US012141883B2

(12) United States Patent
LaVan

(10) Patent No.: US 12,141,883 B2
(45) Date of Patent: *Nov. 12, 2024

(54) CLAIM AND PROGRESSION MANAGEMENT

(71) Applicant: Advocacy Solutions, LLC, Charleston, SC (US)

(72) Inventor: Kenneth L. LaVan, Plantation, FL (US)

(73) Assignee: Advocacy Solutions, LLC, Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,151

(22) Filed: Nov. 19, 2019

(65) Prior Publication Data

US 2020/0090292 A1 Mar. 19, 2020

Related U.S. Application Data

(63) Continuation of application No. 14/586,609, filed on Dec. 30, 2014, now Pat. No. 10,497,077, which is a (Continued)

(51) Int. Cl.

| | |
|---|---|
| ***G06Q 40/00*** | (2023.01) |
| ***G06Q 10/00*** | (2023.01) |
| ***G06Q 40/08*** | (2012.01) |
| ***G06Q 50/26*** | (2012.01) |
| ***G07B 17/00*** | (2006.01) |
| ***G07F 19/00*** | (2006.01) |

(52) U.S. Cl.

CPC ............ *G06Q 50/26* (2013.01); *G06Q 10/00* (2013.01); *G06Q 40/00* (2013.01); *G06Q 40/08* (2013.01); *G07B 17/00* (2013.01); *G07F 19/00* (2013.01)

(58) Field of Classification Search

CPC ........ G06Q 40/08; G06Q 40/00; G06Q 10/00; G06Q 50/26; G06N 5/02

See application file for complete search history.

(56) References Cited

U.S. PATENT DOCUMENTS 6,611,807 B1 8/2003 Bernheim et al.
7,185,273 B2 2/2007 Thomason
(Continued)

OTHER PUBLICATIONS

Bilder, Scott (Navigating the Disability Process: Persons with Mental Disorders Applying for and Receiving Disability Benefits, https://www.ncbi.nlm.nih.gov/pmc/articles/PMC2690202/, Mar. 2003) (Year: 2003).*

(Continued)

*Primary Examiner* — Elizabeth H Rosen
*Assistant Examiner* — Mark H Gaw
(74) *Attorney, Agent, or Firm* — McHale & Slavin, P.A.

(57) ABSTRACT

The present invention is a computer implemented method and system for gathering information from a user related to, filing for, and obtaining government benefits, such as Social Security benefits. The present invention also enables the user to track the benefit application approval process and reminders when certain data or responses are due. There is a feature which enables the user to modify the data submitted for the benefits when circumstances warrant. There is also a decision appeal process feature.

7 Claims, 405 Drawing Sheets

Related U.S. Application Data continuation of application No. 13/843,743, filed on Mar. 15, 2013, now abandoned.

(60) Provisional application No. 61/619,049, filed on Apr. 2, 2012.

(56) References Cited

U.S. PATENT DOCUMENTS

| | | | | |
|---|---|---|---|---|
| 7,546,268 | B1 | 6/2009 | DiGiovanni et al. | |
| 7,600,252 | B2 | 10/2009 | Illowksy et al. | |
| 7,734,480 | B2 | 6/2010 | Stangel | |
| 7,753,263 | B2 | 7/2010 | Schader | |
| 7,765,116 | B1 | 7/2010 | Allsup | |
| 8,185,463 | B1 | 5/2012 | Ball | |
| 2002/0035488 | A1 | 3/2002 | Aquila et al. | |
| 2002/0152113 | A1* | 10/2002 | Butz | G06Q 30/02 705/7.37 |
| 2003/0074277 | A1 | 4/2003 | Foutz | |
| 2003/0158750 | A1 | 8/2003 | Banks et al. | |
| 2003/0167220 | A1 | 9/2003 | Schoen et al. | |
| 2003/0195774 | A1 | 10/2003 | Abbo | |
| 2007/0260501 | A1* | 11/2007 | Schader | G06Q 40/04 235/380 |
| 2008/0010279 | A1 | 1/2008 | Lykkehoy et al. | |
| 2008/0059249 | A1 | 3/2008 | Joao | |
| 2009/0150190 | A1* | 6/2009 | Solomon | G06Q 40/08 705/4 |
| 2009/0192827 | A1 | 7/2009 | Anderson et al. | |
| 2009/0222290 | A1 | 9/2009 | Crowe | |
| 2010/0145734 | A1 | 6/2010 | Becerra et al. | |
| 2010/0185466 | A1 | 7/2010 | Paradis et al. | |
| 2010/0211403 | A1 | 8/2010 | Allsup | |
| 2010/0217624 | A1 | 8/2010 | Kay | |
| 2010/0318393 | A1 | 12/2010 | Acker et al. | |
| 2011/0077981 | A1 | 3/2011 | Kay | |
| 2012/0059677 | A1* | 3/2012 | Crowe | G06Q 40/08 705/4 |
| 2013/0073539 | A1 | 3/2013 | Bowser et al. | |

OTHER PUBLICATIONS

Bilder, S. et al, "Navigating the disability process: persons with mental disorders applying for and receiving disability benefits", Rutgers University, New Brunswick, New Jersey, PMCID: PMC2690202, PMD: 12669652, (2003).

Anonymous, "LaVan & Neidenberg quadruples customer base", Lavan & Neidenberg, P.A., Corporate article from IBM Software Legal Services, IBM Corporation, pp. 1-6, (May 2012).

* cited by examiner

Claim Progression Flow Chart
| | | | |
|---|---|---|---|
| ▭ | = Current Claim Status | ▱ | = Workflow (WF) Complete |
| ◇ | = Workflow (WF) Triggers | ⬭ | = Incoming Mail (mailLetterIn) received from SSA |
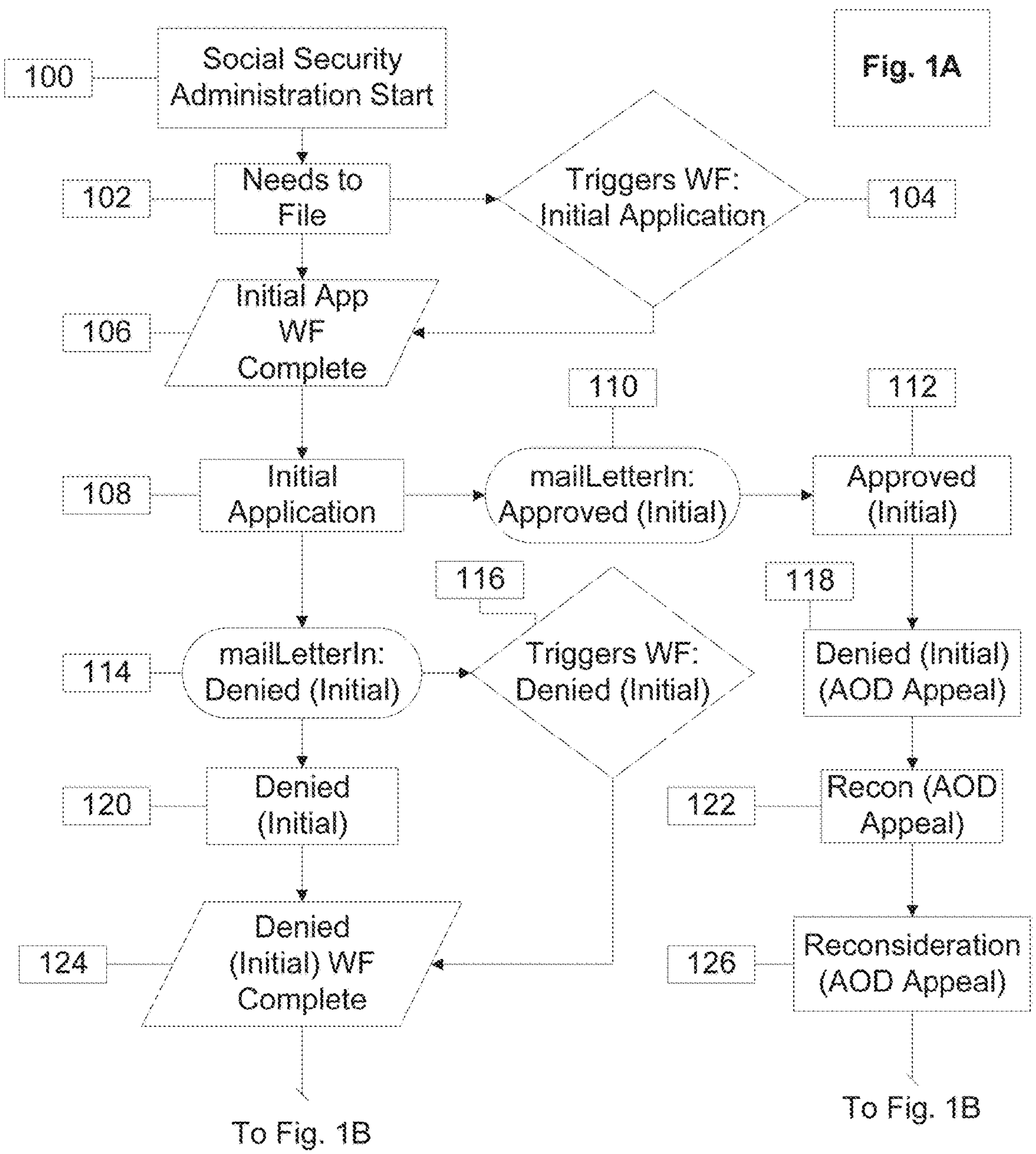

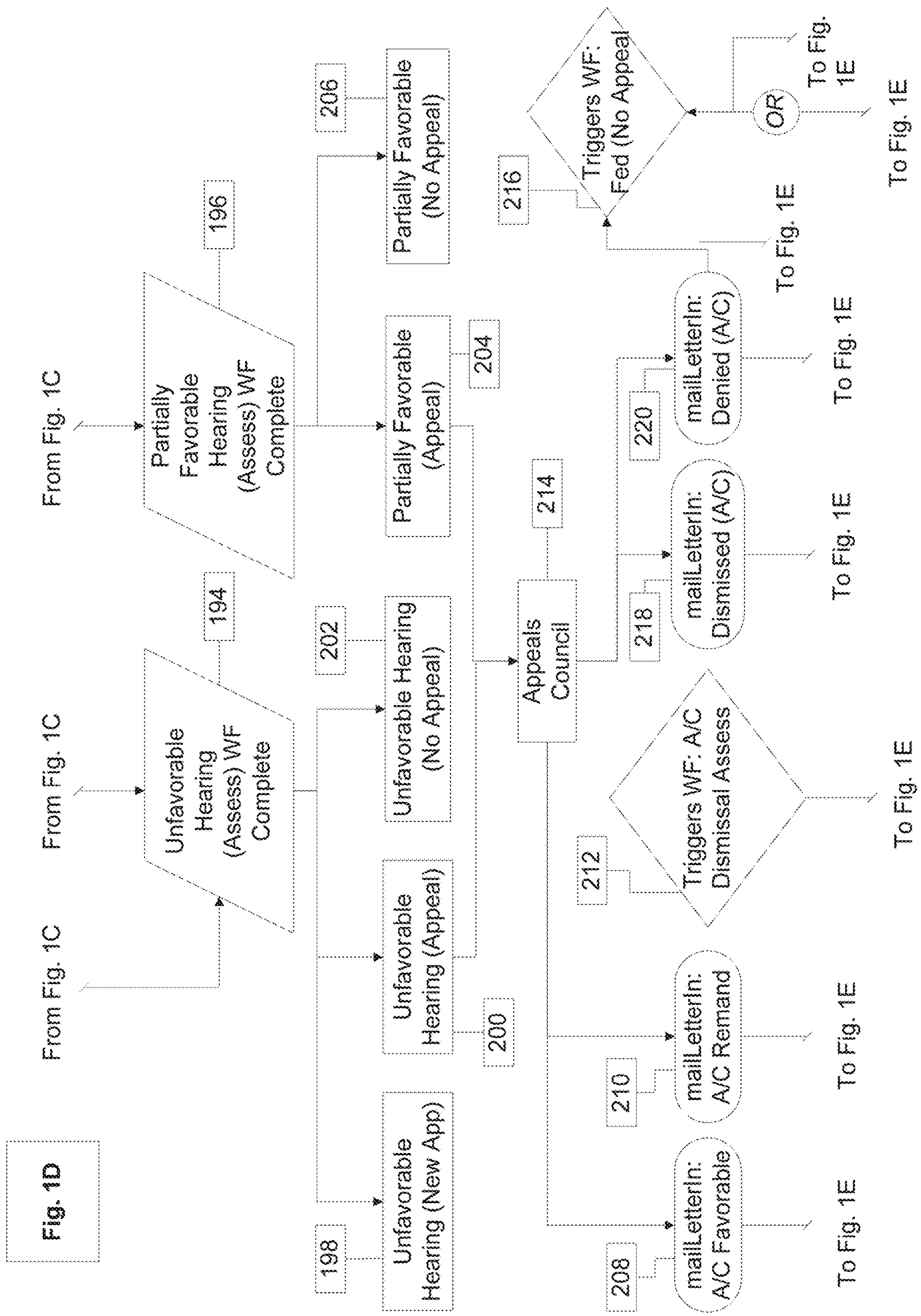
Fig. 1D
From Fig. 1C
From Fig. 1C
From Fig. 1C
Unfavorable Hearing (Assess) WF Complete
194
Partially Favorable Hearing (Assess) WF Complete
196
Unfavorable Hearing (New App)
198
Unfavorable Hearing (Appeal)
200
Unfavorable Hearing (No Appeal)
202
Partially Favorable (Appeal)
204
Partially Favorable (No Appeal)
206
Appeals Council
214
mailLetterIn: A/C Favorable
208
mailLetterIn: A/C Remand
210
Triggers WF: A/C Dismissal Assess
212
mailLetterIn: Dismissed (A/C)
218
mailLetterIn: Denied (A/C)
220
Triggers WF: Fed (No Appeal
216
OR
To Fig. 1E
To Fig. 1E
To Fig. 1E
To Fig. 1E
To Fig. 1E
To Fig. 1E
To Fig. 1E
To Fig. 1E
To Fig. 1E

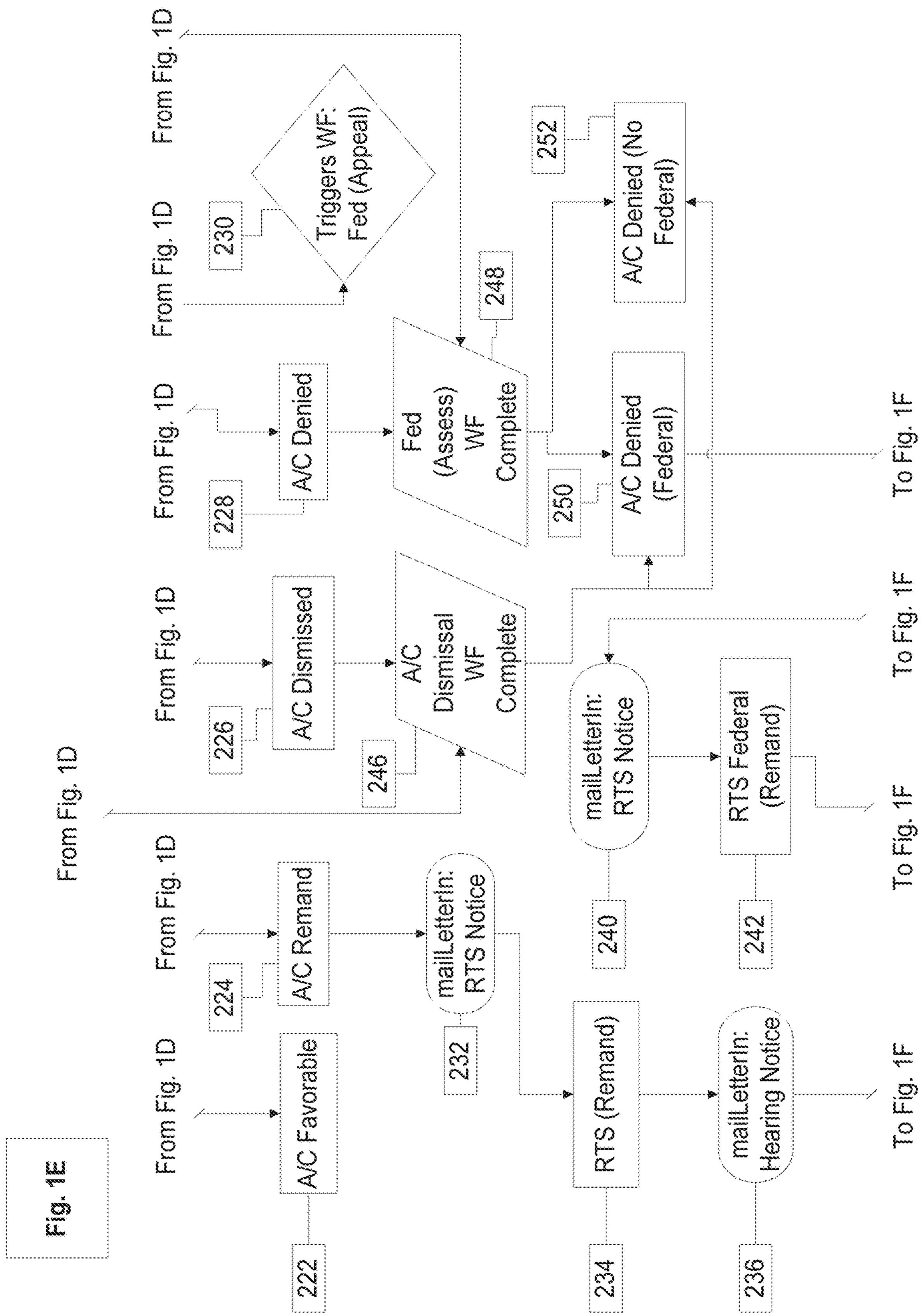
Fig. 1E
From Fig. 1D
A/C Favorable
222
From Fig. 1D
A/C Remand
224
mailLetterIn: RTS Notice
232
RTS (Remand)
234
mailLetterIn: Hearing Notice
236
To Fig. 1F
From Fig. 1D
From Fig. 1D
A/C Dismissed
226
A/C Dismissal WF Complete
246
mailLetterIn: RTS Notice
240
RTS Federal (Remand)
242
To Fig. 1F
To Fig. 1F
From Fig. 1D
A/C Denied
228
Fed (Assess) WF Complete
248
A/C Denied (Federal)
250
To Fig. 1F
From Fig. 1D
Triggers WF: Fed (Appeal)
230
From Fig. 1D
A/C Denied (No Federal)
252

Fig. 5

Workflows: Workflows have been integrated throughout all divisions of the company. The workflows process account for 50% of all work that is completed within the firm. Workflows are tasks that are broken down into specific steps. Each workflow can start automatically by the system of by a user, get assigned to a user, can require a document to be imported to complete specific workflows, and can generate template letters when assigned to the workflow. All workflows are configurable within the office and do not need programmer assistance.

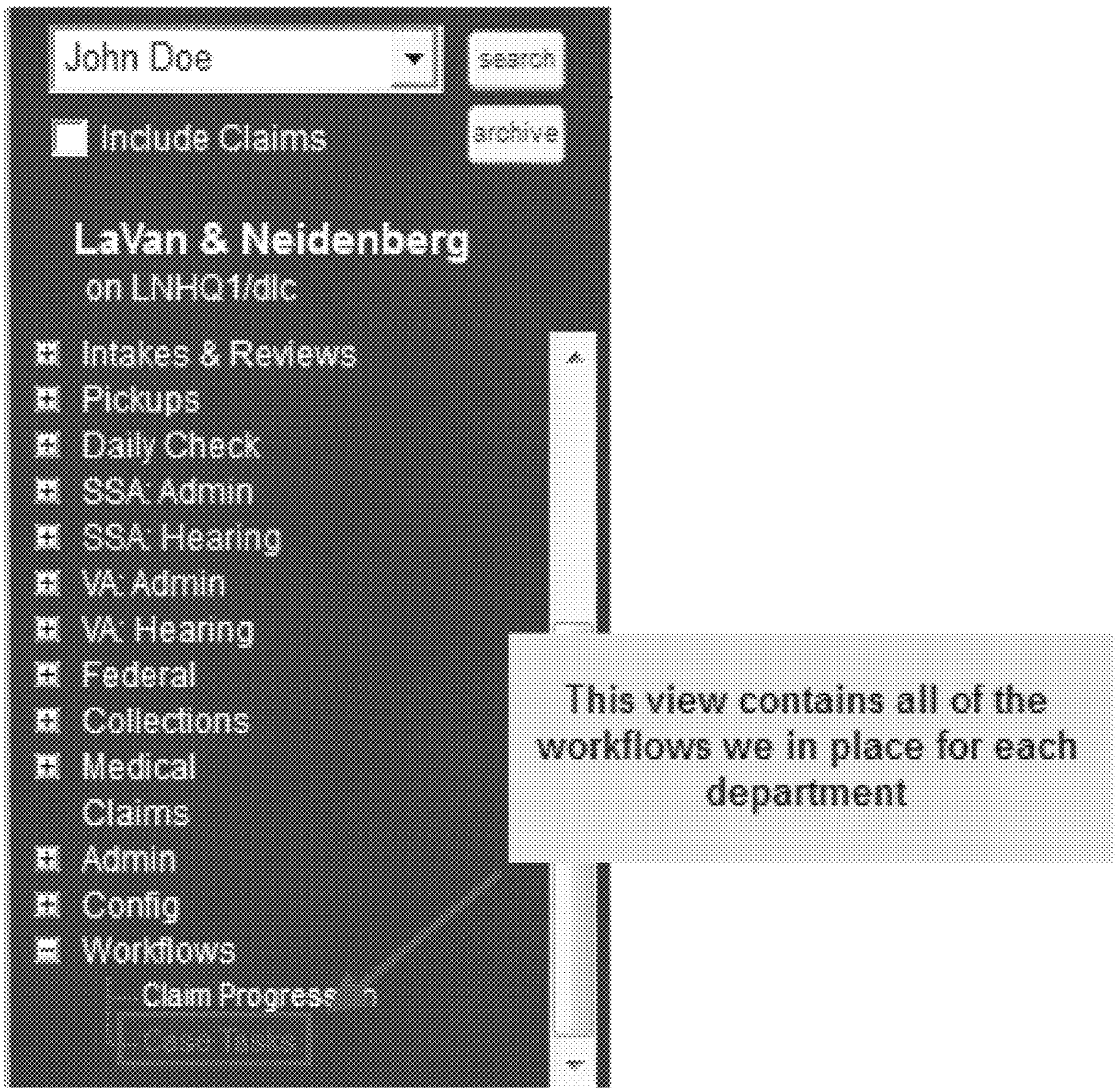

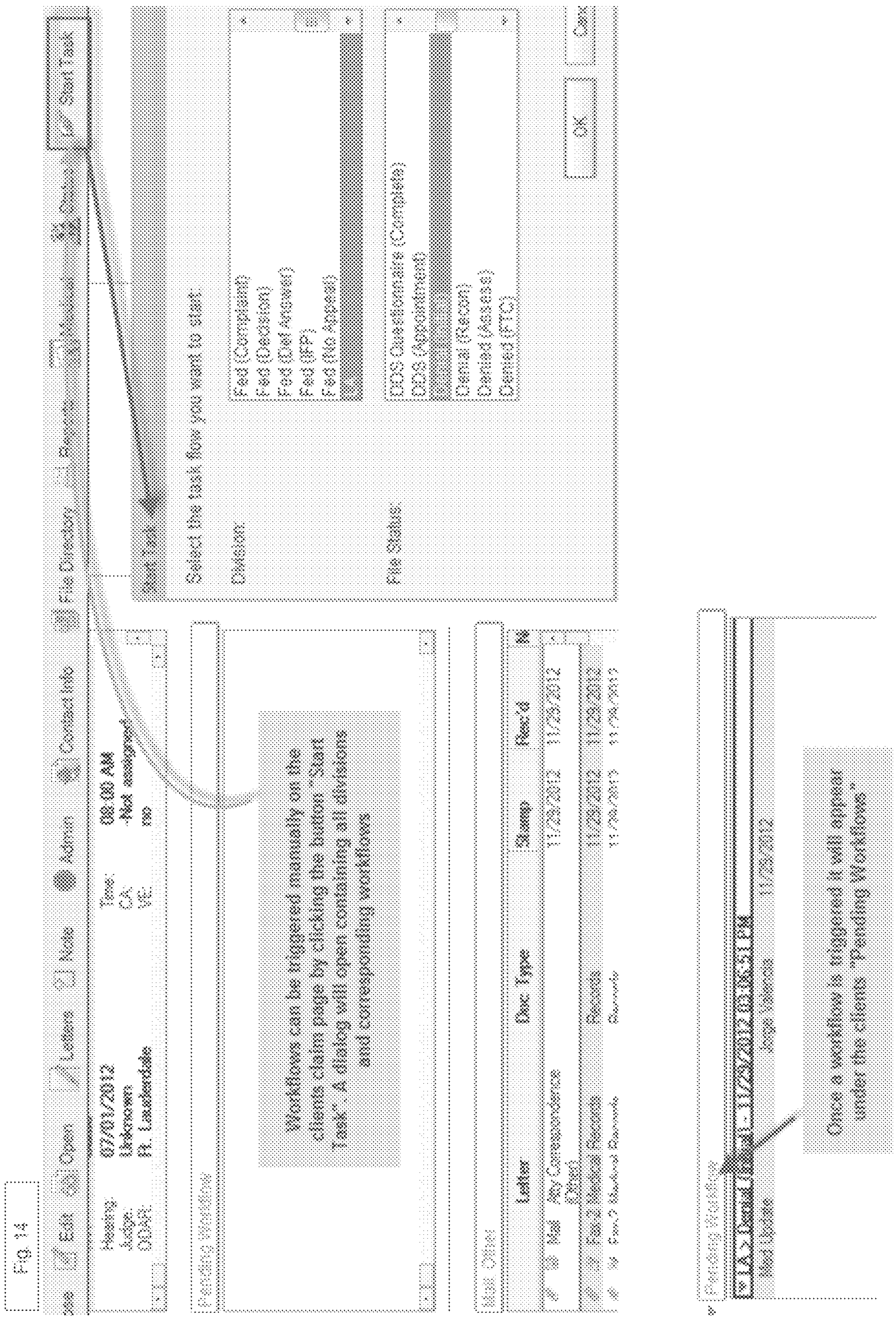
Fig. 14
Start Task
Select the task flow you want to start:
Division:
Fed (Complaint)
Fed (Decision)
Fed (Def Answer)
Fed (IFP)
Fed (No Appeal)
File Status:
DDS Questionnaire (Complete)
DDS (Appointment)
Denial (Recon)
Denied (Assess)
Denied (FTC)
OK
Pending Workflow
Workflows can be triggered manually on the clients claim page by clicking the button "Start Task". A dialog will open containing all divisions and corresponding workflows
Once a workflow is triggered it will appear under the clients "Pending Workflows"

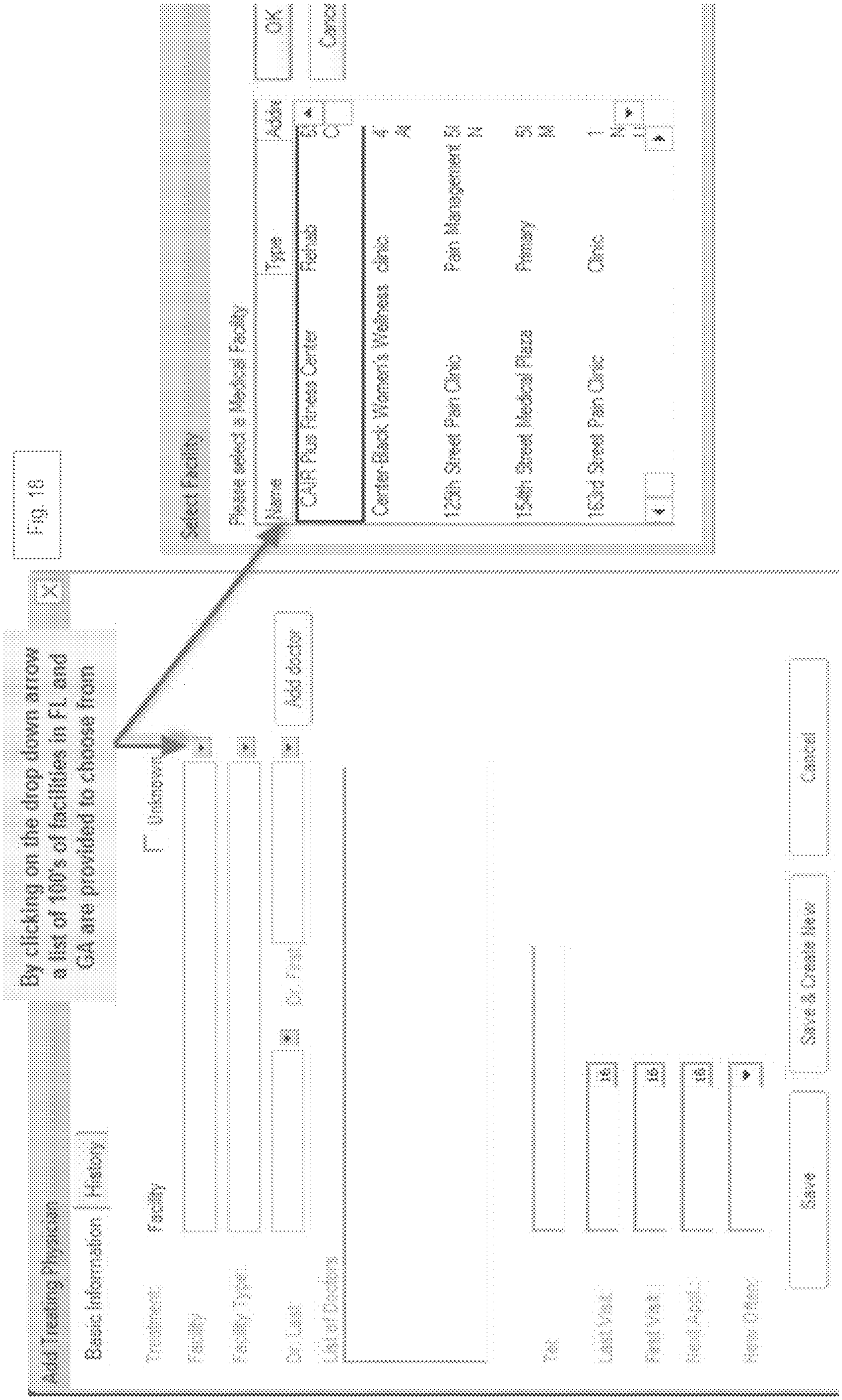
Fig. 18
By clicking on the drop down arrow a list of 100's of facilities in FL and GA are provided to choose from
Add Treating Physician
Basic Information
History
Facility
Unknown
Dr. Find
Add doctor
Save
Save & Create New
Cancel
Select Facility
Please select a Medical Facility
Name
Type
CAM Plus Fitness Center
Rehab
Center Black Women's Wellness
clinic
12th Street Pain Clinic
Pain Management
15th Street Medical Plaza
Primary
153rd Street Pain Clinic
Clinic
OK

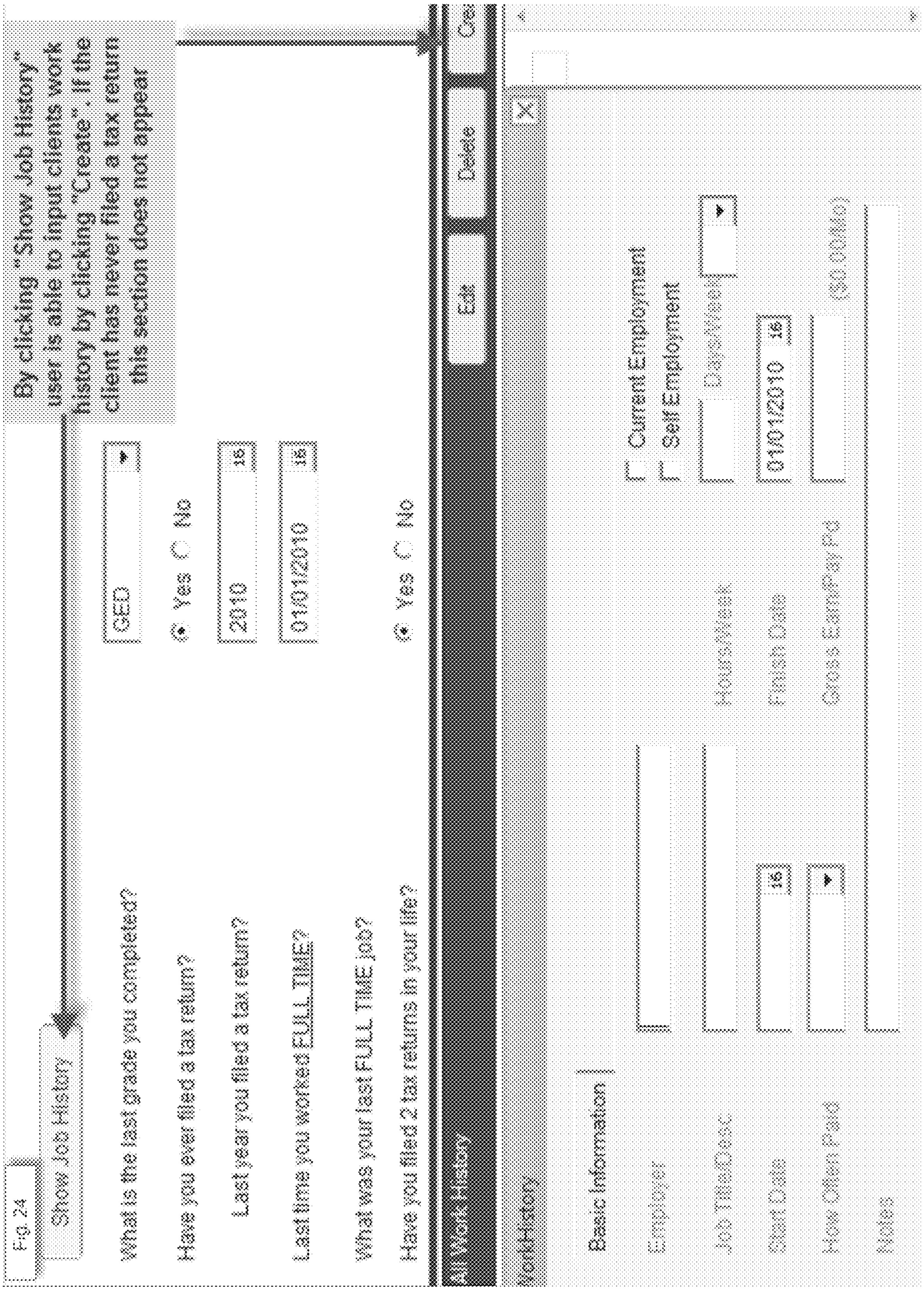
Fig 24
Show Job History
By clicking "Show Job History" user is able to input clients work history by clicking "Create". If the client has never filed a tax return this section does not appear
What is the last grade you completed?
GED
Have you ever filed a tax return?
Yes
No
Last year you filed a tax return?
2010
Last time you worked FULL TIME?
01/01/2010
What was your last FULL TIME job?
Have you filed 2 tax returns in your life?
Yes
No
All Work History
Edit
Delete
WorkHistory
Basic Information
Employer
Job Title/Desc
Start Date
How Often Paid
Notes
Hours/Week
Finish Date
Gross Earn/Pay Pd
Current Employment
Self Employment
Days/Week
01/01/2010
($0.00/Mo)

Intake Sheet
Financial Status
Do you have any children?
Yes
No
How many children do you have? Tip
1
How many kids are NOT receiving SSI & live with you?
1
How many are receiving SSI?
Comments:
The number of children a client and if the child receives SSI is a factor in the clients eligibility.
To Be Continued...
Close
Previous
Next

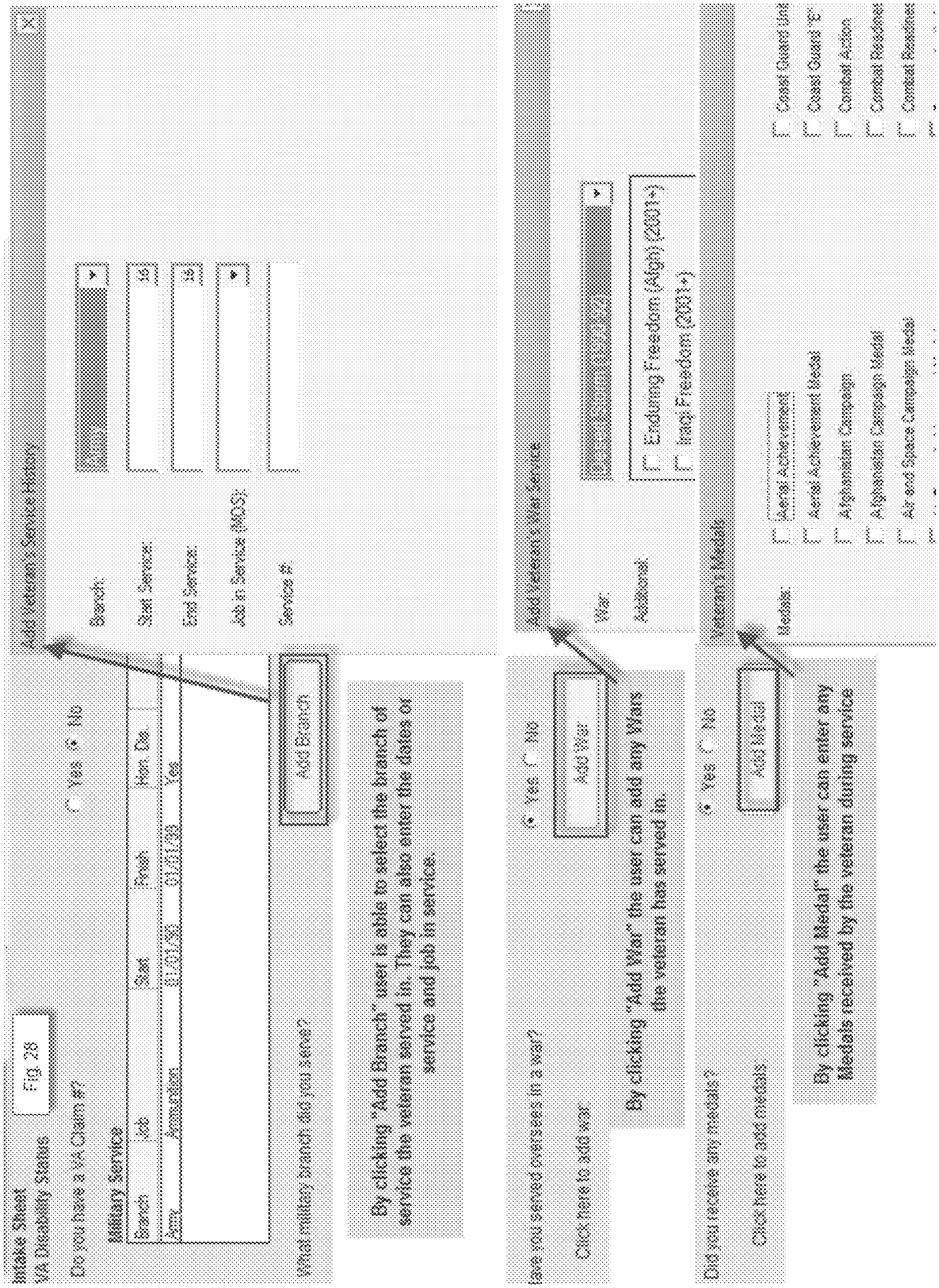
Fig 28
Intake Sheet
VA Disability Status
Do you have a VA Claim #?
Yes No
Military Service
Branch
Job
Start
Finish
Hon. Dis.
Army
Ammunition
01.01.90
01.01.98
Yes
What military branch did you serve?
Add Branch
By clicking "Add Branch" user is able to select the branch of service the veteran served in. They can also enter the dates of service and job in service.
Add Veteran's Service History
Branch:
Start Service:
End Service:
Job in Service (MOS):
Service #:
Have you served overseas in a war?
Click here to add war
Add War
By clicking "Add War" the user can add any Wars the veteran has served in.
Add Veteran's War Service
War:
Additional:
Enduring Freedom (Afgh) (2001+)
Iraqi Freedom (2001+)
Did you receive any medals?
Click here to add medals
Add Medal
By clicking "Add Medal" the user can enter any Medals received by the veteran during service
Veteran's Medals
Medals:
Aerial Achievement
Aerial Achievement Medal
Afghanistan Campaign
Afghanistan Campaign Medal
Air and Space Campaign Medal
Combat Action

Medical Conditions

Hundreds if medical conditions have been added to the database. Each condition has specific questions that can pre-approve a client for medical reasons on the Intake Wizard.

These views show the medical conditions categorized by what type of claim the client has:

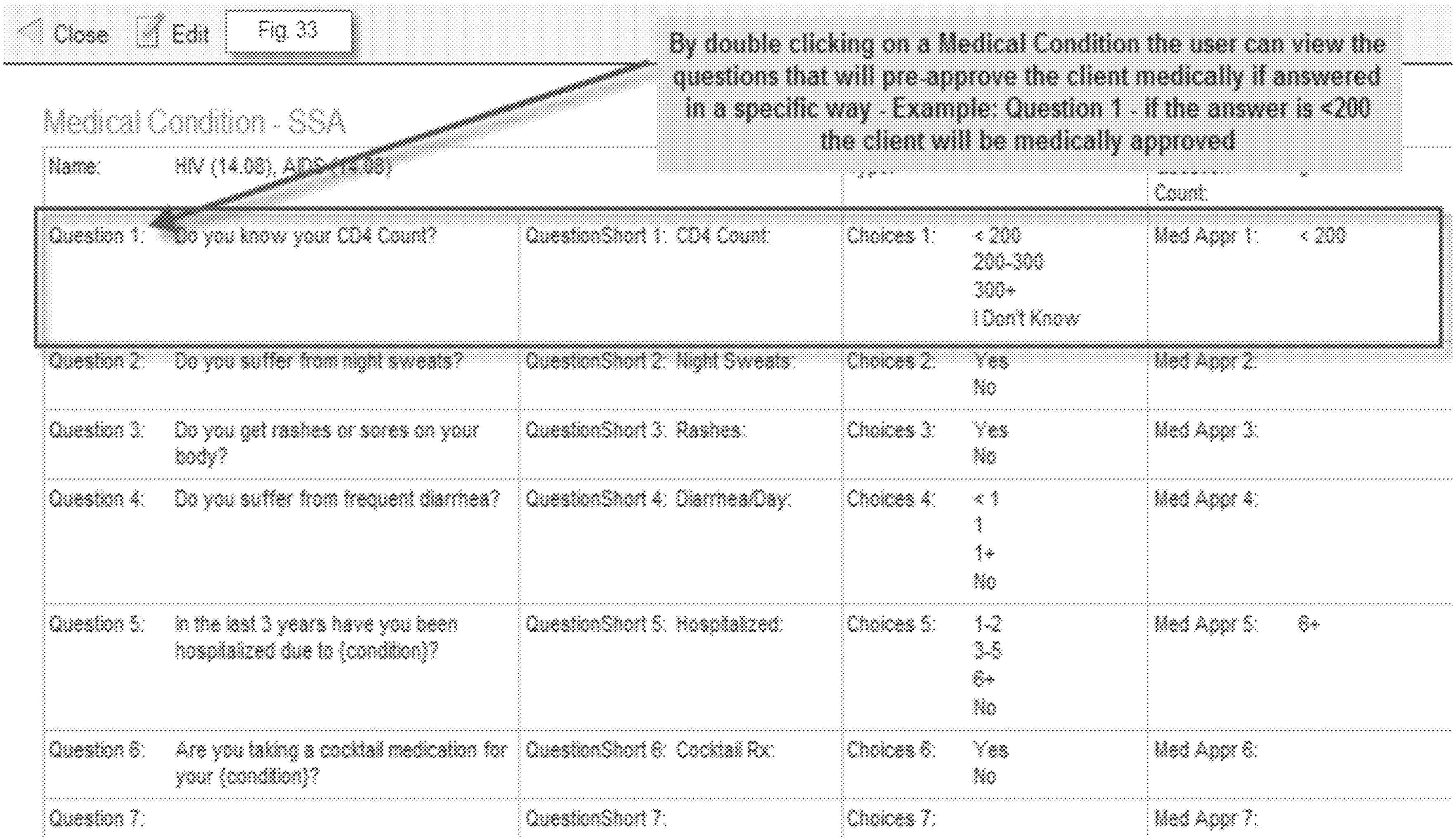
Close
Edit
Fig 33
By double clicking on a Medical Condition the user can view the questions that will pre-approve the client medically if answered in a specific way - Example: Question 1 - if the answer is <200 the client will be medically approved
Medical Condition - SSA
Name: HIV (14.08), AIDS (14.08)
Count:
Question 1: Do you know your CD4 Count?
QuestionShort 1: CD4 Count:
Choices 1: < 200
200-300
300+
I Don't Know
Med Appr 1: < 200
Question 2: Do you suffer from night sweats?
QuestionShort 2: Night Sweats:
Choices 2: Yes
No
Med Appr 2:
Question 3: Do you get rashes or sores on your body?
QuestionShort 3: Rashes:
Choices 3: Yes
No
Med Appr 3:
Question 4: Do you suffer from frequent diarrhea?
QuestionShort 4: Diarrhea/Day:
Choices 4: < 1
1
1+
No
Med Appr 4:
Question 5: In the last 3 years have you been hospitalized due to {condition}?
QuestionShort 5: Hospitalized:
Choices 5: 1-2
3-5
6+
No
Med Appr 5: 6+
Question 6: Are you taking a cocktail medication for your {condition}?
QuestionShort 6: Cocktail Rx:
Choices 6: Yes
No
Med Appr 6:
Question 7:
QuestionShort 7:
Choices 7:
Med Appr 7:

Intake Wizard – Termination Reasons

Fig. 34a

The following chart explains the Termination Reasons we have implemented in the Intake Wizard. If the potential client meets any of this criteria their intake wizard will be denied internally with a brief explanation why.

| Code: | Translation: |
|---|---|
| cl_ifWithYou = "No" & cl_ifPowerAtty = "No" & cl_ifGetClaimant = "No";"NOPOWERATTY"; | If client is not present, 3rd party attempting to complete intake without power of attorney |
| intake_isReceivingSSA = "Yes" & intake_isSSACutOff = "No"; "NOTCUTOFF"; | If client is currently receiving benefits |
| clLegRes = "No"; "NOTLEGAL"; | If client is not a legal resident of the U.S. |
| cl_ifArrestWarrant = "Yes"; "ARRESTWARRANT"; | If client has a pending arrest warrant |
| dsp_clTotalIncomeCurrentJob > 1000; "DIBJOBLIMIT"; | If client has income greater than $1000 and is eligible for Disability Insurance Benefits |
| (clKidsLive != "") \| clAge < 18 & clChildParentsHome = "1" & ((clTotalSalary > clTotalSalaryLimit1Parent) \| (clTotalOtherInc > clTotalOtherIncLimit1Parent)); "CHILD1PARENT"; | If intake is for a child and parents income exceeds limits set forth by SSA (see Deeming Chart) |
| dsp_clTotalIncomeCurrentJob > 694 & (cl_ifTaxReturns = "No" \| cl_ifTaxesEver = "No"); "SSIJOBLIMIT"; | If client has income greater than $684 and is only eligible for Supplemental Security Income |
| (clKidsLive != "") \| clMaritalStatus = "Married" & (cl_ifTaxReturns = "No" \| cl_ifTaxesEver = "No") & ((clSpouseMo > clSpouseIncLimit) \| (clSpouseMoPension > clSpousePenLimit)); "SSISPOUSE"; | If client's spouse exceeds income limits set forth by SSA (see Deeming Chart) |
| clMaritalStatus = "Married" & clTotalSalary > 9999 & (cl_ifTaxReturns = "No" \| cl_ifTaxesEver = "No"); "SSITOTALMARRIED"; | If client and spouse's total income exceeds limits set forth by SSA (see Deeming Chart) |

Fig. 34b

<table>
<tr><th>Code:</th><th>Translation:</th></tr>
<tr><td>clMaritalStatus = "Married" & (cl_ifTaxReturns = "No" |<br>cl_ifTaxesEver = "No") & clTotalCars > 3;<br>"SSI2CAR";</td><td>If client owns more than 1 vehicle, or if married owns more than 2 vehicles</td></tr>
<tr><td>clMaritalStatus = "Married" & (cl_ifTaxReturns = "No" |<br>cl_ifTaxesEver = "No") & clTotalProperties > 1;<br>"SSI2PROPERTY";</td><td>If client owns more than 1 property, or if married owns more than 2 properties</td></tr>
<tr><td>clMaritalStatus = "Married" & (cl_ifTaxReturns = "No" |<br>cl_ifTaxesEver = "No") & clTotalBank >= 3000;<br>"SSI3000BANK";</td><td>If client has more than $2000 in the bank</td></tr>
<tr><td>clAge > 67;<br>"OVER67";</td><td>If client is over age 67</td></tr>
<tr><td>clAge > 64 & SSA_Current = "Needs to File";</td><td>If client is 64 or older and has the claim status "Needs to File"</td></tr>
<tr><td>cl_ifGetBenefitsStoppedFix = "No";<br>"FINANCIALCUTOFFNOTRESOLVED";</td><td>If client's benefits were stopped for technical reasons</td></tr>
<tr><td>clAge > 64 & (clAodLnAge >= 65);<br>"OVER64BADAOD";</td><td>If client is over 65 and their onset date is too long ago</td></tr>
</table>

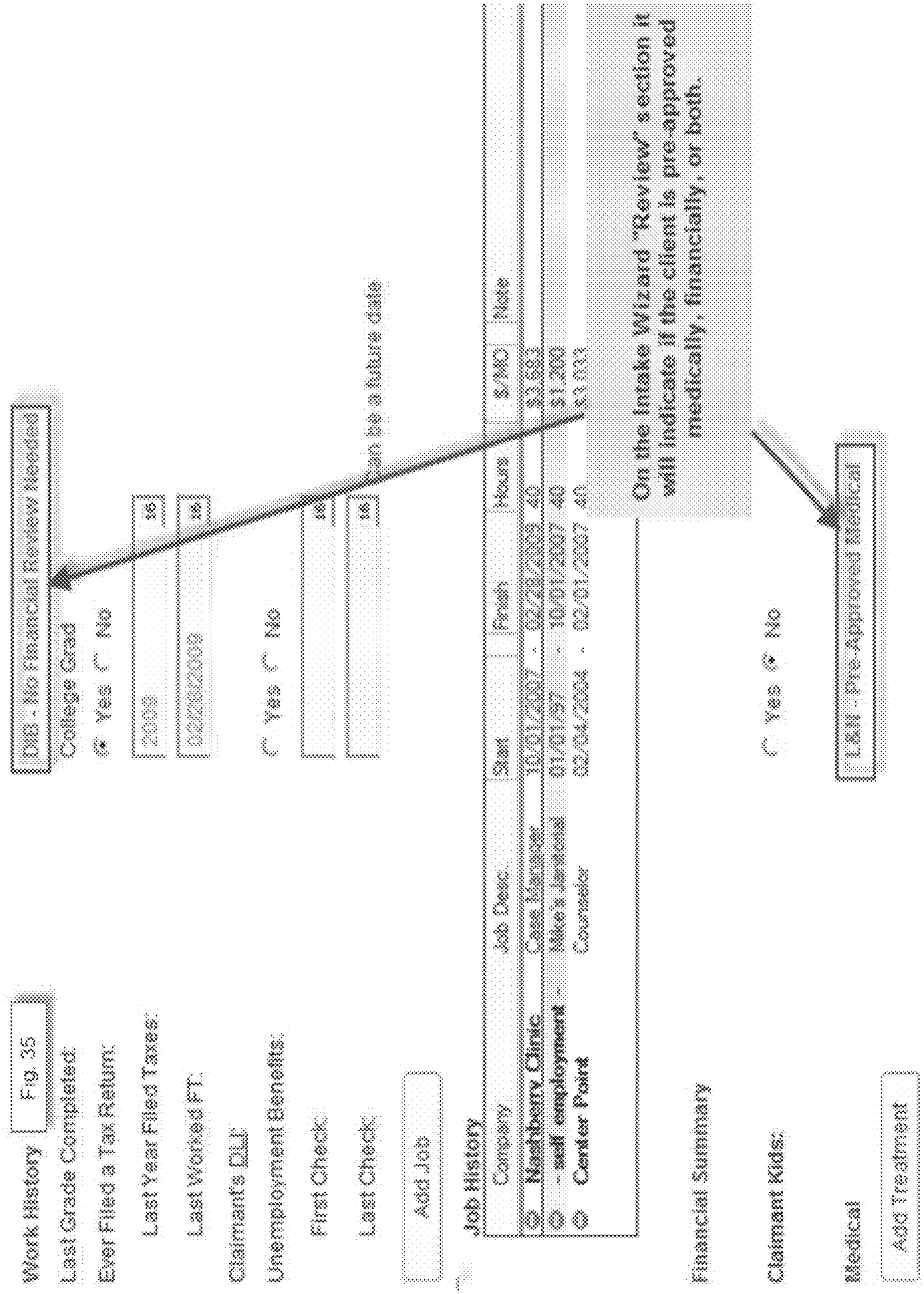
Fig. 35
Work History
Last Grade Completed:
College Grad
Ever Filed a Tax Return:
Yes No
Last Year Filed Taxes:
2009
Last Worked FT:
02/28/2008
Claimant's DLI:
Unemployment Benefits:
Yes No
First Check:
Last Check:
can be a future date
Add Job
Job History
Company
Job Desc.
Start
Finish
Hours
$/MO
Note
Newberry Clinic
Case Manager
10/01/2007
02/28/2008
40
$1,683
self employment
01/01/97
10/01/2007
40
$1,200
Center Point
Counselor
02/04/2004
02/01/2007
40
Financial Summary
Claimant Kids:
Yes No
Medical
Add Treatment
DIB - No Financial Review Needed
LRM - Pre-Approved Medical
On the Intake Wizard "Review" section it will indicate if the client is pre-approved medically, financially, or both.

I Reviewed ALL Claims:

Yes
No
Once the claims are accepted or denied the reviewer must verify all contact information before submitting the intake
Verification Section
Verify Address
Verify Address New (DONT USE)
Last Name:
Doe
Address:
1214 S Andrews Ave Ste 301
City:
Fort Lauderdale
State:
FL
Zip Code:
33316-1826

Import Wizard

The Import Wizard allows the user to attach documents to individual client's files.

The following is an overview of the Import Window. All of the functions outlined below are the same in each Import view (Incoming Mail, Outgoing Mail, Collections, Medical Records, Pickups, and Work-flow Docuemtns Each user is assigned an electronic folder where they scan all of the documents they process.

Once the folder is selected it will remain selected unless the user clicks "select folders" again and changes it User selects the appropriate client that they want to assign the document to by using the search bar. Once the client is selected information from their claim will appear in the import window as shown below:

The button "Pick" allows the user to select a certain document from all documents in the folder:

The button "Skip" allows the user to skip the current document:

Fig. 45
Skip
Pick
Refresh
John Doe (SSA)
search
archive
Folders
select folders
Source \\DLCSERVER1\Transfer\Scanned\CSR\1120
Target \\DLCSERVER1\Transfer\Scanned\CSR\1120\Trash
File Broward health flyer - Copy - Copy.pdf

The button "Import" opens the import window for the user to classify the document.

Pickups Fig. 46

The "Pickups" Import Wizard is used to import the initial representation paperwork signed by a client.

To access the "Pickups" Import Wizard the user would select "Pickups" under Import Import Pickup Documents
John Doe (Pickup)
Select folders
SSA pickup
John Doe 123-45-6789
User will click "Import" to attach the document to the specific clients file.
Social Security Administration
Please read the instructions before completing this form.
Name (Claimant) (Print or Type)
John Doe
Wage Earner (If Different)
Part I
Adam Neidenberg
Signature (Claimant)

After clicking "Import" this dialog will appear showing the 3 different categories the signed paperwork will go into After one of the sections is imported it's indicated on the import window as shown below. To complete a "Pickup" import all 3 categories in the dialogue above should appear under "Imported Subjects"

Fig 49
Skip
John Doe (Pickup)
search
archive
Folders
select folders
Source \\DLCSERVER1\Transfer\Scanned\CS R\1120
Target \\DLCSERVER1\Transfer\Scanned\CS R\1120\Trash
File SKMBT_50111111716570.pdf
SSA pickup
John Doe 123-45-6789
SSA
1214 S Andrews Ave Ste 301
Fort Lauderdale, FL 33316-1826
Cell 954-523-3870 Home 954-899-7717
DOB 01/01/55, 57
1696 & FA
After one of 3 sections is imported is will appear here

This print screen shows the clients claim page after the documents have been imported – All you have to do is right click on the paperclip and you can see the document.

Incoming Mail

To access the "Incoming Mail" Import Wizard the user selects Import > "Incoming Mail"

After clicking "Import" the following dialogue appears.

Section 1 – User will select the mailLetterIn description for what they are importing and complete the date fields.

Section 3: User can assign the document to another user (if necessary) and also add notes if needed Section 4: Each of the fields in this section appear on the clients claim page. If the fields are updated, once the user clicks "Save" the document will attach to the clients claim and any fields that were edited will be reflected on the clients claim.

This print screen shows the clients claim page after the import window was saved and document was attached to the clients file:

Outgoing Mail Fig. 57

To access the "Outgoing Mail" Import Wizard the user selects Import > "Outgoing Mail"

After clicking "Import" this dialogue will appear:

The following print screens will breakdown the dialogue explaining it in 2 sections:

<u>Section 1</u>: User will select the mailLetter description for what they are importing and complete the date field:

Section 2: User will select the method in which the document was delivered and who it was delivered to

Workflow Documents

Several work-flows have been created to require a document to be attached to EZ Claim as part of the work-flow.

For example: the work-flow, LA > Application (Draft) requires the user to attach the Application Packet To access the "Work-flow Documents" Import Wizard the user selects Import > "Work-flow Documents"

When the user clicks the “Import” button this dialogue will appear. Claims can have multiple workflows pending at one time so this dialogue ensures the user is completing the correct one.

The user needs to verify that work-flow they are completing is on the correct step, which is the import step:

After clicking "Yes" on the dialogue the document is imported.

Medical Records

To access the "Medical Records" Import Wizard the user clicks Import > "Medical Records"

The "Medical Record" import window opens as shown below

Once the appropriate client and document have been selected the user clicks "Import".

The following print screens will breakdown the dialogue explaining it in 3 sections:

Section 1 - Using the Client import option

"Unrequested" dialogue continued

"Unrequested" dialogue continued Part 3
Reminders tab from the Import Window

Fig. 30
If the user selects Client > "Other" the following dialogue appears.
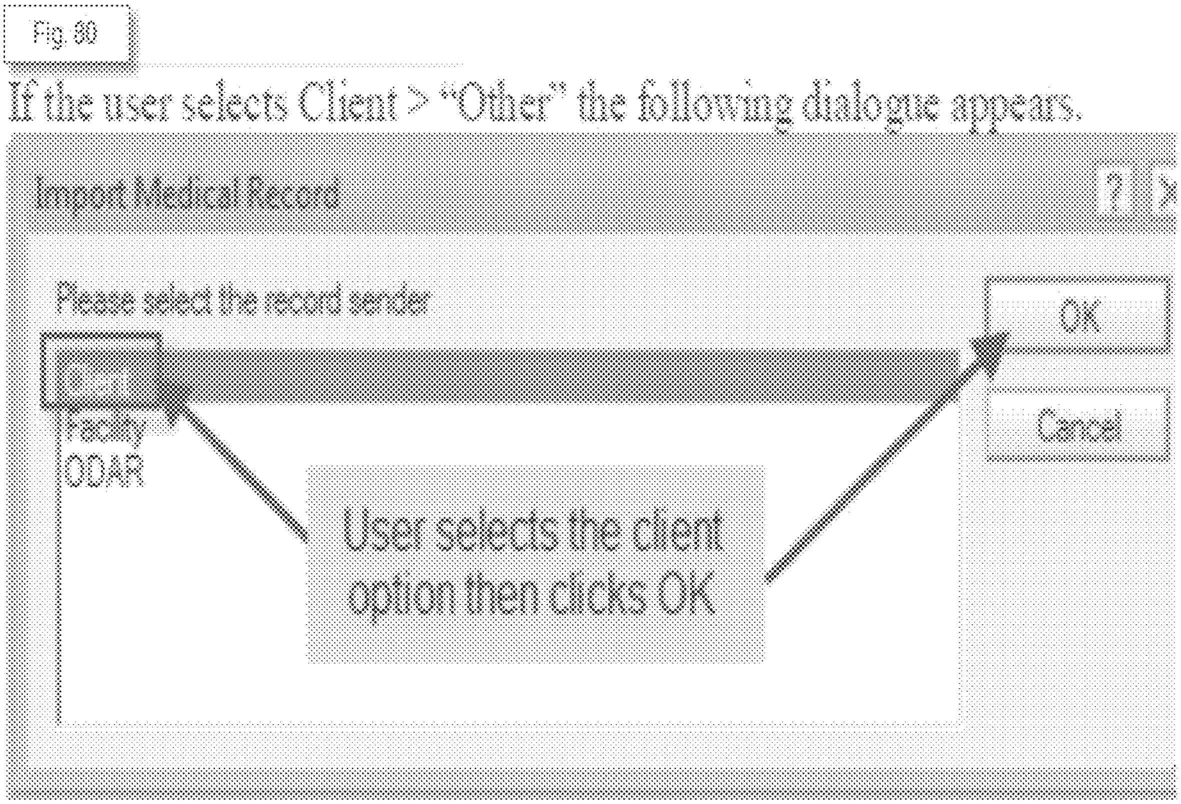
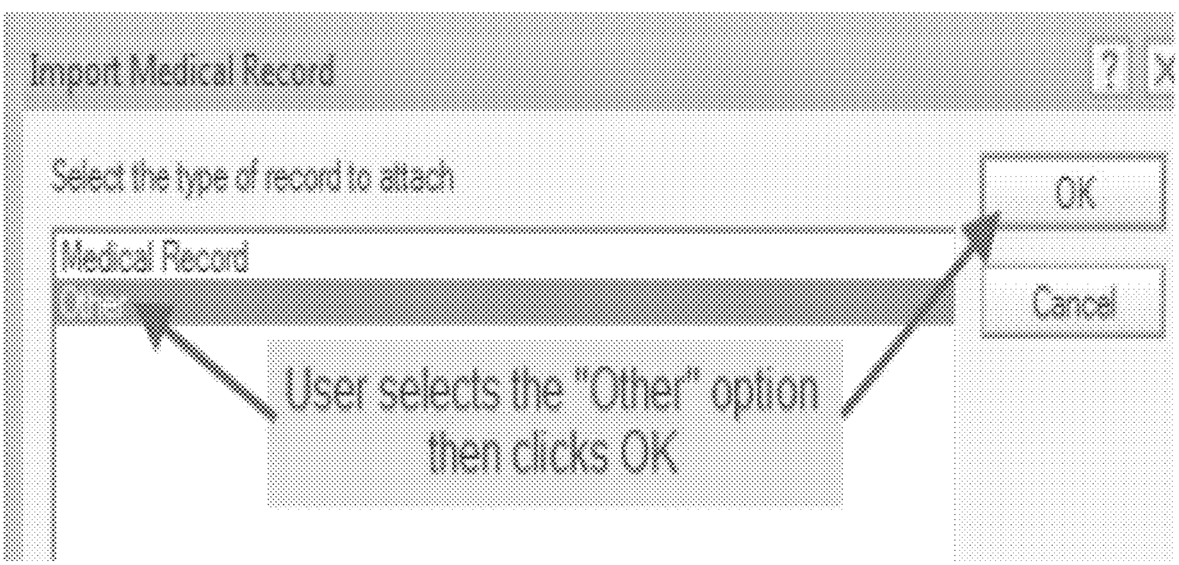

Section 2 – If the user selects the facility option this dialog will appear.

"Close" option from the Import - Facility - Medical Records - Requested window appears as shown below:

"Close" Option continued

"Close" - Consolidated Option

"Close" - Consolidated Option continued

If the user selects Facility - Invoice this dialogue box will appear

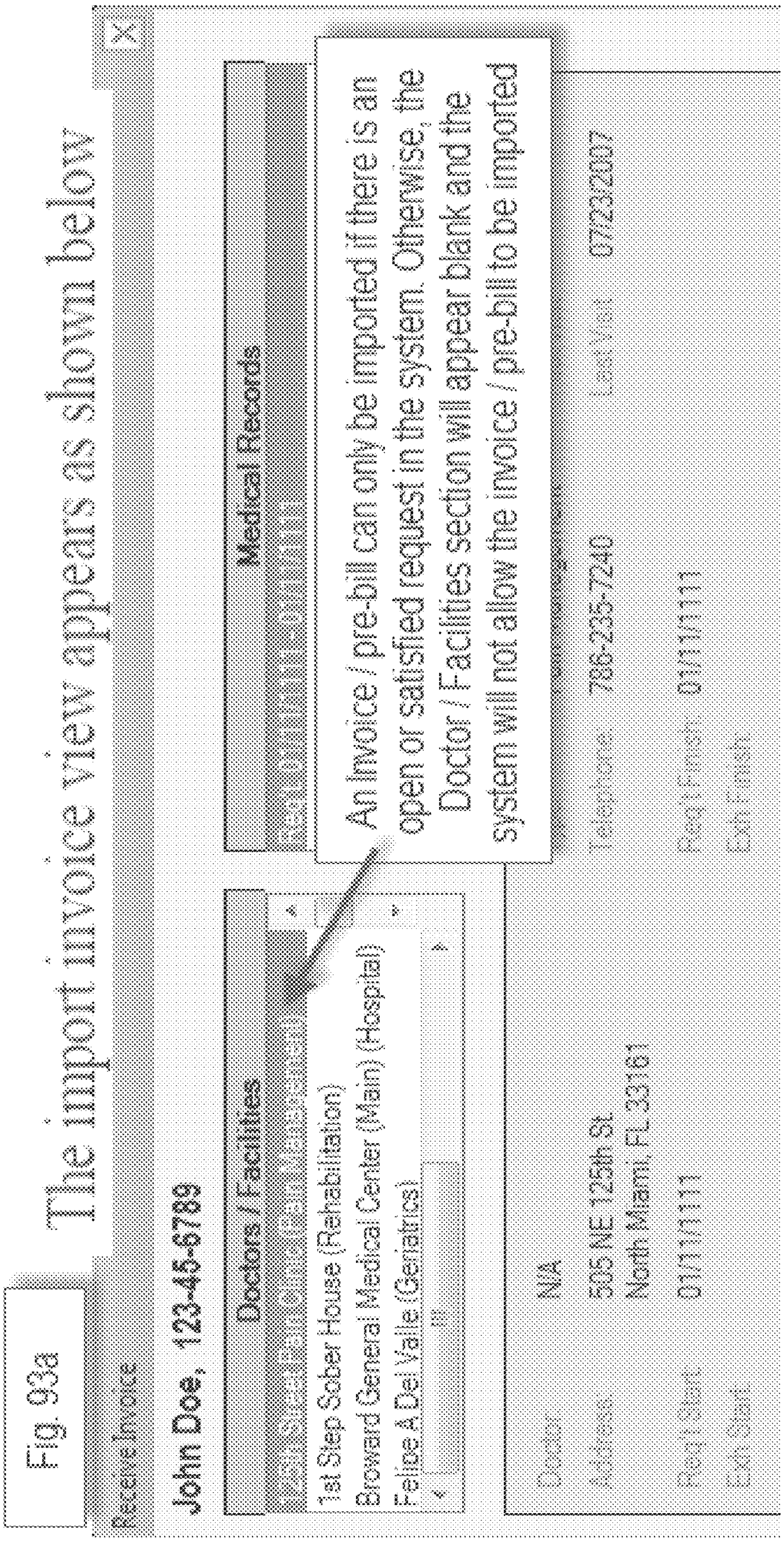
Fig. 93a
The import invoice view appears as shown below
Receive Invoice
John Doe, 123-45-6789
Doctors / Facilities
Medical Records
1st Step Sober House (Rehabilitation)
Broward General Medical Center (Main) (Hospital)
Felice A Del Valle (Geriatrics)
An Invoice / pre-bill can only be imported if there is an open or satisfied request in the system. Otherwise, the Doctor / Facilities section will appear blank and the system will not allow the invoice / pre-bill to be imported
Doctor NA
Address 505 NE 125th St
North Miami, FL 33161
Telephone 786-235-7240
Last Visit 07/23/2007
Req't Start 01/11/1111
Req't Finish 01/11/1111
Exh Start
Exh Finish Section 3 – If the user selects the ODAR option this dialog will appear.

When selecting the "Unrequested" option the following dialogue appears.

Fig. 97
John Doe
search
Include Claims
archive
LaVan & Neidenberg
on LNHO1/dlc
Start Intake
My Assignments
My Attachments
Set a Meeting
Incoming Mail
Outgoing Mail
Client Search
Medical Records

Collections

To access the "Collections" Import Wizard the user selects Import > "Collections".

After clicking "Import" the following dialogue appears.

Based on what the user selects a second dialogue will appear – an explanation of each is shown below:

If "New Fee Request" is selected the following dialogue appears.

The following print screens will breakdown the dialogue explaining it in 4 sections:

<u>Section 1:</u> User selects the Subject, Type, Fee Type Issued By, and the Check Received date.

Section 2: User selects the attorney's name that appears on the check, enters the amount and a note if necessary

Section 3: User selects the AR Status and completes the date fields

Section 4: User has the option to change the client's status and/or status date if necessary If "New Fee Mail" is selected, the following dialogue appears.

Fig. 106
Select Collection
Select the collection to which you want to attach the file
OK
Cancel
Once a "New Fee Request" is imported it would appear here - user is able to add on to it

"Existing Fee Request"

This corresponds with the first Collections import option - "New Fee Request"

Once a "New Fee Request" is imported additional things can be added to it later using this importing option

Fig. 107
Select Collection
Select the collection to which you want to attach the file
Fee Type
Retro
Client
Atto
OK
Cancel
Once a "New Fee Mail" is imported it would appear here - user is able to add on to it

"Existing Fee Mail"

This corresponds with the first Collections import option - "New Fee Mail"

Once a "New Fee Mail" is imported additional things can be added to it later using this importing option

Fig. 108

Locator Module

The Locator Module systematically assigns various government agencies, offices, and staff members to the clients' file. The Locator analyzes the clients' State, Zip Code, and Social Security Number. Specifically, if the claim is a Veterans Claim, the Regional Office (RO) is assigned. If it is a Social Security Disability Claim the District Office (DO), Disability Determination Service (DDS), and Office of Disability Adjudication & Review (ODAR) are assigned. In addition, the Social Security Administration (SSA) unit that pays the client benefits and the attorney fees once a person is found disabled uses the built in analytics to determine the appropriate unit (Mod or Payment Center (PC)). In addition, the views in the databases organize the groups of clients that have received favorable decisions by Mod or PC.

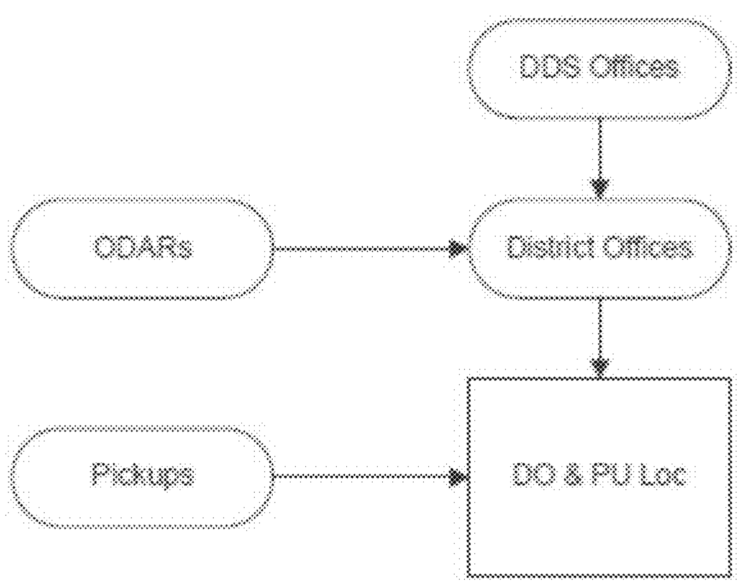

The print screens below show how all components from the flow chart are linked together and associated with each client's file, allowing the system to automatically assign each component to the clients' file.

This view identifies all of the SSA Do's in the country:

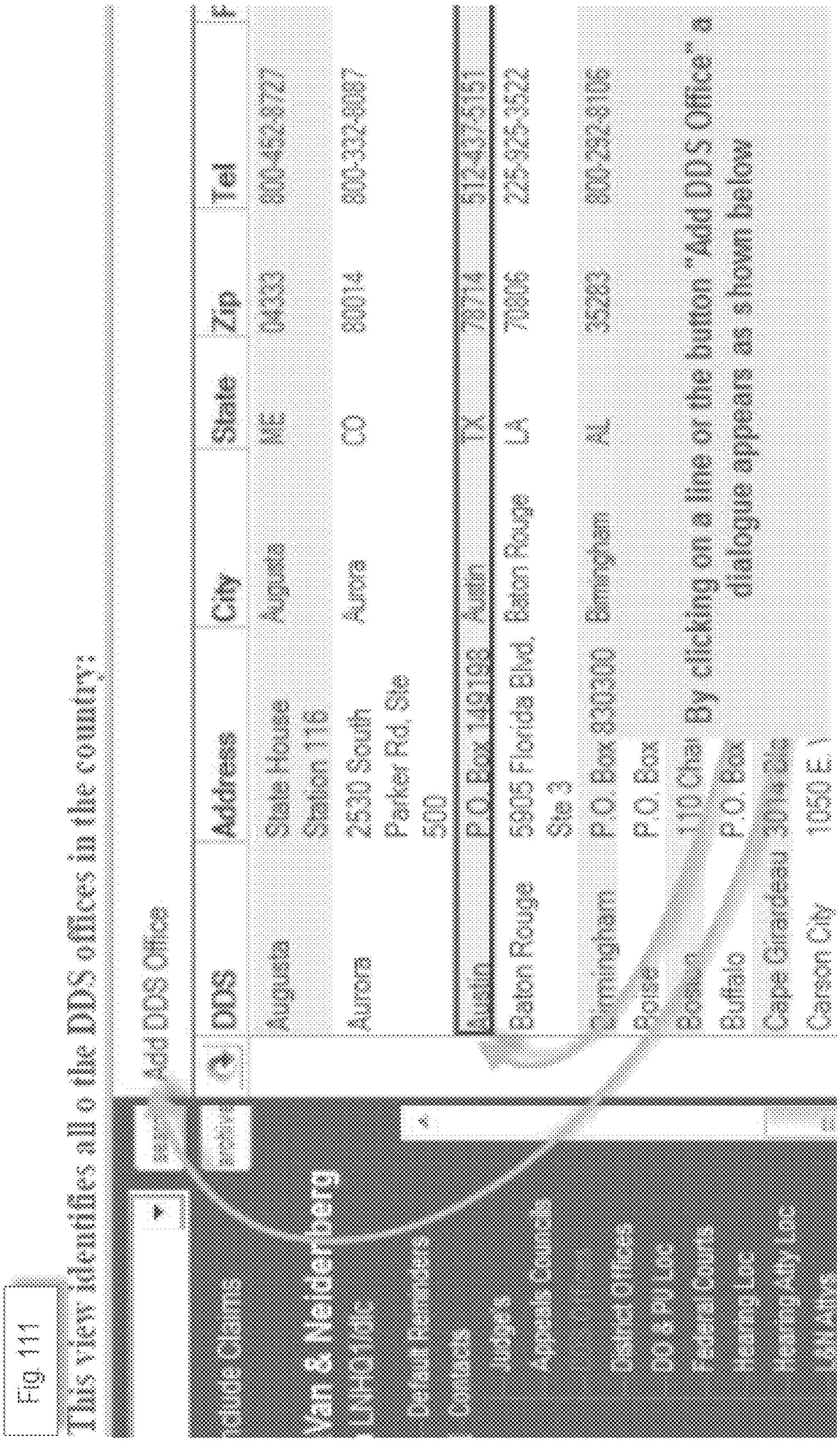
Fig 111
This view identifies all o the DDS offices in the country:
Add DDS Office
DDS
Address
City
State
Zip
Tel
Augusta
State House Station 116
Augusta
ME
04333
800-452-8727
Aurora
2530 South Parker Rd, Ste 500
Aurora
CO
80014
800-332-8087
Austin
P.O. Box 149198
Austin
TX
78714
512-437-5151
Baton Rouge
5905 Florida Blvd, Ste 3
Baton Rouge
LA
70806
225-925-3522
Birmingham
P.O Box 830300
Birmingham
AL
35283
800-292-8106
Boise
P.O. Box
Buffalo
P.O. Box
Cape Girardeau
Carson City
1050 E.
Van & Neiderberg
Default Reminders
Contacts
Judge's
Appeals Councils
District Offices
DDS & PU Loc
Federal Courts
Hearing Loc
By clicking on a line or the button "Add DDS Office" a dialogue appears as shown below The DDS name is then added to the DO dialogue:

This view identifies all of the ODAR's in the country:

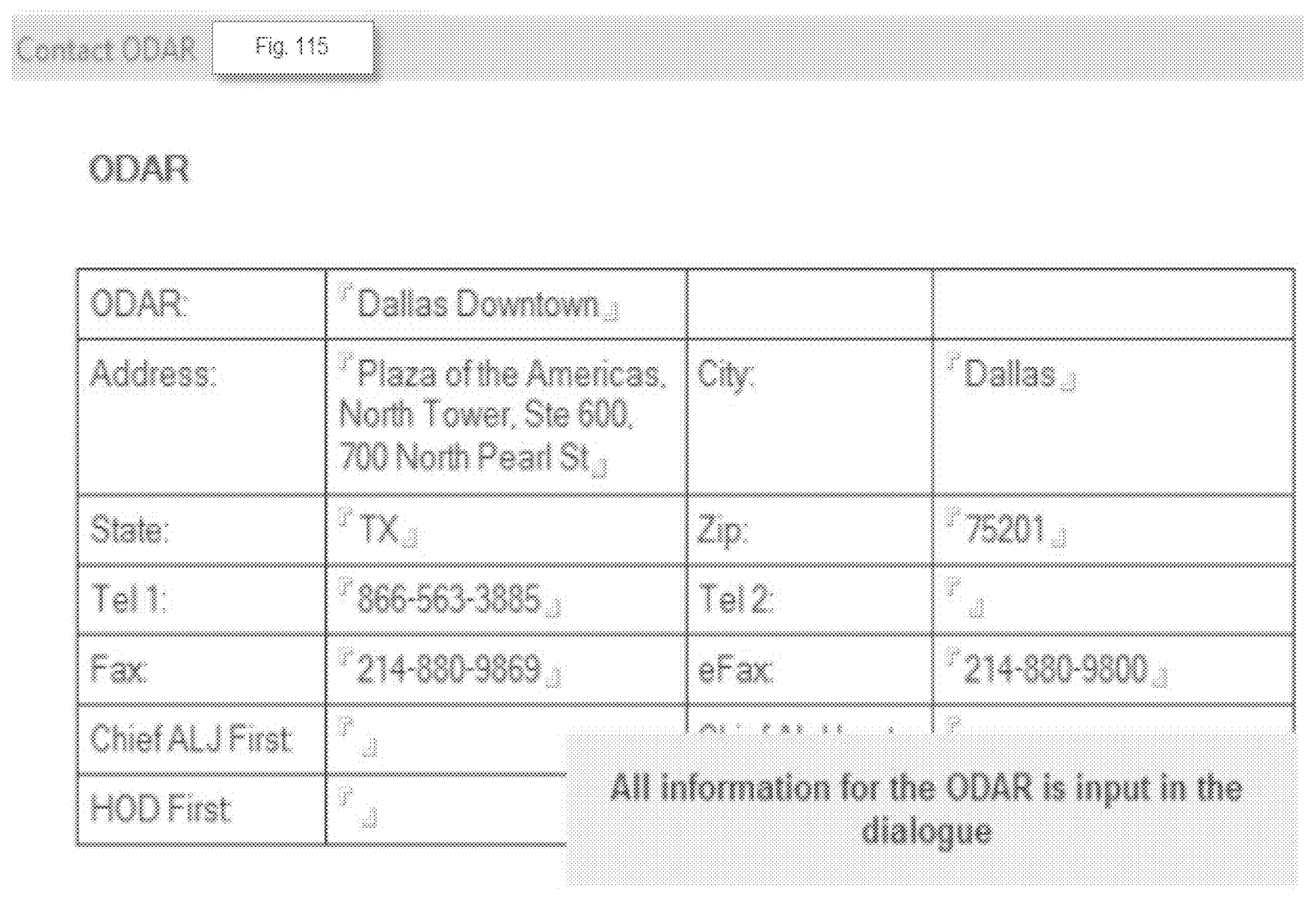

Contact ODAR | Fig. 115

ODAR

| | | | |
|---|---|---|---|
| ODAR: | Dallas Downtown | | |
| Address: | Plaza of the Americas, North Tower, Ste 600, 700 North Pearl St | City: | Dallas |
| State: | TX | Zip: | 75201 |
| Tel 1: | 866-563-3885 | Tel 2: | |
| Fax: | 214-880-9869 | eFax: | 214-880-9800 |
| Chief ALJ First | | [illegible] | |
| HOD First | | | |

All information for the ODAR is input in the dialogue

The ODAR name is then added to the DO dialogue:

Contact - District Office

District Office (based on zip)

| | | | |
|---|---|---|---|
| DO: | Georgetown, TX | Local: | Local Office |
| Address: | 104 Parkview Dr | City: | Georgetown |
| State: | TX | Zip: | 78626 |
| Tel: | 877-531-4699 | Admin Tel: | |
| Fax: | | | |
| Liaison: | | Liaison Tel: | |
| Liaison: Ext | | | |
| Supervisor: | | eMail: | |
| DDS: | Austin | ODAR: | Dallas Downtown |
| Fed Courthouse | | | |

This view identifies all of the staff members that will be assigned to the clients' case based on their zip code:

Pickup

Pickup People
Territory:
Pickup Name:
Chris Marrow
Method:
eMail
eMail:
csmarrow@bellsouth.net
Tel:
404-484-2847
All information for the Pickup Person is input in the dialogue This view matches the client's zip code to the DO and then assigns the DDS, ODAR, and Pickup Person based on the DO:

Figure 120:
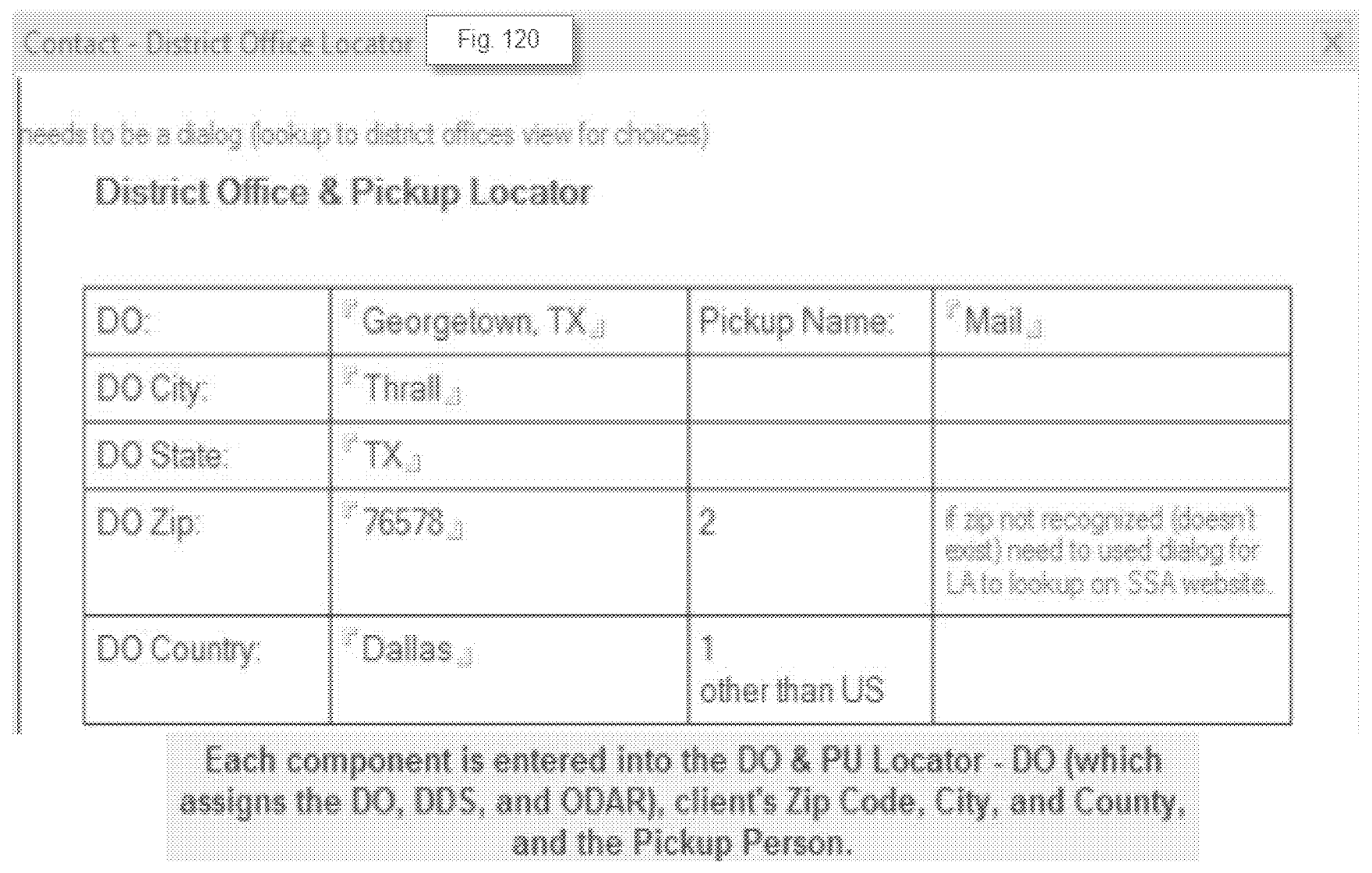

Contact - District Office Locator

Fig. 120 needs to be a dialog (lookup to district offices view for choices)

District Office & Pickup Locator

| | | | |
|---|---|---|---|
| DO: | Georgetown, TX | Pickup Name: | Mail |
| DO City: | Thrall | | |
| DO State: | TX | | |
| DO Zip: | 76578 | 2 | if zip not recognized (doesn't exist) need to used dialog for LA to lookup on SSA website. |
| DO Country: | Dallas | 1<br>other than US | |

Each component is entered into the DO & PU Locator - DO (which assigns the DO, DDS, and ODAR), client's Zip Code, City, and County, and the Pickup Person.

Application Wizard

The Application Wizard was designed to condense the processing time and make the questions more user friendly.

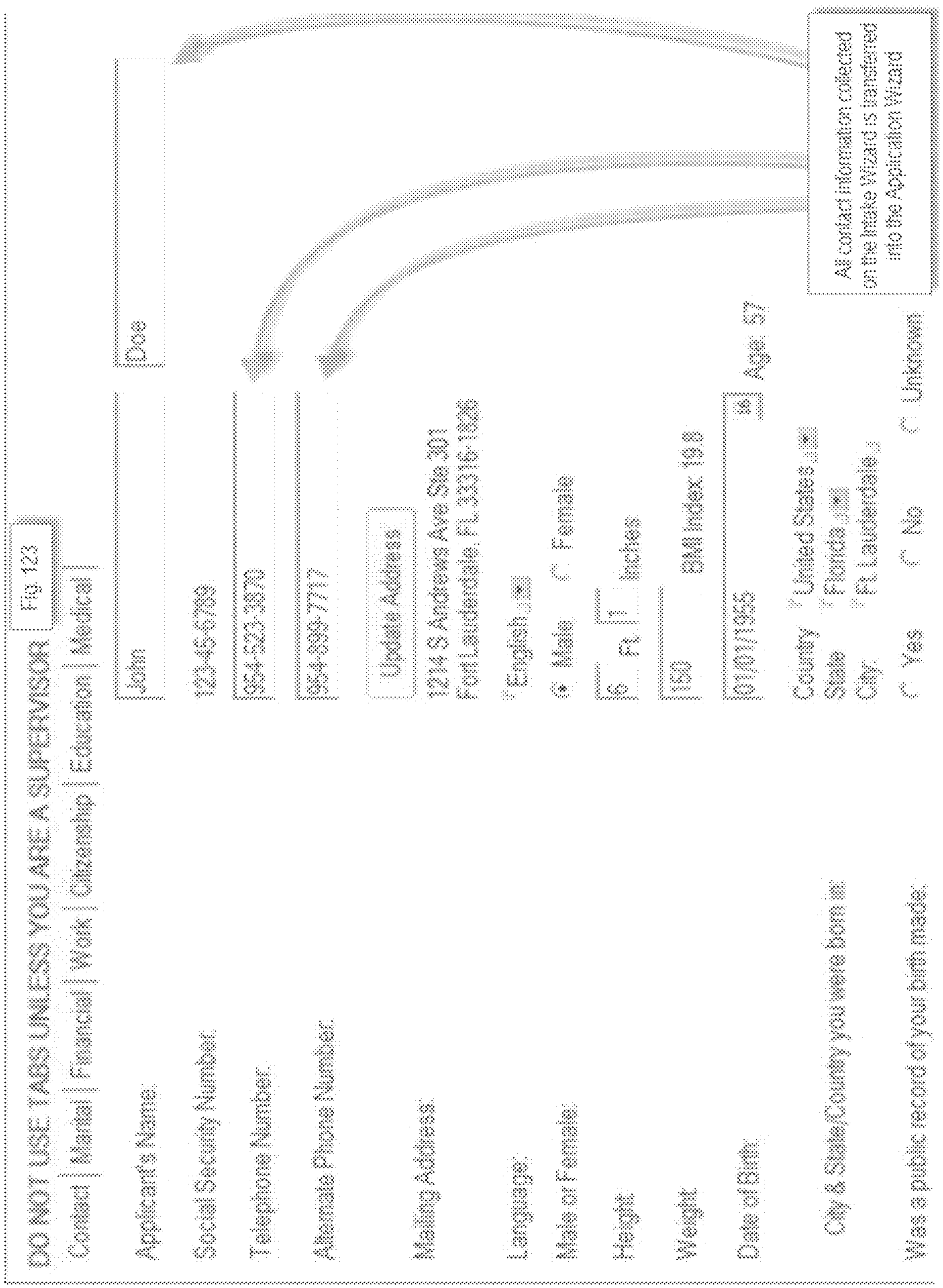
Fig. 123
DO NOT USE TABS UNLESS YOU ARE A SUPERVISOR
Contact | Marital | Financial | Work | Citizenship | Education | Medical
Applicant's Name:
John
Doe
Social Security Number:
123-45-6789
Telephone Number:
954-523-3870
Alternate Phone Number:
954-899-7717
Mailing Address:
Update Address
1214 S Andrews Ave Ste 301
Fort Lauderdale, FL 33316-1826
Language:
English
Male or Female:
Male
Female
Height:
6
Ft.
Inches
Weight:
150
BMI Index: 19.8
Date of Birth:
01/01/1955
Age: 57
City & State/Country you were born in:
Country
United States
State
Florida
City
Ft. Lauderdale
Was a public record of your birth made:
Yes
No
Unknown
All contact information collected on the Intake Wizard is transferred into the Application Wizard

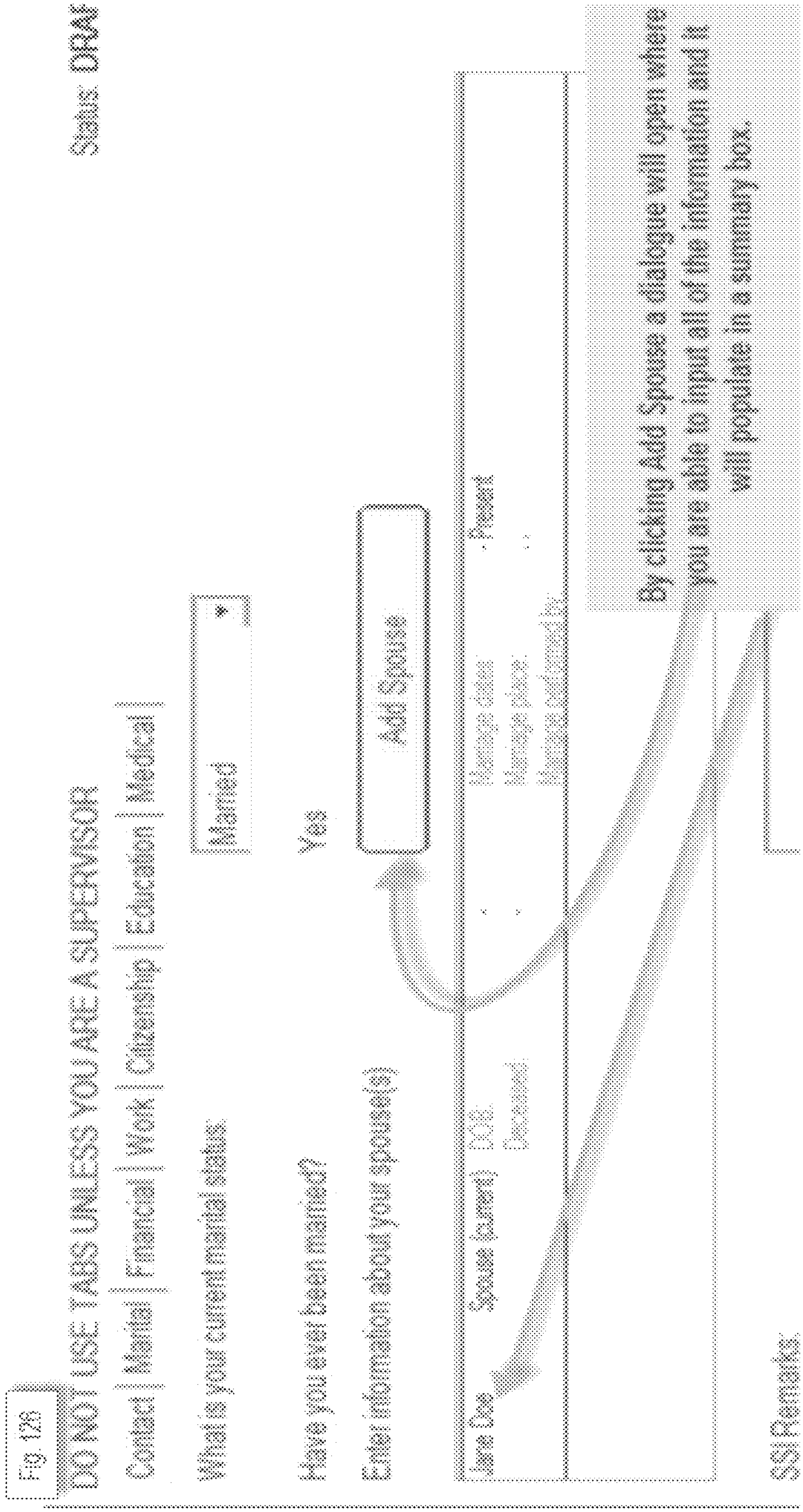
Fig. 128
Status: DRAF
DO NOT USE TABS UNLESS YOU ARE A SUPERVISOR
Contact | Marital | Financial | Work | Citizenship | Education | Medical
What is your current marital status:
Married
Have you ever been married?
Yes
Enter information about your spouse(s)
Add Spouse
Jane Doe
Spouse (current)
DOB:
Deceased:
Marriage date:
Marriage place:
Marriage performed by:
Present
By clicking Add Spouse a dialogue will open where you are able to input all of the information and it will populate in a summary box.
SSI Remarks:

Contact Type

Relationship:
Spouse (former)
First Name:
Last Name:
Other names used:
Date of marriage
Place of marriage
Country
United States
State
City:
Marriage performed by:
Clergyman
Public Official
Notary Public
How marriage ended?
Date marriage ended:
Place marriage ended:
Country
United States
State
City:
DOB:
Unknown
Deceased?
Yes
No

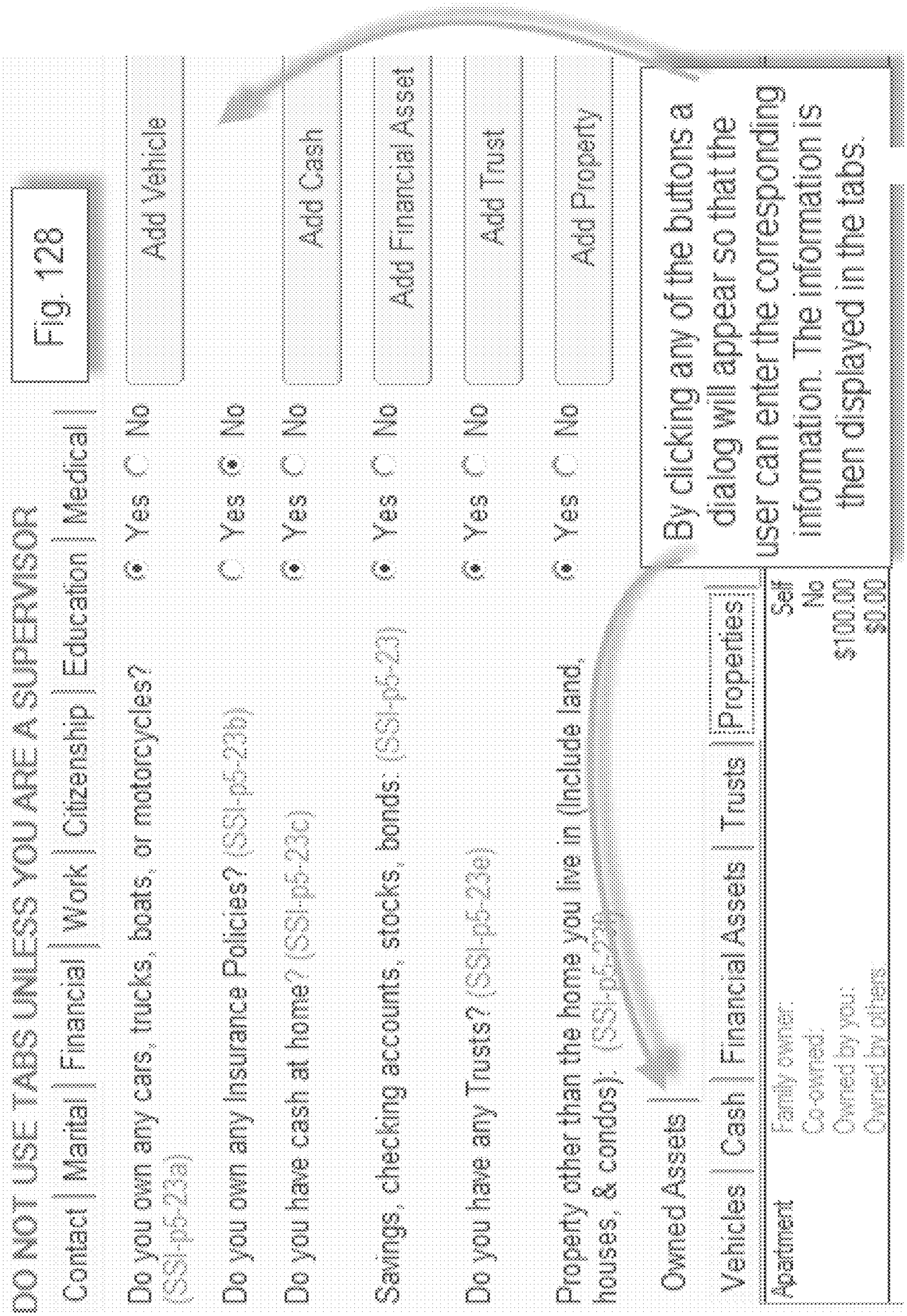
DO NOT USE TABS UNLESS YOU ARE A SUPERVISOR
Contact | Marital | Financial | Work | Citizenship | Education | Medical
Fig. 128
Do you own any cars, trucks, boats, or motorcycles? (SSI-p5-23a)
Yes No
Add Vehicle
Do you own any Insurance Policies? (SSI-p5-23b)
Yes No
Do you have cash at home? (SSI-p5-23c)
Yes No
Add Cash
Savings, checking accounts, stocks, bonds: (SSI-p5-23)
Yes No
Add Financial Asset
Do you have any Trusts? (SSI-p5-23e)
Yes No
Add Trust
Property other than the home you live in (Include land, houses, & condos):
Yes No
Add Property
Owned Assets
Vehicles | Cash | Financial Assets | Trusts | Properties
Apartment
Family owner: Self
Co-owned: No
Owned by you: $100.00
Owned by others: $0.00
By clicking any of the buttons a dialog will appear so that the user can enter the corresponding information. The information is then displayed in the tabs.

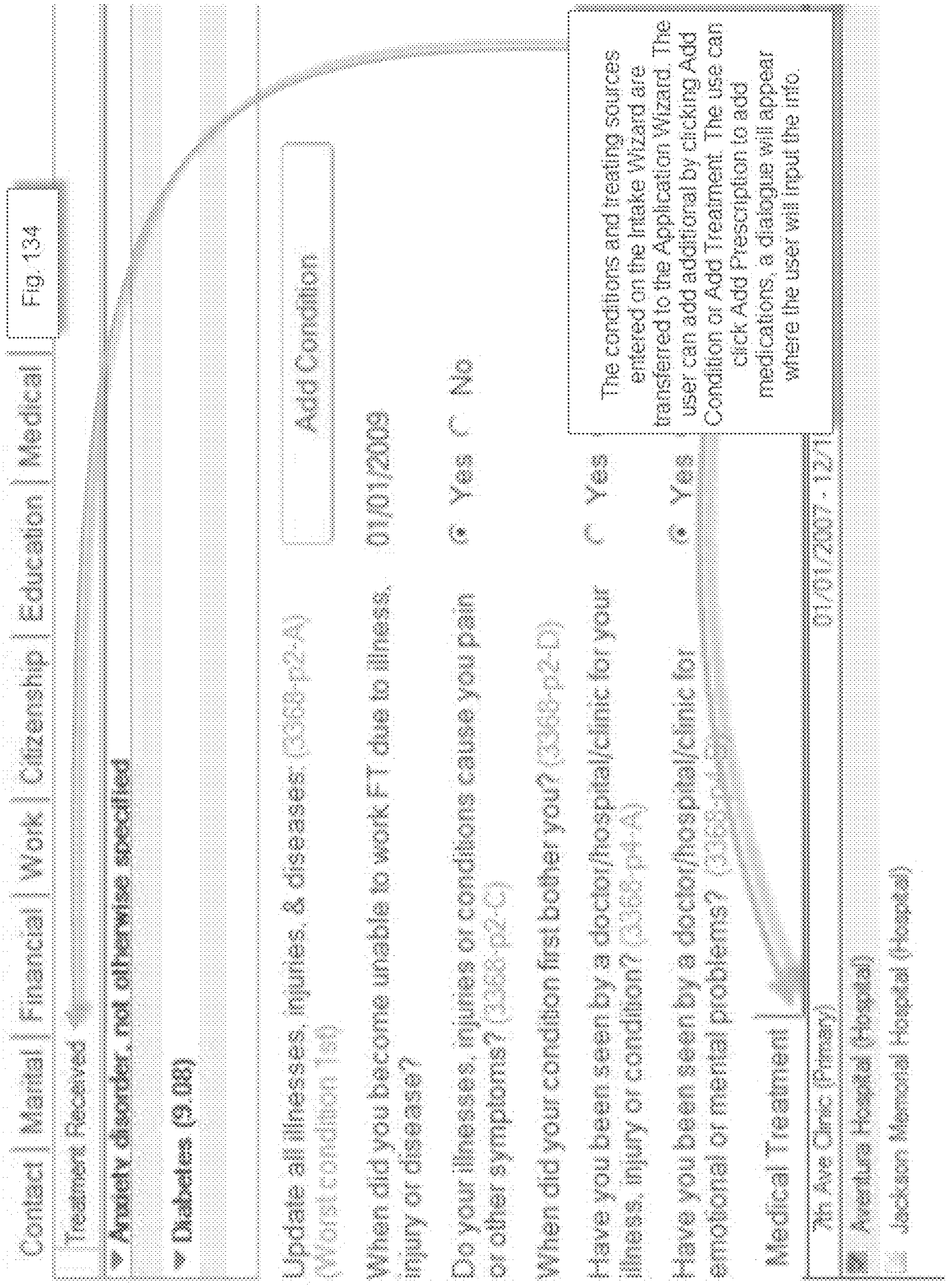
Fig. 134
Contact | Marital | Financial | Work | Citizenship | Education | Medical
Treatment Received
Anxiety disorder, not otherwise specified
Diabetes (9.08)
Update all illnesses, injuries, & diseases: (3368-p2-A)
Worst condition 1st
Add Condition
When did you become unable to work FT due to illness, injury or disease?
01/01/2009
Do your illnesses, injuries or conditions cause you pain or other symptoms? (3368-p2-C)
Yes No
When did your condition first bother you? (3368-p2-D)
Have you been seen by a doctor/hospital/clinic for your illness, injury or condition? (3368-p4-A)
Yes
Have you been seen by a doctor/hospital/clinic for emotional or mental problems?
Yes
Medical Treatment
7th Ave Clinic (Primary)
01/01/2007 - 12/1
Aventura Hospital (Hospital)
Jackson Memorial Hospital (Hospital)
The conditions and treating sources entered on the Intake Wizard are transferred to the Application Wizard. The user can add additional by clicking Add Condition or Add Treatment. The use can click Add Prescription to add medications, a dialogue will appear where the user will input the info.

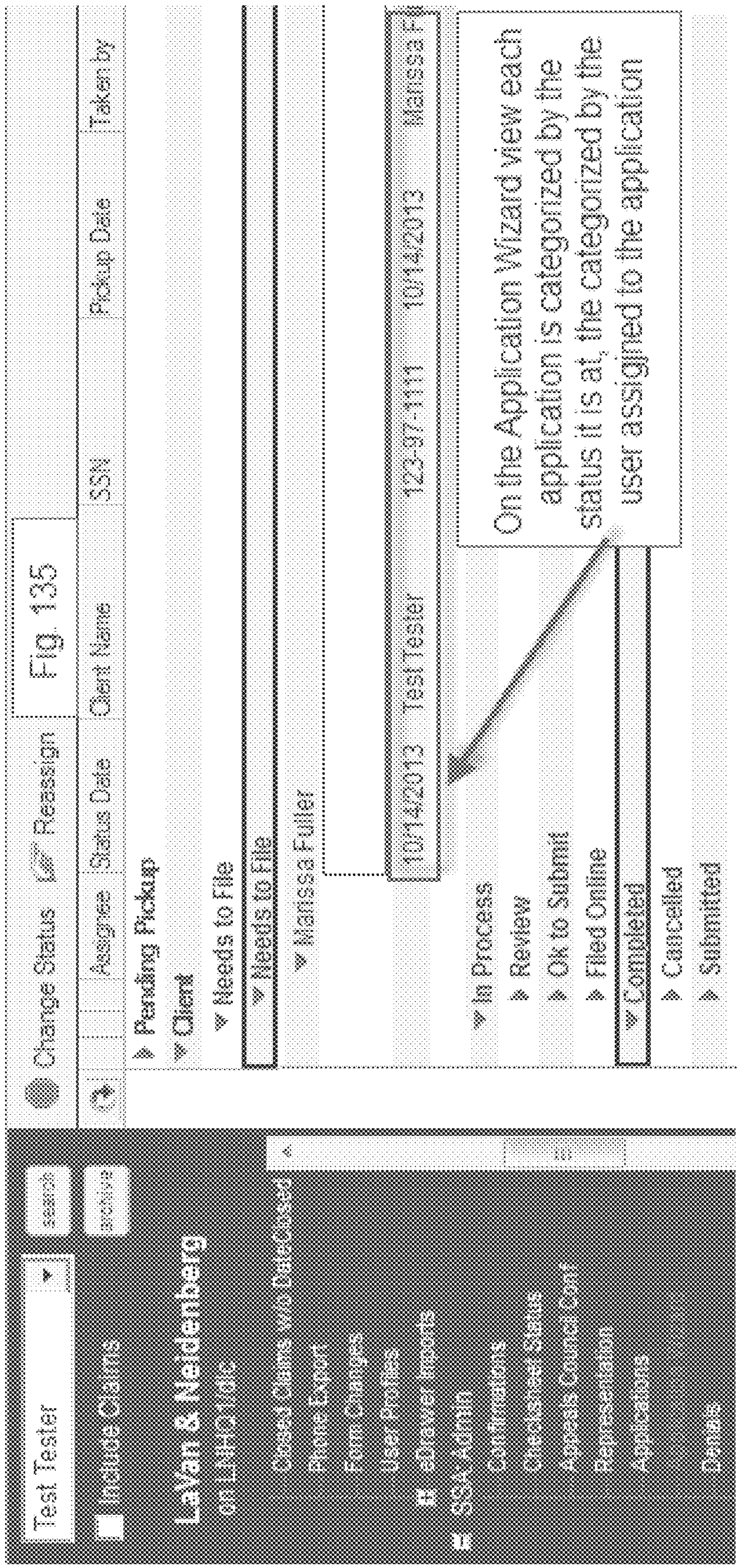
Fig 135
Test Tester
Include Claims
search
archive
LaVan & Neidenberg
Closed Claims w/o DateClosed
Phone Export
Form Changes
User Profiles
eDrawer Imports
SSA Admin
Confirmations
Checksheet Status
Appeals Council Conf
Representation
Applications
Denials
Change Status
Reassign
Assignee
Status Date
Client Name
SSN
Pickup Date
Taken by
Pending Pickup
Client
Needs to File
Needs to File
Marissa Fuller
10/14/2013
Test Tester
123-97-1111
10/14/2013
Marissa F
In Process
Review
Ok to Submit
Filed Online
Completed
Cancelled
Submitted
On the Application Wizard view each application is categorized by the status it is at, the categorized by the user assigned to the application

Fig. 139

CD Landing Page - Medical Summary Tab

The Medical Summary tab organizes a client's medical history, including doctors and facilities that have treated the client, the dates of treatment, and the status of whether such medical records have been requested, received, reviewed, and submitted. Helpful icons, subheadings, and notations keep useful information organized and user friendly.

This printscreen is the Landing Page for the Case Developers (CDs).

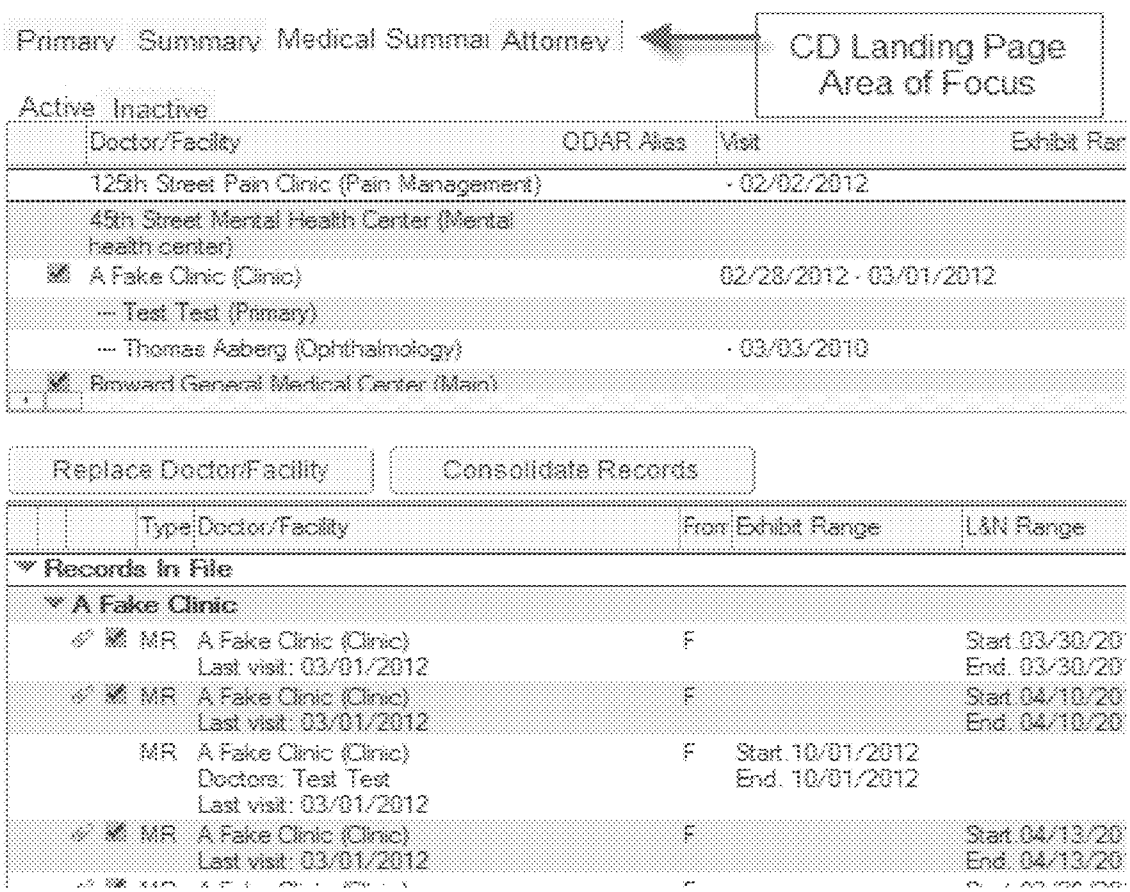

When user right clicks on any "Forms", the following menu will appear

Definitions of Preview File and Replace Doctor/Facility

When user right clicks on any entry from the doctors and facilities, the following menu will appear.

Allows user to add a Comment to a Doctor/Facility

Fig. 146

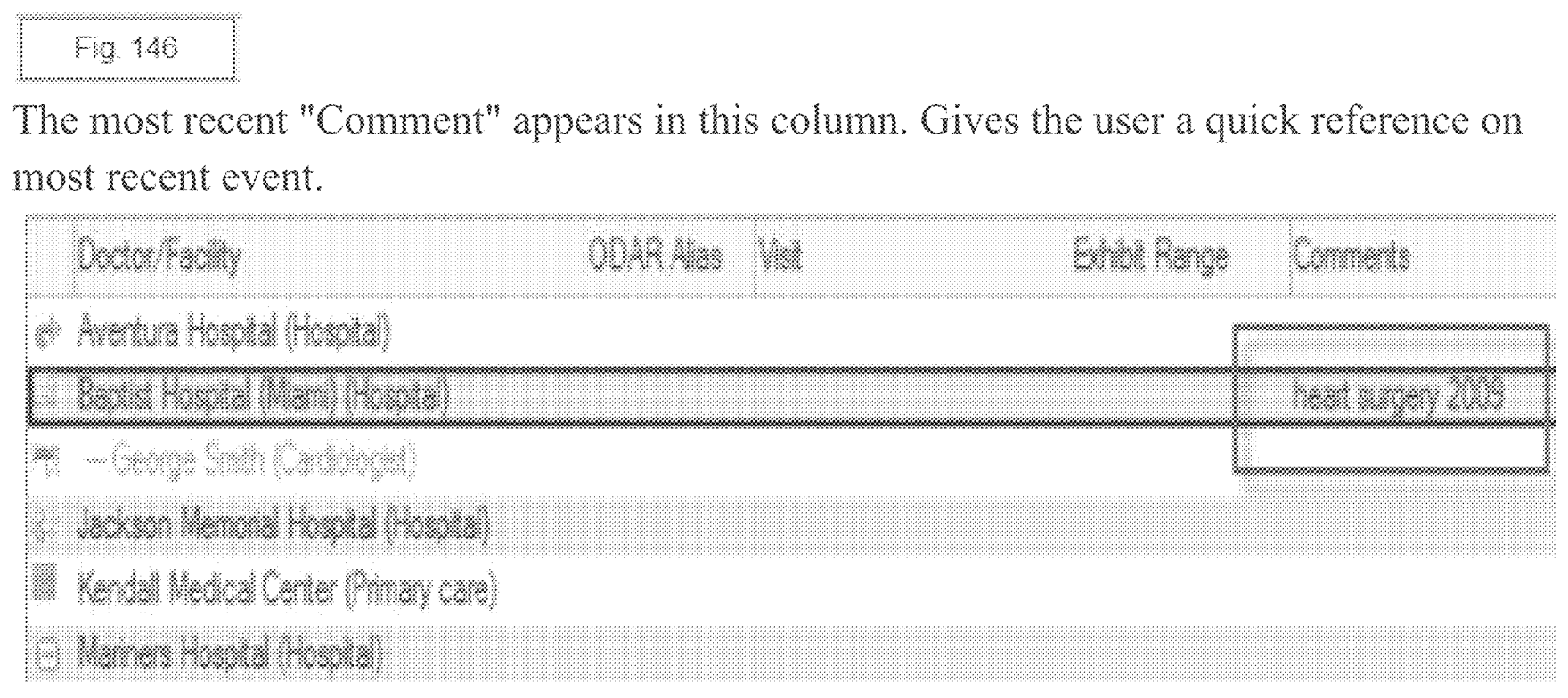

The most recent "Comment" appears in this column. Gives the user a quick reference on most recent event.

| Doctor/Facility | ODAR Alias | Visit | Exhibit Range | Comments |
|---|---|---|---|---|
| Aventura Hospital (Hospital) | | | | |
| Baptist Hospital (Miami) (Hospital) | | | | heart surgery 2009 |
| --George Smith (Cardiologist) | | | | |
| Jackson Memorial Hospital (Hospital) | | | | |
| Kendall Medical Center (Primary care) | | | | |
| Mariners Hospital (Hospital) | | | | |

When the user selects Show Comments in this dialogue a history of comments will appear History of Comments window.

To prevent duplicate requests users can Consolidate a Doctor to a subset of a facility.

Consolidate view appears, allowing user to merge a Doctor with a Facility.

All previous print screens have related to Active Doctors/Facilities. The following will demonstrate how to move a treating source from Active to Inactive. The Inactive tab helps keep the file organized and current.

User must verify making a Doctor/Facility Inactive by completing the Removal Windows.

The Doctor/Facility now appears on the Inactive Tab.

The user may return the item to the Active Tab.

Fig 156a

Forms

Each record associated with a contact, regardless of its status, will have a corresponding form located on the contact's Medical Summary. The form provides the user with helpful information regarding the record, such as the status of the record and the treating source's contact information. The actual record may be attached to the form and accessible here by the user. The user may also update the form as needed to store additional useful information.

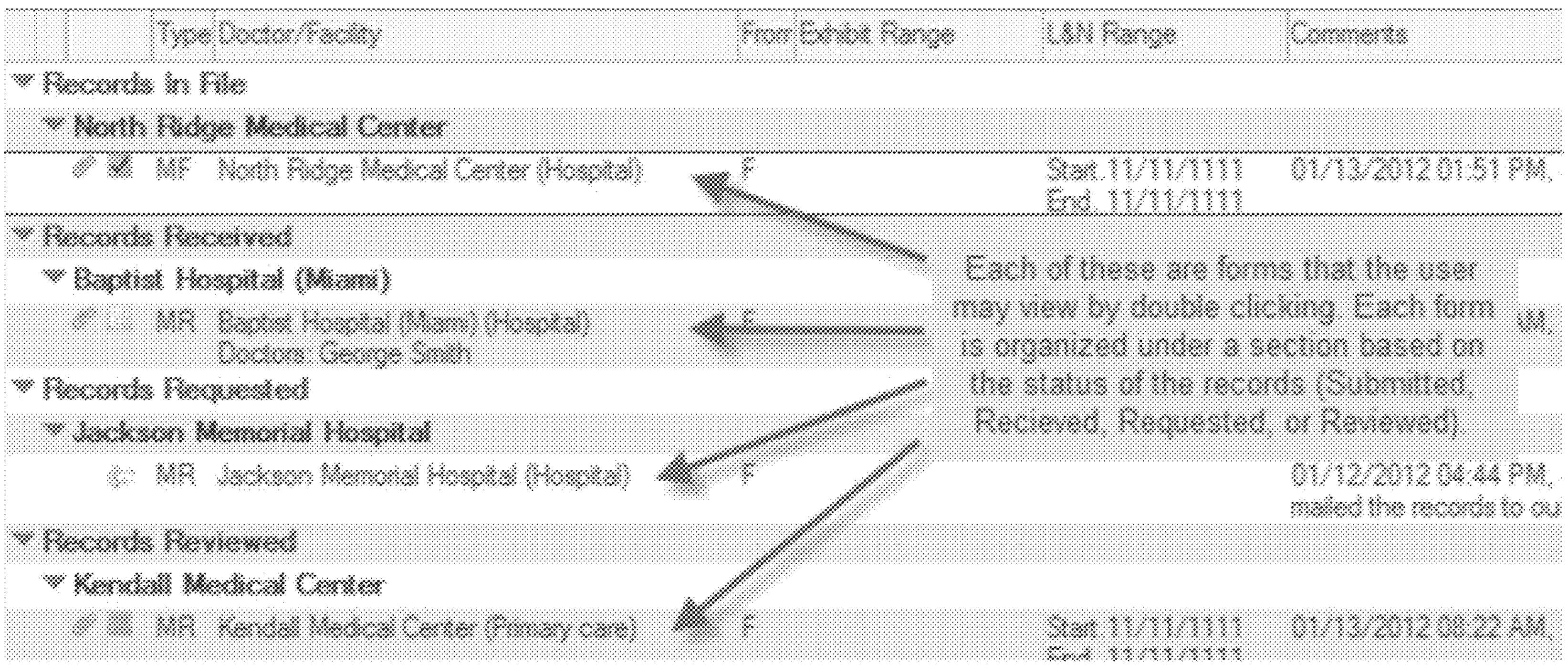

Client's Name, SSN, and DOB
Test Tester, 123-97-1111, 01/01/1955 12:00:00
Medical Record (Requested) - Requested
6015-Blue
Record's status
Tool bar with buttons that perform different functions
Receive Invoice
Receive File
Follow-Up Note
Basic Information
Created by
Request Date
Request As
Leanna Murraydi
10/23/2013
L&N
Who created the form and when

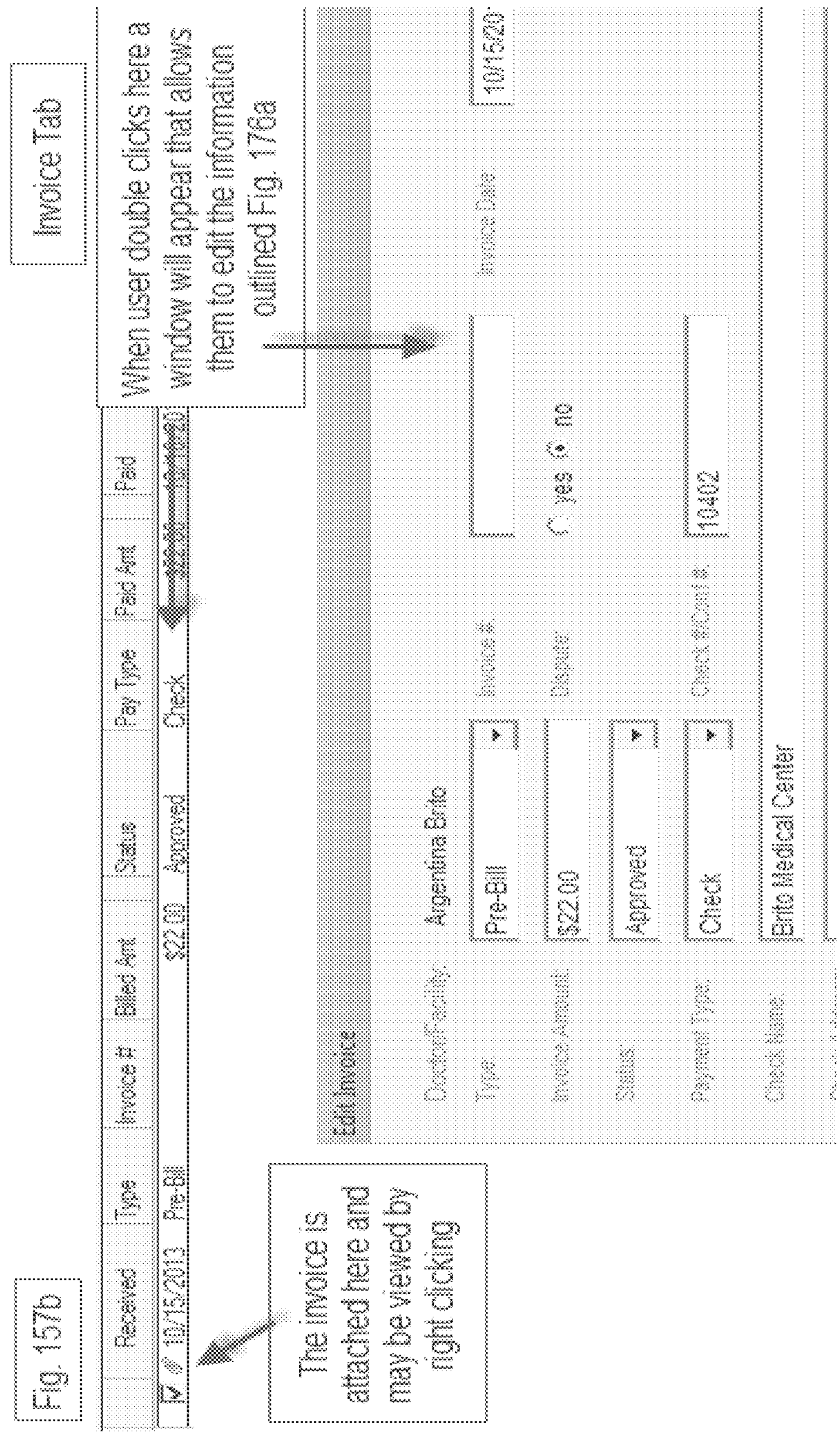
Fig. 157b
Invoice Tab
Received
Type
Invoice #
Billed Amt
Status
Pay Type
Paid Amt
Paid
10/15/2013
Pre-Bill
$22.00
Approved
Check
When user double clicks here a window will appear that allows them to edit the information outlined Fig. 176a
The invoice is attached here and may be viewed by right clicking
Edit Invoice
Doctor/Facility:
Argentina Brito
Type:
Pre-Bill
Invoice #:
Invoice Date
10/15/20
Invoice Amount:
$22.00
Dispute:
yes
no
Status:
Approved
Payment Type:
Check
Check #/Card #:
10402
Check Name:
Brito Medical Center

Fig. 160

Add Physician & Generate Request

The following print screens show how information regarding the medical sources where a contact has received treatment is added to their personal file. Users have access to previously stored information for commonly used treating sources and may update and add to this stored information at any time. The information is used to request medical records for the contact's Social Security disability claim.

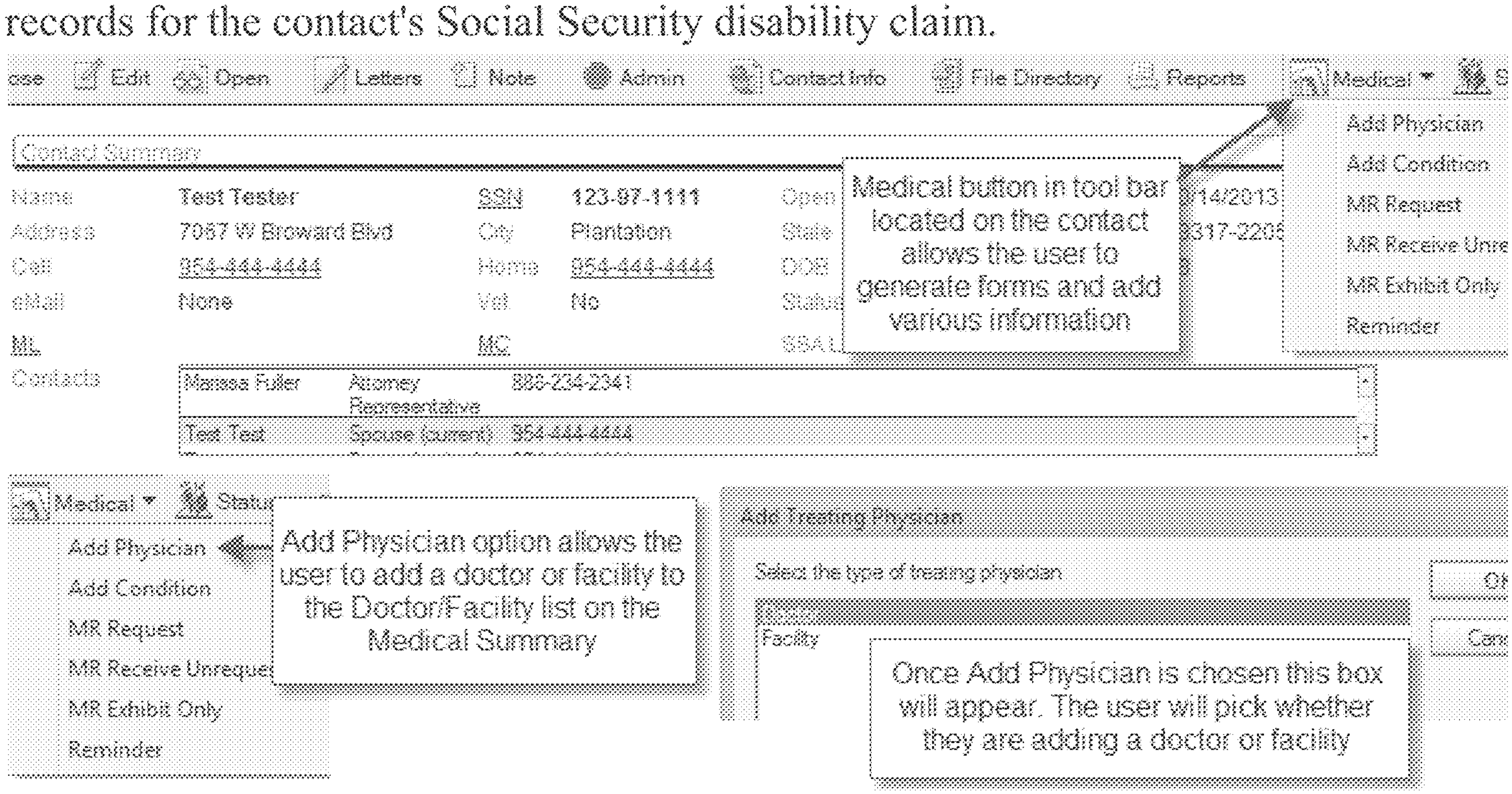

Once Doctor or Facility is chosen this box will appear. The user will enter information about the Doctor/Facility in the corresponding fields. All fields may always be edited.

Edit Treating Physician
Facility
Aventura Hospital
Hospital
Phone numbers & email | Address | Visit information | Exh
Need to request
The Record Status will change to Requested
Edit Treating Physician
Facility
Aventura Hospital
Hospital
Phone numbers & email | Address
Requested

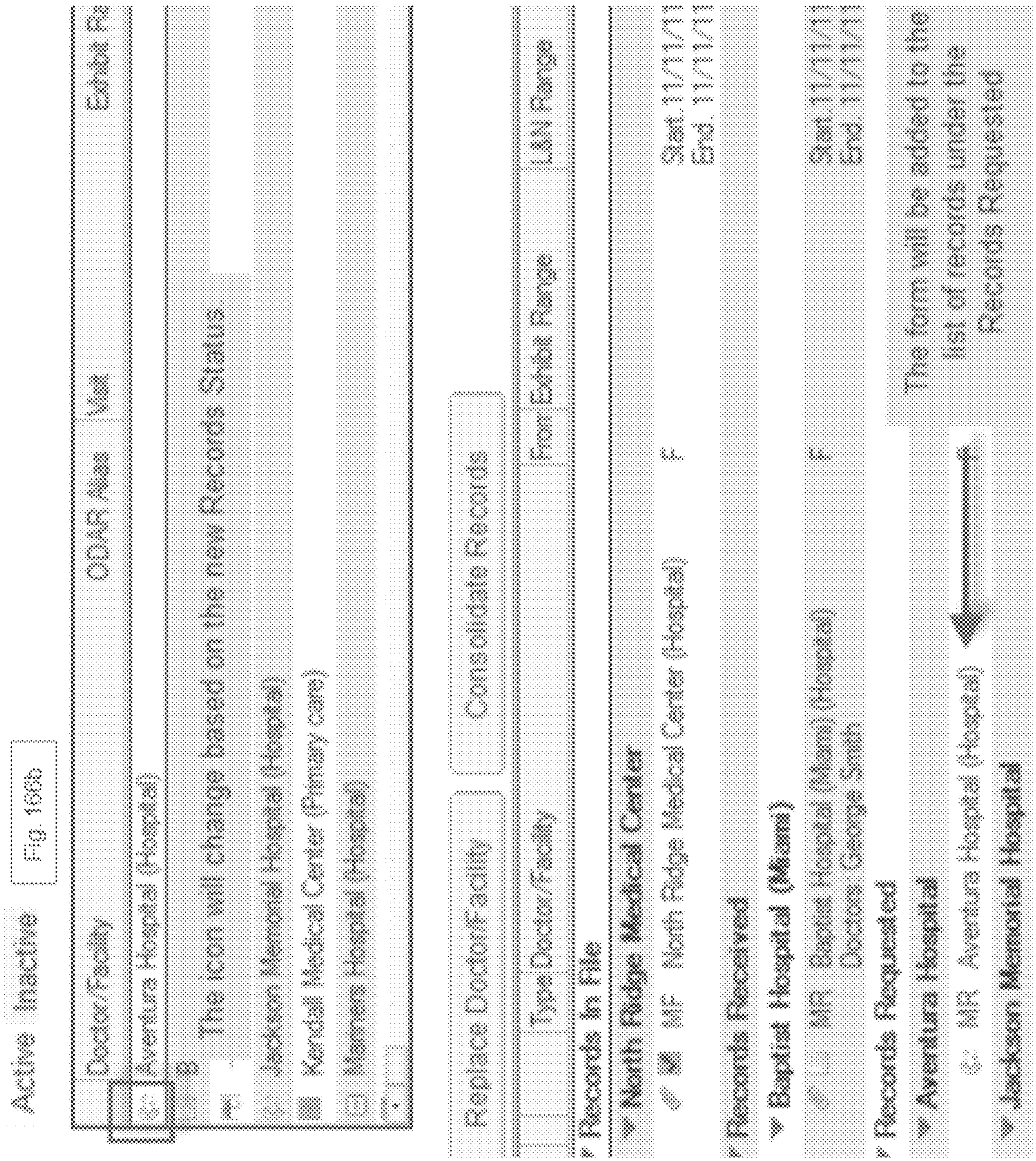
Fig. 166b
Active
Inactive
Doctor/Facility
ODAR Alias
Visit
Aventura Hospital (Hospital)
The icon will change based on the new Records Status
Jackson Memorial Hospital (Hospital)
Kendall Medical Center (Primary care)
Mercy Hospital (Hospital)
Replace Doctor/Facility
Consolidate Records
Type Doctor/Facility
For Exhibit Range
LSN Range
Records In File
North Ridge Medical Center
MR North Ridge Medical Center (Hospital)
Records Received
Baptist Hospital (Miami)
Records Requested
Aventura Hospital
MR Aventura Hospital (Hospital)
Jackson Memorial Hospital
The form will be added to the list of records under the Records Requested

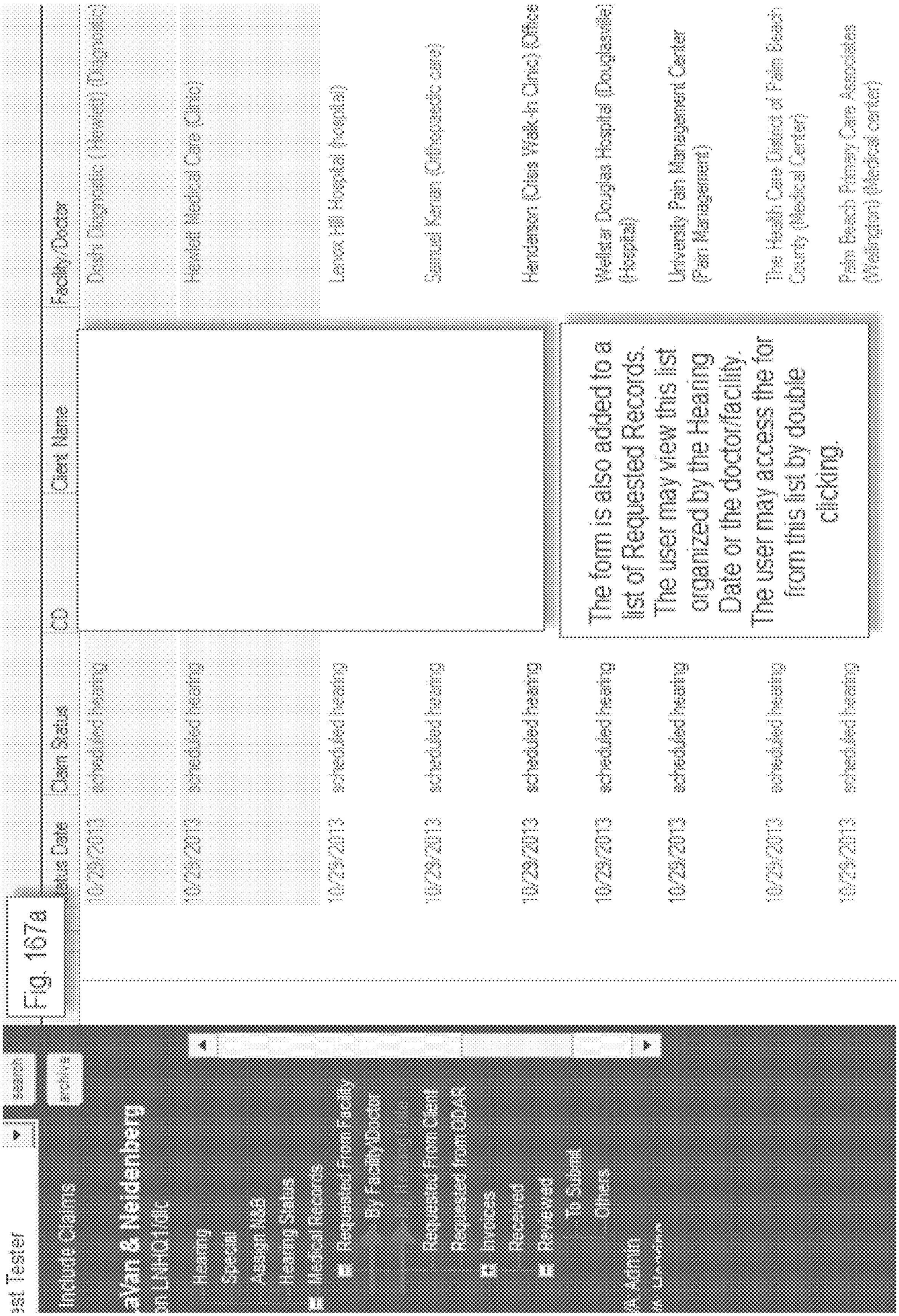

Fig. 167a
Test Tester
search
archive
Include Claims
aVan & Neidenberg
Hearing
Special
Assign IME
Hearing Status
Medical Records
Requested From Facility
By Facility/Doctor
Requested From Client
Requested from OBAR
Invoices
Received
Reviewed
To Submit
Others
Status Date
Claim Status
CD
Client Name
Facility/Doctor
10/29/2013
scheduled hearing
Hewlett Medical Care (Clinic)
Lenox Hill Hospital (hospital)
Samuel Kenan (Orthopaedic care)
Henderson (Cities Walk-In Clinic) (Office
Wellstar Douglas Hospital (Douglasville) (Hospital)
University Pain Management Center (Pain Management)
The Health Care District of Palm Beach County (Medical Center)
Palm Beach Primary Care Associates (Wellington) (Medical center)
The form is also added to a list of Requested Records. The user may view this list organized by the Hearing Date or the doctor/facility. The user may access the for from this list by double clicking.

Summary Tab

The Summary Tab organizes a client's claim information, including application dates, yearly earnings, work history, conditions, and prescriptions. The Summary tab is a quick reference to important claim information.

The following print screens will explain each of the fields that are shown in the yellow box.

File Status: Built is formula selects File Status when a hearing is scheduled. Workflow starts based on File Status e-File: The user fills in this field to indicate whether the Exhibit File is electronic or paper.

Rec'd File: The user sets this field to indicate the date that the Exhibit File was received.

Fig. 171a
Summary
Questionnaire
Primary
Summary
Medical Summar
Attorney
Social Security Claim
File Status
New
Evaluate
e-File
Y-Bar Code
Rec'd File
01/09/2012
Barcode
CD Asgn
RV
11/11/2012
PFD
05/20/2010
Type:
DIB
DLI
03/31/2001
Prior App
DOF
05/20/2010
SSA AOD
02/10/2001
CS Initial
CS Recon
CS Hearing
COB

Initial Call: The user completes this field to indicate the date that the Initial Call was completed.

Fig. 171b
Summary
Questionnaire
Primary
Summary
Medical Summar
Attorney
Social Security Claim
File Status
New
Evaluate
ODAR
Ft. Lauderdale
e-File
Y-Bar Code
Rec'd File
01/09/2012
Barcode
01/09/2012 12:00:00 AM
CD Asgn
RV
Initial Call
11/11/2012
Copy Note
PFD
05/20/2010
Type
DIB
DLI
03/31/2001
GRIDS
Prior App
DOF
05/20/2010
SSA AOD
02/10/2001
L&N AOD
CS Initial
CS Recon
CS Hearing
COB

Copy Reqt: The user completes this field to indicate the date that the Exhibit File was requested.

Fig. 171c
Summary
Questionnaire
Primary
Summary
Medical Summar
Attorney
Social Security Claim
File Status
New
Evaluate
ODAR
Ft. Lauderdale
e-File
Y-Bar Code
Rec'd File
01/09/2012
Barcode
Copy Req'd
01/09/2012 12:00:00 AM
CD Asgn
RV
Initial Call
11/11/2012
PFD
05/20/2010
Type
DIB
DLI
03/31/2001
GRIDS
Prior App
DOF
05/20/2010
SSA AOD
02/10/2001
L&N AOD
CS Initial
CS Recon
CS Hearing
COB

Copy Note: The user completes this field to provide special instructions or notes needed to request the Exhibit File.

Fig. 172a

The following fields are technical aspects of the client's SSA claim.

PFD: This field indicates the Protective Filing Date of the client's application for Social Security Disability

Type: This field indicates the type of disability application that is currently pending

DLI: This field indicates the date in which the client's work credits, acquired by working and paying into Social Security, expire

DOF: This field indicates the date that the current application for disability was filed

Prior App: This field indicates the DOF of a previously filed application that is no longer pending

SSA AOD: The Alleged Onset Date, the date the client says they became disabled, according to Social Security

L&N AOD: This field indicates the AOD that the CDs select to determine the request range for medical records The user may edit this section by clicking on the paper/pencil icon in the top right corner This print screen shows the earnings box. The client's earnings record is included in the Exhibit File and is important for determining SSA Disability eligibility. The user enters the information by clicking on this icon.

Fig. 173a
Summary Questionnaire
Primary Summary Medical Summar Attorney
Social Security Claim
File Status New Evaluate ODAR Ft. Lauderdale
e-File Y-Bar Code Rec'd File 01/09/2012 Barcode Copy Reqt 01/09/2012 12:00:00 AM
CD Asgn RV Initial Call 11/11/2012 Copy Note
PFD 05/20/2010 Type DIB DLI 03/31/2001 GRIDS
Prior App DOF 05/20/2010 SSA AOD 02/10/2001 L&N AOD
CS Initial CS Recon Complete CS Hearing COB
Click Here
2001 $0.00 2002 $0.00 2003 $0.00 2004 $0.00 2005 $0.00 2006 $0.00
2007 $0.00 2008 $0.00 2009 $0.00 2010 $0.00 2011 2012
Edit Contact Earnings
OK
Cancel

The Job History summary show the clients work history.

The user may edit this information by double clicking on the existing information or by clicking Create.

This print screen shows the Work Benefit box. This box shows the client's tax, Worker's Compensation, Unemployment compensation, and tax history, as well as their highest level of education and incarceration history.

The user may edit this information by double clicking on the existing information. Follow up questions will appear depending on certain answers.

This print screen shows the SSA Claims box. This box shows the Claim Status and LA assigned.

Approved users may edit this information using the Status button in the toll bar on the contact page.

Fig. 178

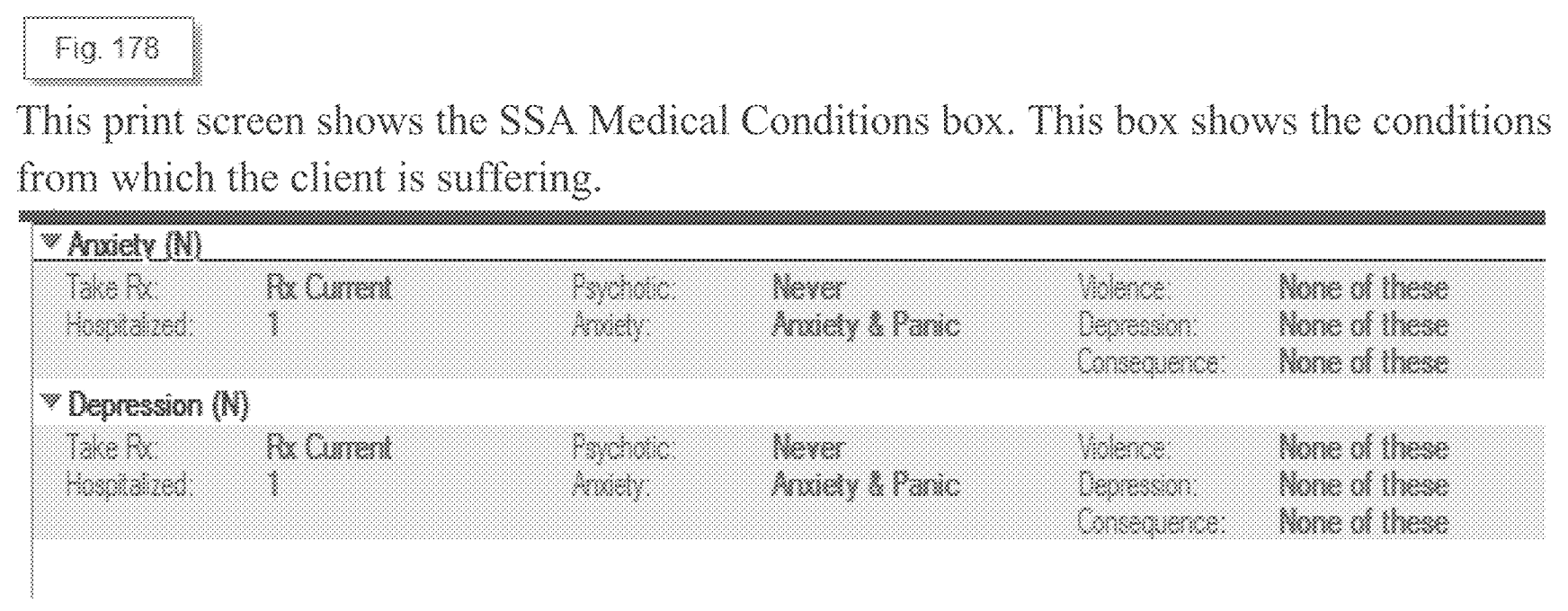

This print screen shows the SSA Medical Conditions box. This box shows the conditions from which the client is suffering.

▼ Anxiety (N)

| | | | | | |
|---|---|---|---|---|---|
| Take Rx: | Rx Current | Psychotic: | Never | Violence: | None of these |
| Hospitalized: | 1 | Anxiety: | Anxiety & Panic | Depression: | None of these |
| | | | | Consequence: | None of these |

▼ Depression (N)

| | | | | | |
|---|---|---|---|---|---|
| Take Rx: | Rx Current | Psychotic: | Never | Violence: | None of these |
| Hospitalized: | 1 | Anxiety: | Anxiety & Panic | Depression: | None of these |
| | | | | Consequence: | None of these |

The SSA Medical Conditions box can be edited by using the right click action "Open Medical Condition" or a new Medical Condition can be added by clicking Add Condition in the toll bar on the contact page.

This print screen shows the Costs box. The Costs box is a quick view of the expenses that were acquired for items used to help the client's case.

This print screen shows the Prescriptions box. The Prescriptions box shows the prescribed medications that the client is currently taking.

The Prescriptions box can be edited by double clicking on an existing medication or clicking Create from the Prescription window.

Attorney Tab

The Attorney Tab organizes the documents that the attorney uses to build the client's case, including medical records (MRs), hearing briefs, and decisions written by Social Security. The print screen is the landing page for Case Developers (CDs).

Attorney tab:

The documents used to build the client's case are organized by subheadings (MRs, Decisions, and L&N Submissions).

A document can be viewed by right clicking on the corresponding paperclip and selecting Preview File.

Above the documents are buttons; Launch Files, Upload File Changes, and Attorney Packet.

The Launch Files button will open all of the documents from the section chosen on the user's computer.

The Upload File Changes button allows the user to upload any changes they made to the files they launched.

The Attorney Packet button generates the documents that the attorney has the client sign at the hearing.

CSR Landing Page

EZ Claim has designed Landing Pages for different departments that are specific to the data they need to view.

The CSR (Client Representative Specialist) Landing Page is designed for the users that take all incoming calls.

The second half of the CSR page consists of the Claim Progression and Tabs that the user can click through to view information regarding the clients claim.

VA Landing Page

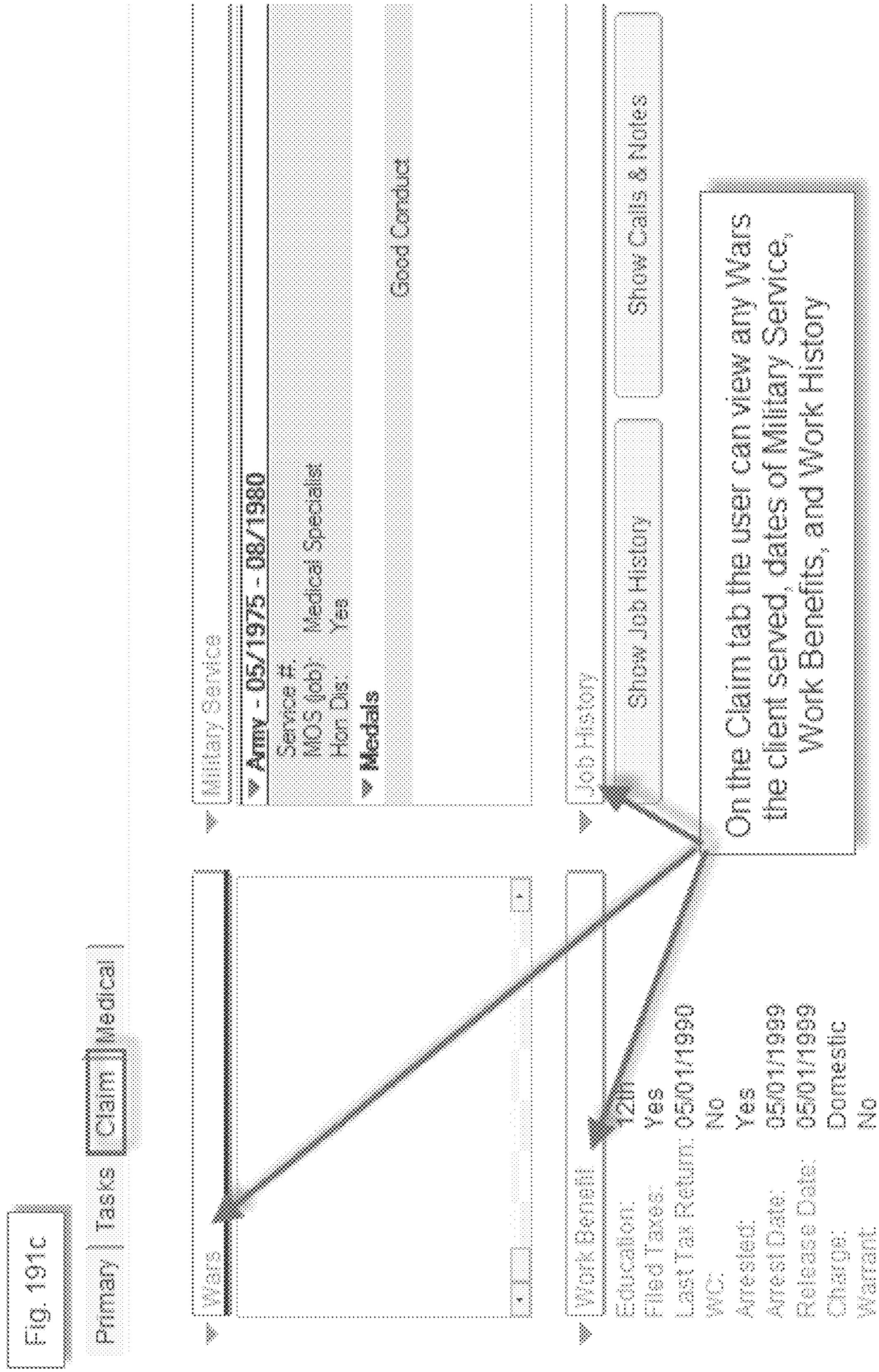
Fig. 191c
Primary
Tasks
Claim
Medical
Wars
Military Service
Army - 05/1975 - 08/1980
Service #:
MOS (job): Medical Specialist
Hon Dis: Yes
Medals
Good Conduct
Work Benefit
Education: 12th
Filed Taxes: Yes
Last Tax Return: 05/01/1990
WC: No
Arrested: Yes
Arrest Date: 05/01/1999
Release Date: 05/01/1999
Charge: Domestic
Warrant: No
Job History
Show Job History
Show Calls & Notes
On the Claim tab the user can view any Wars the client served, dates of Military Service, Work Benefits, and Work History

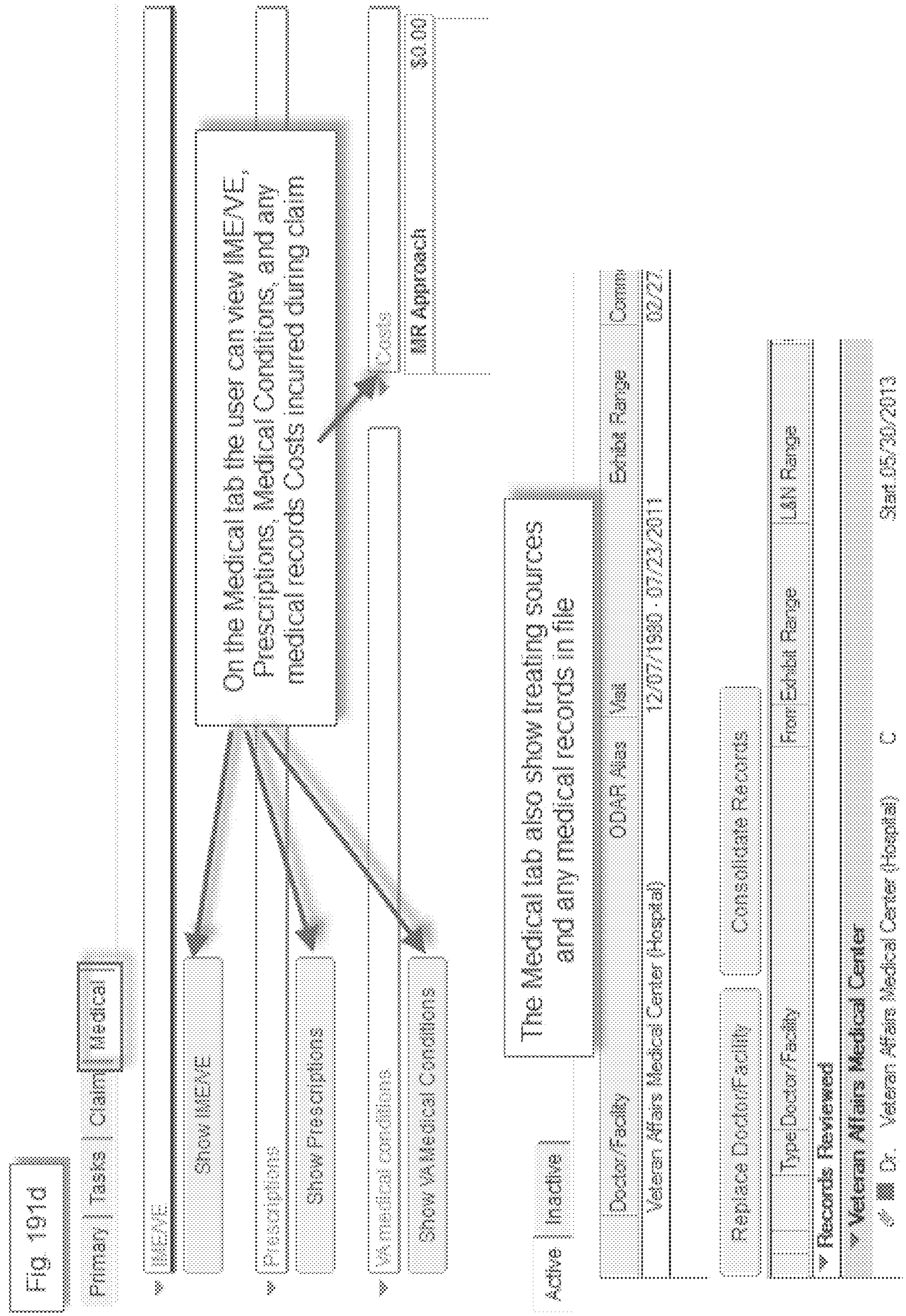
Fig. 191d
Primary | Tasks | Claim | Medical
IME/VE
Show IME/VE
Prescriptions
Show Prescriptions
VA medical conditions
Show VA Medical Conditions
Costs
MR Approach
$0.00
On the Medical tab the user can view IME/VE, Prescriptions, Medical Conditions, and any medical records Costs incurred during claim
The Medical tab also show treating sources and any medical records in file
Active
Inactive
Doctor/Facility
ODAR Alias
Visit
Exhibit Range
Comm
Veteran Affairs Medical Center (Hospital)
12/07/1980 - 07/23/2011
02/27
Replace Doctor/Facility
Consolidate Records
Type Doctor/Facility
From Exhibit Range
L&N Range
Records Reviewed
Veteran Affairs Medical Center
Dr.
Veteran Affairs Medical Center (Hospital)
C
Start 05/30/2013

Calls and Notes

Calls and Notes are used in the database to track what is going in a client's claim. It may describe communication with the client, court, etc. or may describe notes that pertain to the client or claim.

A Note is selected to track Calls and Notes

If the user selects Call then they indicate if it's an Incoming Call or Outgoing Call.

This dialogue will appear for the user to choose from a list who they spoke to and the subject of the call -

Once user clicks OK the user must select a subject and enter the details regarding the Call Note will then appear in clients Calls & Notes shown at the bottom of their claim:

Each user has a "My Assignments" option

To complete the note the user will double click the note:

After clicking "Complete" and "Save" the user will be prompted to enter a follow up note. The note will be entered the same way as explained figures 192 and 193.
To help prevent "user error" we have created a safety list for notes that must have further action taken:

If a note with an asterisk (*) is not assigned it will appear on this view which is checked daily:

Audit History

Audit History tracks changes made throughout the database when a user edits the client's data.

The "Open" button allows the user to toggle back and forth between "Audit History" and "Calls & Notes".

Fig. 197b

The "Audit History" tracks changes such as - Address changes (example in print screen below), name changes, claim status changes, etc.

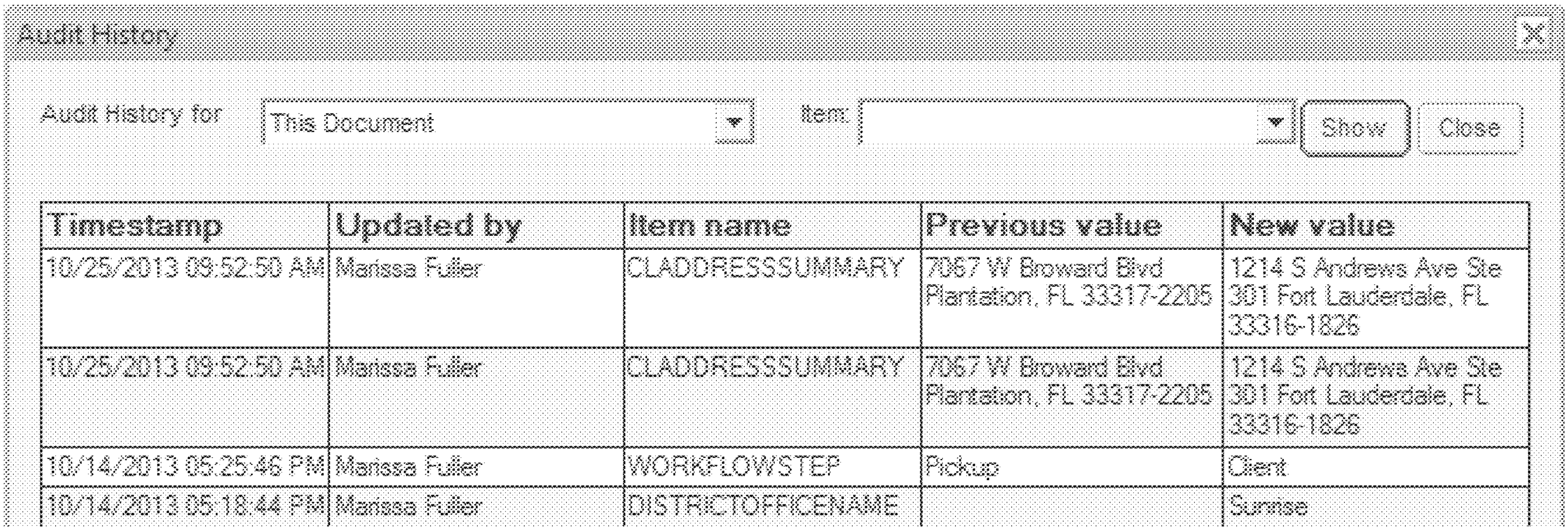

| Timestamp | Updated by | Item name | Previous value | New value |
|---|---|---|---|---|
| 10/25/2013 09:52:50 AM | Marissa Fuller | CLADDRESSSUMMARY | 7067 W Broward Blvd Plantation, FL 33317-2205 | 1214 S Andrews Ave Ste 301 Fort Lauderdale, FL 33316-1826 |
| 10/25/2013 09:52:50 AM | Marissa Fuller | CLADDRESSSUMMARY | 7067 W Broward Blvd Plantation, FL 33317-2205 | 1214 S Andrews Ave Ste 301 Fort Lauderdale, FL 33316-1826 |
| 10/14/2013 05:25:46 PM | Marissa Fuller | WORKFLOWSTEP | Pickup | Client |
| 10/14/2013 05:18:44 PM | Marissa Fuller | DISTRICTOFFICENAME | | Sunrise |

Fig 198
These fields allow the user to filter their search based on the criteria selected:
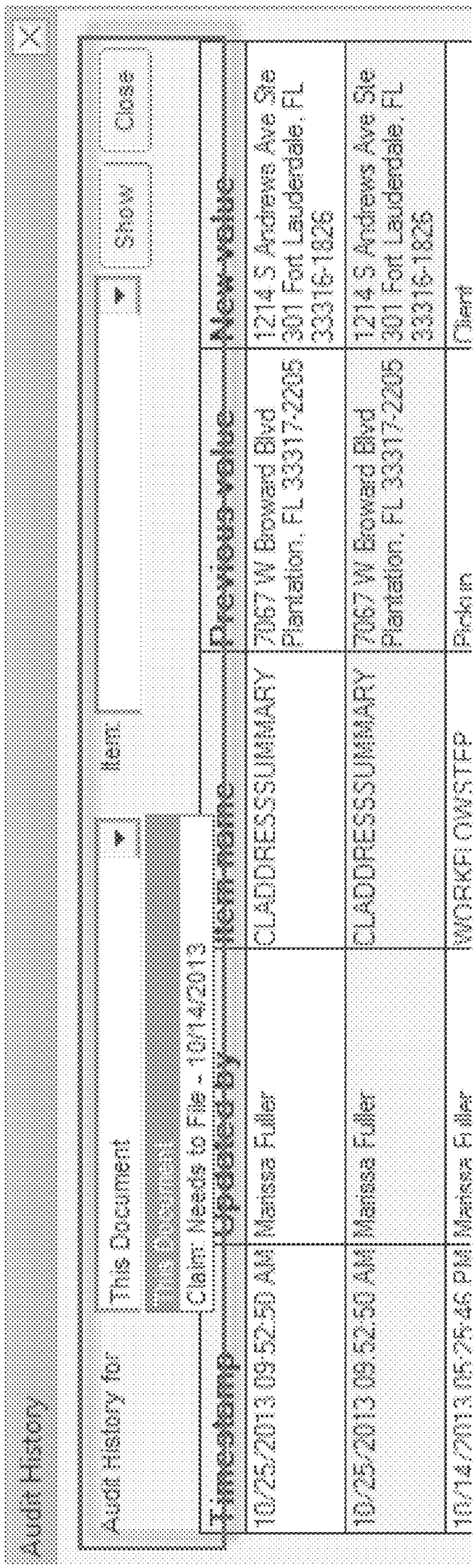
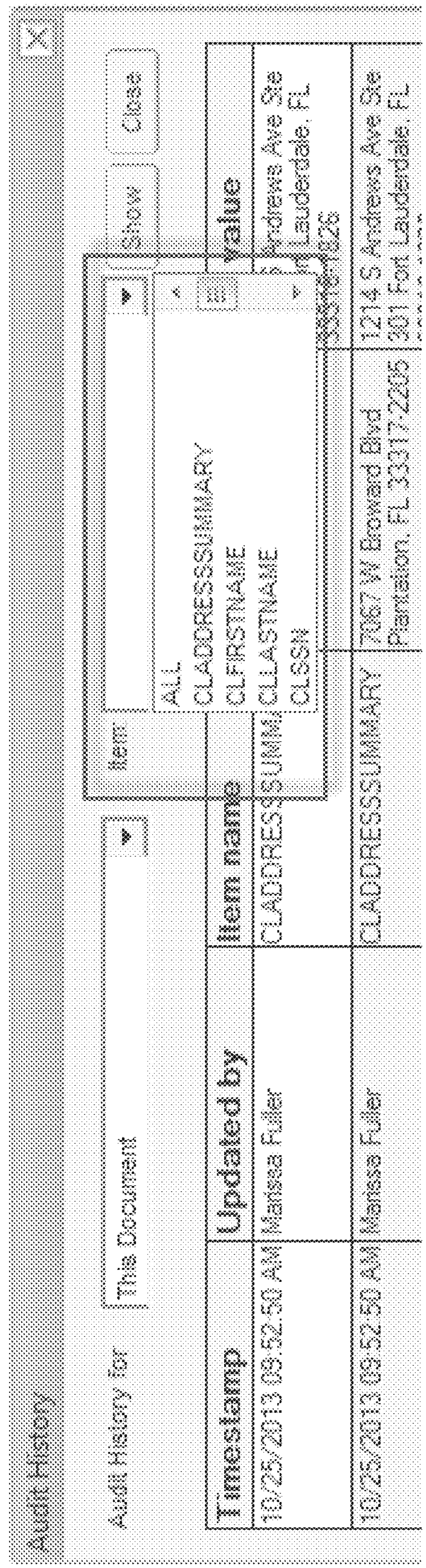

File Directory

Each client has a "File Directory" where all of their incoming and outgoing correspondence is stored.

To access the File Directory:

Fig. 199b

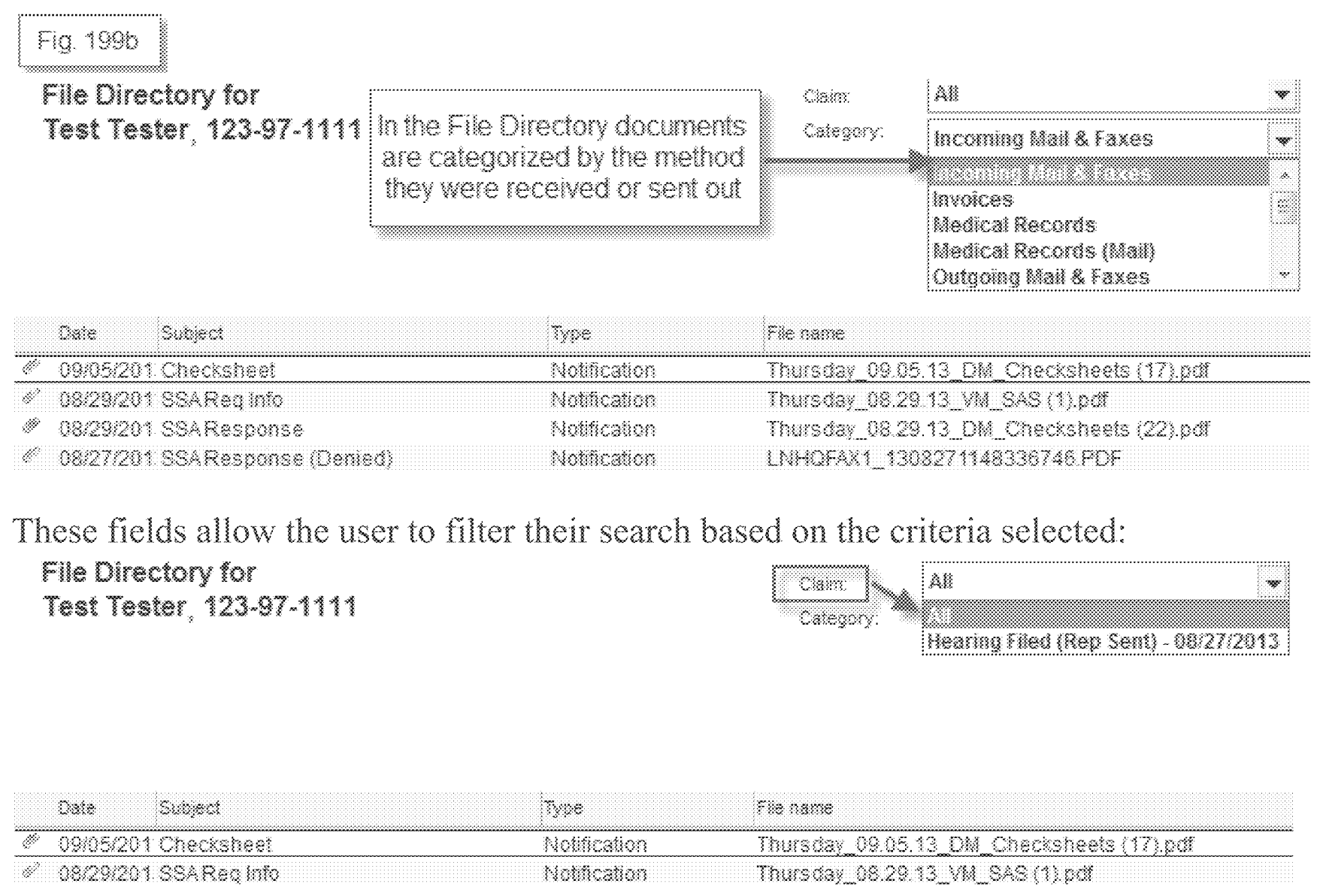

File Directory for
Test Tester, 123-97-1111

In the File Directory documents are categorized by the method they were received or sent out Claim: All Category: Incoming Mail & Faxes Incoming Mail & Faxes
Invoices
Medical Records
Medical Records (Mail)
Outgoing Mail & Faxes

| Date | Subject | Type | File name |
|---|---|---|---|
| 09/05/201 | Checksheet | Notification | Thursday_09.05.13_DM_Checksheets (17).pdf |
| 08/29/201 | SSAReq Info | Notification | Thursday_08.29.13_VM_SAS (1).pdf |
| 08/29/201 | SSAResponse | Notification | Thursday_08.29.13_DM_Checksheets (22).pdf |
| 08/27/201 | SSAResponse (Denied) | Notification | LNHQFAX1_1308271148336746.PDF |

These fields allow the user to filter their search based on the criteria selected:

File Directory for
Test Tester, 123-97-1111

Claim: All

Category:

All
Hearing Filed (Rep Sent) - 08/27/2013

| Date | Subject | Type | File name |
|---|---|---|---|
| 09/05/201 | Checksheet | Notification | Thursday_09.05.13_DM_Checksheets (17).pdf |
| 08/29/201 | SSAReq Info | Notification | Thursday_08.29.13_VM_SAS (1).pdf |

To view or edit documents in the File Directory:

Close
Edit
Delete
Certify Valid Copy
Contact Summary
Subject
Barcode (ODAR - Re Supplied Evidence) Hearing
Comments
Attachment
- LNHQFAX1_130522181
5/23/2013 8:23:12 AM - Created byAlicia Deshazer
By double clicking on an attachment the user can see when the document was imported and by whom. They can also open the document to edit by double clicking on the attachment or by clicking Edit

Fig. 202a

Directory

The Domino Directory allows management to create groups specific to each department. Multiple employees can added into multiple groups. The groups are used to email specific employees at the same time by entering the group name. Workflows are also assigned to correspondence groups - if there are multiple users in one group the workflows that trigger will be evenly distributed among users.

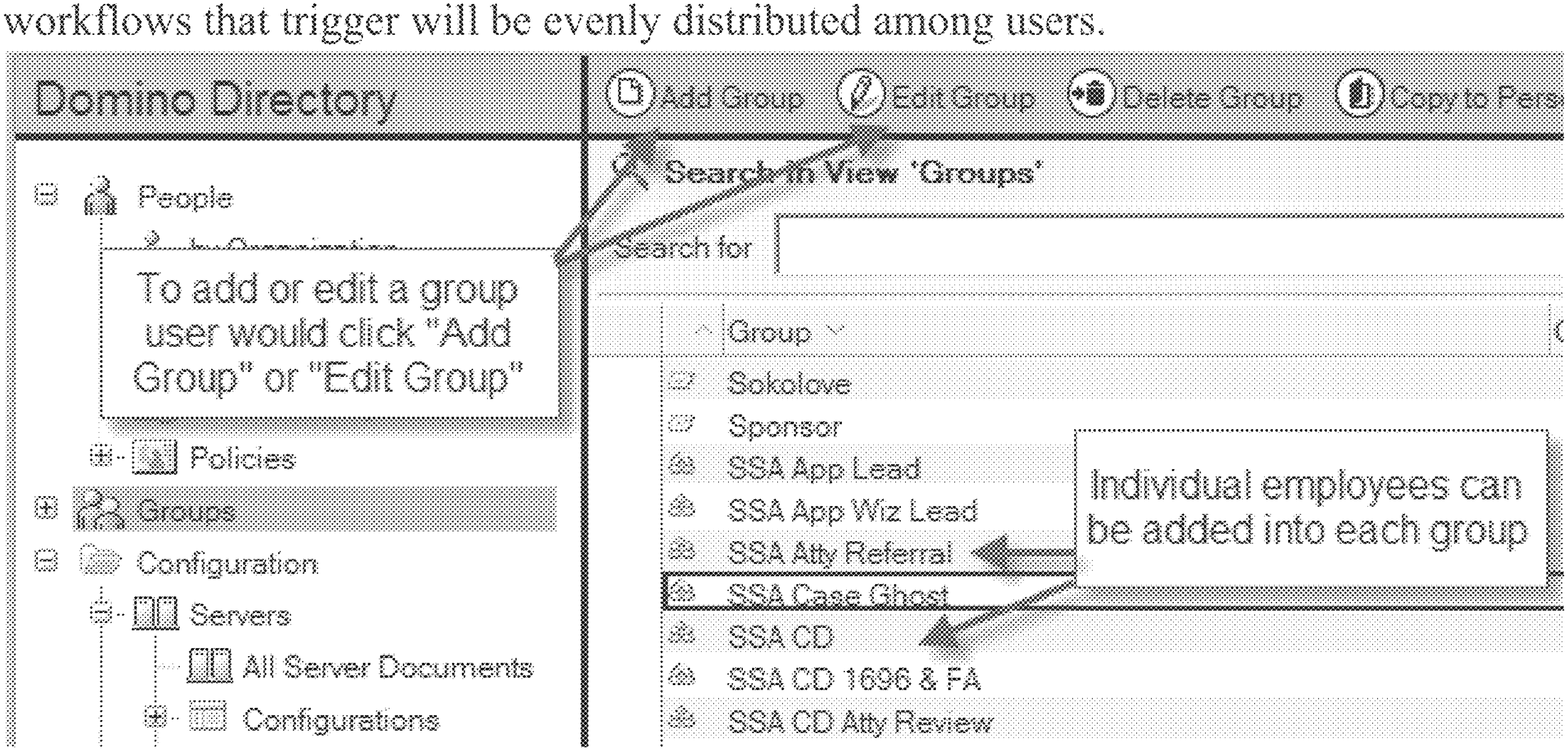

Bulletin Board IM

In addition to using instant message (IM), the firm uses the IM as a bulletin board to allow users to post helpful information to their entire team. As the day progresses each team member can instantly get updated on events and tips that have progressed throughout the day.

Sametime Chat:

Users are able to send a chat to multiple users at one time:

LA Field

The LA Field is assigned to the client. The client's LA Field is assigned to teams within the office based on the client's claim status. In addition, each client's corresponding LA Field is imported into the phone system so the client's phone number is routed to the appropriate team.

Symphony Templates and Bookmarks

To be as time efficient as possible, each department uses template letters that automatically generate clients information using bookmarks or tokens. We currently have 503 templates and 1,240 bookmarks created in the system.

These views show all templates and bookmarks for each department in the office:

Each department creates their templates and they are added into the database by following the steps below:

To create the template the user will open a blank Lotus Symphony Document -

The Law Offices of
LAVAN & NEIDENBERG
{companyLetterhead}
The user will create the letter and add the token bookmarks where the correpsonding information will populate
{currentDate}
Social Security Administration
{districtOfficeAddress}
RE: {clFirstName} {clLastName} / Address Change
SSN: {clSSN}

Fig. 208b
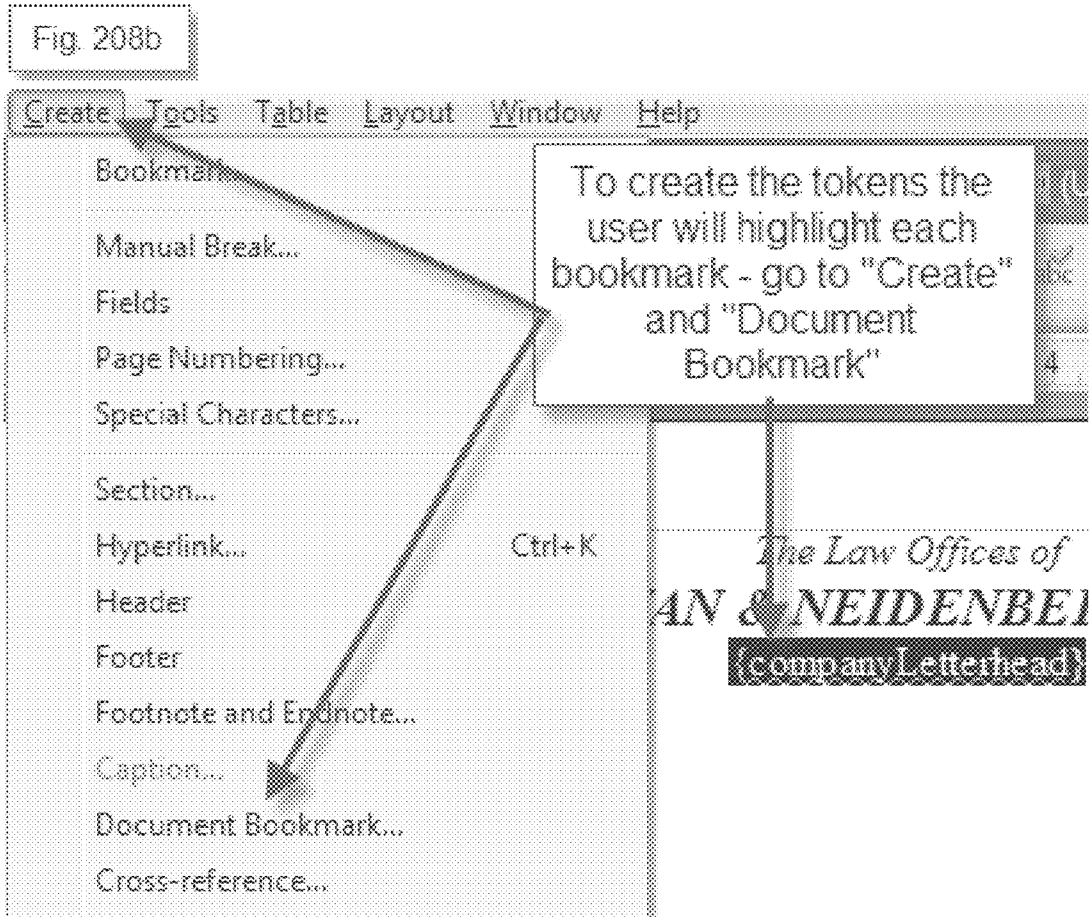
Once the user clicks on "Document Bookmark" a dialogue will appear for them to enter the bookmark name -
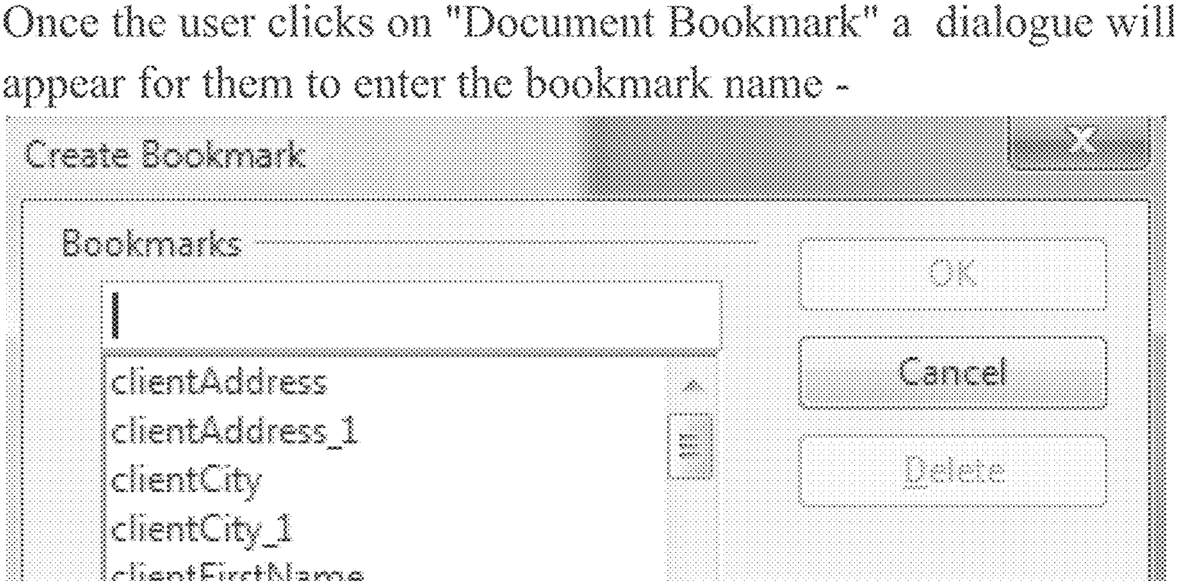

Once the letter is created and all of the bookmarks are entered the user will create the Template:

This dialogue will appear:

Form Type:
Assigned To:
Select Keywords
Keywords
Contact
Claim
OK
Cancel
By clicking on the dropdown arrow for "Form Type" the user can select where the document will visible - on the clients "Contact" page and/or "Claim" page The user will select a letter and click OK - the letter will open and populate the tokens:

Fig. 212b

*The Law Offices of*

*LAVAN & NEIDENBERG, P.A.*

P.O. Box 350038
Fort Lauderdale, FL 33335-0038
Phone: (888) 234-2341; (954) 523-3870
Fax: (954) 523-3871

October 28, 2013

Office of Disability Adjudication & Review
500 E. Broward Blvd, 10th Flr, Ste 1000
Ft. Lauderdale, FL 33394

RE: Test Tester / Address Change
SSN: 123-97-1111

Mail Descriptions

Hundreds of Mail Descriptions have been added to EZ Claim for incoming and outgoing correspondence. Many of the Mail Descriptions include workflows as the start action field, kicking off the workflow as the document is imported. In addition, mail descriptions are used in the Claim Progression to update claim statuses automatically.

By clicking "Add Mail Description" the following dialogue appears

The following print screens explain the dialogue in 4 sections:

Section 1:

Section 2:

Section 3:

Section 4:

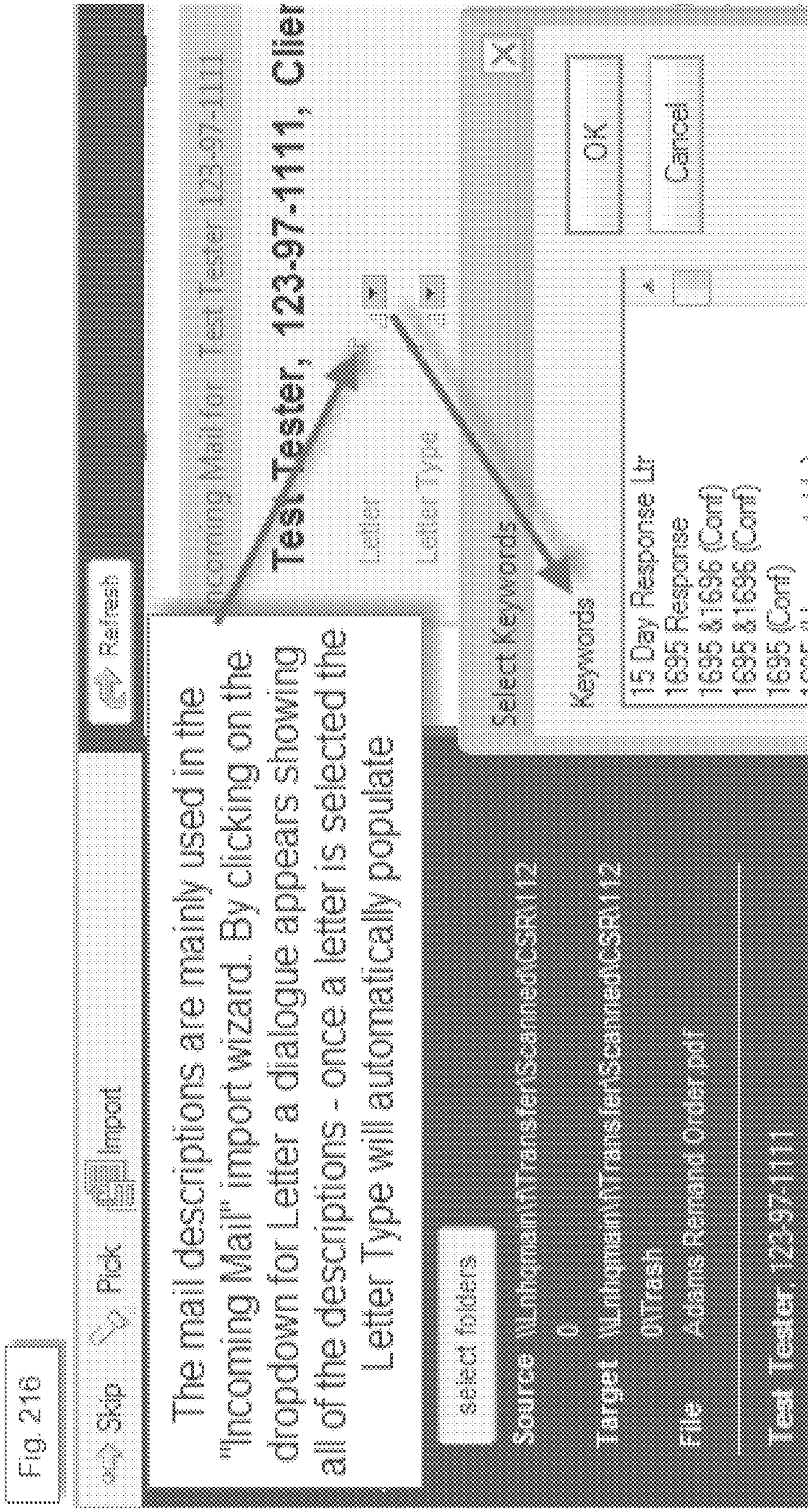
Fig. 216
Skip
Pick
Import
Refresh
The mail descriptions are mainly used in the "Incoming Mail" import wizard. By clicking on the dropdown for Letter a dialogue appears showing all of the descriptions - once a letter is selected the Letter Type will automatically populate
select folders
Source
Target
File
Adams Remand Order.pdf
Test Tester, 123-97-1111
Letter
Letter Type
Select Keywords
Keywords
OK
Cancel
15 Day Response Ltr
1695 Response

Reminders

Reminder codes have been configured in the database to help organize developing a file. The user can assign Reminders and complete Reminders as they are developing a file.

This print screen is the Landing page for CDs.

The Case Development Department Manager can update Reminders on this configuration view Reminders are assigned by the Case Developer in charge of developing that particular case. The Remind are set up to give the Case Developer and team members a snap shot of a case at any time during the process.

To add a Reminder:

After the user clicks on Reminder, a window will appear allowing the user to select the Reminder Type.

Each Reminder Type has a preset list of Reminders to choose from or a Miscellaneous box for the user to type freely.

CLIENT:

A check mark will appear once the user selects the box with the corresponding Reminder.

After the user saves their selection it will appear under Pending Reminders, categorized by Type.

When the item is not longer pending, the Reminder may be moved to the Completed Reminders box.

In this view the Case Developer and team members can see all of the pending cases and instantly know exactly what is remaining to be completed in the case.

Fig. 223

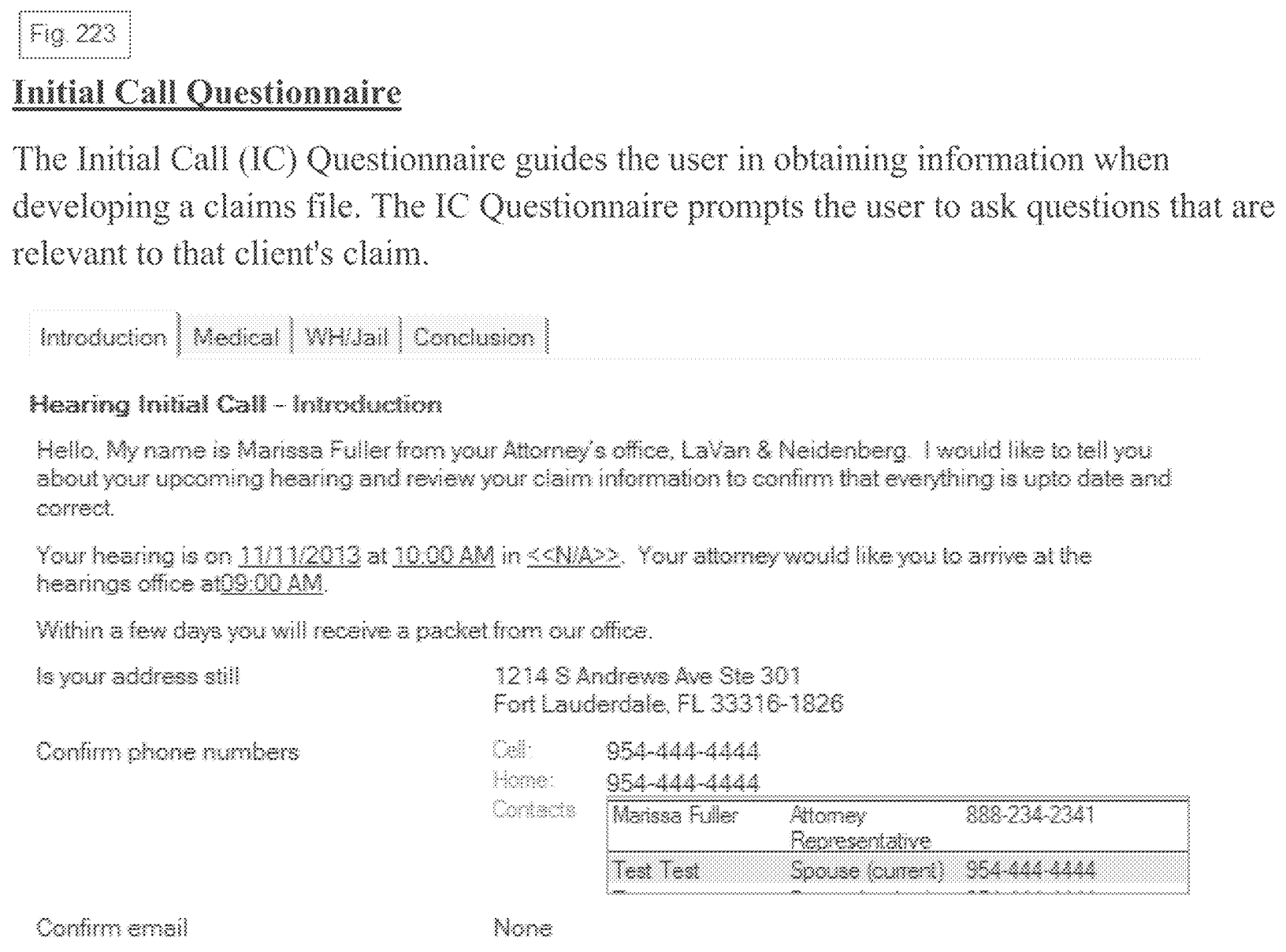

Initial Call Questionnaire

The Initial Call (IC) Questionnaire guides the user in obtaining information when developing a claims file. The IC Questionnaire prompts the user to ask questions that are relevant to that client's claim.

Introduction | Medical | WH/Jail | Conclusion

Hearing Initial Call – Introduction

Hello, My name is Marissa Fuller from your Attorney's office, LaVan & Neidenberg. I would like to tell you about your upcoming hearing and review your claim information to confirm that everything is upto date and correct.

Your hearing is on 11/11/2013 at 10:00 AM in <<N/A>>. Your attorney would like you to arrive at the hearings office at09:00 AM.

Within a few days you will receive a packet from our office.

Is your address still: 1214 S Andrews Ave Ste 301, Fort Lauderdale, FL 33316-1826

Confirm phone numbers:

Cell: 954-444-4444

Home: 954-444-4444

Contacts:

| | | |
|---|---|---|
| Marissa Fuller | Attorney Representative | 888-234-2341 |
| Test Test | Spouse (current) | 954-444-4444 |

Confirm email: None

The IC Questionnaire is divided into 4 tabs: Introduction, Medical, WH/Jail, and Conclusion.

The Introduction tab contains dialogue that prompts the user to explain who they are and why they are calling the client. Hearing and contact information are automatically generated from the contact's Scheduled Hearing box and Contact Summary.

The Medical tab contains questions regarding the client's conditions, treatment, prescriptions, as well as family, drug abuse, and Social Security benefits history.

Fig. 225b

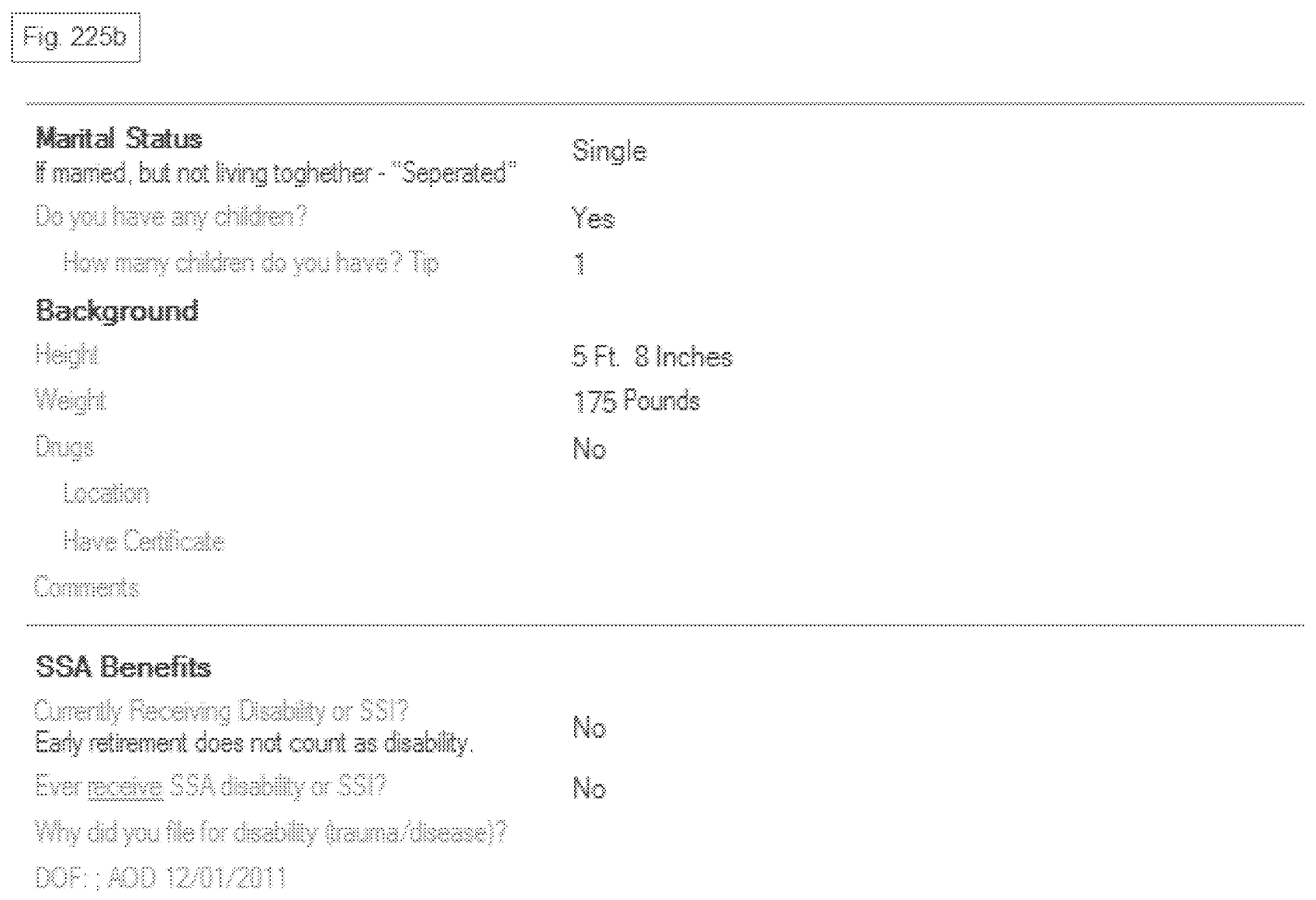

| | |
|---|---|
| **Marital Status**<br>If married, but not living toghether - "Seperated" | Single |
| Do you have any children? | Yes |
| How many children do you have? Tip | 1 |
| **Background** | |
| Height | 5 Ft. 8 Inches |
| Weight | 175 Pounds |
| Drugs | No |
| Location | |
| Have Certificate | |
| Comments | |
| **SSA Benefits** | |
| Currently Receiving Disability or SSI?<br>Early retirement does not count as disability. | No |
| Ever <u>receive</u> SSA disability or SSI? | No |
| Why did you file for disability (trauma/disease)? | |
| DOF: ; AOD 12/01/2011 | |

The WH/Jail tab contains questions regarding the client's education, work history, financial, and incarceration history.

Fig. 227a

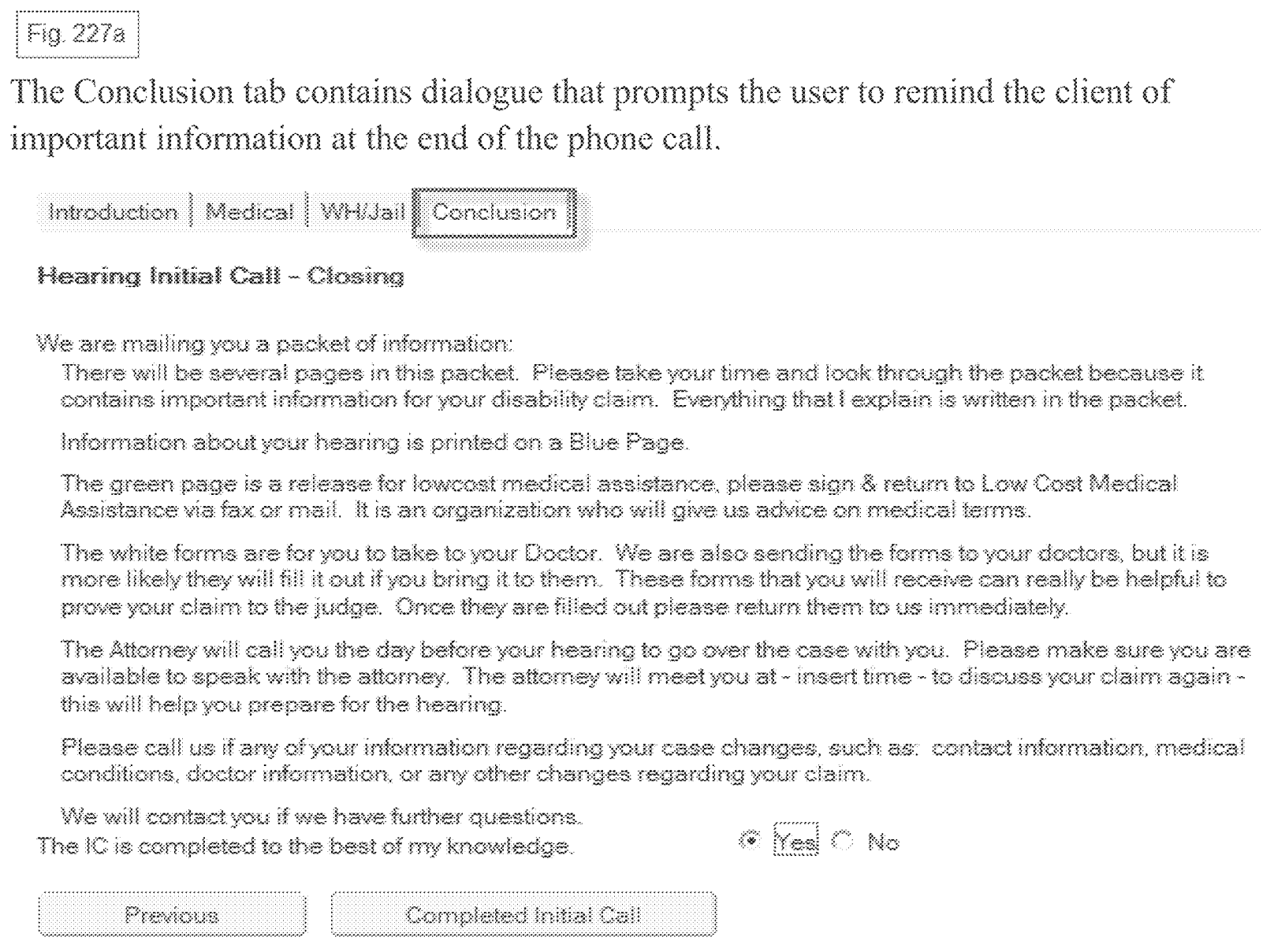

The Conclusion tab contains dialogue that prompts the user to remind the client of important information at the end of the phone call.

Introduction | Medical | WH/Jail | Conclusion

Hearing Initial Call - Closing

We are mailing you a packet of information:

There will be several pages in this packet. Please take your time and look through the packet because it contains important information for your disability claim. Everything that I explain is written in the packet.

Information about your hearing is printed on a Blue Page.

The green page is a release for lowcost medical assistance, please sign & return to Low Cost Medical Assistance via fax or mail. It is an organization who will give us advice on medical terms.

The white forms are for you to take to your Doctor. We are also sending the forms to your doctors, but it is more likely they will fill it out if you bring it to them. These forms that you will receive can really be helpful to prove your claim to the judge. Once they are filled out please return them to us immediately.

The Attorney will call you the day before your hearing to go over the case with you. Please make sure you are available to speak with the attorney. The attorney will meet you at - insert time - to discuss your claim again - this will help you prepare for the hearing.

Please call us if any of your information regarding your case changes, such as: contact information, medical conditions, doctor information, or any other changes regarding your claim.

We will contact you if we have further questions.

The IC is completed to the best of my knowledge. (•) Yes ( ) No

Previous | Completed Initial Call

Fig. 227b
Reports
Medical
Status
Start Task
Initial Call
Hearing
10/14/2013
33316-1828
58
1

The user must enter the edit window in order to complete or edit the IC Questionnaire.

The user may update the client's address or add an additional contact from this window.

When the user clicks "Update Address" this window will appear and the user will follow the prompts to add the new address.

The updated address will appear in the contact from this window

When the user clicks "Add Contact" these windows will appear to add an additional contact.

The additional contact will appear here.

The user may edit the existing contact information from this window by clicking inside the field The user may add or edit the Doctor/Facility list and any of its entries from the following window.

After clicking "Add Treatment" the following windows appear so that the user may add a Doctor or Facility to the Doctor/Facility list.

After the user double clicks on an existing Doctor or Facility, the following window appears so that the user may edit that Doctor or Facilities information.

The user may add or edit the Medical Conditions list.

Medical Conditions List:

When the user clicks "Add Condition" this window appears allowing the user to add a Medical Condition to the list.

The user can select the right click action "Open Medical Condition" on an existing condition. This window appears allowing the user to edit that Medical Condition.

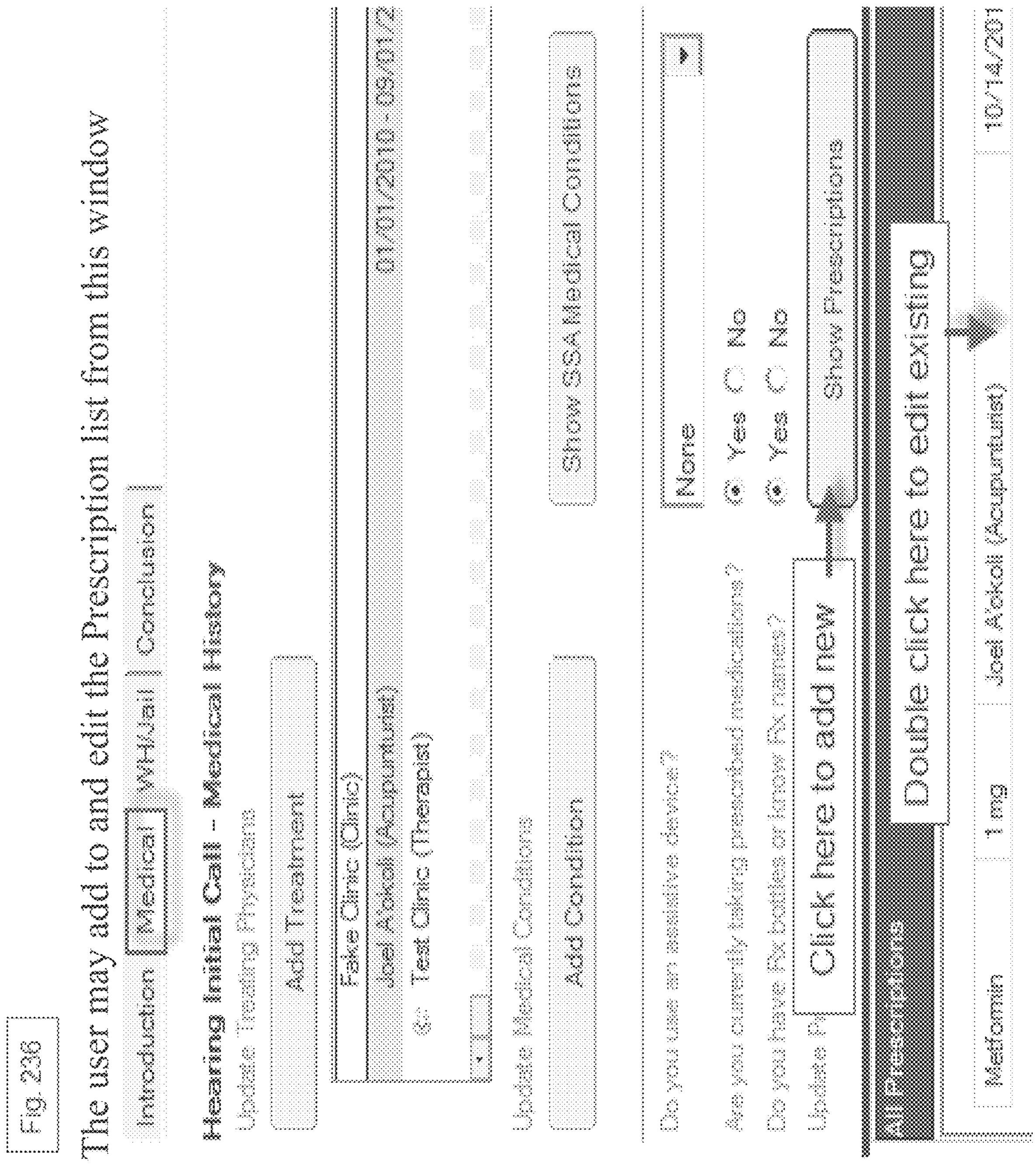
Fig. 236
The user may add to and edit the Prescription list from this window
Introduction
Medical
WH/Jail
Conclusion
Hearing Initial Call - Medical History
Update Treating Physicians
Add Treatment
Fake Clinic (Clinic)
Joel A'okoli (Acupunturist)
01/01/2010 - 05/01/2
Test Clinic (Therapist)
Update Medical Conditions
Add Condition
Show SSA Medical Conditions
Do you use an assistive device?
None
Are you currently taking prescribed medications?
Yes
No
Do you have Rx bottles or know Rx names?
Yes
No
Click here to add new
Show Prescriptions
All Prescriptions
Double click here to edit existing
Metformin
1 mg
Joel A'okoli (Acupunturist)
10/14/201

Prescription List:

When the user clicks "Add Prescription" this window will appear so that the user may add a new prescription to the list.

When the user double clicks an existing prescription, this window will appear so that the user may edit that prescription.

The user may add to or edit the Job History list from this window

Job History list:

After user clicks "Add Job" this window will appear so that the user may add a new job to the list.

After user double clicks on an existing job, this window will appear so that the user may edit that job.

The following print screens show how questions may be answered in the edit window using a drop down, short answer or yes/no check box. They will also show how certain answers prompt the system to ask follow up questions, if the answer does not require follow up questions they remain hidden.

Medical Tab (Continued):

Fig. 246a

SSA Hearing Views - Case Developers

The Case Developers view is used by the Case Developers to keep track of the client's that have a Claim Status of Scheduled Hearing or are Ready to Schedule (RTS). The Case Developers summary prioritizes, organizes, and tracks these clients' cases as well as provides a quick view of what tasks are pending.

The Case Developers view is accessed by clicking on SSA: Hearing > "Case Developers"

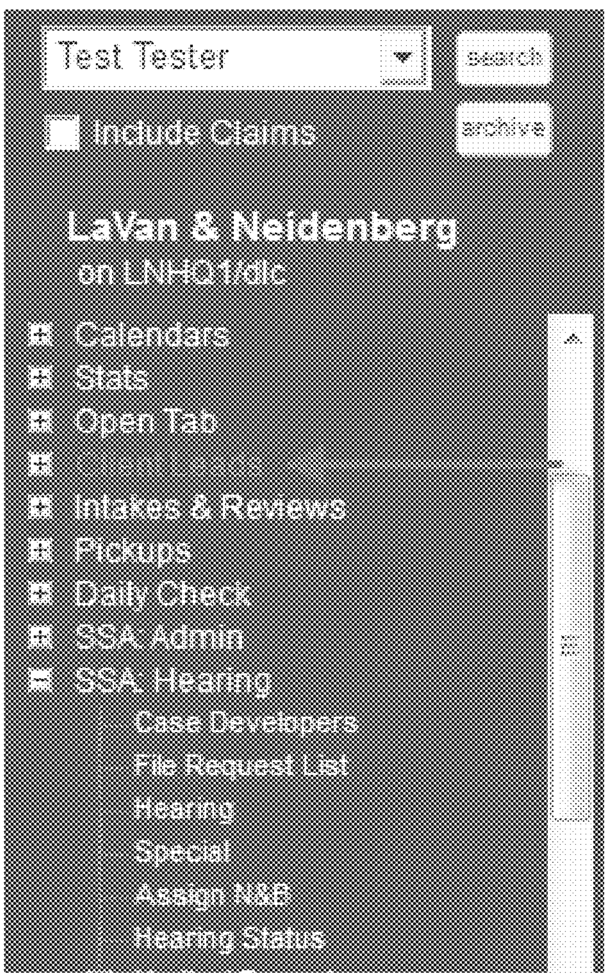

The system organizes all contacts that have an LA field of 6005-Pink, 6006-Yellow, 6015-Blue and a claim status of Scheduled Hearing or RTS on the Case Developer view.

Fig. 247

The Case Developers view has sub-categories that divide the list by the LA field; each LA field indicates a separate Case Development team. This allows each Case Development team to focus only on the cases they are developing.

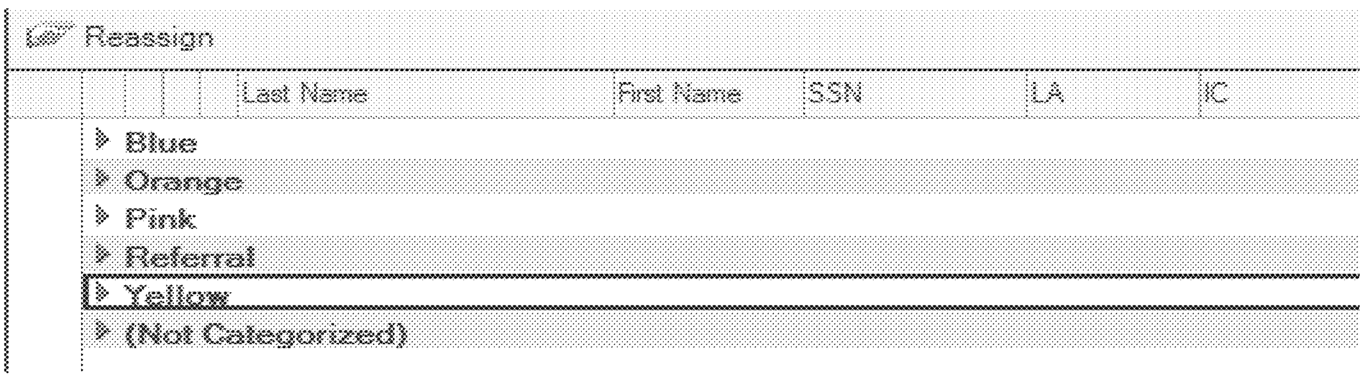

When a case is scheduled for a hearing, the system generally generates a File Status, which identifies which workflow to start. The workflow guides the user through certain steps required to efficiently develop the file.

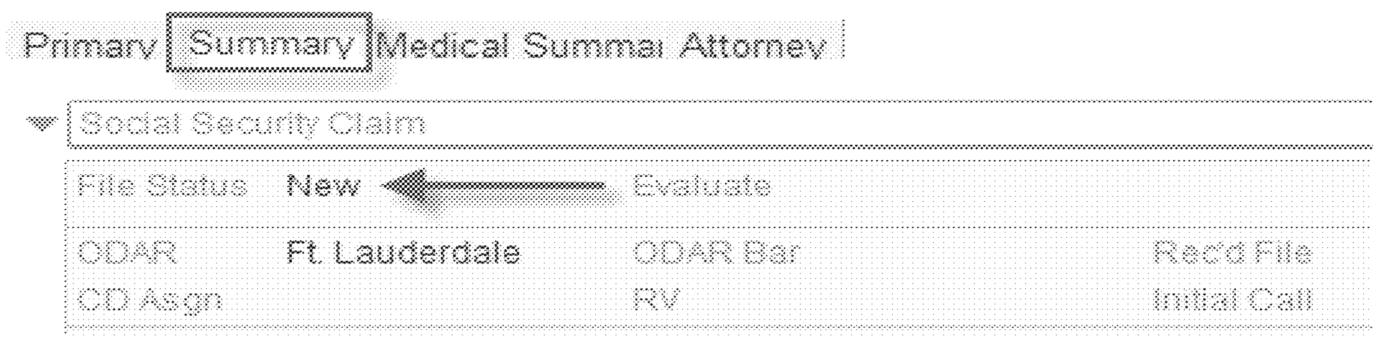

Fig. 249
Each LA Field sub-category is further broken down by Claim Status sub-category, Scheduled Hearing, RTS, etc.
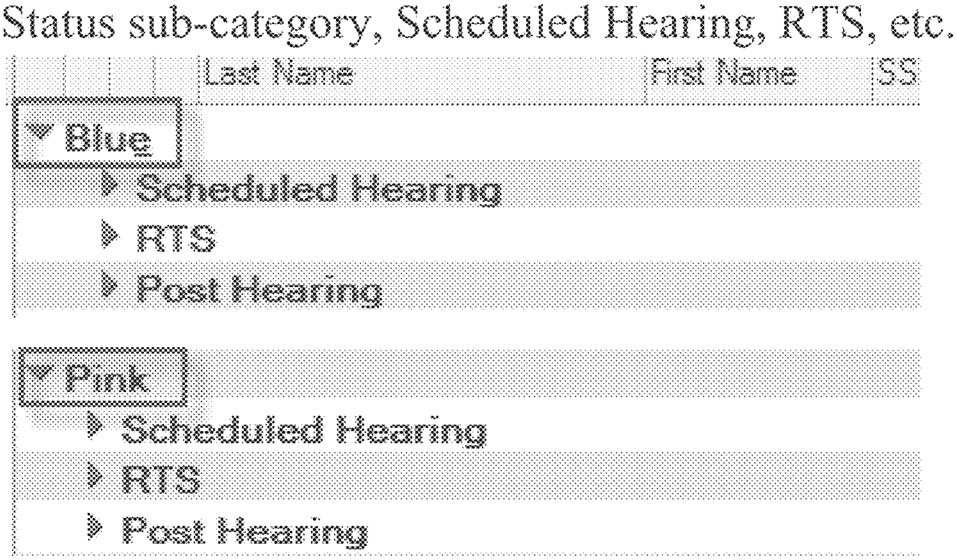
Each Claim Status is further broken down by the Claim Status Date, in ascending order.

The following print screen illustrates the Yellow team (LA field is 6006-Yellow), Claim Status is Scheduled Hearing and Claim Status Date is 12/4/13.

The user may access a client's contact page from the Hearing Summary.

The following print screen shows the Case Developer view. The columns display critical information from the client's Contact page so the user can quickly assess and work on the client's case.

Fig. 253
The following print screens will illustrate where each column gets its information.
Name:
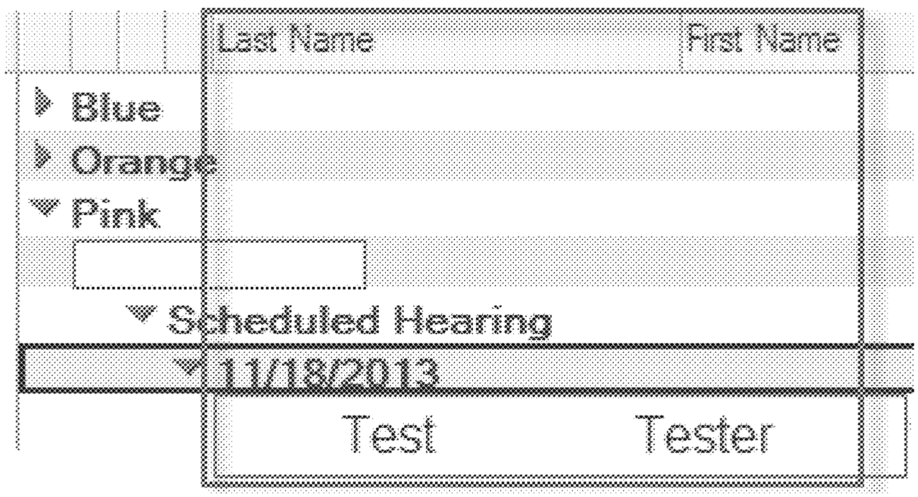

Fig. 258

File Request List

The File Request List is used to organize and track the Client Files that have been added and need to be requested. These files are required to complete the development of each client's case.

The File Request List is accessed by clicking on SSA: Hearing > "File Request List"

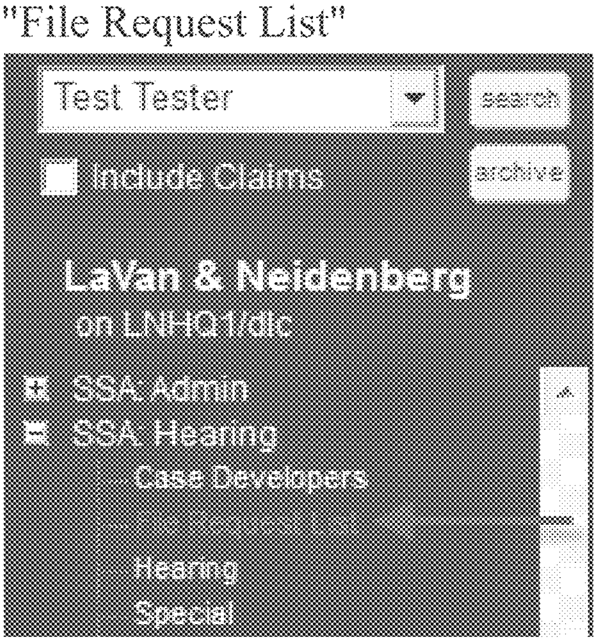

The system places all contacts that have an LA of 6006-Yellow, 6005-Pink, or 6015-Blue on the File Request List.

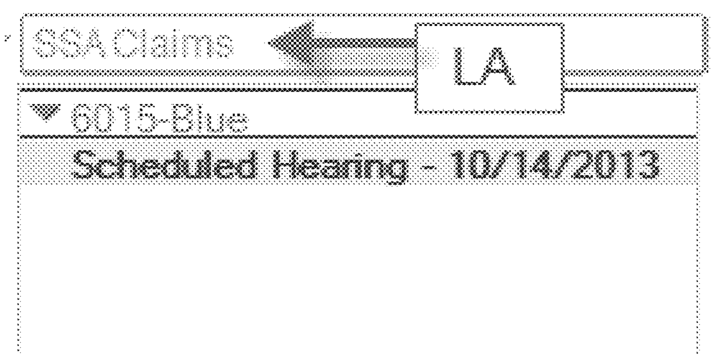

Fig. 259a

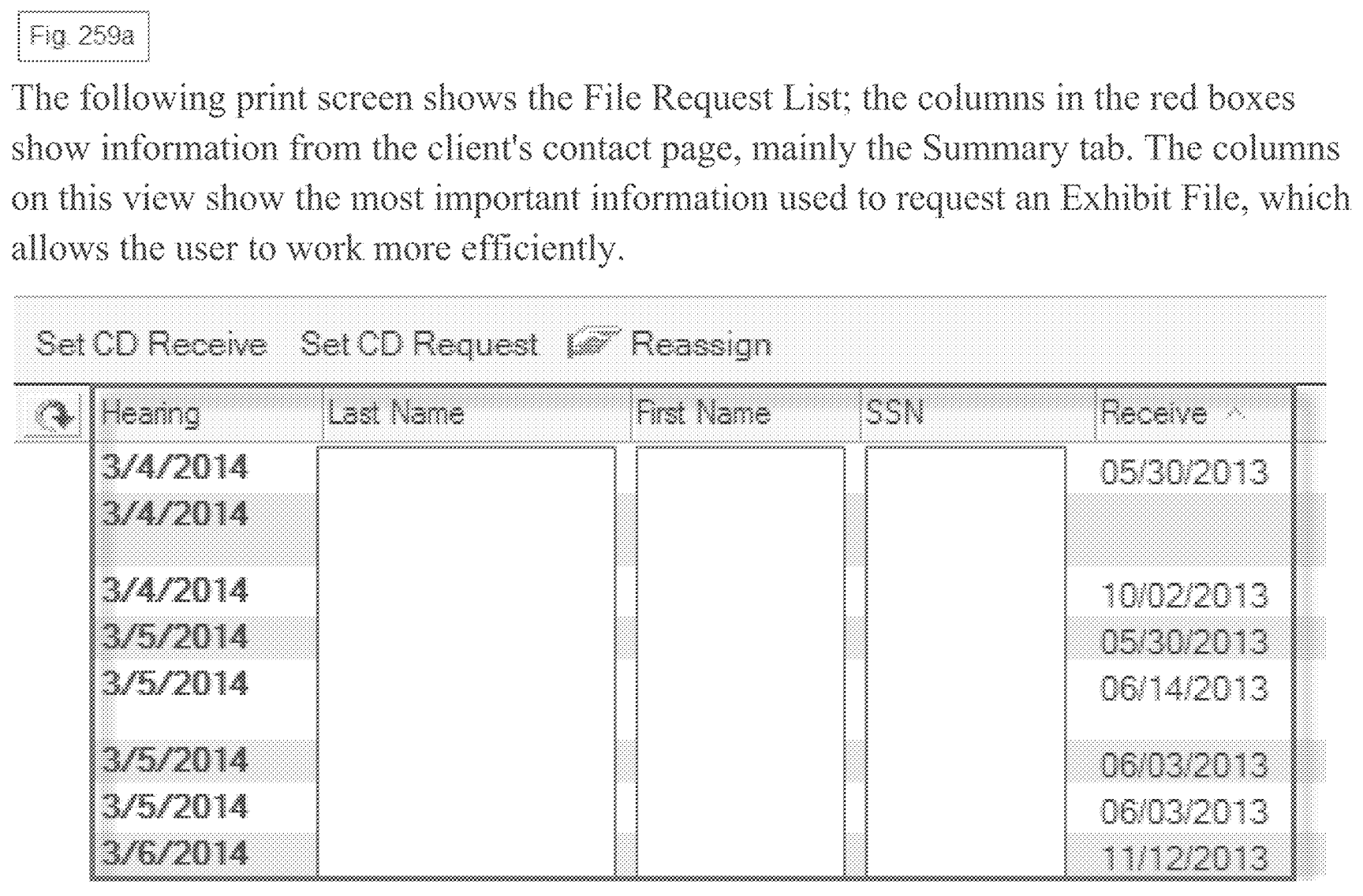

The following print screen shows the File Request List; the columns in the red boxes show information from the client's contact page, mainly the Summary tab. The columns on this view show the most important information used to request an Exhibit File, which allows the user to work more efficiently.

Set CD Receive Set CD Request Reassign

| Hearing | Last Name | First Name | SSN | Receive ^ |
| --- | --- | --- | --- | --- |
| 3/4/2014 | | | | 05/30/2013 |
| 3/4/2014 | | | | |
| 3/4/2014 | | | | 10/02/2013 |
| 3/5/2014 | | | | 05/30/2013 |
| 3/5/2014 | | | | 06/14/2013 |
| 3/5/2014 | | | | 06/03/2013 |
| 3/5/2014 | | | | 06/03/2013 |
| 3/6/2014 | | | | 11/12/2013 |

Fig 259b

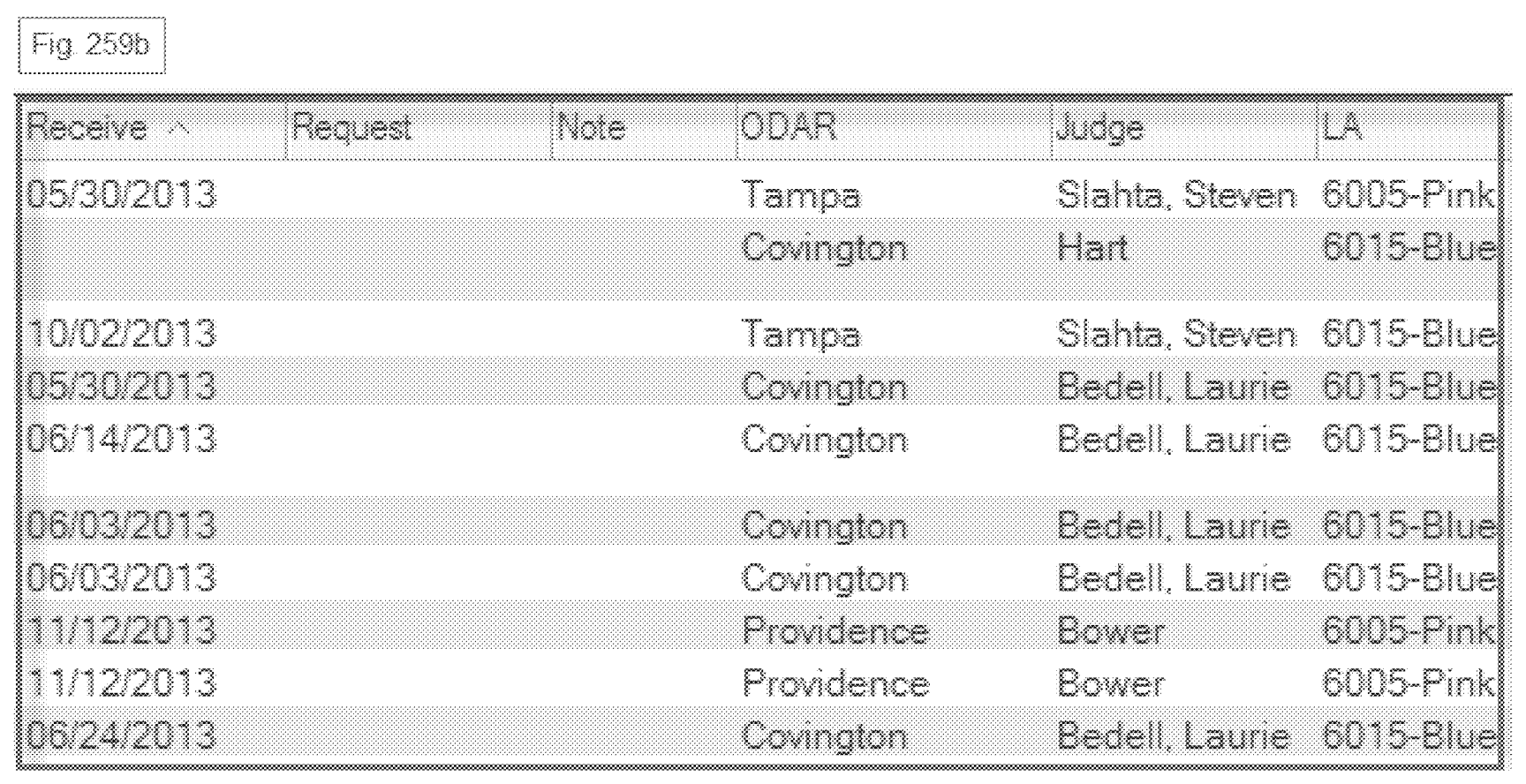

| Receive ^ | Request | Note | ODAR | Judge | LA |
|---|---|---|---|---|---|
| 05/30/2013 | | | Tampa | Slahta, Steven | 6005-Pink |
| | | | Covington | Hart | 6015-Blue |
| 10/02/2013 | | | Tampa | Slahta, Steven | 6015-Blue |
| 05/30/2013 | | | Covington | Bedell, Laurie | 6015-Blue |
| 06/14/2013 | | | Covington | Bedell, Laurie | 6015-Blue |
| 06/03/2013 | | | Covington | Bedell, Laurie | 6015-Blue |
| 06/03/2013 | | | Covington | Bedell, Laurie | 6015-Blue |
| 11/12/2013 | | | Providence | Bower | 6005-Pink |
| 11/12/2013 | | | Providence | Bower | 6005-Pink |
| 06/24/2013 | | | Covington | Bedell, Laurie | 6015-Blue |

The following print screens show where each column gets its information.

Hearing:

Fig. 266

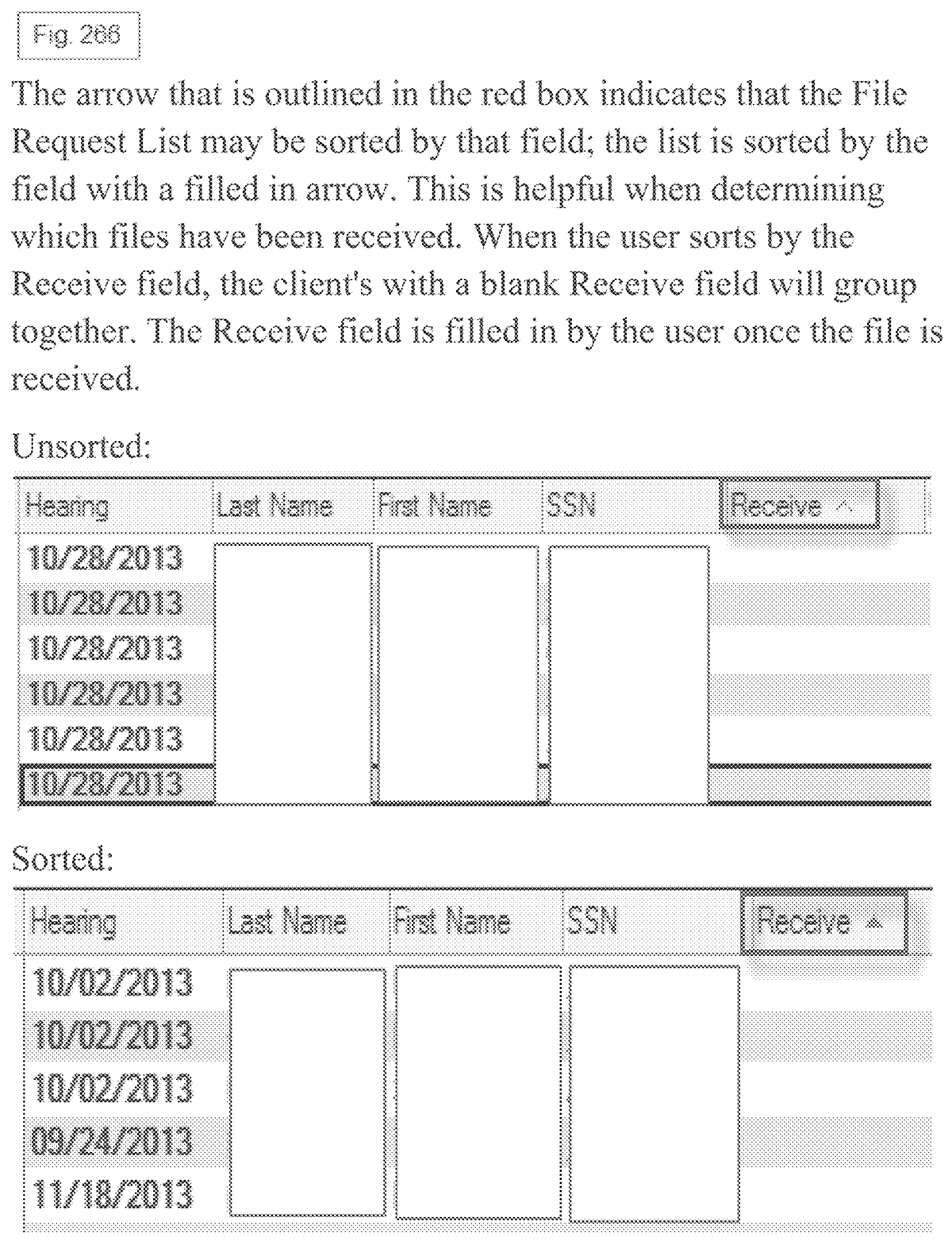

The arrow that is outlined in the red box indicates that the File Request List may be sorted by that field; the list is sorted by the field with a filled in arrow. This is helpful when determining which files have been received. When the user sorts by the Receive field, the client's with a blank Receive field will group together. The Receive field is filled in by the user once the file is received.

Unsorted:

| Hearing | Last Name | First Name | SSN | Receive ^ |
|---|---|---|---|---|
| 10/28/2013 | | | | |
| 10/28/2013 | | | | |
| 10/28/2013 | | | | |
| 10/28/2013 | | | | |
| 10/28/2013 | | | | |
| 10/28/2013 | | | | |

Sorted:

| Hearing | Last Name | First Name | SSN | Receive ▲ |
|---|---|---|---|---|
| 10/02/2013 | | | | |
| 10/02/2013 | | | | |
| 10/02/2013 | | | | |
| 09/24/2013 | | | | |
| 11/18/2013 | | | | |

Fig. 267
The File Request List has two buttons (Set CD Receive and Set CD Request) that allow the user to quickly fill in the Receive and Request dates. The user may fill in multiple clients' date simultaneously to save time. The user will click to the left of the Hearing column in the row they wish to fill and press the corresponding button.
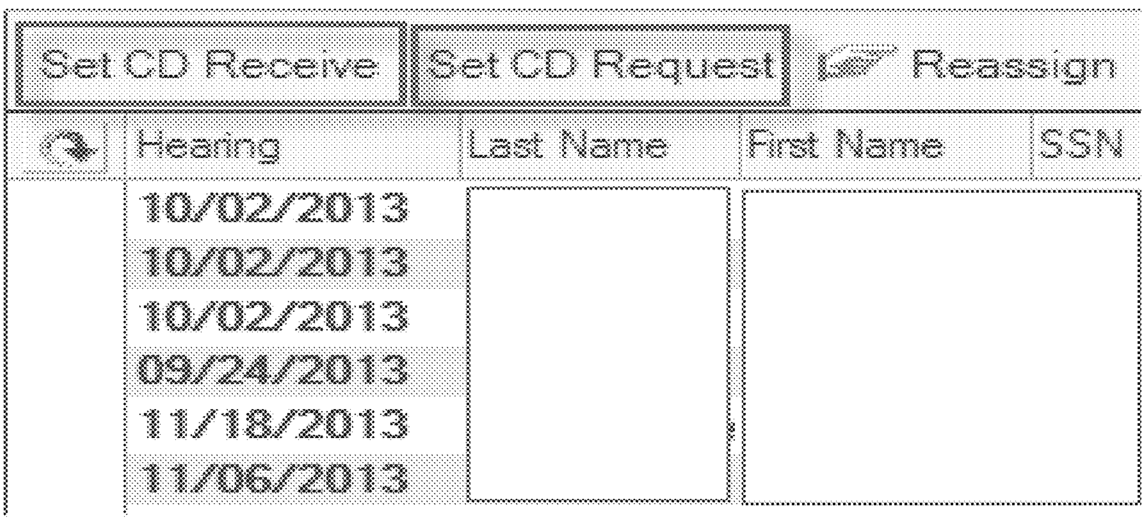
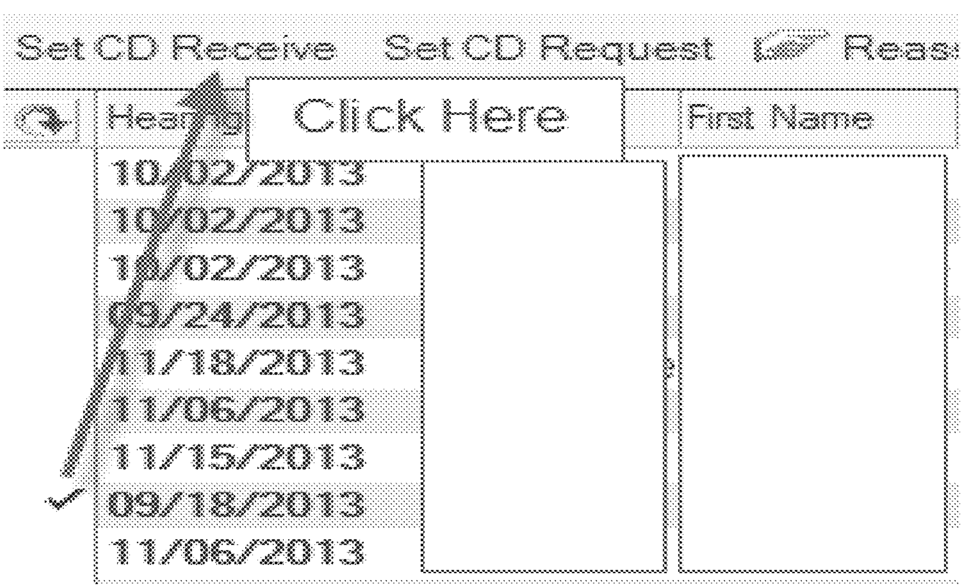

Special

The Special view is used by the Special Case Developer team to keep track of the clients that have "Special" cases - generally referring to time sensitivity. The Special view organizes and tracks the clients' cases as well as provides a quick view of what tasks are pending.

The Special view is accessed by clicking on SSA: Hearing > "Special"

The system places all of the contacts with POST (MR), POST (CE), VSU / IFR, and ODAR in their Special field on the list.

The Special field is edited by clicking on the pencil/paper icon and using the dropdown.
The user must edit this field in order to add or remove the contact to/from the Special list.

The Special view has subcategories that divide the list by the Special field.

Fig. 271a

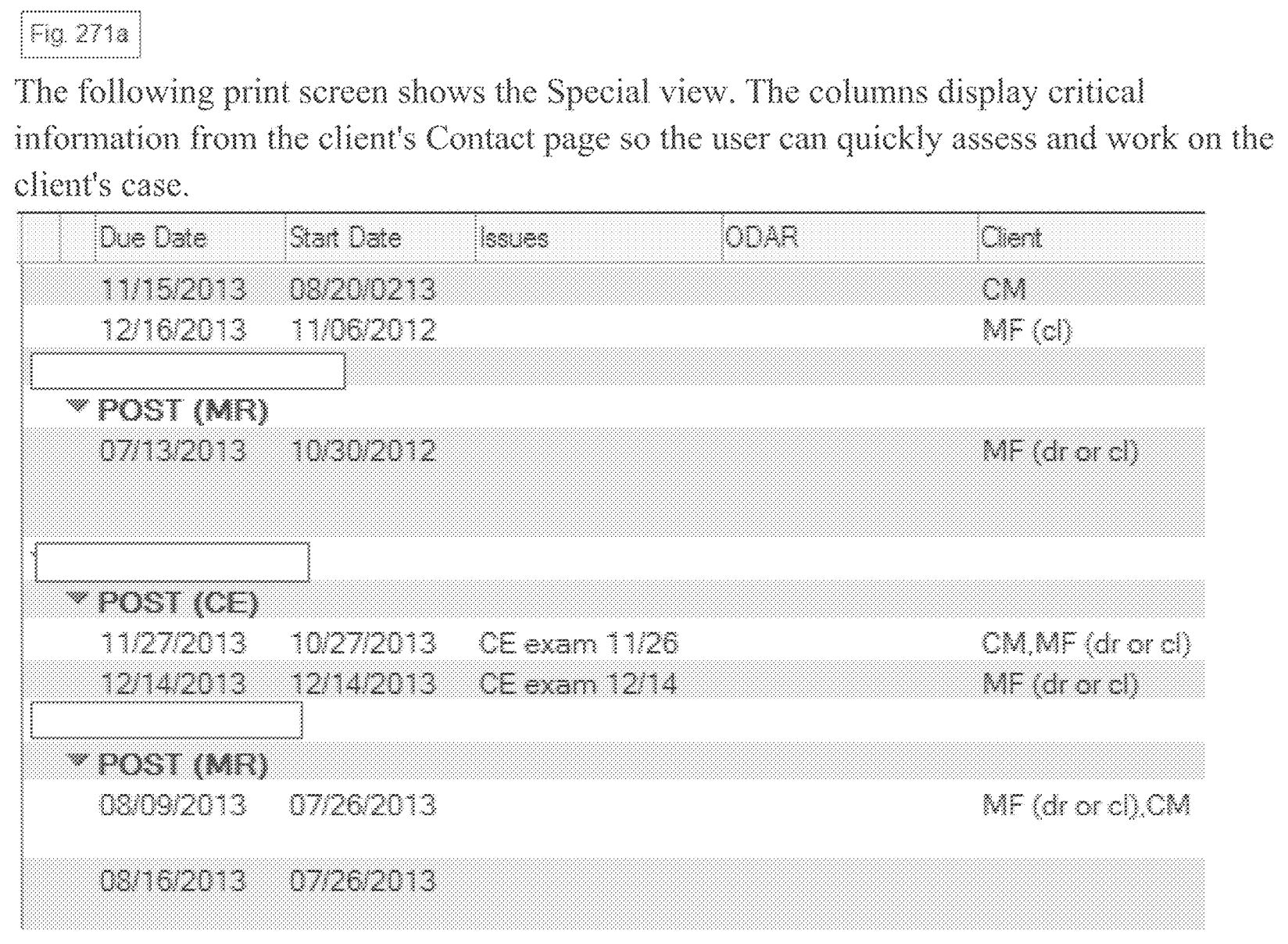

The following print screen shows the Special view. The columns display critical information from the client's Contact page so the user can quickly assess and work on the client's case.

| | Due Date | Start Date | Issues | ODAR | Client |
|---|---|---|---|---|---|
| | 11/15/2013 | 08/20/0213 | | | CM |
| | 12/16/2013 | 11/06/2012 | | | MF (cl) |
| | | | | | |
| ▼ POST (MR) | | | | | |
| | 07/13/2013 | 10/30/2012 | | | MF (dr or cl) |
| | | | | | |
| ▼ POST (CE) | | | | | |
| | 11/27/2013 | 10/27/2013 | CE exam 11/26 | | CM,MF (dr or cl) |
| | 12/14/2013 | 12/14/2013 | CE exam 12/14 | | MF (dr or cl) |
| | | | | | |
| ▼ POST (MR) | | | | | |
| | 08/09/2013 | 07/26/2013 | | | MF (dr or cl),CM |
| | 08/16/2013 | 07/26/2013 | | | |

Fig. 271b

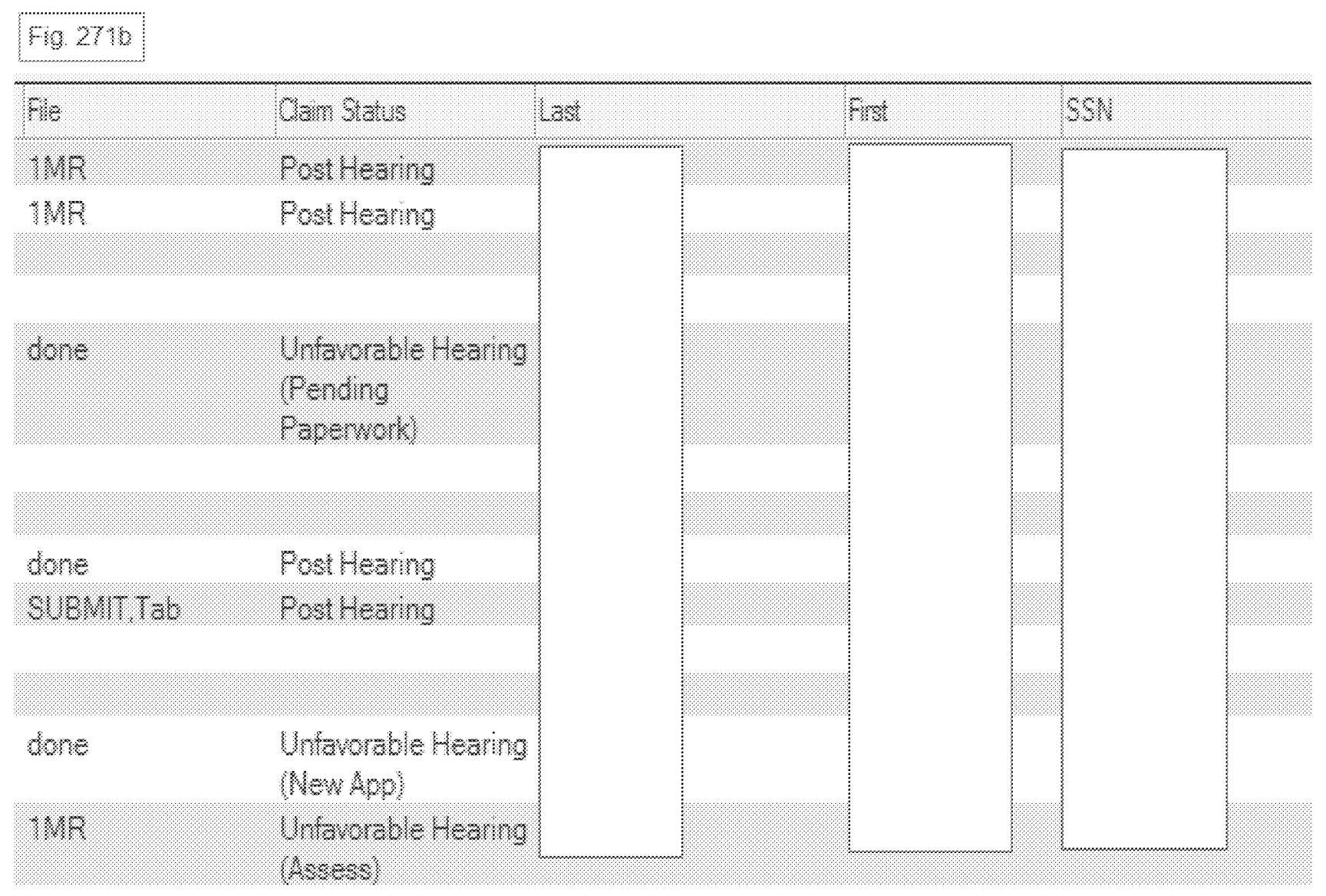

| File | Claim Status | Last | First | SSN |
|---|---|---|---|---|
| 1MR | Post Hearing | | | |
| 1MR | Post Hearing | | | |
| | | | | |
| | | | | |
| done | Unfavorable Hearing (Pending Paperwork) | | | |
| | | | | |
| | | | | |
| done | Post Hearing | | | |
| SUBMIT,Tab | Post Hearing | | | |
| | | | | |
| | | | | |
| done | Unfavorable Hearing (New App) | | | |
| 1MR | Unfavorable Hearing (Assess) | | | |

Fig. 272a

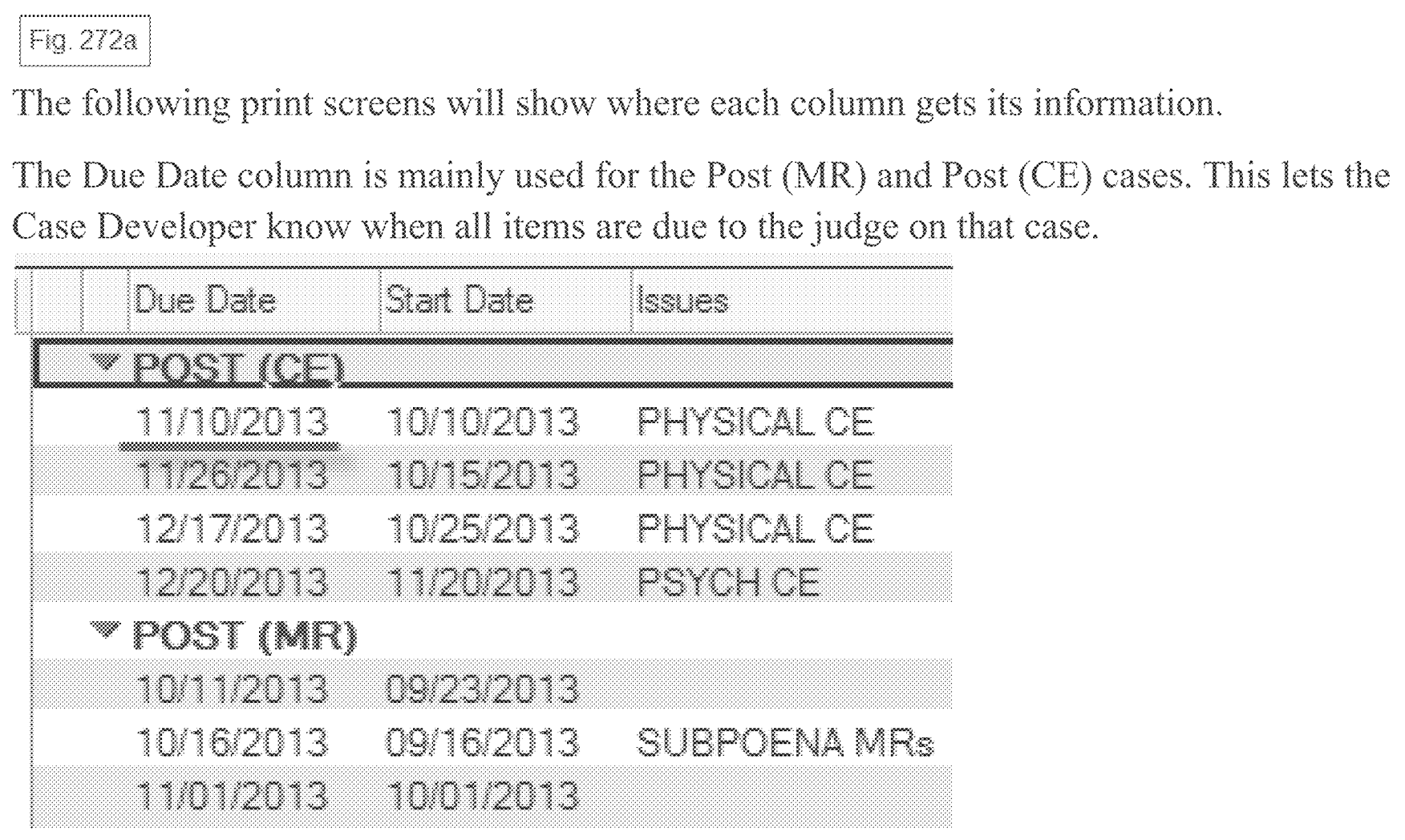

The following print screens will show where each column gets its information.

The Due Date column is mainly used for the Post (MR) and Post (CE) cases. This lets the Case Developer know when all items are due to the judge on that case.

| Due Date | Start Date | Issues |
| --- | --- | --- |
| ▼ POST (CE) | | |
| 11/10/2013 | 10/10/2013 | PHYSICAL CE |
| 11/26/2013 | 10/15/2013 | PHYSICAL CE |
| 12/17/2013 | 10/25/2013 | PHYSICAL CE |
| 12/20/2013 | 11/20/2013 | PSYCH CE |
| ▼ POST (MR) | | |
| 10/11/2013 | 09/23/2013 | |
| 10/16/2013 | 09/16/2013 | SUBPOENA MRs |
| 11/01/2013 | 10/01/2013 | |

Fig. 273a

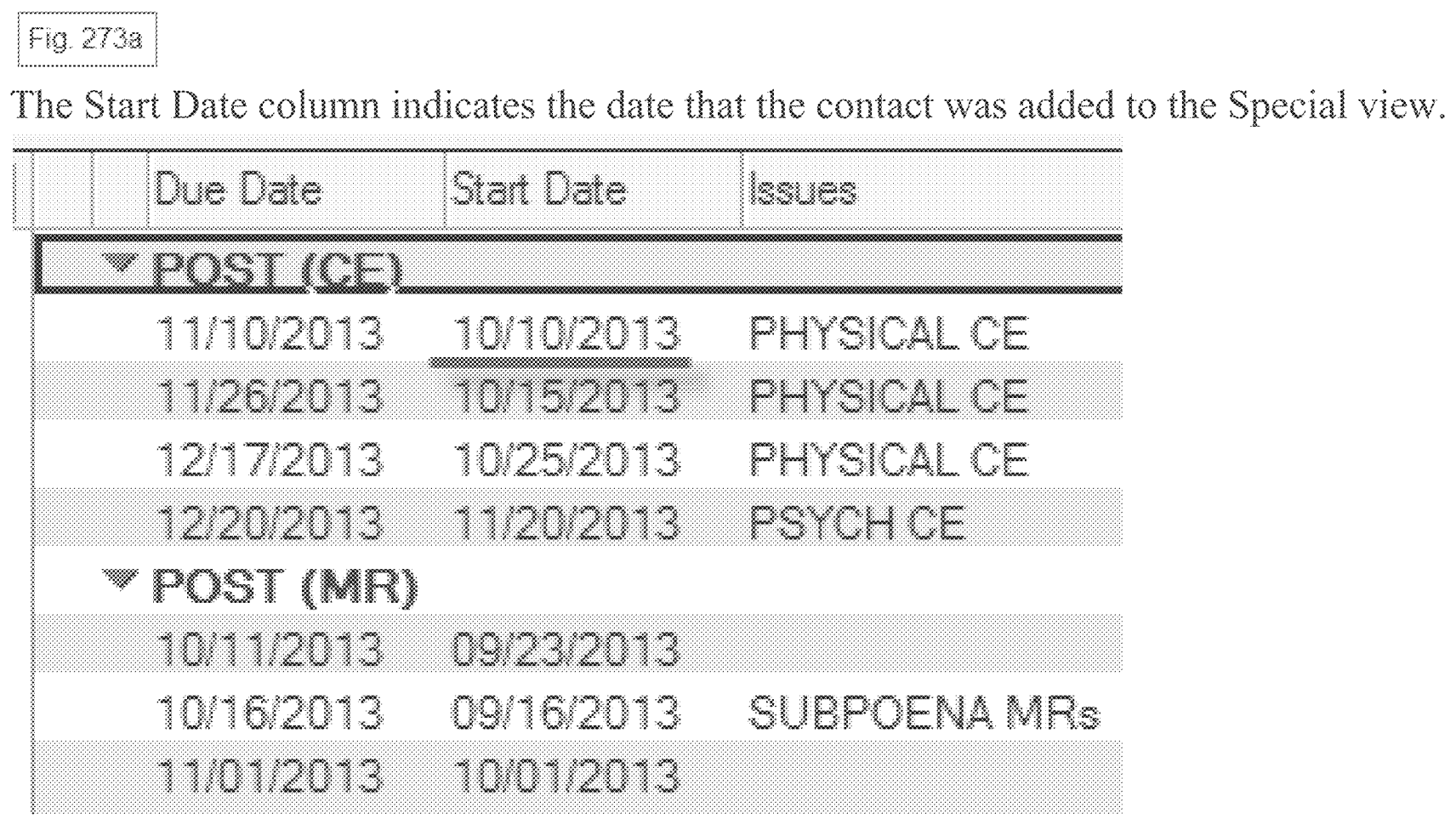

The Start Date column indicates the date that the contact was added to the Special view.

| Due Date | Start Date | Issues |
|---|---|---|
| ▼ POST (CE) | | |
| 11/10/2013 | 10/10/2013 | PHYSICAL CE |
| 11/26/2013 | 10/15/2013 | PHYSICAL CE |
| 12/17/2013 | 10/25/2013 | PHYSICAL CE |
| 12/20/2013 | 11/20/2013 | PSYCH CE |
| ▼ POST (MR) | | |
| 10/11/2013 | 09/23/2013 | |
| 10/16/2013 | 09/16/2013 | SUBPOENA MRs |
| 11/01/2013 | 10/01/2013 | |

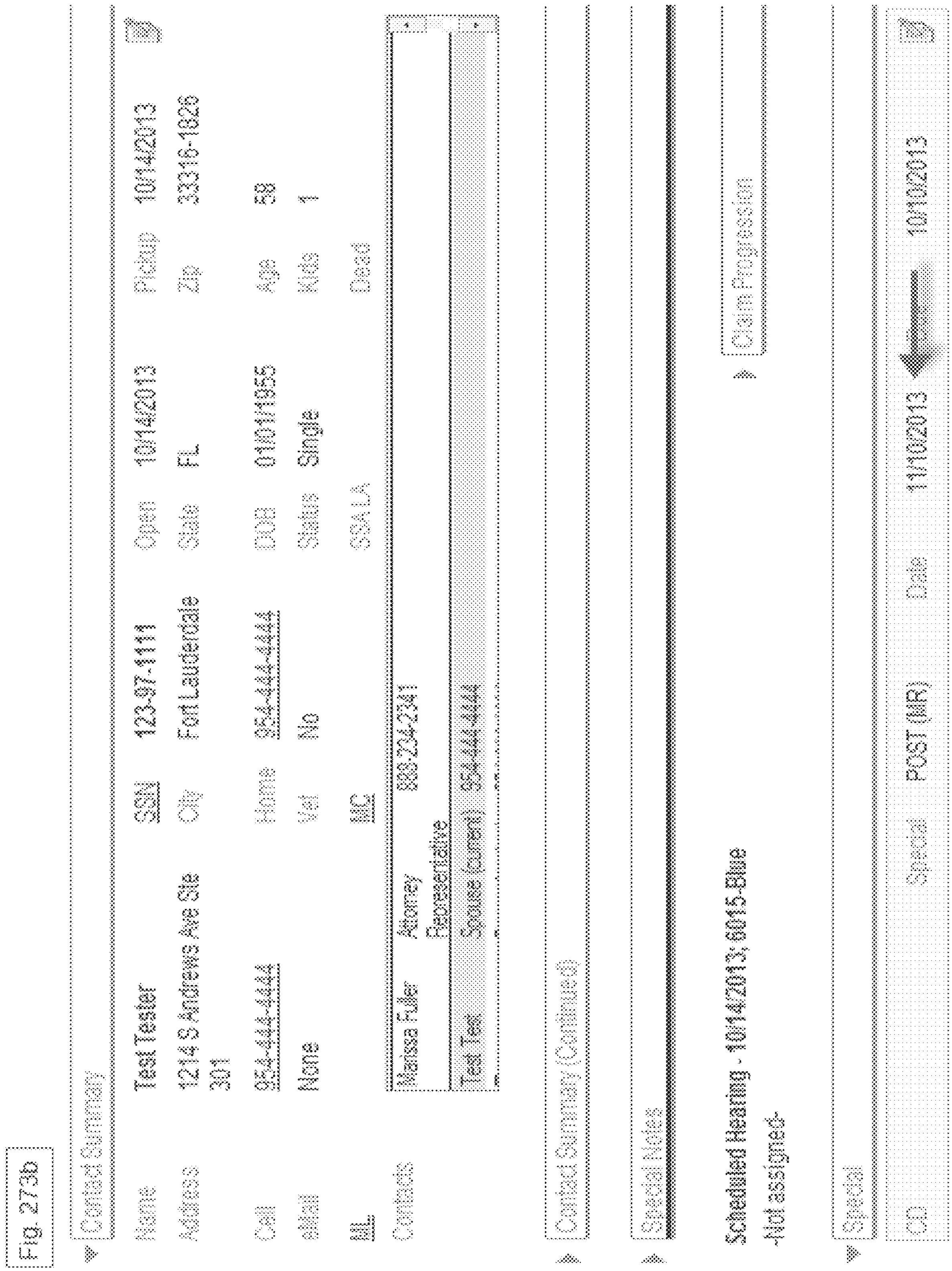
Fig. 273b
Contact Summary
Name
Test Tester
SSN
123-97-1111
Open
10/14/2013
Pickup
10/14/2013
Address
1214 S Andrews Ave Ste 301
City
Fort Lauderdale
State
FL
Zip
33316-1826
Cell
954-444-4444
Home
954-444-4444
DOB
01/01/1955
Age
58
eMail
None
Vet
No
Status
Single
Kids
1
ML
MC
SSA LA
Dead
Contacts
Marissa Fuller
Attorney Representative
888-234-2341
Test Test
Spouse (current)
954-444-4444
Contact Summary (Continued)
Special Notes
Scheduled Hearing - 10/14/2013, 6015-Blue
-Not assigned-
Claim Progression
Special
CD
Special
POST (MR)
Date
11/10/2013
10/10/2013

The Issues column is used to keep any important notes in regards to the case. For Special cases, typically the location or contact for the Office of Disability Adjudication and Review (ODAR) is kept in this field.

The ODAR, Client, and File columns connect to the Pending Reminders in the contact page. These columns help the case developer quickly see what items are currently pending for each case.

The Claim Status column shows the current status of the client's claim.

| Due Date | Start Date | Issues | ODAR | Client | File | Claim Status |
|---|---|---|---|---|---|---|
| ▼ POST (CE) | | | | | | |
| 09/29/2013 | 08/29/2013 | | | | done | Post Hearing |
| ▼ POST (MR) | | | | | | |
| 11/29/2013 | 11/01/2013 | | RqDISCO | T,MF (dr or cl),CM | done | Post Hearing |
| 12/05/2013 | 11/05/2013 | | | LPOA | SUBMIT | Post Hearing |

The Last Name, First Name, and SSN are connected to the contact page.

Fig. 278a
Test Tester
search
Include Claims
archive
LaVan & Neidenberg
on LNHQ1/dlc
SSA Hearing
Case Developers
File Request List
Hearing
Special
Assign N&B
Hearing Status
Requested From Facility
Requested From Client
Requested from ODAR

Invoice Tracking

Throughout any given week the firm receives hundreds of invoices for medical records and therefore tracking the status of the invoices is critical. There are two invoice views: 1. To Pay; or 2. Paid

Fig. 278b

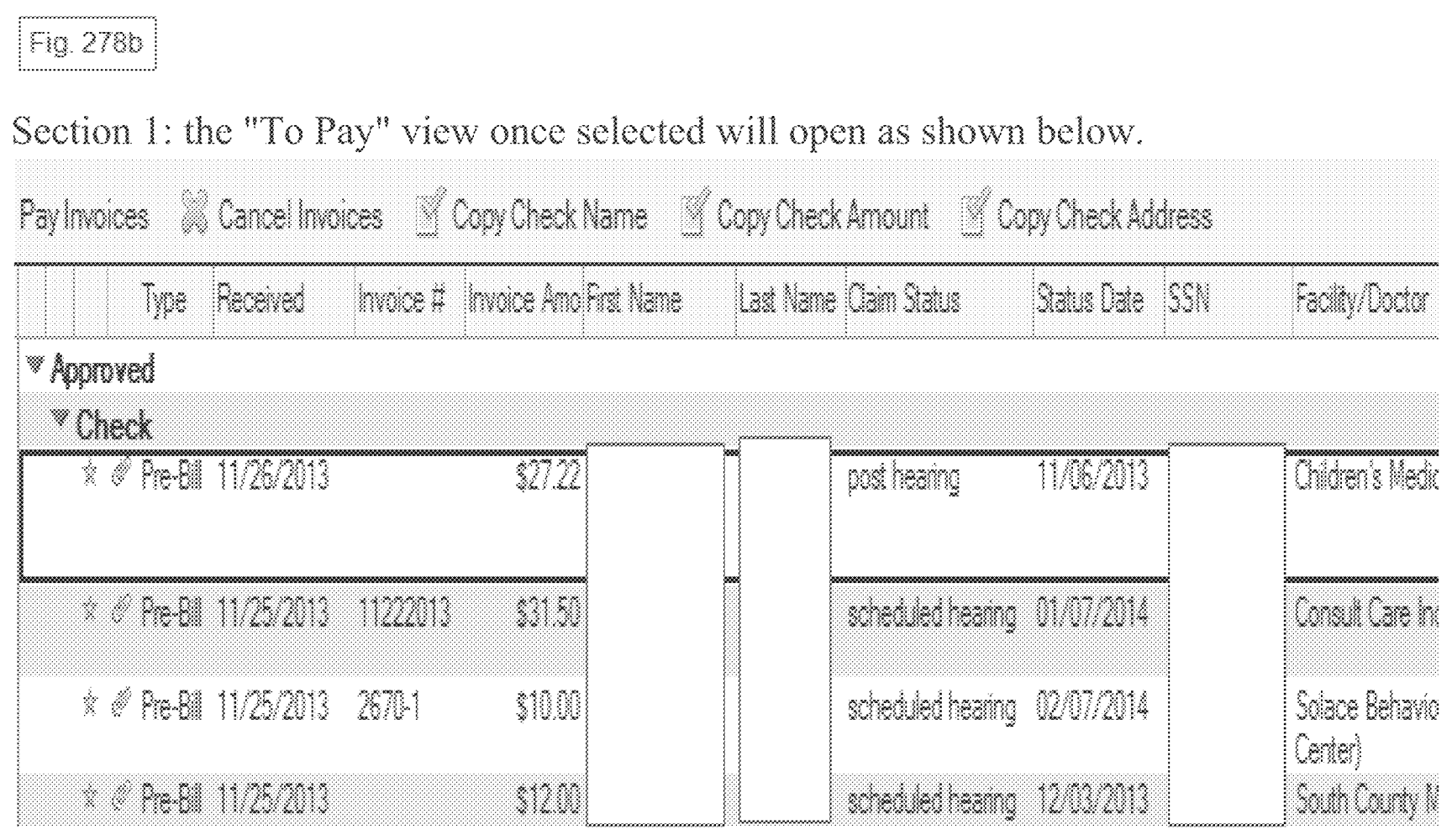

Section 1: the "To Pay" view once selected will open as shown below.

Pay Invoices | Cancel Invoices | Copy Check Name | Copy Check Amount | Copy Check Address

| Type | Received | Invoice # | Invoice Amo | First Name | Last Name | Claim Status | Status Date | SSN | Facility/Doctor |
|---|---|---|---|---|---|---|---|---|---|
| ▾ Approved | | | | | | | | | |
| ▾ Check | | | | | | | | | |
| Pre-Bill | 11/26/2013 | | $27.22 | | | post hearing | 11/06/2013 | | Children's Medic |
| Pre-Bill | 11/25/2013 | 11222013 | $31.50 | | | scheduled hearing | 01/07/2014 | | Consult Care In |
| Pre-Bill | 11/25/2013 | 2670-1 | $10.00 | | | scheduled hearing | 02/07/2014 | | Solace Behavio Center) |
| Pre-Bill | 11/25/2013 | | $12.00 | | | scheduled hearing | 12/03/2013 | | South County N |

The "To Pay" has categories to organize the flow of invoices. By expanding the category the user can view the invoices.

Expand a category by clicking on the category header.

Section 2: There are several categories within the "Paid" view

Invoice/pre-bills transfer from the To Pay view to the Paid view by completing the dialogue below (multiple invoices can be updated simultaneously to increase user's efficiency)

Fig. 281a

Record Tracking System

A critical aspect of the database is tracking records from receipt, through review, to submission. The Received view organizes and provides the user with easy view ability and data making it efficient for several users to review hundreds of records each week. A reviewer has the option to assign Good, Bad, Hold , or Partially Good to a record.

The Received view appears as shown

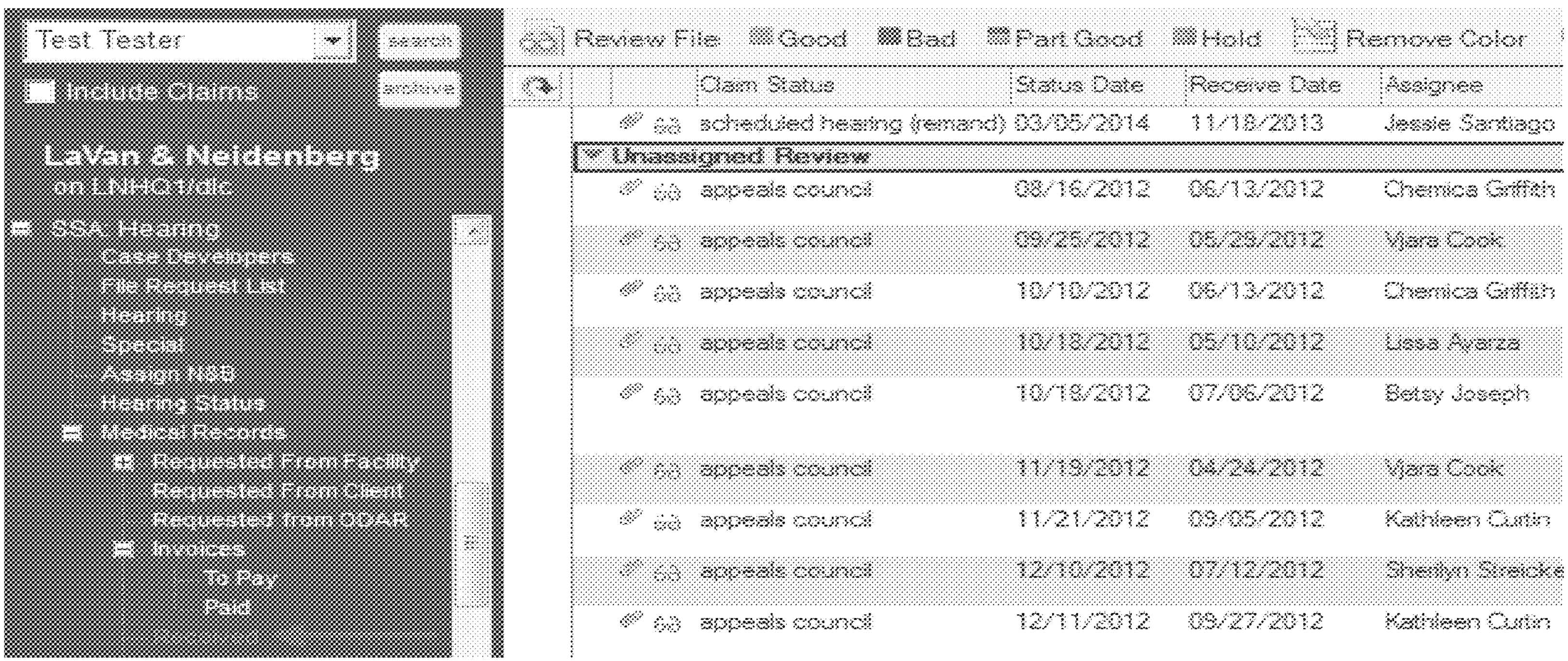

The Received view is categorized by the following

After expanding one of the categories in the Received view the list will appear as shown

Fig. 283a

Auto-Fax

The purpose of this project is to implement a process that will automatically send via fax any file attached to existing documents in the DLC database that meets a given criteria and recover confirmation information on first page faxed. The group of documents to process as of right now is:

Medical Records

- Any requested medical record with request type = "Fax"
    - When: Immediately
    - Where: To the fax number associated to the doctor/facility
- Any reviewed medical record that meets the following conditions:
    - Contains the word "Good" in the review result
    - Claim Status is included in the list of valid claim statuses
    - Parent claim has an incoming letter of type = "Barcode (DDS)" or "Barcode (ODAR)" with a valid file attachment. (type of letter required will depend on claim status)

Fig. 283b

- When: X days after the date of the current claim status. (number of days will depend on claim status)

- Where: To e-fax number of the DDS or ODAR office (type of office will depend on claim status) The faxed file will contain the office's Barcode attachment, the template cover sheet and configuration medical record attachment.

Symphony templates

Some of the letters that are available for manual generation should be faxed. The symphony template configuration will need a flag that will determine when it needs to be automatically faxed.

When: Immediately

Where: To e-fax number of the configured contact office (type of office depends on symphony template being generated)

Task workflow attachments

Files attached to some tasks once they are completed. However, sometimes only the first page of the file needs to be faxed.

When: Immediately, once the task is completed

Fig. 283c

Where: To e-fax number of the configured contact office. (type of office depends on the specific task definition: if the parent workflow contains a task that generates a symphony template, the *type* of office will de£1ult to the type of office configured for such symphony template)

Confirmations and Check-sheet views

Allow users to select a subset of records and auto-generate/fax a specific template letter that can be selected each time.

When: Immediately

Where: To e-fax number of the office configured for the selected symphony template.

The documents will be faxed and flagged according to the result. The process will run on a scheduled time (probably once a day at a specific time.)

Fig. 284

Fax auto-submit views

Queue view

The system will provide a list (view) of documents pending for processing categorized by type.

Each document in the view will be marked with a "submit status" that provides information about the submit step, for example: "Ready to submit", "Awaiting barcode", etc.

All documents "Ready to submit" will be subject to processing. However, the user will be able to manually remove any document from this queue using a button.

An action will be provided to "re-fax" in bulk a given subset of documents that have been previously submitted.

Each time a document is "re-faxed", its confirmation information needs to be recovered and maintained as a file attachment associated to the document.

If an error occurs during processing, the database administrator will receive a notification containing the list of failures.

History View

Another view needs to be provided to show the history of fax attempts

Fig. 285

Client Web Portal - MyClaimGo.com

With our new client web portal, MyClaimGo.com, we are now able to offer our clients instant access to their claim via the Internet. Our goal is to better serve our clients by giving them access to their file, therefore the claims representatives should encourage our clients to create a user account.

The client will be able to view their contact information, emergency contacts, medical providers, prescriptions, medical conditions, work history, and details about their claim status. They will have access to update, add, or remove information from these categories.

If the client updates, adds, or removes any information the data will be organized in a queue that is managed by L&N staff in an internal Admin Console. If the request is approved by L&N Admin then Lotus will be updated and the information will then be reflected on MyClaimGo.com when the client logs in.

REGISTRATION

The client will need to follow all screen prompts and enter their information:

If client has not registered they will need to click "Register to use the site":

Fig. 287
LAVAN & NEIDENBERG, P.A.
MyClaimGo.com Registration - Step 1
Username Information
Fields marked with an asterisk* are required
Your Privacy
First Name*
Tester
Middle Initial:
Last Name*
Client
Continue
Clear Entries
View M

Registration Step 1:

Fig. 289

The client will receive a confirmation email (or text message if they choose that option):

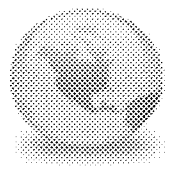

MyClaimGo.com Registration Confirmation
registration to: mfuller

Dear Tester:

Your MyClaimGo.com Registration has been successfully processed.

Your username is: Tester Client
Your password is: test4me

Email: mfuller@disabilitylawclaims.com
Mobile: 954-523-3870

If you need to update this information, use our Registration page at:
https://servername.com/registration.nsf/regchoice Thanks for using our site!
MyClaimGo.com Team
http://www.disabilitylawclaims.com

Once the client receives their confirmation email they will need to return to the Portal home page to enter their Username and Password and click Sign In:

Once the client logs in they will be directed to this page:

Fig. 292a
John Doe
Address 3015 SW 16th St Fort Lauderdale, FL, 33312-3802
Home 954-899-7717 Mobile 954-888-2341
Email info@disabilitylawclaims.com

Client will be able to click on each category (Emergency Contacts, Medical Treatments, Prescriptions, Medical Conditions, Work History, Details) and update, edit, or remove information.

Adding, Updating, or Removing Information

Client will complete all necessary fields and click Save

Once they click Save they receive a notification that their request to add a contact has been received

Claim Status

The client will be able to view their Claim Status(es). A brief description is provided under the Claim Status so the client will have a clear definition of what status their claim is at. The client can also view their Claim Status Progression.

Additional Comments

If the client needs to update, add, or remove information other than what is shown on the Portal they can enter the information in Additional Comments

Client Portal Admin Console

Each time a client enters a request to update, add, or remove information while logged into the Client Portal the request is sent to our Admin Console. A user checks the console daily and updates, adds, or removes, the information accordingly.

The user will log into the Admin Console from MyClaimGo.com.

The User will assign pending requests to themselves to complete. That way more than one user can work in the Admin Console at the same time.

The requests assigned to each user will appear in a panel called "Requests Assigned To Me". The user can click on Edit to view the request.

Fig. 300
Exit
Leroy
Address
Mobile
Email
Created By on 3/12/2013
Update Emergency Contact
First Name
Last Name
Relation
Parent (mother)
Phone
Complete Request
Cancel Request

The user will be able to view the clients request and determine if the information needs to be updated in Lotus. The user will then Complete or Cancel the request accordingly.

Fig. 301
Exit
Leroy
Address
Mobile
Email
Created By
on 3/12/2013
Update Emergency Contact
First Name
Last Name
Relation
Parent (mother)
Phone
Complete Request
Cancel Request

Once the request is Completed or Cancelled the information is stored under the Completed or Cancelled tabs.

CLAIM AND PROGRESSION MANAGEMENT

PRIORITY CLAIM

In accordance with 37 C.F.R. 1.76, a claim of priority is included in an Application Data Sheet filed concurrently herewith. Accordingly, the present invention claims priority as a continuation of U.S. patent application Ser. No. 14/586,609 entitled "CLAIM AND PROGRESSION MANAGEMENT", filed on Dec. 30, 2014, which claims the benefit of U.S. patent application Ser. No. 13/843,743, entitled "CLAIM AND PROGRESSION MANAGEMENT", filed on Mar. 15, 2013, which claims the benefit of priority of U.S. Provisional Patent Application No. 61/619,049, entitled "SOCIAL SECURITY CLAIM AND PROGRESSION MANAGEMENT", filed on Apr. 2, 2012. The contents of which the above referenced application is incorporated herein by reference in its entirety.

FIELD OF THE INVENTION

The present invention relates to a system and method for submitting and processing benefit claims, such as Social Security claims. The present invention permits the user to make the initial application for benefits, respond to denials of benefits, if necessary, and appeal negative decisions.

BACKGROUND OF THE INVENTION

Government agencies have developed rules and regulations for applying for and receiving government benefits. These agencies also have developed rules and procedures for adjudication of disability requests. In particular, the Social Security Administration receives probably the most requests for retirement and disability benefits of all of the government agencies which pay out benefits. Medicare provides health insurance under Title XVIII of the Social Security act. Therefore, the Social Security Administration must process Medicare claims in addition to retirement claims. There is also the Social Security Disability Insurance program which handles disability claims and benefits for those individuals who qualify. Again, there are rules and procedures for the processing of these disability claims. There are businesses, in particular law firms that file for Social Security benefits on behalf of their clients. Currently, this is a very tedious, difficult, and time consuming process. This process becomes even more difficult when the conditions under which the initial benefit claim was made changes. For example, when a claim for a medical benefit has initially been made and there is a change in the medical condition of the claimant, different forms need to be completed and specific procedures need to be followed. Also, if a claim or claims for benefits have been denied, there are specific procedures that need to be followed to properly appeal the denial decision of the Social Security Administration or other government agencies.

Thus, what is needed in the art is a process for filing benefit claims with the Social Security Administration, or other government agencies, which can follow the proper claim procedures to assure the claimant receives the benefits that he/she is entitled to. Also a process that will enable filing of updated and/or changes in status of benefits. Further, a process that will assure a proper and correct filing of an appeal for denial of certain benefits.

DESCRIPTION OF THE PRIOR ART

U.S. Published Patent Application No. 2011/0077981 discloses a method and system for automated processing of medical data for insurance and disability determinations.

U.S. Published Patent Application No. 2003/0158750 discloses a computer implemented process and system for processing compensation requests.

U.S. Published Patent Application No. 2008/0059249 discloses a system and process for storing healthcare information, records, or history of an individual or healthcare provider.

U.S. Published Patent Application No. 2010/0145734 discloses a computer based automated loss verification system for evaluating the validity of claims filed under an insurance policy or debt protection contract.

U.S. Published Patent Application No. 2010/0185466 discloses a method for tracking health related spending for validation of disability benefits claims. The method includes tracking, by the Medicare Secondary Payer statute-compliance company, healthcare related expenditures by the recipient.

U.S. Published Patent Application No. 2003/0167220 discloses a computer aided method of computing coverage benefit costs for a retirement plan having respective accounts for individuals.

U.S. Published Patent Application No. 2002/0035488 discloses a system and method of administering, tracking, and managing claim processing.

U.S. Published Patent Application No. 2009/0222290 discloses a system for automated, predictive modeling of the outcome of benefits claims including a profile generator, an evaluation component, and a case management application.

U.S. Published Patent Application No. 2009/0192827 discloses a rules based system for information relating to health or retirement benefits. The information is stored in the form of statements or clauses relating to financial, medical, or personal characteristics relevant to certain statures or regulations.

U.S. Patent Application No. 2008/0010279 discloses a system and method of educational accountability reporting for Federal, State, and local initiatives such as the Federal No Child Left Behind (NCLB) program. The system also includes a detailed process for handling appeals and reconsiderations of disputed assessments or demographic data being utilized for the calculation of statistics.

U.S. Published Patent Application No. 2010/0318393 discloses a system and method for dispatching a workflow responsive request including a plurality of dispatch rules which may be defined based on a user's input.

U.S. Pat. No. 7,753,263 discloses a method and system for automatic case determination and assignment for a business transaction.

U.S. Published Patent Application No. 2003/0074277 discloses a method for processing an application from a user for a product using a first computer. The information is sent to a second computer for processing. The computers can be a client and a server respectively.

U.S. Pat. No. 7,600,252 discloses a system, method, and computer program for providing communication between different devices having similar or different characteristics and facilitating seamless operability between the devices.

U.S. Pat. No. 7,185,273 discloses a method for the completion of forms including receiving location information, retrieving user information, configuring the user information for merging with the form, and printing a form that contains at least some of the user information.

SUMMARY OF THE INVENTION

The present invention is a computer implemented method and system for gathering information from a user related to, filing for, and obtaining government benefits, such as Social Security benefits. The present invention also enables the user to track the benefit application approval process and reminders when certain data or responses are due. There is a feature which enables the user to modify the data submitted for the benefits when circumstances warrant. The system presents questions in a systematic method to reduce the time it takes to complete an intake. Based on answers provided, the intake wizards guides the user through appropriate questions to ask based on the previous answers provided. for example if the potential client is a veteran the intake will ask service related questions that can be evaluated for an SSA claim and/or VA claim. If an answer disqualifies the claimant from SSDI or SSI for a "technical" reason, the questionnaire is terminated so that the user can move on to the next intake quickly and efficiently. If an answer does not disqualify the claimant from the intake process, the intake moves onto the next sections of the questionnaire. The system assists the user in computing what stage in the process the claimant is currently at. For example, Needs to File an Application, Initial Application, Denied Initial Claim, Reconsideration, Denied Reconsideration, Hearing Filed, Ready to Schedule a Hearing, Hearing Scheduled, Awaiting Decision, Appeals Council, or Federal Claim (many claimants get confused and this is an important part of the application process). Questions are presented related to the claimant's medical history to determine if the user has a valid claim for benefits. The system may in certain instances medically approve the client for representation. When an intake is accepted, the intake wizard assigns the intake to a person responsible for getting the retainer signed, the intake system programmatically fills in SSA forms for the client to sign, emails the forms when appropriate, determines what SSA district office is assigned to the claimant, and then programmatically completes the three SSA Application forms when appropriate. There is also a decision appeal process feature.

Accordingly, it is an objective of the present invention to provide a computer implemented method and system for inputting data into a government benefits system.

It is a further objective of the present invention to provide an intake wizard which permits a user to automatically populate a form by input data related to obtaining government benefits, including medical conditions.

It is yet another objective of the present invention to provide an intake wizard which assists a user in responding to denial of government benefits.

It is a still further objective of the present invention to provide an import wizard which handles incoming mail, outgoing mail, workflow documents, medical records, document attachments, and collections.

It is a still further objective of the present invention to provide an application wizard which enables a user to correction complete an application form for government benefits.

It is a still further objective of the present invention to provide a computer implemented method and system which enables multiple individuals to file on behalf of multiple users for government benefits, maintain the records of these users and respond to different requests and/or information from a government agency regarding the application for the users' benefits requests.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIGS. 1A-1F is a benefit claim progression flow chart;
FIG. 5 is workflow view;
FIG. 14 is a screen shot of a workflow view;
FIG. 18 is a screen shot of an Intake Wizard;
FIG. 24 is a screen shot of an Intake Wizard;
FIG. 26 is a screen shot of an Intake Wizard;
FIG. 33 is a screen shot of medical conditions on the Intake Wizard;
FIGS. 34*a*-34*b* are charts explaining the termination reasons;
FIG. 35 is screen shot of termination reasons.

FIG. 80 is a screen shot of an Import Wizard;
FIGS. 93*a*-93*b* are a screen shot of an Import Wizard;
FIG. 108 is a screen shot of a locator module;
FIG. 111 is a screen shot of a locator module;
FIG. 115 is a screen shot of a locator module;
FIG. 120 is a screen shot of a locator module;
FIG. 123 is a screen shot of an Application Wizard;
FIG. 126 is a screen shot of an Application Wizard;
FIG. 128 is a screen shot of an Application Wizard;
FIG. 134 is a screen shot of an Application Wizard;
FIG. 135 is a screen shot of an Application Wizard;
FIG. 139 is a screen shot of a CD Landing Page;
FIG. 146 is a screen shot of a CD Landing Page;
FIGS. 156*a*-156*c* are a screen shot of a CD Landing Page;
FIGS. 157*a*-157*b* are a screen shot of a CD Landing Page;
FIG. 160 is a screen shot of a CD Landing Page;
FIGS. 166*a*-166*b* are a screen shot of a CD Landing Page;
FIGS. 167*a*-167*b* are a screen shot of a CD Landing Page;
FIGS. 172*a*-172*c* are a screen shot of a CD Landing Page;
FIG. 178 is a screen shot of a CD Landing Page.

FIGS. 191a-191d are a screen shot of a VA Landing Page;

FIGS. 197a-197b are a screen shot of Audit History pages;

FIG. 198 is a screen shot of Audit History pages;

FIGS. 199a-199b are a screen shot of a File Directory;

FIGS. 202a-202b are a screen shot of the Domino Directory;

FIGS. 208a-208b are a screen shot of Symphony Templates and Bookmarks;

FIGS. 212a-212b are a screen shot of Symphony Templates and Bookmarks;

FIG. 216 is a screen shot of Mail Descriptions pages;

FIG. 223 is a screen shot of Initial Call Questionnaire pages;

FIGS. 225a-225b are a screen shot of Initial Call Questionnaire pages;

FIGS. 227a-227b are a screen shot of Initial Call Questionnaire pages;

FIG. 236 is a screen shot of Initial Call Questionnaire pages;

FIGS. 246a-246b are a screen shot of SSA Hearing Views pages;

FIG. 247 is a screen shot of SSA Hearing Views pages;

FIG. 249 is a screen shot of SSA Hearing Views pages;

FIG. 253 is a screen shot of SSA Hearing Views pages;

FIG. 258 is a screen shot of SSA Hearing Views pages;

FIGS. 259a-259b are a screen shot of SSA Hearing Views pages;

FIG. 266 is a screen shot of SSA Hearing Views pages;

FIG. 267 is a screen shot of SSA Hearing Views pages;

FIGS. 271*a*-271*b* are a screen shot of SSA Hearing Views pages;

FIGS. 272*a*-272*c* are a screen shot of SSA Hearing Views pages;

FIGS. 273*a*-273*c* are a screen shot of SSA Hearing Views pages;

FIGS. 278*a*-278*b* are a screen shot of SSA Hearing Views pages;

FIGS. 281*a*-281*b* are a screen shot of SSA Hearing Views pages;

FIGS. 283*a*-283*c* are a description of auto-fax instructions;

FIG. 284 is a description of auto-fax instructions;

FIG. 285 is a screen shot of the client portal;

FIG. 289 is a screen shot of the client portal;

DETAILED DESCRIPTION OF THE INVENTION

Figure 1B:
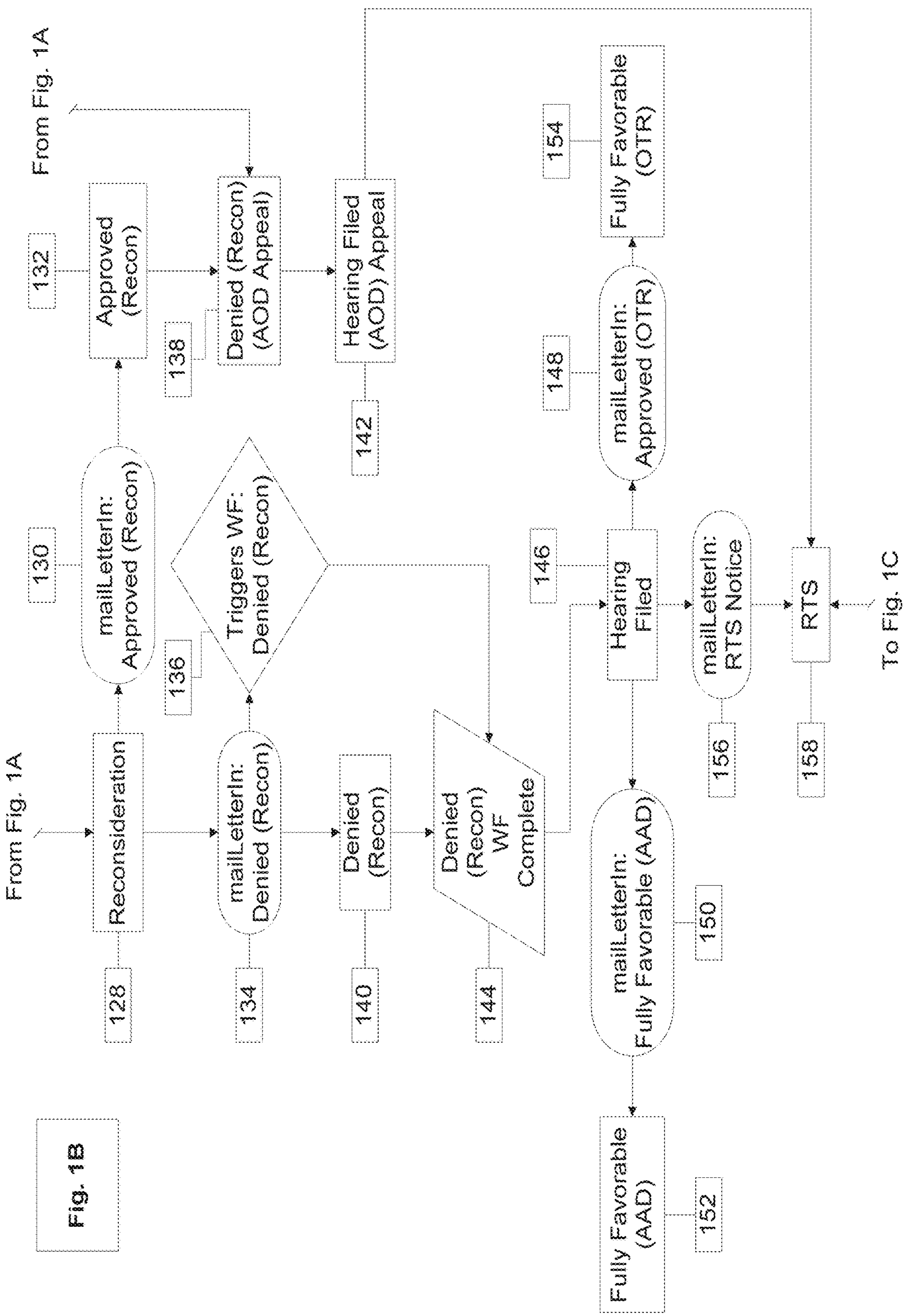

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 282:
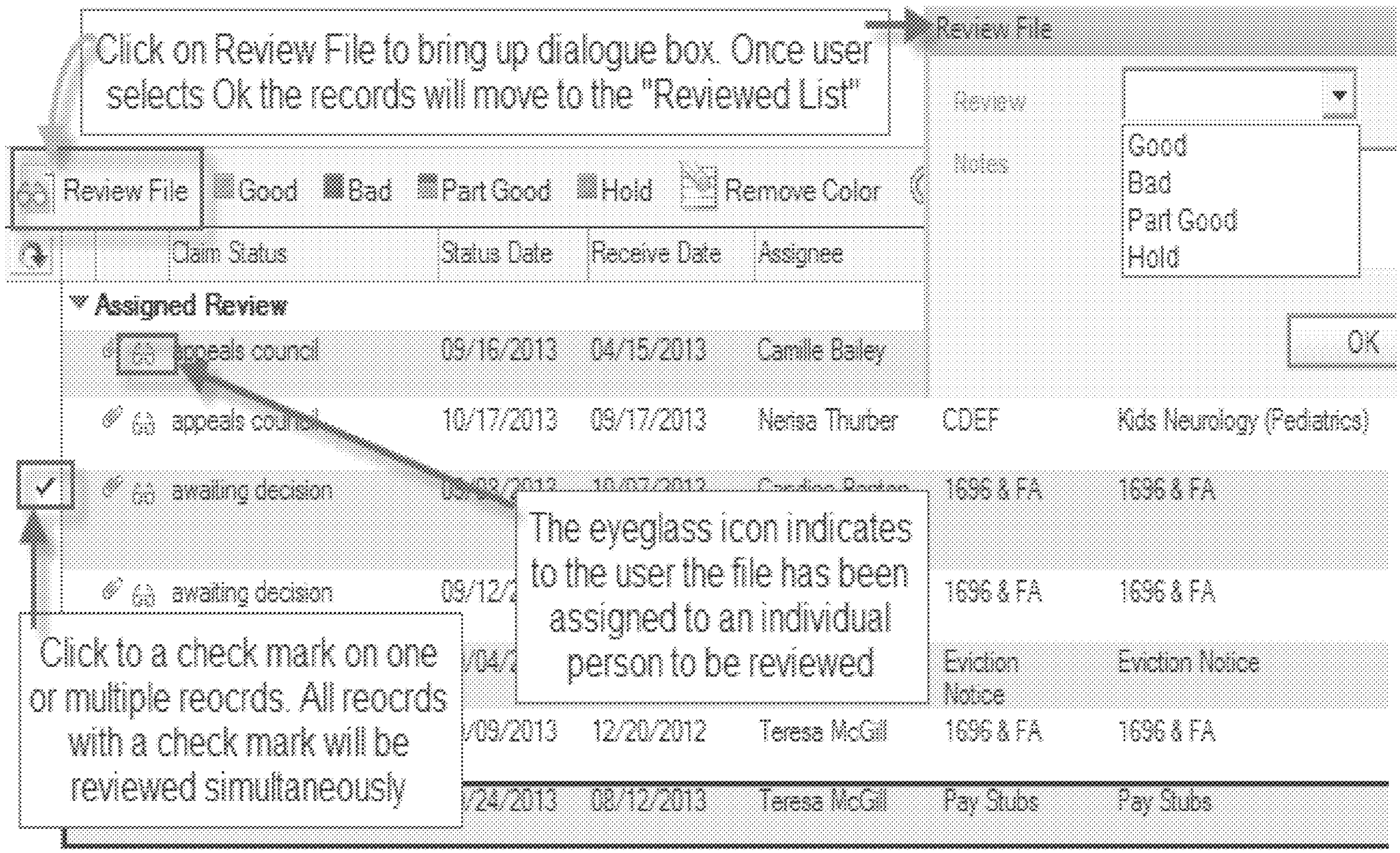
FIG. 282 is a screen shot of SSA Hearing Views pages.
Figure 286:
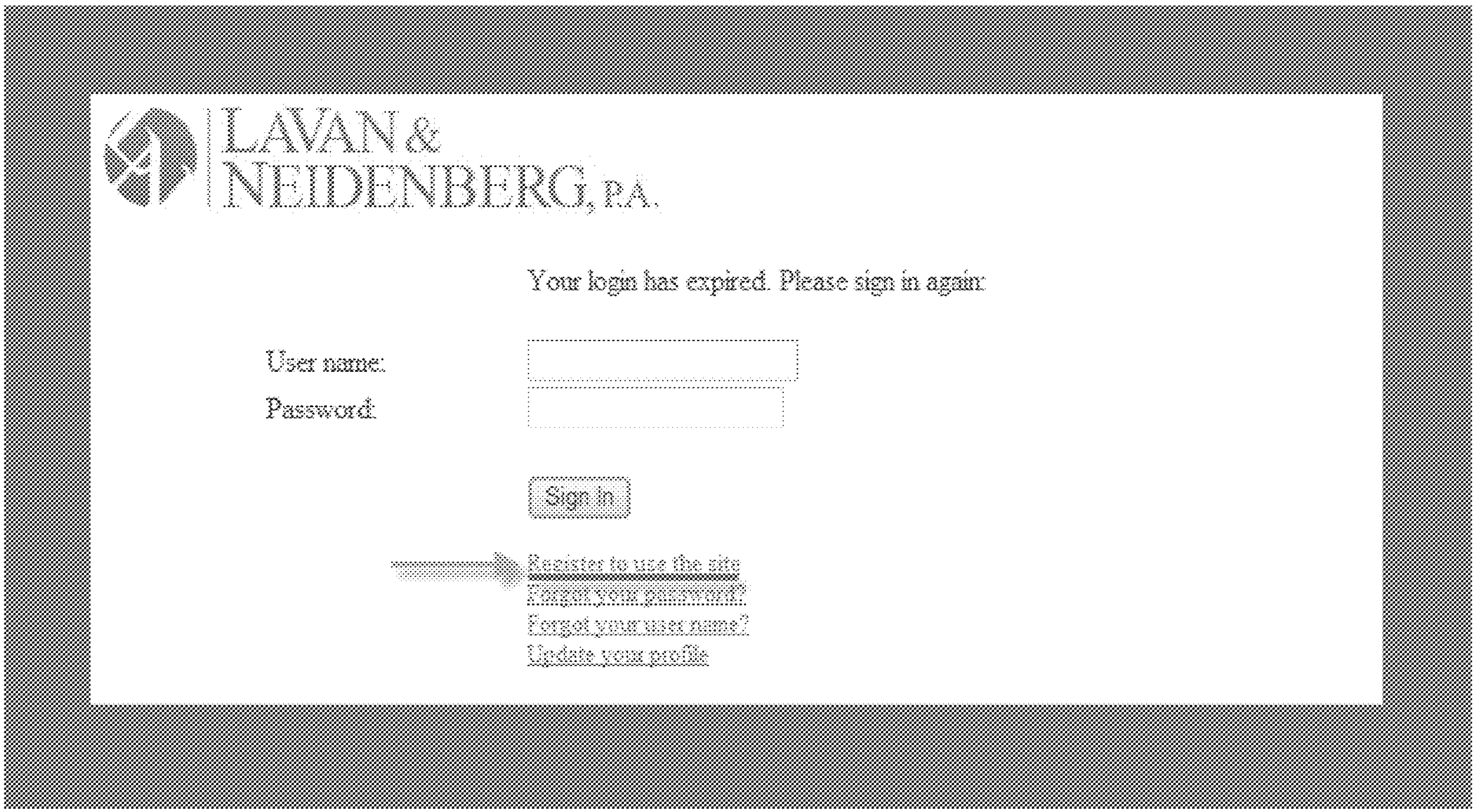
FIG. 286 is a screen shot of the client portal.
Figure 287:
FIG. 287 is a screen shot of the client portal.
Figure 288A:
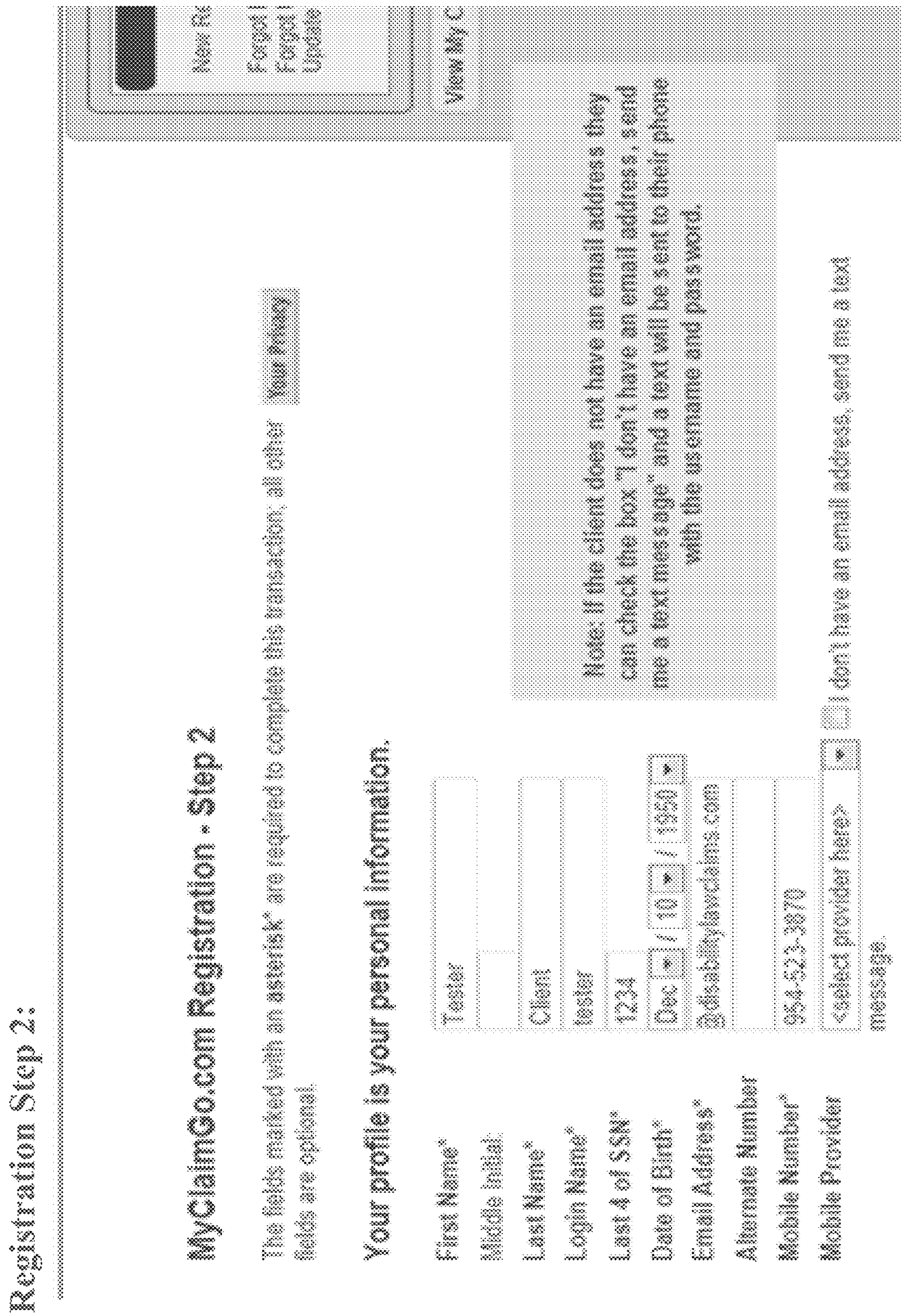
FIGS. 288*a*-288*b* are a screen shot of the client portal.
Figure 288B:
Figure 290:
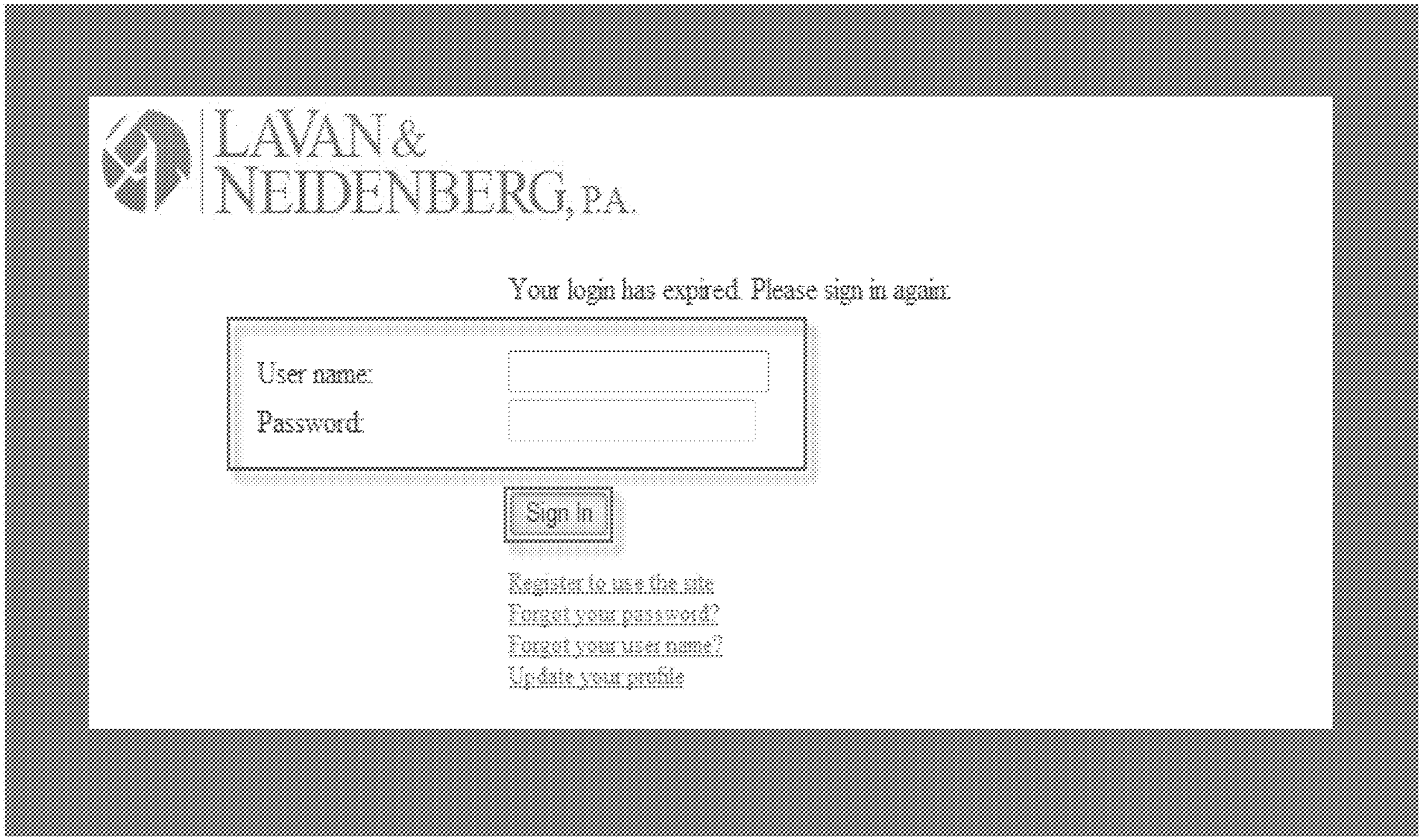
FIG. 290 is a screen shot of the client portal.
Figure 291:
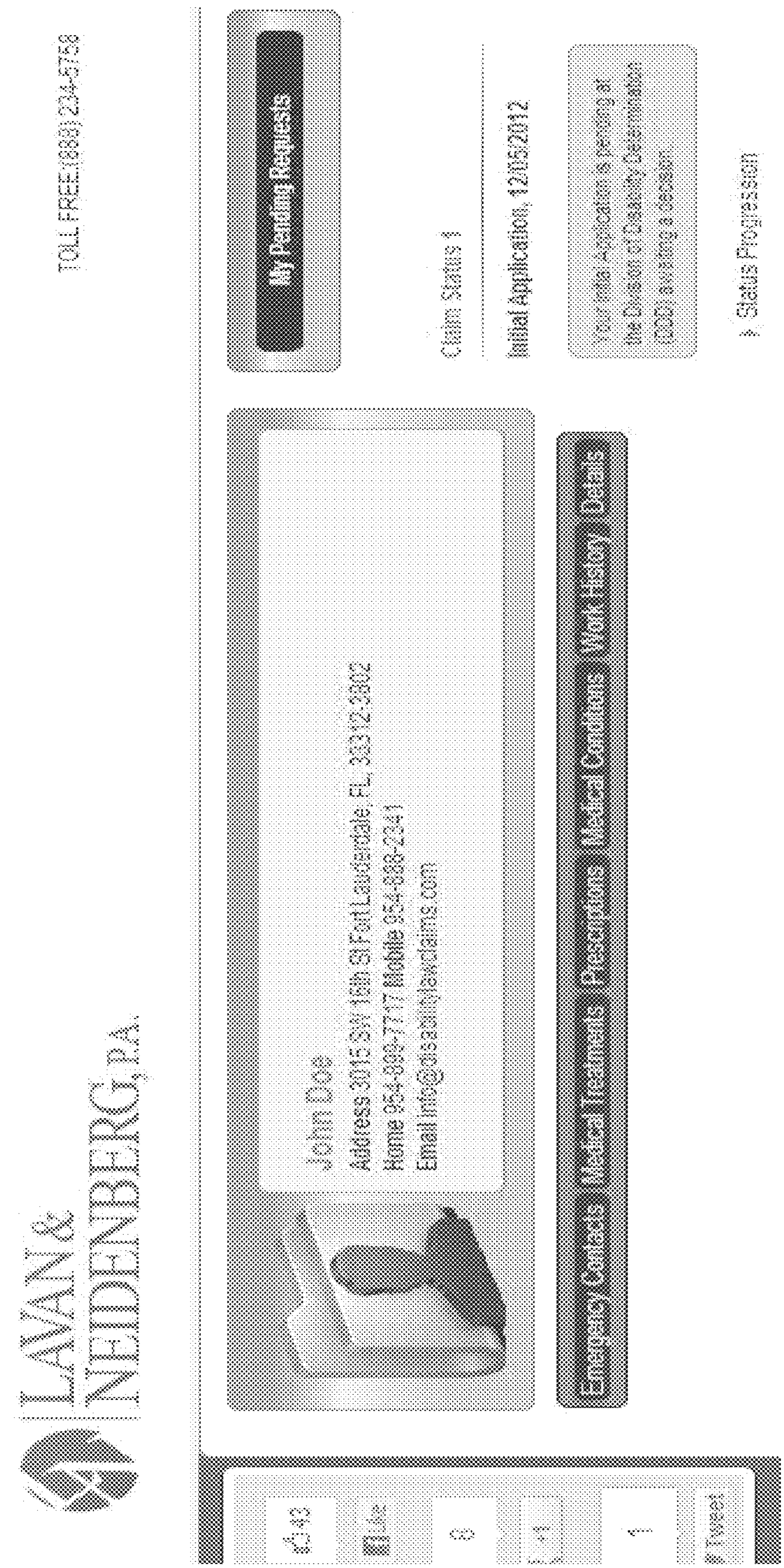
FIG. 291 is a screen shot of the client portal.
Figure 292A:
FIGS. 292*a*-292*b* are a screen shot of the client portal.
Figure 292B:
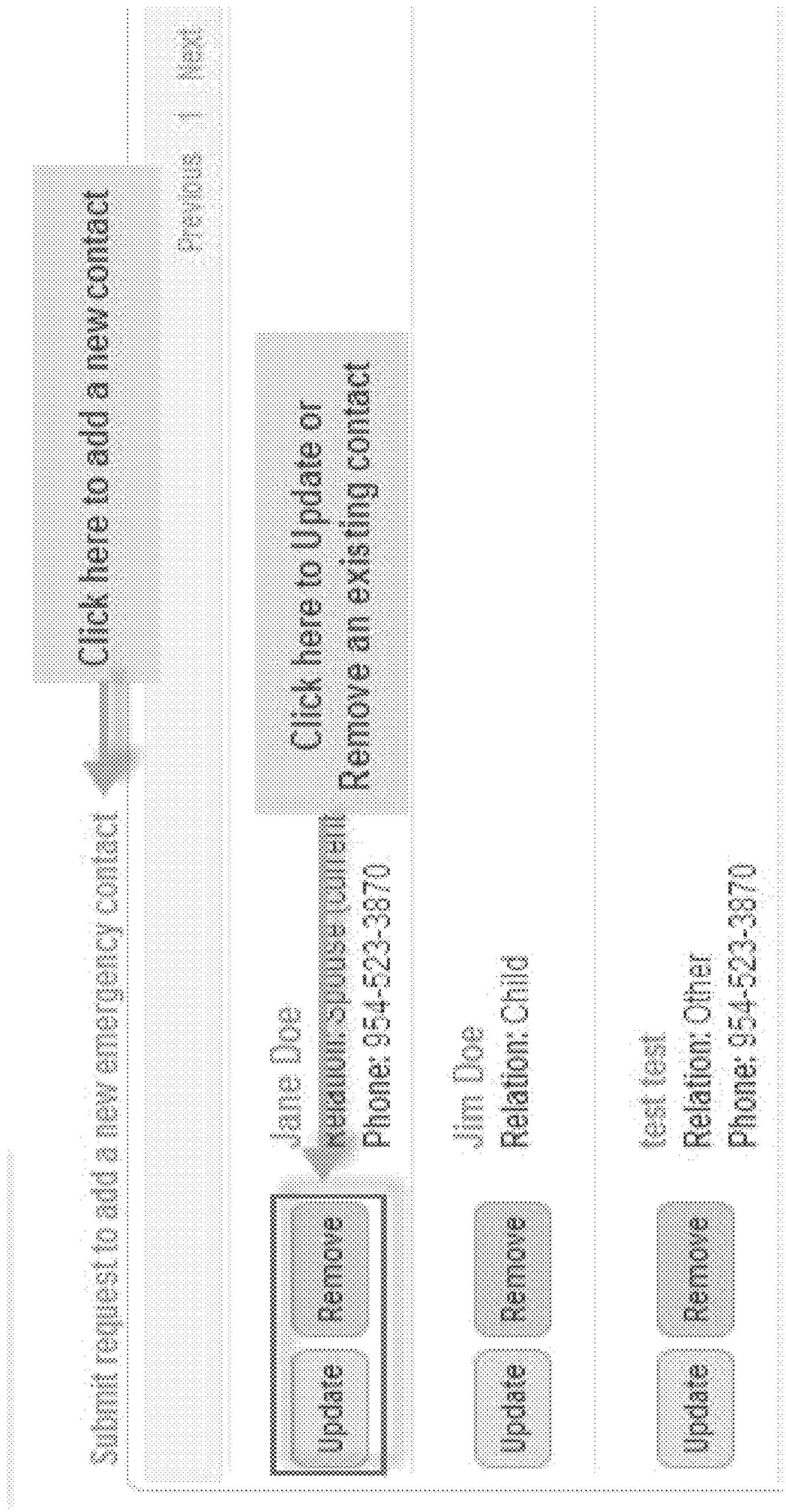
Figure 293:
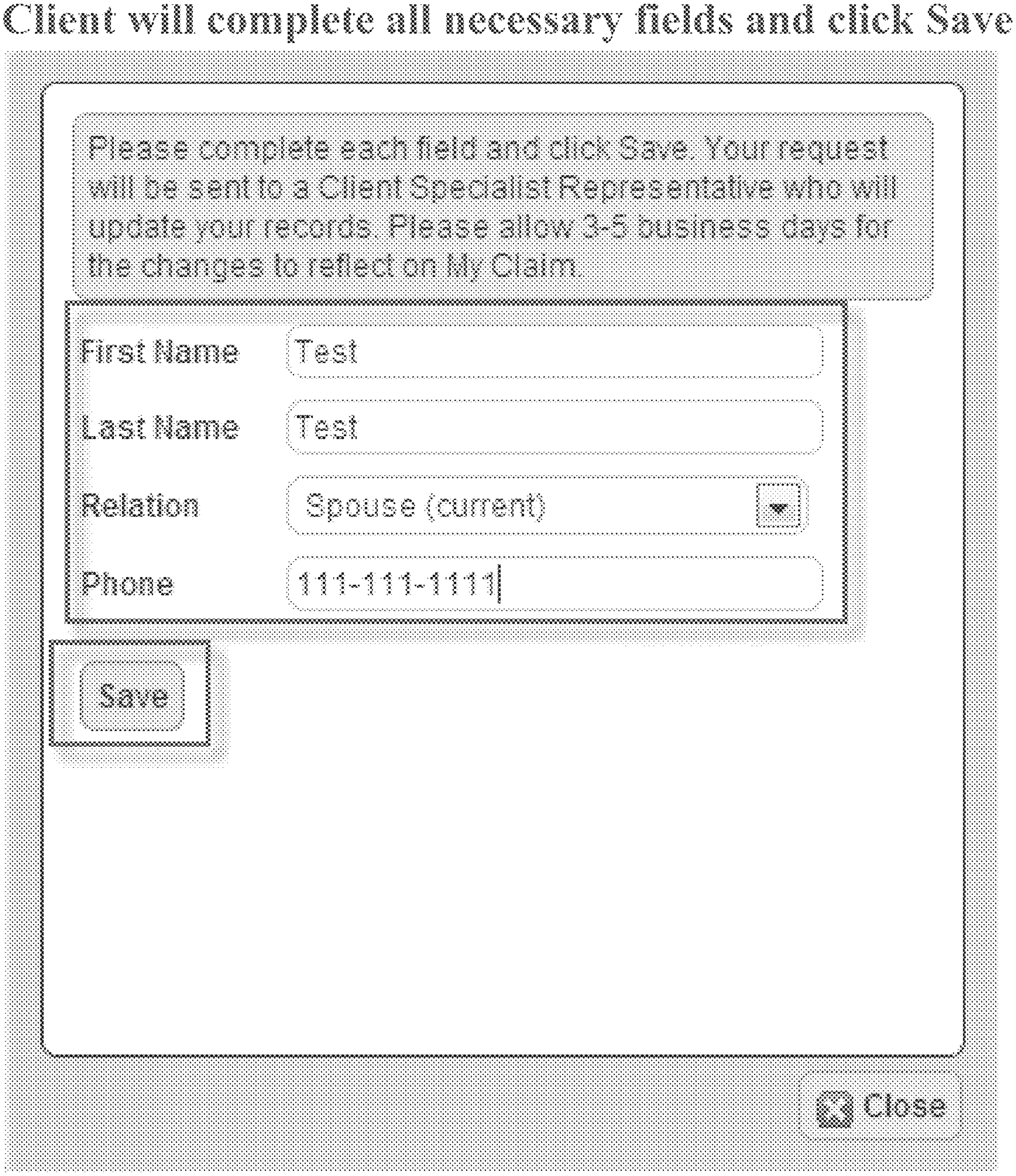
FIG. 293 is a screen shot of the client portal.
Figure 294:
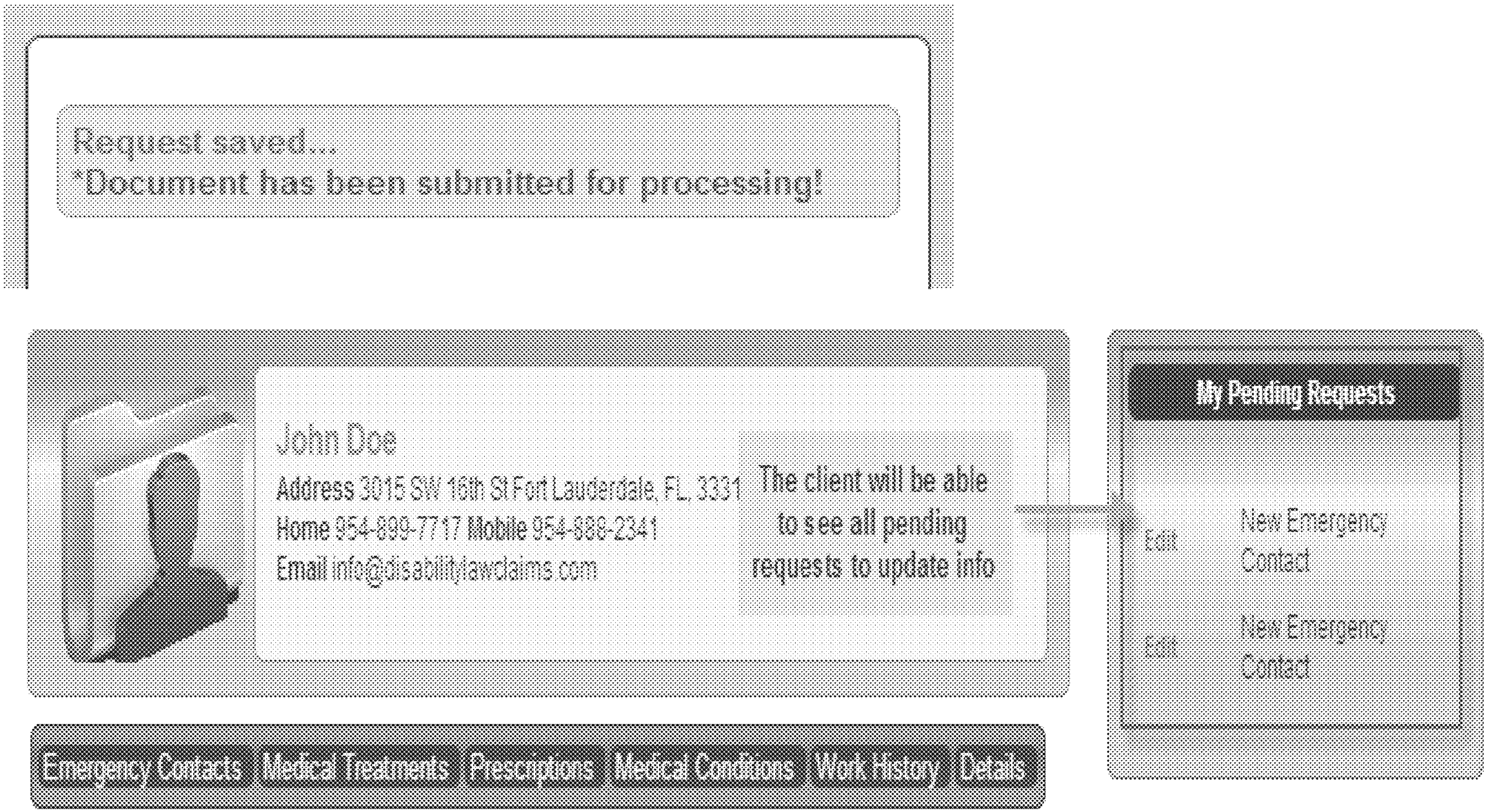
FIG. 294 is a screen shot of the client portal.
Figure 295:
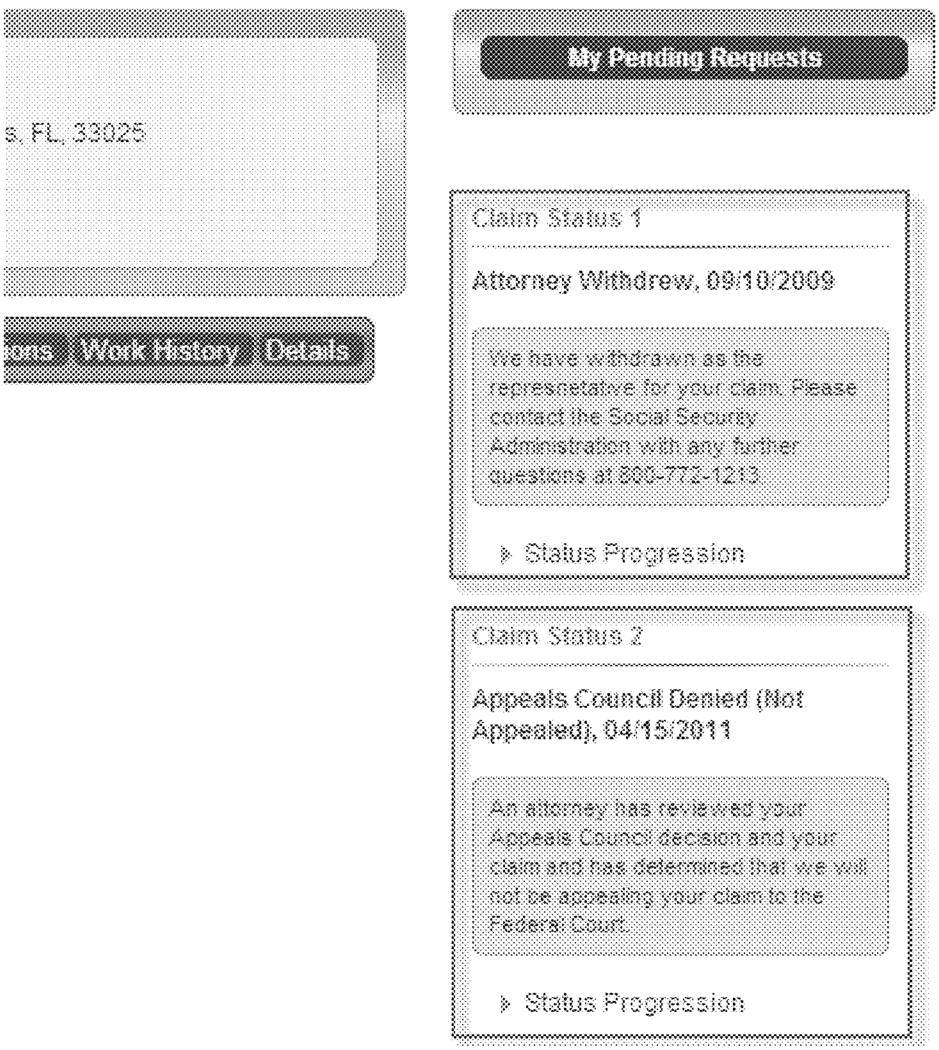
FIG. 295 is a screen shot of the client portal.
Figure 296:
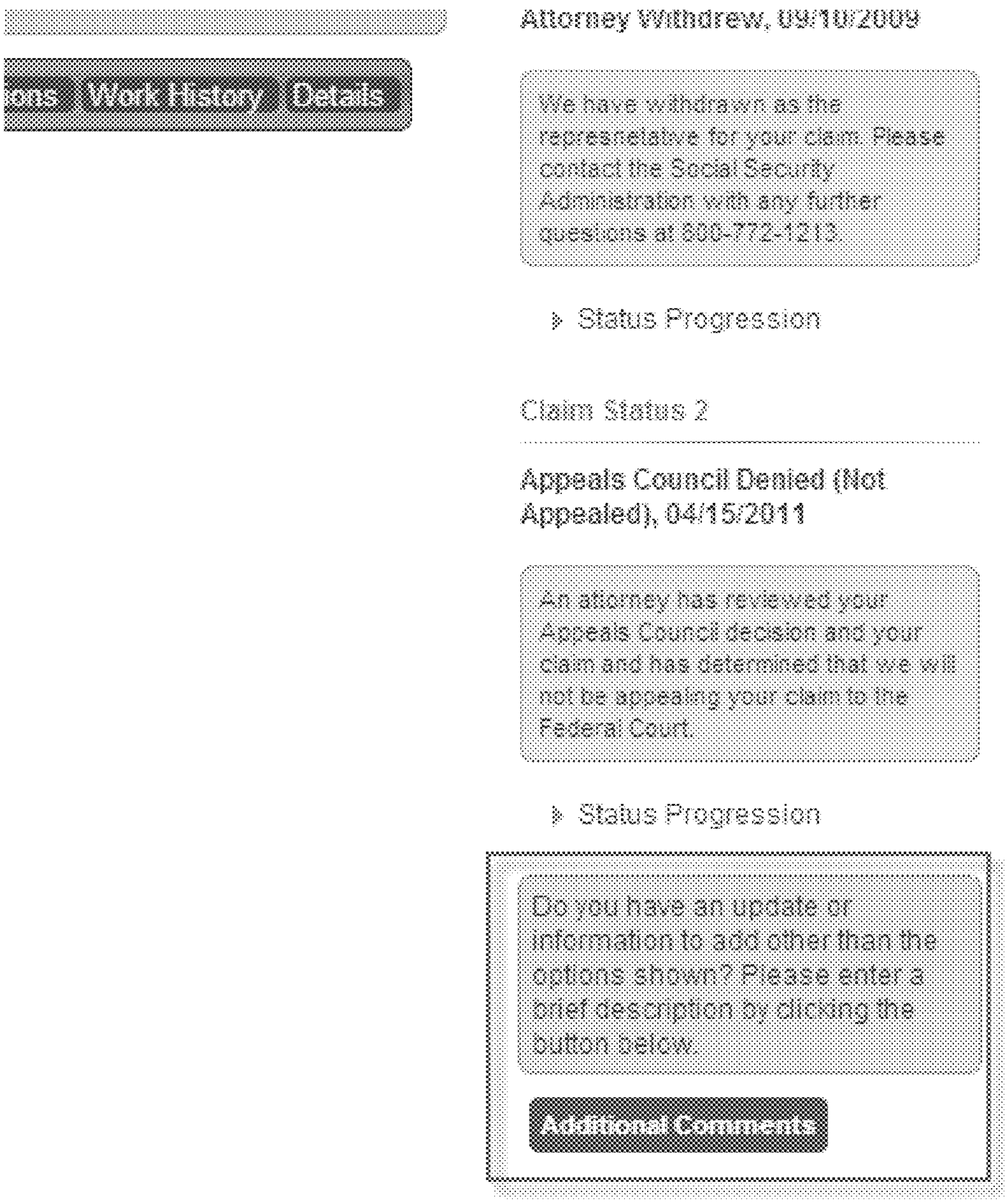
FIG. 296 is a screen shot of the client portal.
Figure 297:
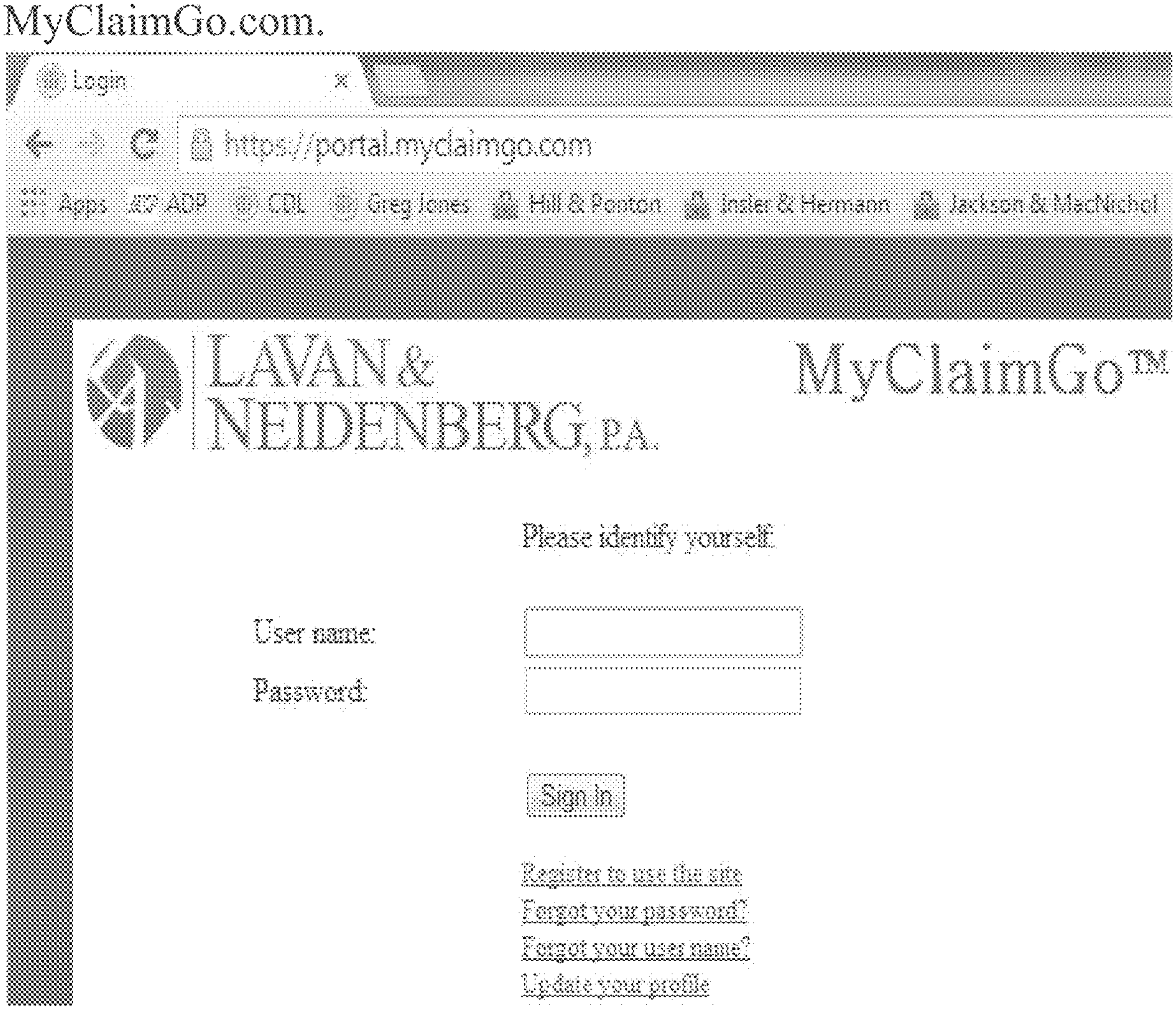
FIG. 297 is a screen shot of the client portal.
Figure 298:
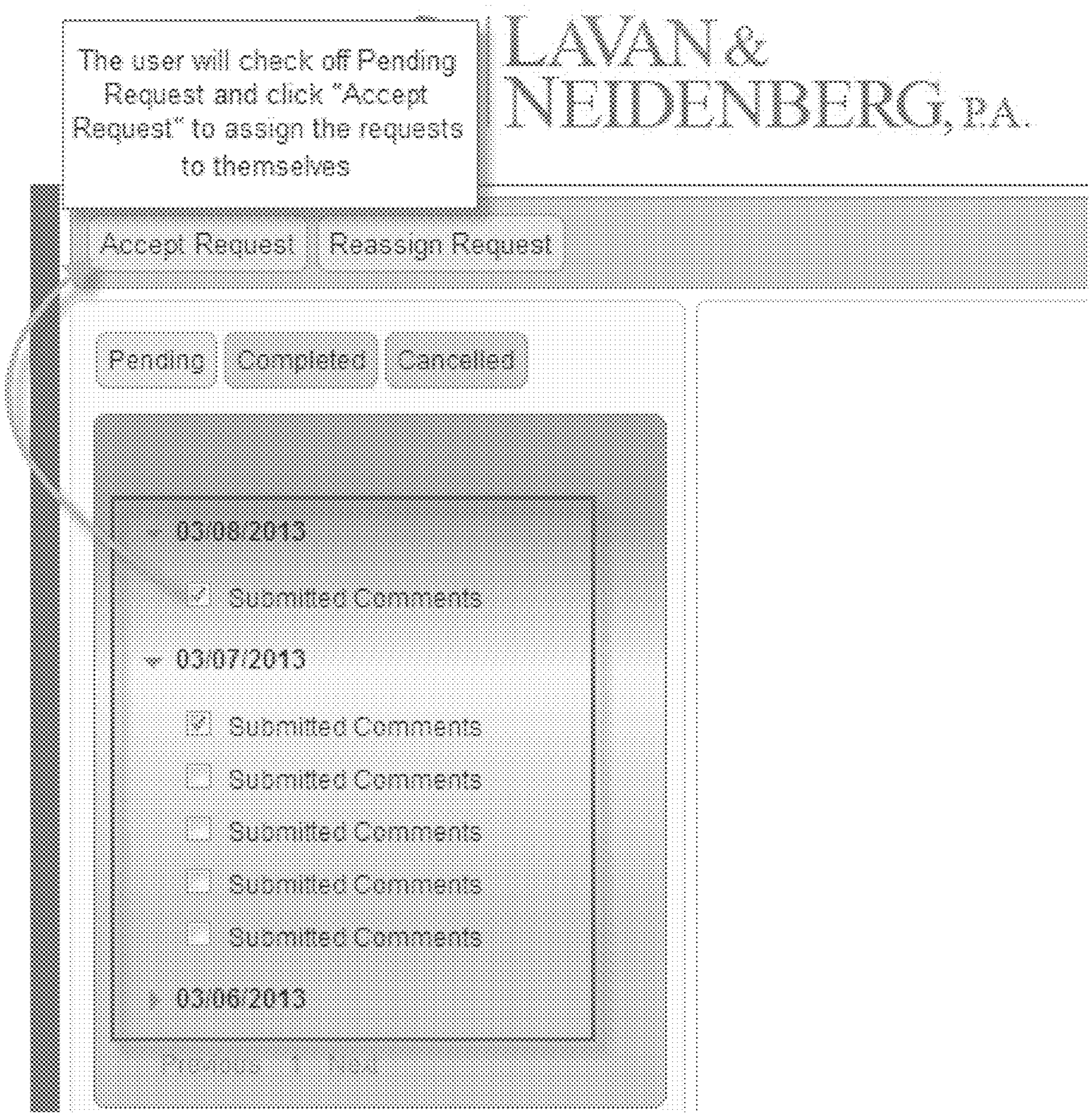
FIG. 298 is a screen shot of the client portal.
Figure 299:
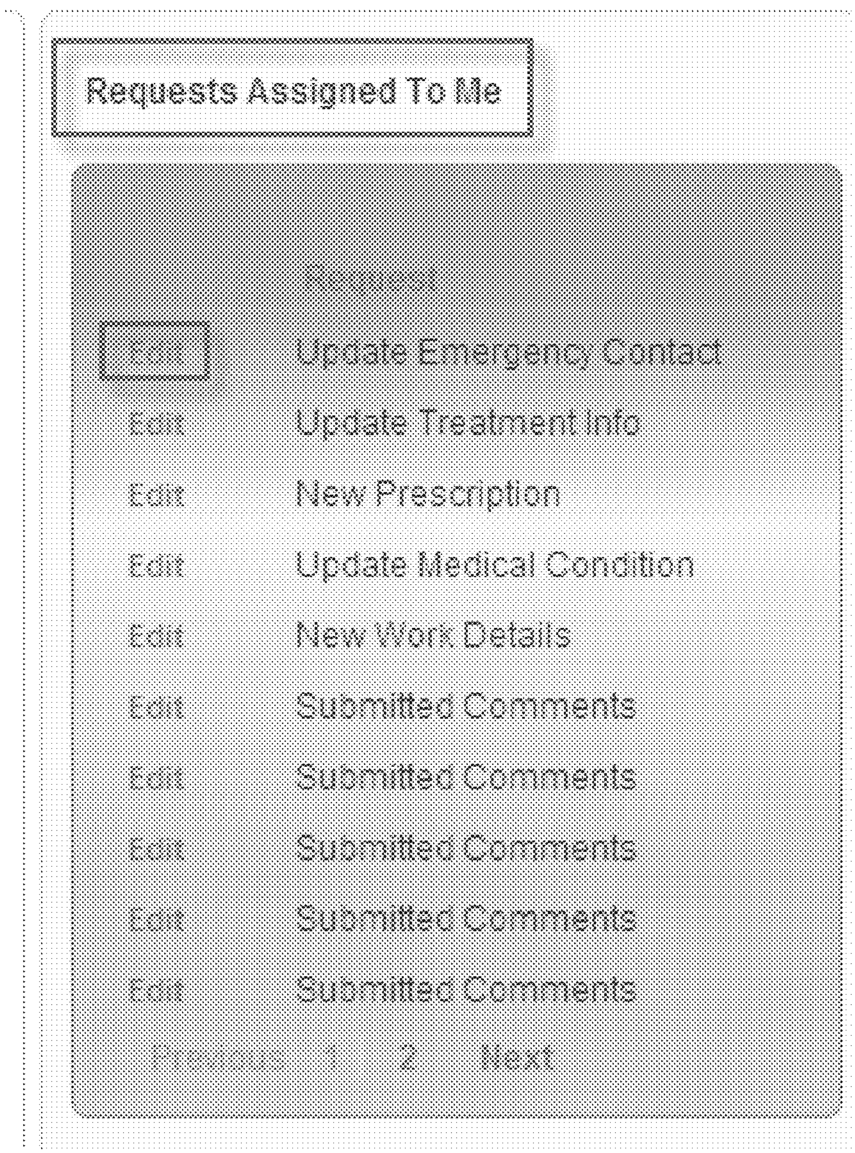
FIG. 299 is a screen shot of the client portal.
Figure 300:
FIG. 300 is a screen shot of the client portal.
Figure 301:
FIG. 301 is a screen shot of the client portal.

FIGS. 1-282, which are now referenced, illustrate the present invention and the manner in which it is performed.

Referring to FIGS. 1A-1F is shown a general method of claim progression relating to social security disability. The instant invention is portable across other areas of law and also to other industries. For example, this method of claim progression is useful for insurance benefit claims and other administrative proceedings.

The claim process administration begins at step 100, which defines a process by which client leads are generated. The client leads are generated through traditional and modern means including television, internet and social networking advertising and marketing. The client leads are received into a software suite. The flow charts FIGS. 1A and 1B illustrate the path that a claim for a benefit from a government agency will take according to the present invention. In a preferred embodiment a claim for a benefit from the Social Security Administration is described. It should be noted that other claims for other benefits and services from other that the government can also be obtained utilizing the present invention.

A determination is made at step 102 if an individual needs to file a claim for a benefit. At step 104 the response triggers a work flow for the initial application for benefits. At step 106 the initial application work flow is complete and the application is produced and/or the application data is filled in/populated automatically. This procedure depends on the manner in which the system is set up and the specific software that the system is utilizing. The application is then filed with the specific government agency, in the preferred embodiment, the Social Security Administration. At step 108 a determination is made to accept or reject the benefit claim at the government agency. If the benefit claim is accepted at step 110 a letter indicating this acceptance is sent to the individual or firm who submitted the benefit claim application. At step 112 the status that the claim has been approved is indicated.

Should the claim be denied, an AOD appeal is initiated at step 118. Additionally, a reconsideration request is initiated at step 122. At step 126 the reconsideration of the claim denial is filed. Next, the process goes to step 138 where it is joined with another type of claim denial appeal prior to filing for a hearing at step 142.

If there is a letter from the government administration, such as the Social Security Administration, denying the benefits from the initial filing of the application for benefits, then a letter is mailed at step 114. This letter can trigger specific work flows relating to the denial at step 116. Alternatively, there is a procedure relating to the denial that occurs at step 120. Subsequent to steps 120 and 116 the work flow is complete at step 124. If the individual and/or law firm decides to go back to the agency for reconsideration of the agency's denial of benefits, the process then proceeds to step 128. Here the reconsideration process and work flow related to the reconsideration process begins.

Next, there will be a letter from the Social Security Administration approving the reconsideration request 130 or denying the reconsideration request 134. When the reconsideration request is approved the process moves to 132 where the reconsideration takes place. If the reconsideration is denied, an AOD appeal is next at 138. The hearing for the AOD appeal takes place at 142.

After receiving the reconsideration request denial letter from the Social Security Administration a specific work flow is triggered at 136 regarding the denial. Alternatively, the denial proceeds to step 140 then onto step 144 where the work flow is complete. Also, from 136 the process proceeds to step 144. Next, a hearing is filed at 146. There can be three results of the filing. First, the hearing is fully favorable to the individual/law firm and a letter is sent to the individual/law firm from the Social Security Administration (SSA). The process ends with a fully favorable reconsideration of the benefit request at 152. Second, a letter is send from the SSA approving an OTR at 148. The process ends here with a fully favorable reconsideration of the benefit request at 154. Finally, a letter form the SSA is mailed with an RTS notice at 158.

The following steps are found in FIG. 1B. Next, a letter from the SSA is mailed regarding the hearing notice at 160. From here either there is a scheduled hearing at 162 or a scheduled hearing at 170. From both 162 and 170 there is a post hearing at 174. The next step is awaiting a decision at 176. There can be three results from the decision. First, a letter from the SSA is mailed which is fully favorable at 178. Then at step 180 the fully favorable decision is recorded. Next, at 172, there is a letter from the SSA indicating a remand where the A/C overturns the FF. From here there is a fully favorable decision at 168 and a letter from the SSA is mailed at 166. The process then proceeds to 164 where there is a RTS, the A/C overturns the FF. The process then proceeds back to step 160. Second, there is a letter from the SSA indicating a partially favorable decision from the hearing at 186. This letter triggers certain work flow at 188 and then proceeds to 196 where the work flow regarding a partially favorable decision is complete. From step 186 there is a partially favorable hearing at 192. Then the process proceeds to step 196. Finally, there is a letter from the SSA indicating that the decision is unfavorable at 184. This letter triggers specific work flow at 182 and this workflow proceeds to an assessment of the unfavorable decision at 194. From 184 the process can proceed to 190 where assessment of the unfavorable decision starts.

From step 194 there can be three results. First, at 198 a new application is filed. Second, at 202 a decision is made to not pursue any further action at 202. Finally, at 200 a decision is made to appeal the unfavorable decision. The next step is the appeals council at 214. From step 196 there can be two results. First, there is no appeal of the partially favorable decision at 206. Second, a decision is made to appeal the partially favorable decision at 204. After the decision at 204 the process proceeds to the appeal council at 214.

From the decision of appeal council the process can proceed in one of 4 different ways. First, at 208 there is a letter from the SSA that the appeal was successful at 208 and the process concludes at 220. Second, there is a letter from the SSA remanding the appeal at 210. The process proceeds to step 222 and then to step 230 where a letter from the SSA contains a RTS notice. Next, at step 234 there is a letter from the SSA containing the hearing notice. Then the hearing is scheduled at 236 and the process returns to step 170. Third, there is a letter from the SSA dismissing the appeal at 218. This letter triggers work flow at 212 which concludes at 244 where the dismissal can proceed in one of two ways. After step 218 the process can proceed to step 224 where the A/C is dismissed. Fourth, there is a letter from the SSA denying the appeal at 220. As a result of this letter, the process can proceed to either of steps 216 or 228.

At step 216 there are triggers for work flow to come to a final decision that there will be no further appeal. At step 228 there are triggers for work flow to come to a decision that there will be a further appeal. At step 246 there is assessment to see if the work flow is complete. From step 246 there can be a denial decision at 248 at the Federal level. There can also be a denial decision at step 250. From step 248 the process proceeds to step 252 which is the Federal level. From here there are two outcomes. First, there is a letter from the SSA denying the appeal at step 254. Second, there is a letter from the SSA granting the benefit and this decision is published as a final order at 256.

There can also be a remand of the decision at the Federal level at step 262. From here the process proceeds to step 238 where a letter from the SSA indicates a RTS notice. Next, there is a RTS (Federal Remand) step 240. Then, at step 242 there is a letter from the SSA containing a notice of the hearing. The hearing is scheduled at step 260 and the process proceeds back to step 170.

Figure 1C:
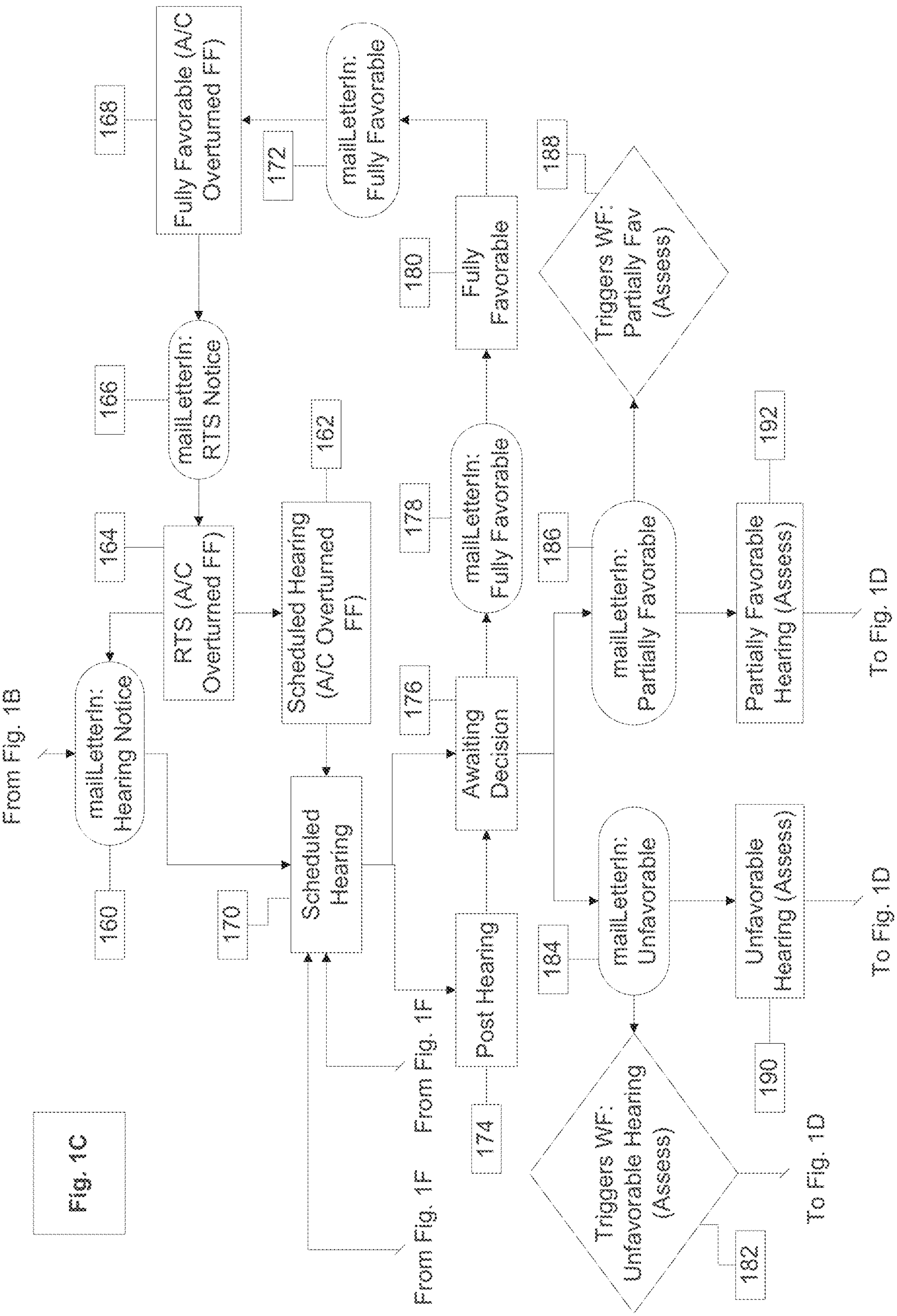
Figure 1F:
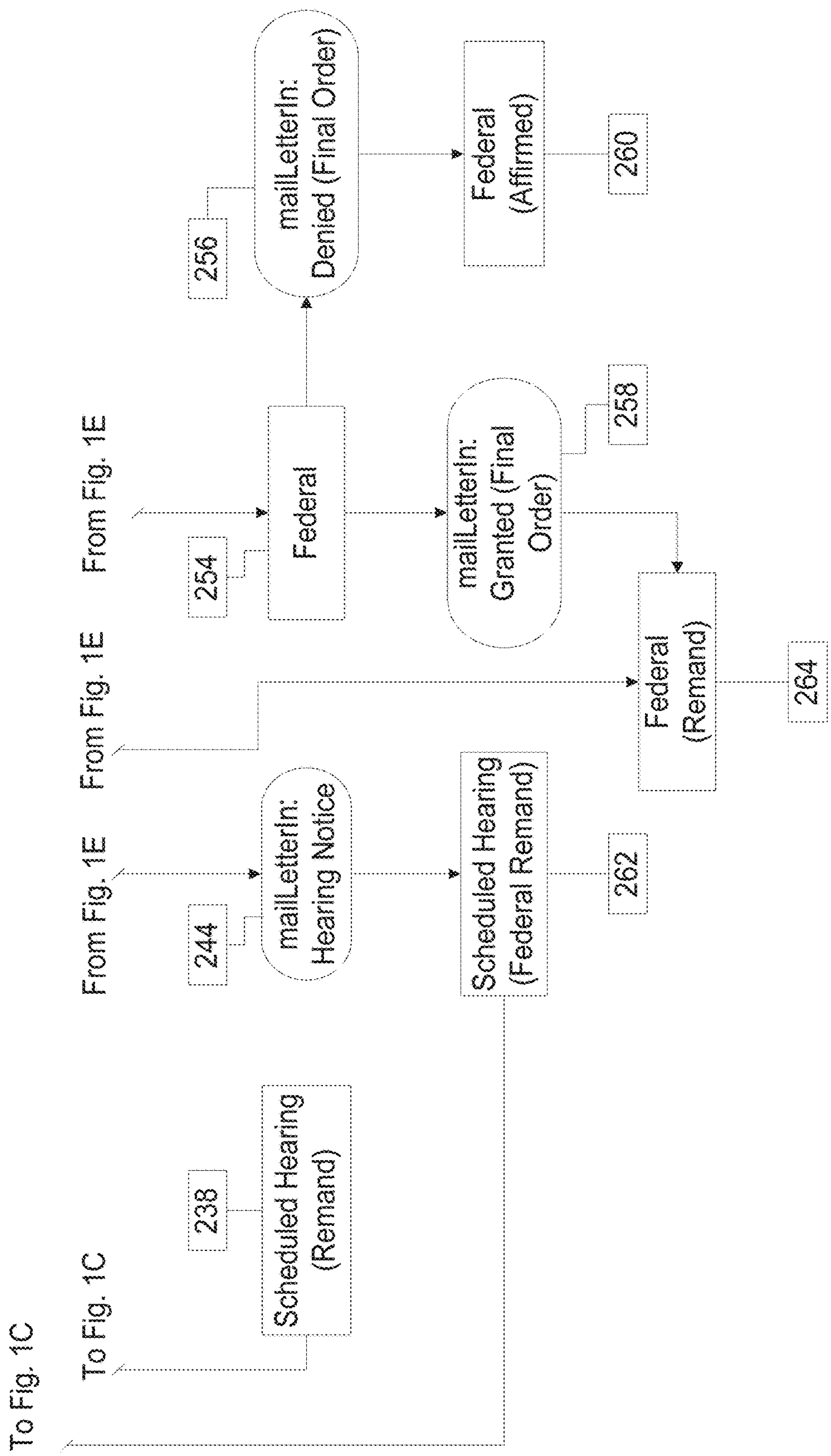

Referring to FIG. 1C, a simplified flow chart is provided depicting the computer driven systematic method of populating social security claim forms comprising the steps of: providing a series of on-line contact information questions to a claimant 280 where the claimant enters contact information. The answers provide by the claimant are compared against a database 282 to determine a service track for the claimant by determining which government benefit programs the claimant is eligible for. The method determines if the claimant has a valid claim for Social Security Disability Insurance (SSDI) 284, Supplemental Security Income (SSI) 286, or veterans disability 288 based upon questions selected from said service track. The claimant is then directed through appropriate through appropriate questions and sequences based on answers and valid claim 290 and provides the appropriate questions to determine medical qualifies 292, financial qualifiers 294 and claim status qualifiers 296. A determination is then made if the claimant can be evaluated for a Disability claim 298 wherein the claimant is directed to a processing stage 300 and an inquiry is made to determine if the intake review is complete 302. If the intake review is incomplete the intake is denied 304, if the intake review is complete the intake is accepted 306 based on the claimant's medical history and determining that the claimant has a valid claim for benefits. The documents are generated for a mobile representative or mailed upon assigning 308 a Social Security District Office by zip code. Representation forms are populated for the claimant to sign 310 and the forms are submitted to the assigned Social Security District Office when appropriate 312. If the claim status fails, the claim does not need to be filed. A further review of the intake review is performed and status still indicates fail, the intake is denied. If the further review of the intake review is performed and status indicates accepted 306', the claimant is passed to document preparation 308'.

Figure 2:
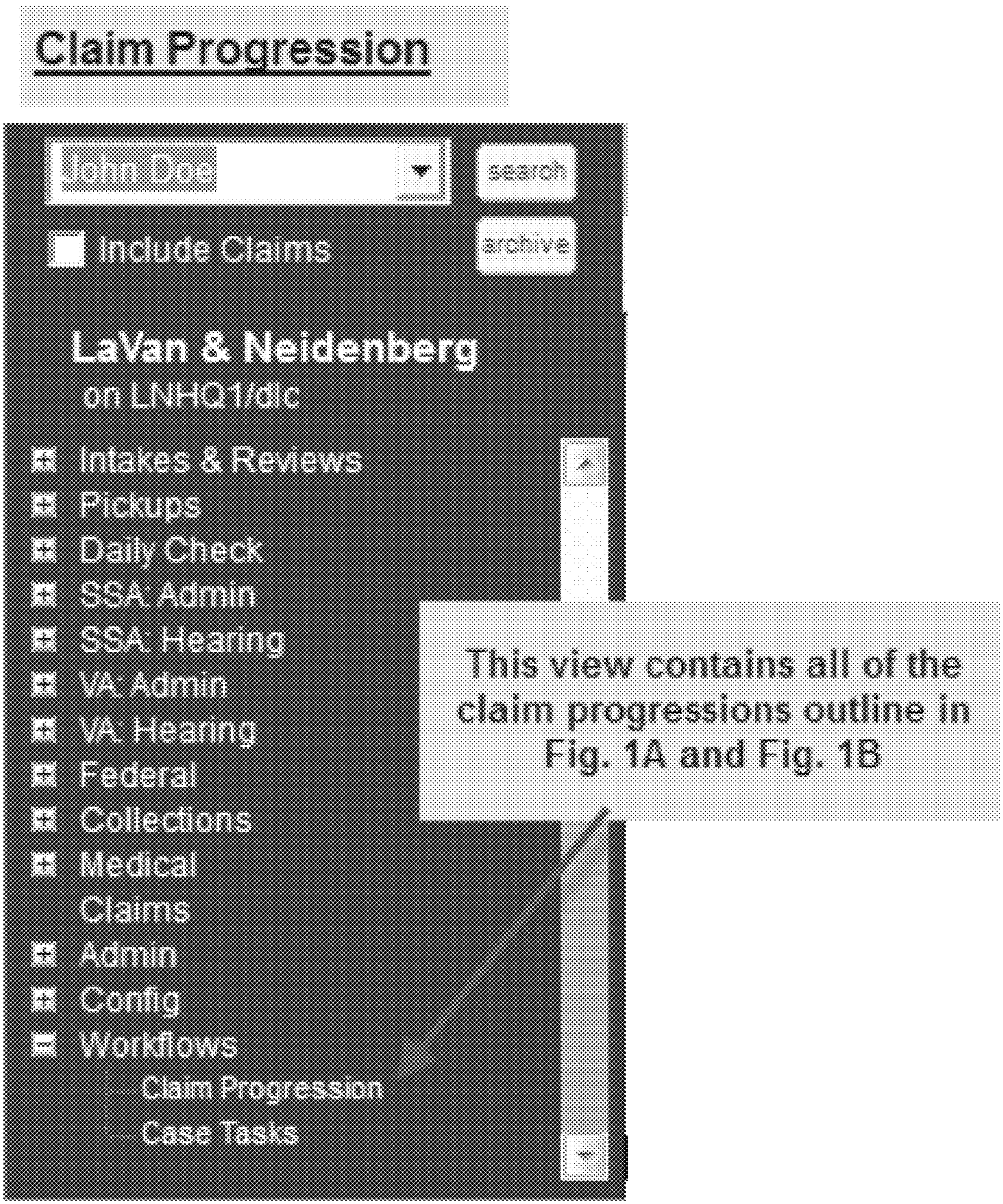
FIG. 2 is a claim progression view.
Figure 3:
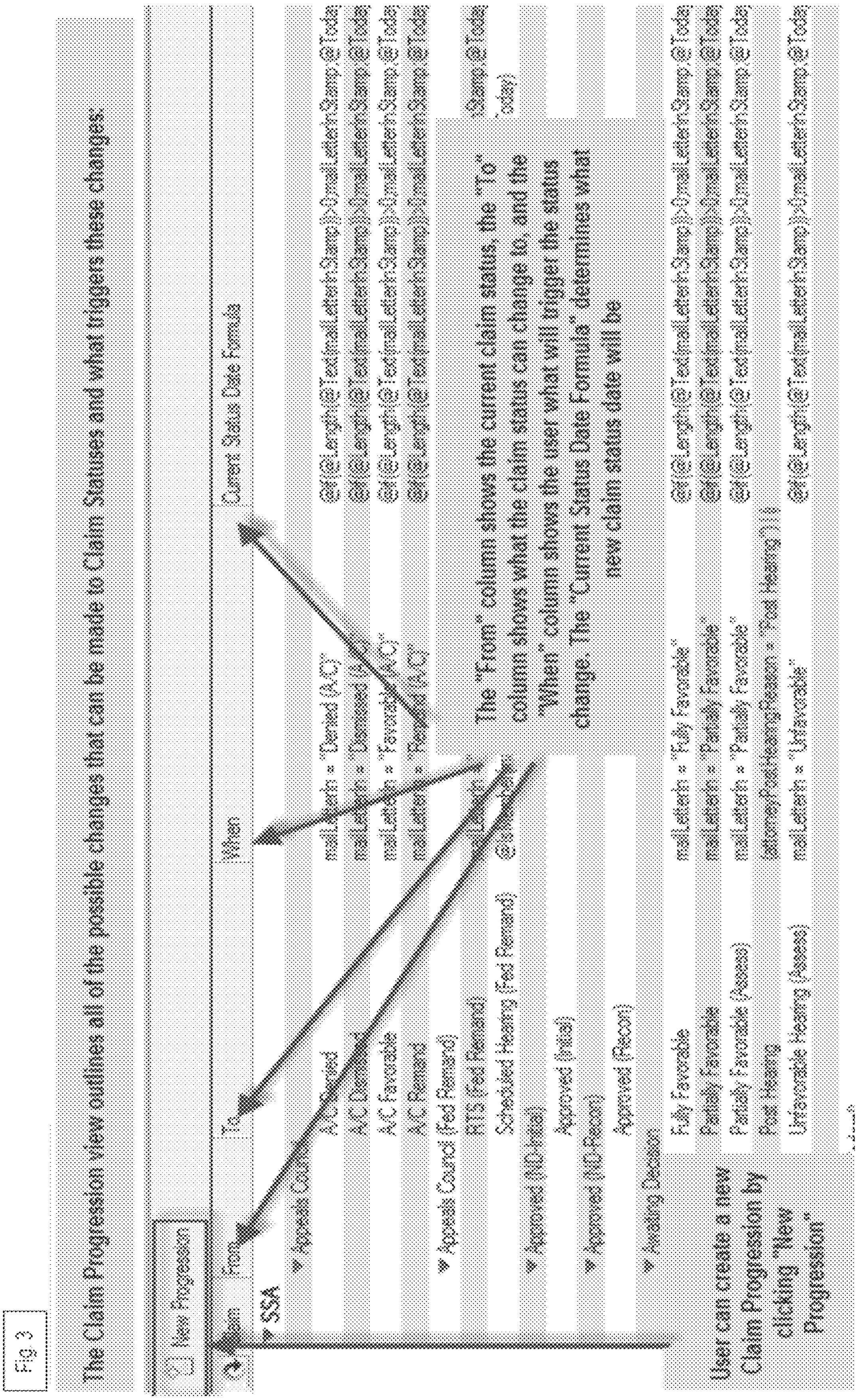
FIG. 3 is a screen shot of a claim progression view.
Figure 4:
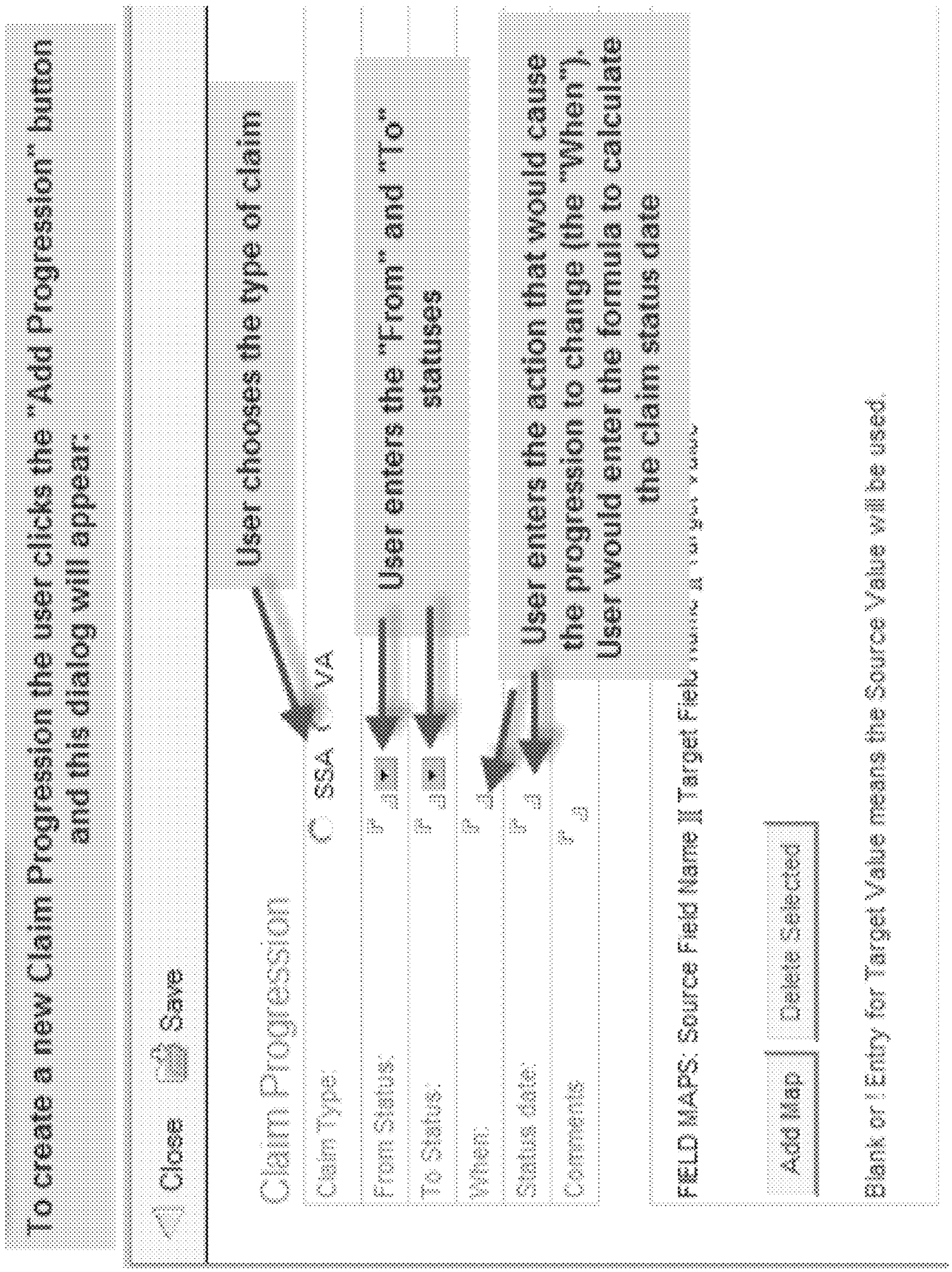
FIG. 4 is a screen shot of a claim progression view.
Figure 6:
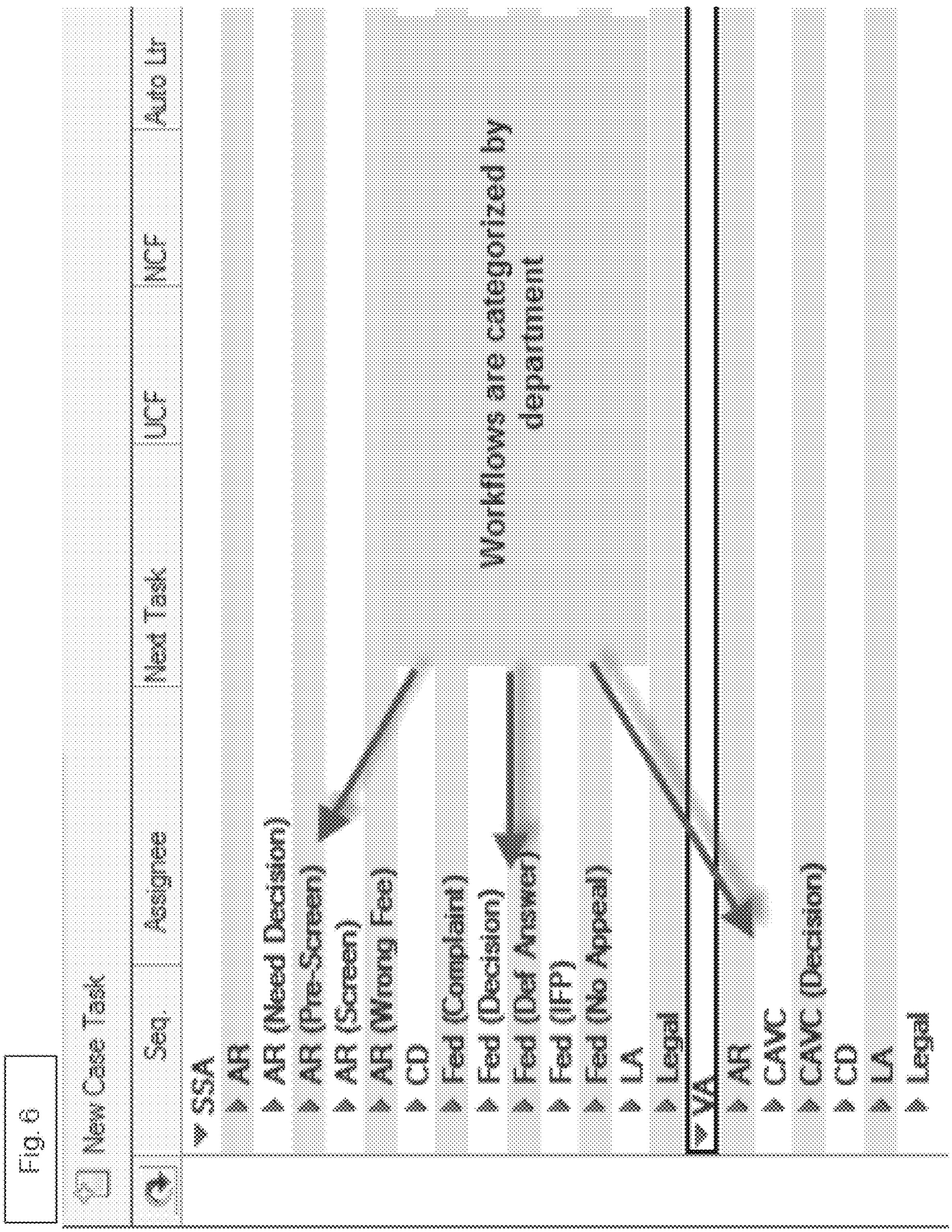
FIG. 6 is a screen shot of a workflow view.
Figure 7:
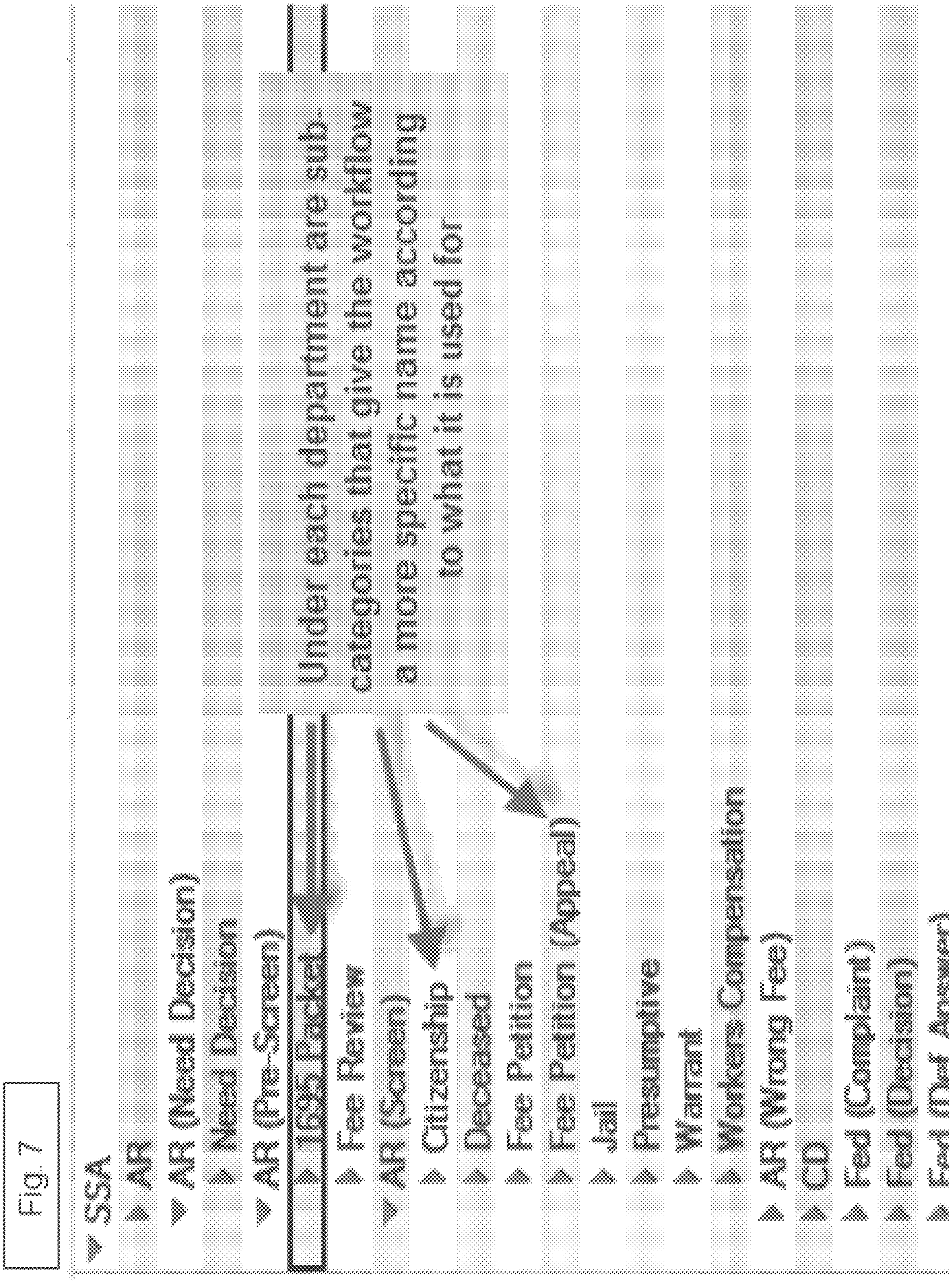
FIG. 7 is a screen shot of a workflow view.
Figure 8:
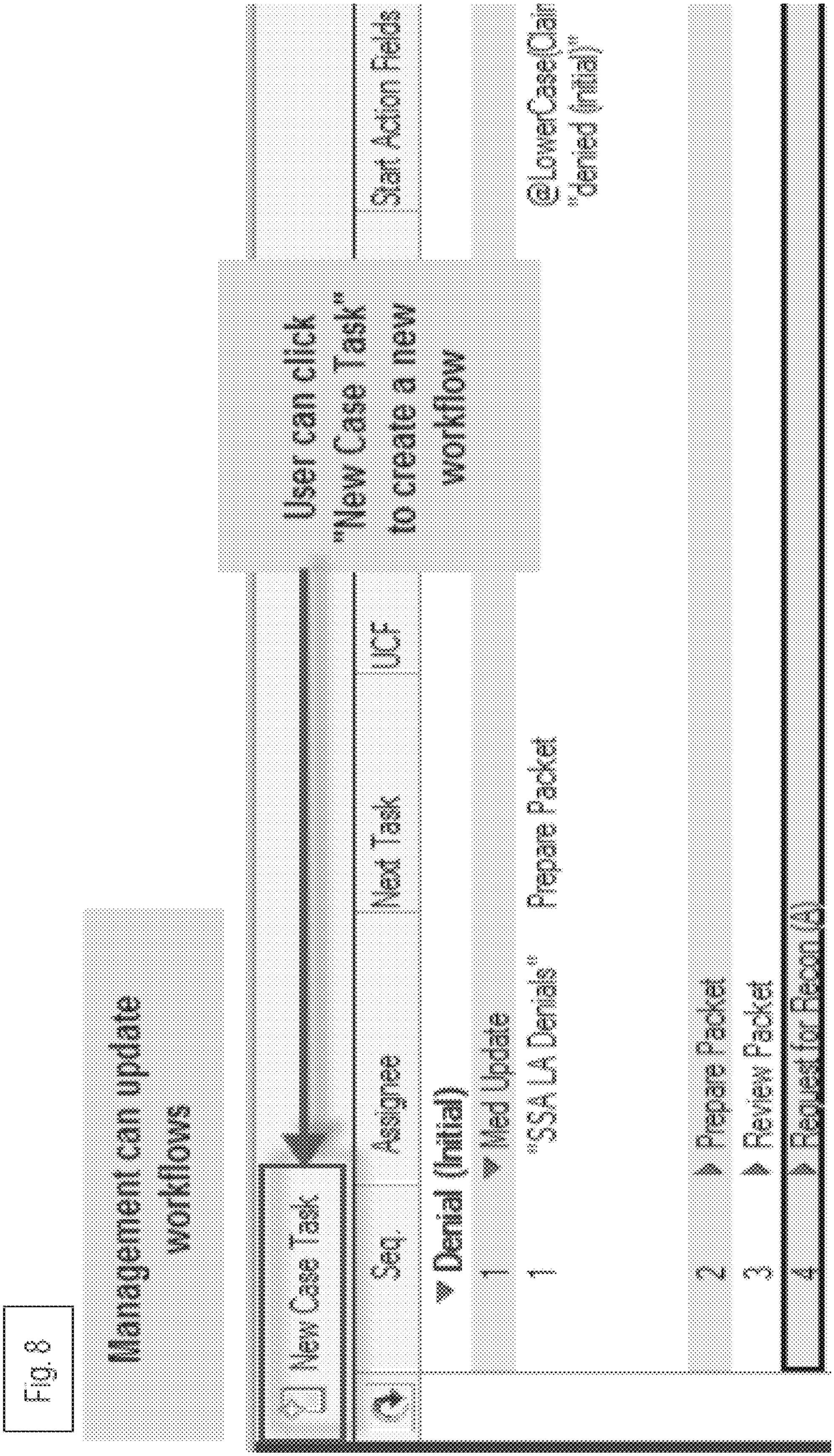
FIG. 8 is a screen shot of a workflow view.
Figure 9:
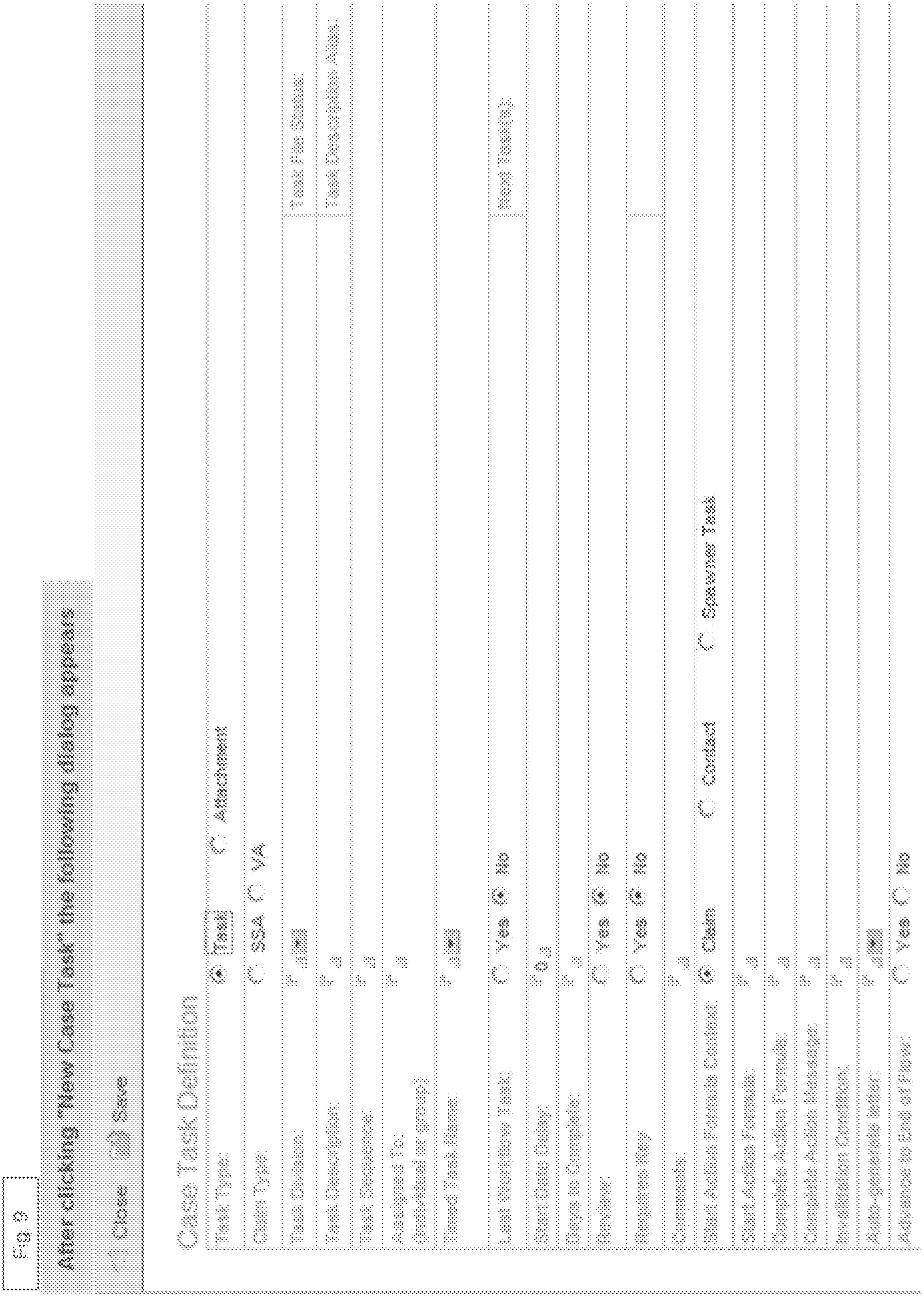
FIG. 9 is a screen shot of a workflow view.
Figure 10:
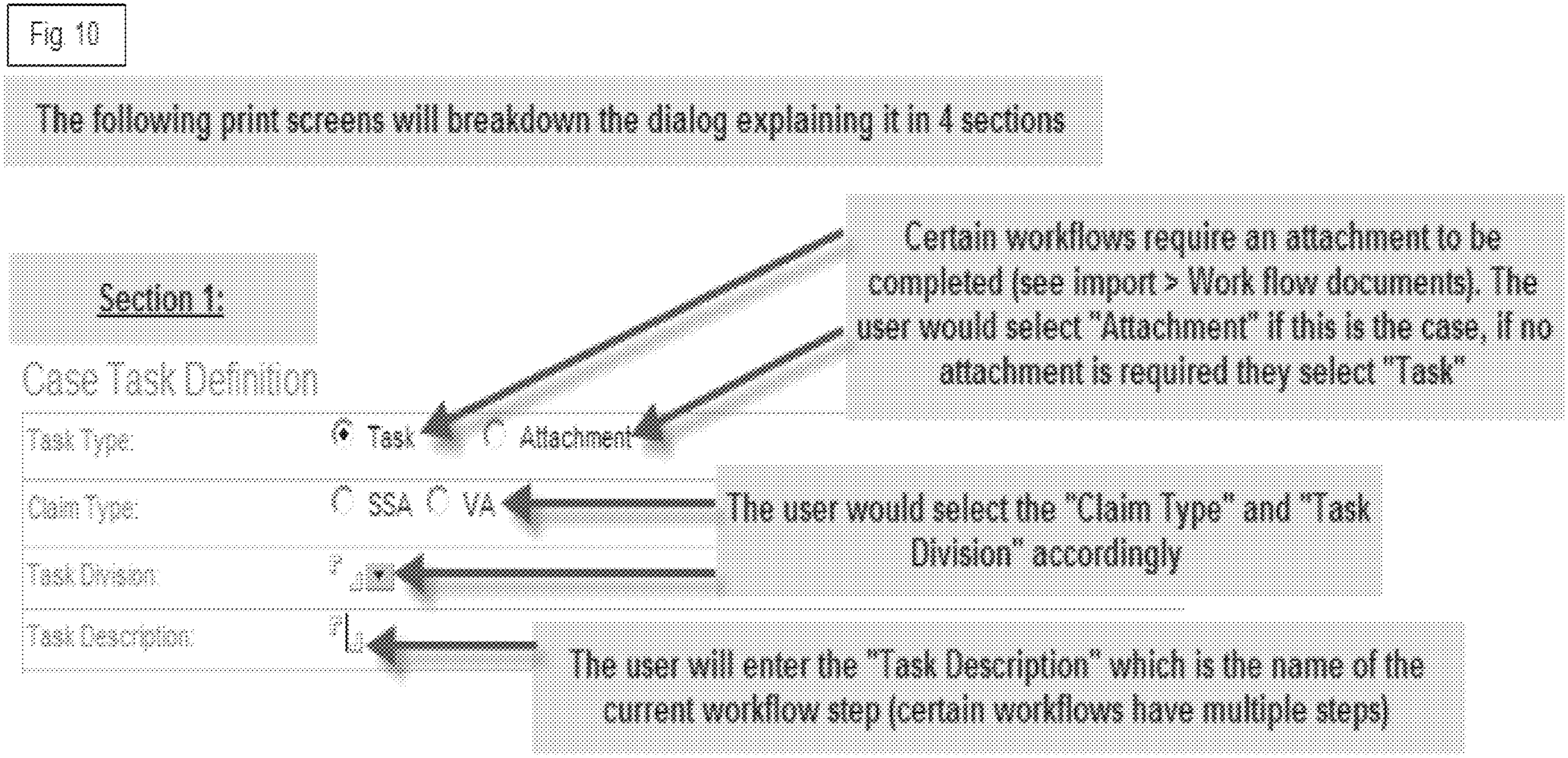
FIG. 10 is a screen shot of a workflow view.
Figure 11:
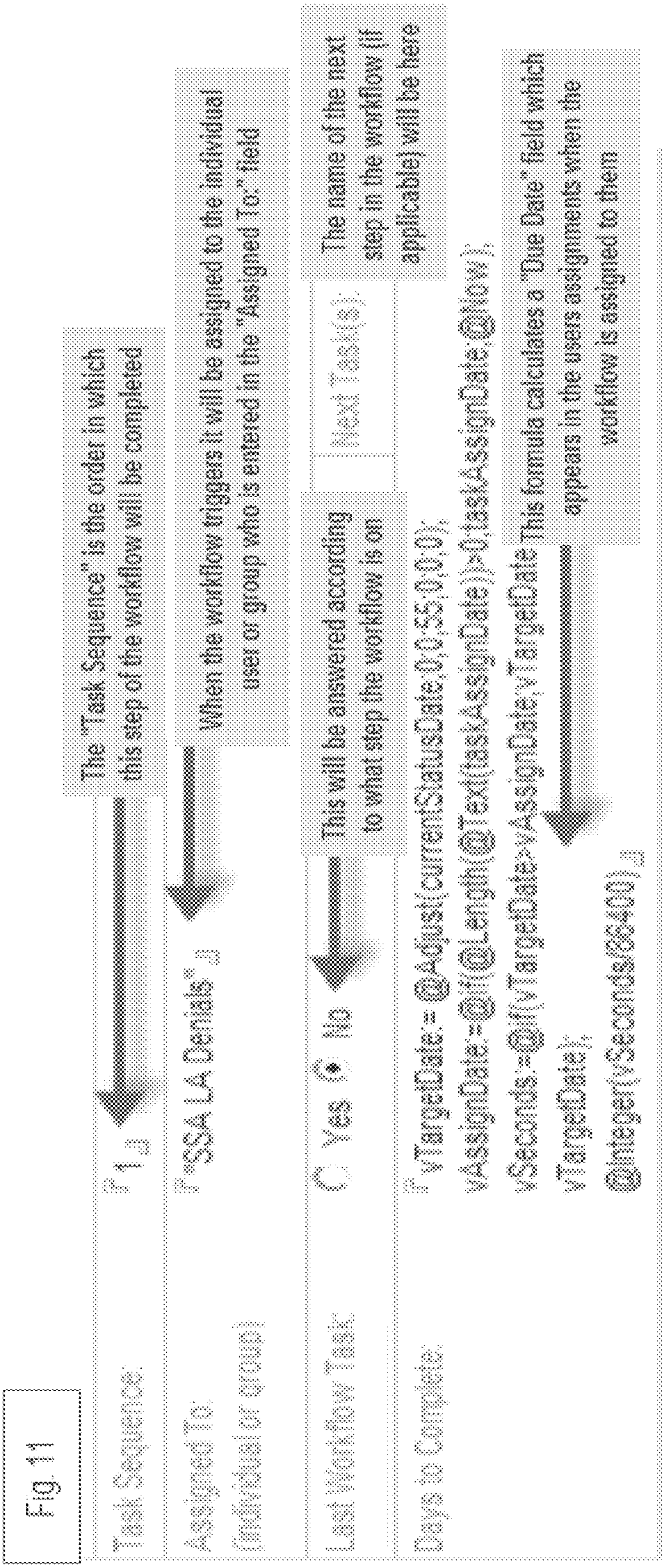
FIG. 11 is a screen shot of a workflow view.
Figure 12:
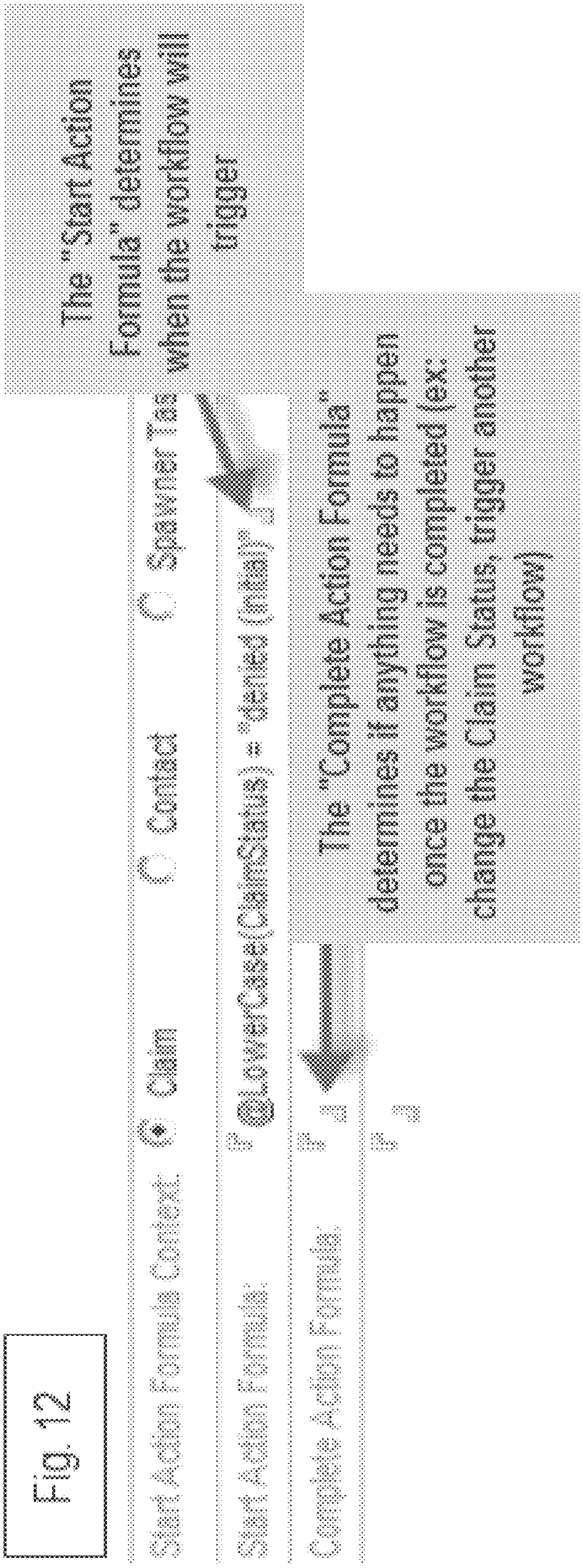
FIG. 12 is a screen shot of a workflow view.
Figure 13:
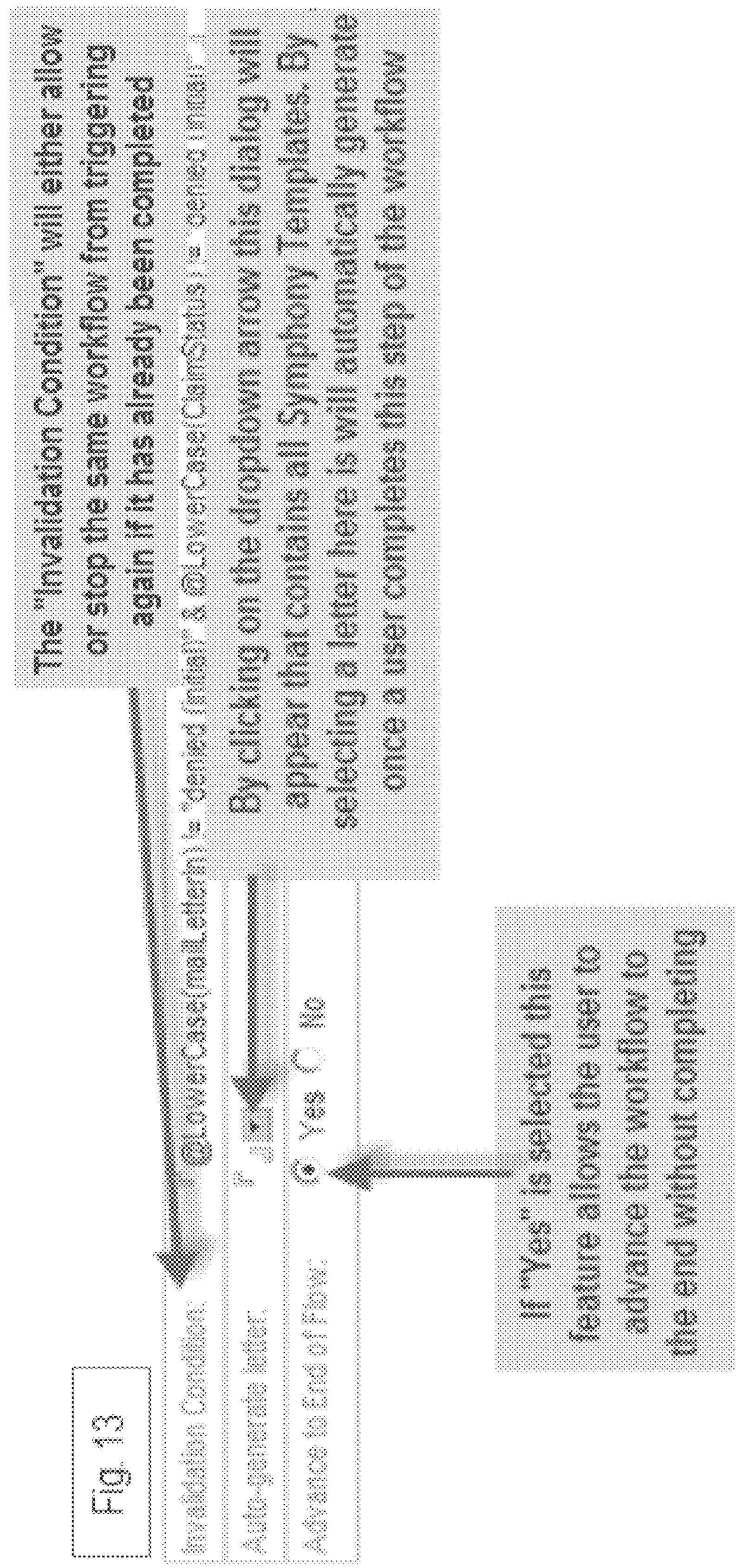
FIG. 13 is a screen shot of a workflow view.
Figure 15:
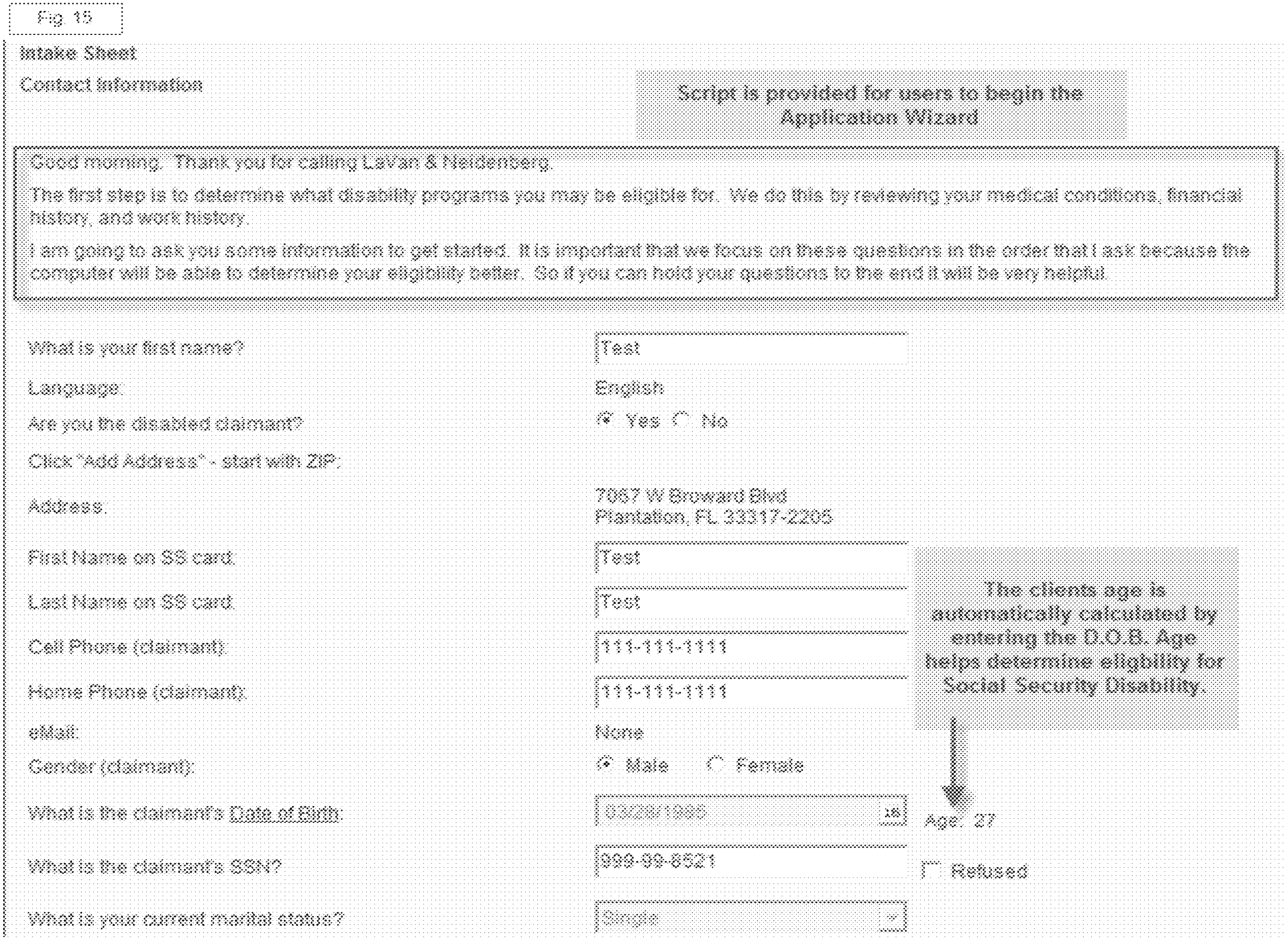
FIG. 15 is a screen shot of an Intake Wizard.
Figure 16:
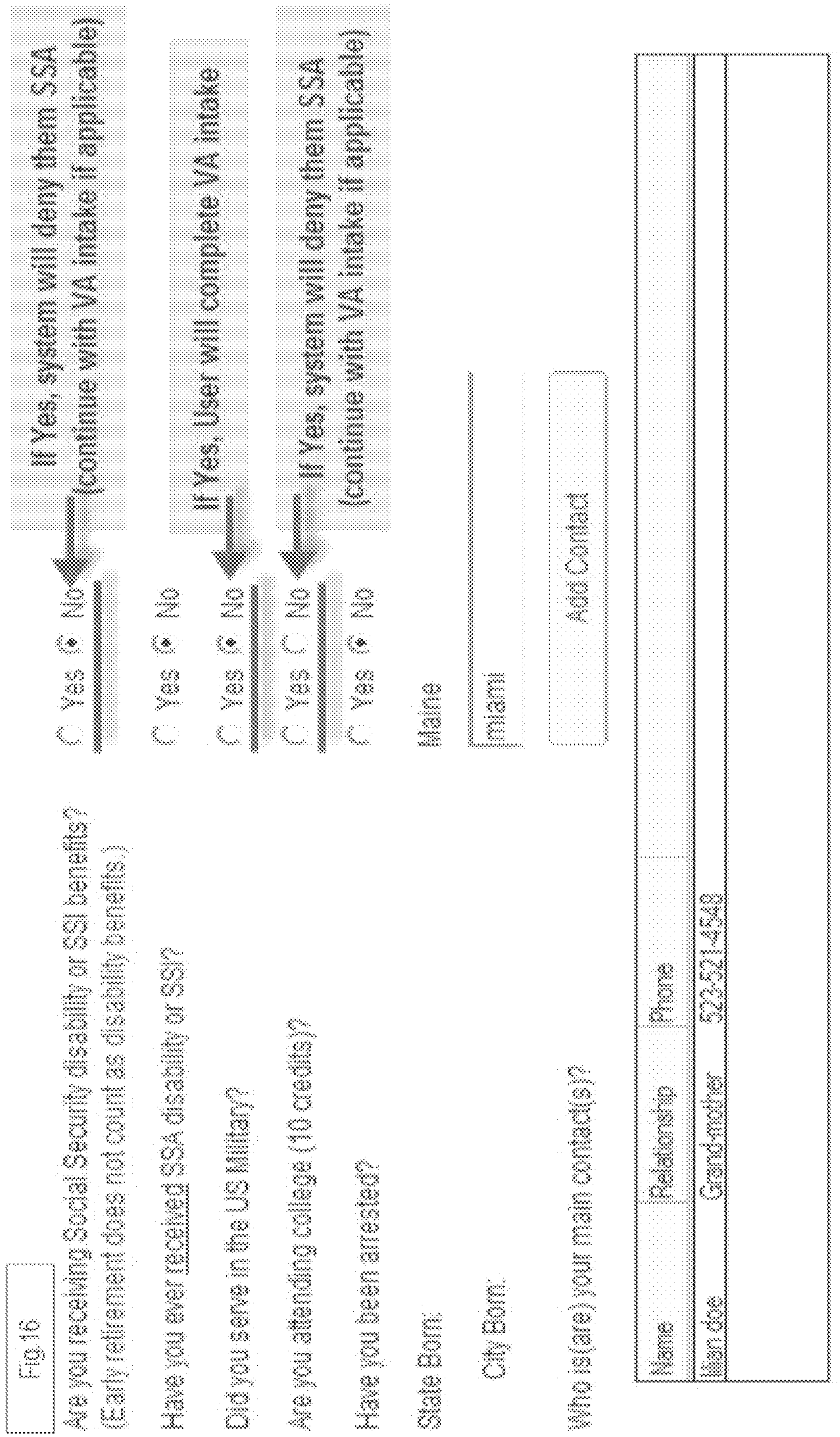
FIG. 16 is a screen shot of an Intake Wizard.
Figure 17:
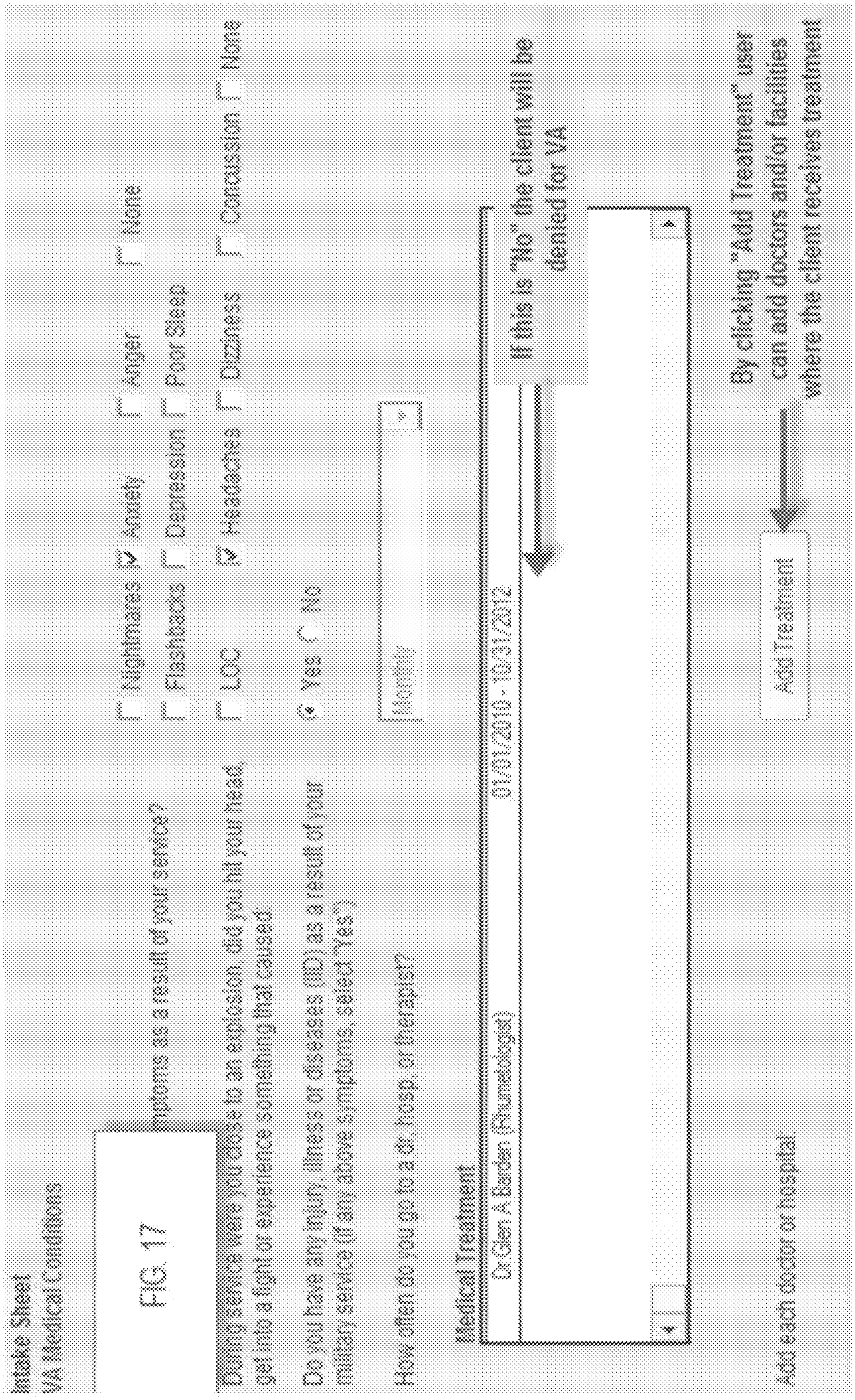
FIG. 17 is a screen shot of an Intake Wizard.
Figure 19:
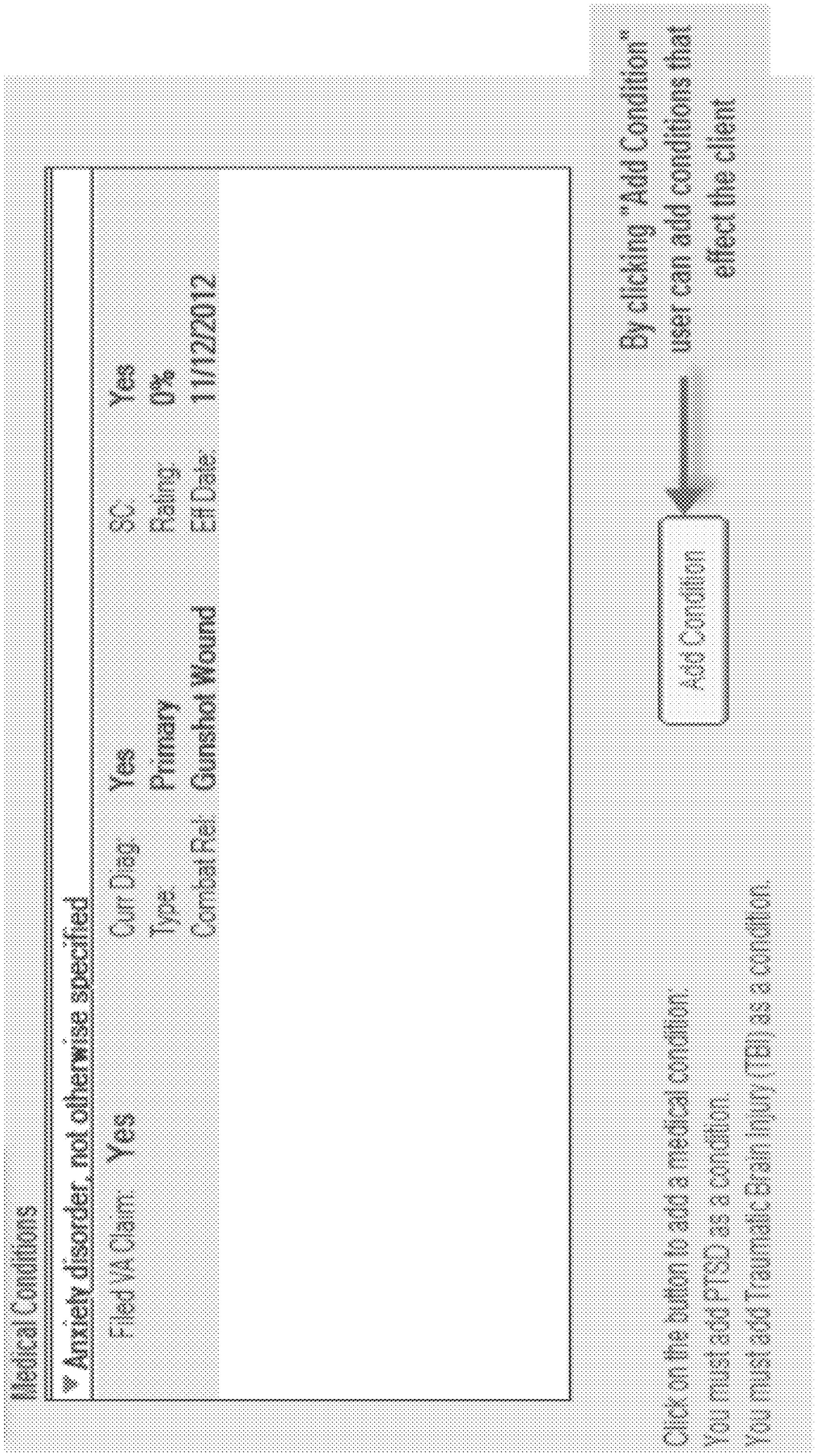
FIG. 19 is a screen shot of an Intake Wizard.
Figure 20:
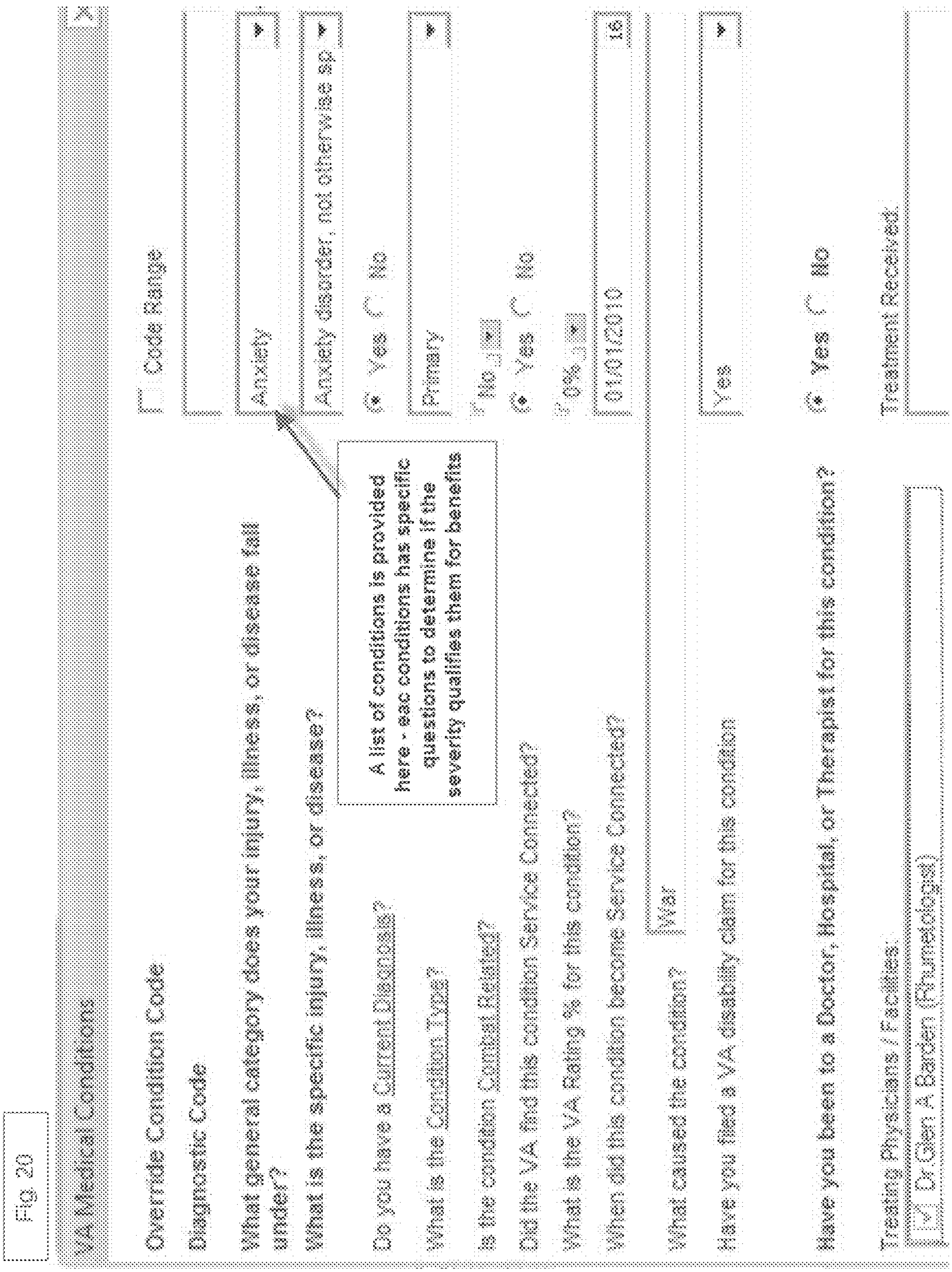
FIG. 20 is a screen shot of an Intake Wizard.
Figure 21:
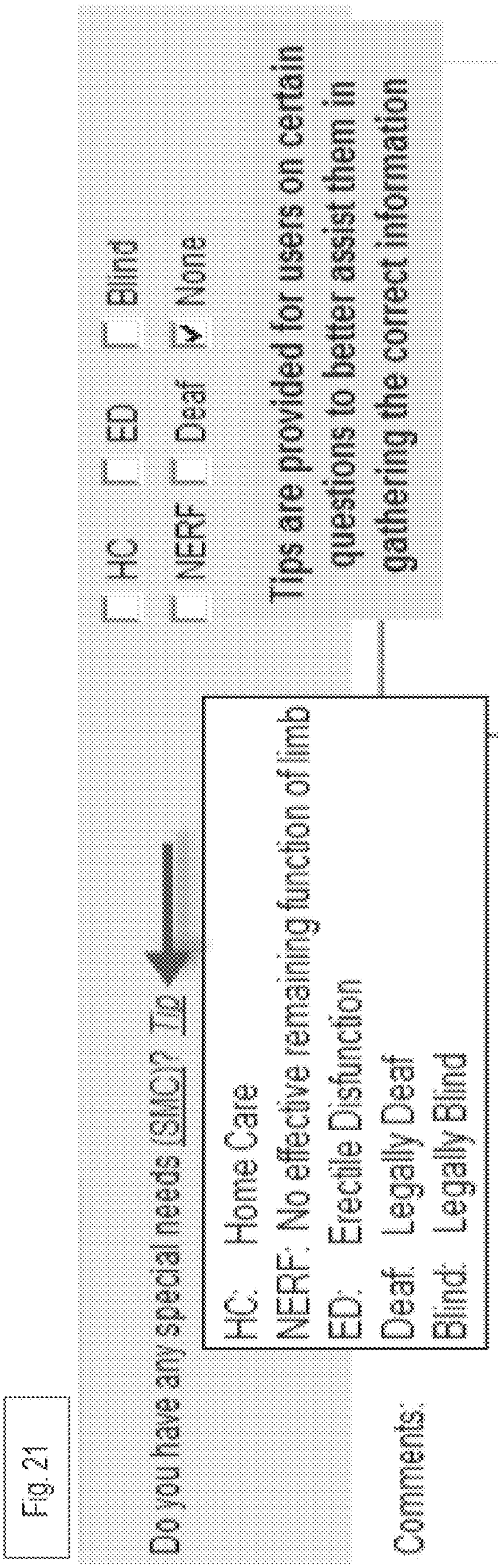
FIG. 21 is a screen shot of an Intake Wizard.
Figure 22:
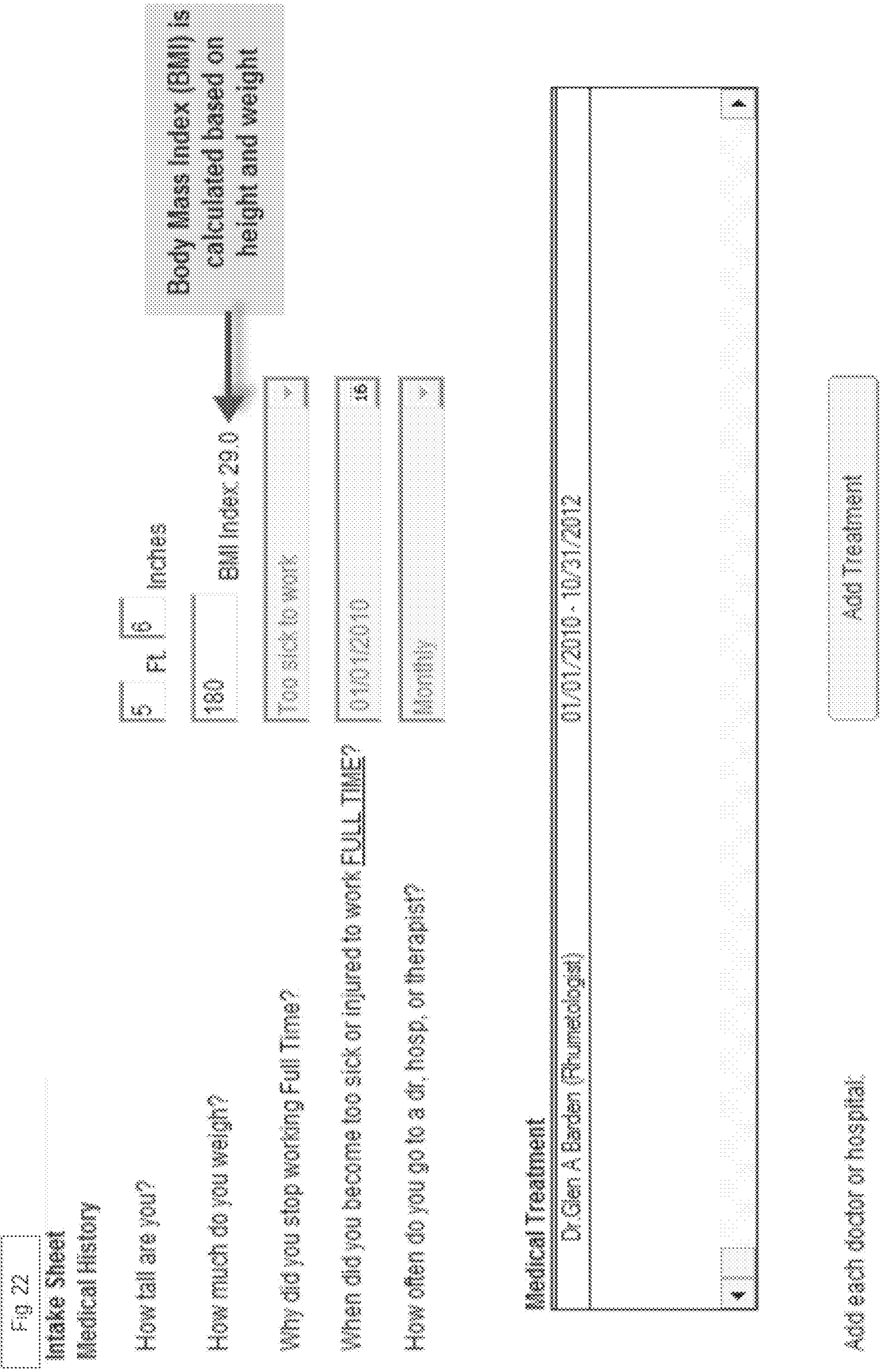
FIG. 22 is a screen shot of an Intake Wizard.
Figure 23:
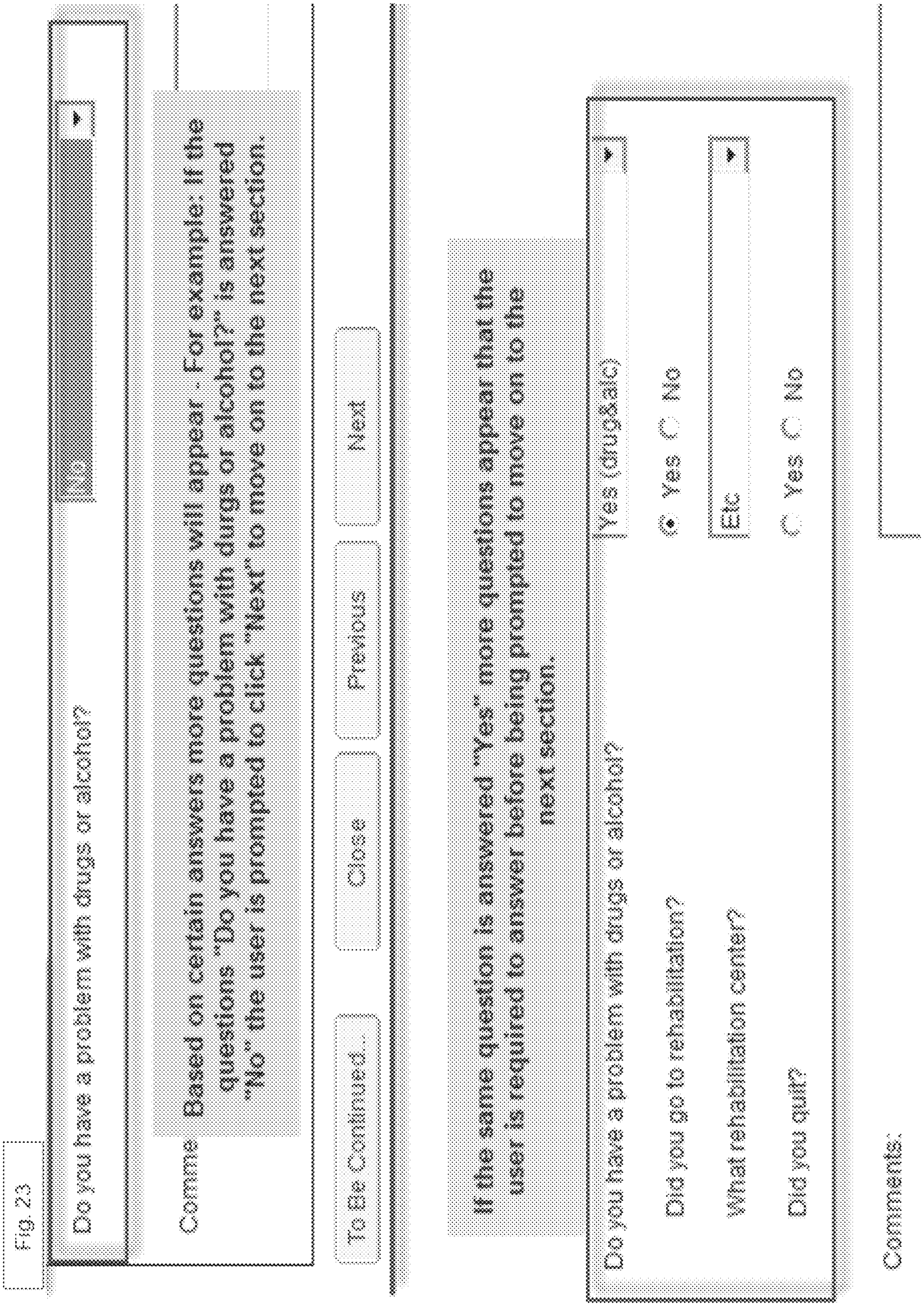
FIG. 23 is a screen shot of an Intake Wizard.
Figure 25:
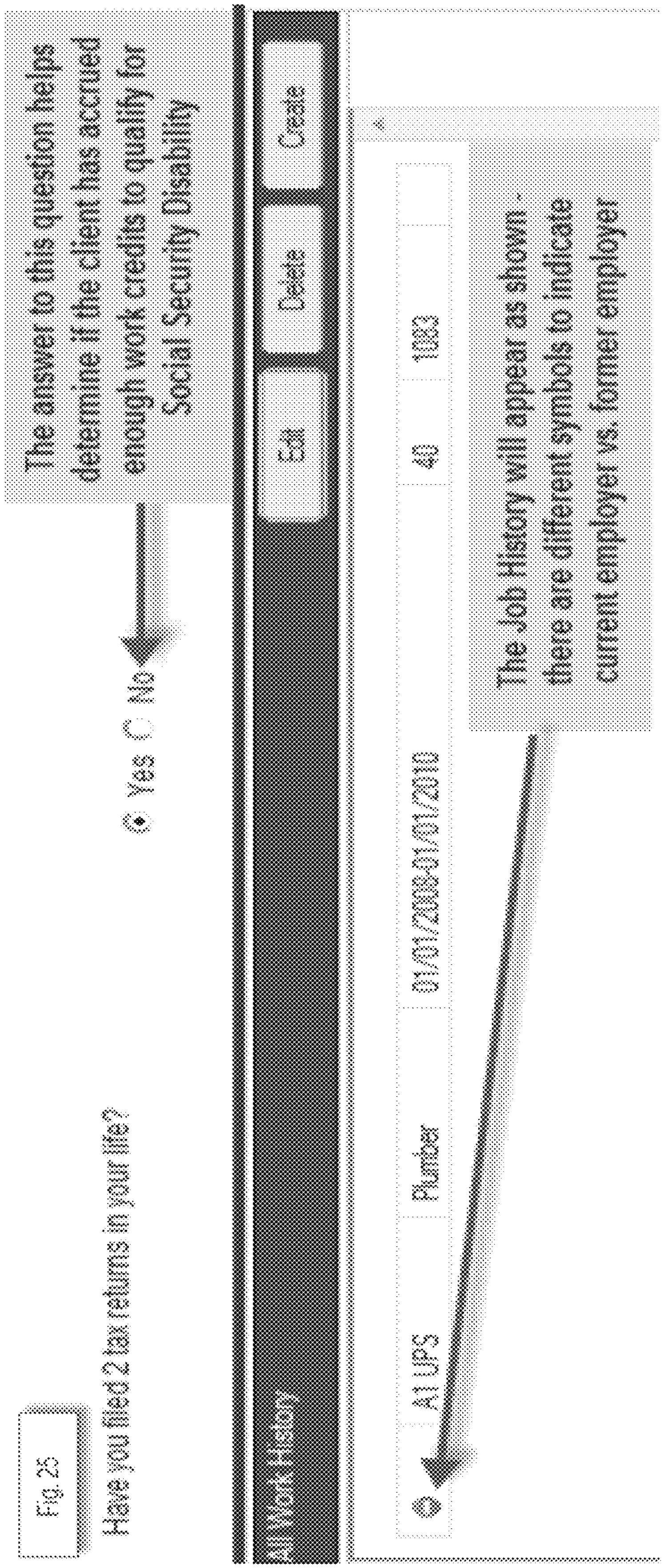
FIG. 25 is a screen shot of an Intake Wizard.
Figure 28:
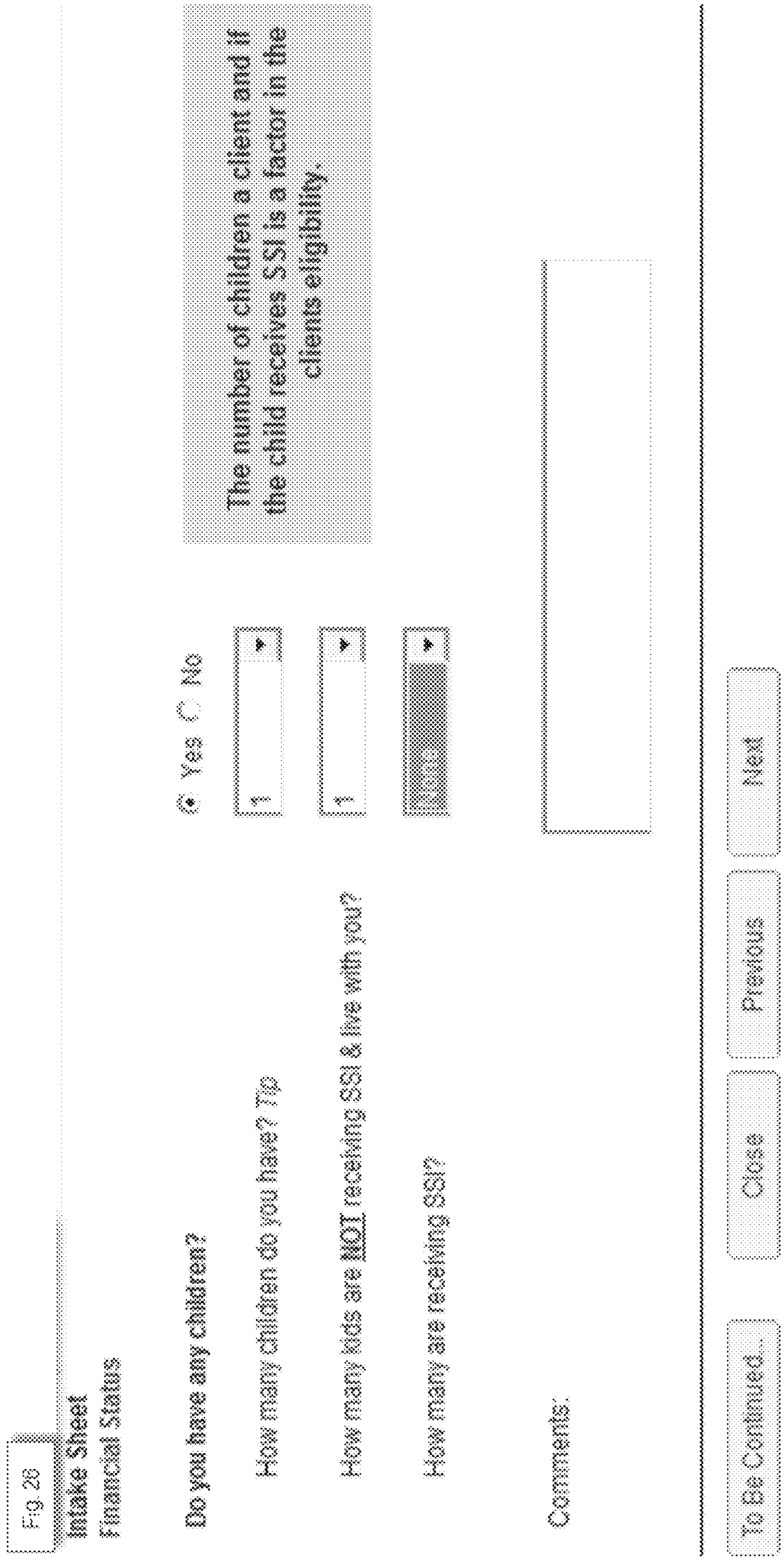
FIG. 28 is a screen shot to an Intake Wizard.
Figure 27:
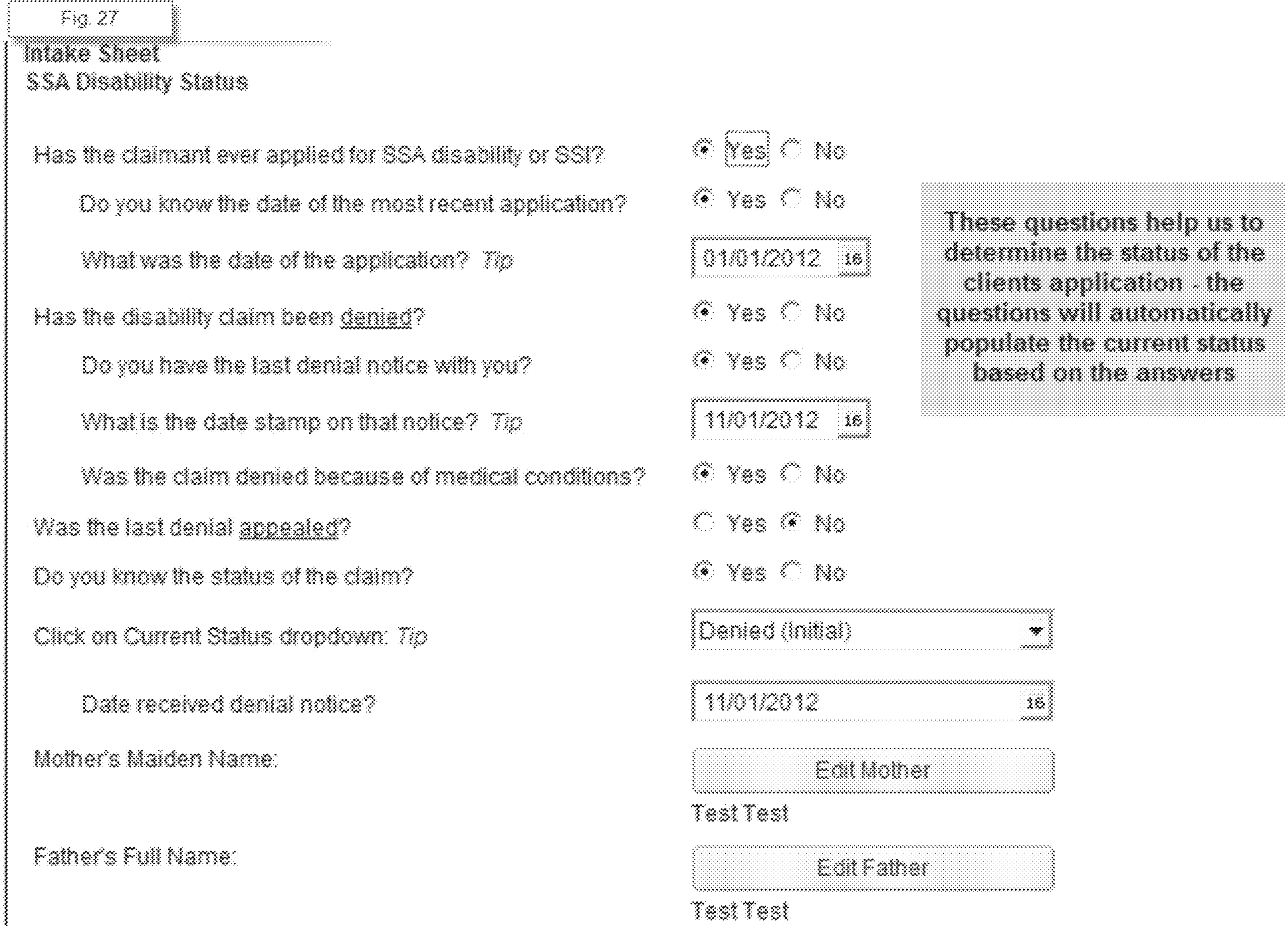
FIG. 27 is a screen shot of an Intake Wizard.
Figure 29:
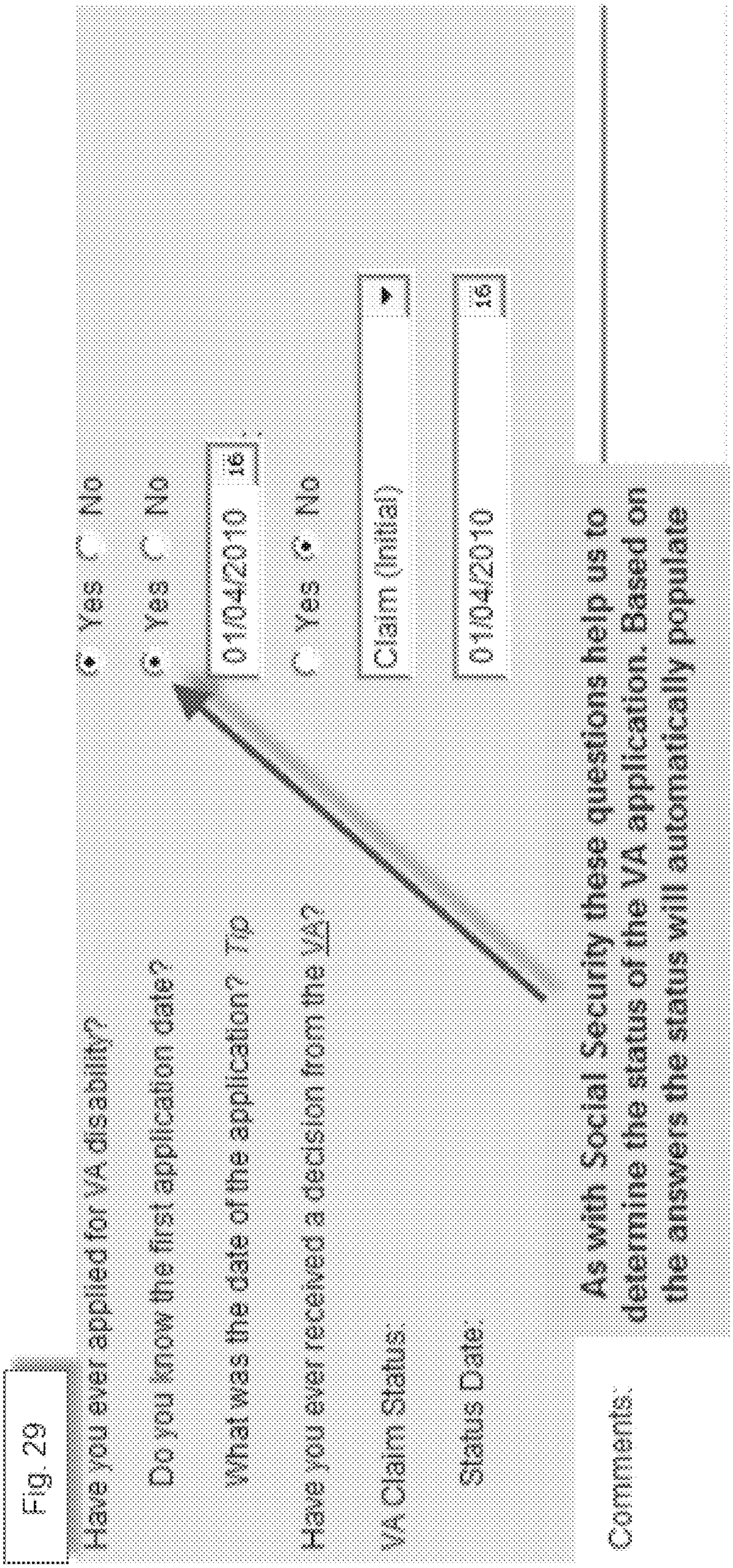
FIG. 29 is a screen shot of an Intake Wizard.
Figure 30:
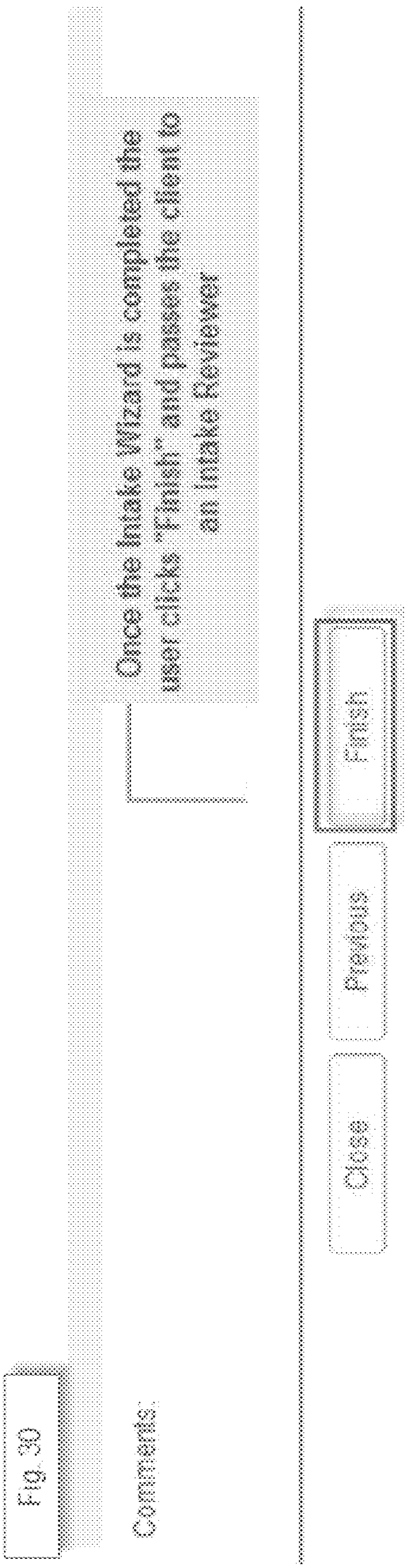
FIG. 30 is a screen shot of an Intake Wizard.
Figure 31:
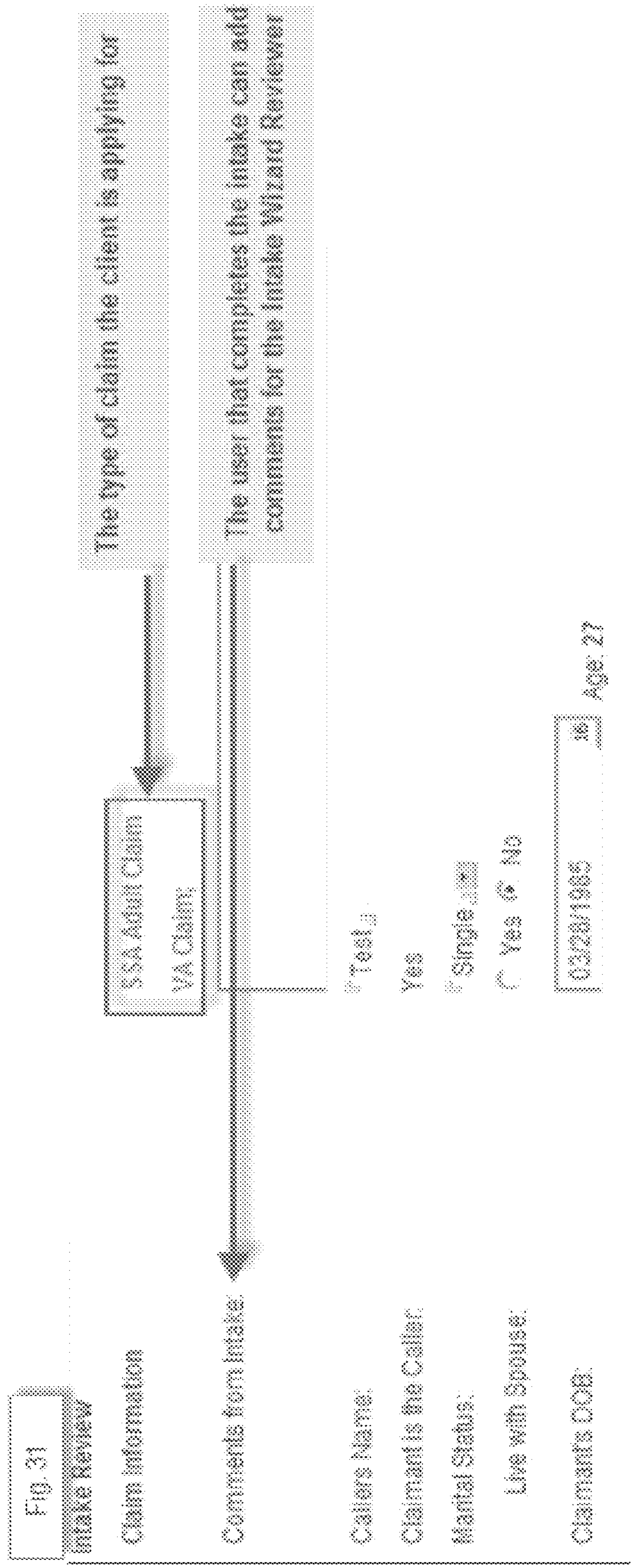
FIG. 31 is a screen shot of an Intake Wizard.
Figure 32:
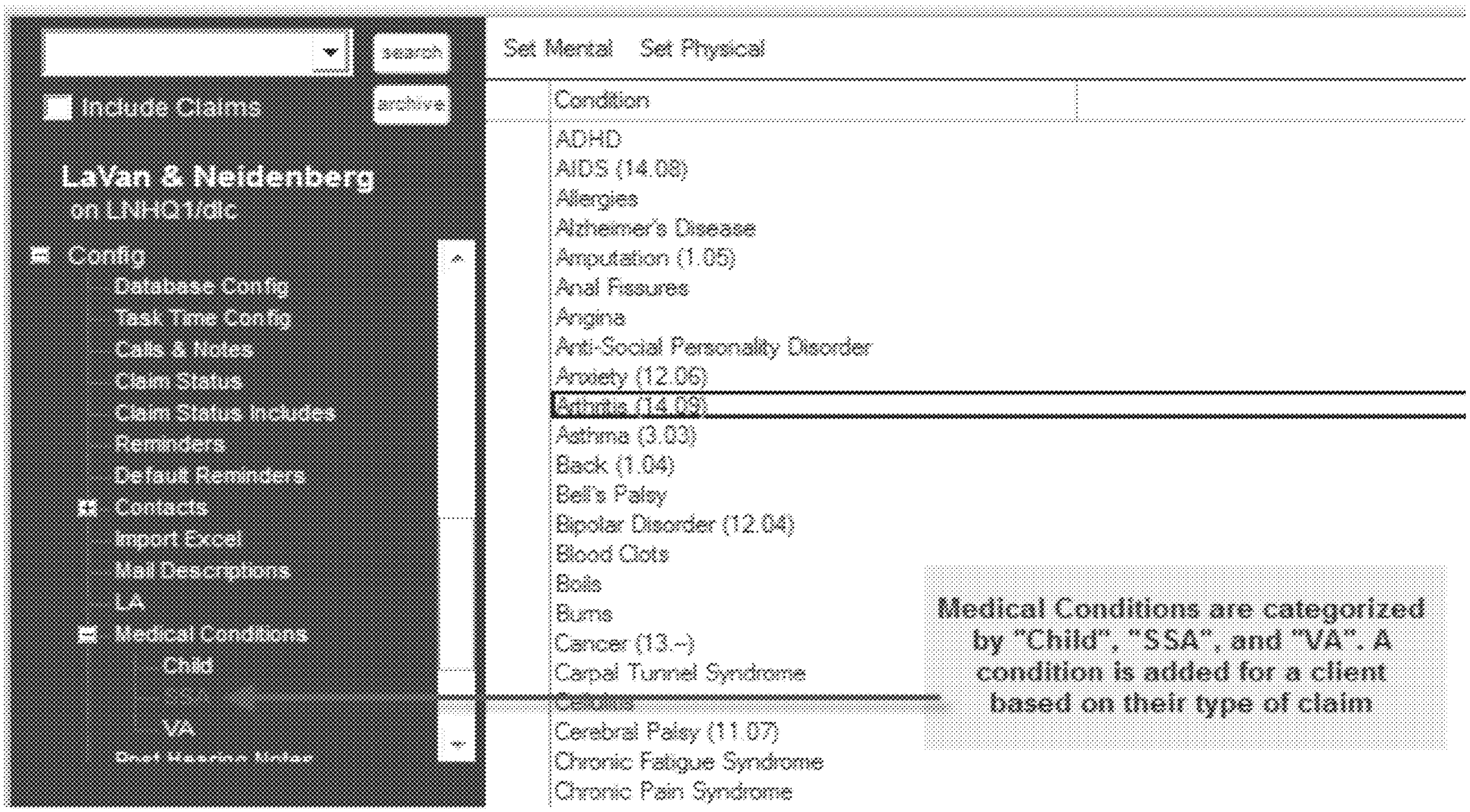
FIG. 32 is a screen shot of medical conditions on the Intake Wizard.
Figure 36:
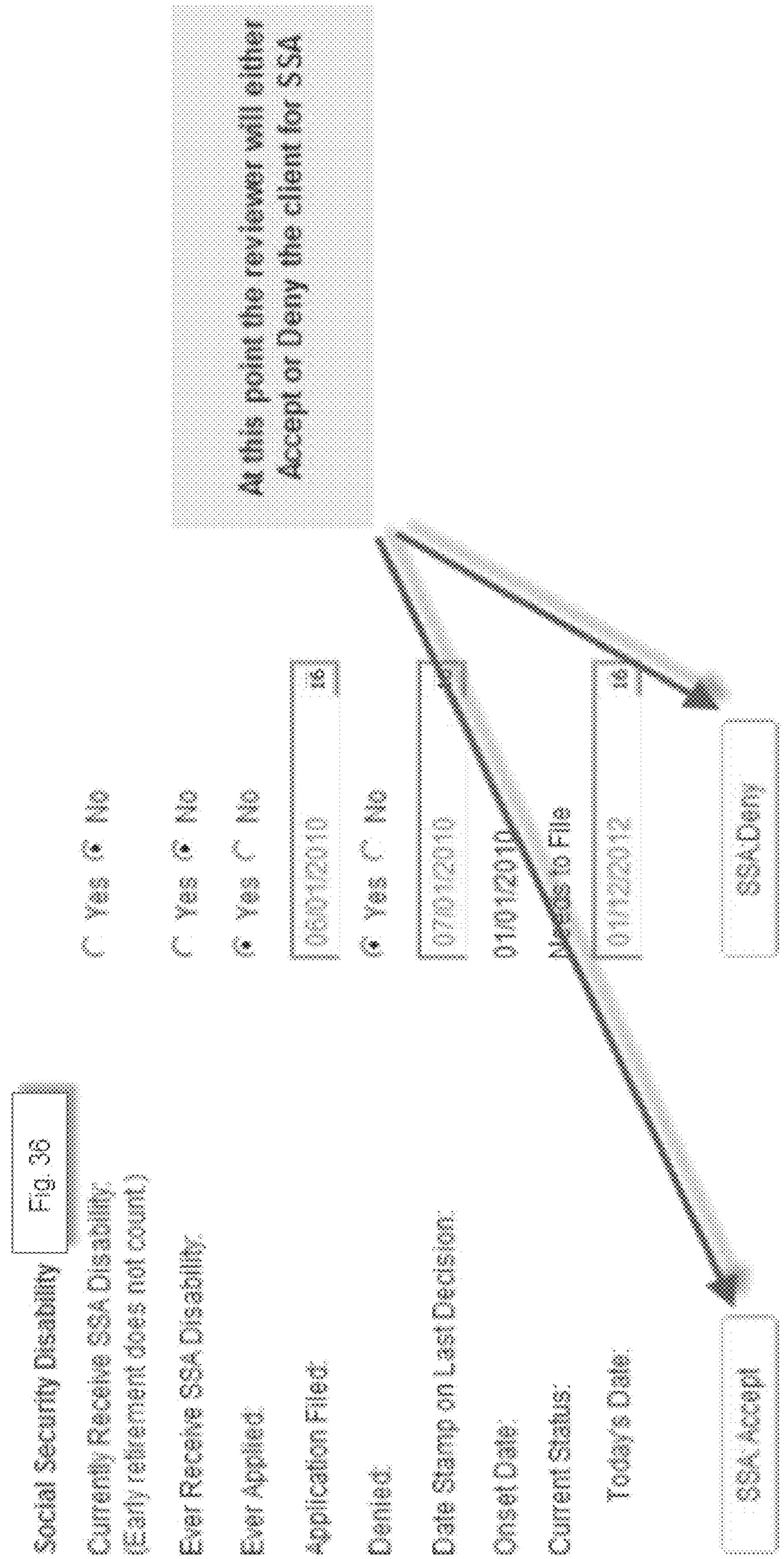
FIG. 36 is screen shot of termination reasons.
Figure 37A:
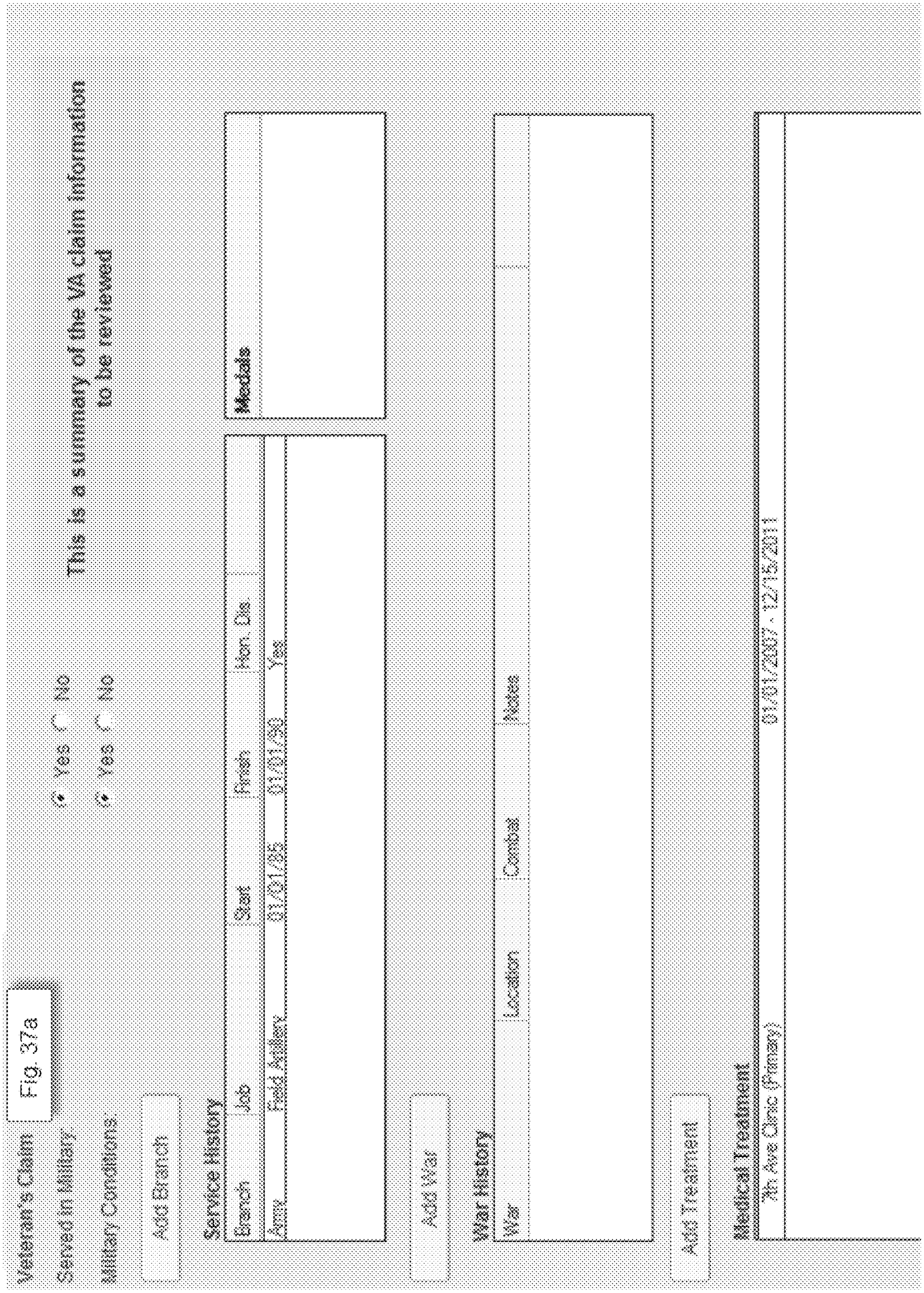
FIGS. 37*a*-37*b* are a screen shot of termination reasons.
Figure 37B:
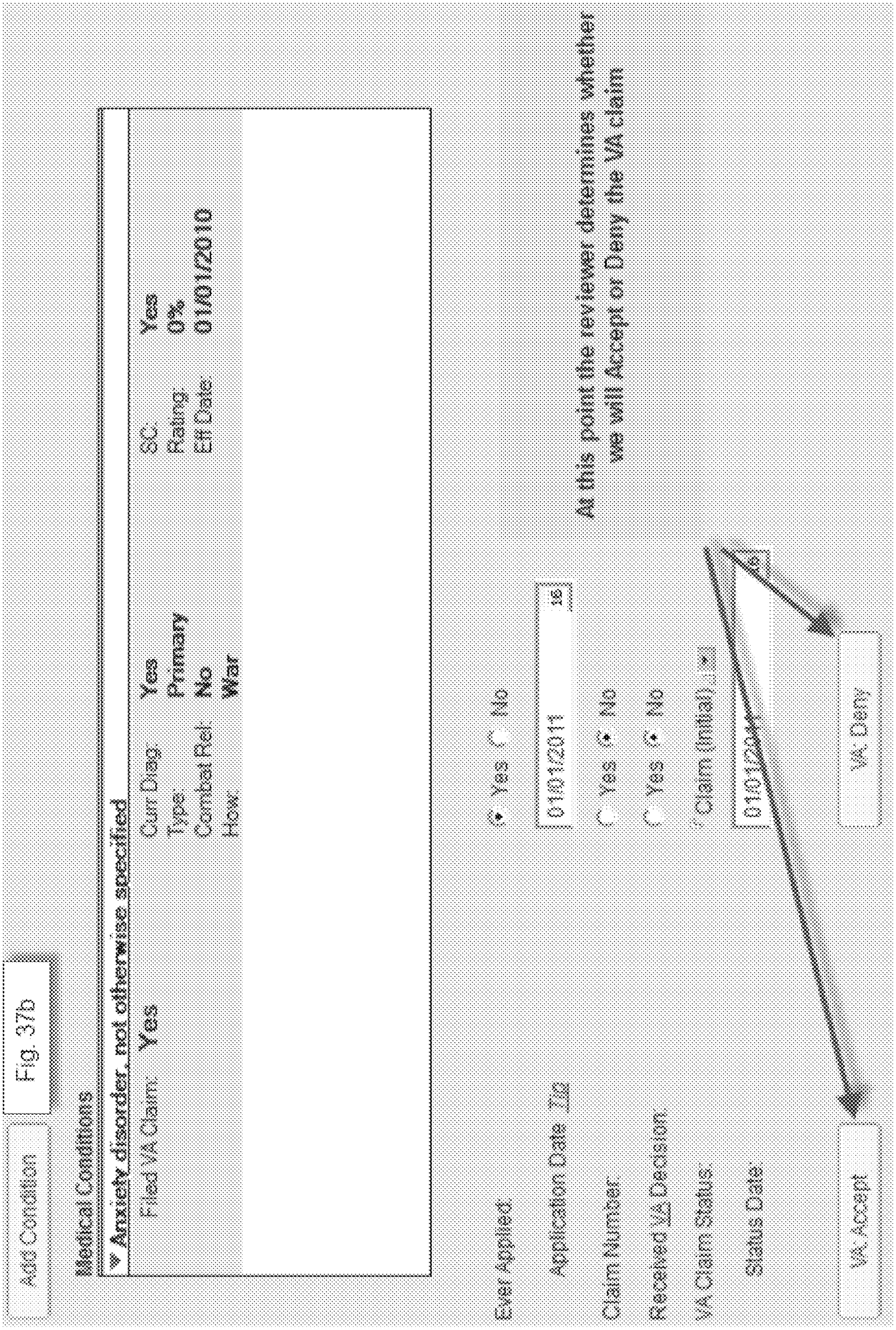
Figure 38A:
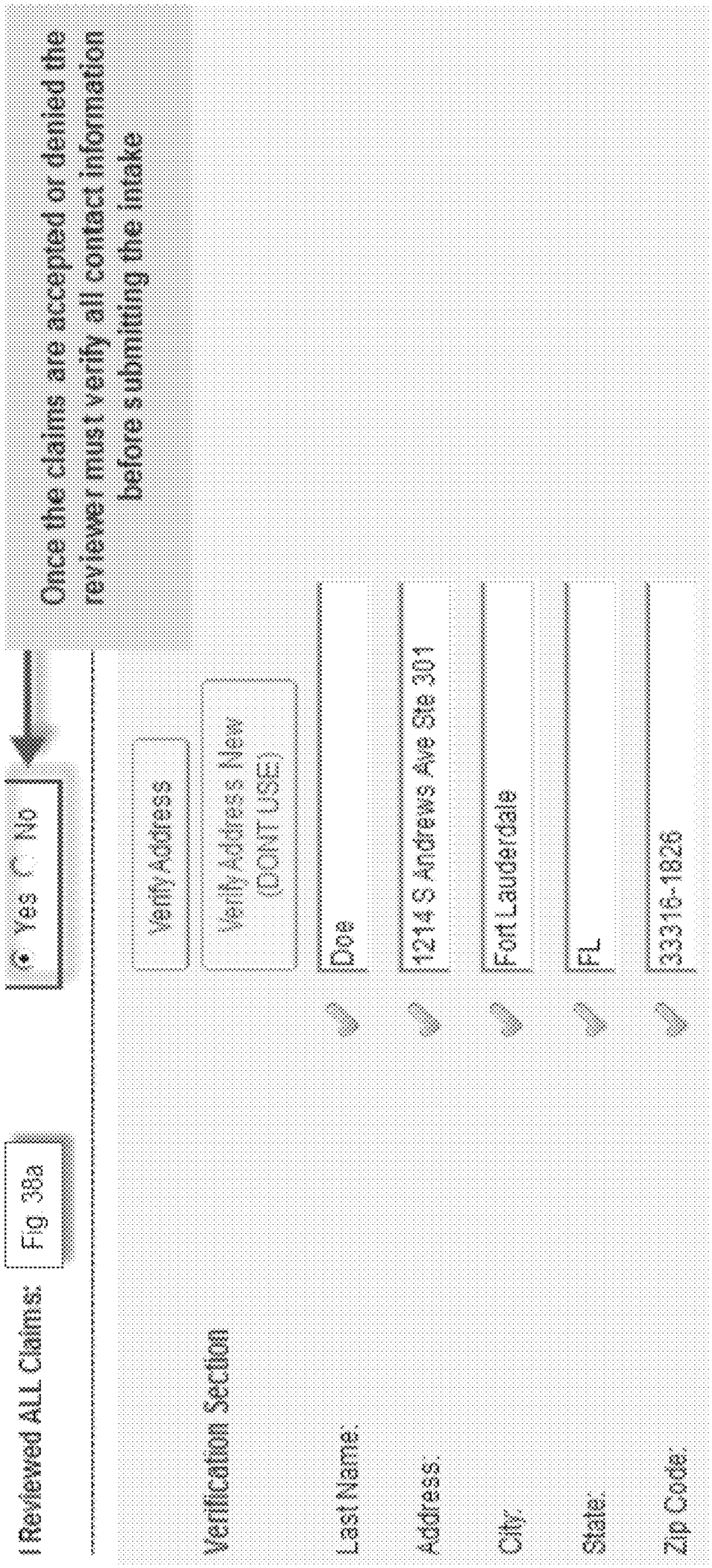
FIGS. 38*a*-38*b* are a screen shot of termination reasons.
Figure 38B:
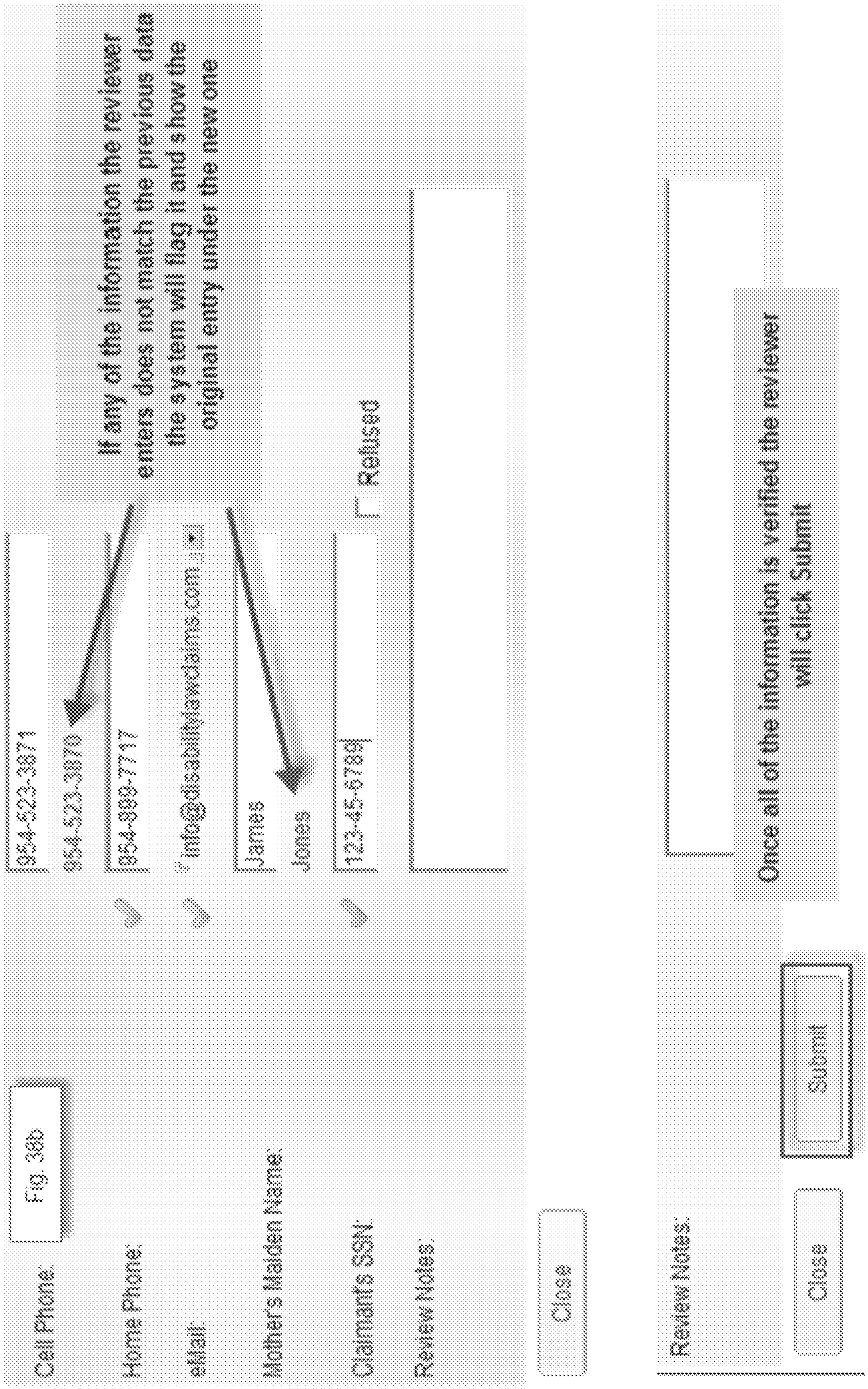
Figure 39:
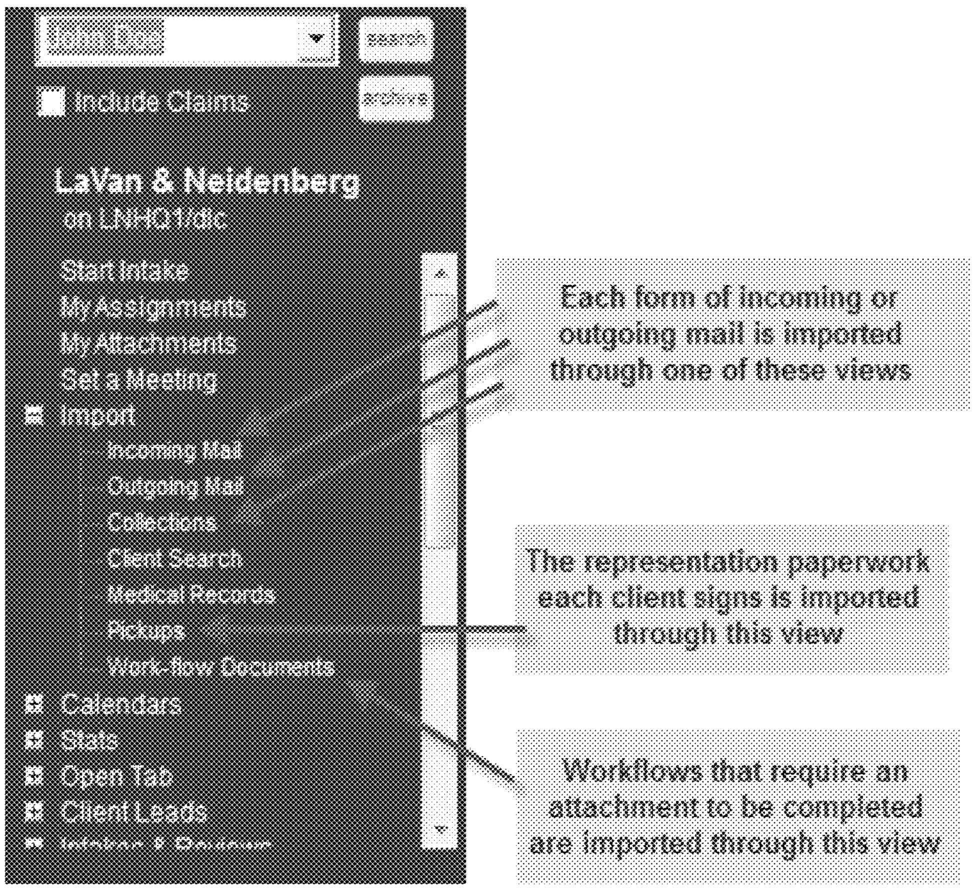
FIG. 39 is a screen shot of an Import Wizard.
Figure 40:
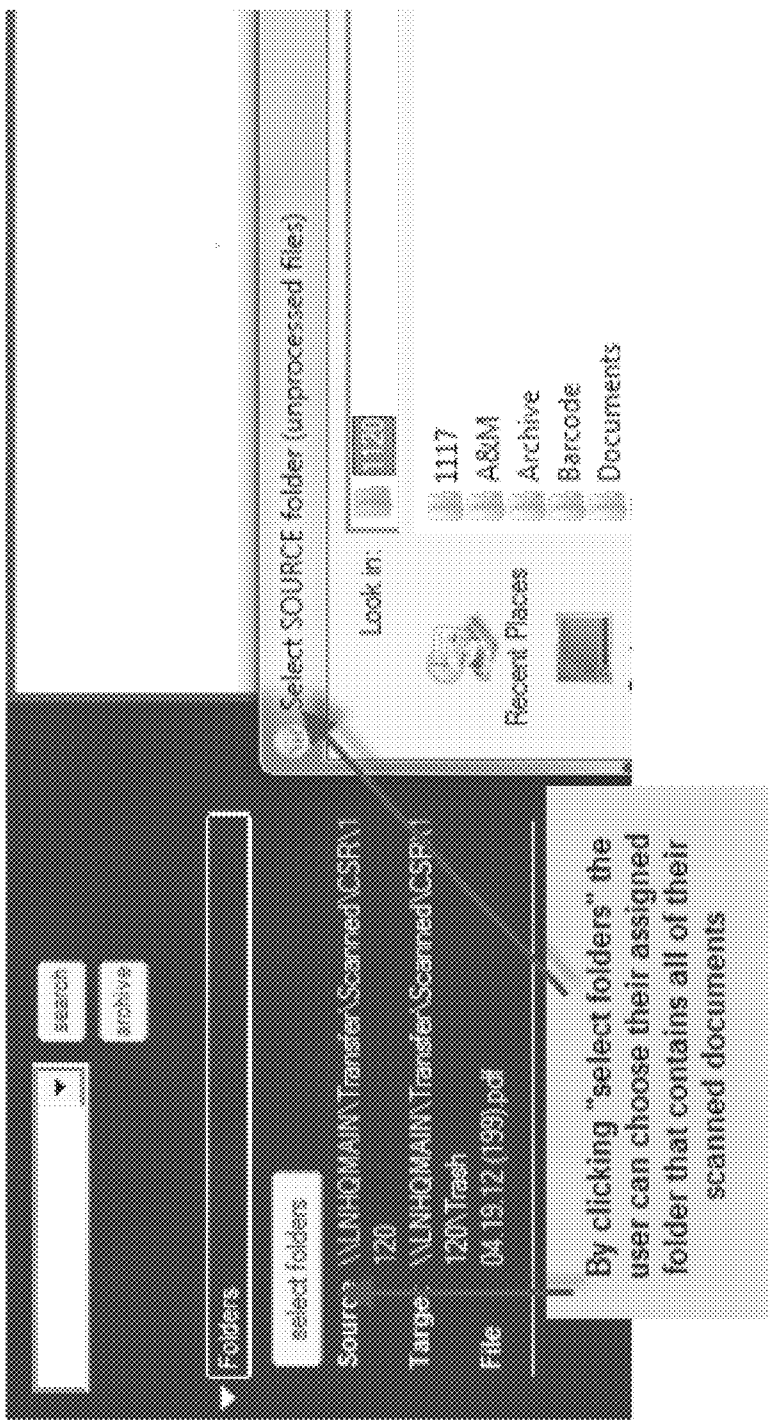
FIG. 40 is a screen shot of an Import Wizard.
Figure 41:
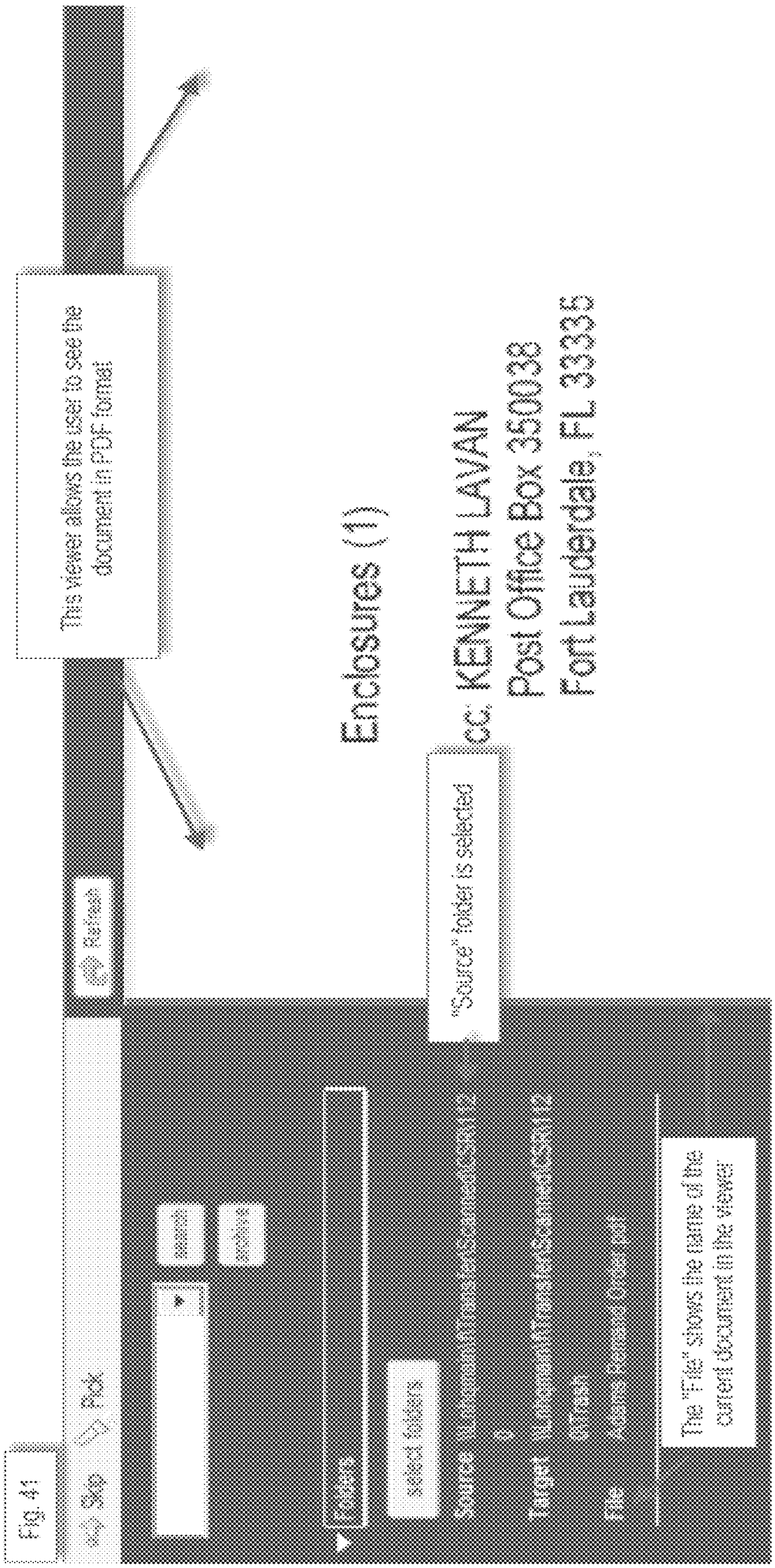
FIG. 41 is a screen shot of an Import Wizard.
Figure 42:
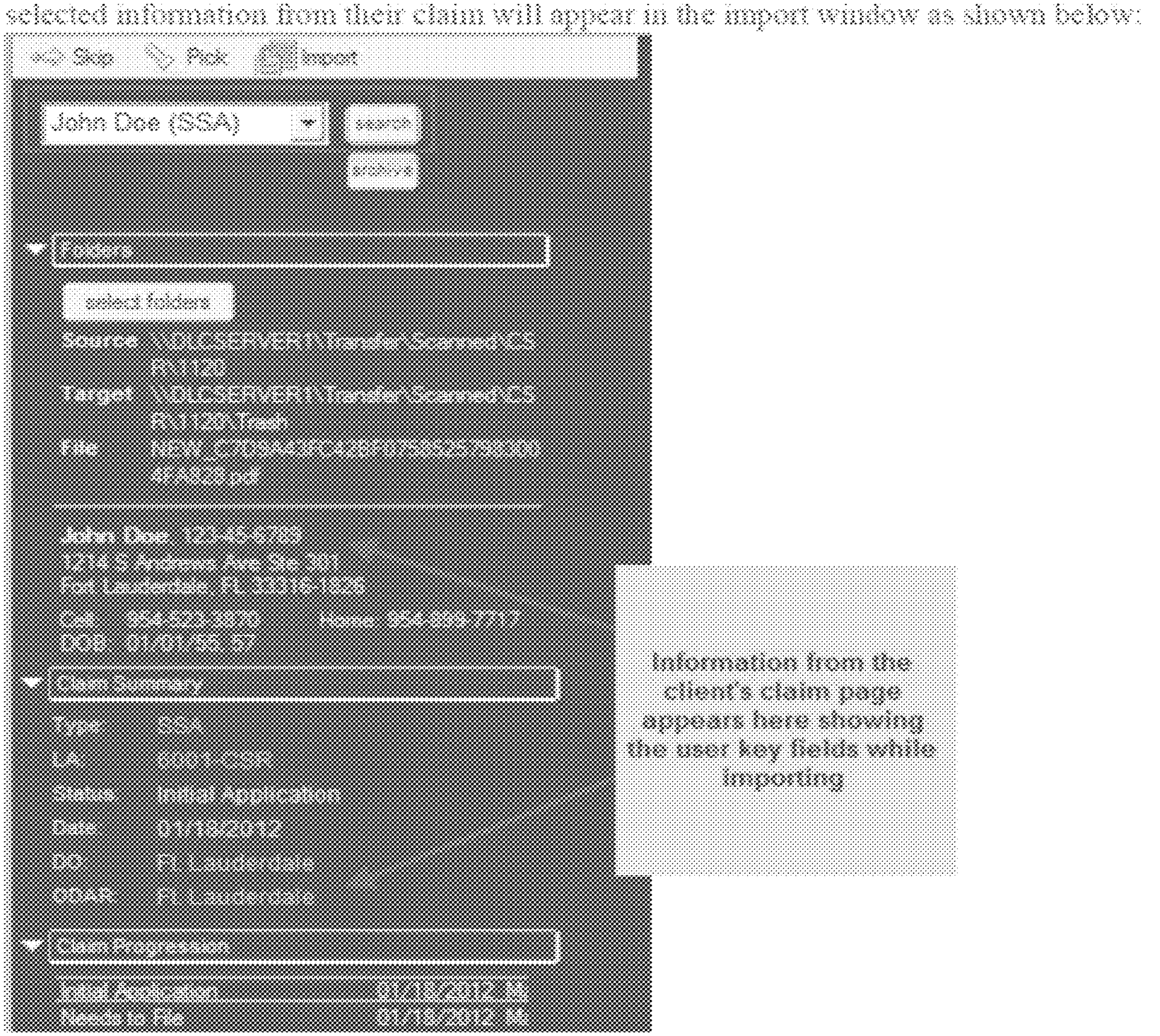
FIG. 42 is a screen shot of an Import Wizard.
Figure 43:
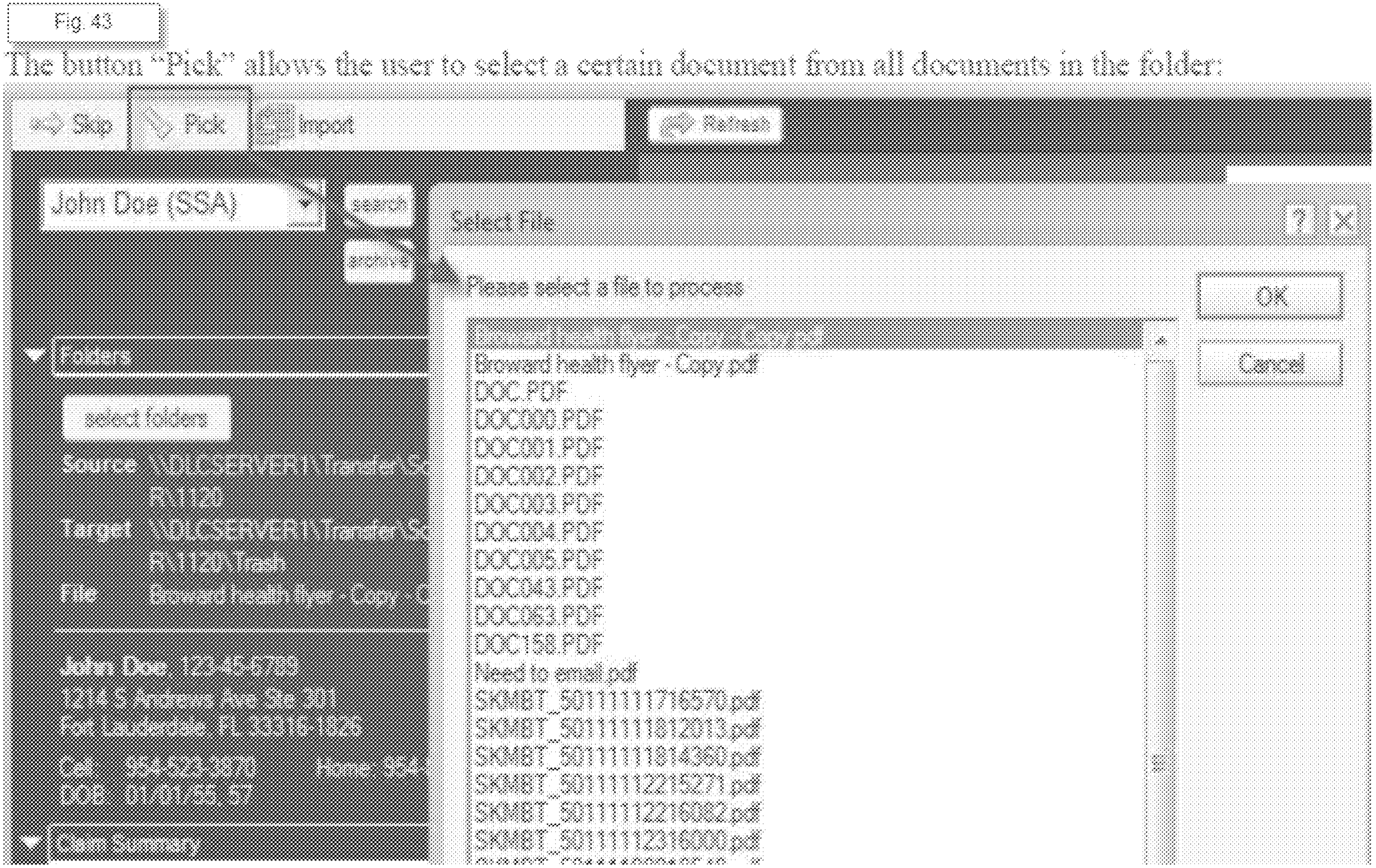
FIG. 43 is a screen shot of an Import Wizard.
Figure 44:
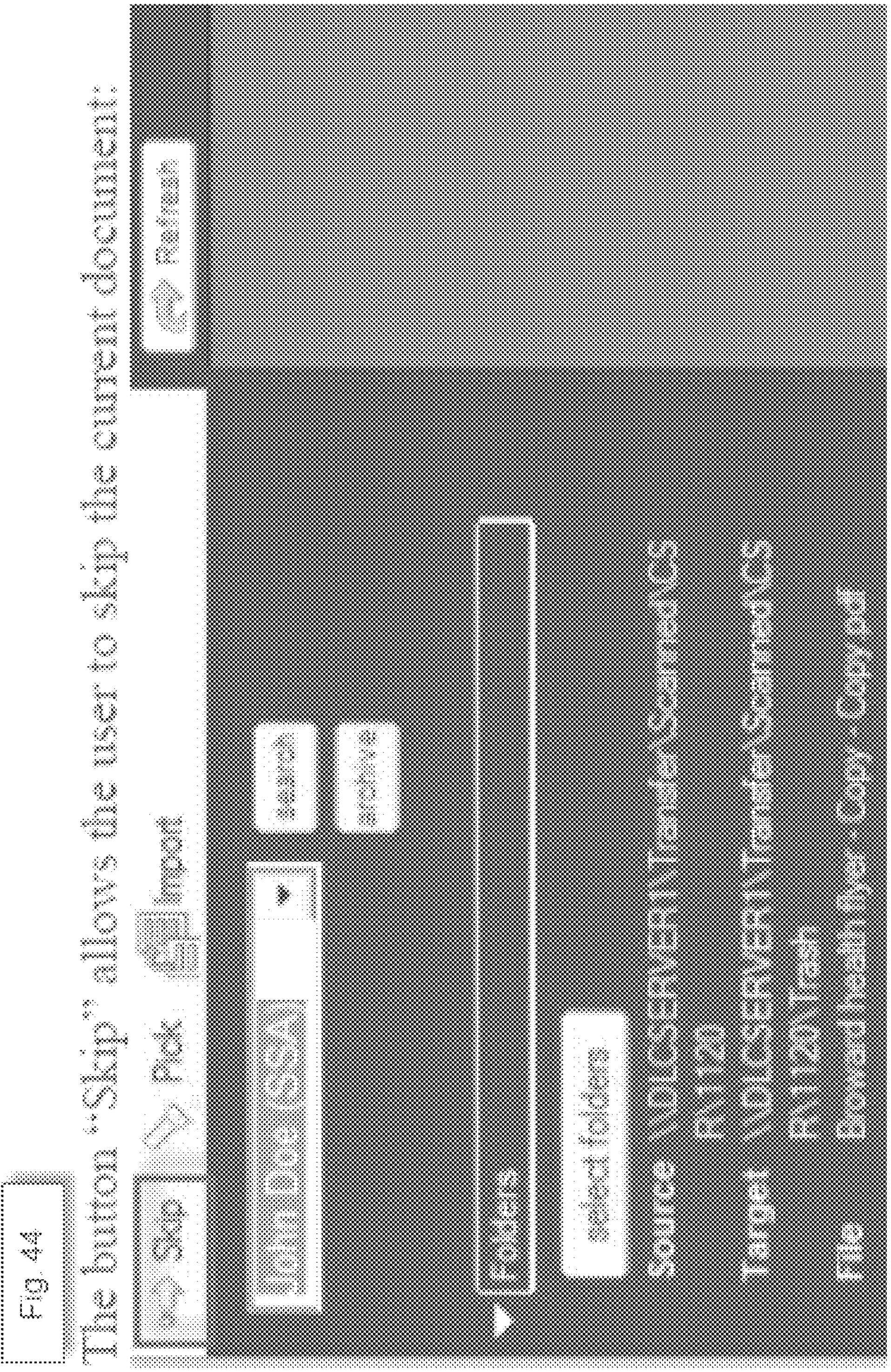
FIG. 44 is a screen shot of an Import Wizard.
Figure 45:
FIG. 45 is a screen shot of an Import Wizard.
Figure 46:
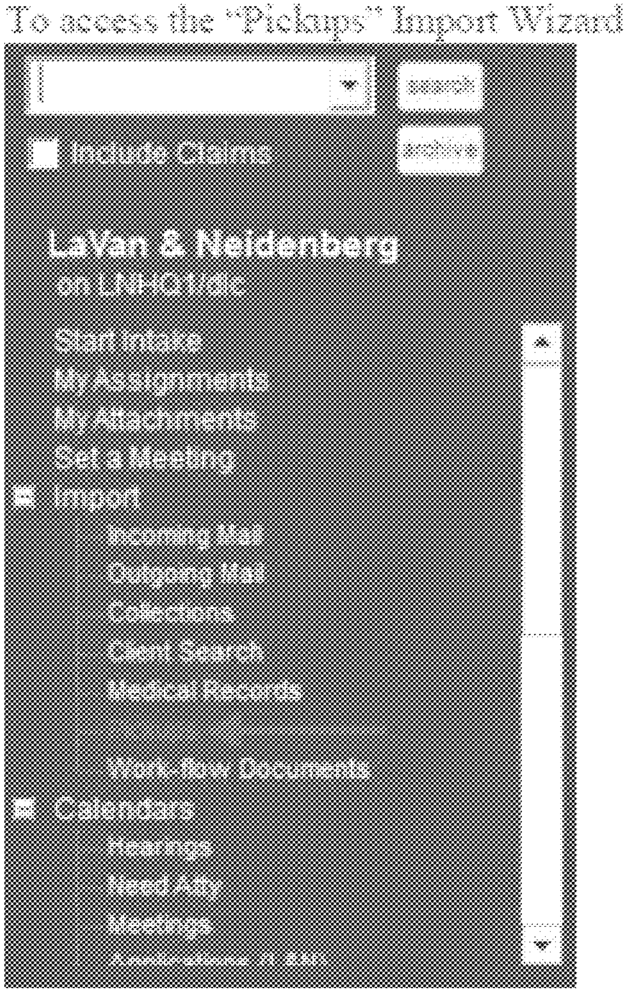
FIG. 46 is a screen shot of an Import Wizard.
Figure 47:
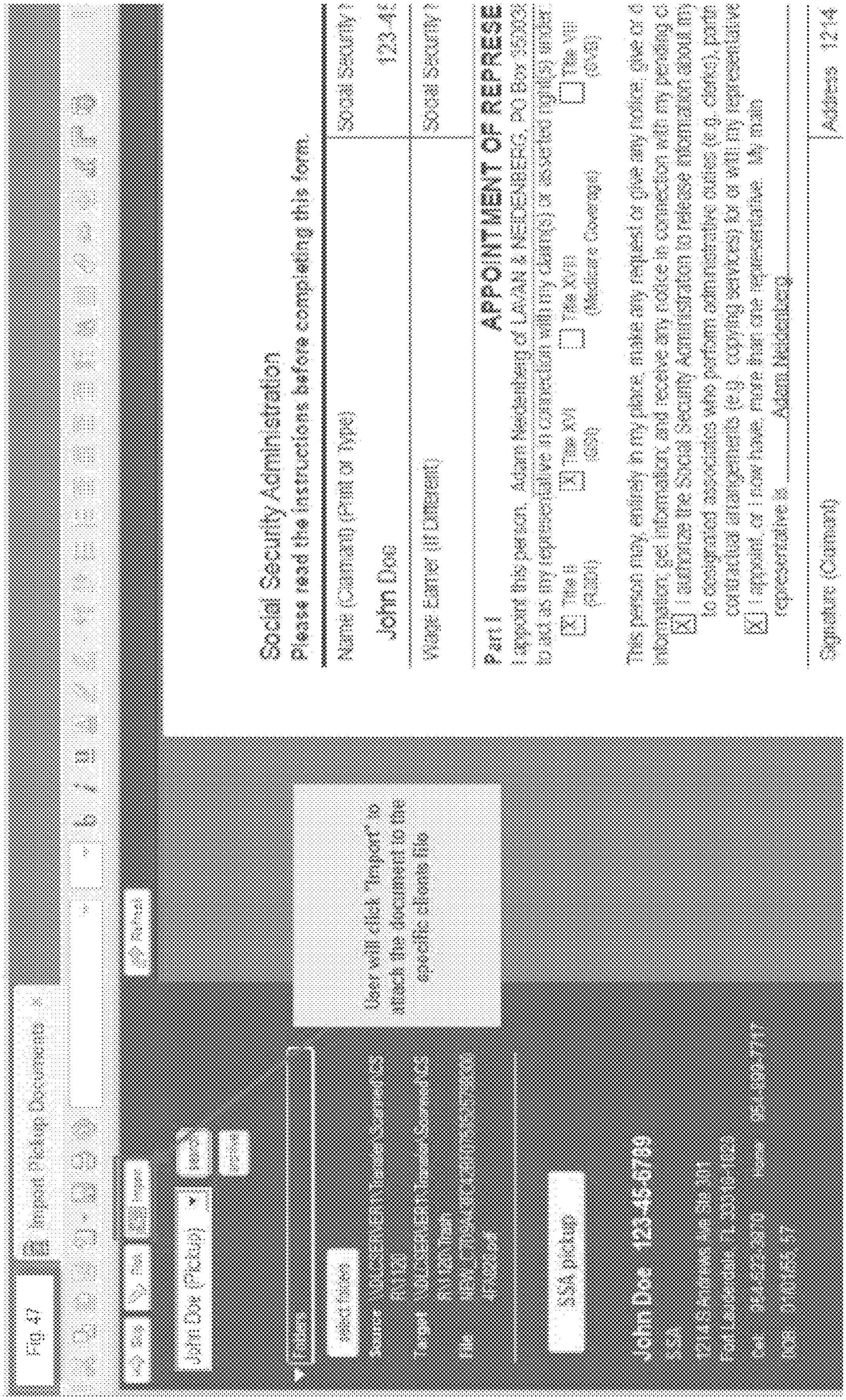
FIG. 47 is a screen shot of an Import Wizard.
Figure 48:
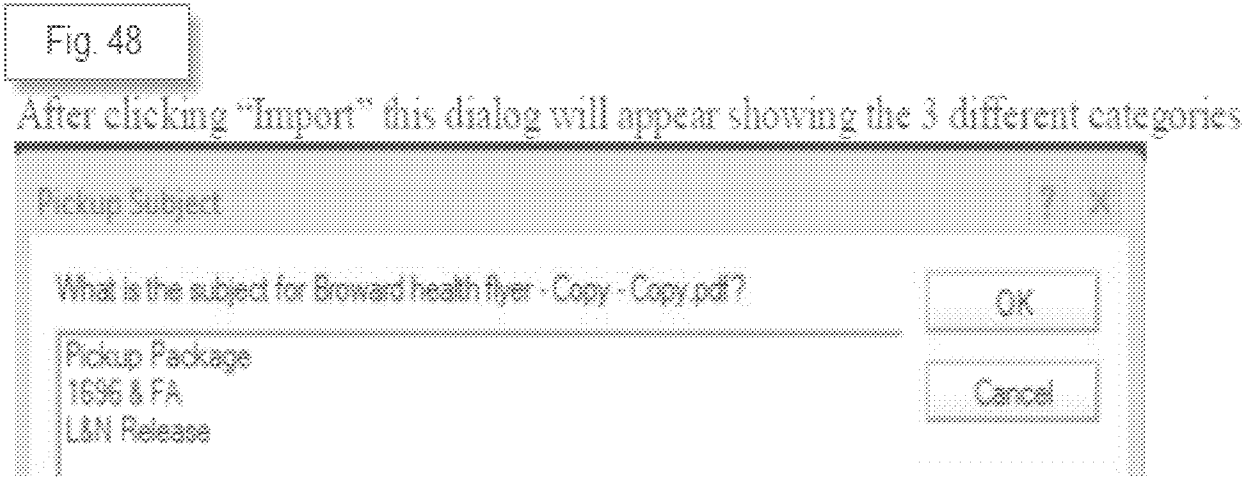
FIG. 48 is a screen shot of an Import Wizard.
Figure 49:
FIG. 49 is a screen shot of an Import Wizard.
Figure 50:
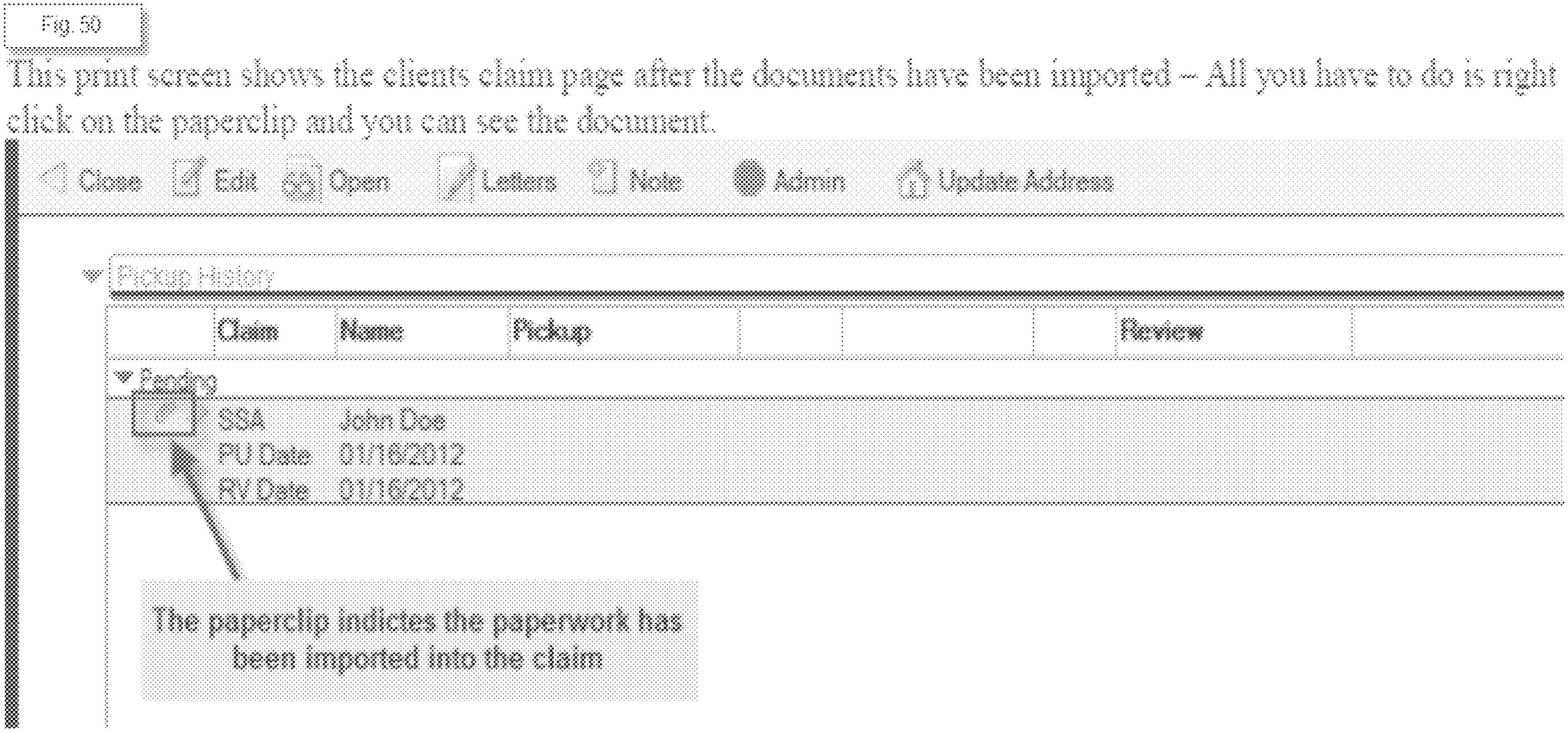
FIG. 50 is a screen shot of an Import Wizard.
Figure 51:
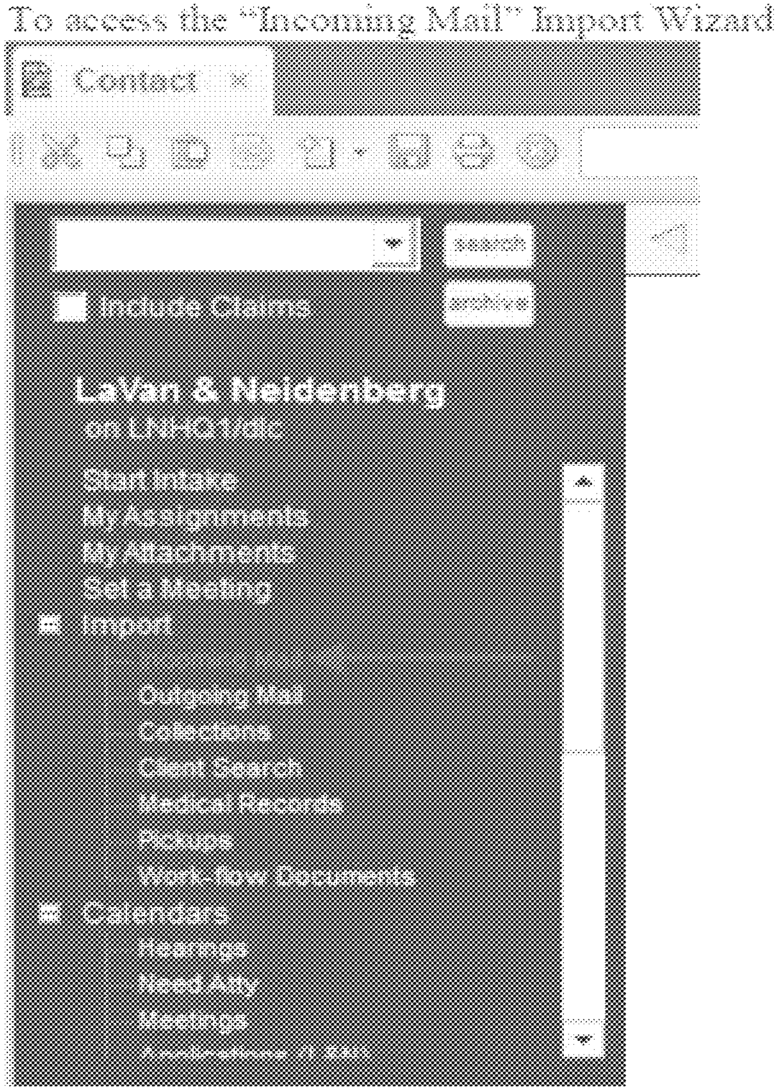
FIG. 51 is a screen shot of an Import Wizard.
Figure 52:
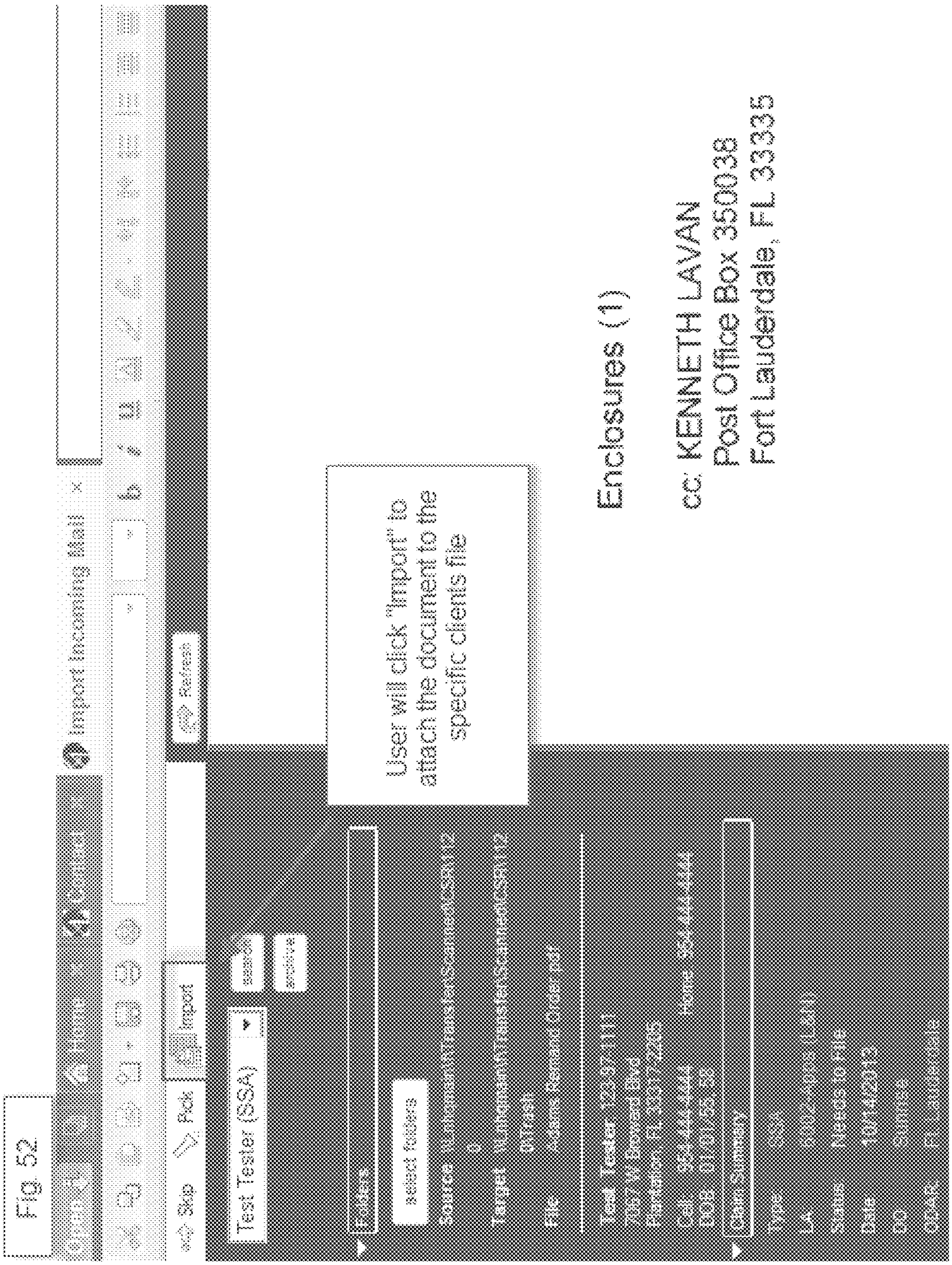
FIG. 52 is a screen shot of an Import Wizard.
Figure 53:
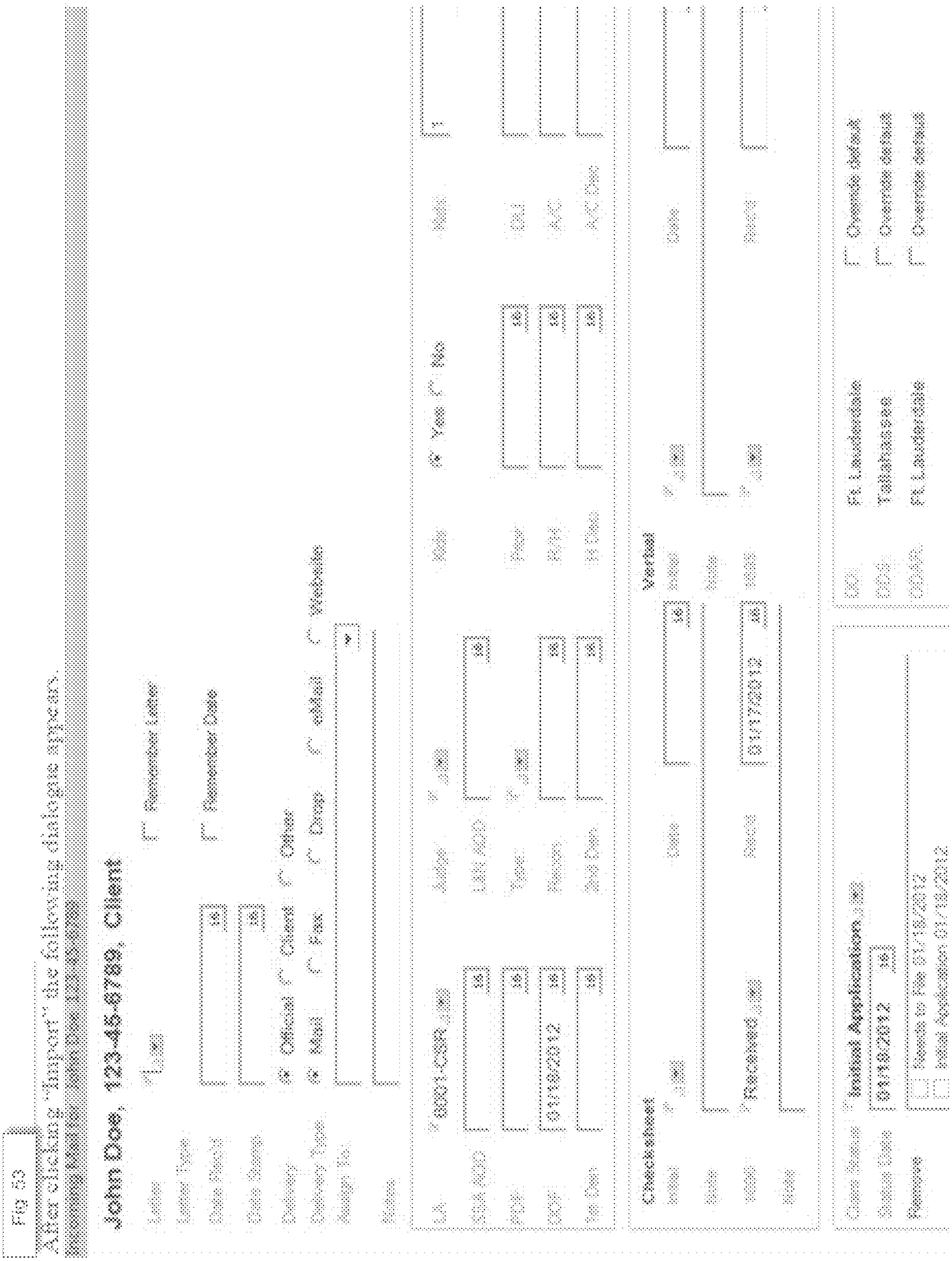
FIG. 53 is a screen shot of an Import Wizard.
Figure 54:
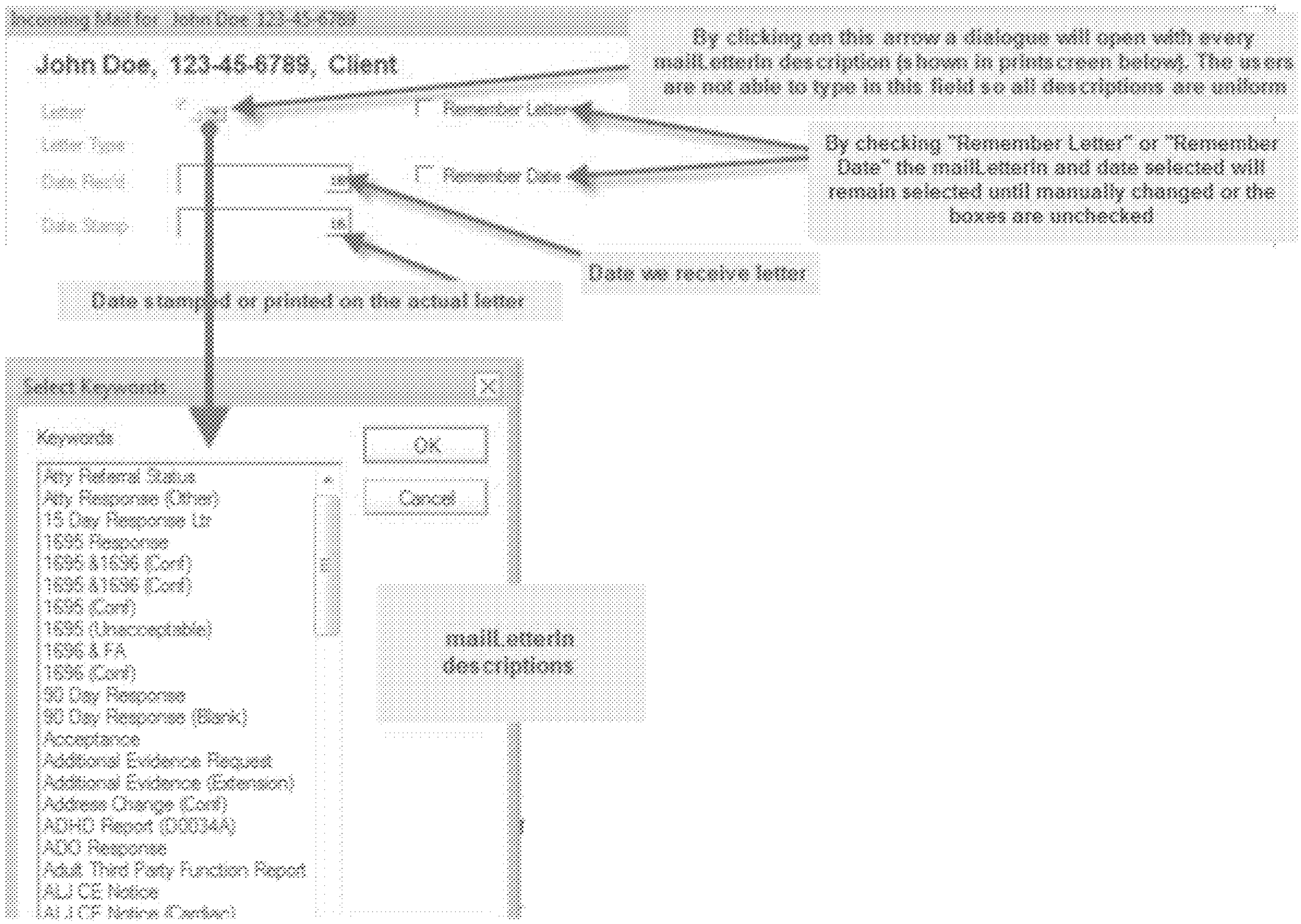
FIG. 54 is a screen shot of an Import Wizard.
Figure 55A:
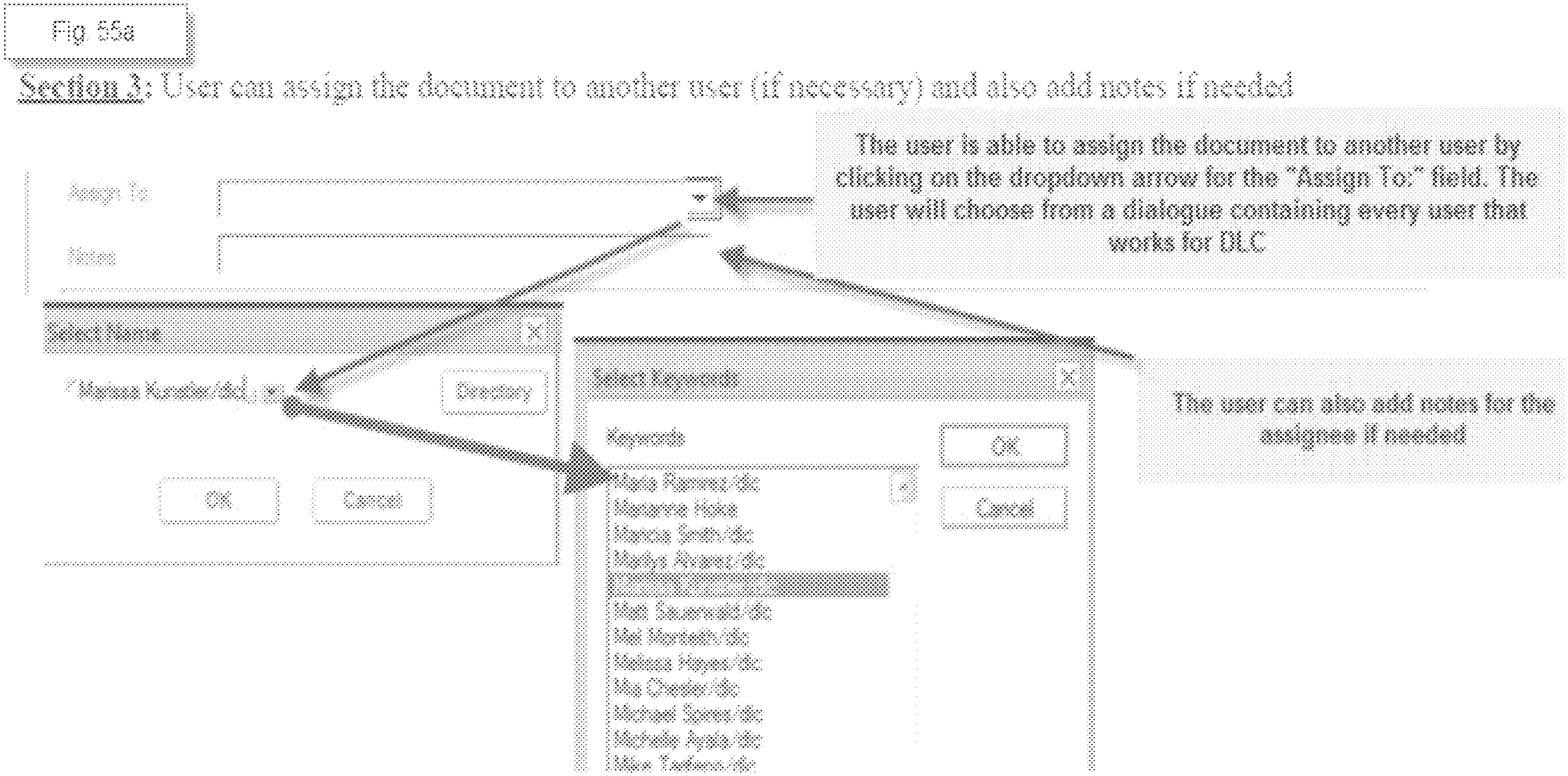
FIGS. 55*a*-55*b* are a screen shot of an Import Wizard.
Figure 55B:
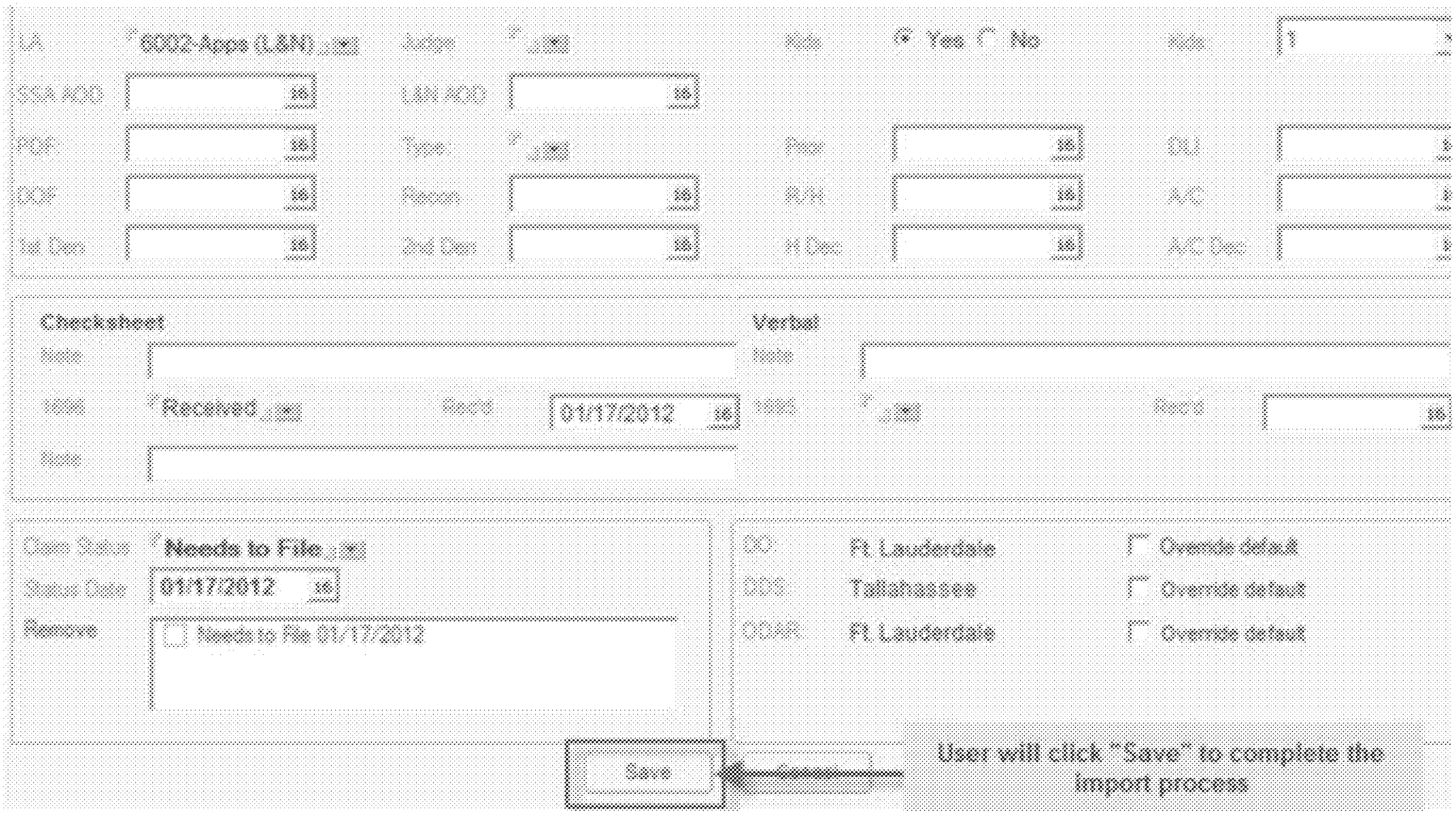
Figure 56:
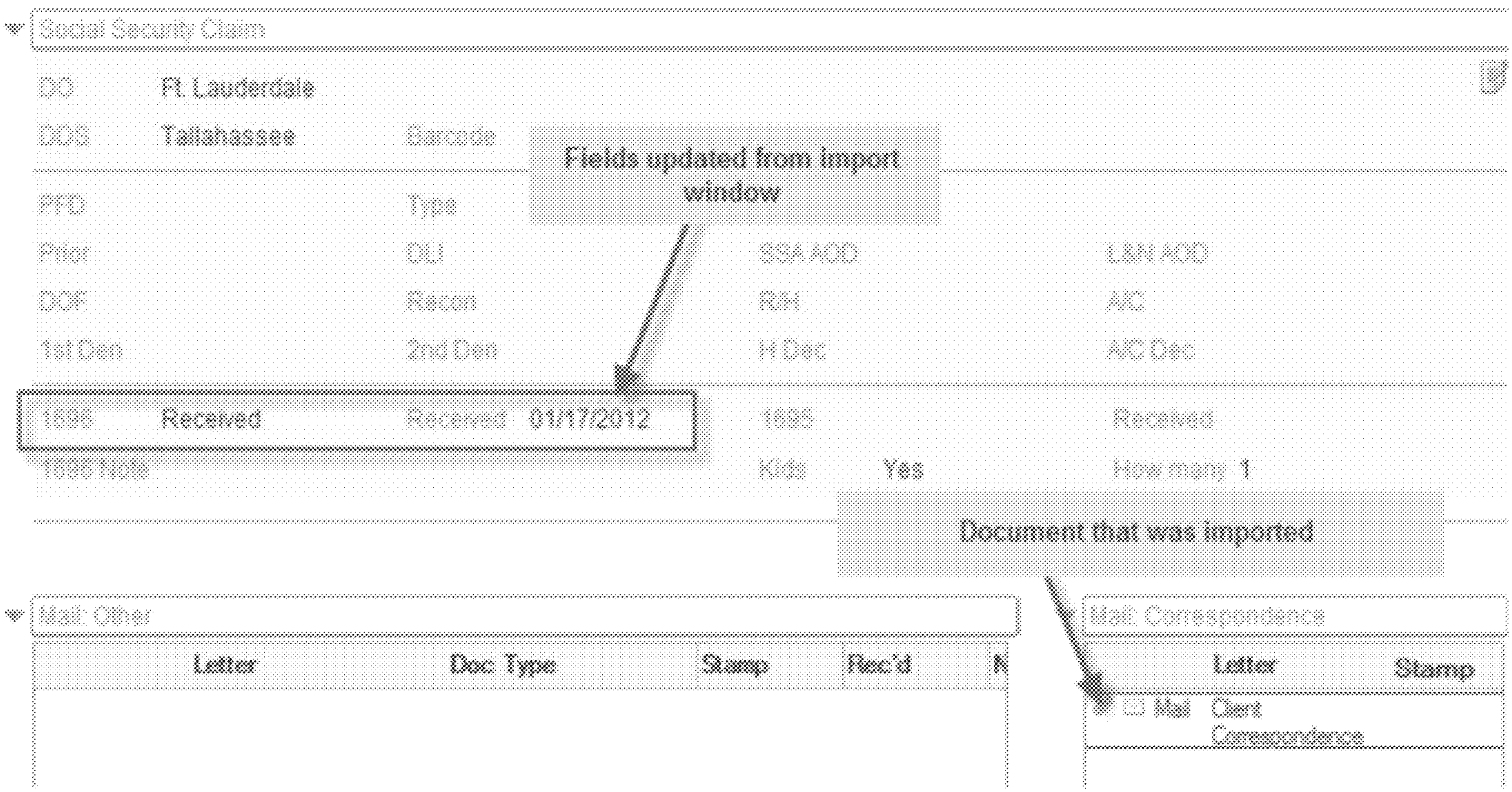
FIG. 56 is a screen shot of an Import Wizard.
Figure 57:
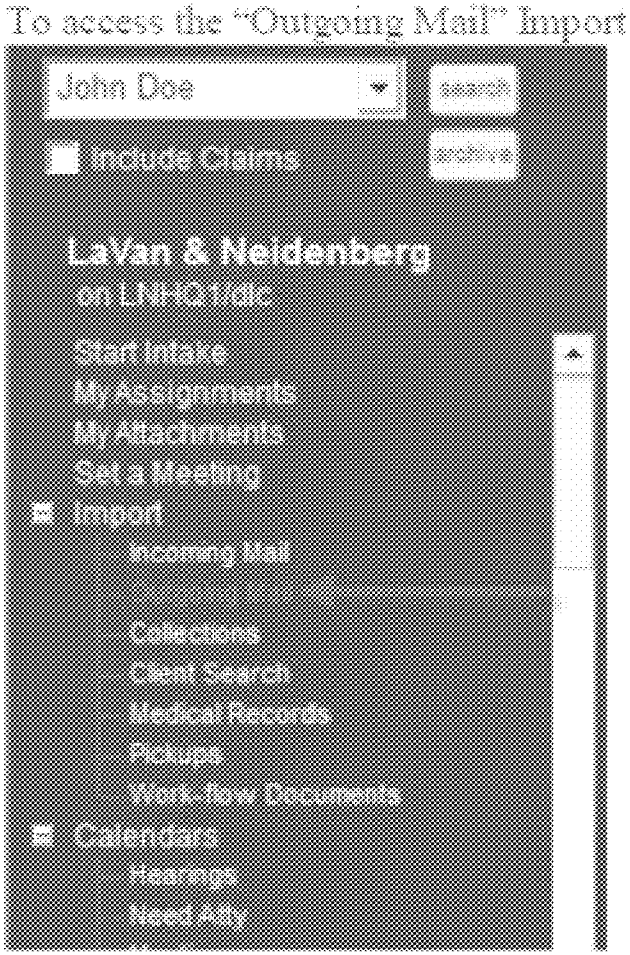
FIG. 57 is a screen shot of an Import Wizard.
Figure 58:
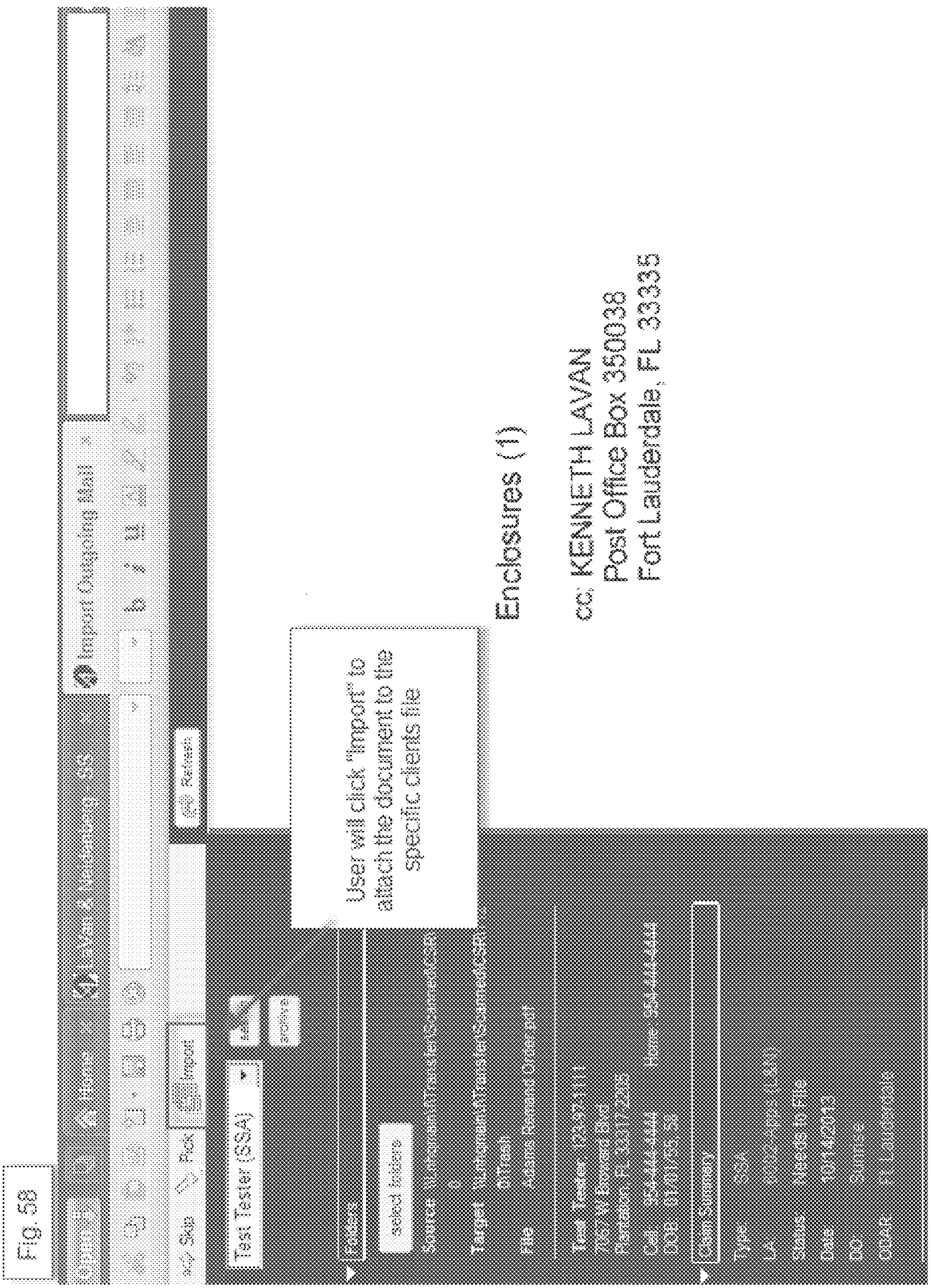
FIG. 58 is a screen shot of an Import Wizard.
Figure 59:
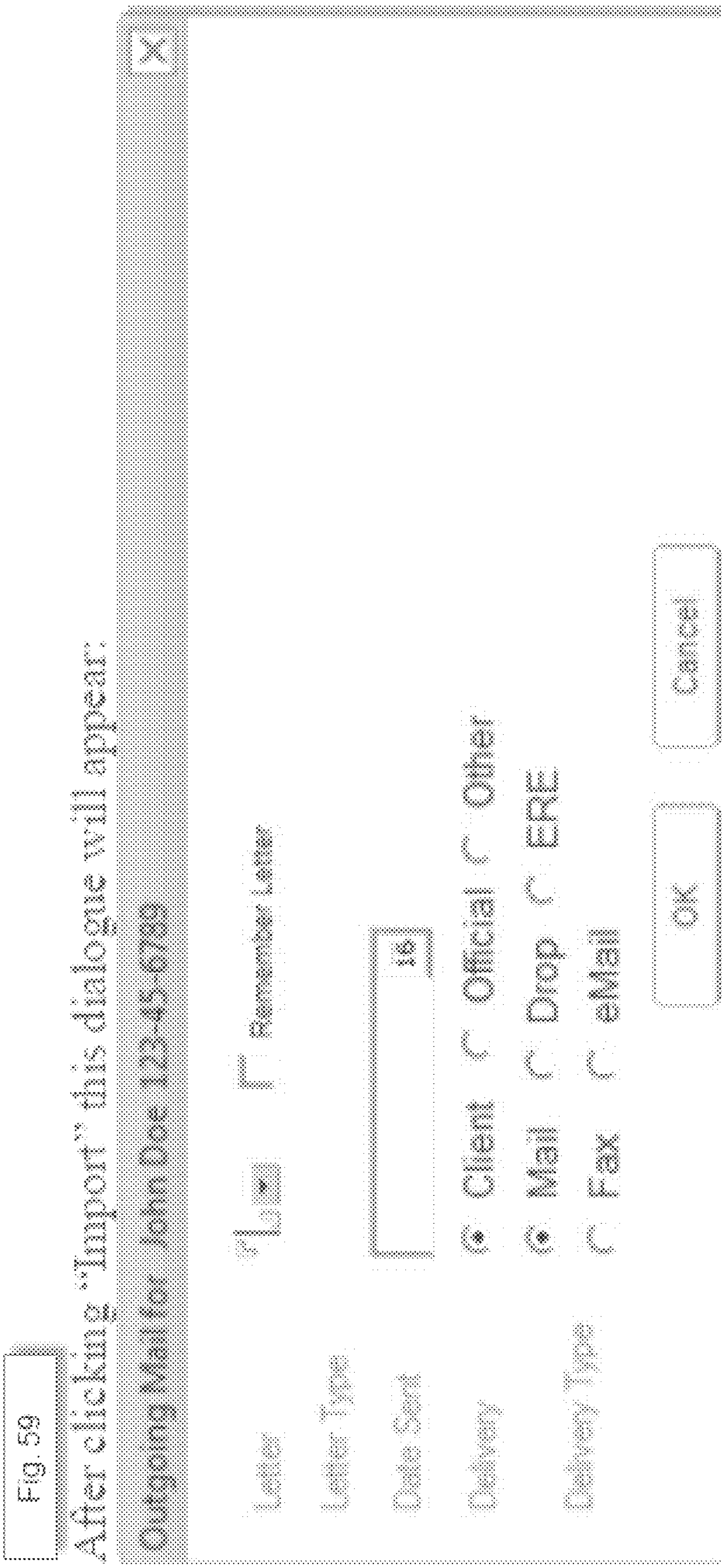
FIG. 59 is a screen shot of an Import Wizard.
Figure 60:
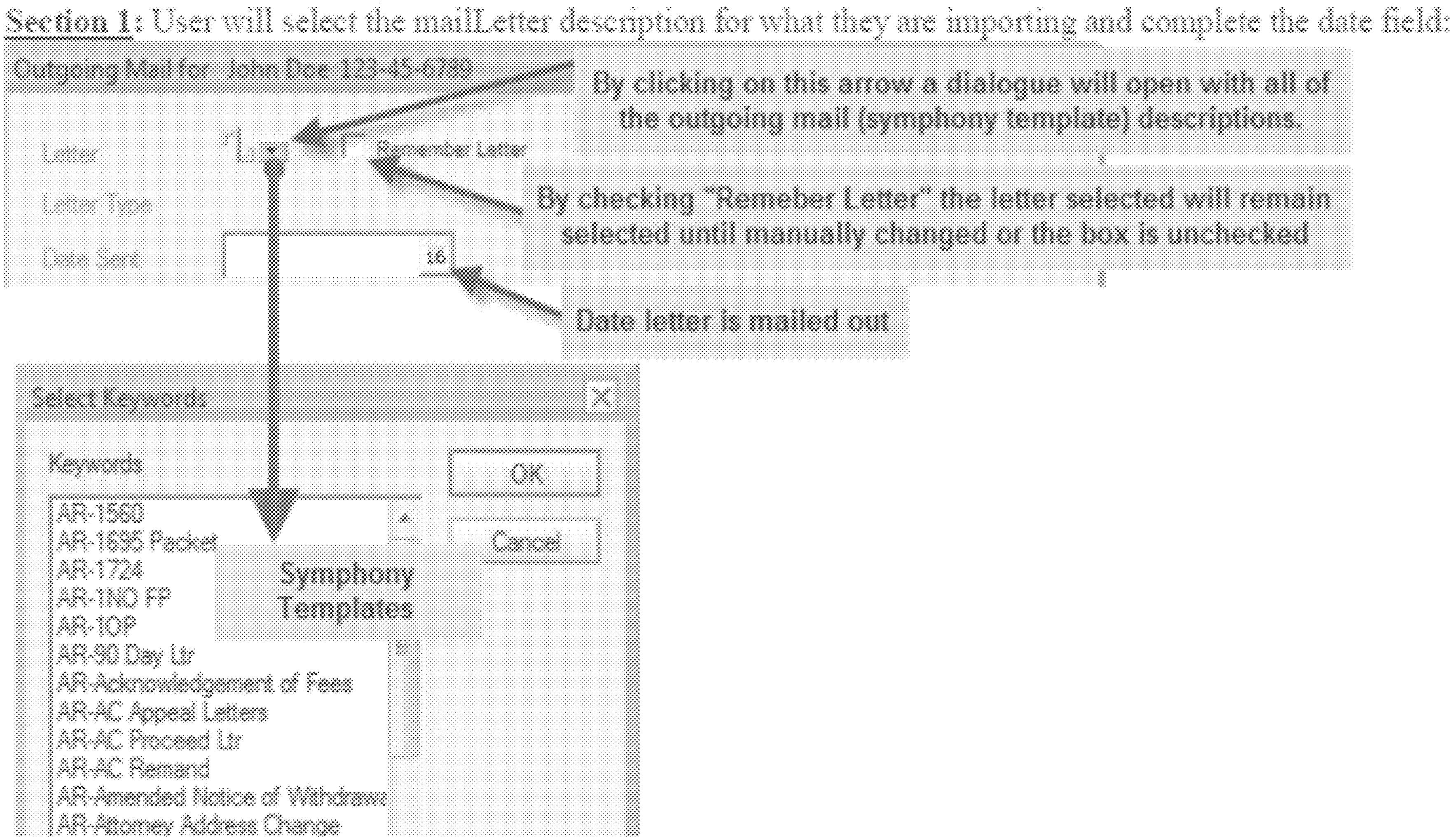
FIG. 60 is a screen shot of an Import Wizard.
Figure 61:
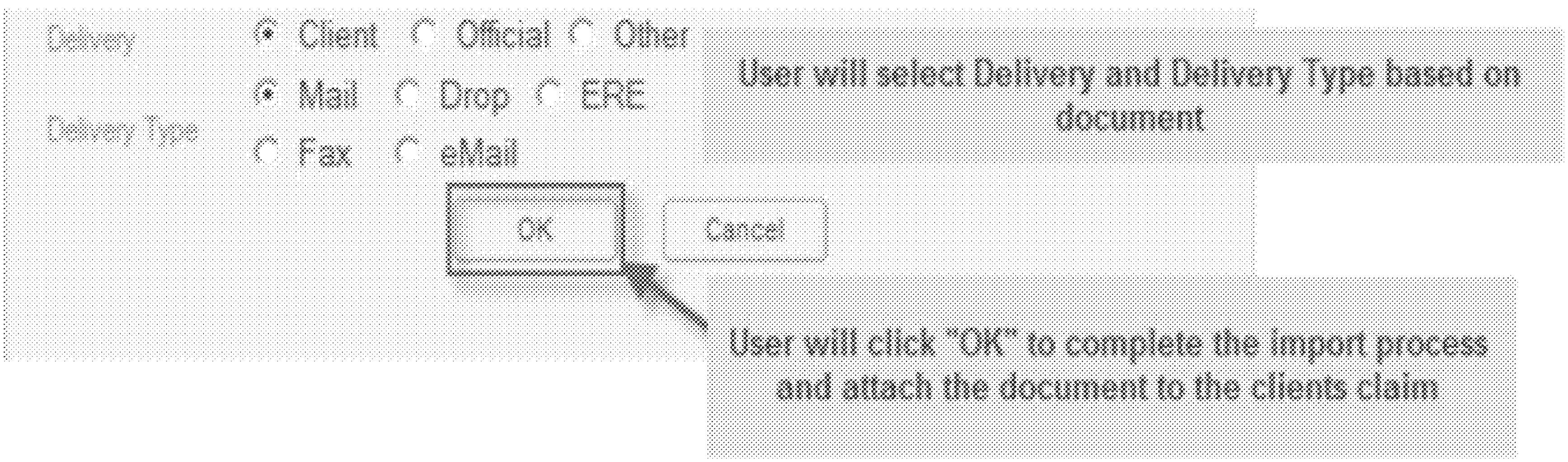
FIG. 61 is a screen shot of an Import Wizard.
Figure 62:
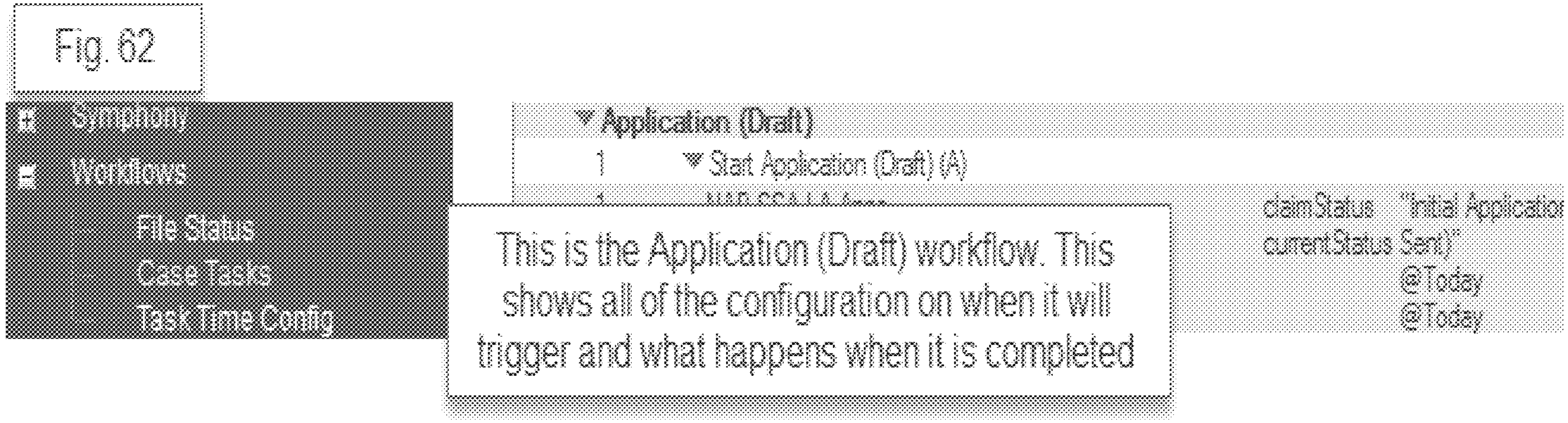
FIG. 62 is a screen shot of an Import Wizard.
Figure 63:
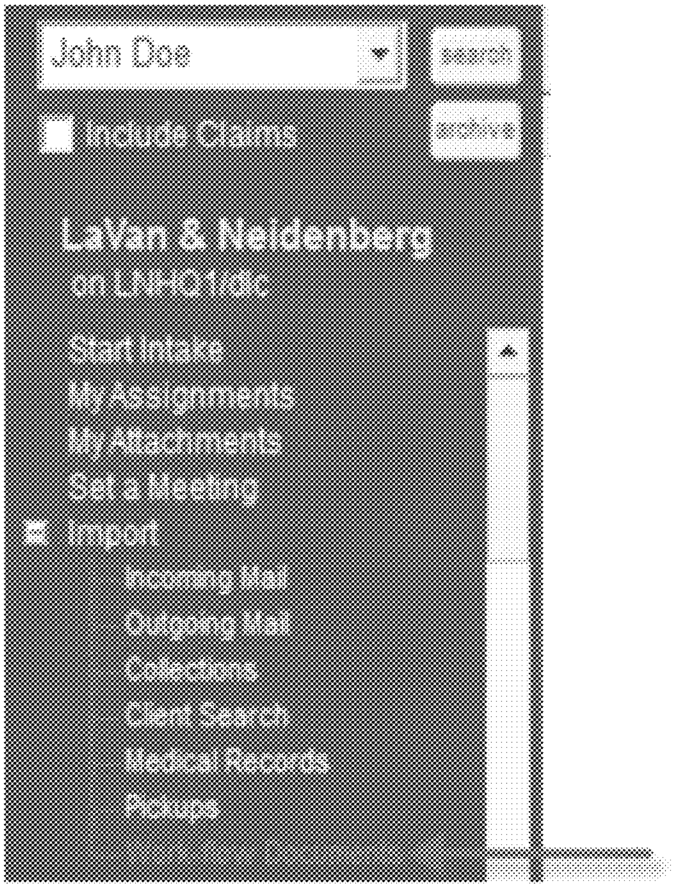
FIG. 63 is a screen shot of an Import Wizard.
Figure 64:
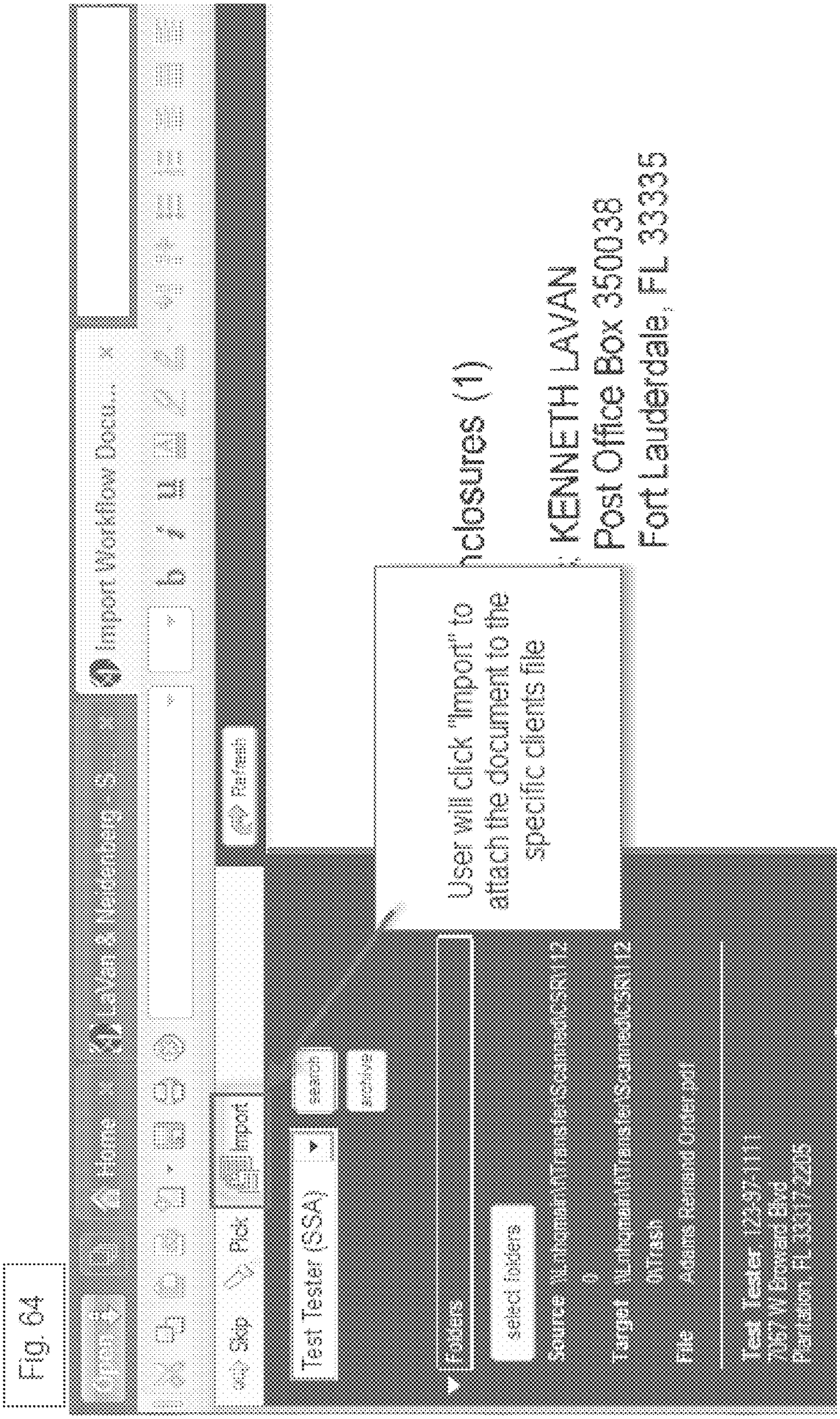
FIG. 64 is a screen shot of an Import Wizard.
Figure 65:
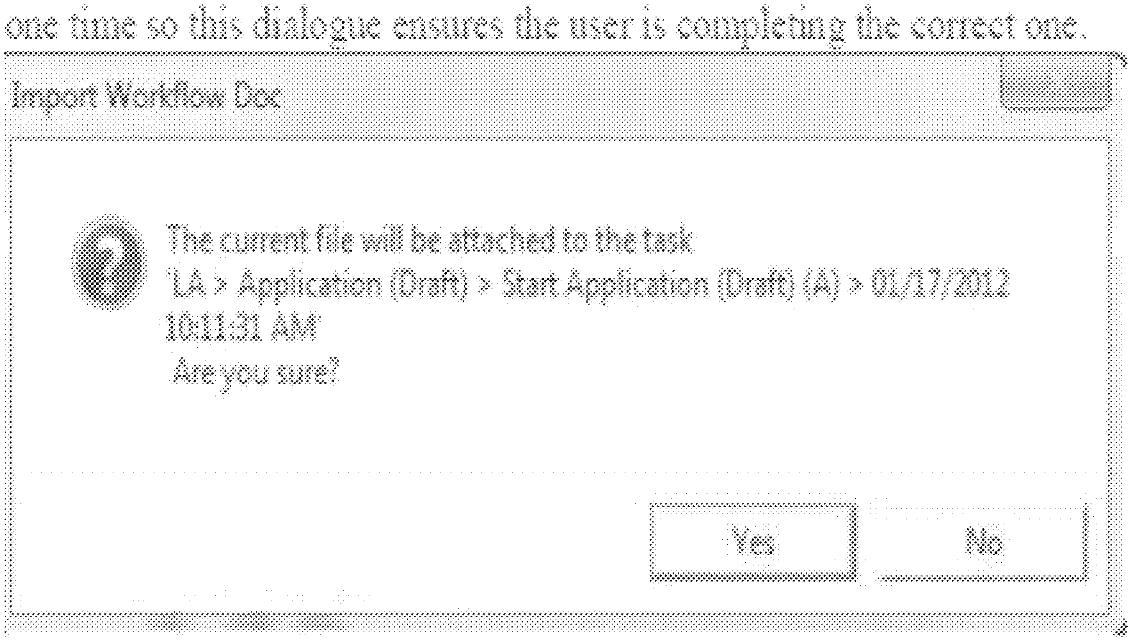
FIG. 65 is a screen shot of an Import Wizard.
Figure 66:
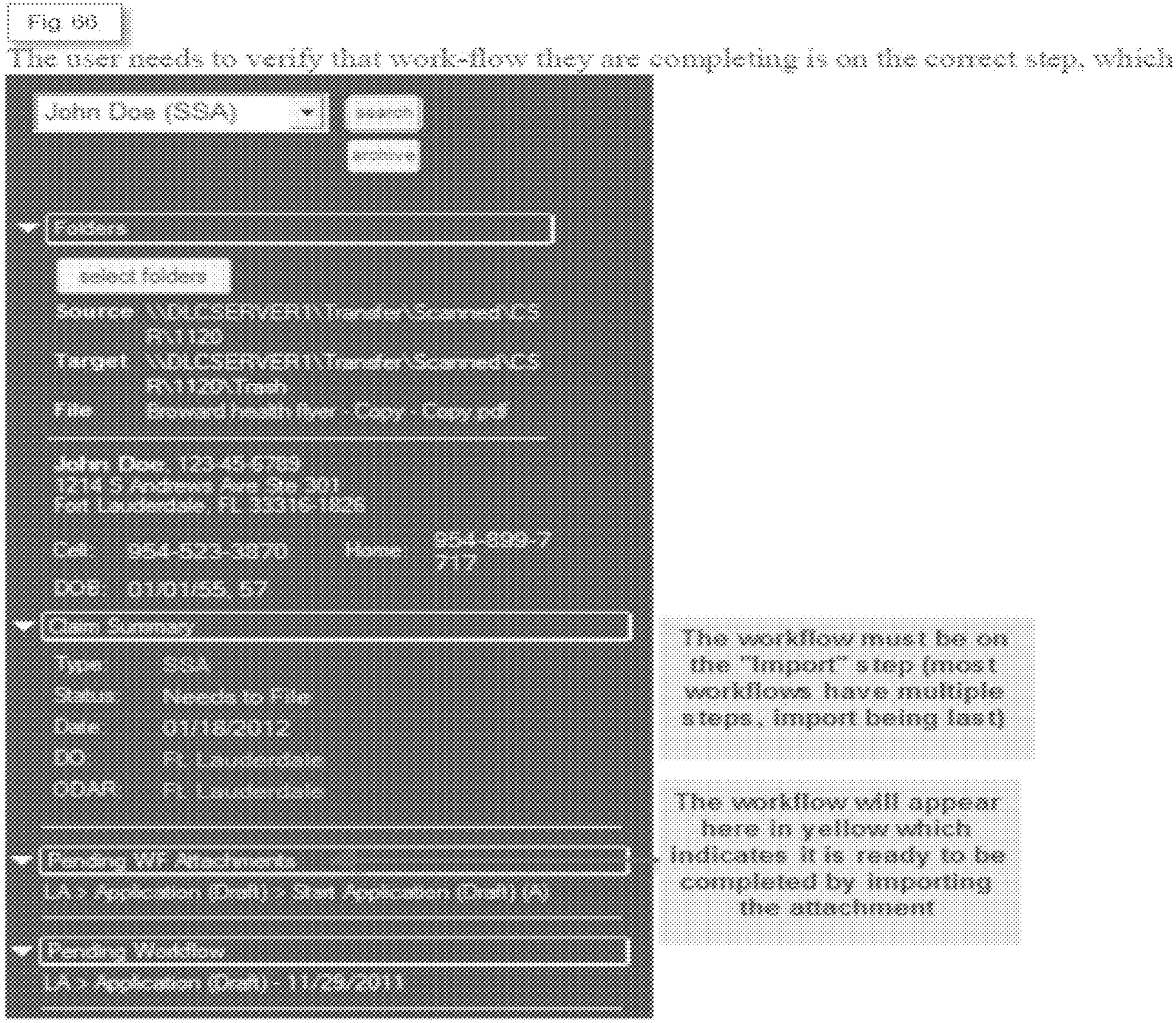
FIG. 66 is a screen shot of an Import Wizard.
Figure 67A:
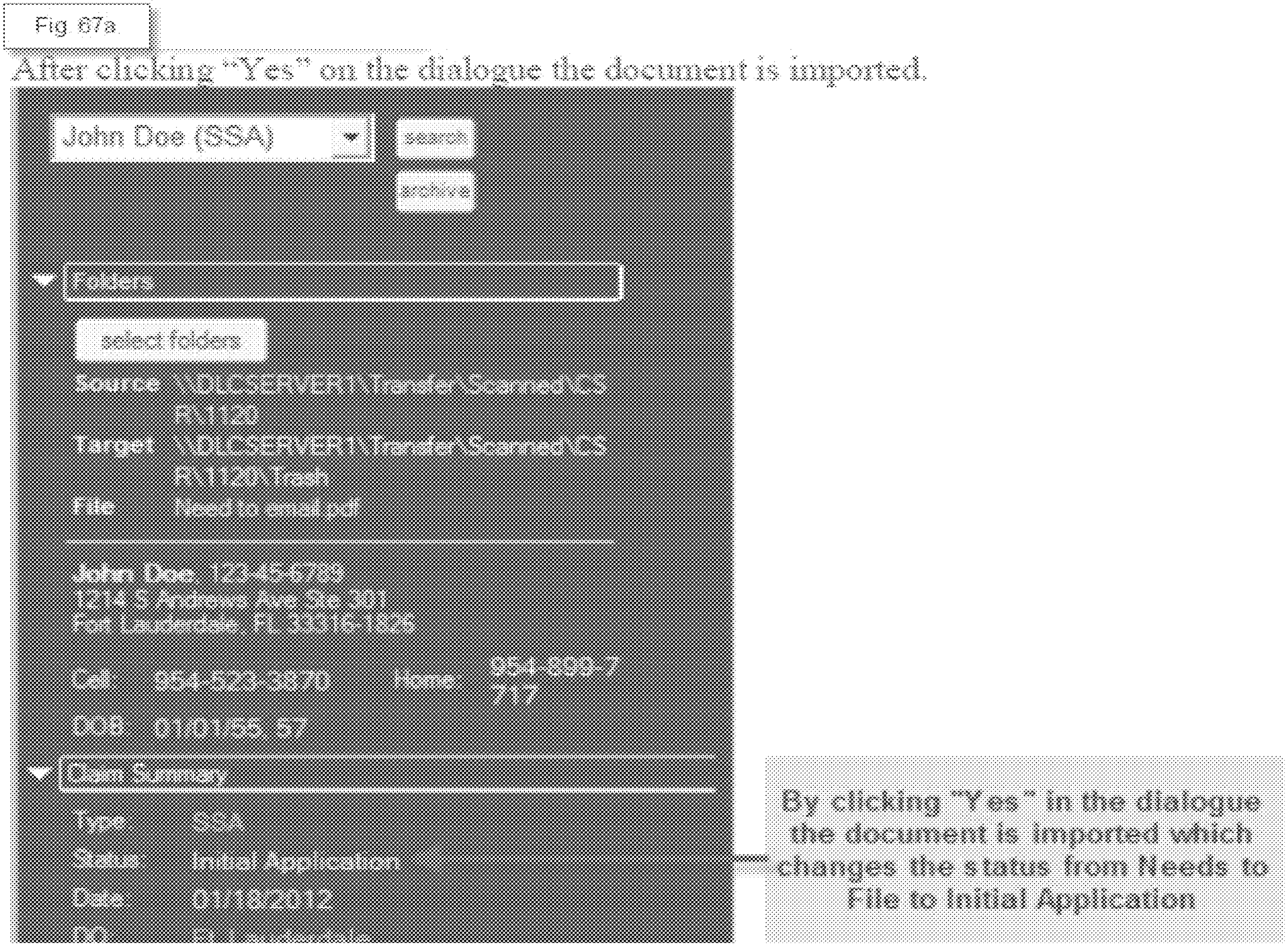
FIGS. 67*a*-67*b* are a screen shot of an Import Wizard.
Figure 67B:
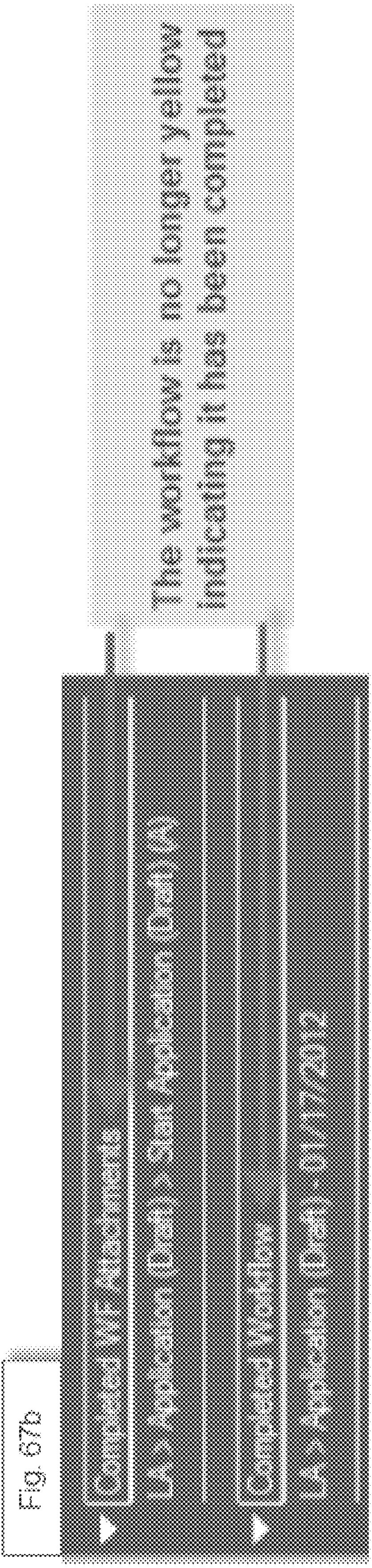
Figure 68:
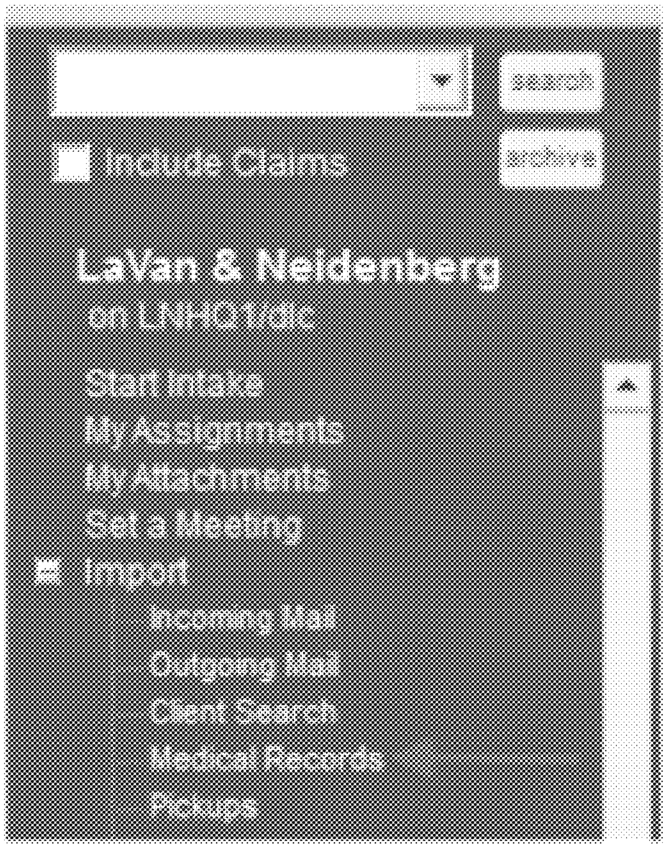
FIG. 68 is a screen shot of an Import Wizard.
Figure 69:
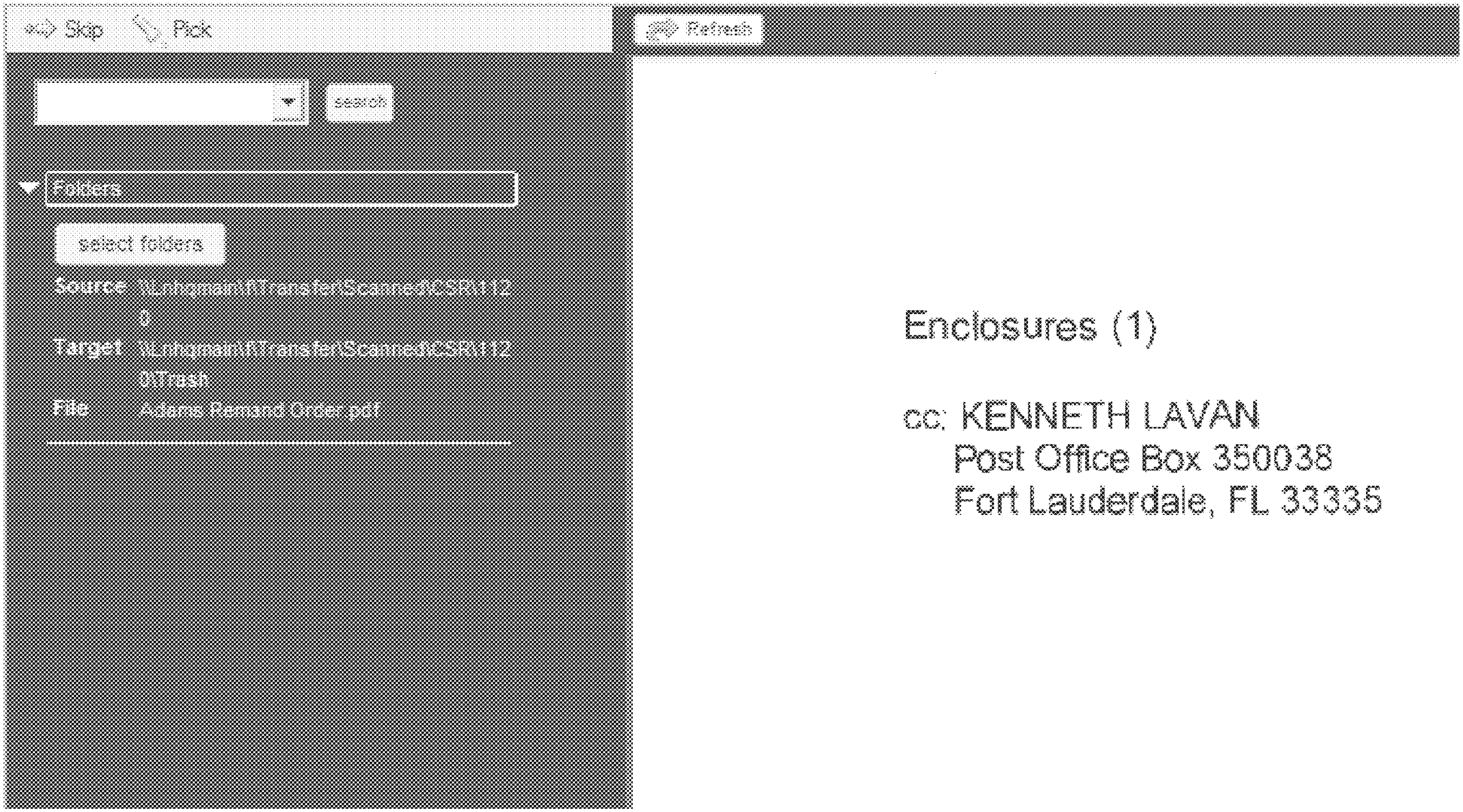
FIG. 69 is a screen shot of an Import Wizard.
Figure 70A:
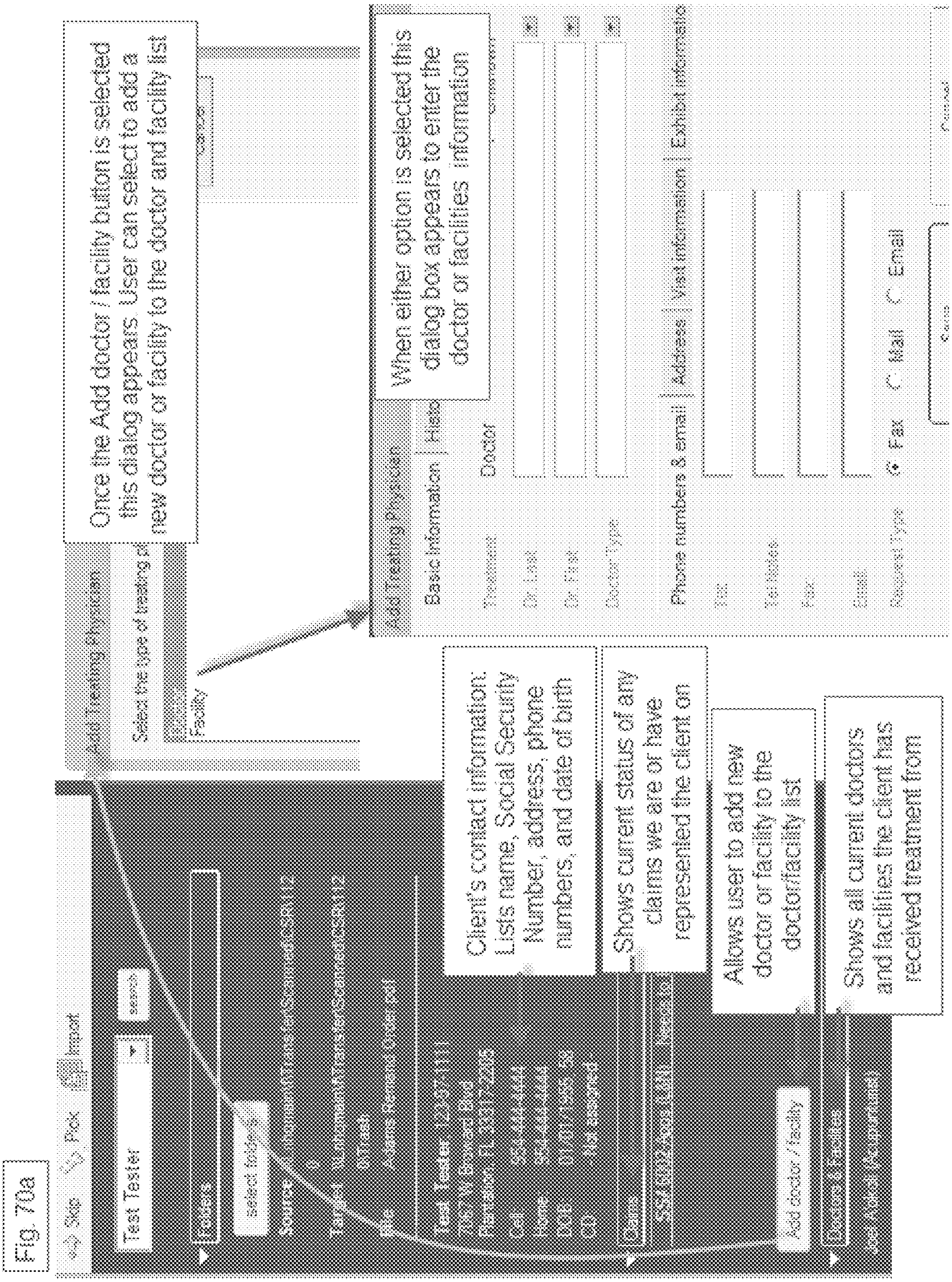
FIGS. 70*a*-70*b* are a screen shot of an Import Wizard.
Figure 70B:
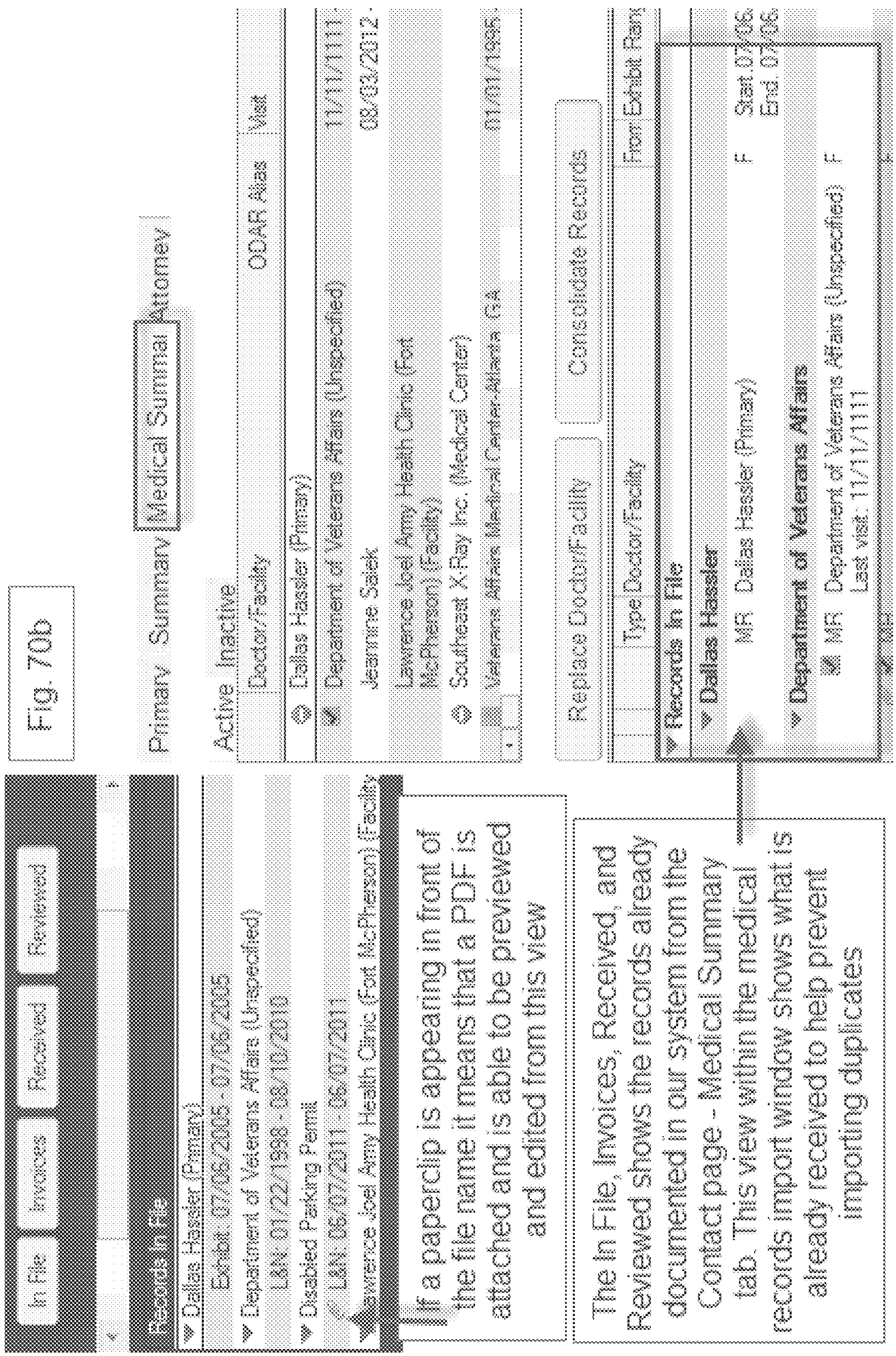
Figure 71:
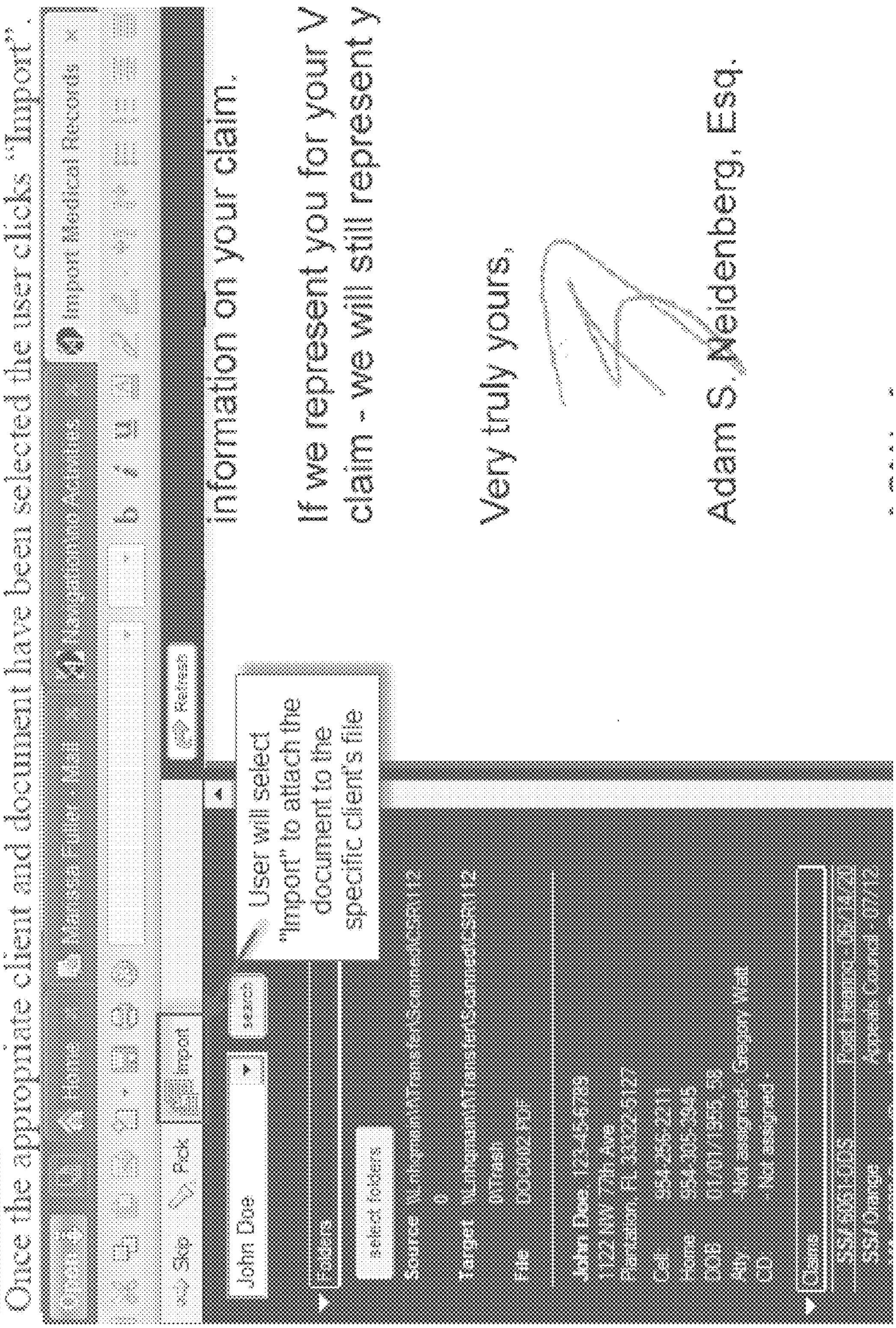
FIG. 71 is a screen shot of an Import Wizard.
Figure 72:
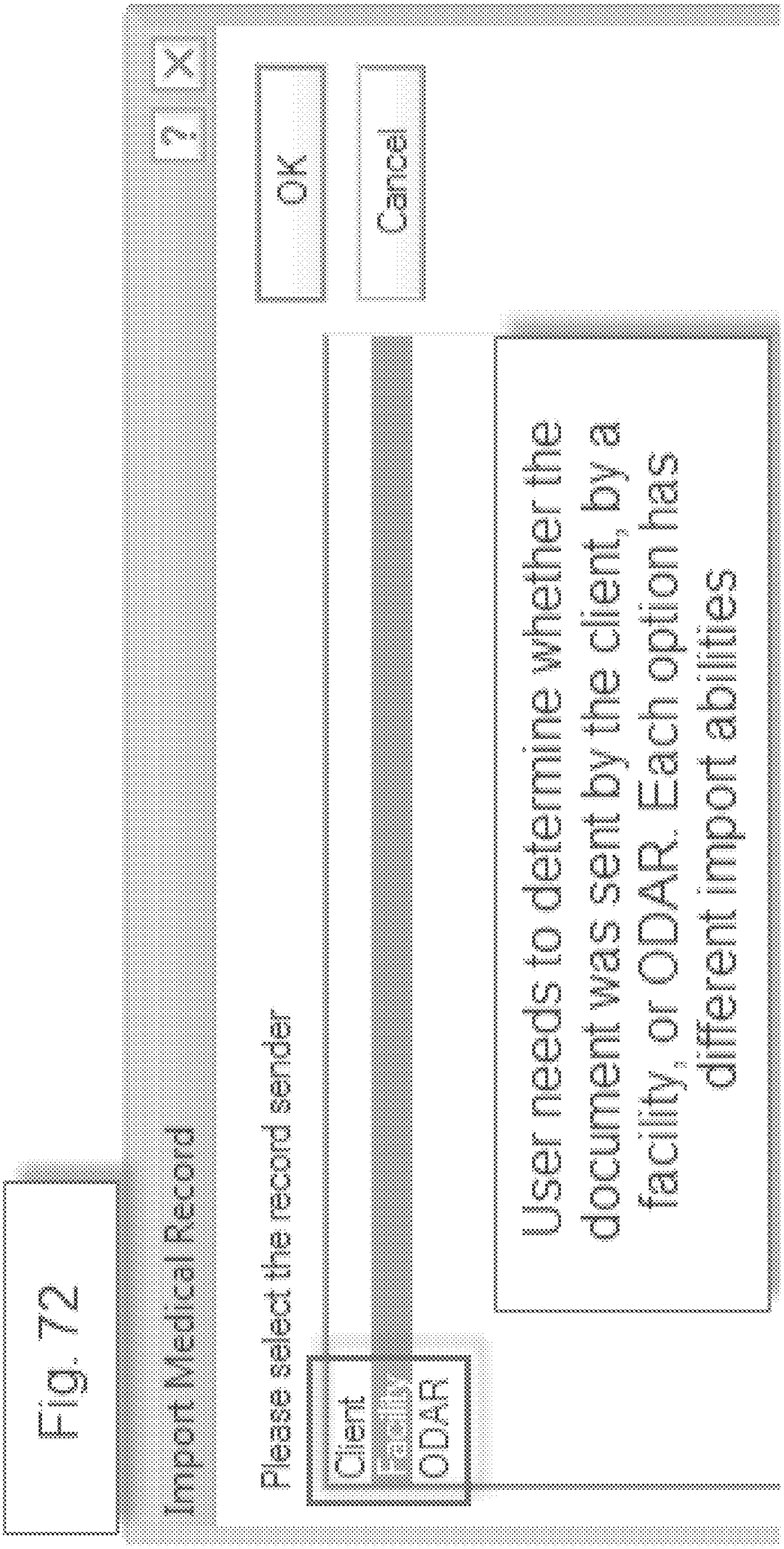
FIG. 72 is a screen shot of an Import Wizard.
Figure 73:
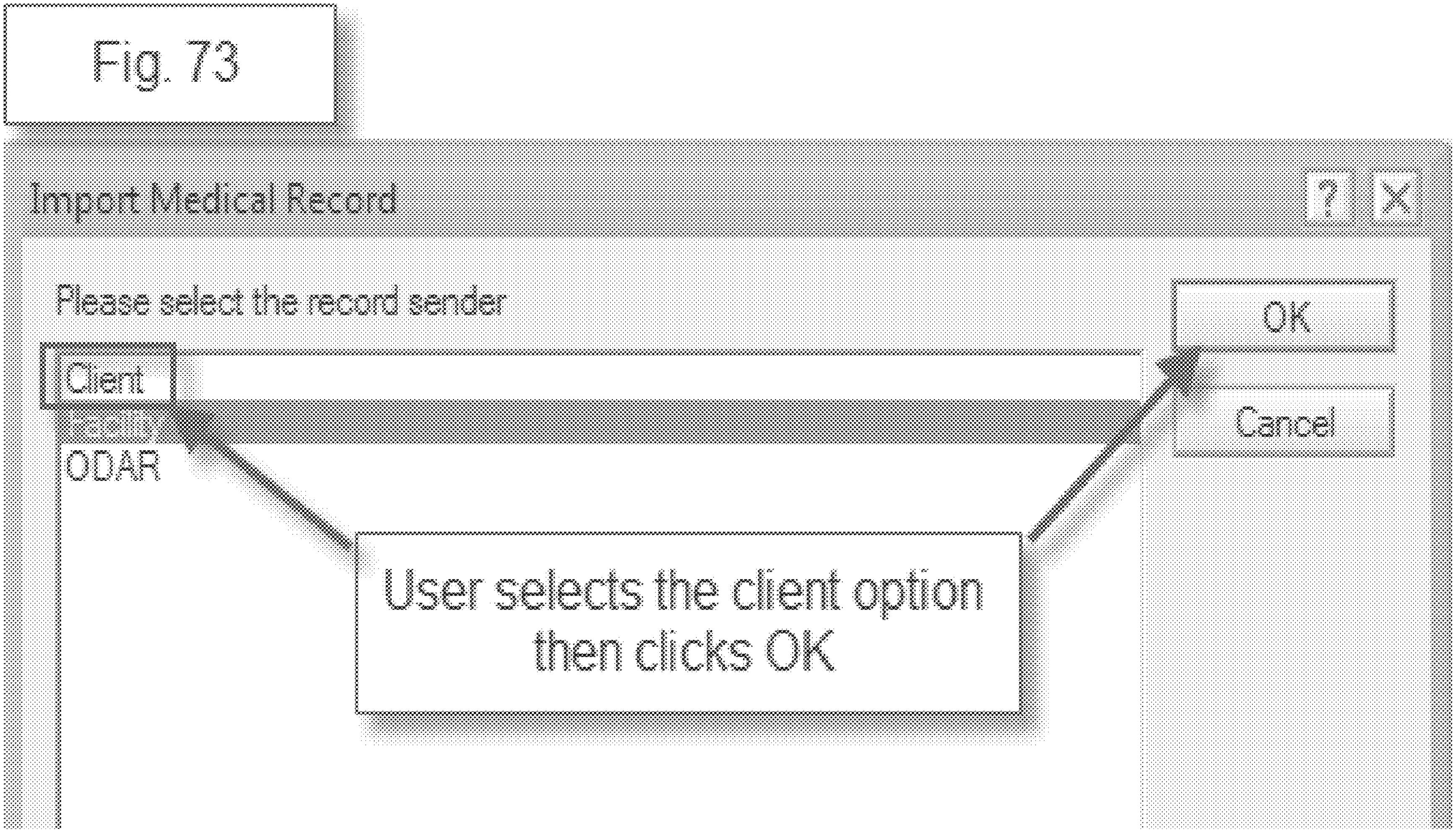
FIG. 73 is a screen shot of an Import Wizard.
Figure 74:
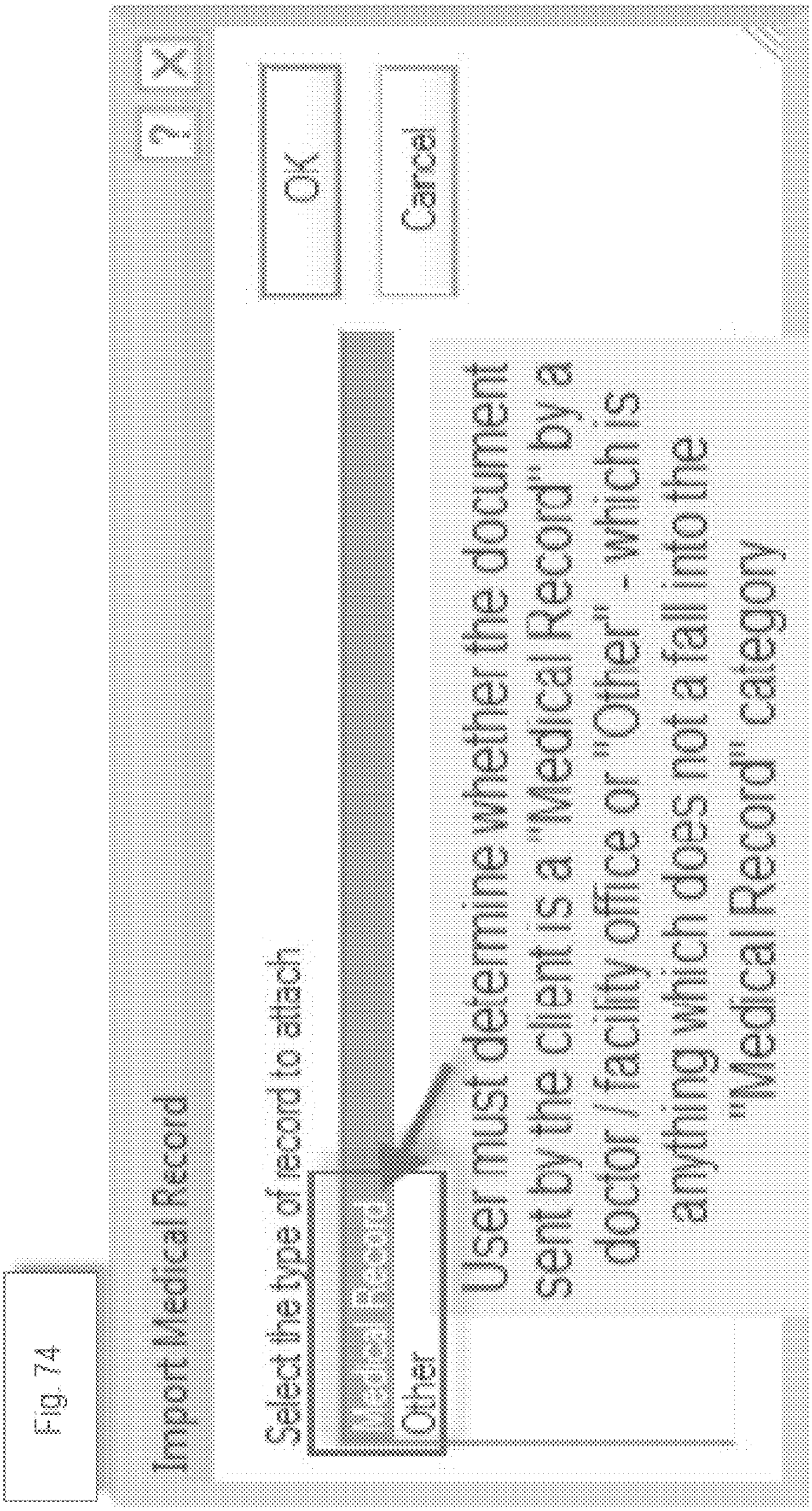
FIG. 74 is a screen shot of an Import Wizard.
Figure 75:
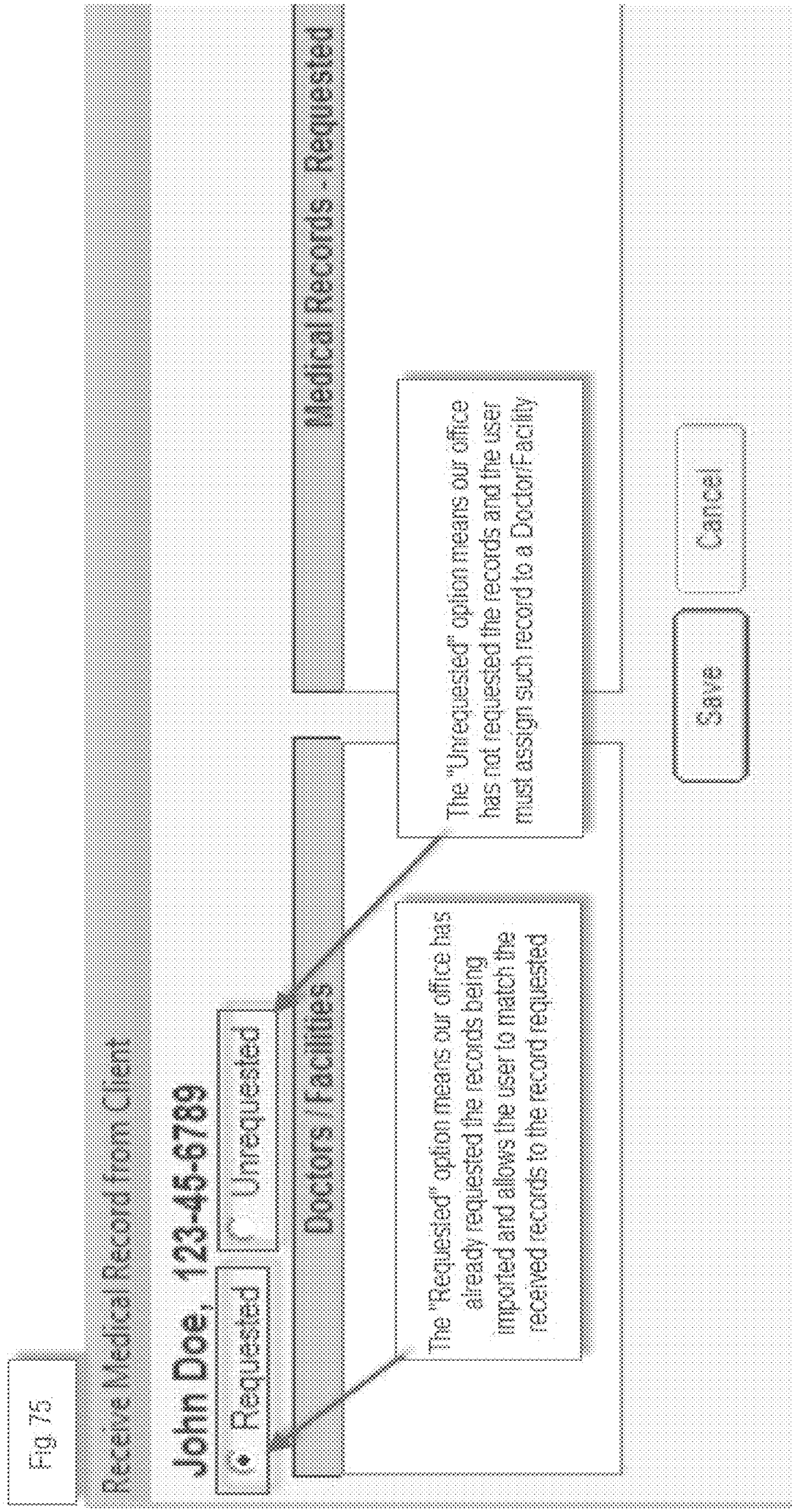
FIG. 75 is a screen shot of an Import Wizard.
Figure 76A:
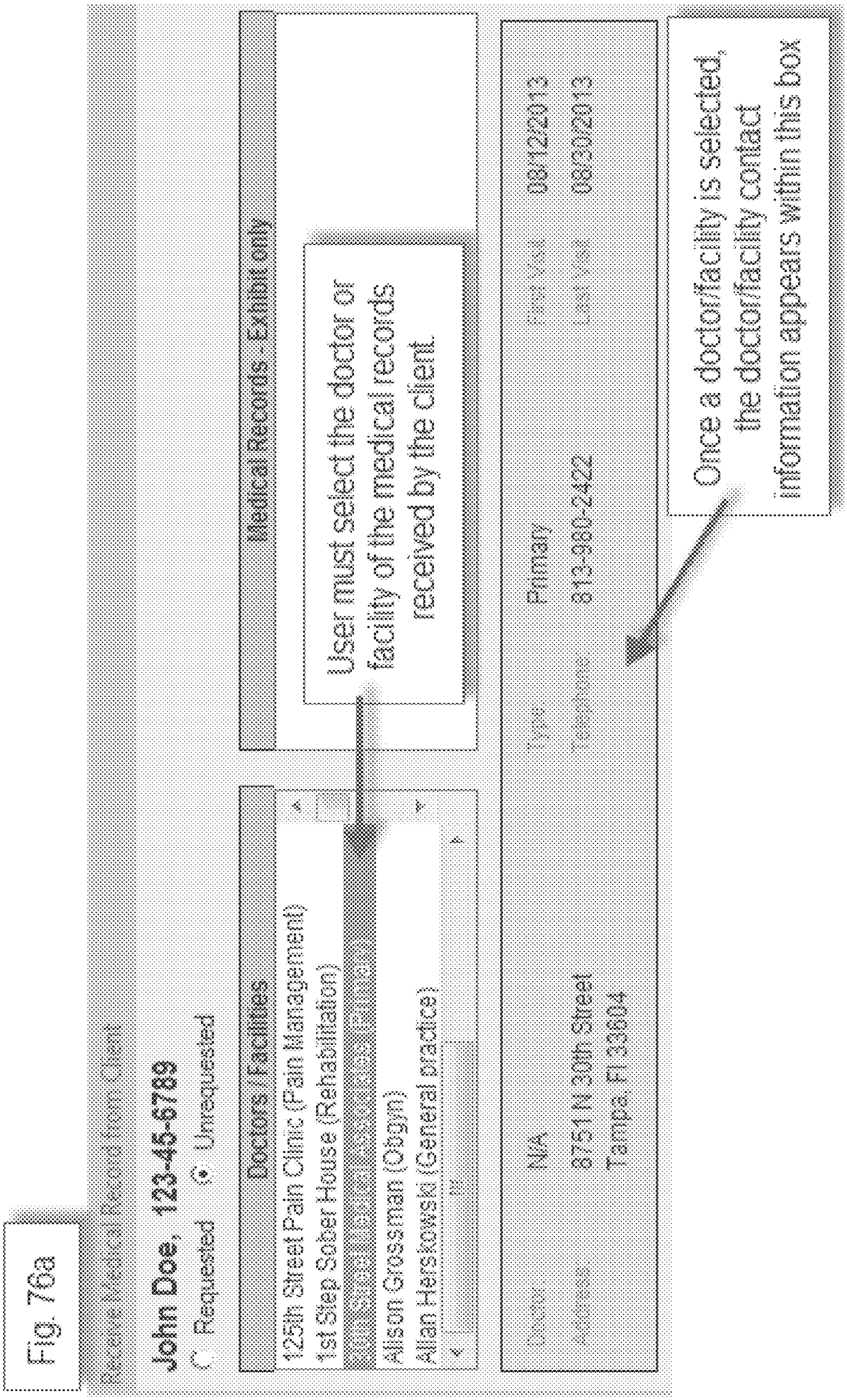
FIGS. 76*a*-76*b* are a screen shot of an Import Wizard.
Figure 76B:
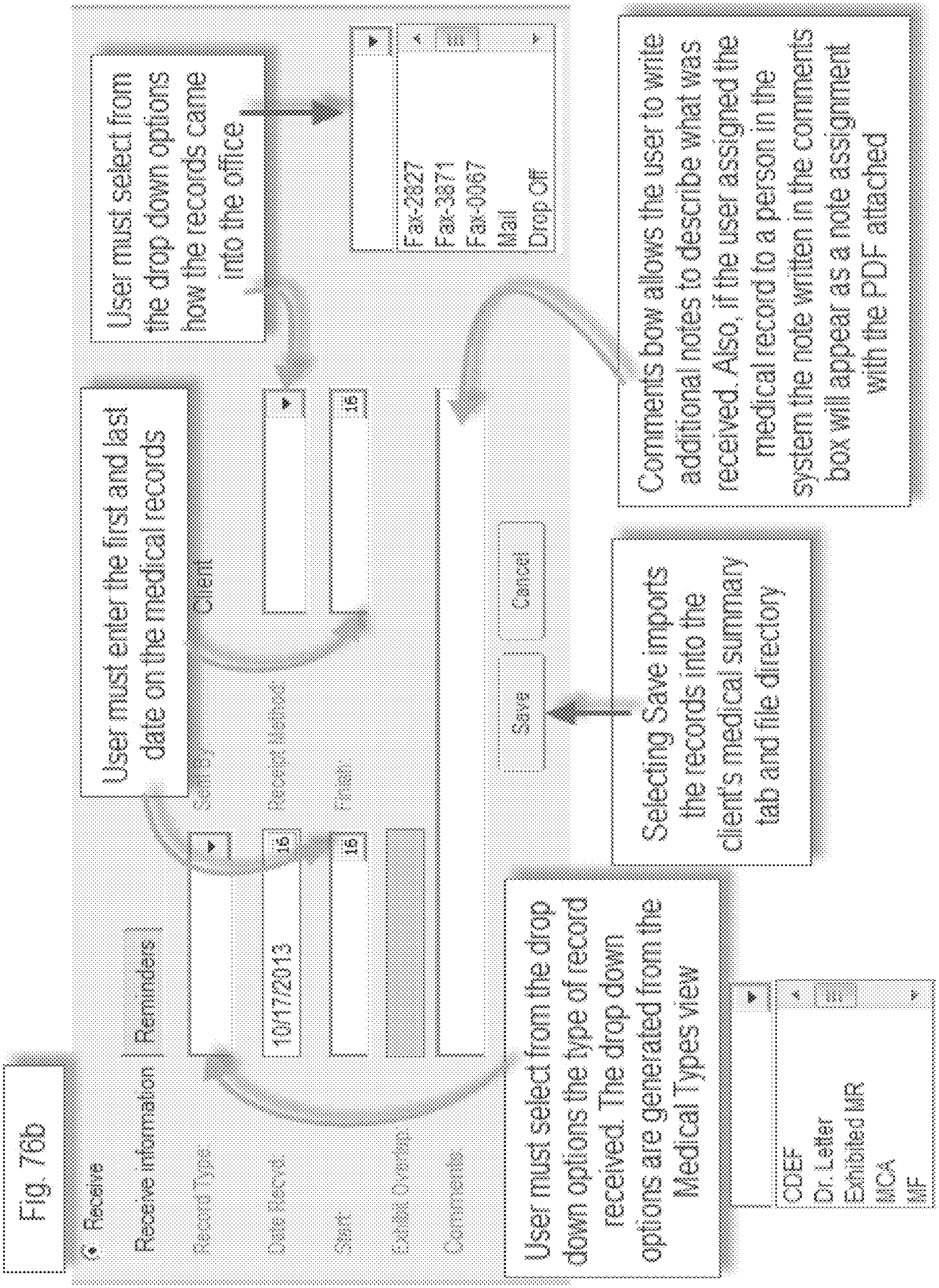
Figure 77:
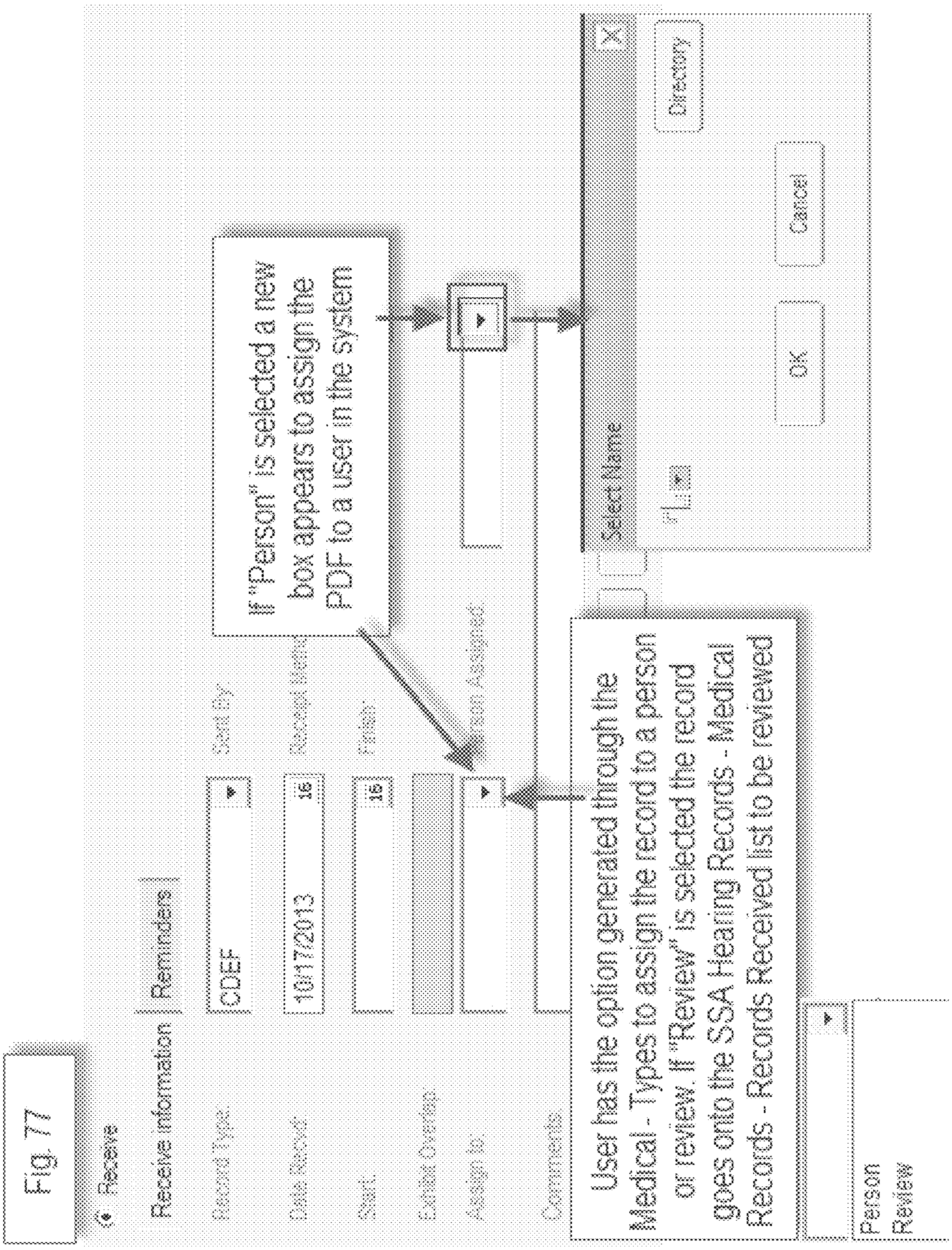
FIG. 77 is a screen shot of an Import Wizard.
Figure 78:
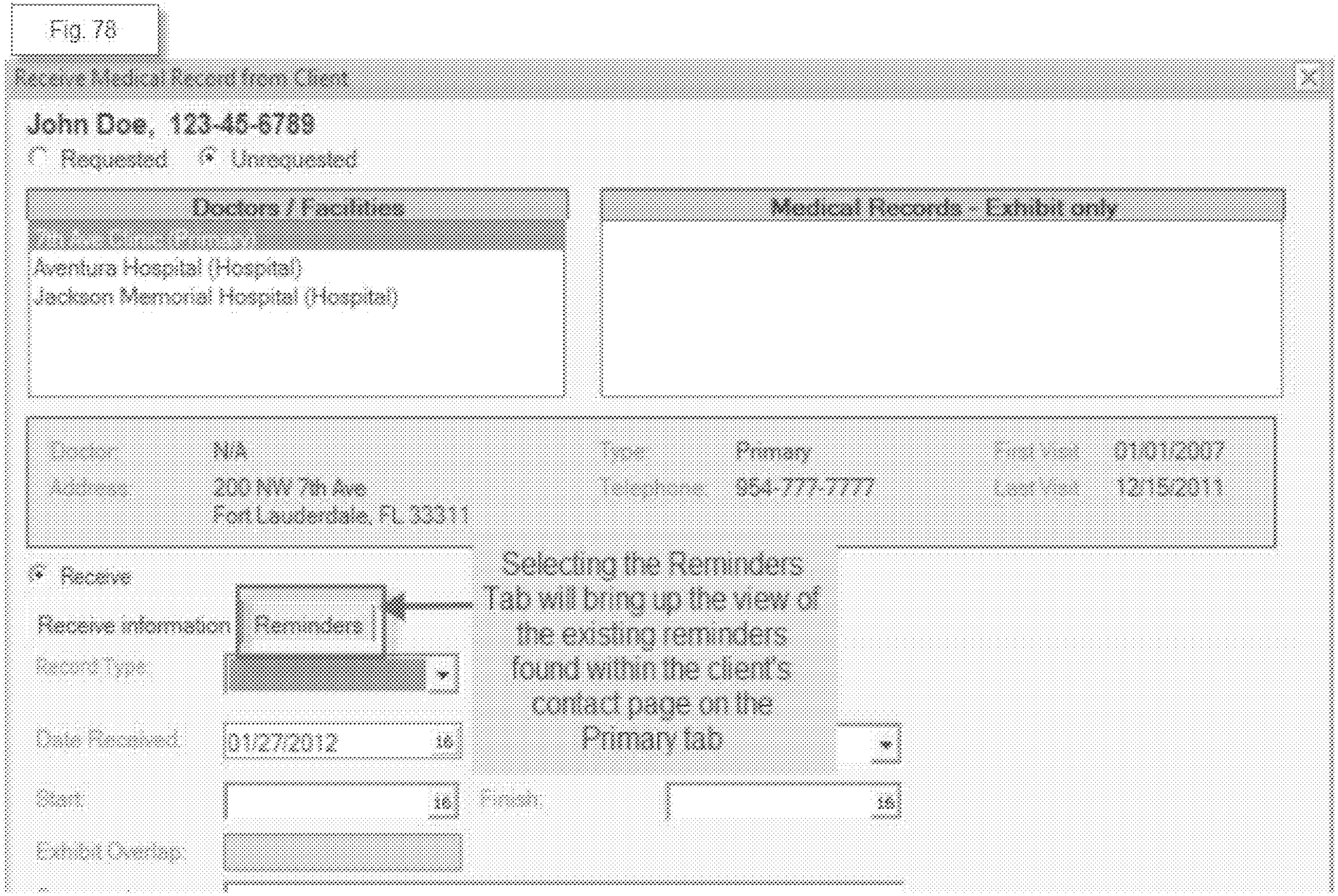
FIG. 78 is a screen shot of an Import Wizard.
Figure 79:
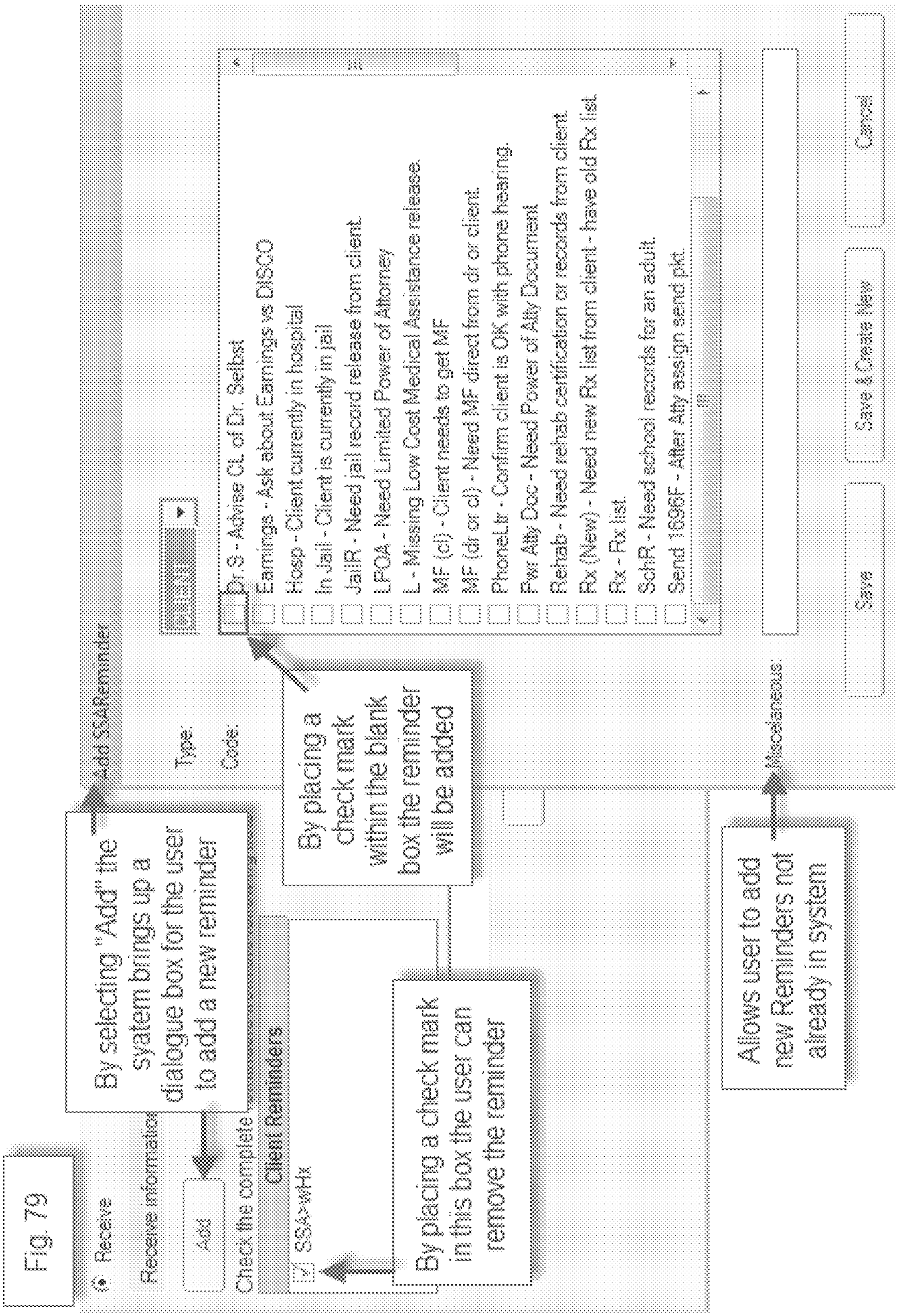
FIG. 79 is a screen shot of an Import Wizard.
Figure 81:
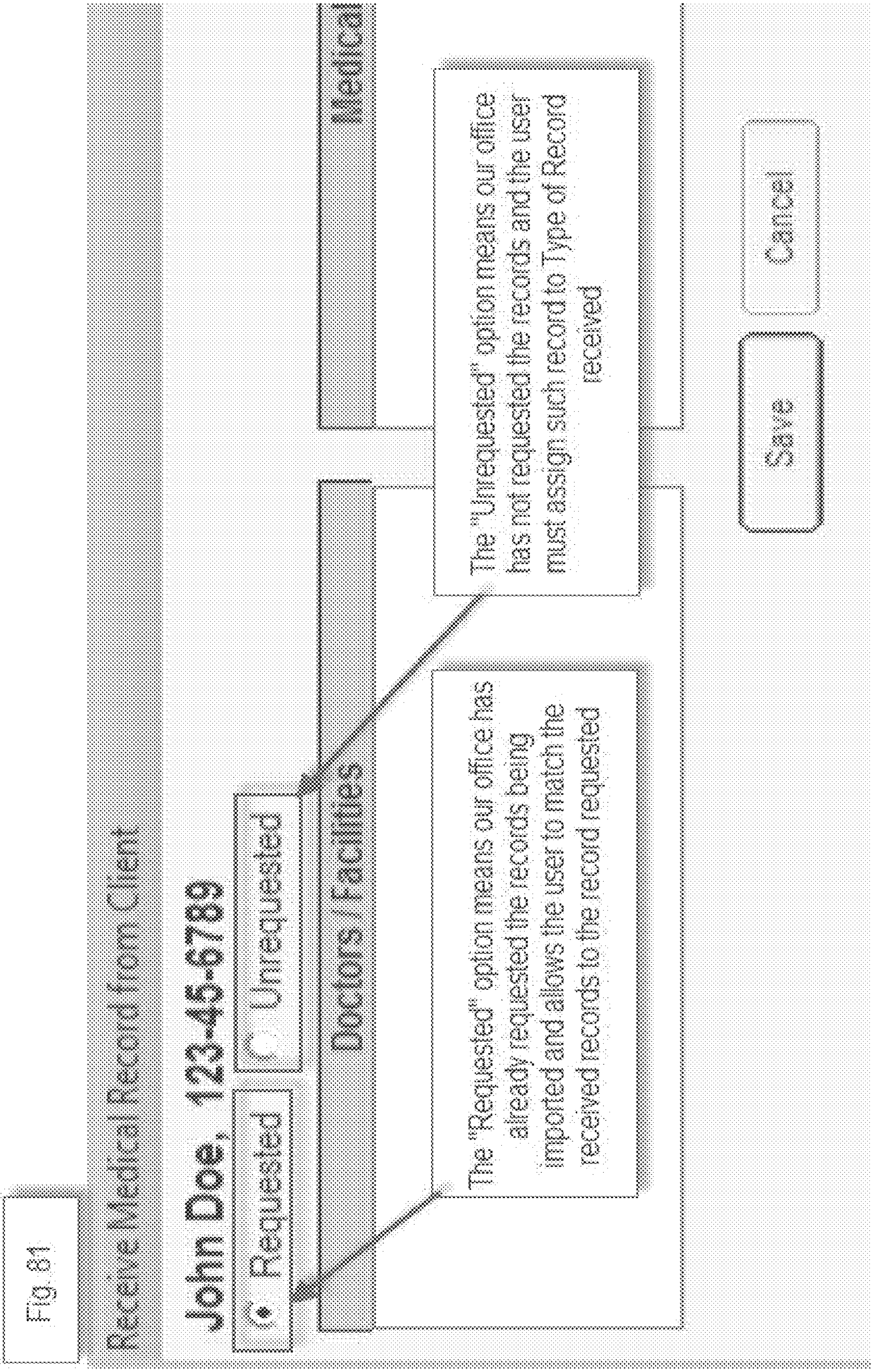
FIG. 81 is a screen shot of an Import Wizard.
Figure 82:
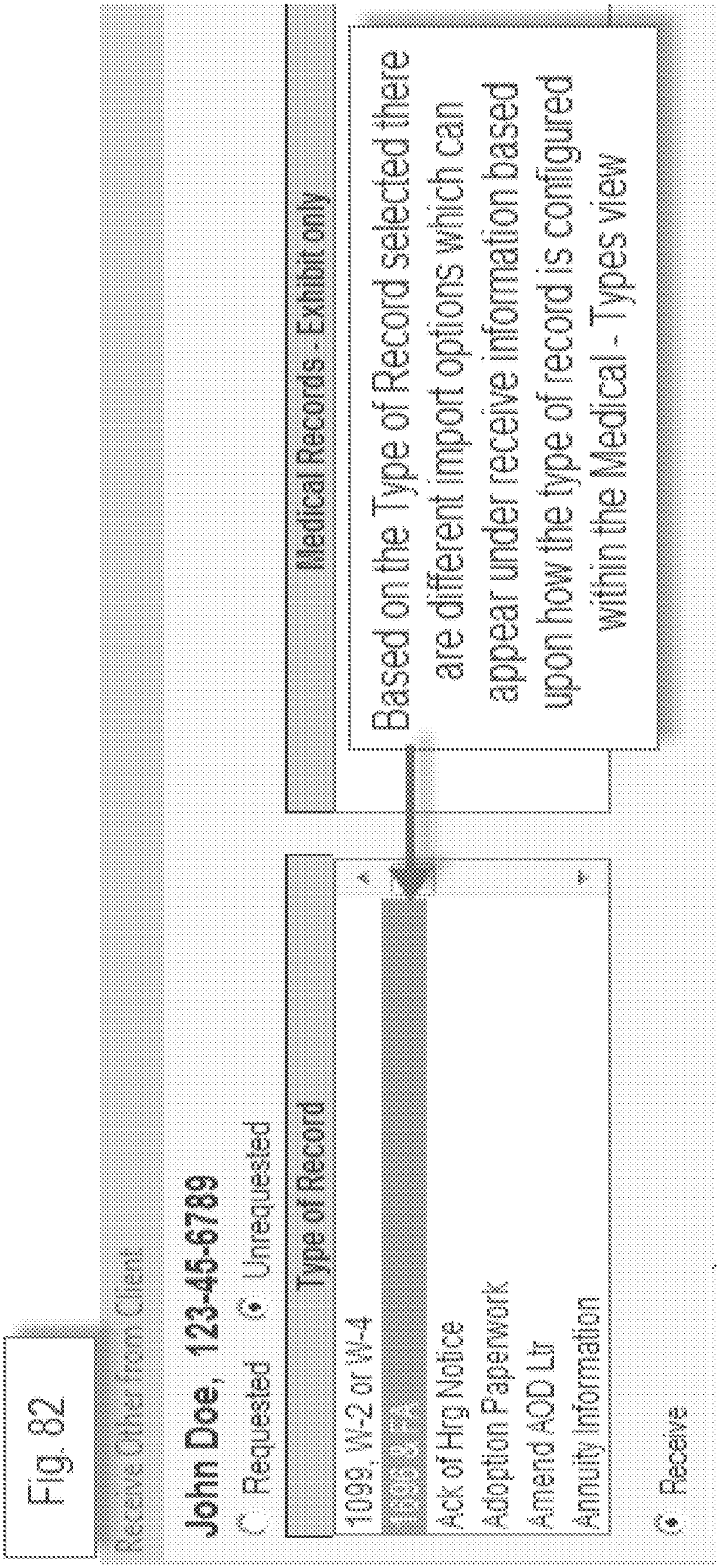
FIG. 82 is a screen shot of an Import Wizard.
Figure 83:
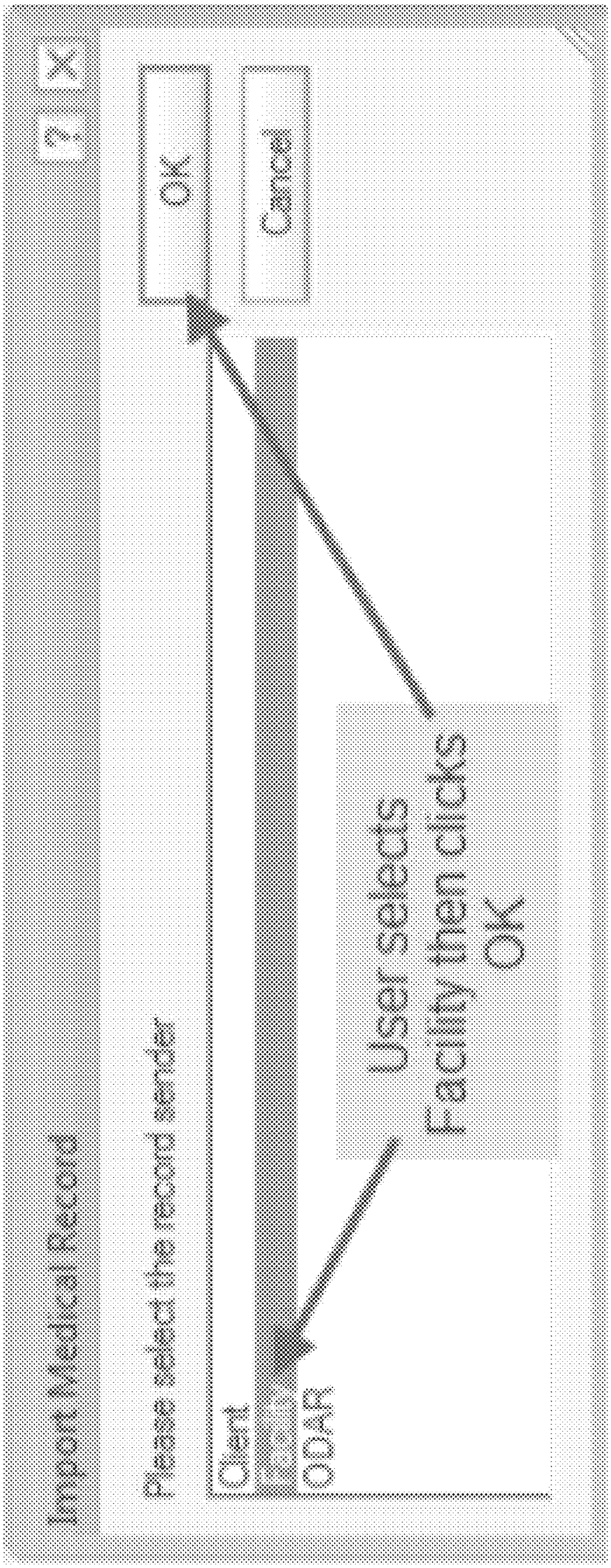
FIG. 83 is a screen shot of an Import Wizard.
Figure 84:
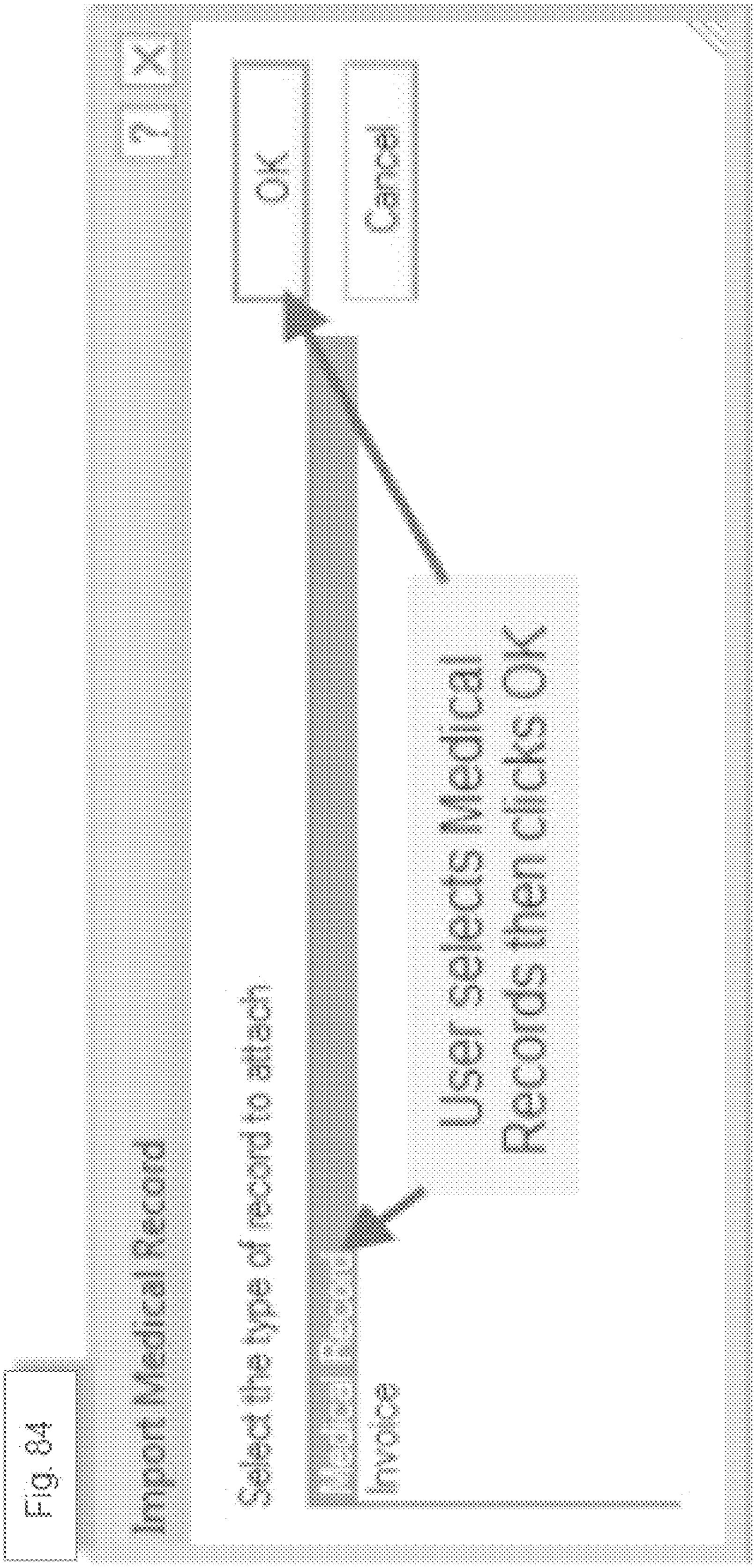
FIG. 84 is a screen shot of an Import Wizard.
Figure 85:
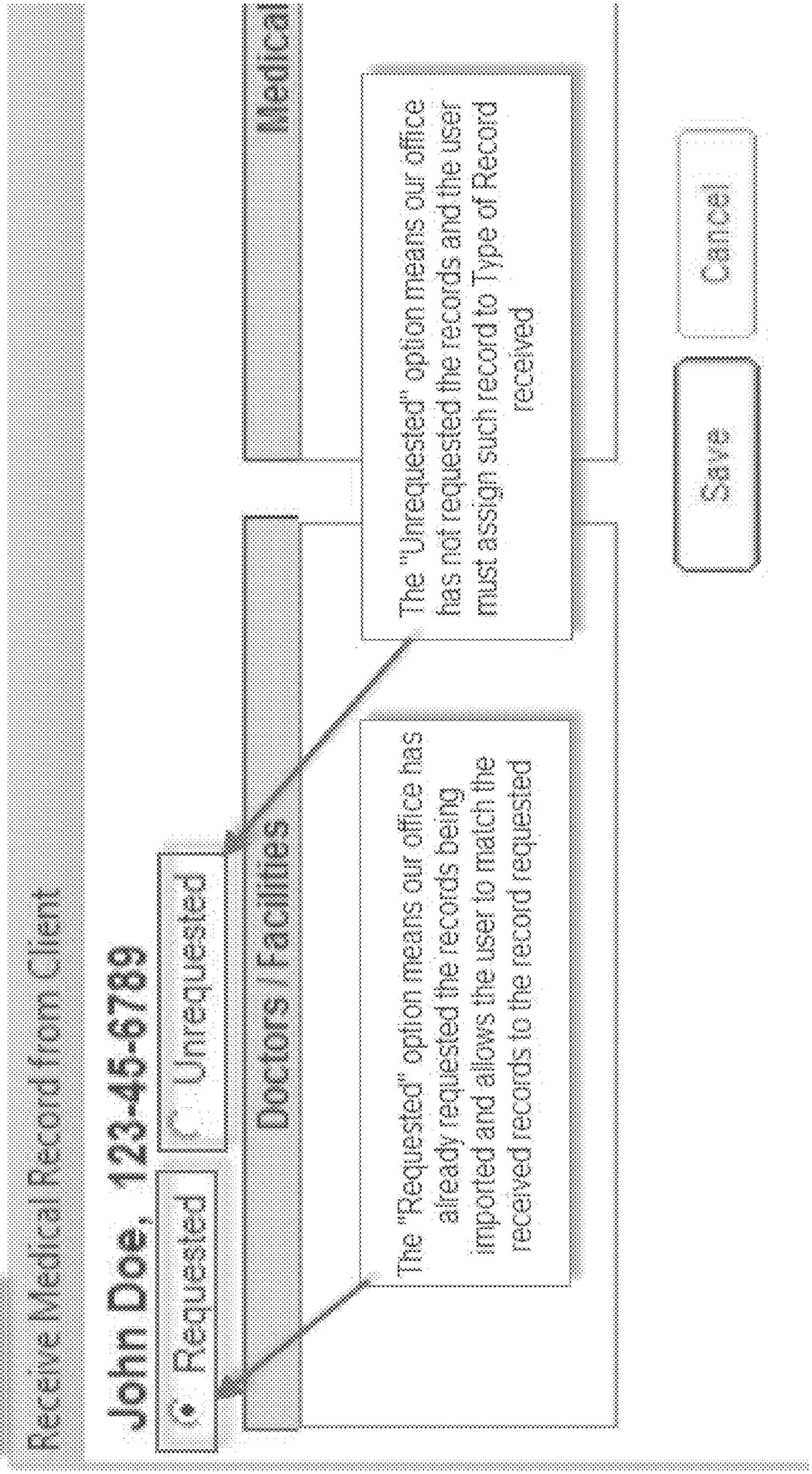
FIG. 85 is a screen shot of an Import Wizard.
Figure 86:
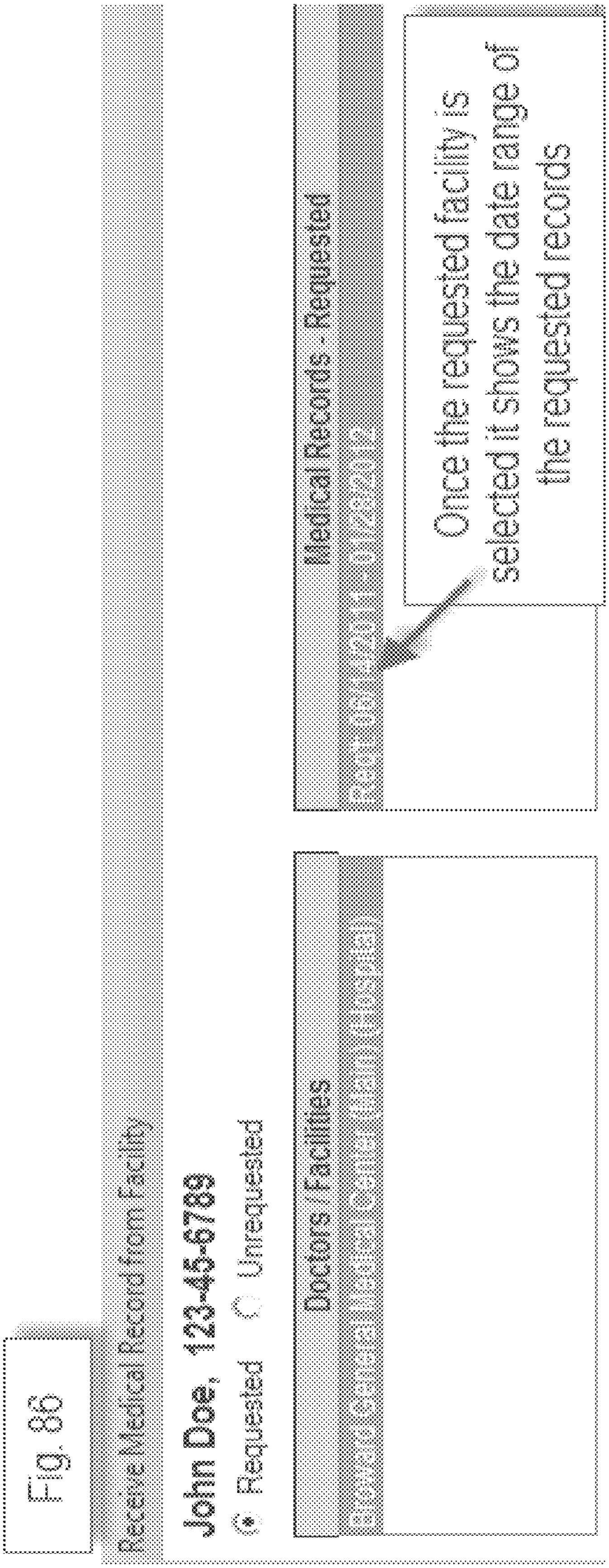
FIG. 86 is a screen shot of an Import Wizard.
Figure 87:
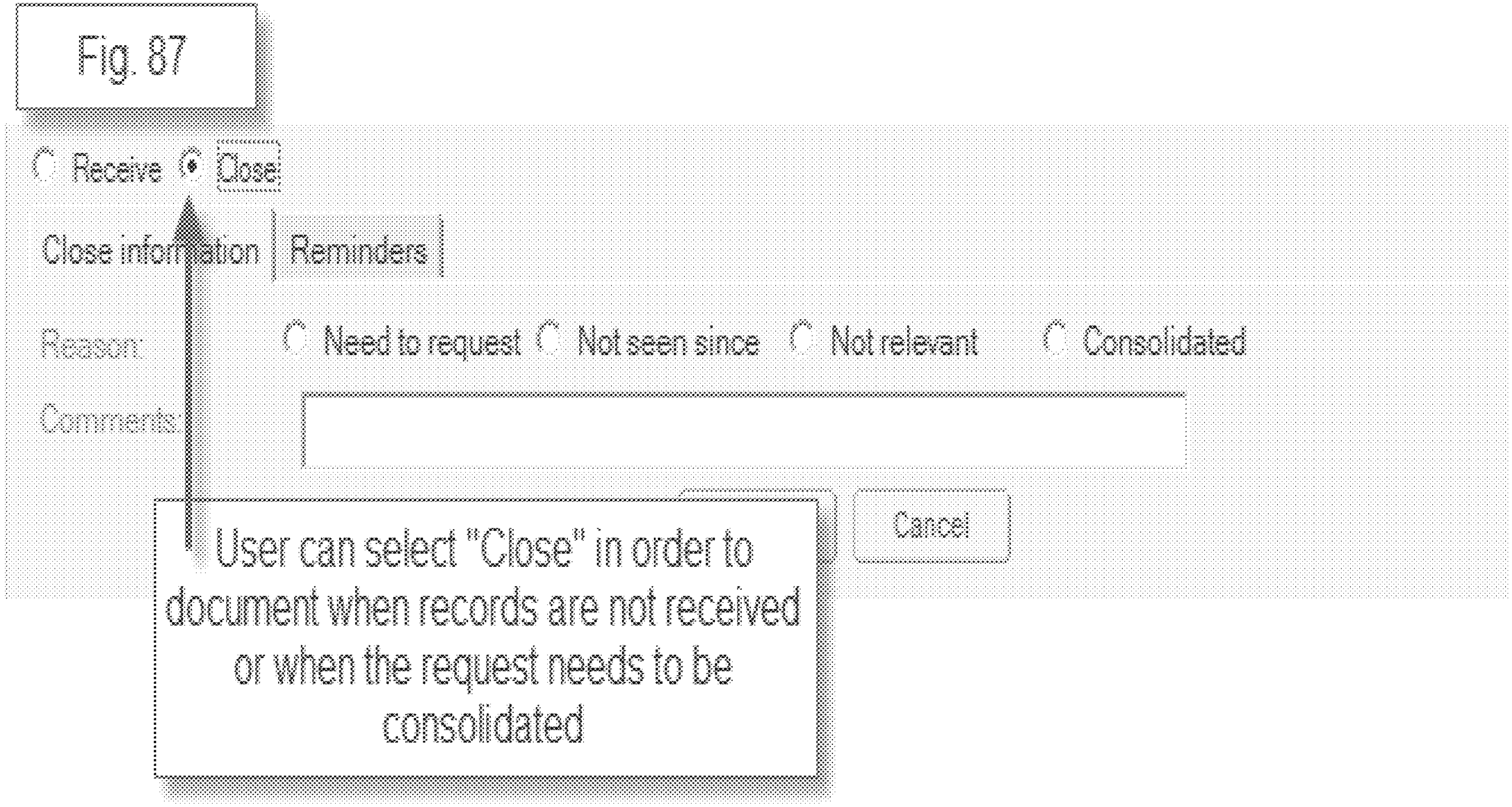
FIG. 87 is a screen shot of an Import Wizard.
Figure 88:
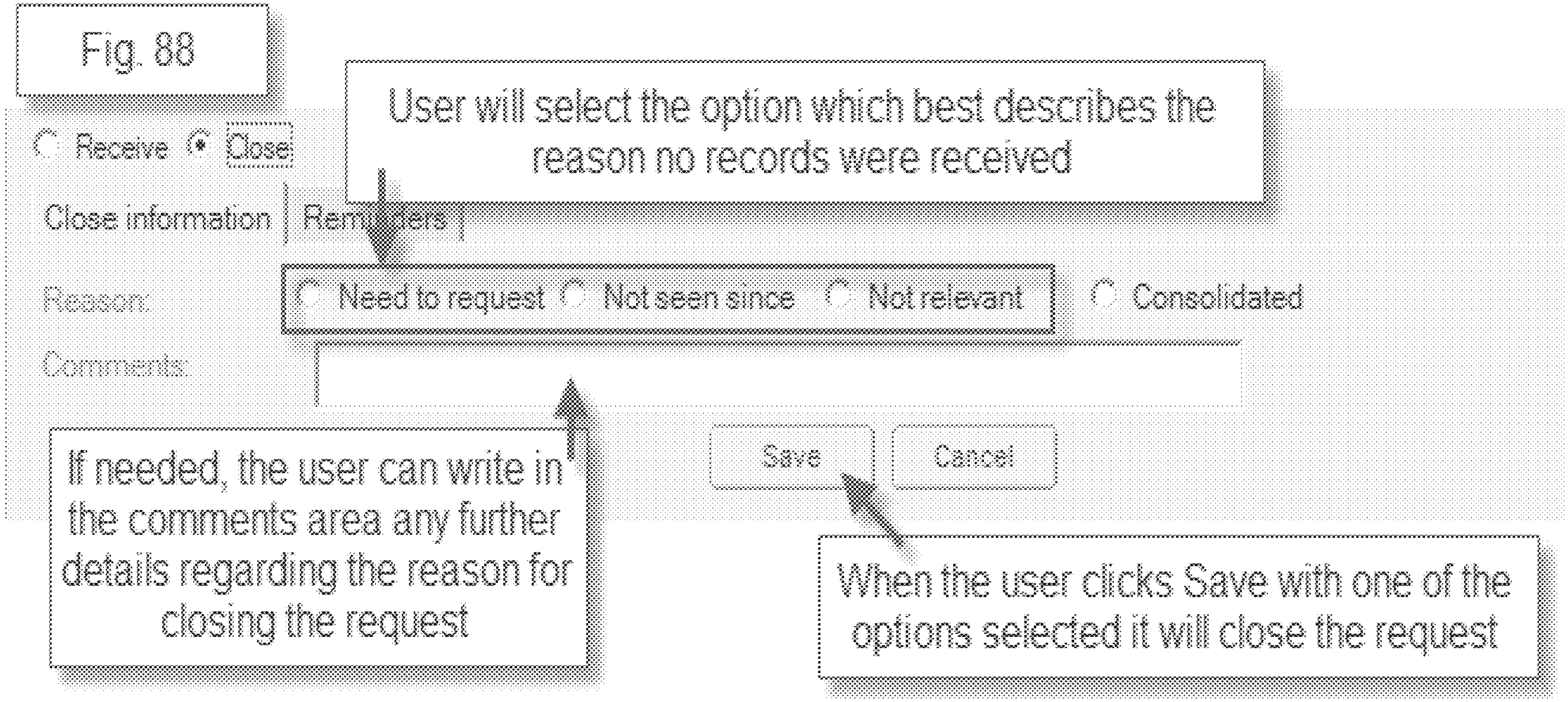
FIG. 88 is a screen shot of an Import Wizard.
Figure 89:
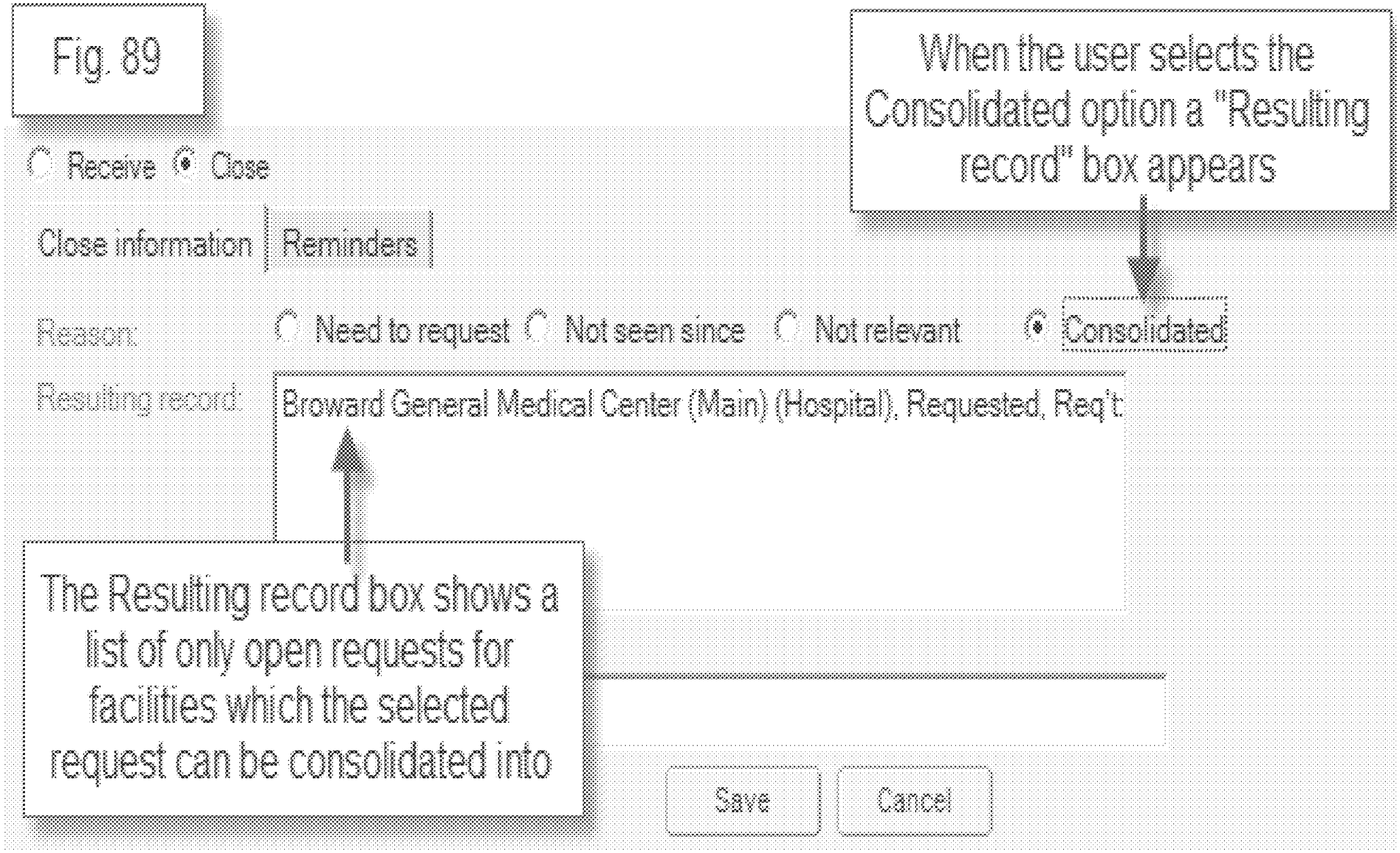
FIG. 89 is a screen shot of an Import Wizard.
Figure 90:
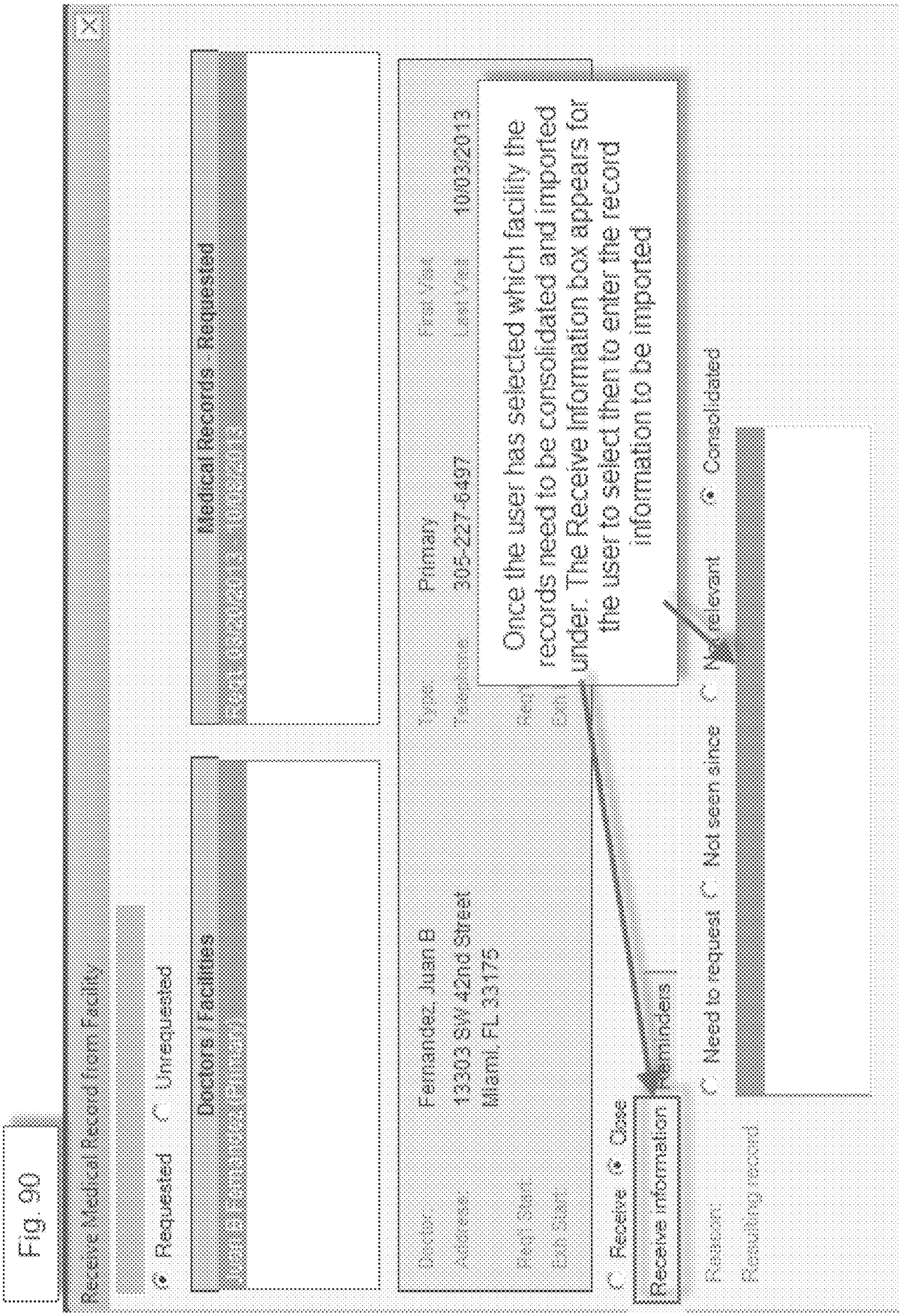
FIG. 90 is a screen shot of an Import Wizard.
Figure 91:
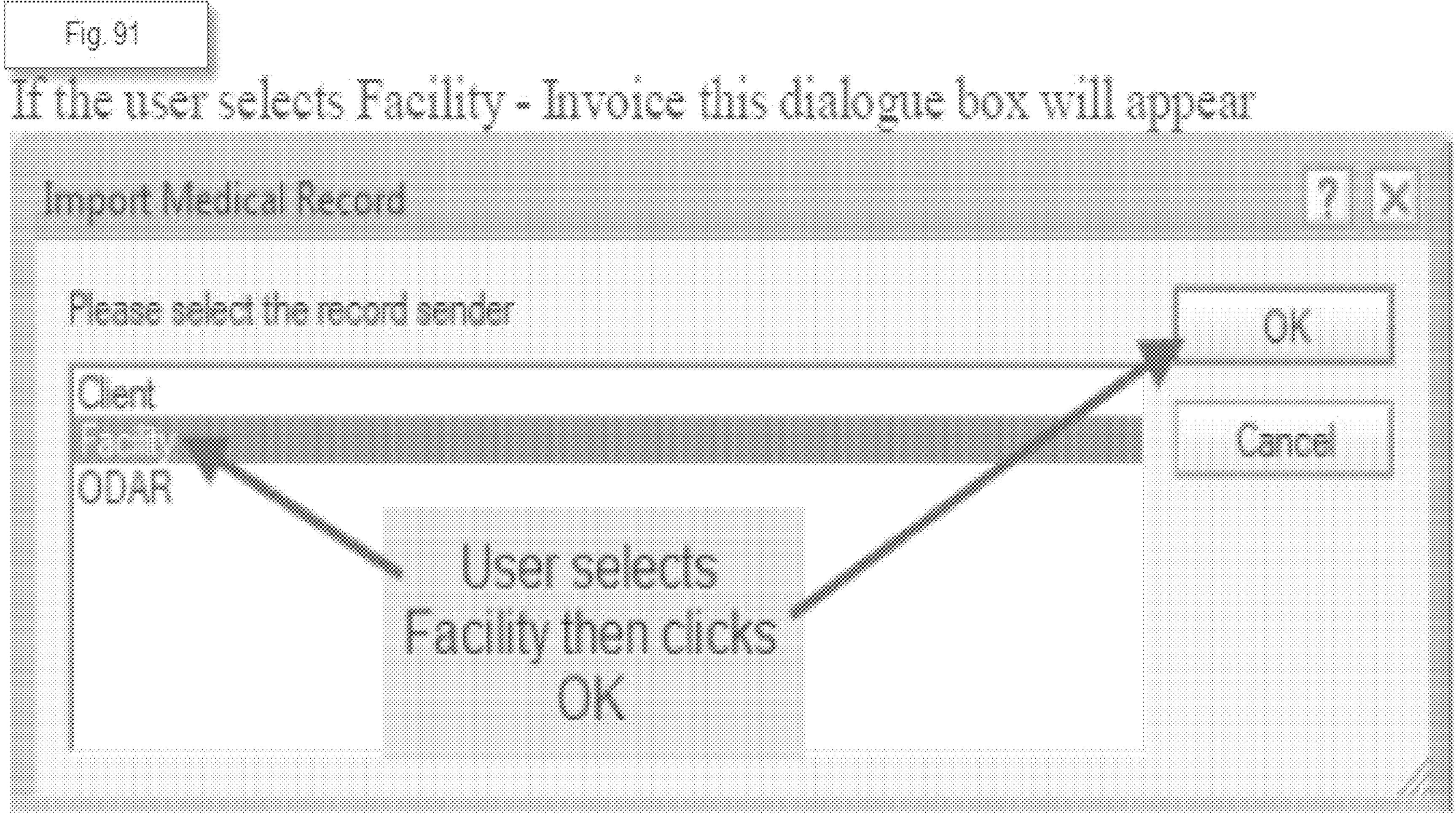
FIG. 91 is a screen shot of an Import Wizard.
Figure 92:
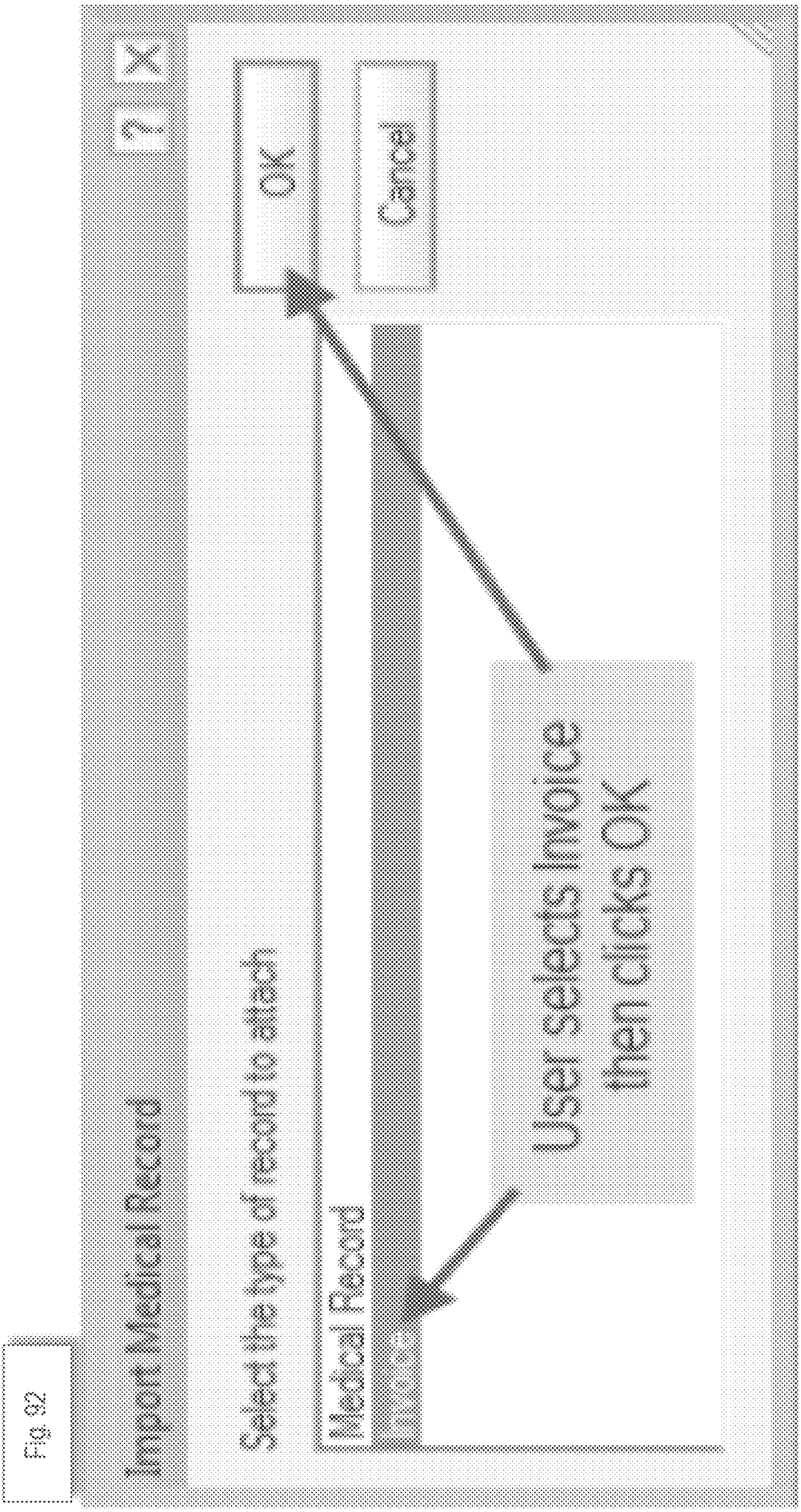
FIG. 92 is a screen shot of an Import Wizard.
Figure 93B:
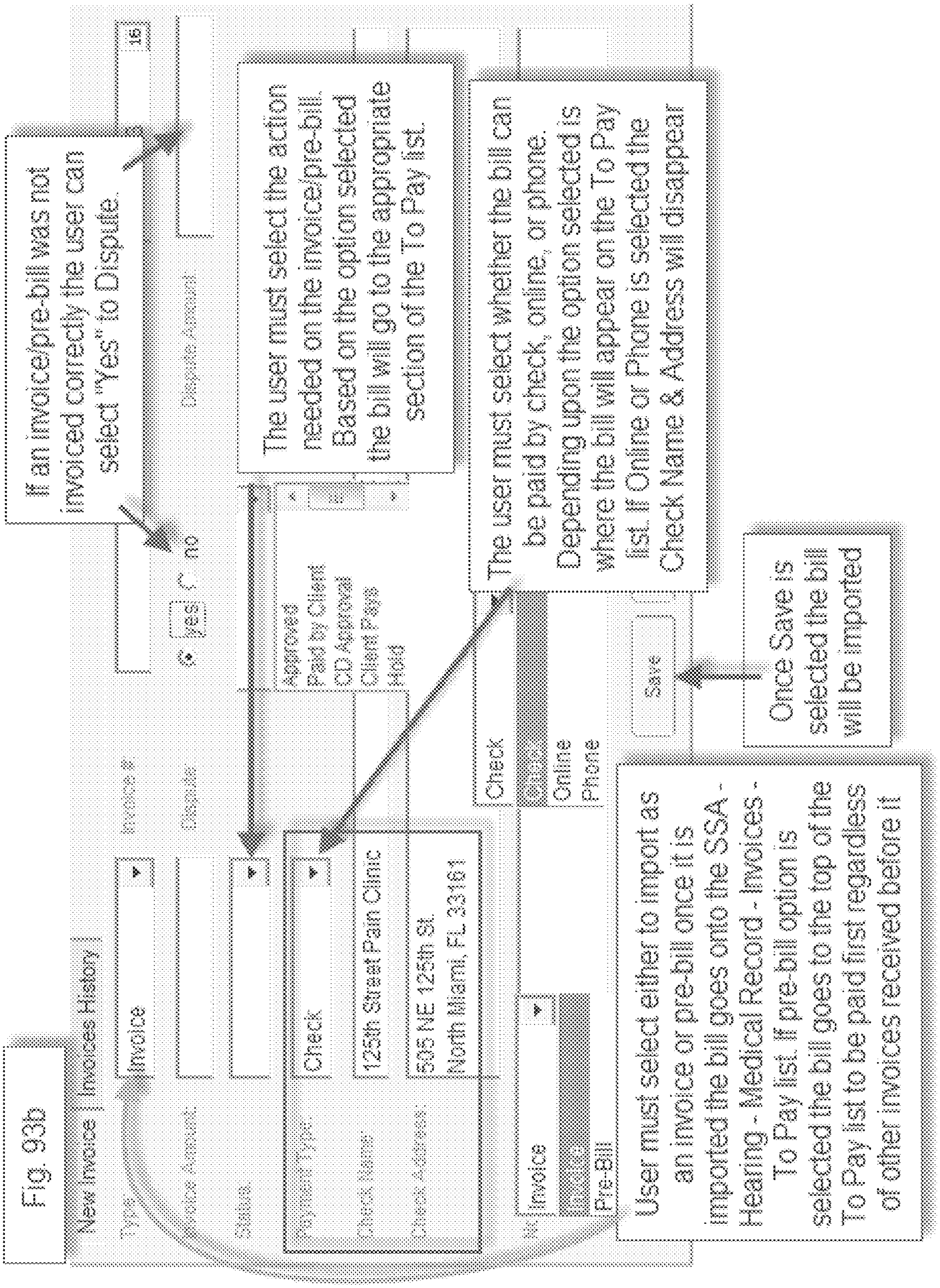
Figure 94:
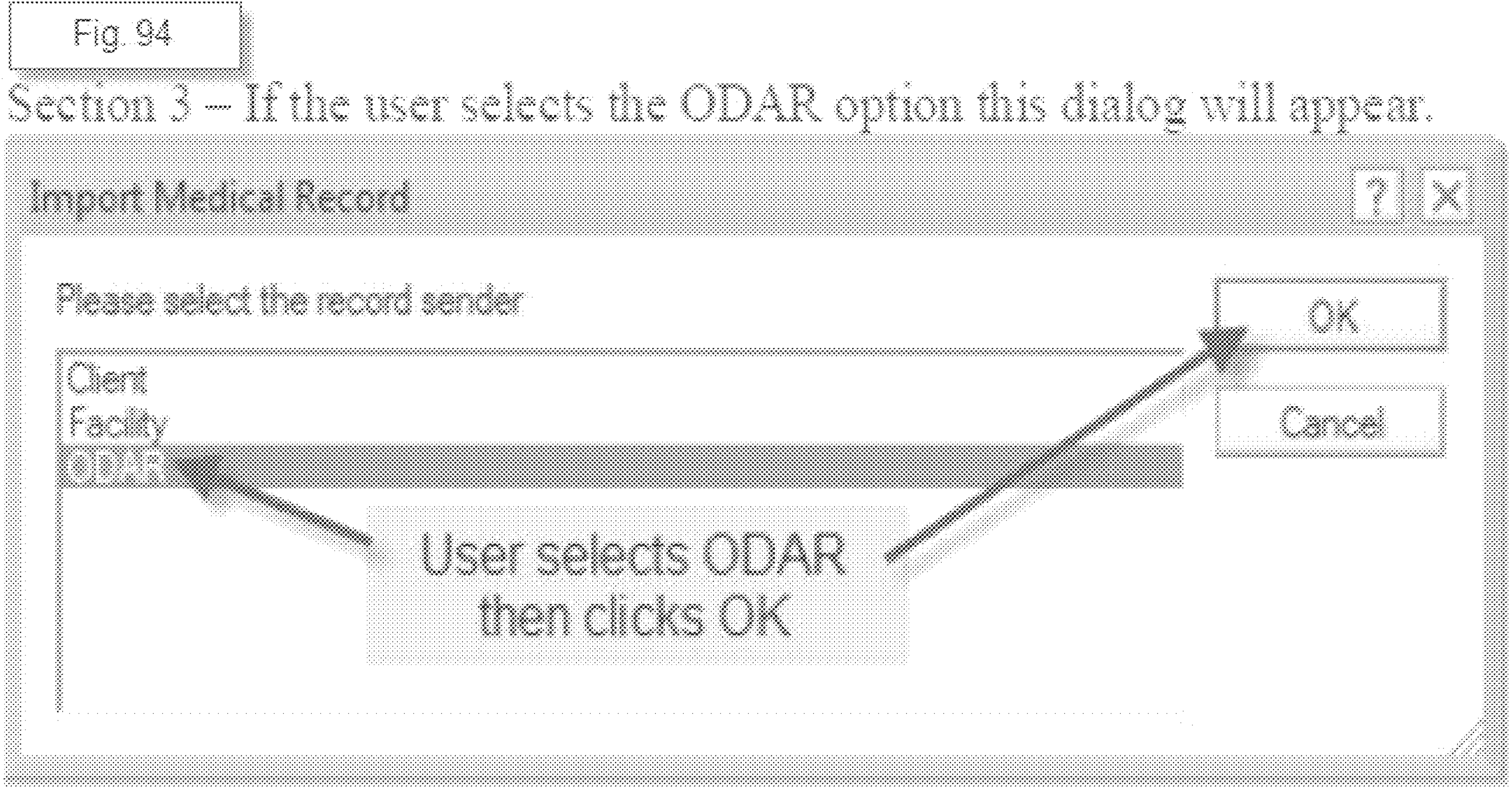
FIG. 94 is a screen shot of an Import Wizard.
Figure 95:
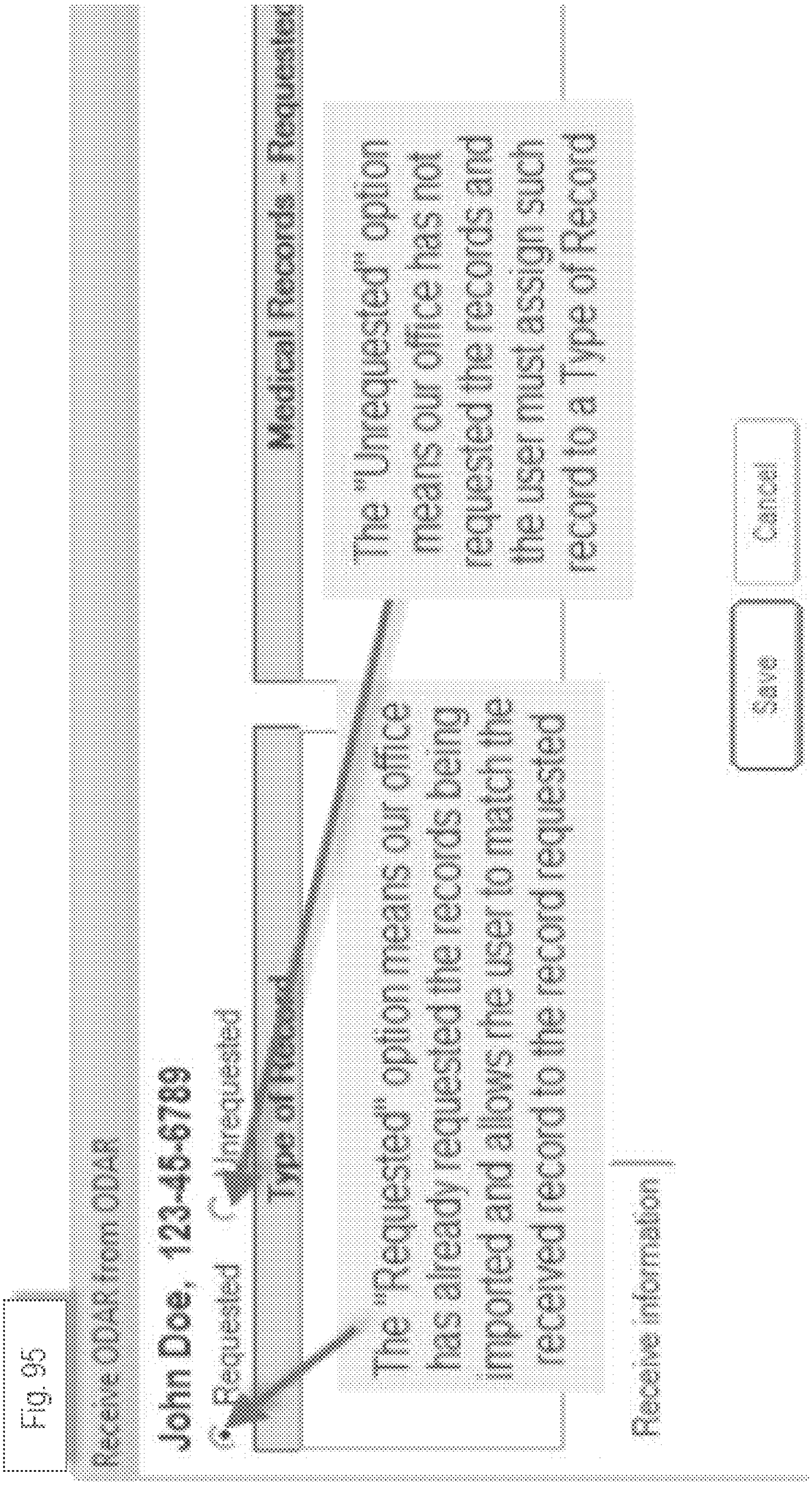
FIG. 95 is a screen shot of an Import Wizard.
Figure 96:
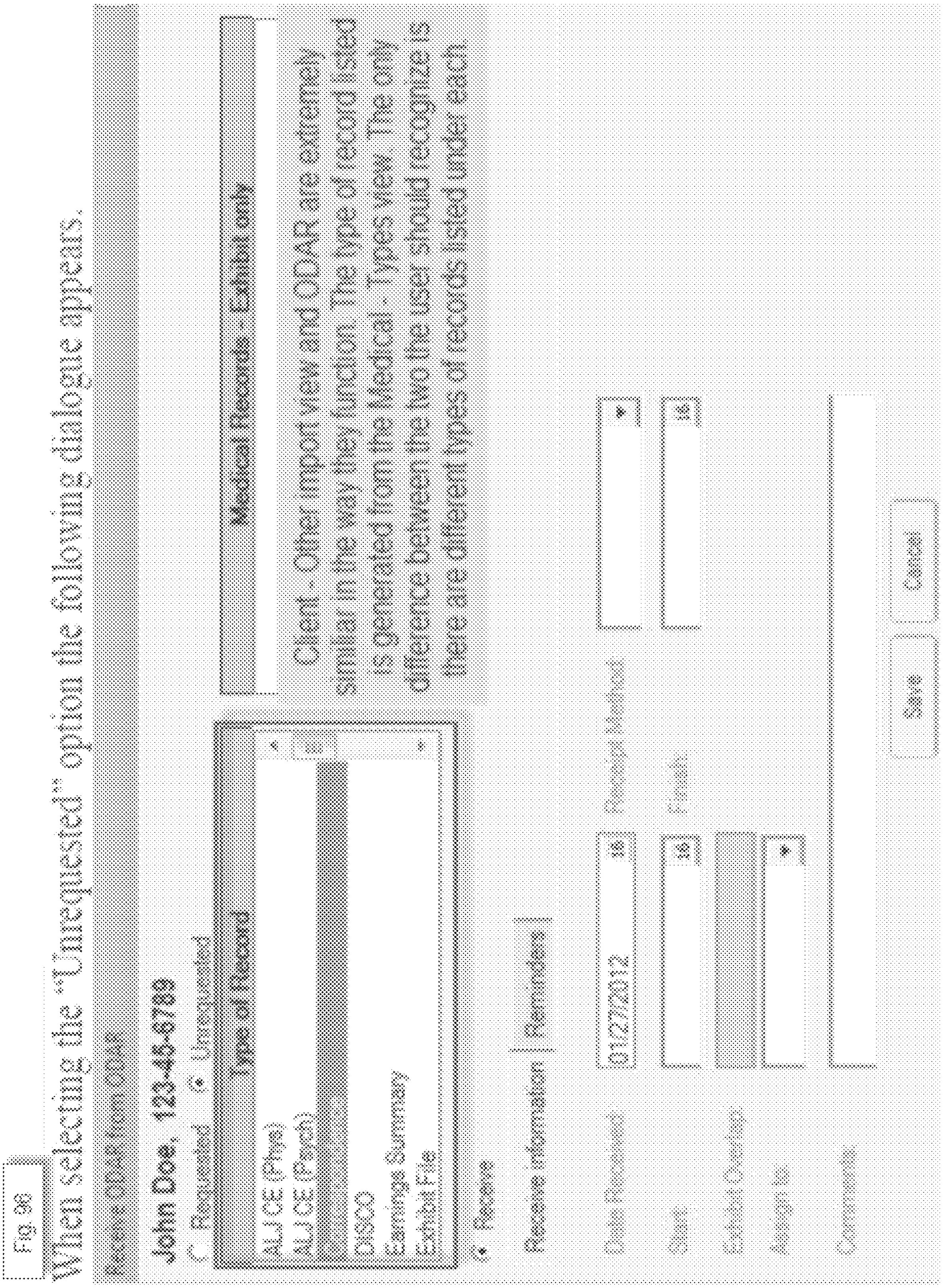
FIG. 96 is a screen shot of an Import Wizard.
Figure 97:
FIG. 97 is a screen shot of an Import Wizard.
Figure 98:
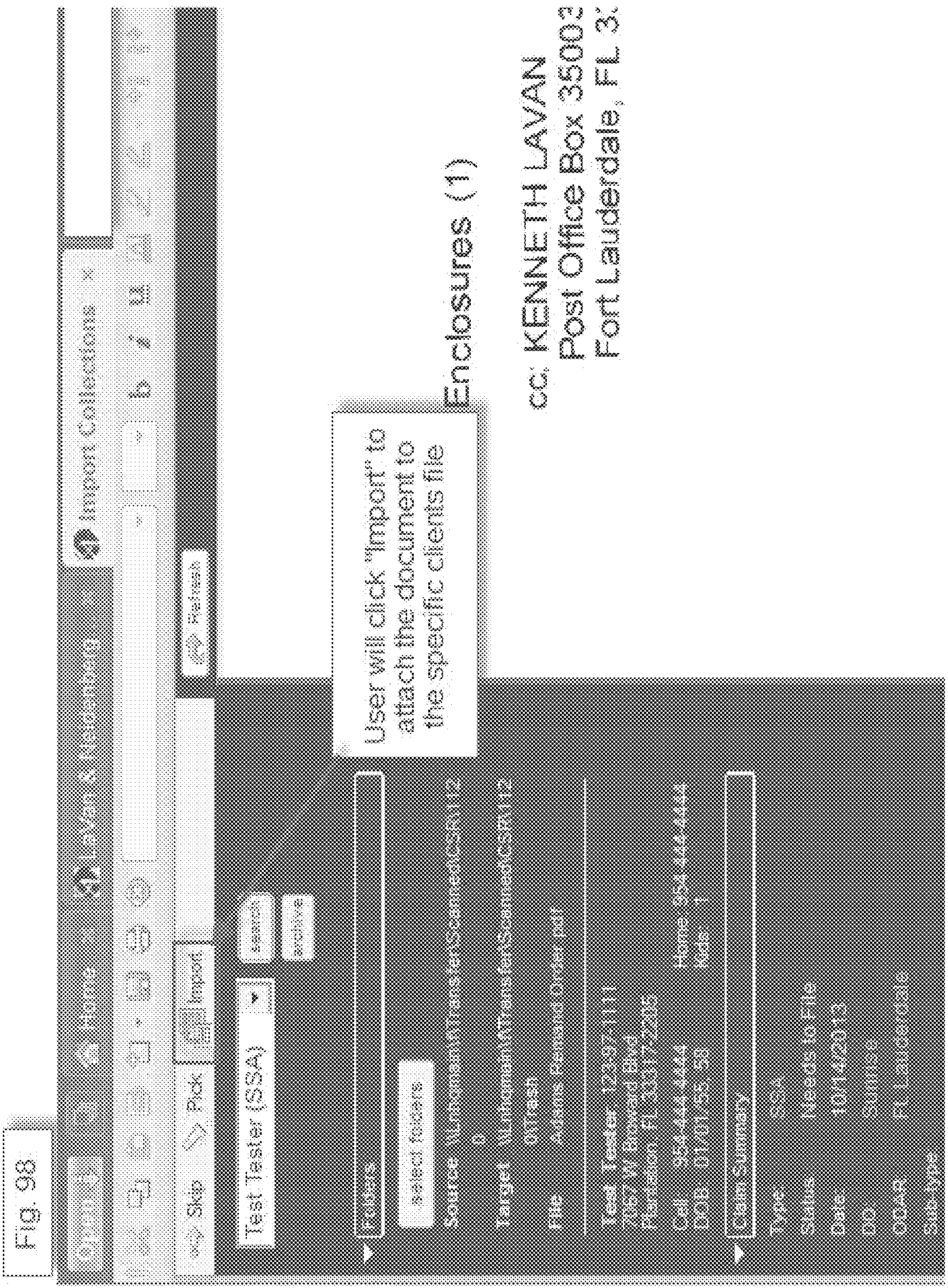
FIG. 98 is a screen shot of an Import Wizard.
Figure 99:
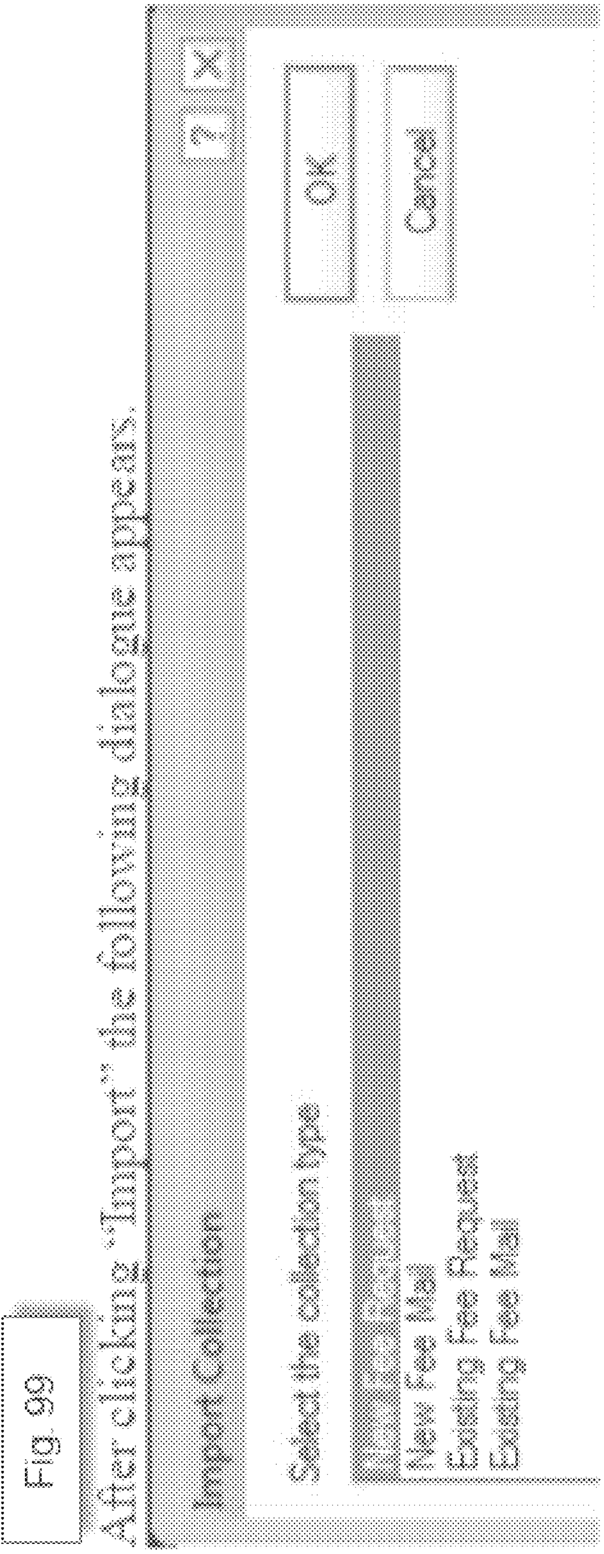
FIG. 99 is a screen shot of an Import Wizard.
Figure 100:
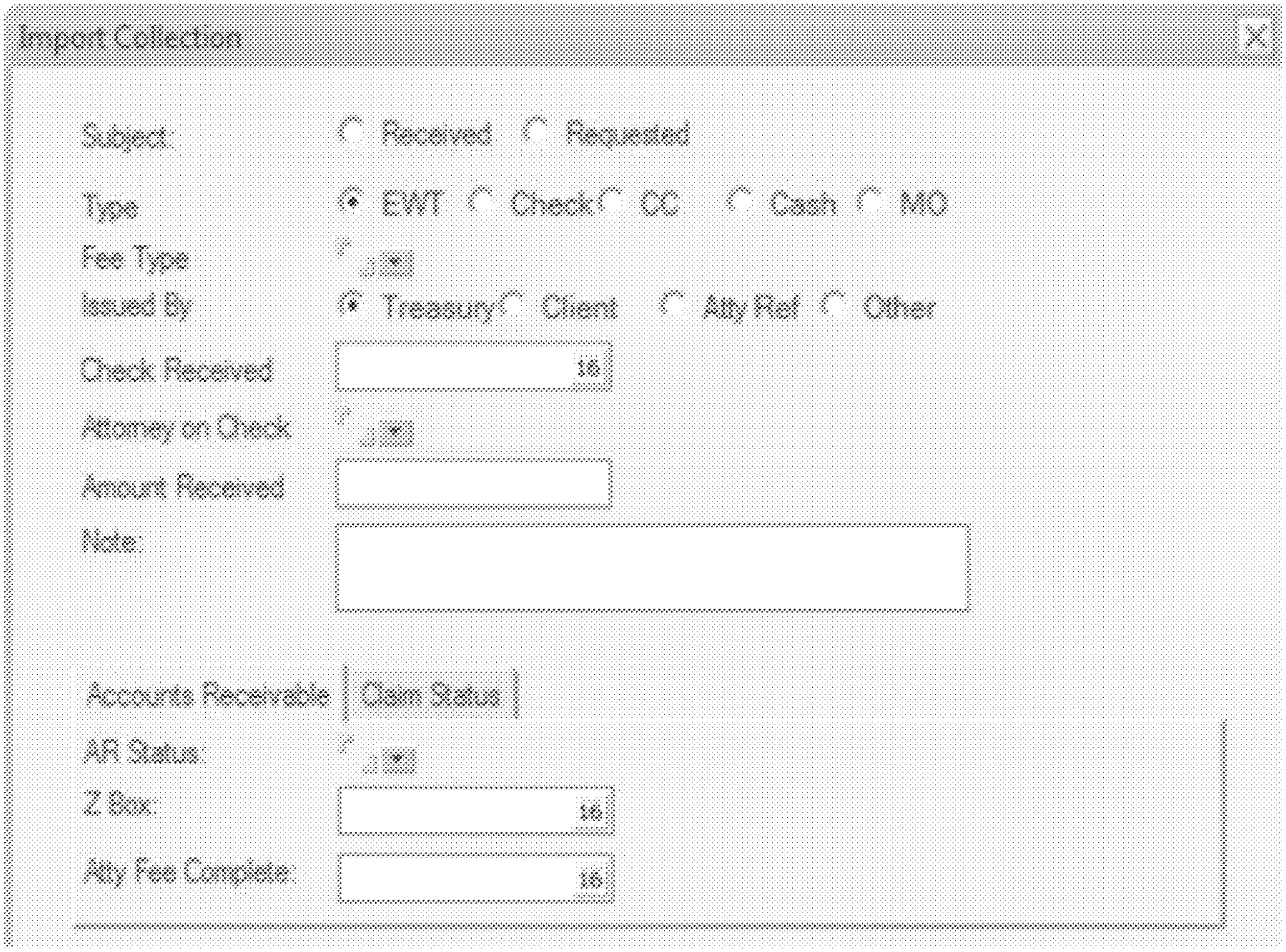
FIG. 100 is a screen shot of an Import Wizard.
Figure 101:
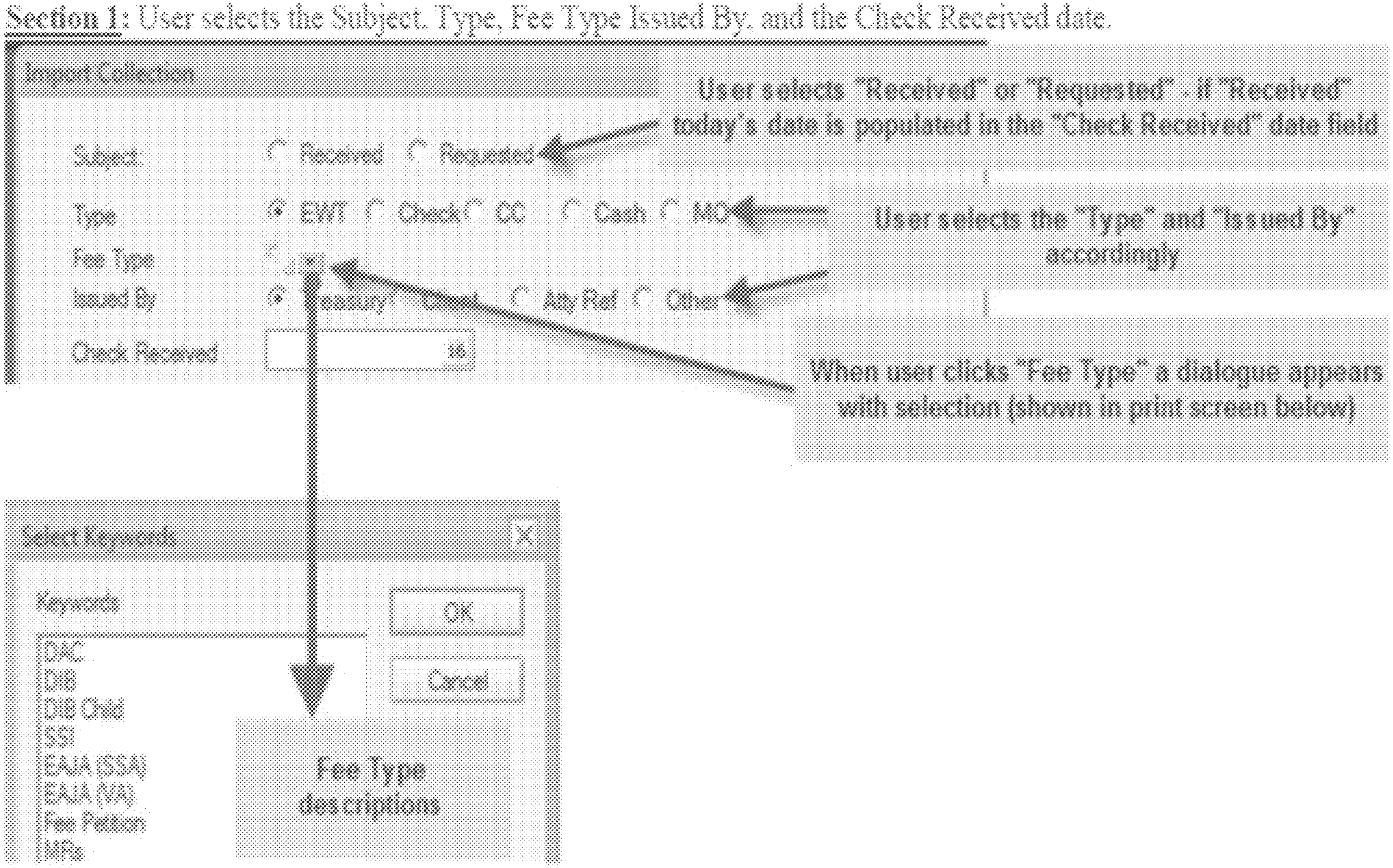
FIG. 101 is a screen shot of an Import Wizard.
Figure 102:
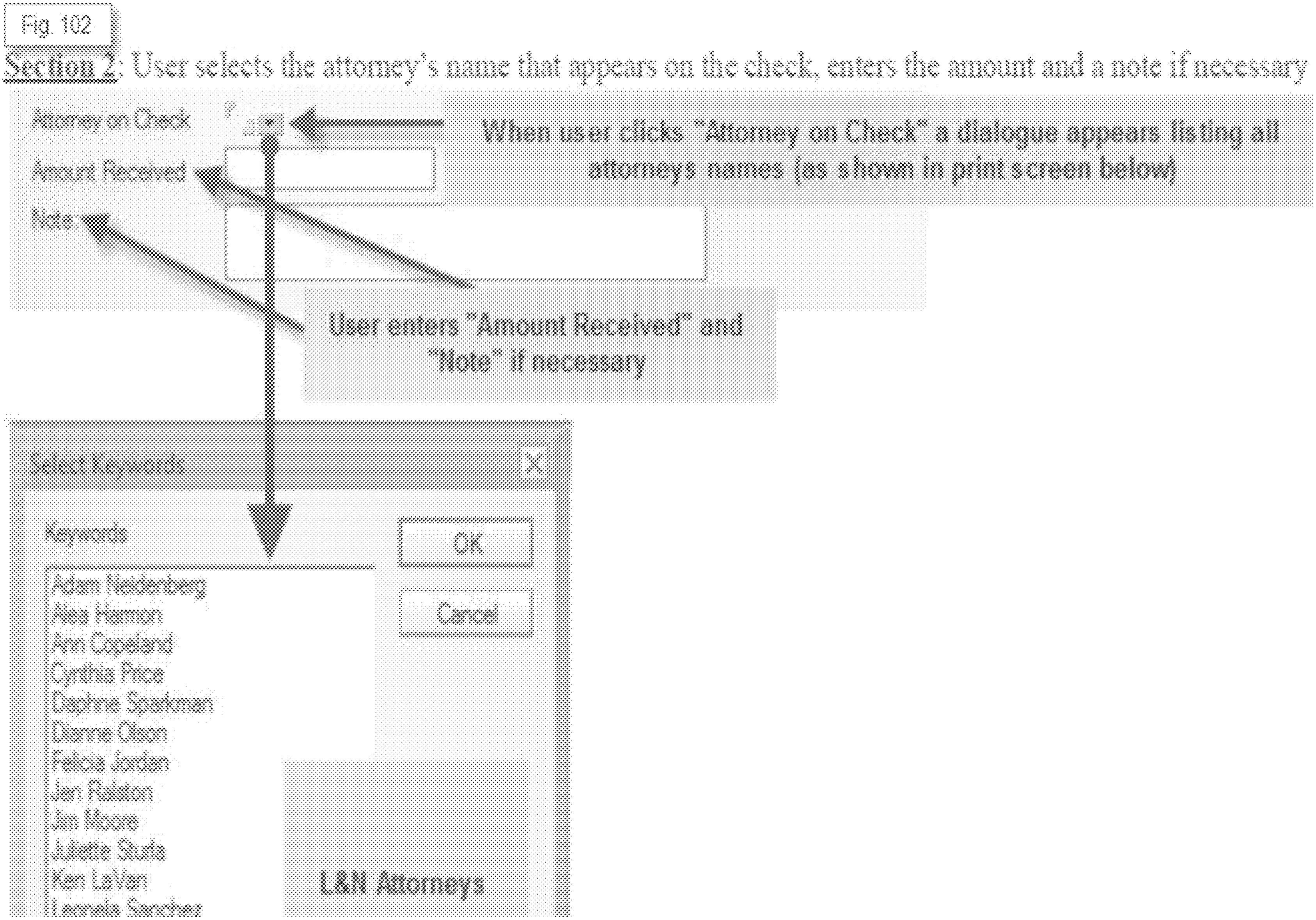
FIG. 102 is a screen shot of an Import Wizard.
Figure 103:
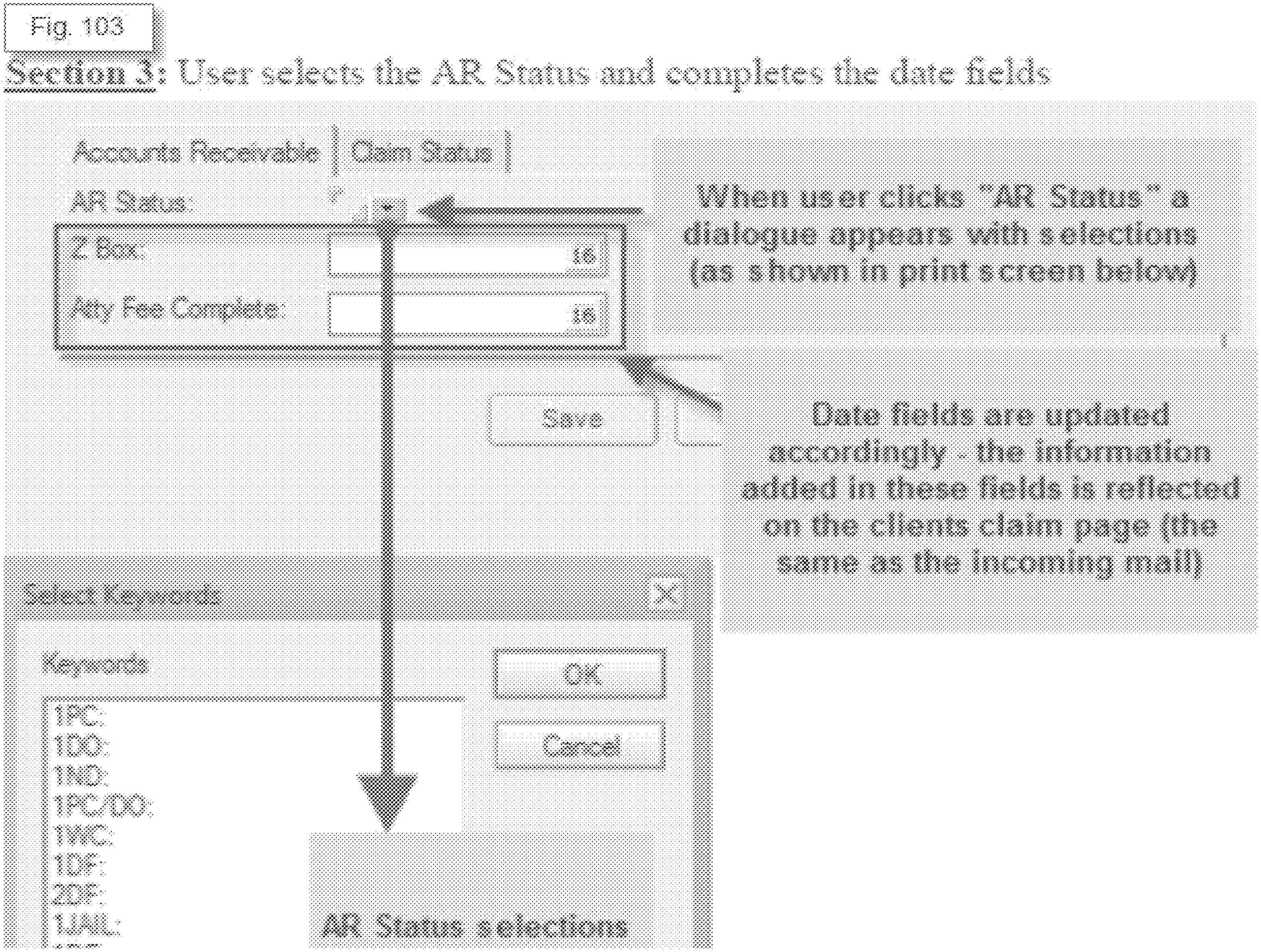
FIG. 103 is a screen shot of an Import Wizard.
Figure 104:
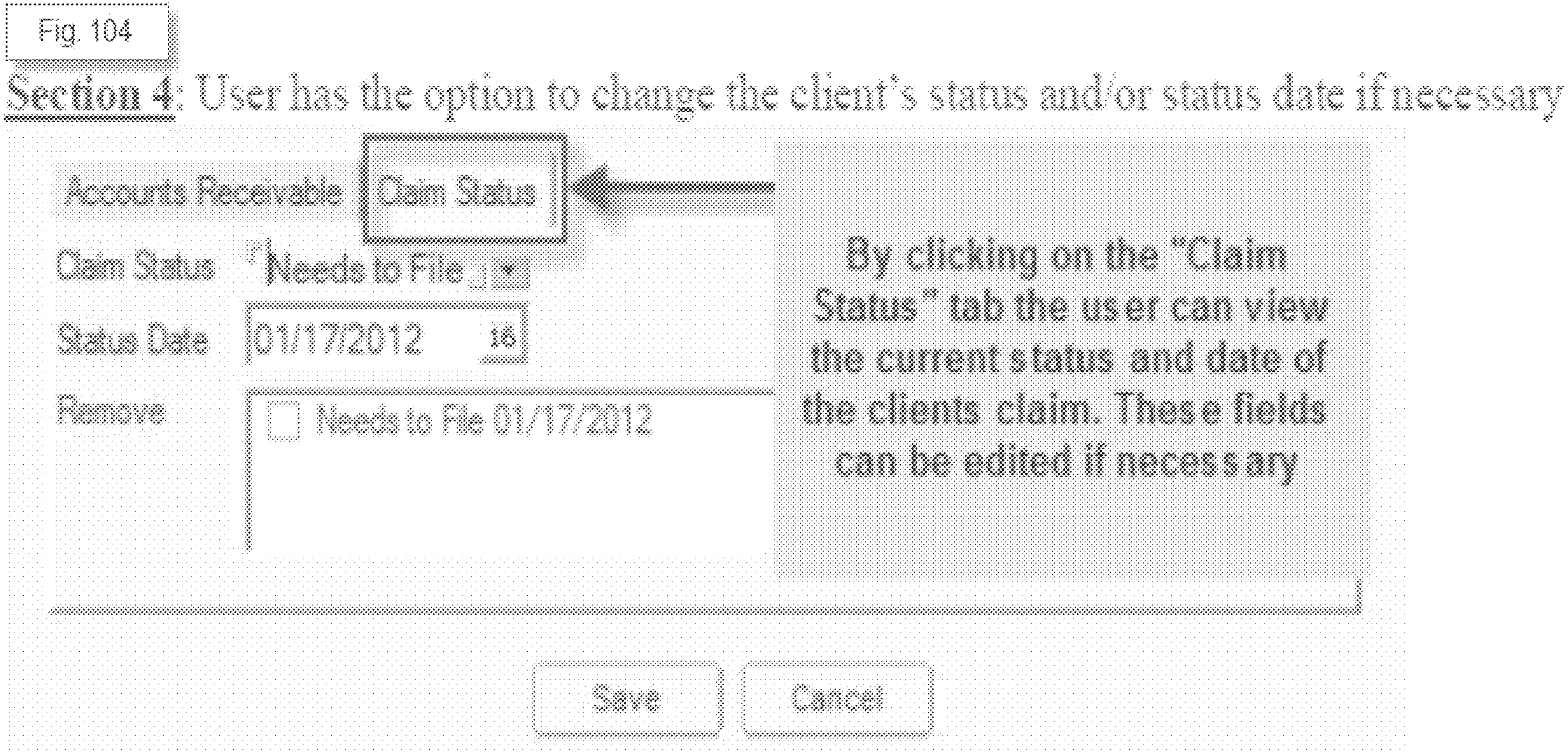
FIG. 104 is a screen shot of an Import Wizard.
Figure 105:
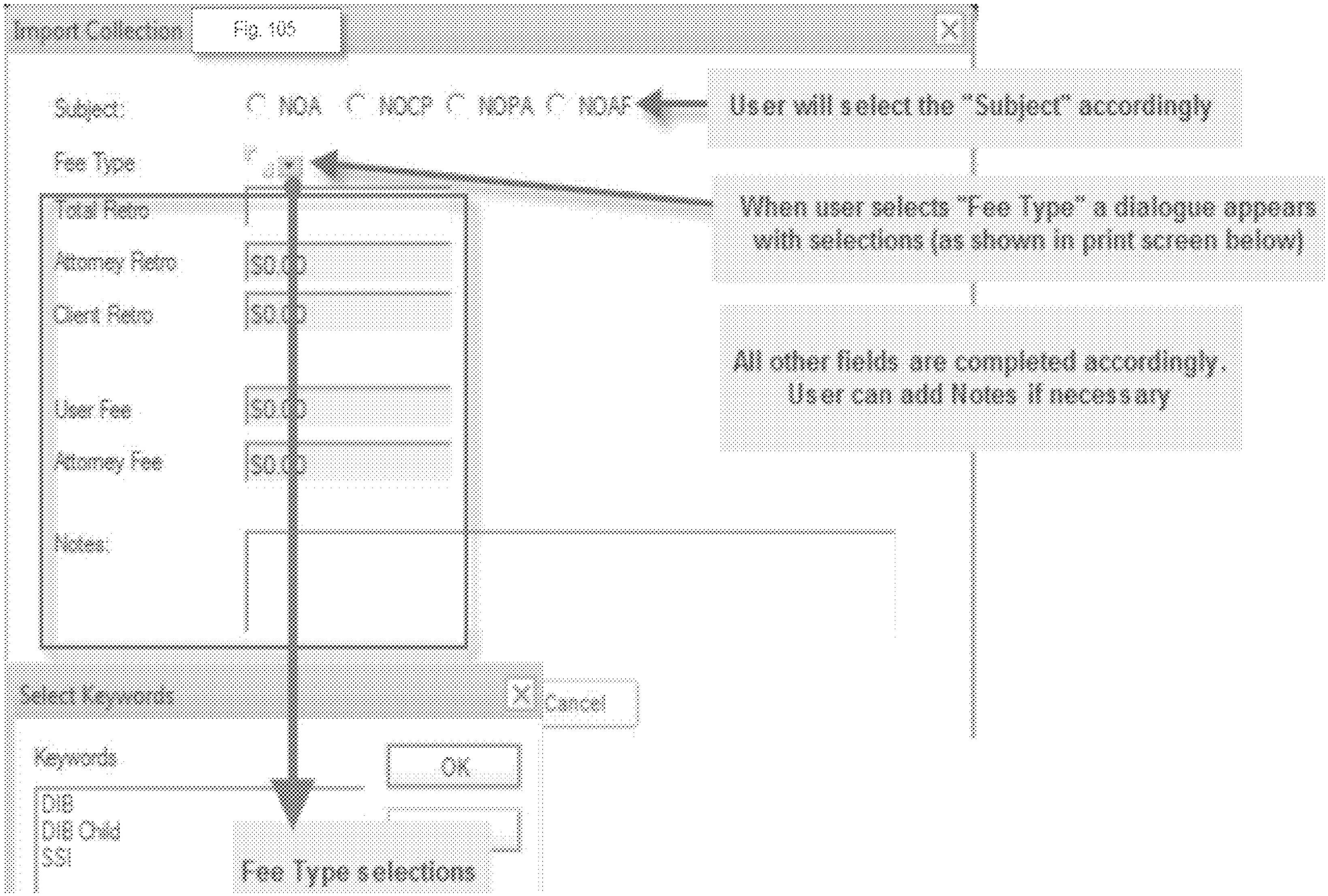
FIG. 105 is a screen shot of an Import Wizard.
Figure 106:
FIG. 106 is a screen shot of an Import Wizard.
Figure 107:
FIG. 107 is a screen shot of an Import Wizard.
Figure 109:
FIG. 109 is a screen shot of a locator module.
Figure 110:
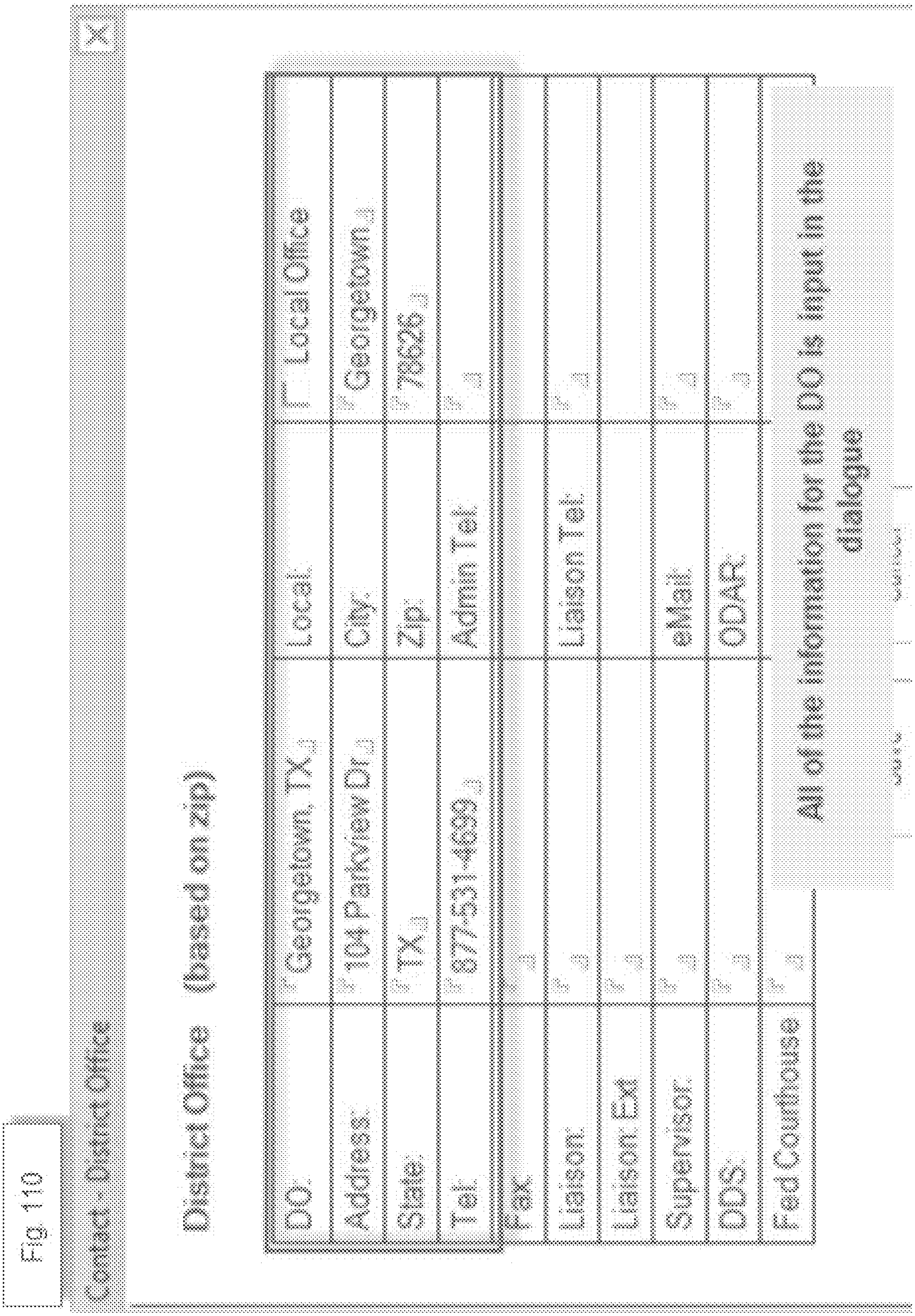
FIG. 110 is a screen shot of a locator module.
Figure 112:
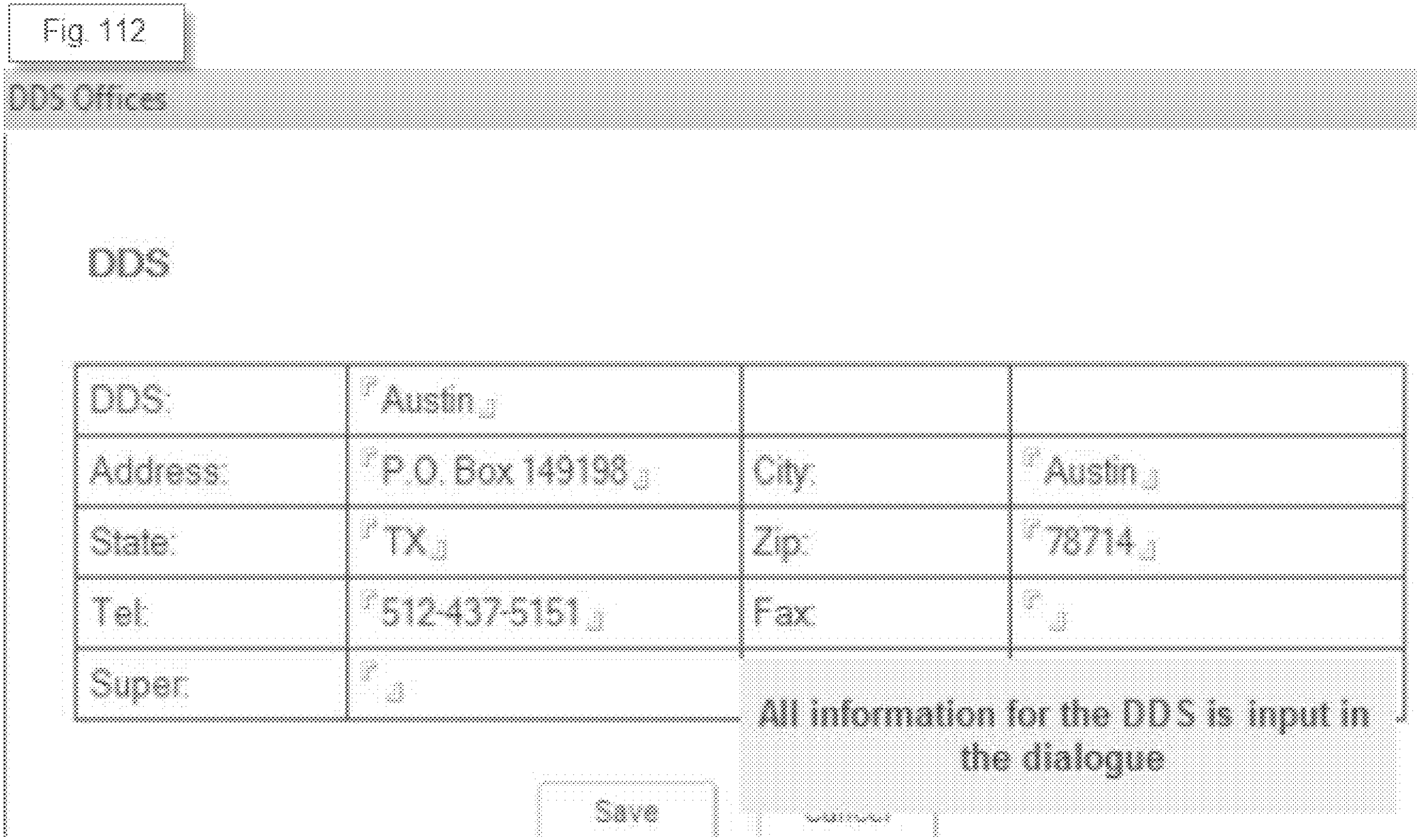
FIG. 112 is a screen shot of a locator module.
Figure 113:
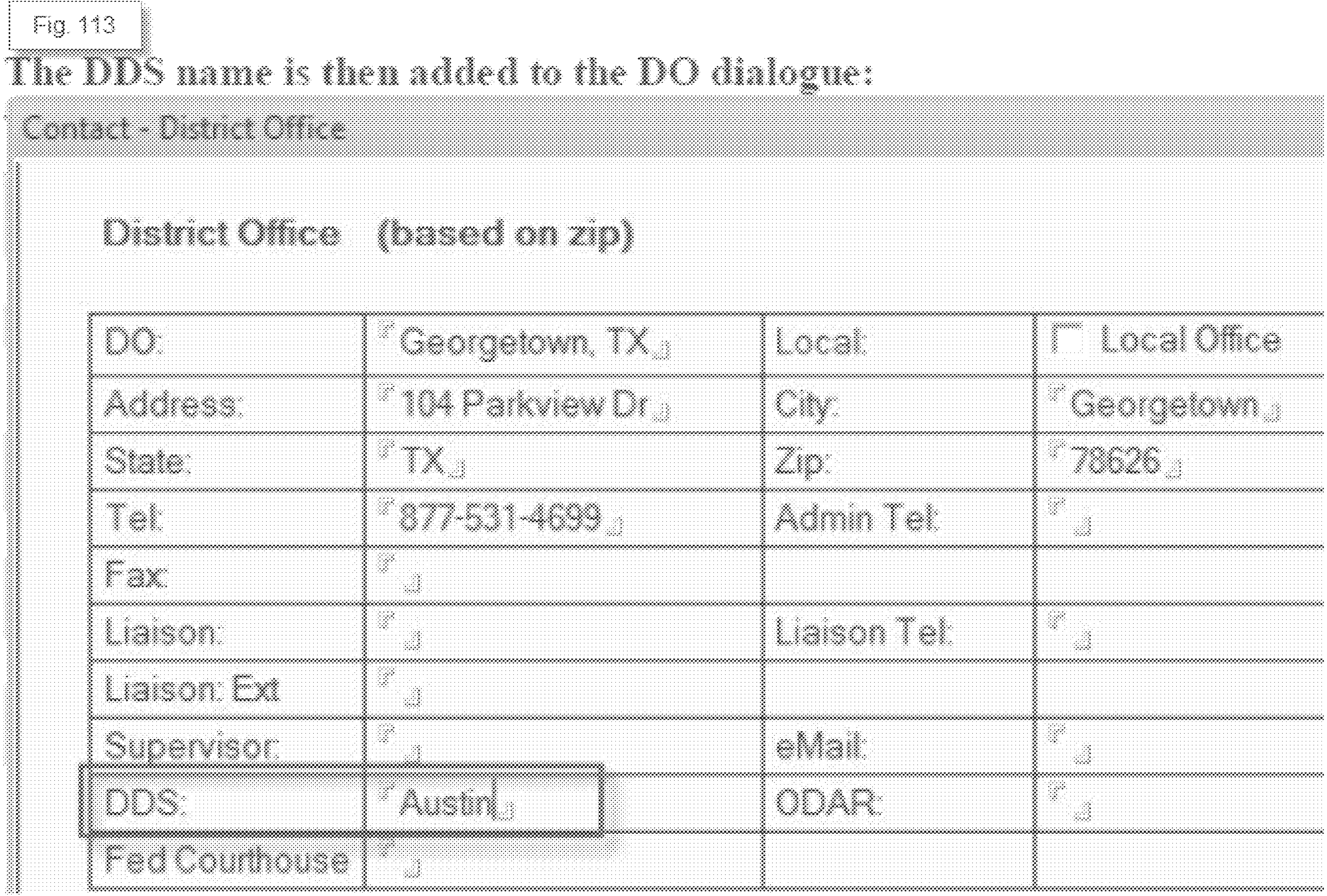
FIG. 113 is a screen shot of a locator module.
Figure 114:
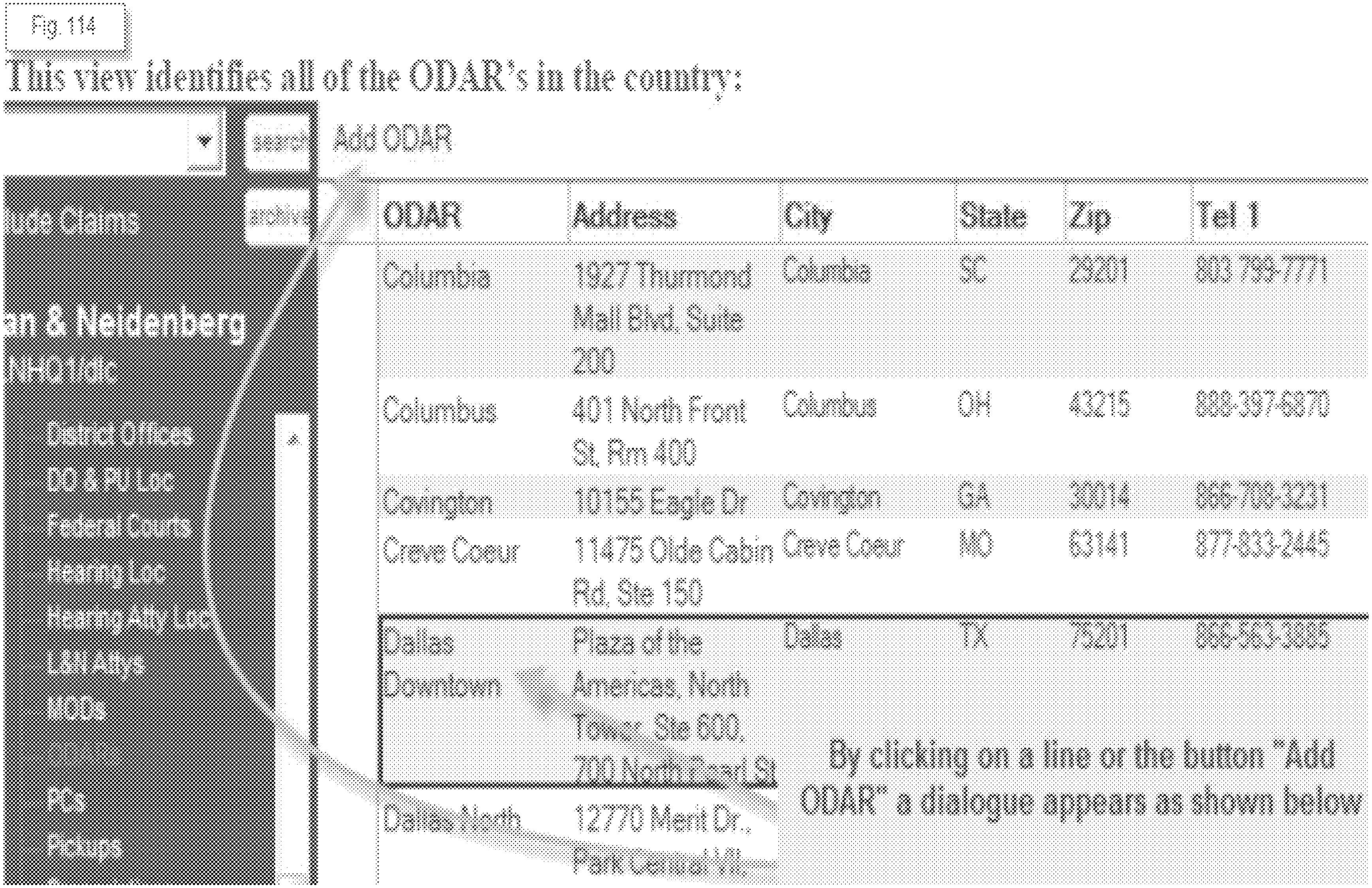
FIG. 114 is a screen shot of a locator module.
Figure 116:
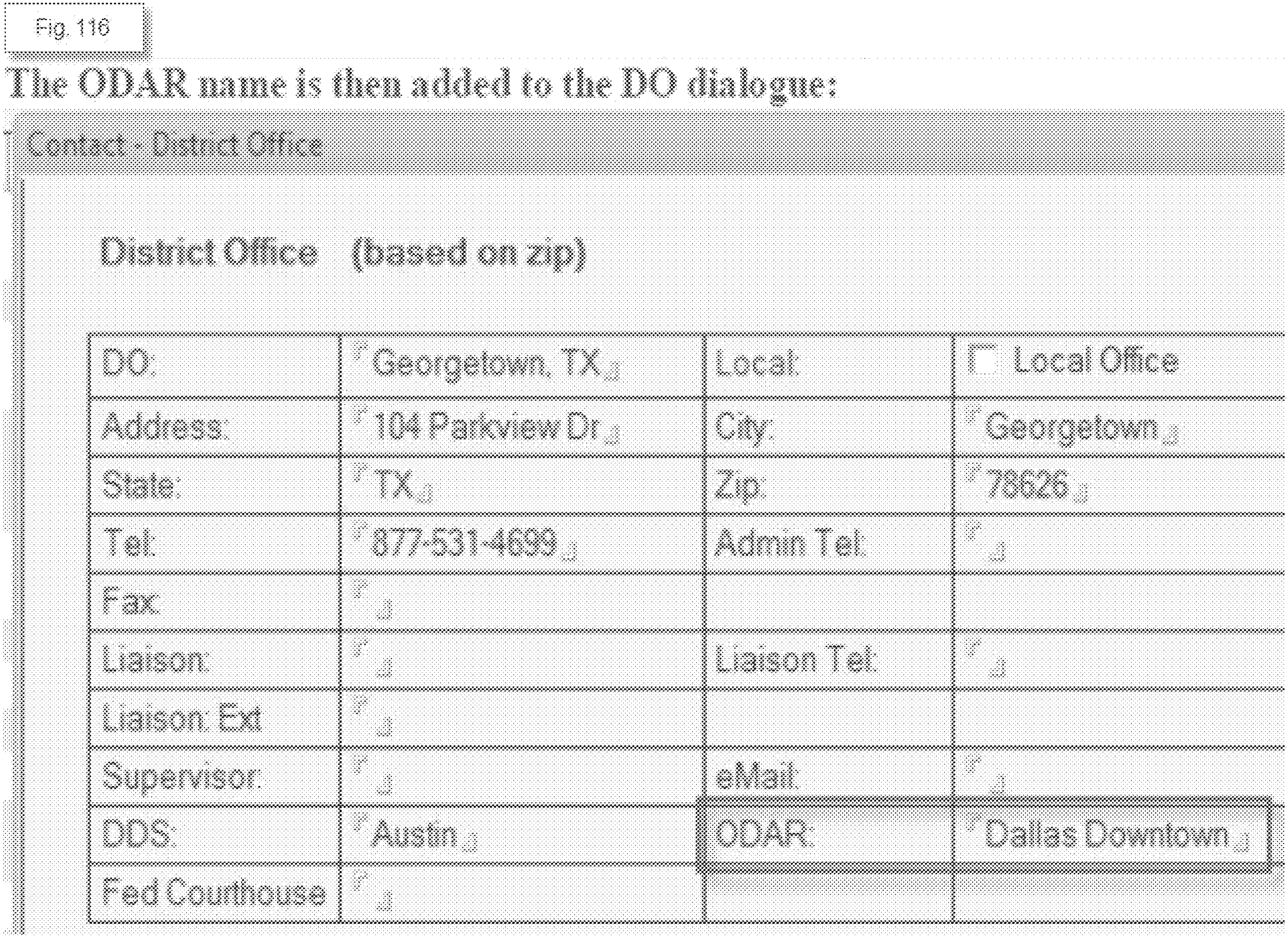
FIG. 116 is a screen shot of a locator module.
Figure 117:
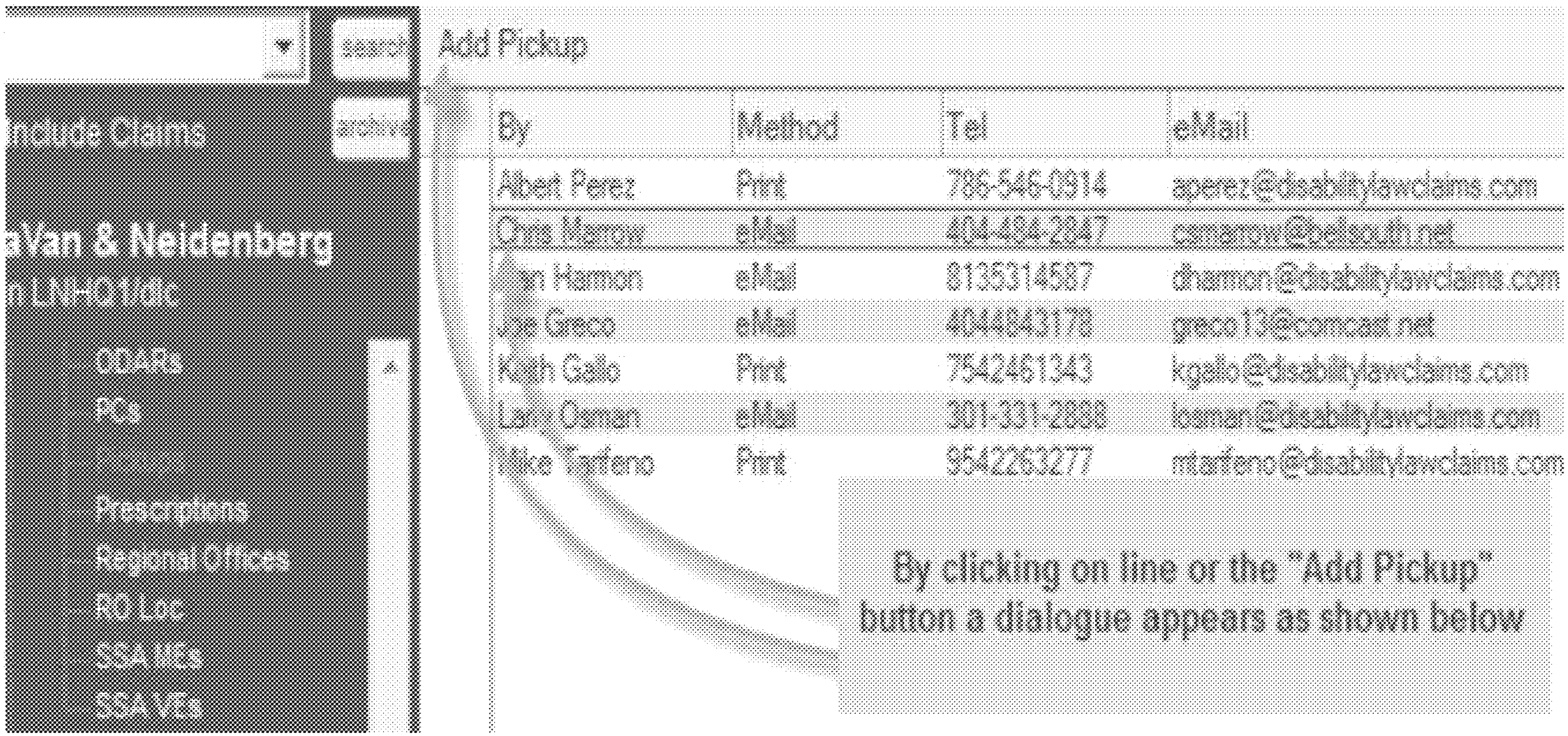
FIG. 117 is a screen shot of a locator module.
Figure 118:
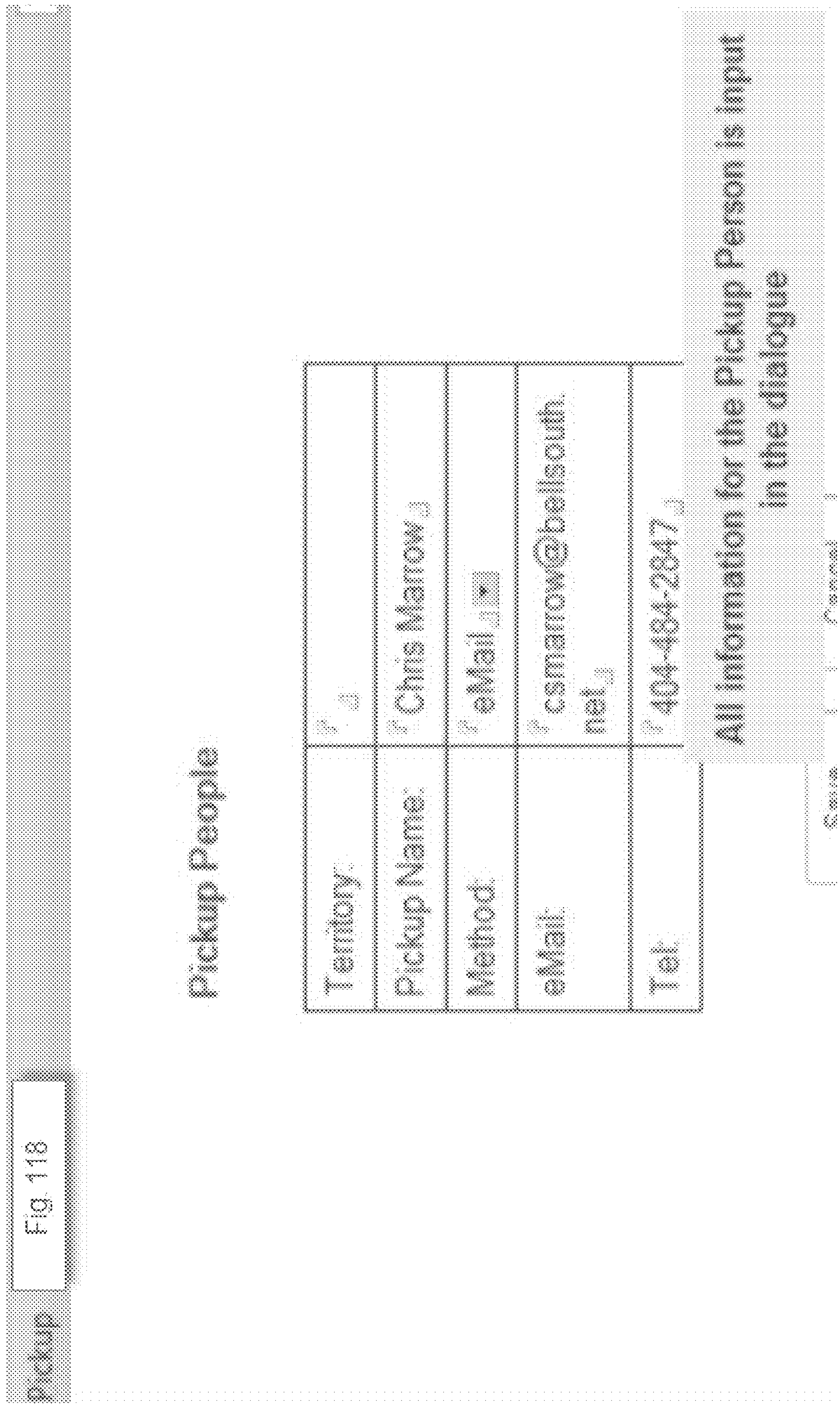
FIG. 118 is a screen shot of a locator module.
Figure 119:
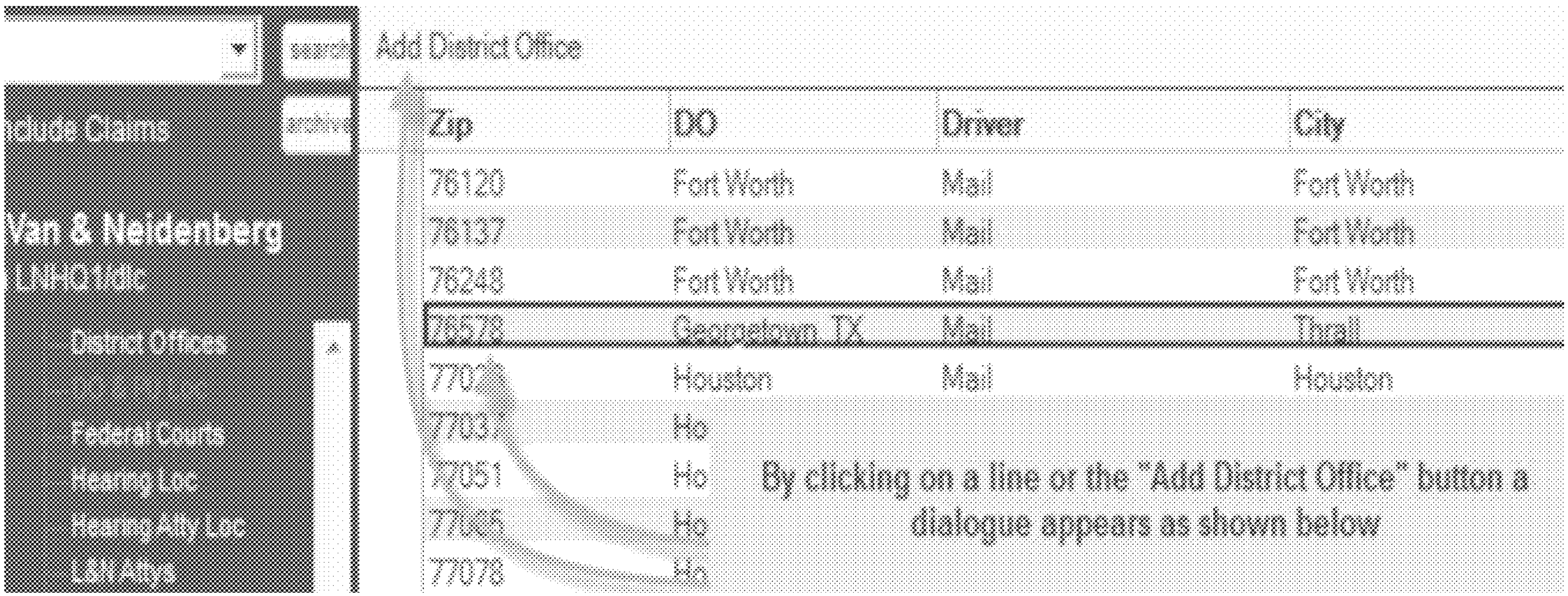
FIG. 119 is a screen shot of a locator module.
Figure 121:
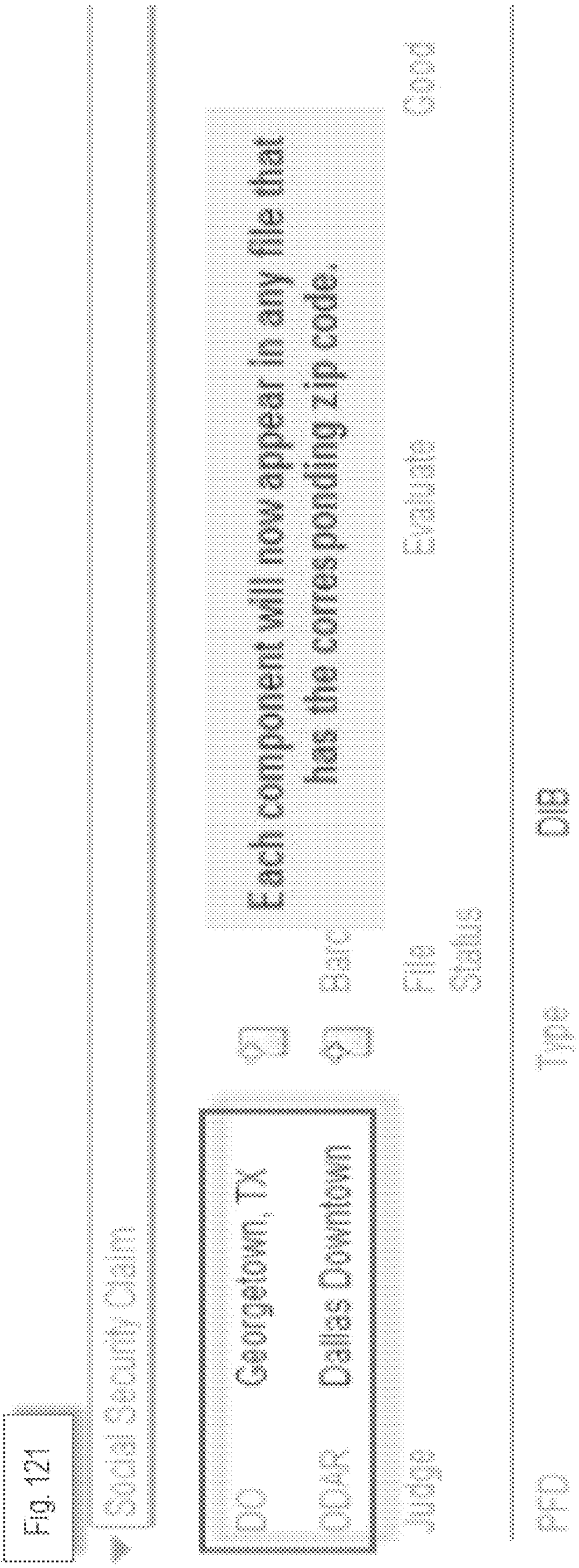
FIG. 121 is a screen shot of a locator module.
Figure 122:
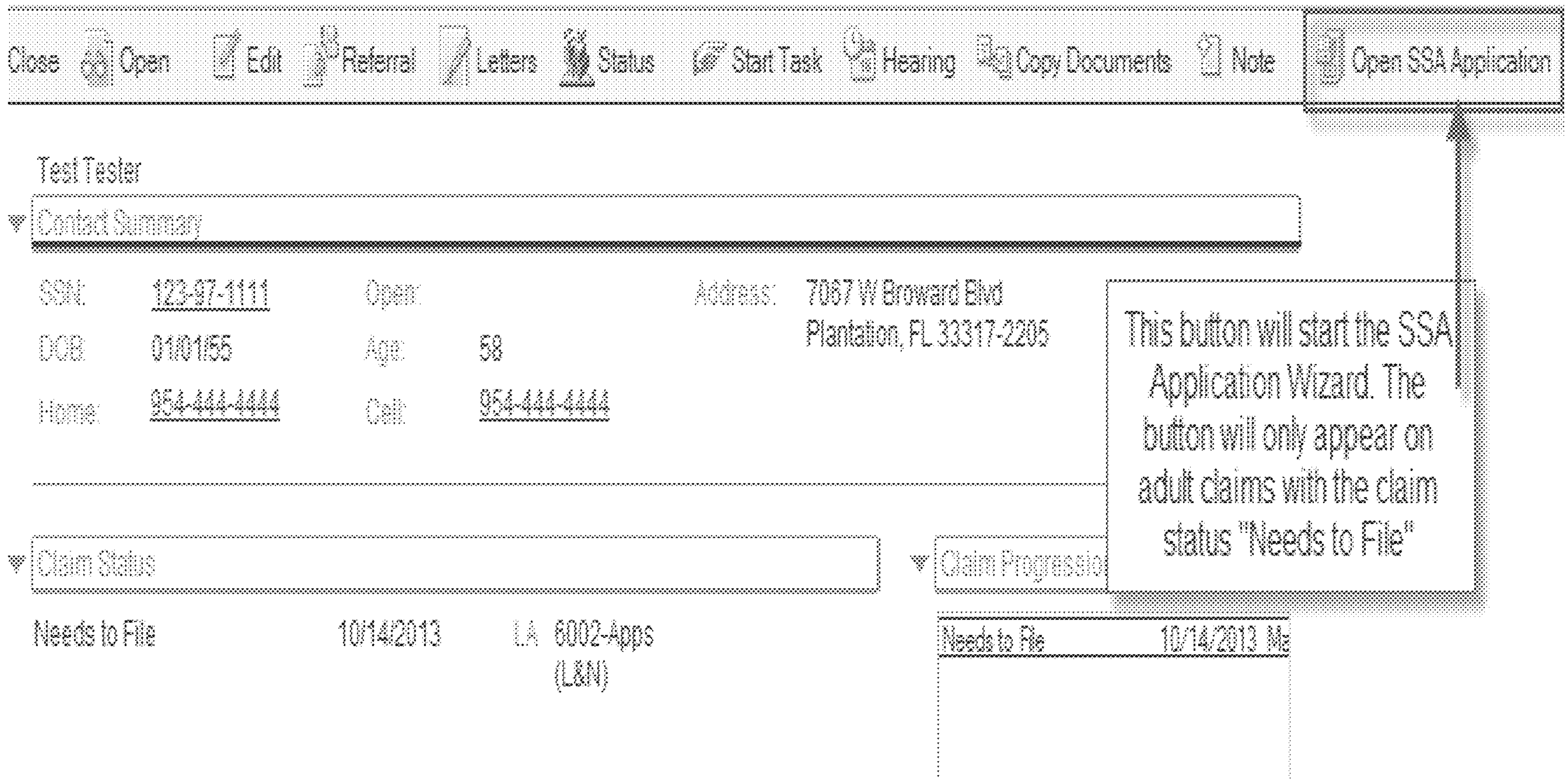
FIG. 122 is a screen shot of an Application Wizard.
Figure 124:
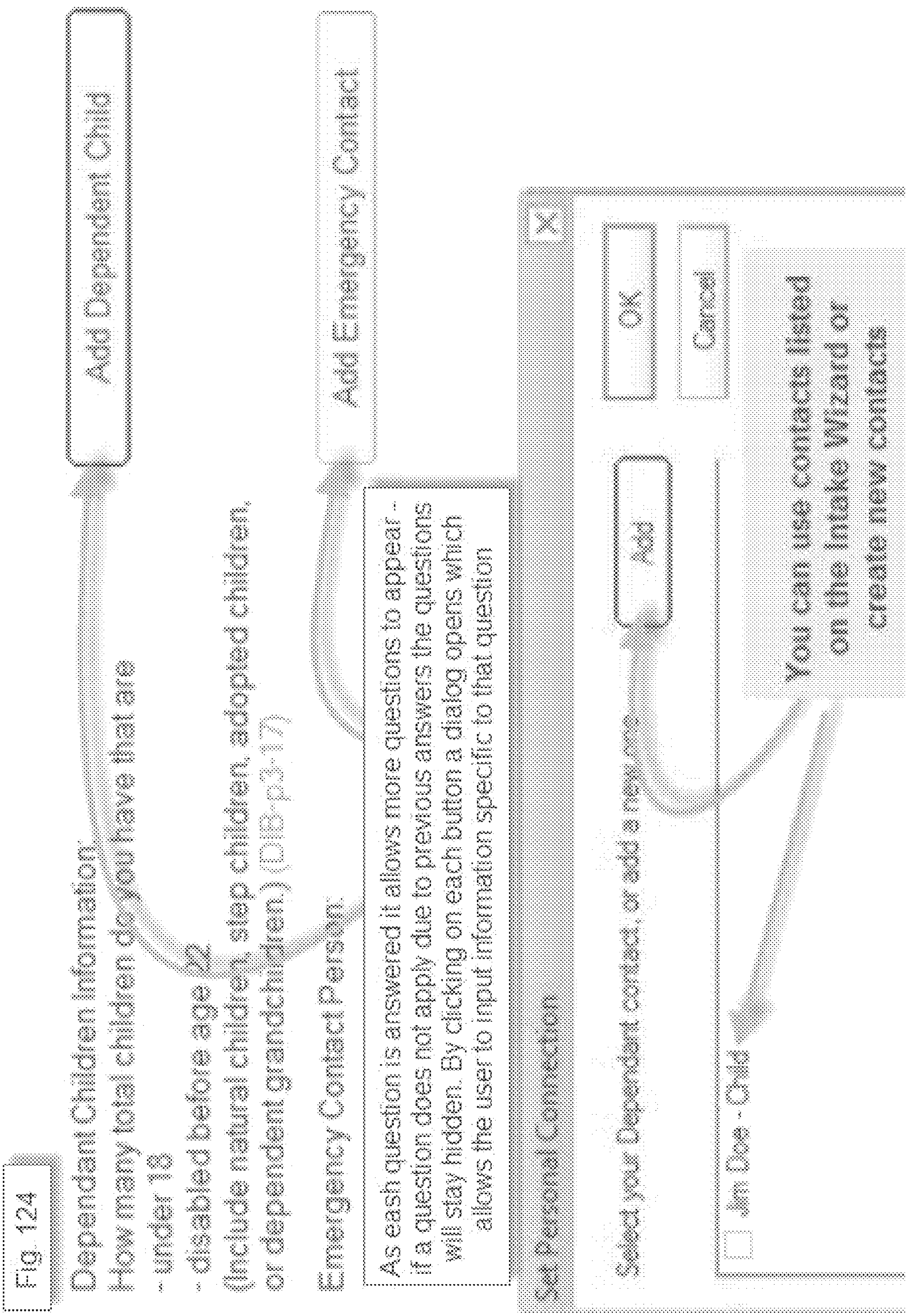
FIG. 124 is a screen shot of an Application Wizard.
Figure 125:
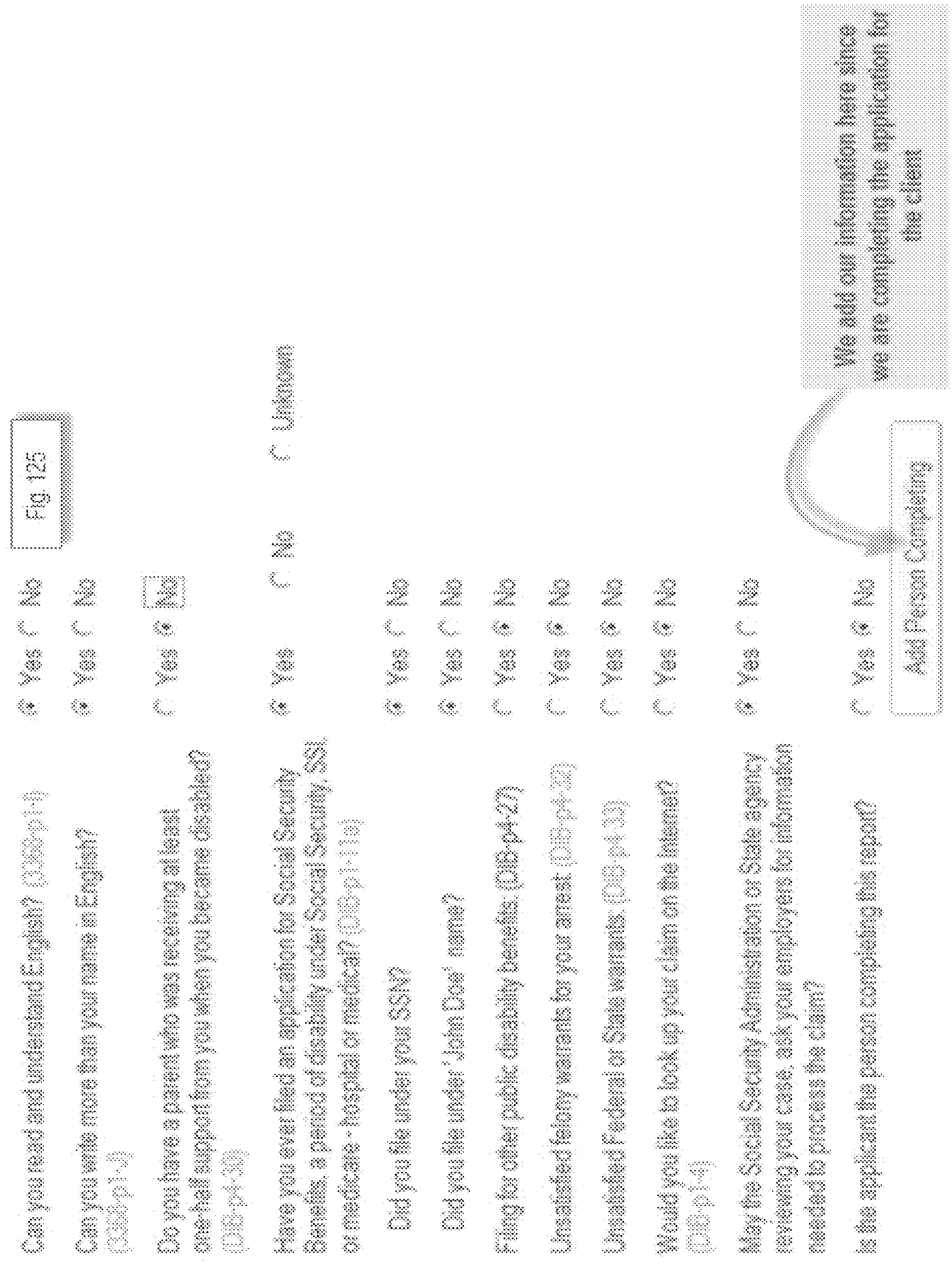
FIG. 125 is a screen shot of an Application Wizard.
Figure 127:
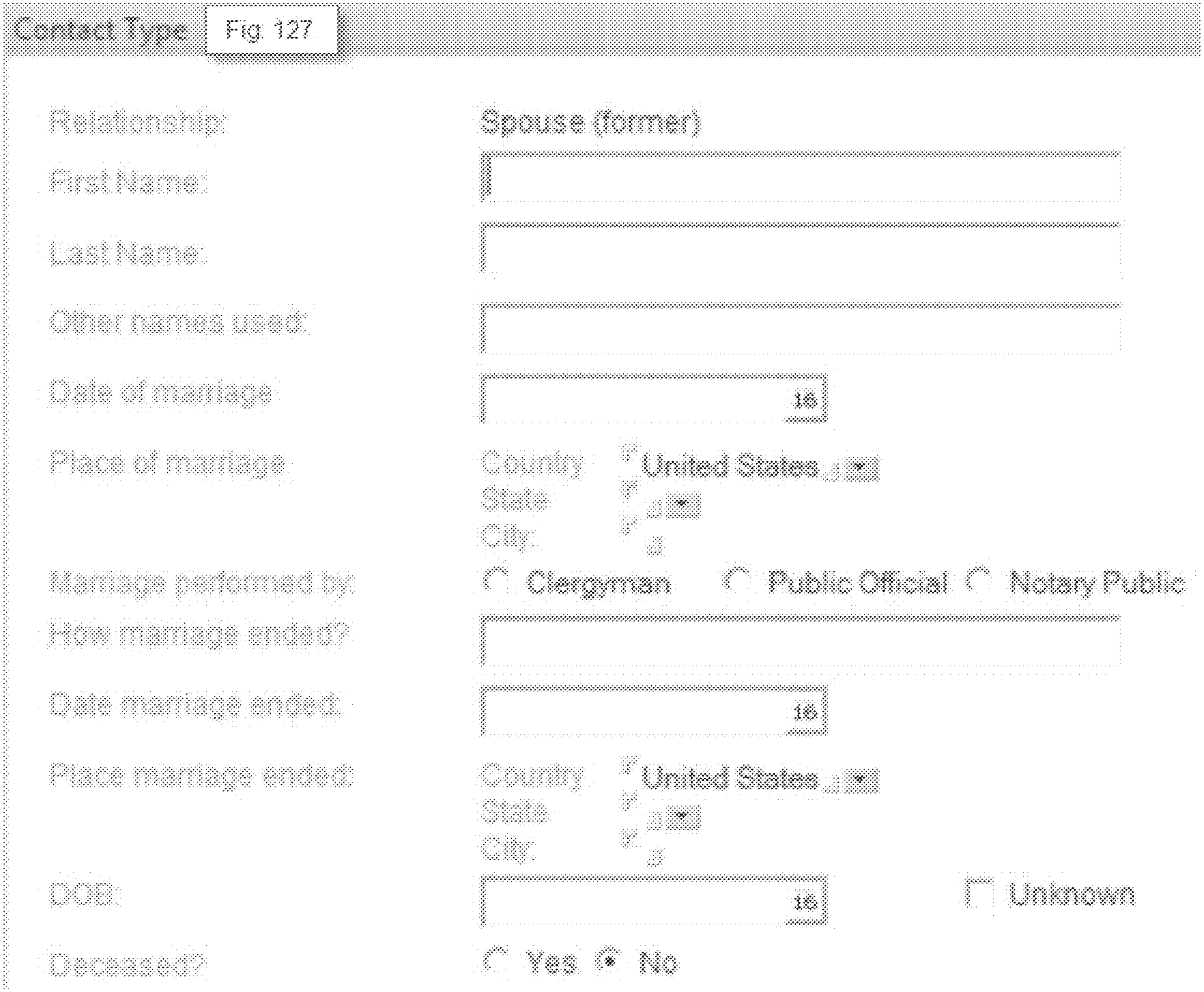
FIG. 127 is a screen shot of an Application Wizard.
Figure 129:
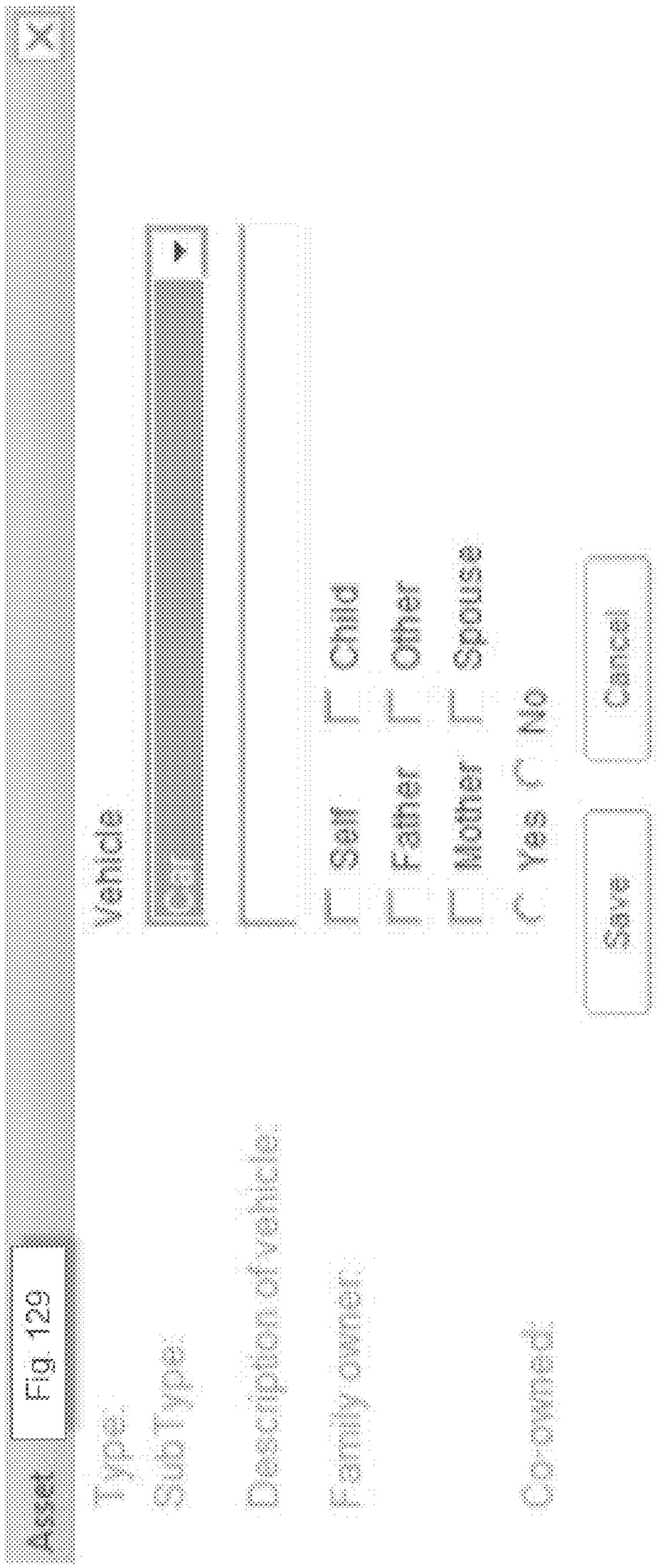
FIG. 129 is a screen shot of an Application Wizard.
Figure 130:
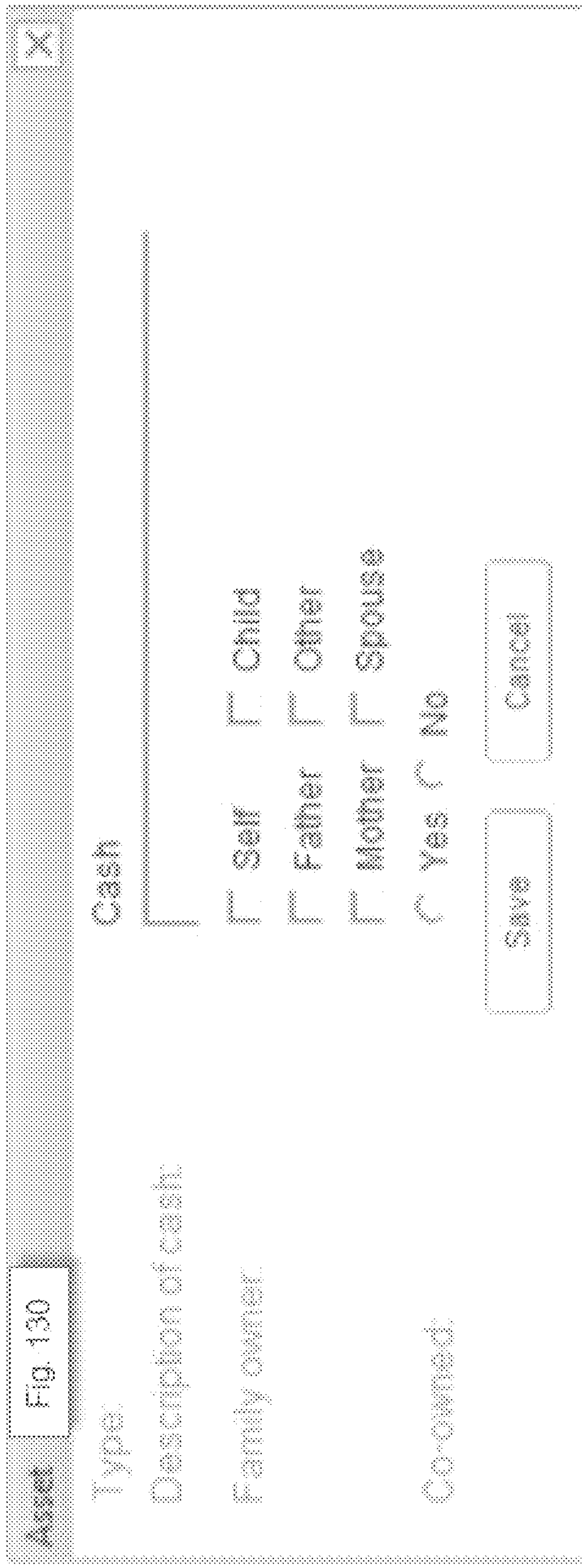
FIG. 130 is a screen shot of an Application Wizard.
Figure 131:
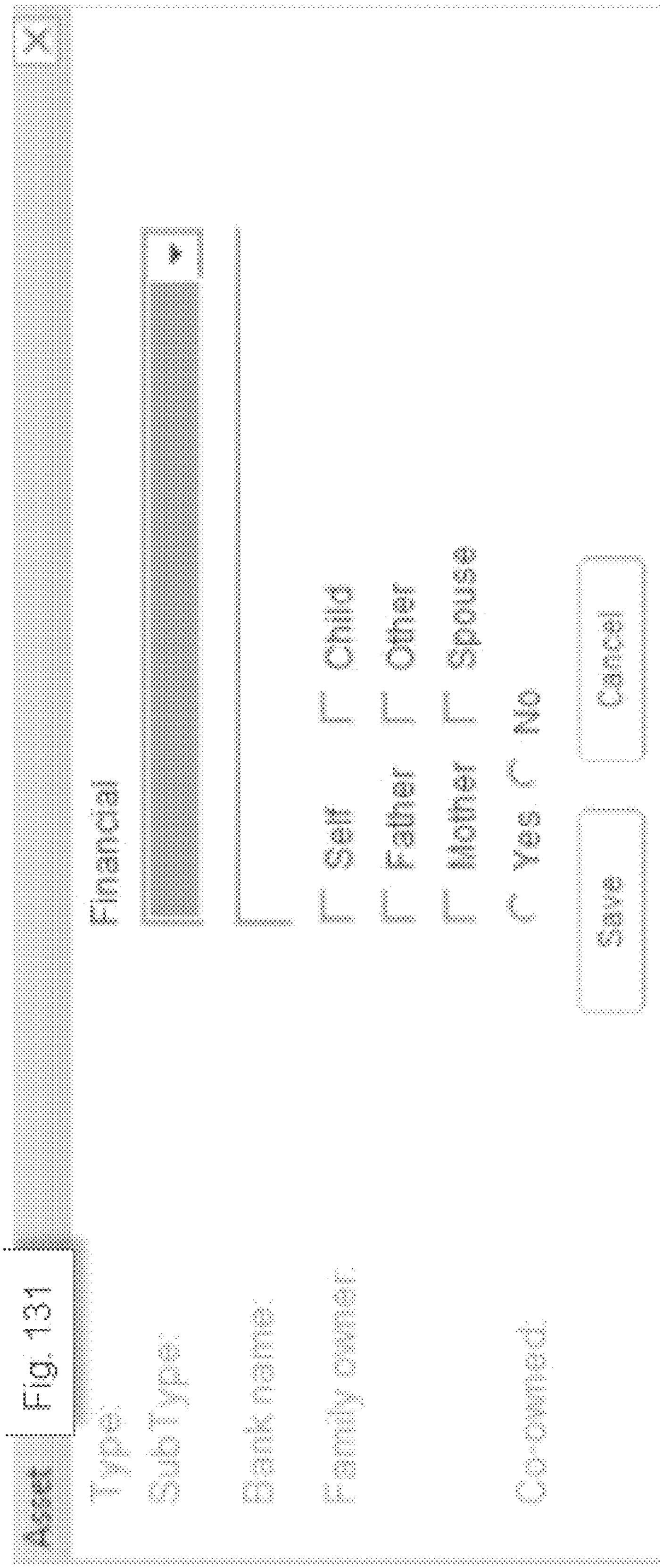
FIG. 131 is a screen shot of an Application Wizard.
Figure 132:
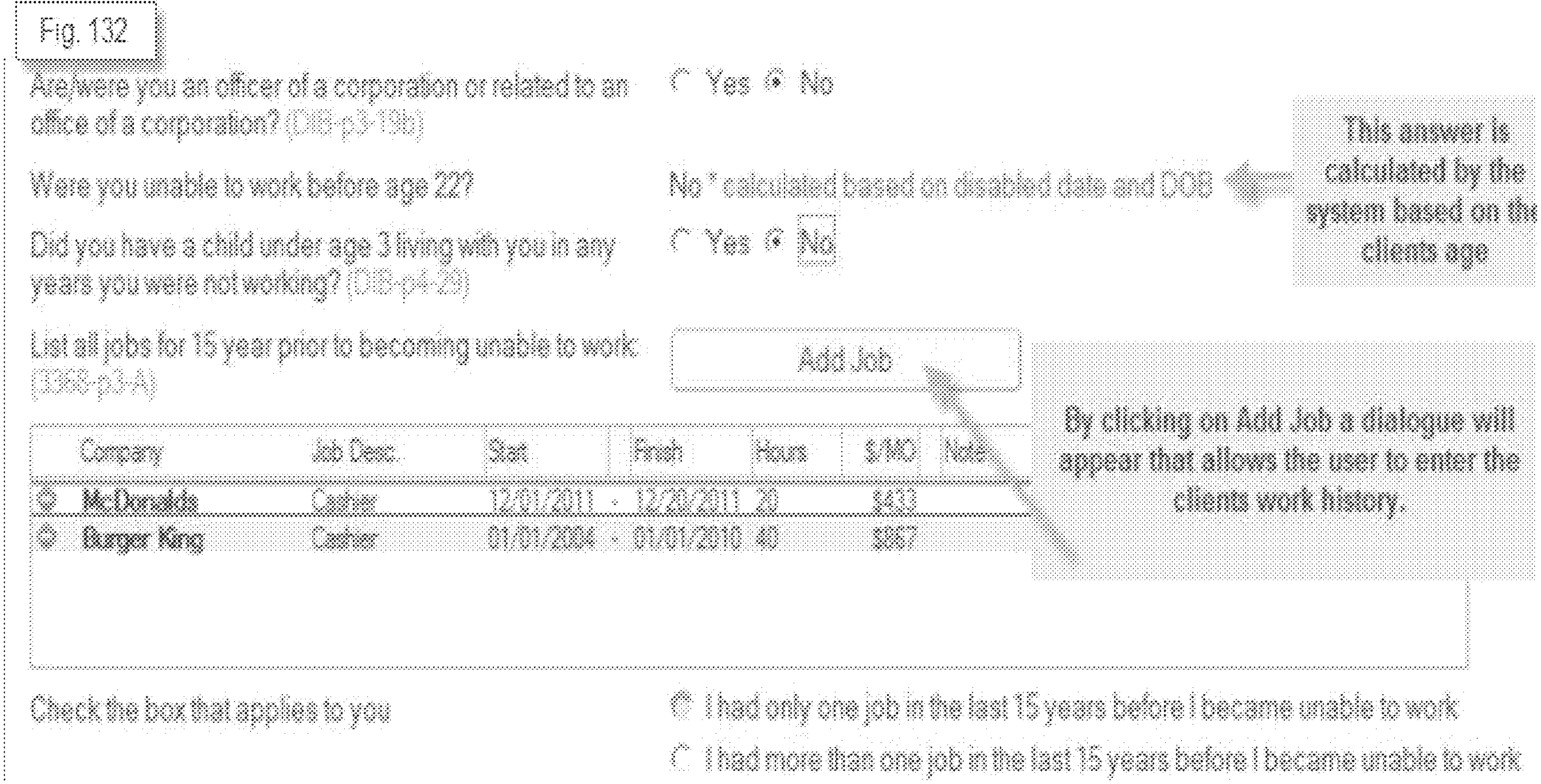
FIG. 132 is a screen shot of an Application Wizard.
Figure 133:
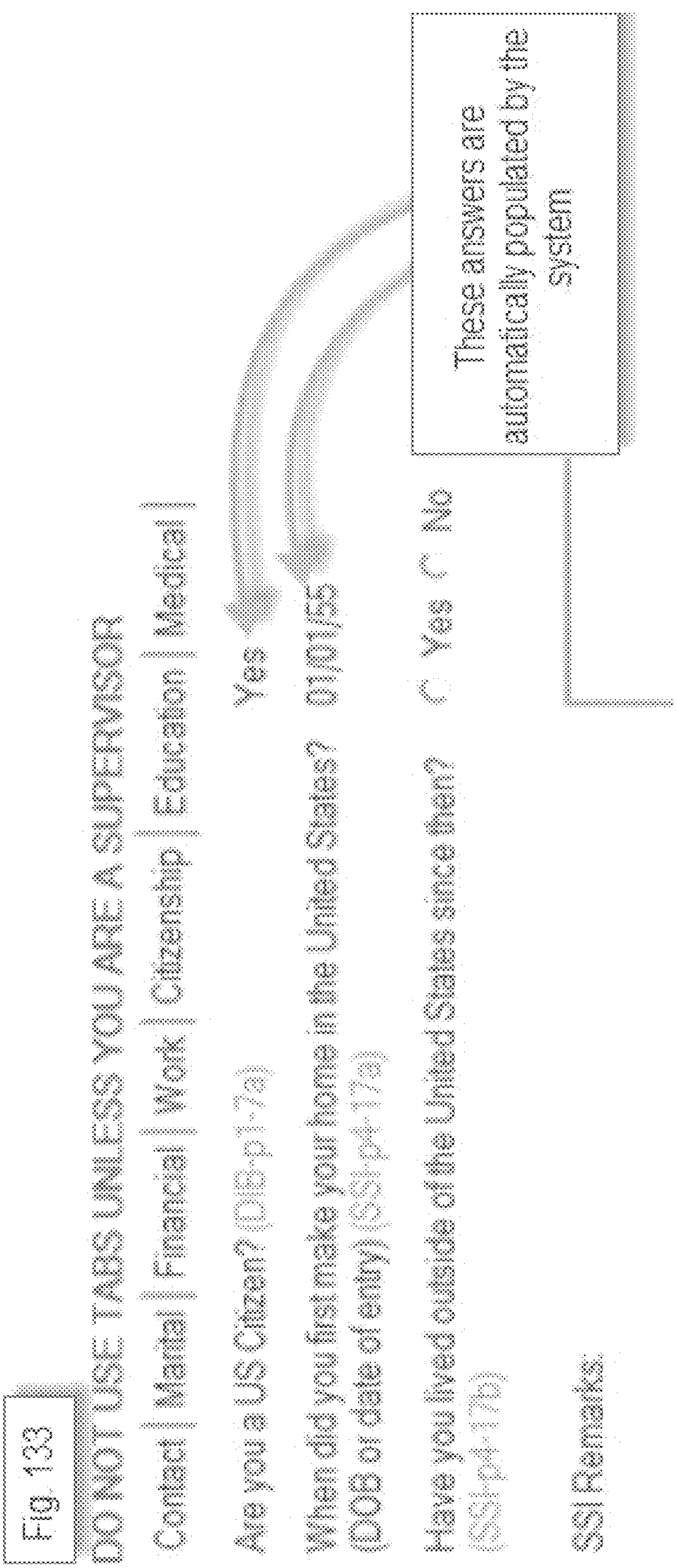
FIG. 133 is a screen shot of an Application Wizard.
Figure 136:
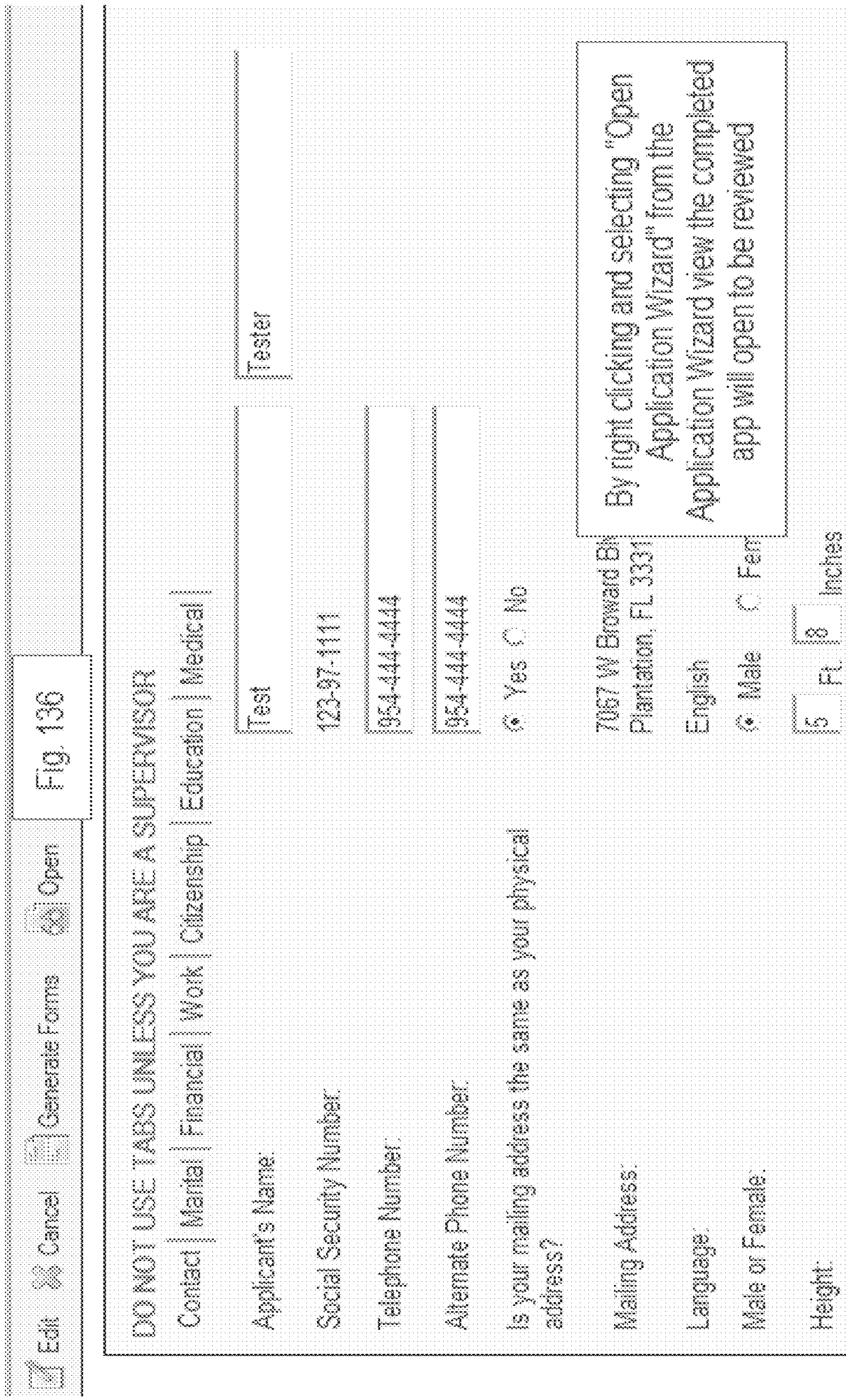
FIG. 136 is a screen shot of an Application Wizard.
Figure 137:
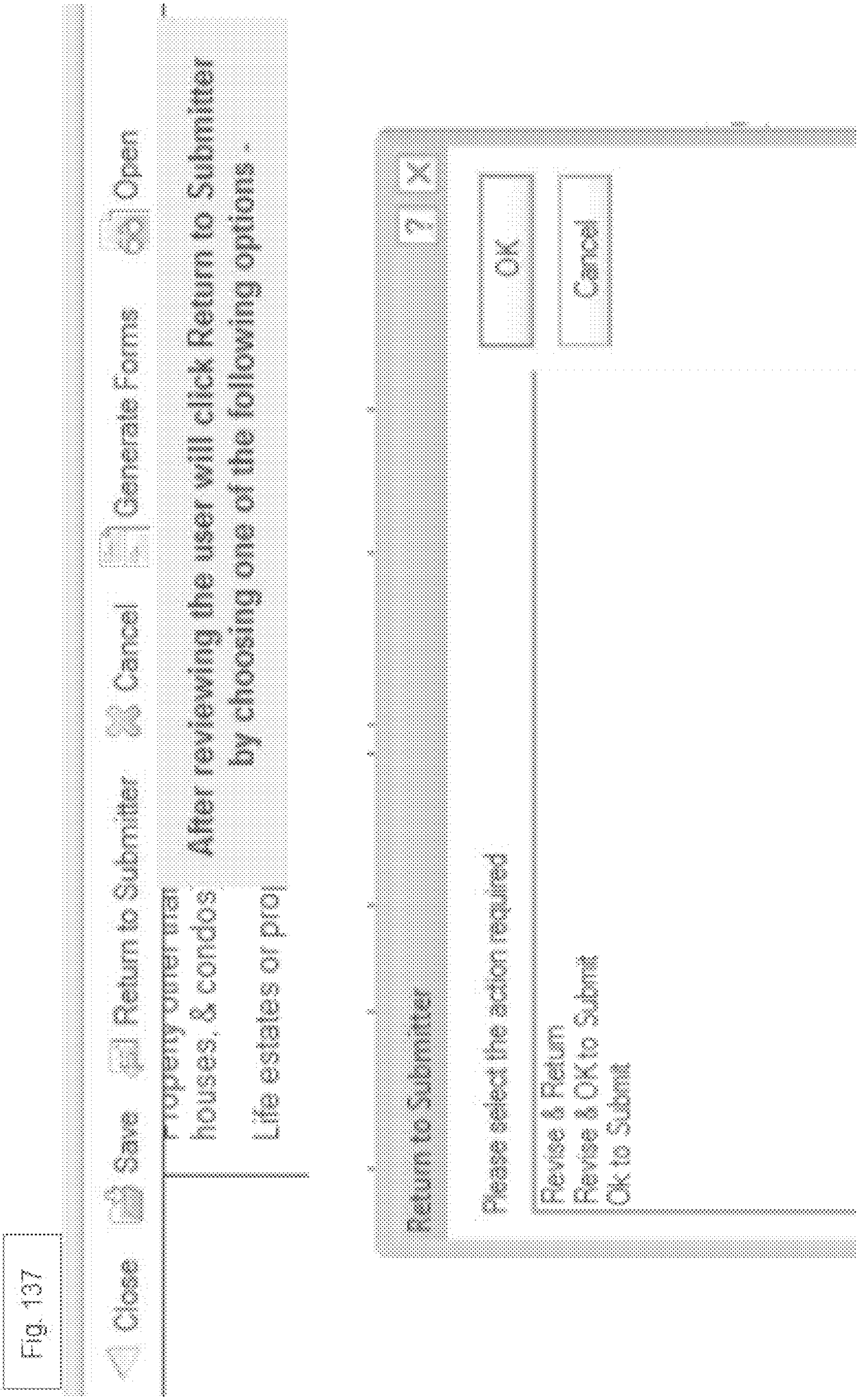
FIG. 137 is a screen shot of an Application Wizard.
Figure 138:
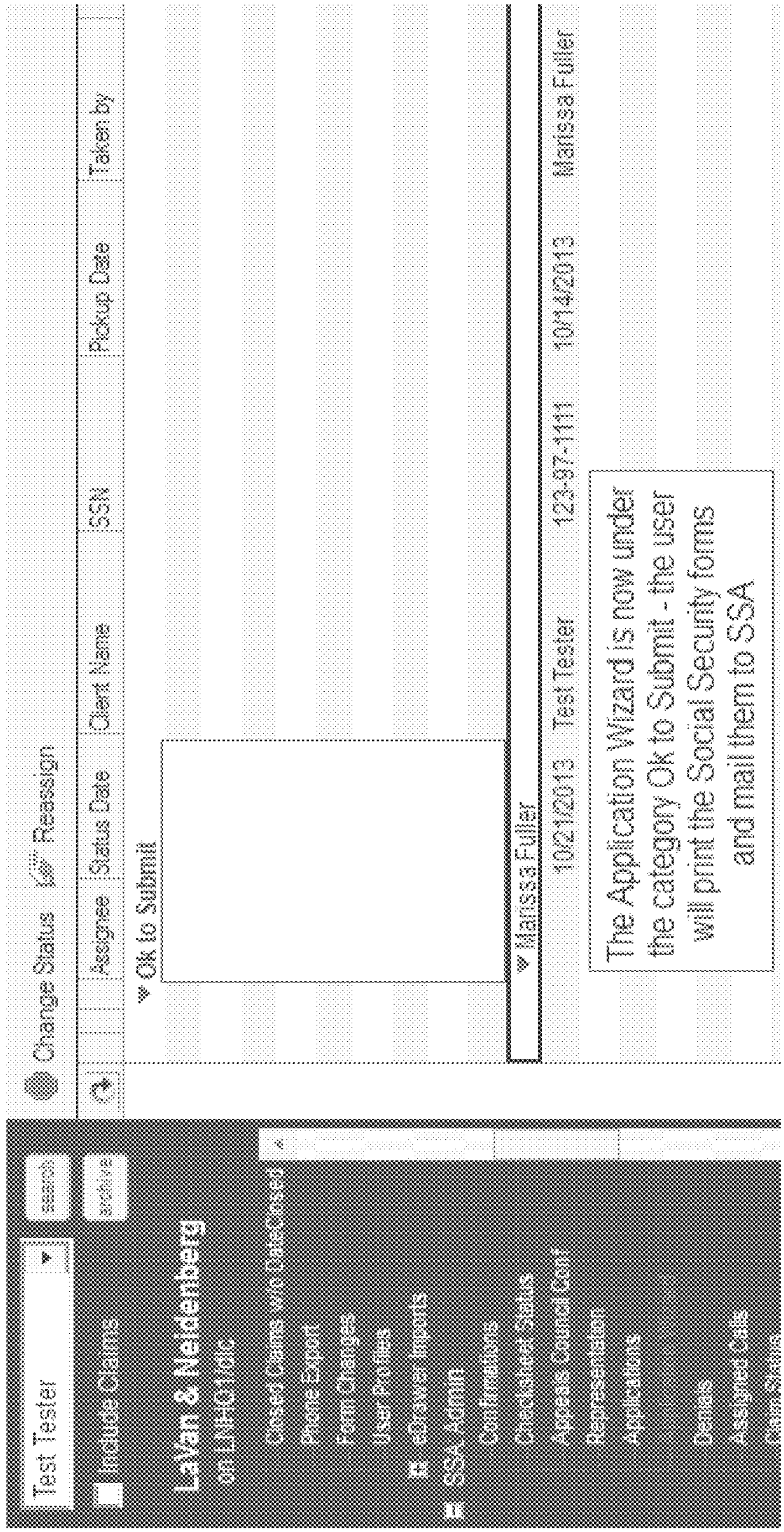
FIG. 138 is a screen shot of an Application Wizard.
Figure 140A:
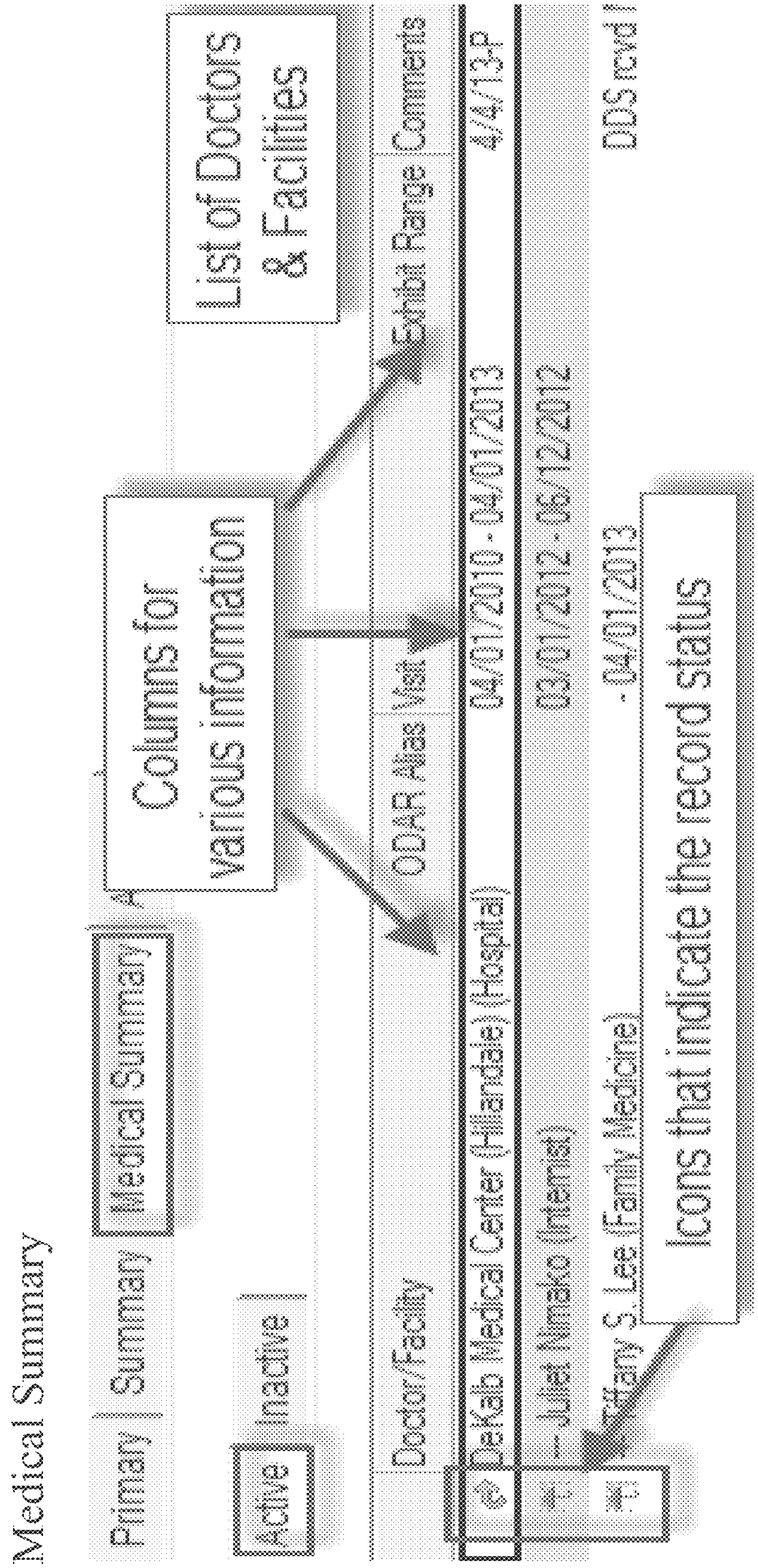
FIGS. 140*a*-140*c* are a screen shot of a CD Landing Page.
Figure 140B:
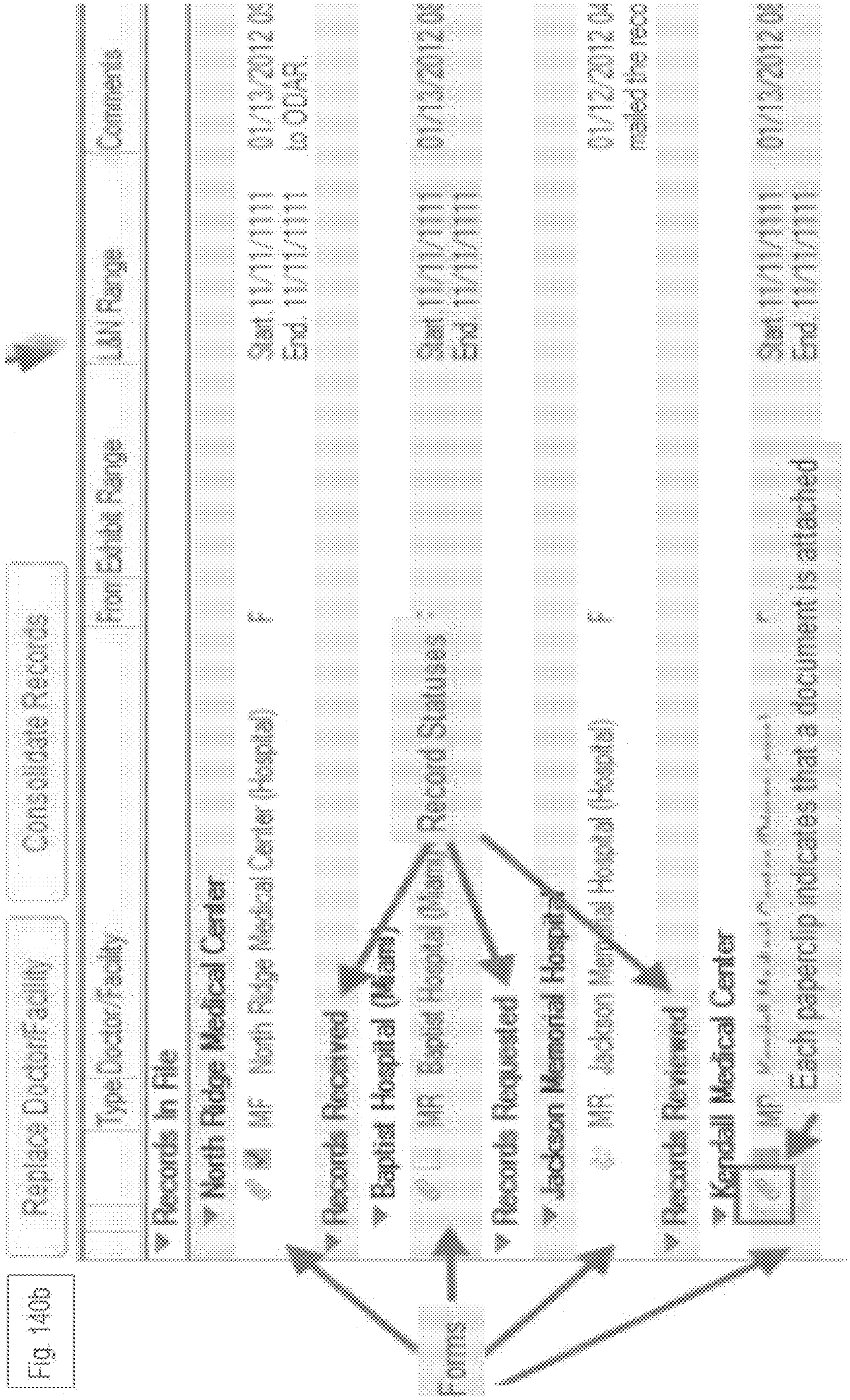
Figure 140C:
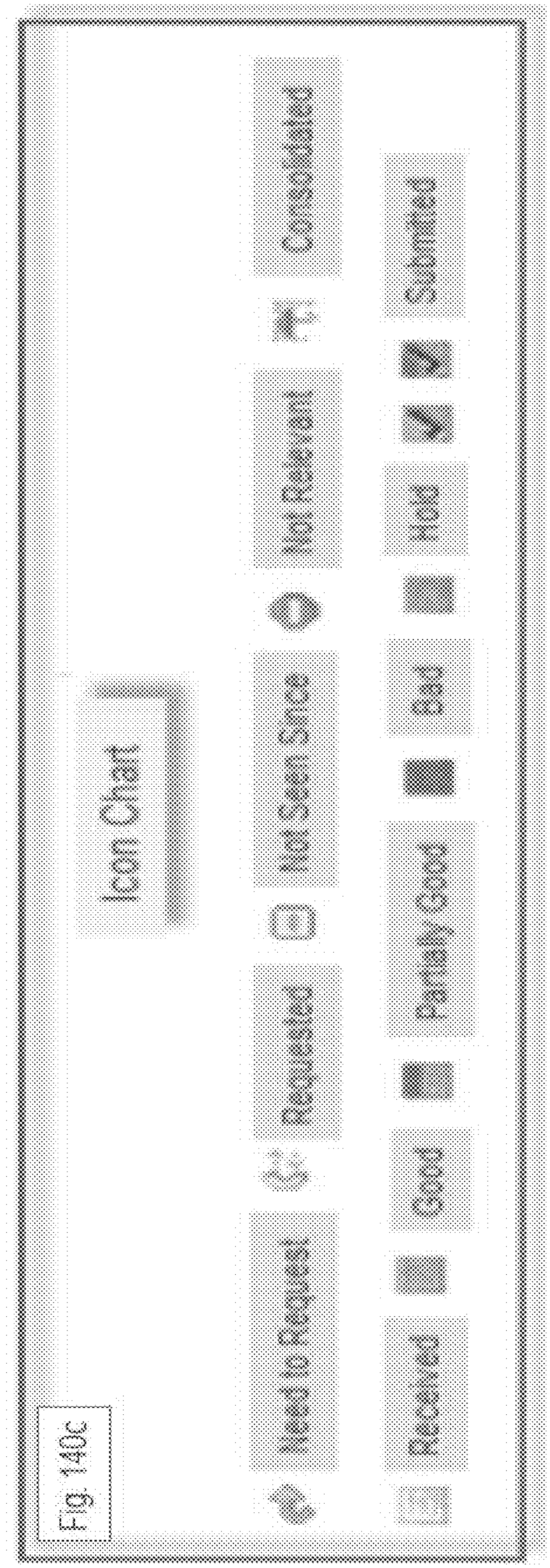
Figure 141:
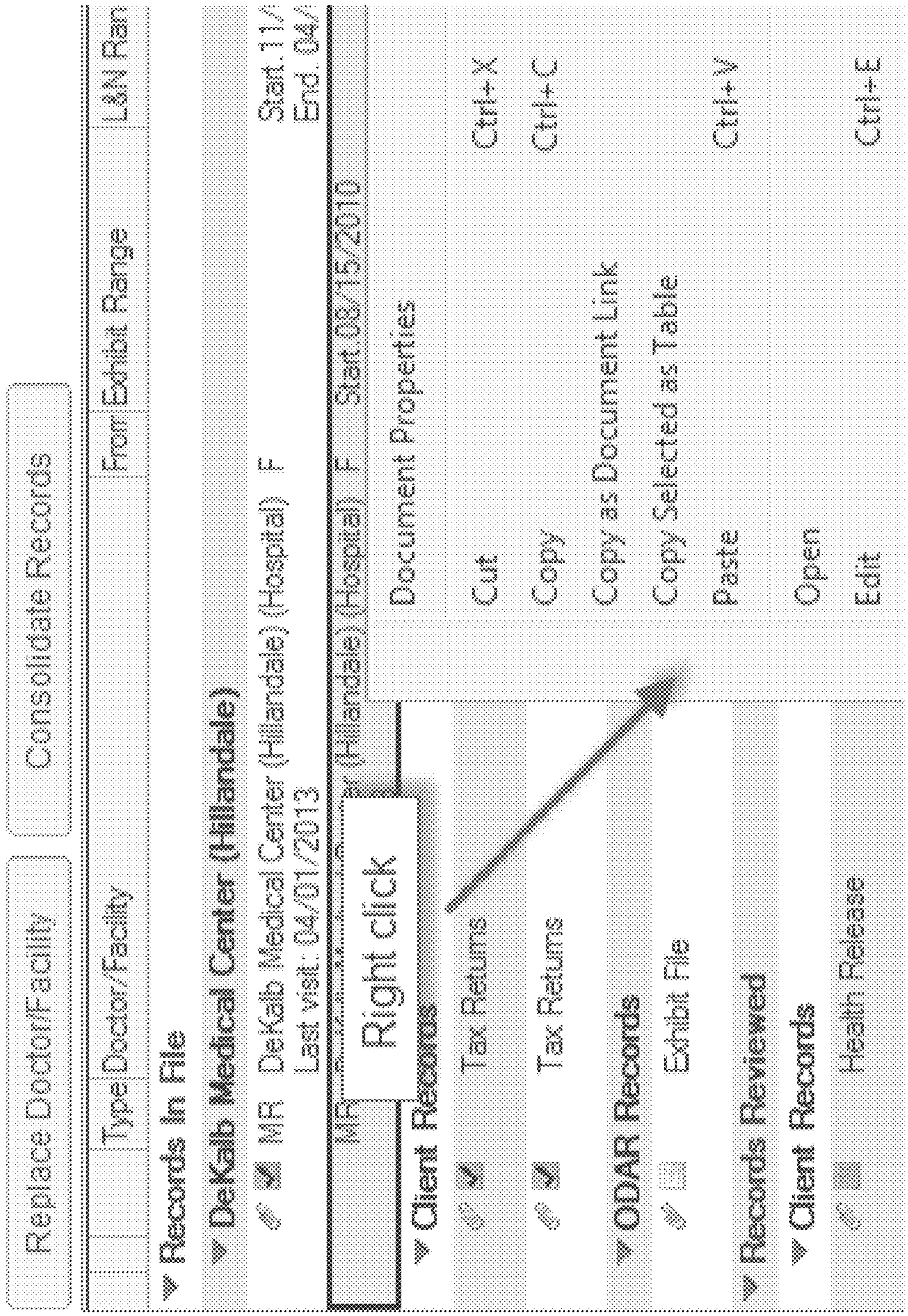
FIG. 141 is a screen shot of a CD Landing Page.
Figure 142:
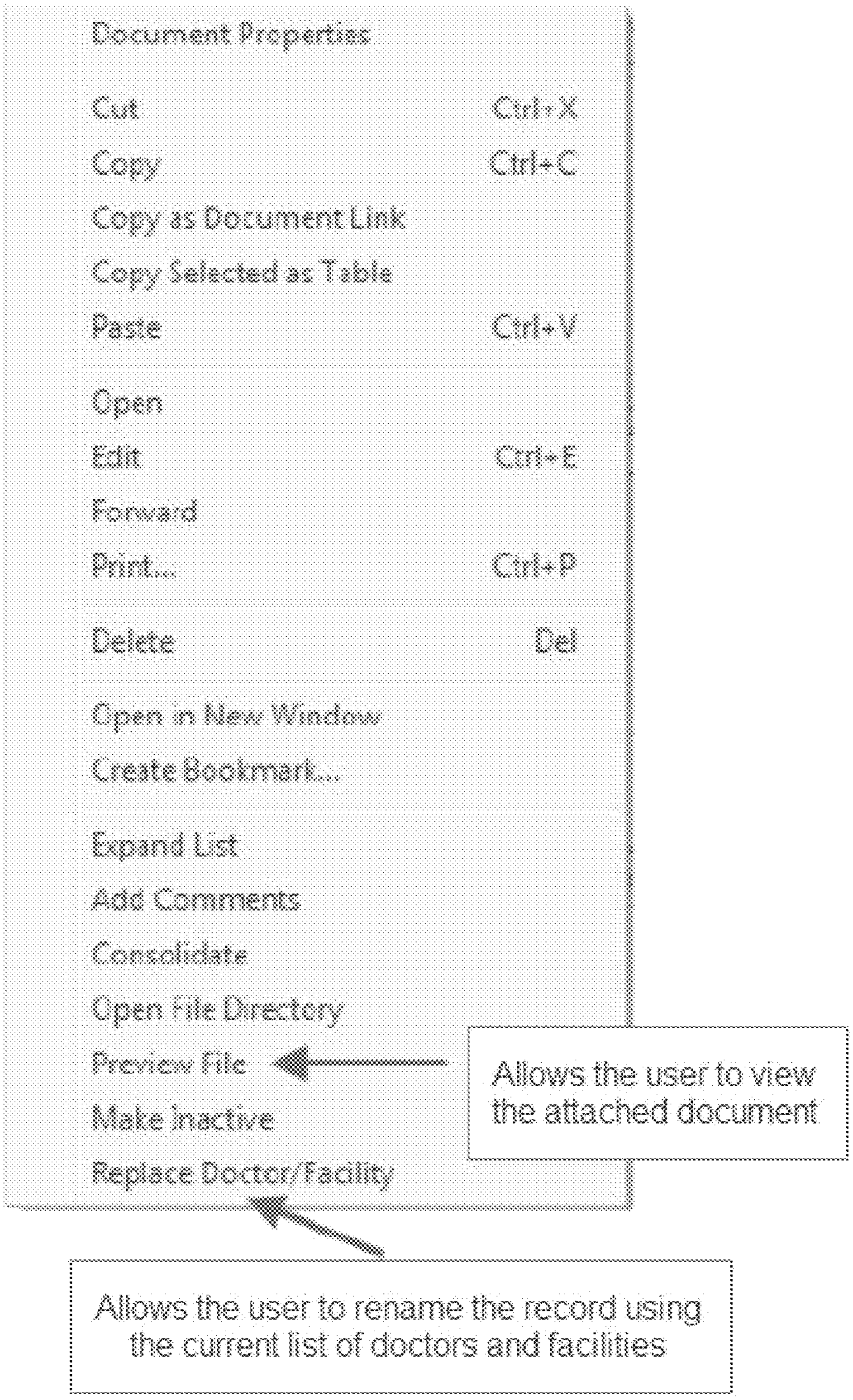
FIG. 142 is a screen shot of a CD Landing Page.
Figure 143:
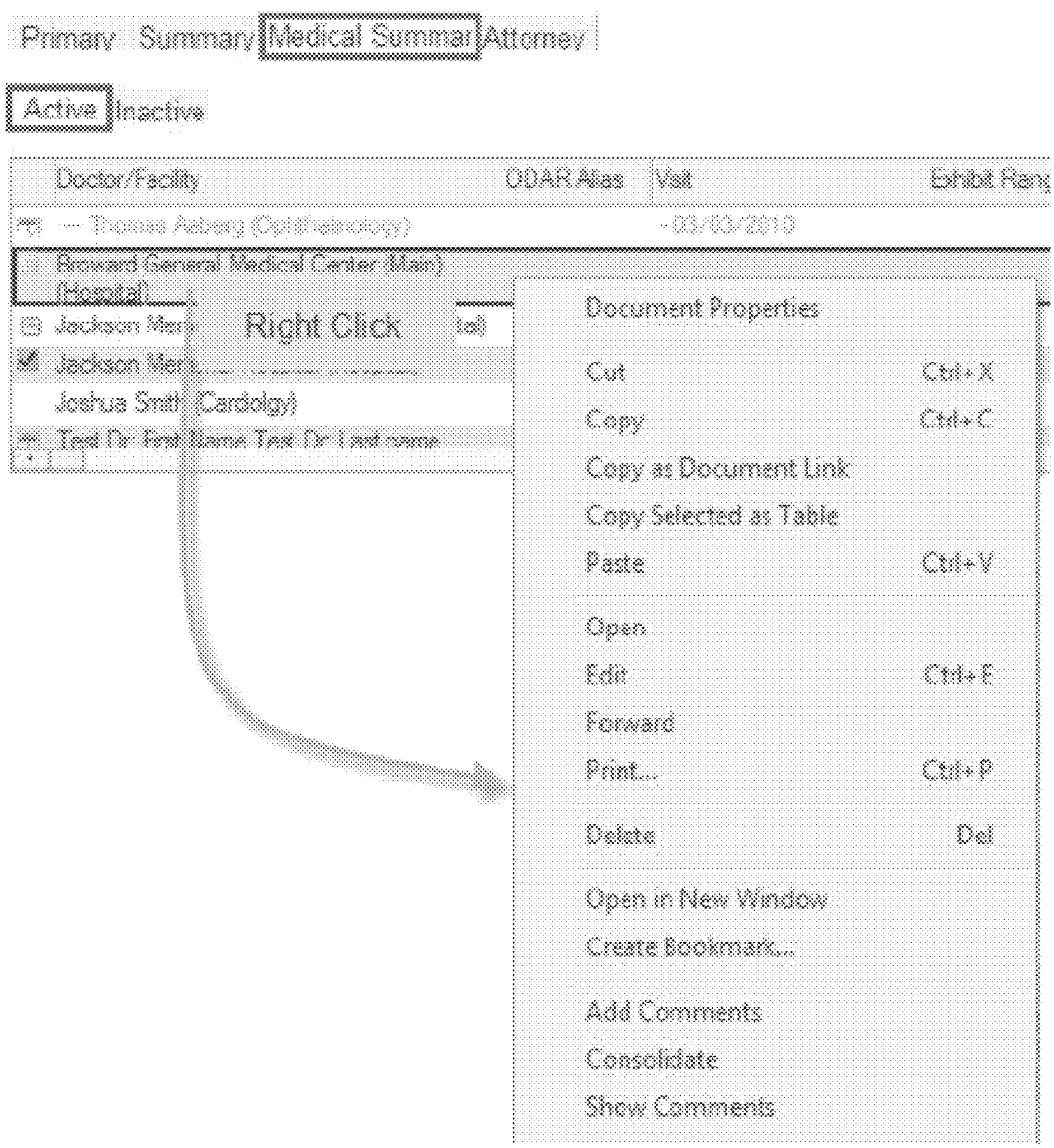
FIG. 143 is a screen shot of a CD Landing Page.
Figure 144:
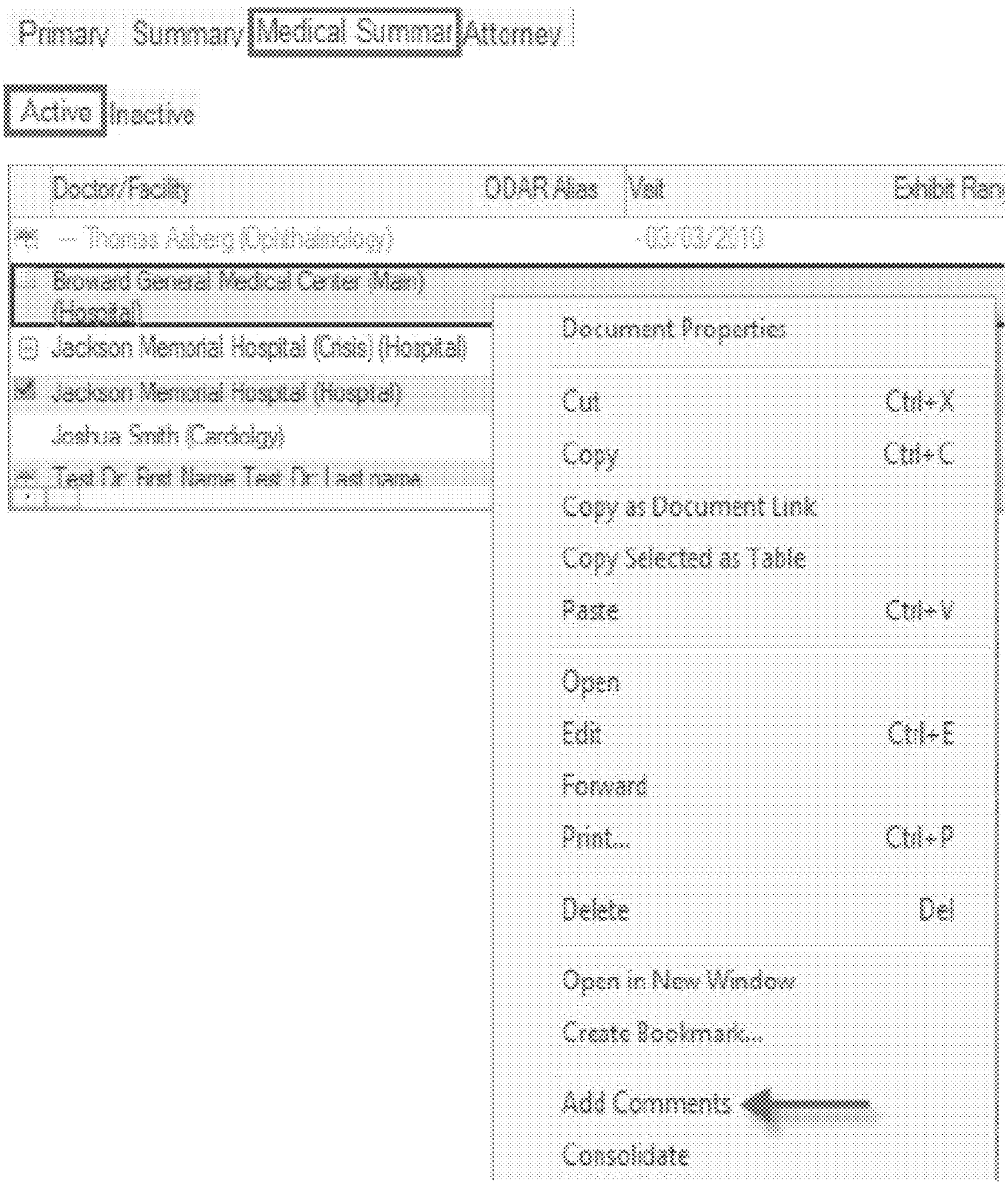
FIG. 144 is a screen shot of a CD Landing Page.
Figure 145:
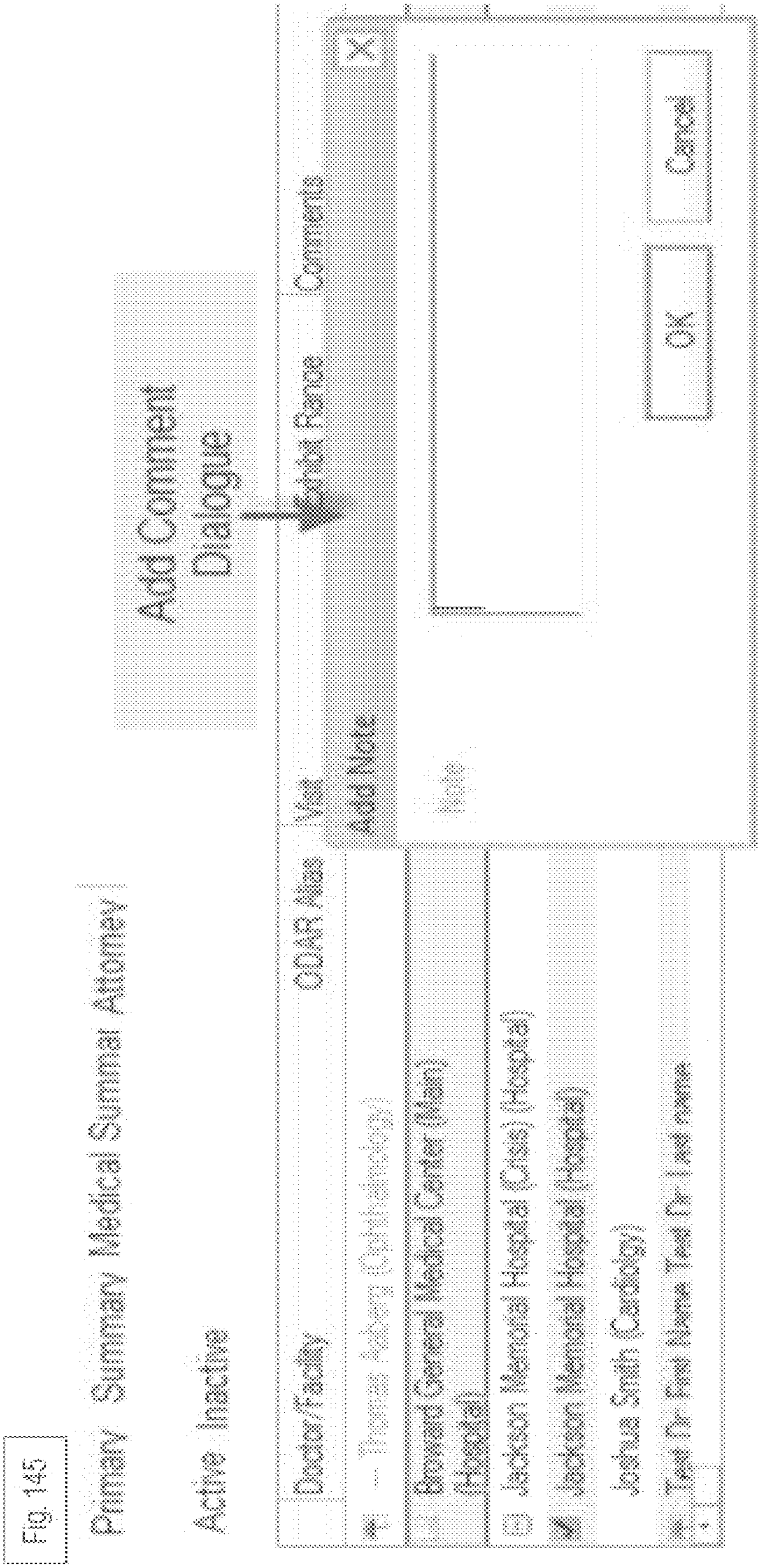
FIG. 145 is a screen shot of a CD Landing Page.
Figure 147:
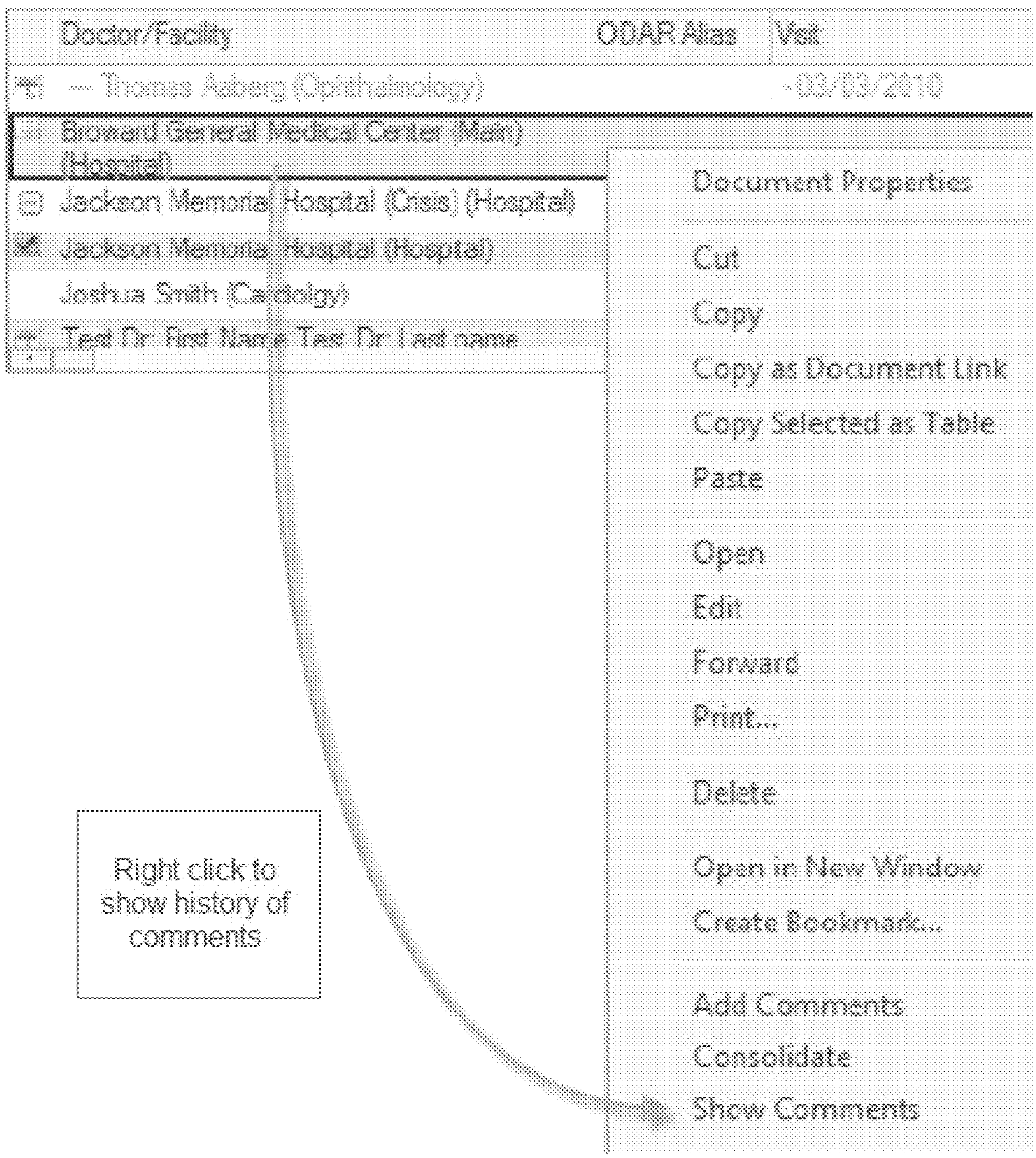
FIG. 147 is a screen shot of a CD Landing Page.
Figure 148:
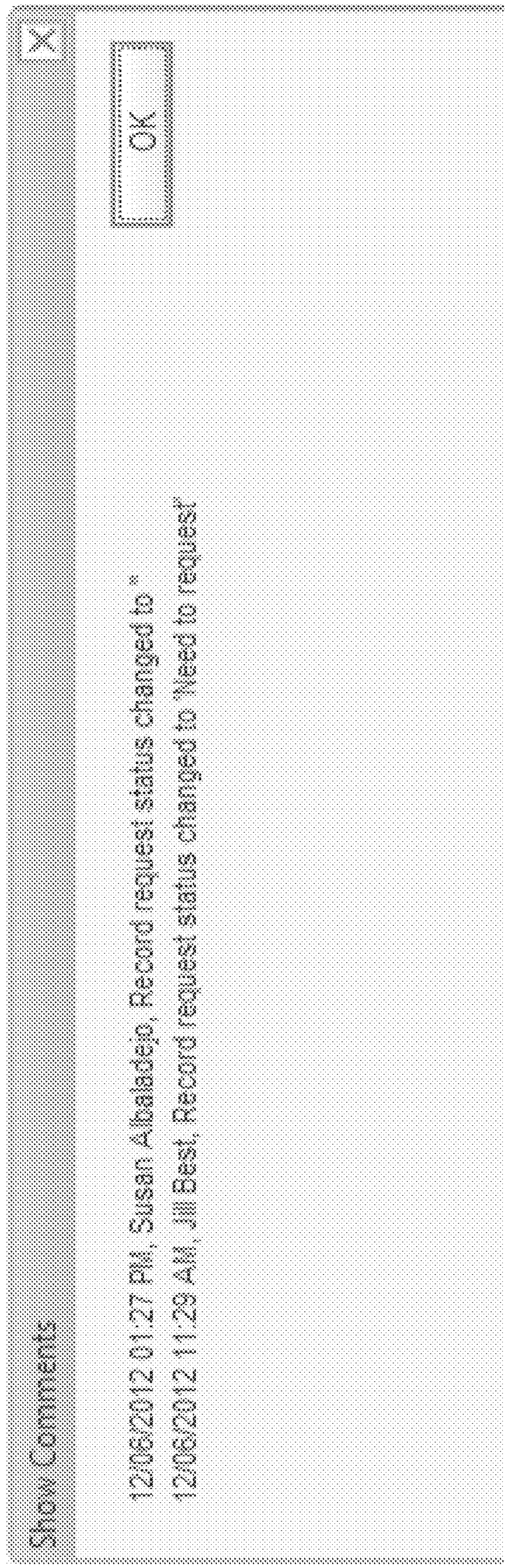
FIG. 148 is a screen shot of a CD Landing Page.
Figure 149:
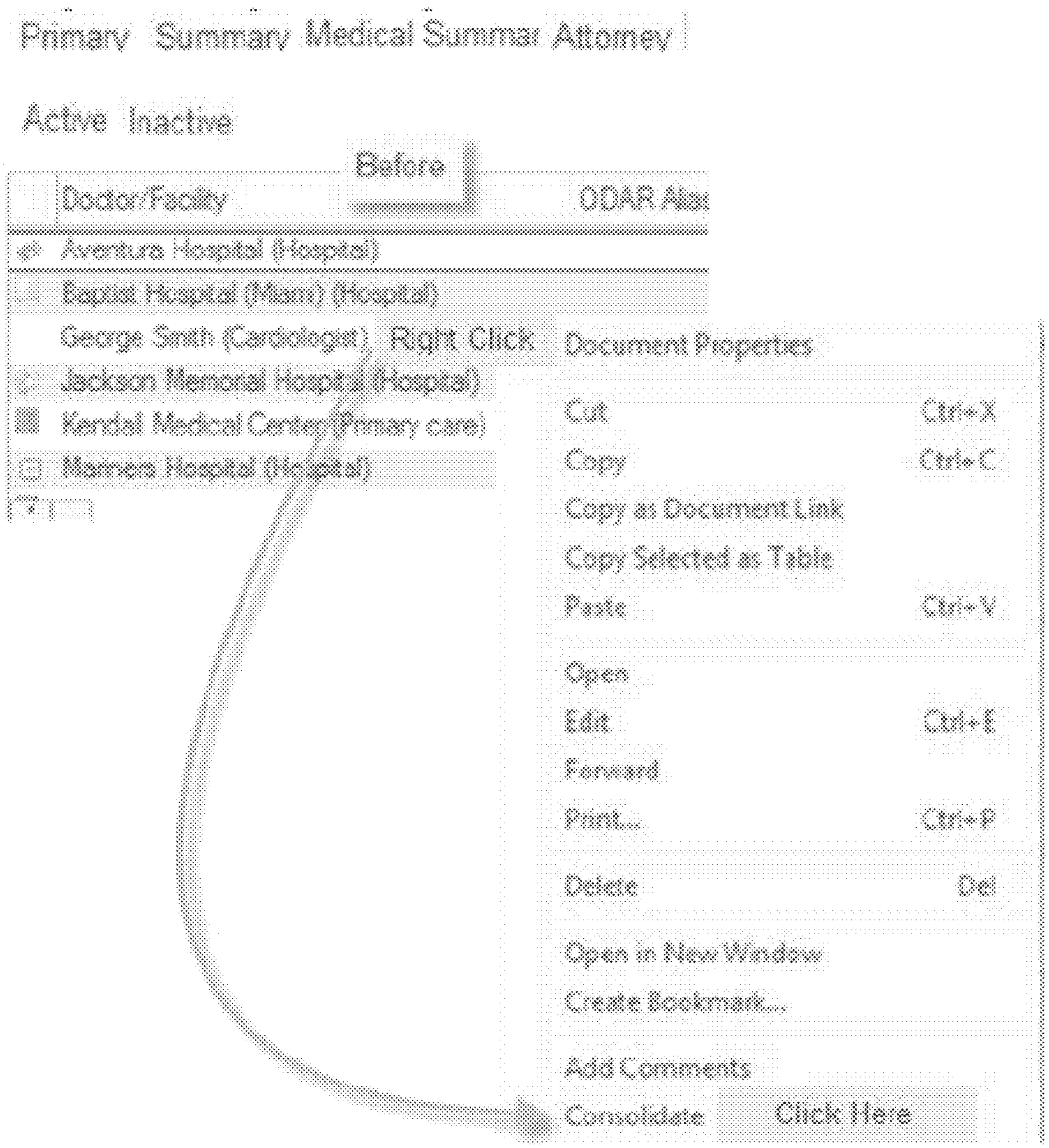
FIG. 149 is a screen shot of a CD Landing Page.
Figure 150:
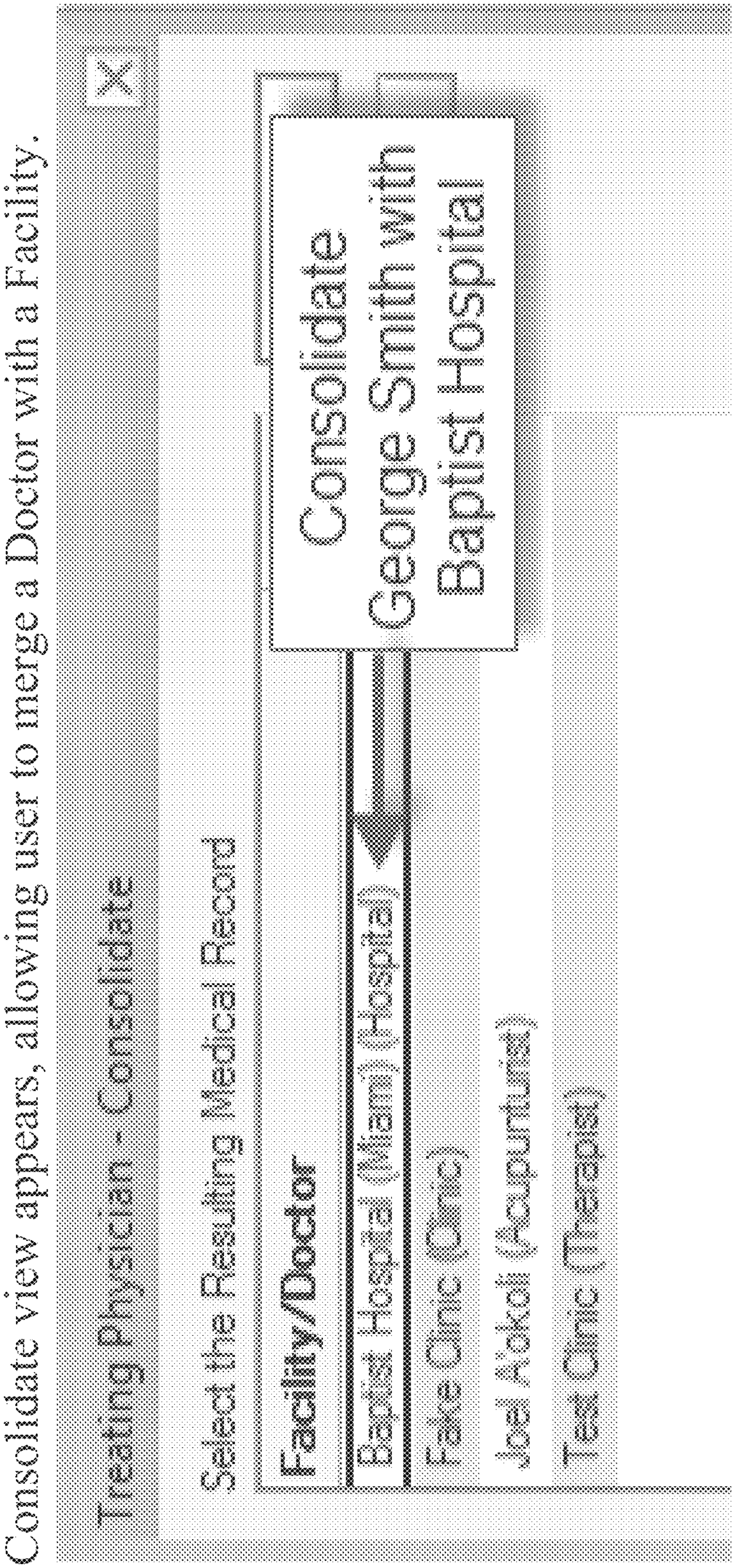
FIG. 150 is a screen shot of a CD Landing Page.
Figure 151:
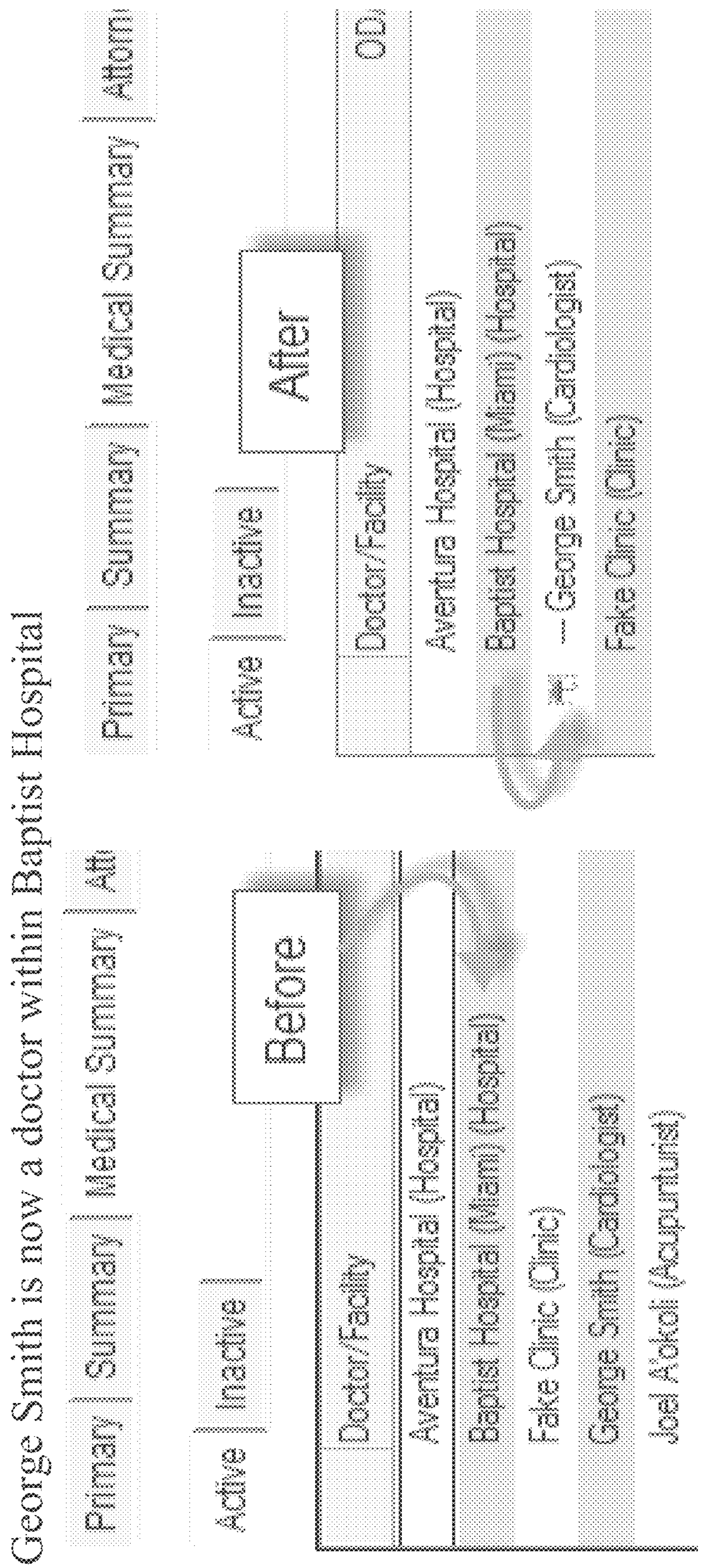
FIG. 151 is a screen shot of a CD Landing Page.
Figure 152A:
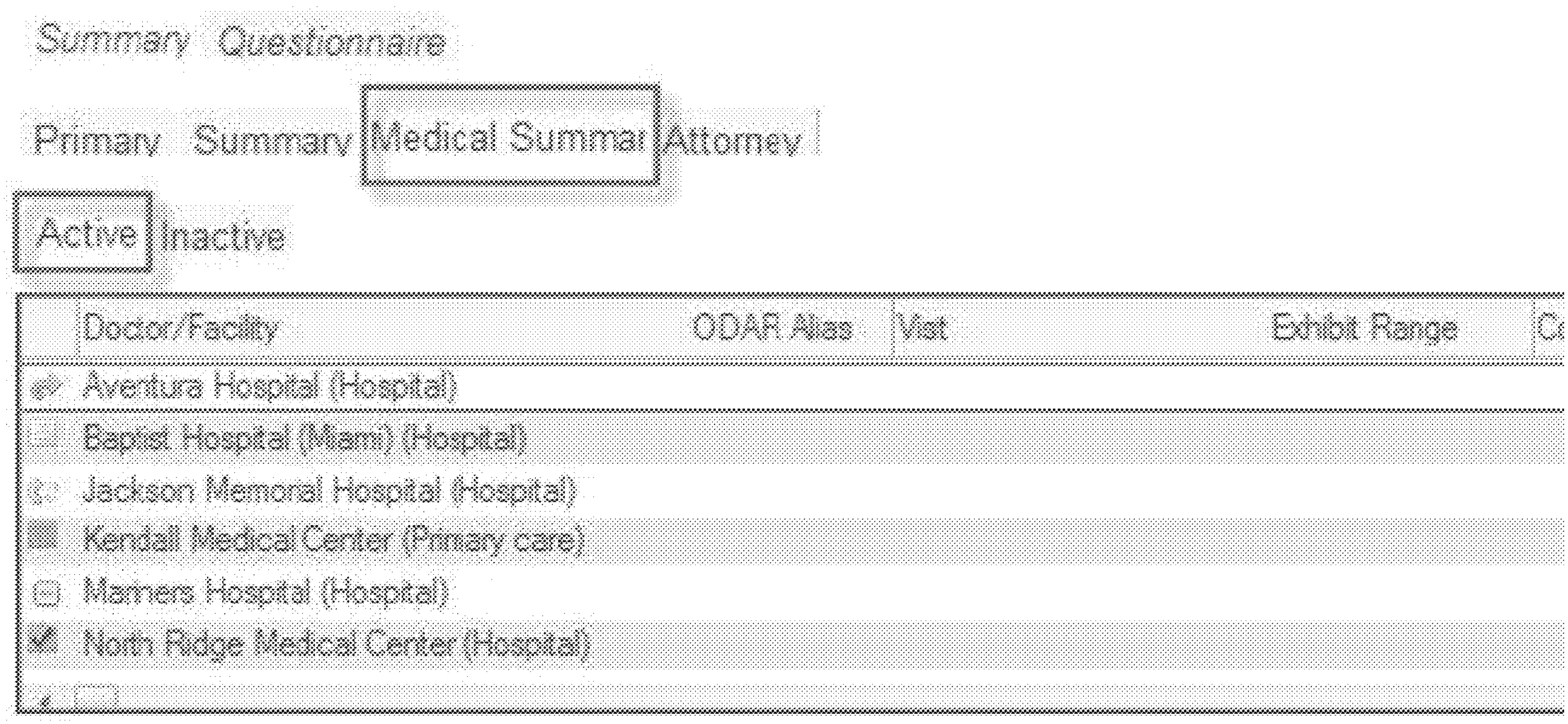
FIGS. 152*a*-152*b* are a screen shot of a CD Landing Page.
Figure 152B:
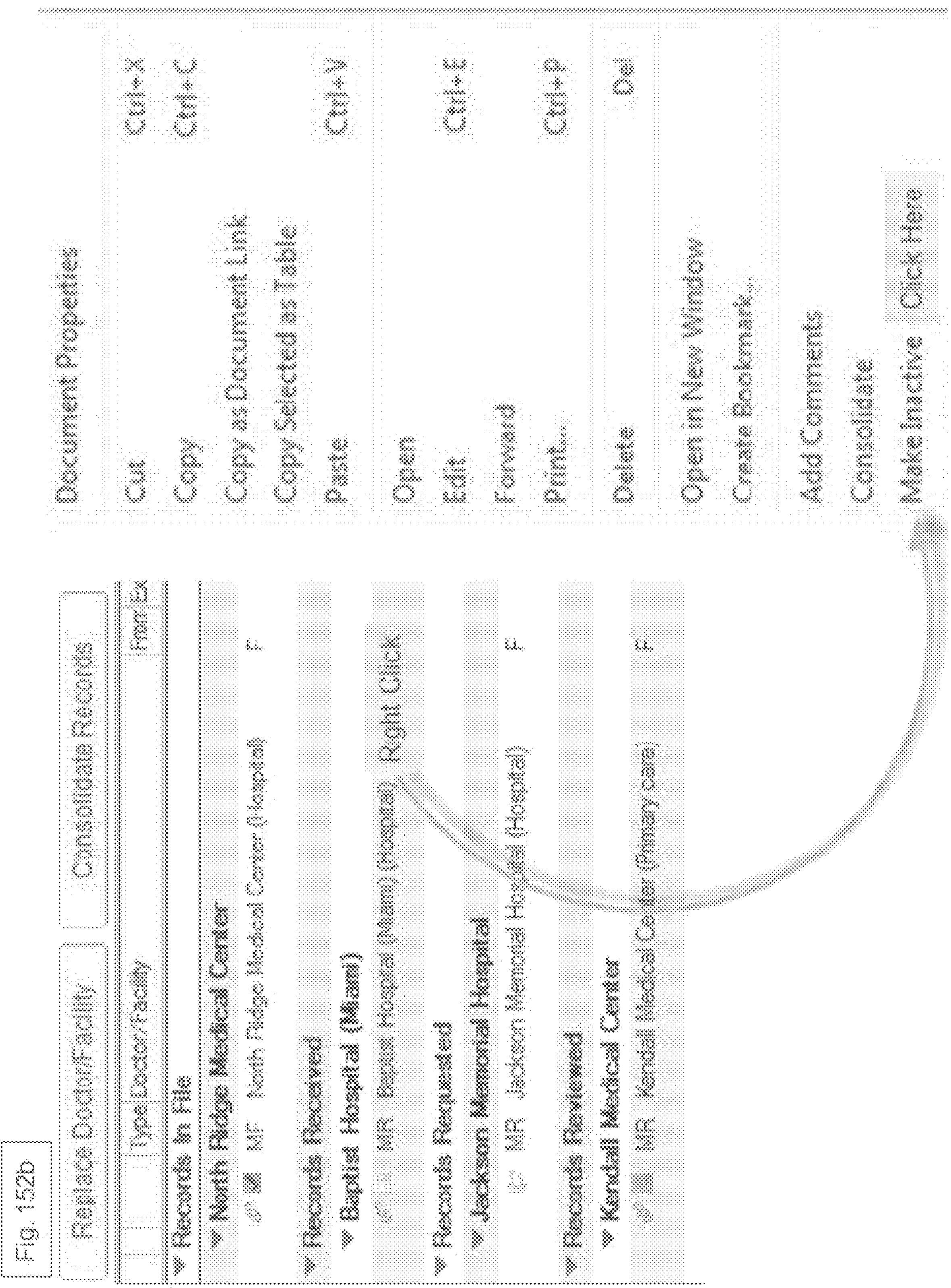
Figure 153:
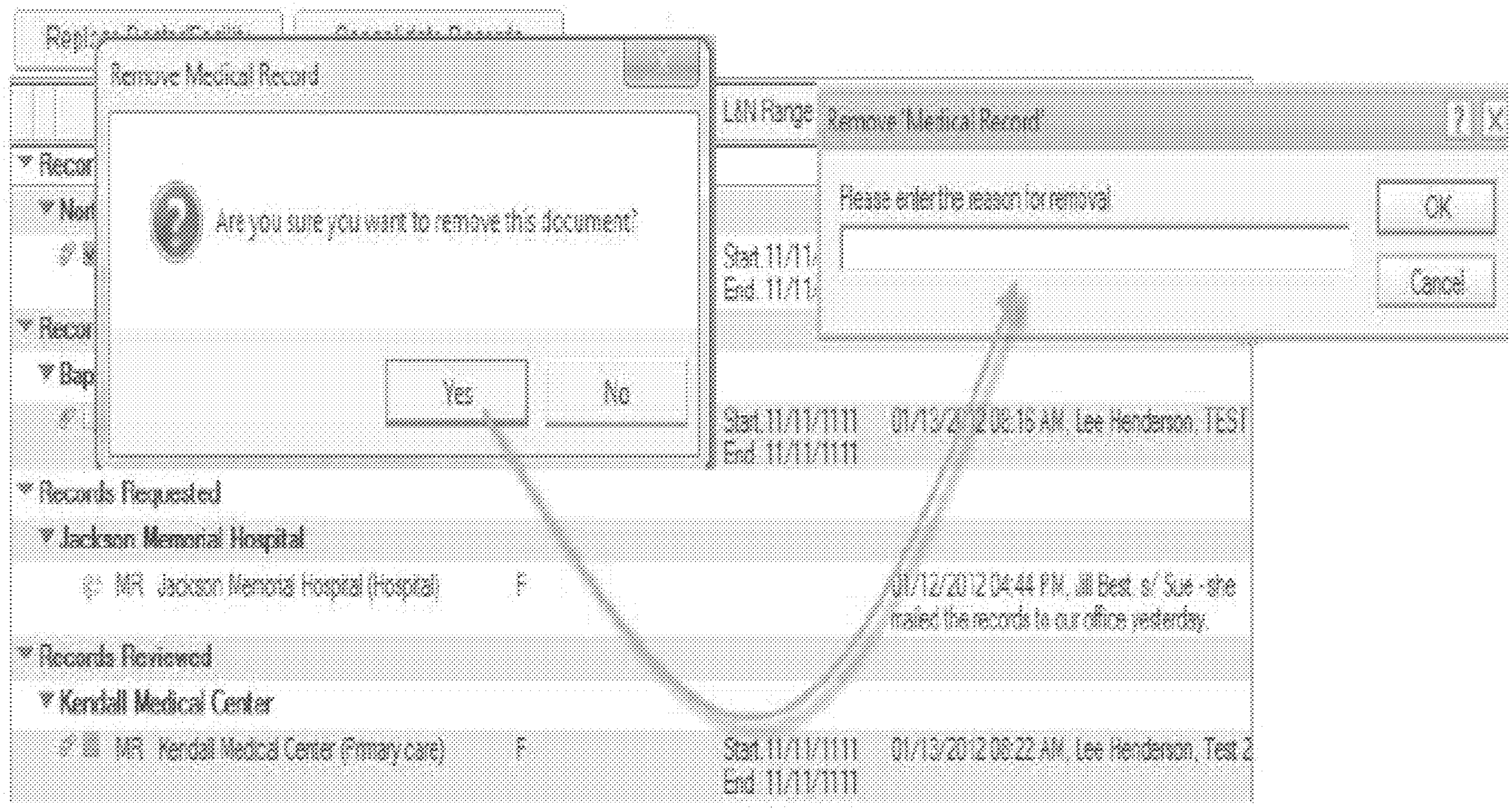
FIG. 153 is a screen shot of a CD Landing Page.
Figure 154:
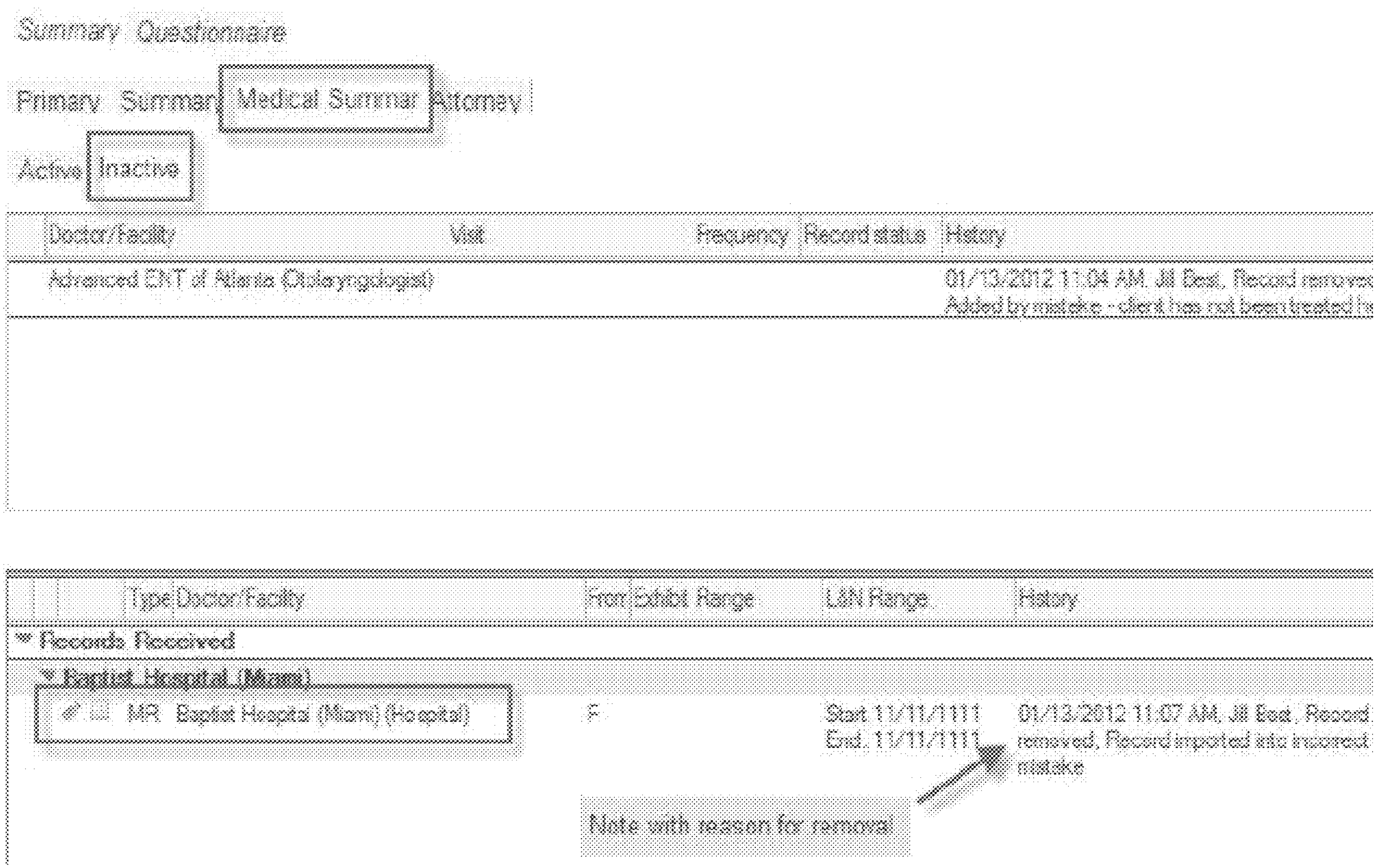
FIG. 154 is a screen shot of a CD Landing Page.
Figure 155:
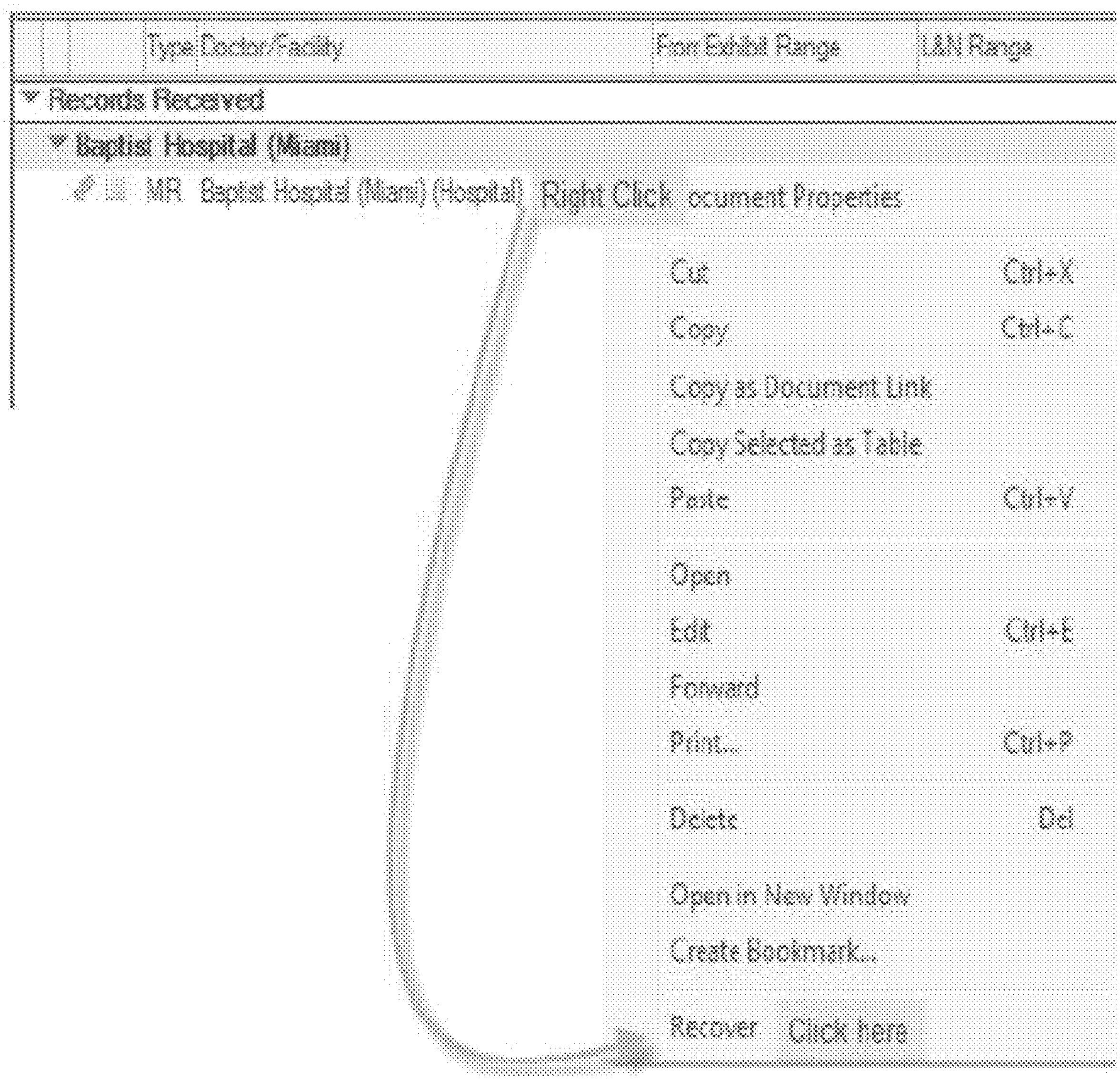
FIG. 155 is a screen shot of a CD Landing Page.
Figure 156B:
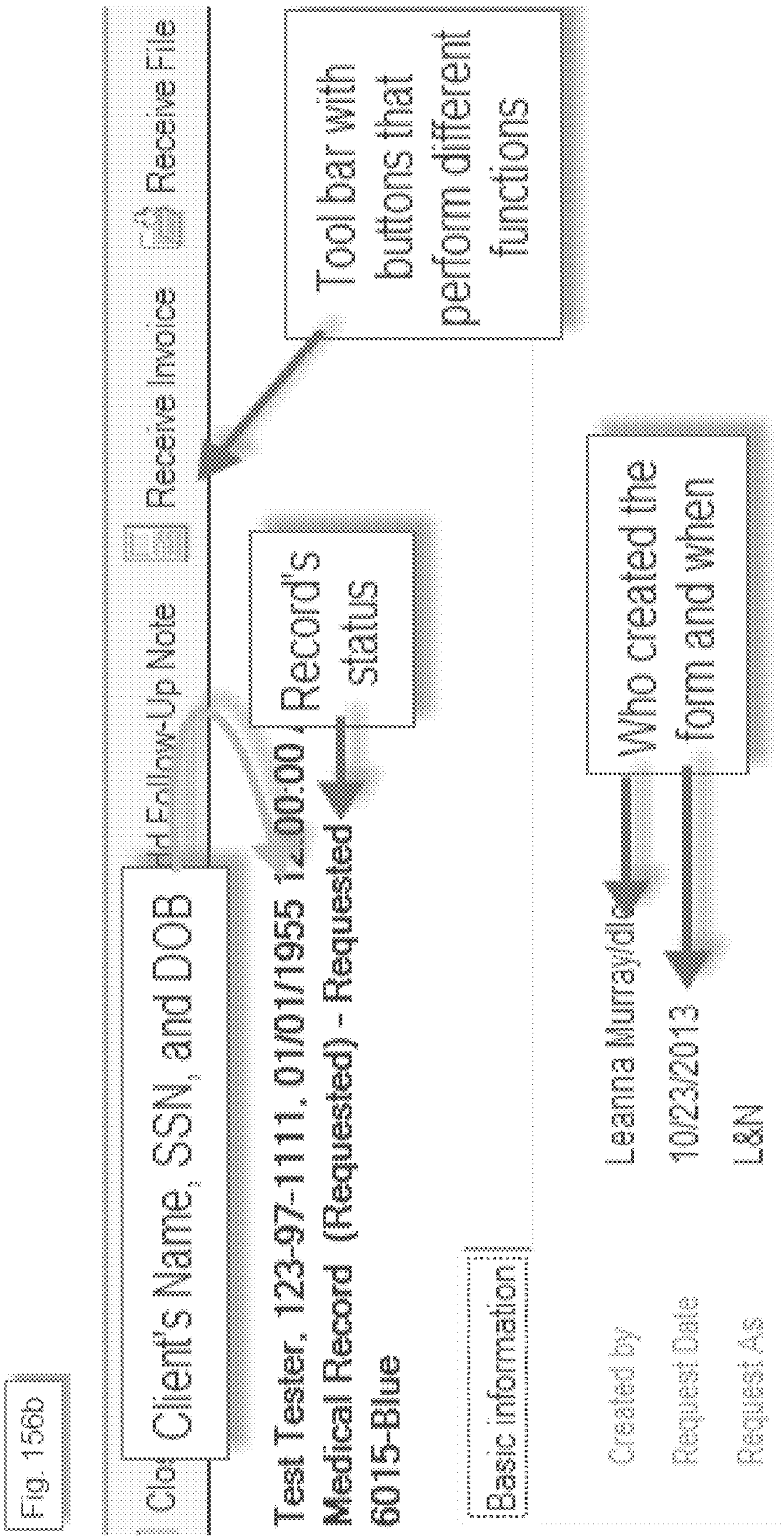
Figure 156C:
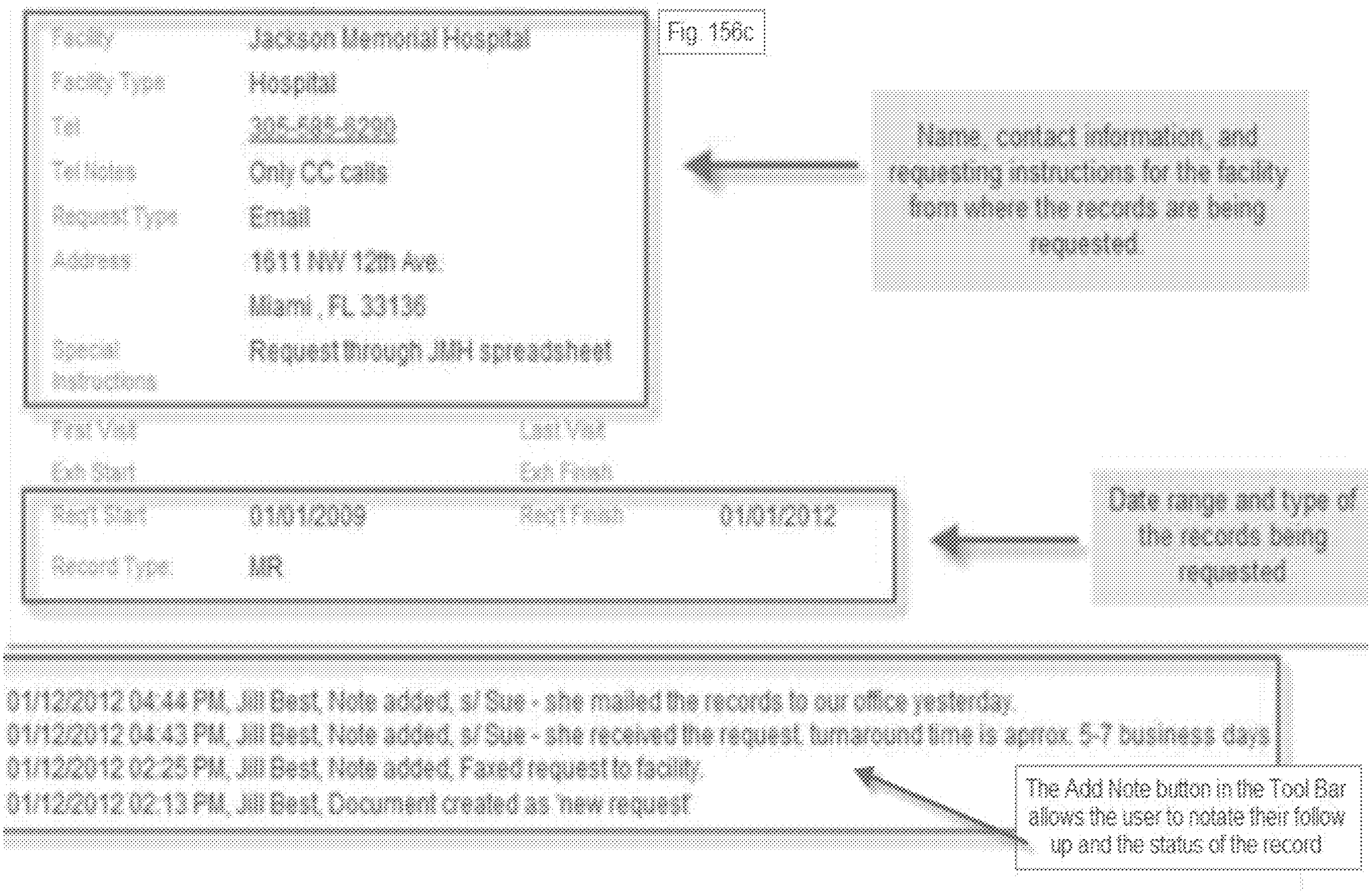
Figure 157A:
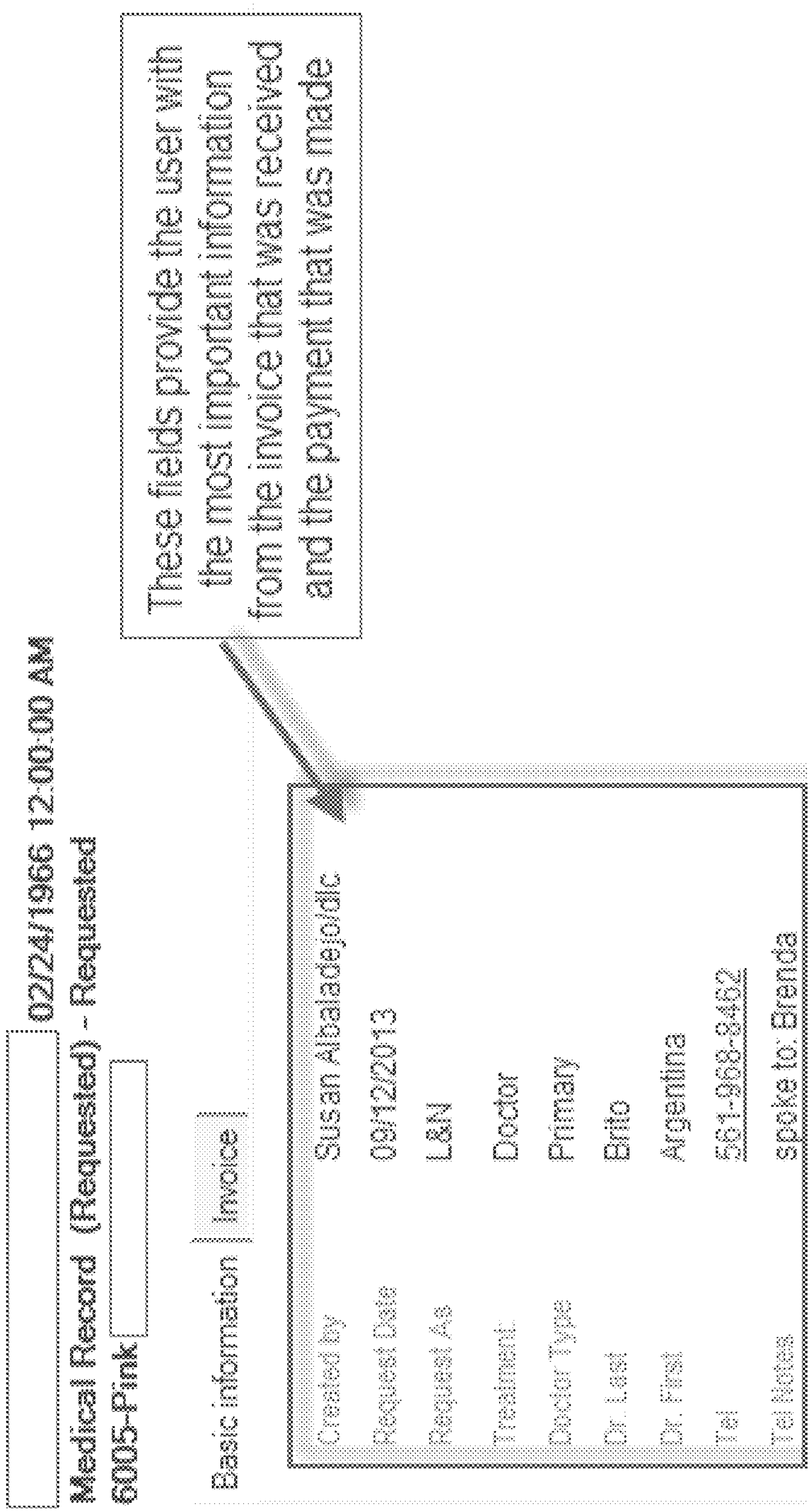
Figure 158:
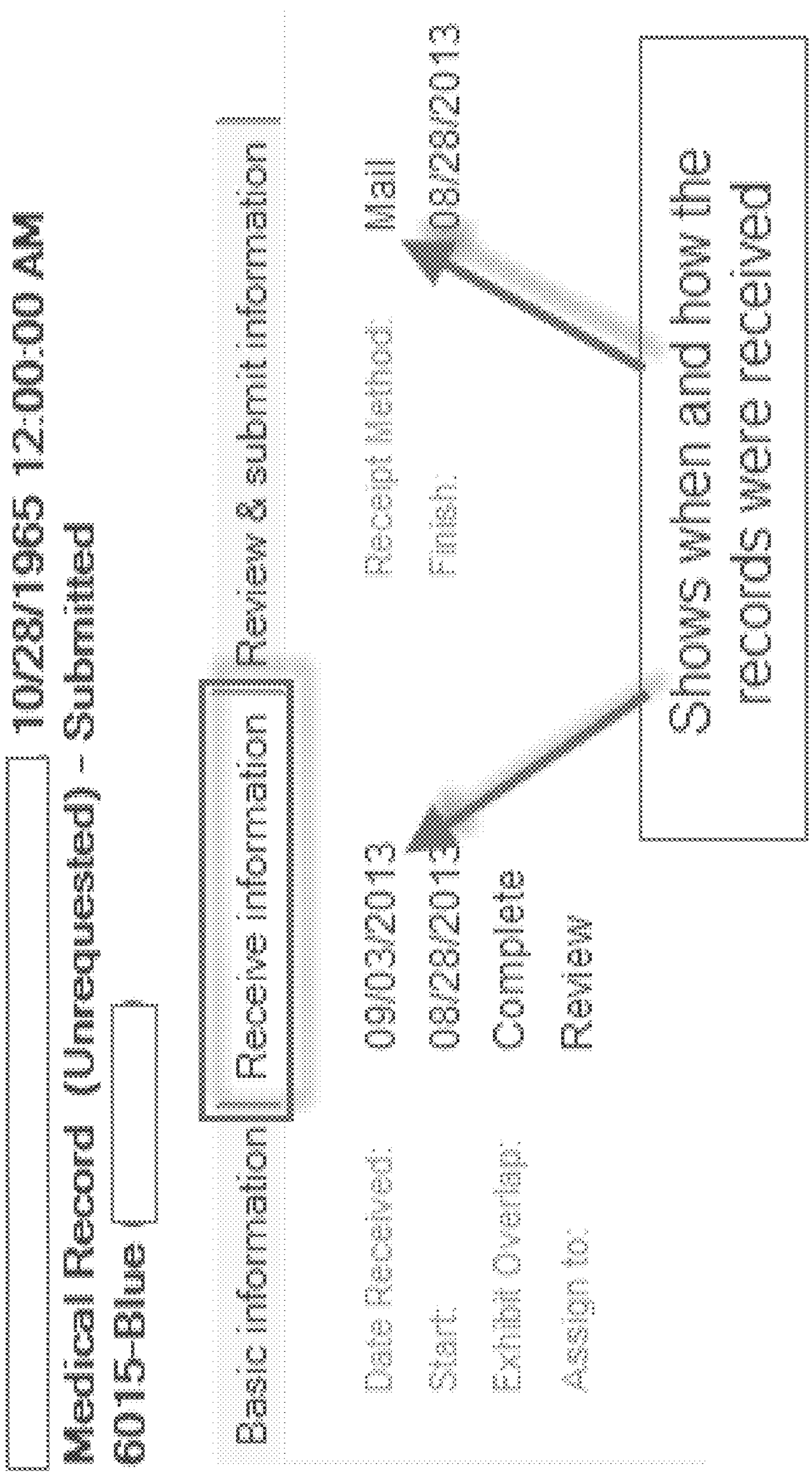
FIG. 158 is a screen shot of a CD Landing Page.
Figure 159:
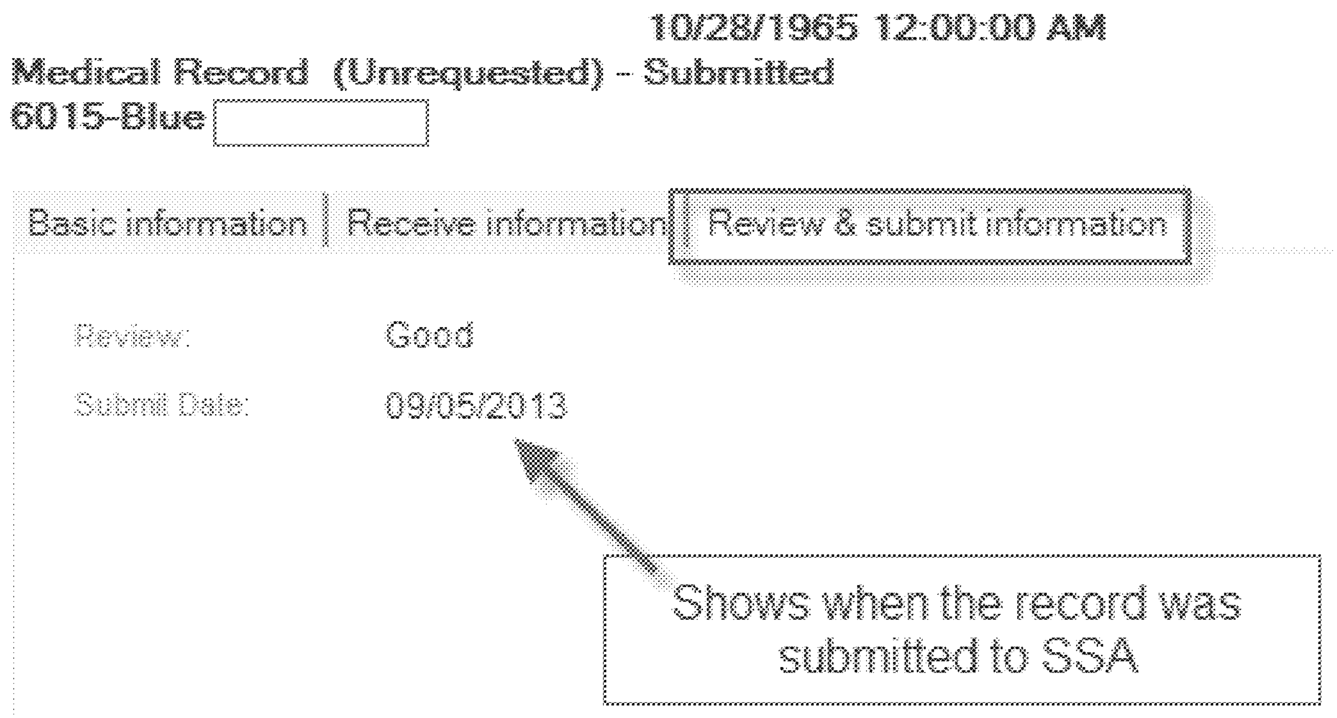
FIG. 159 is a screen shot of a CD Landing Page.
Figure 161:
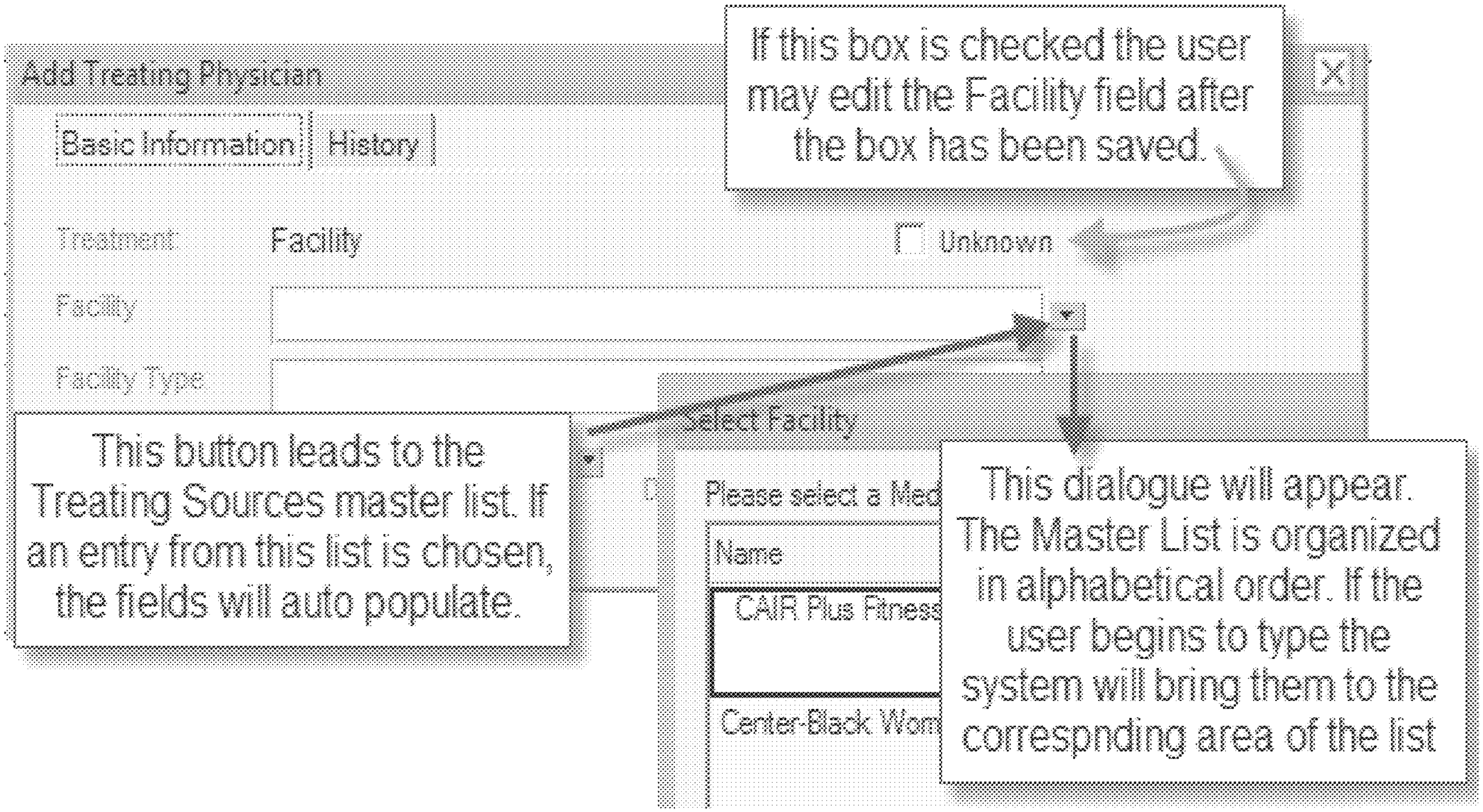
FIG. 161 is a screen shot of a CD Landing Page.
Figure 162:
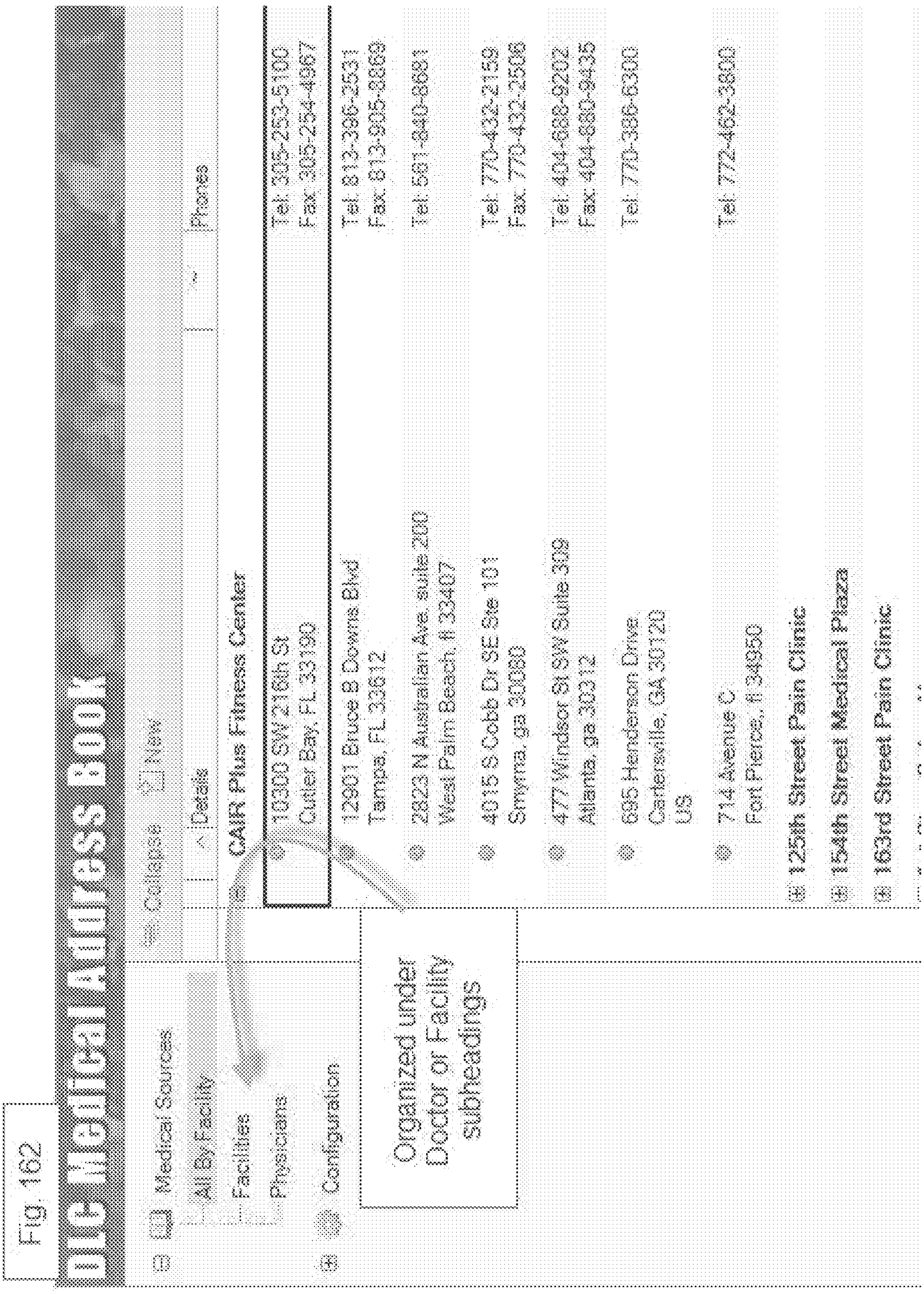
FIG. 162 is a screen shot of a CD Landing Page.
Figure 163:
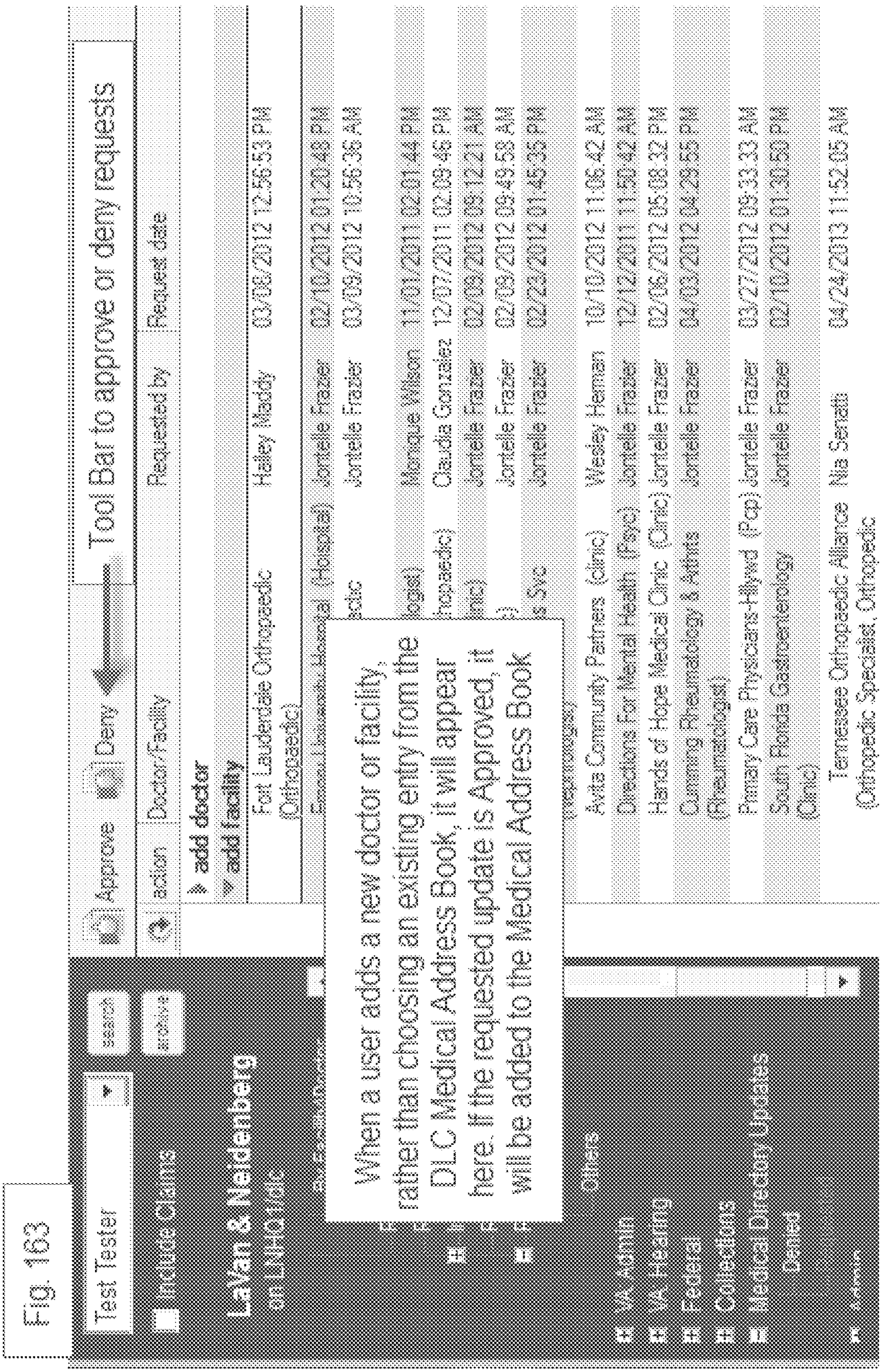
FIG. 163 is a screen shot of a CD Landing Page.
Figure 164A:
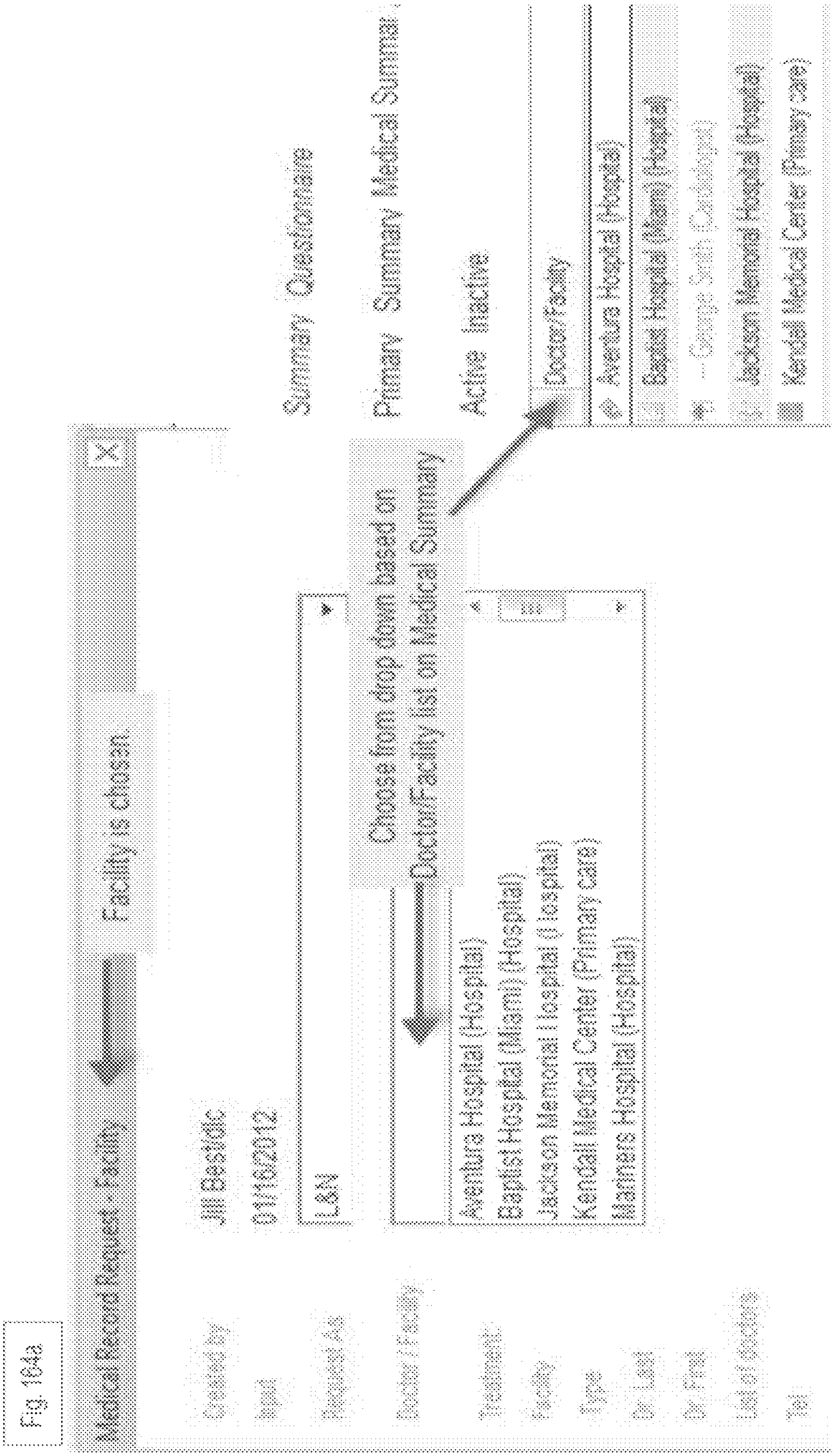
FIGS. 164*a*-164*b* are a screen shot of a CD Landing Page.
Figure 164B:
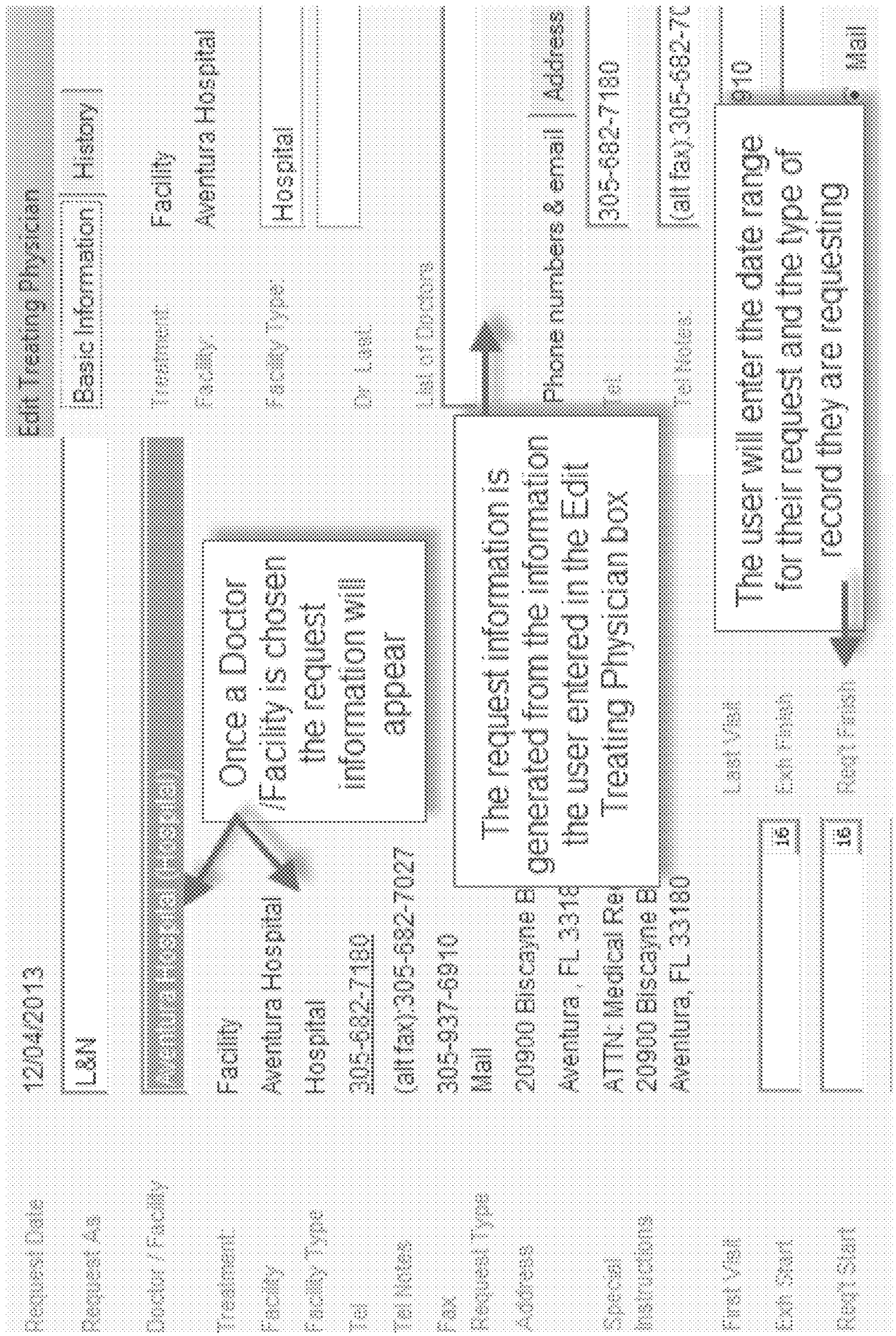
Figure 165:
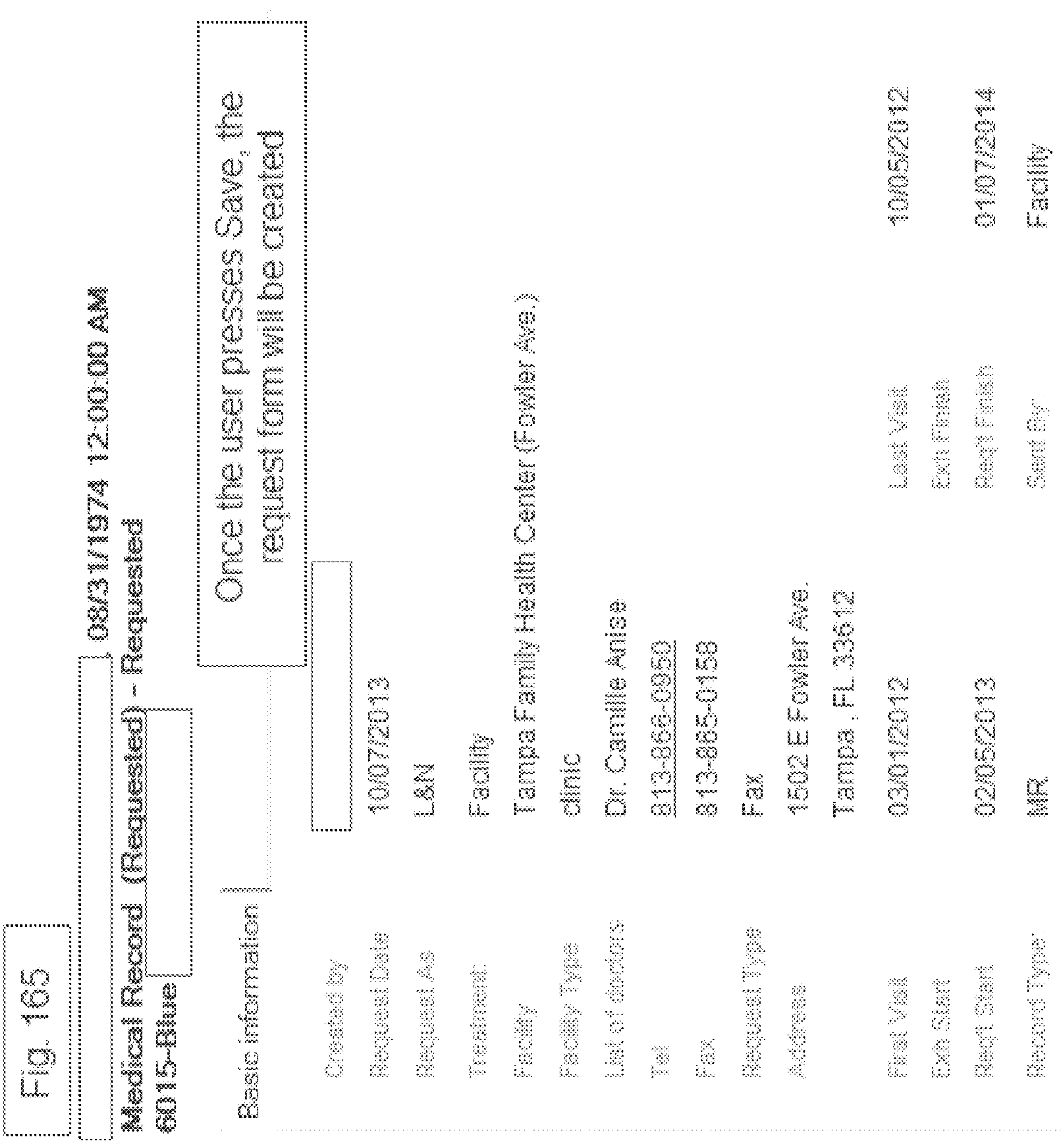
FIG. 165 is a screen shot of a CD Landing Page.
Figure 166A:
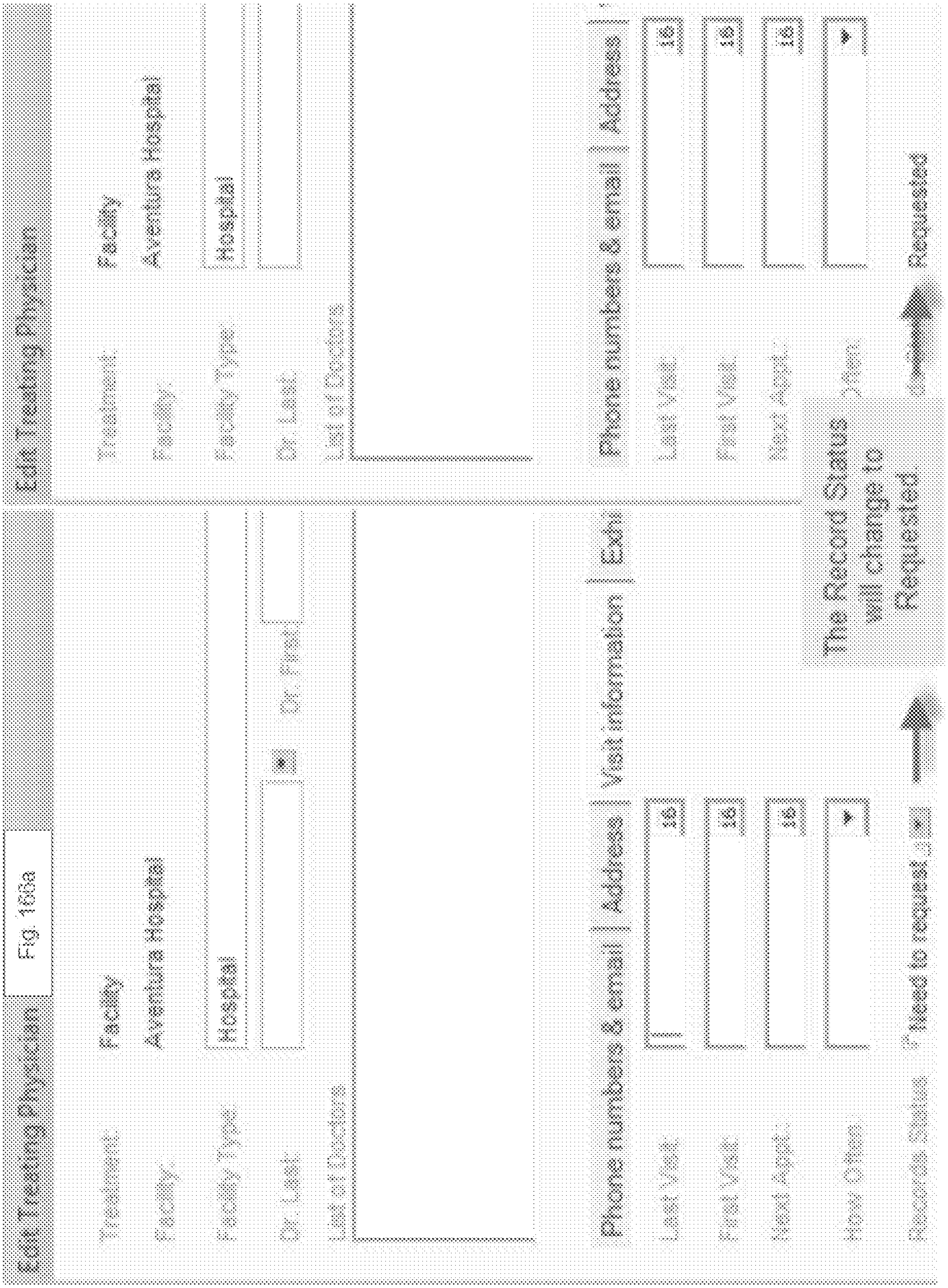
Figure 187B:
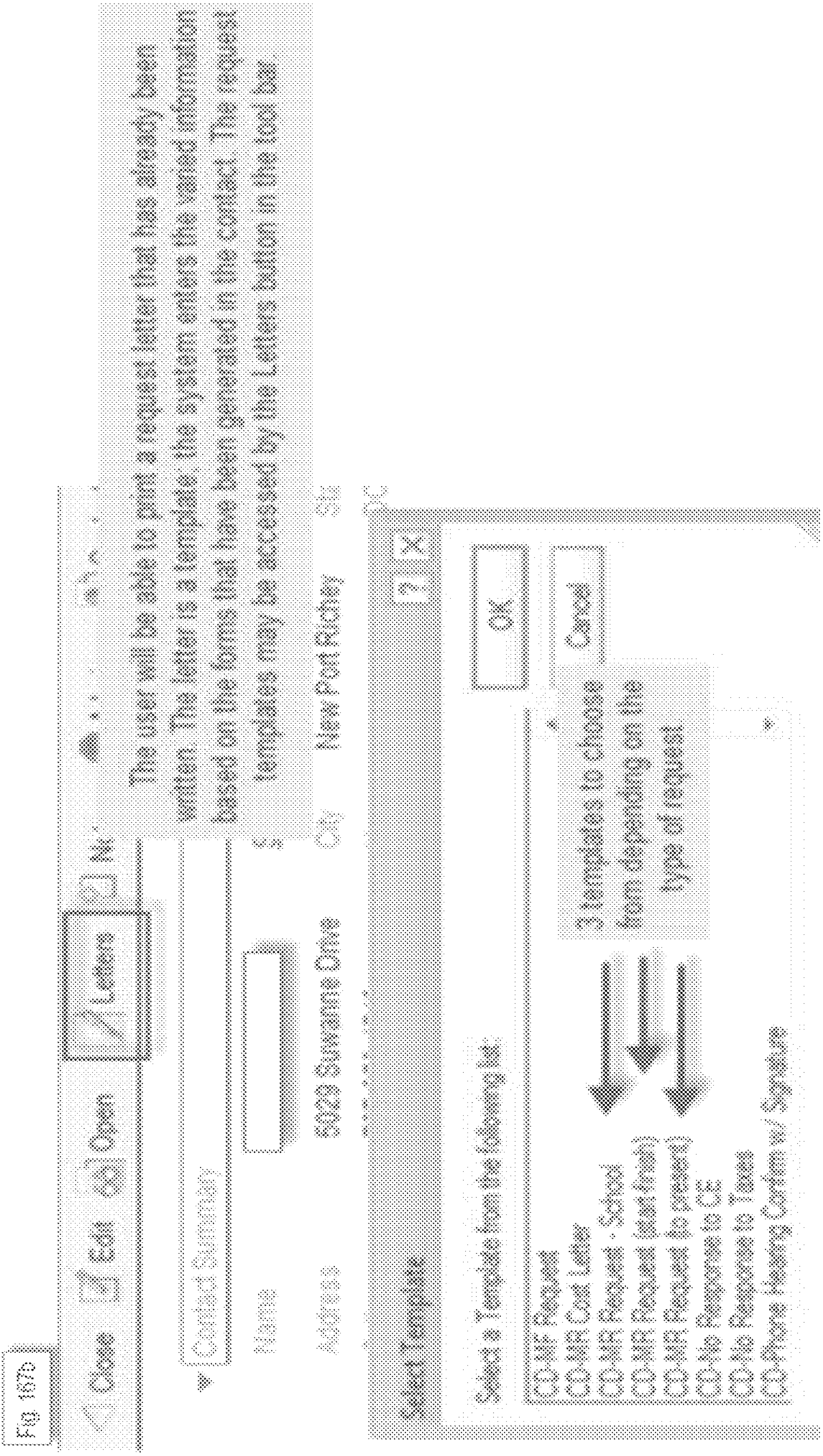
FIG. 187 is a screen shot of a CSR Landing Page.
Figure 168A:
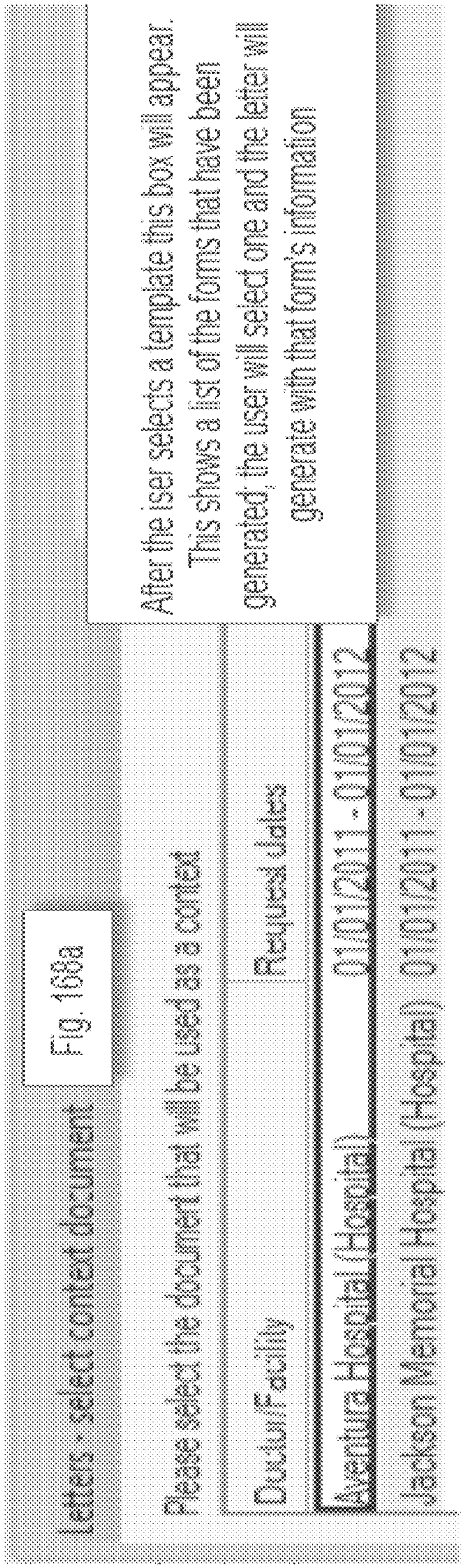
FIGS. 168*a*-168*b* are a screen shot of a CD Landing Page.
Figure 168B:
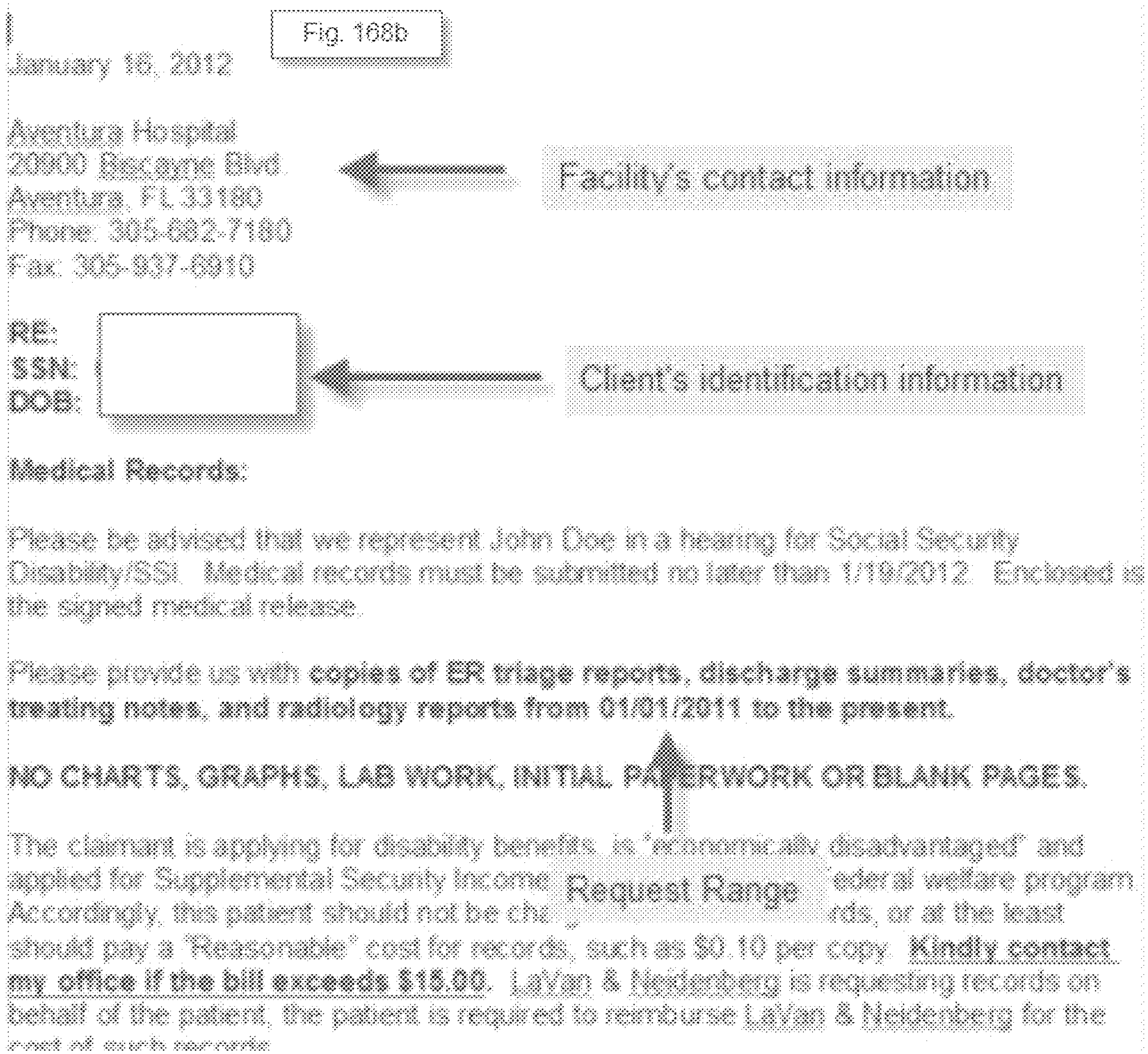
Figure 169:
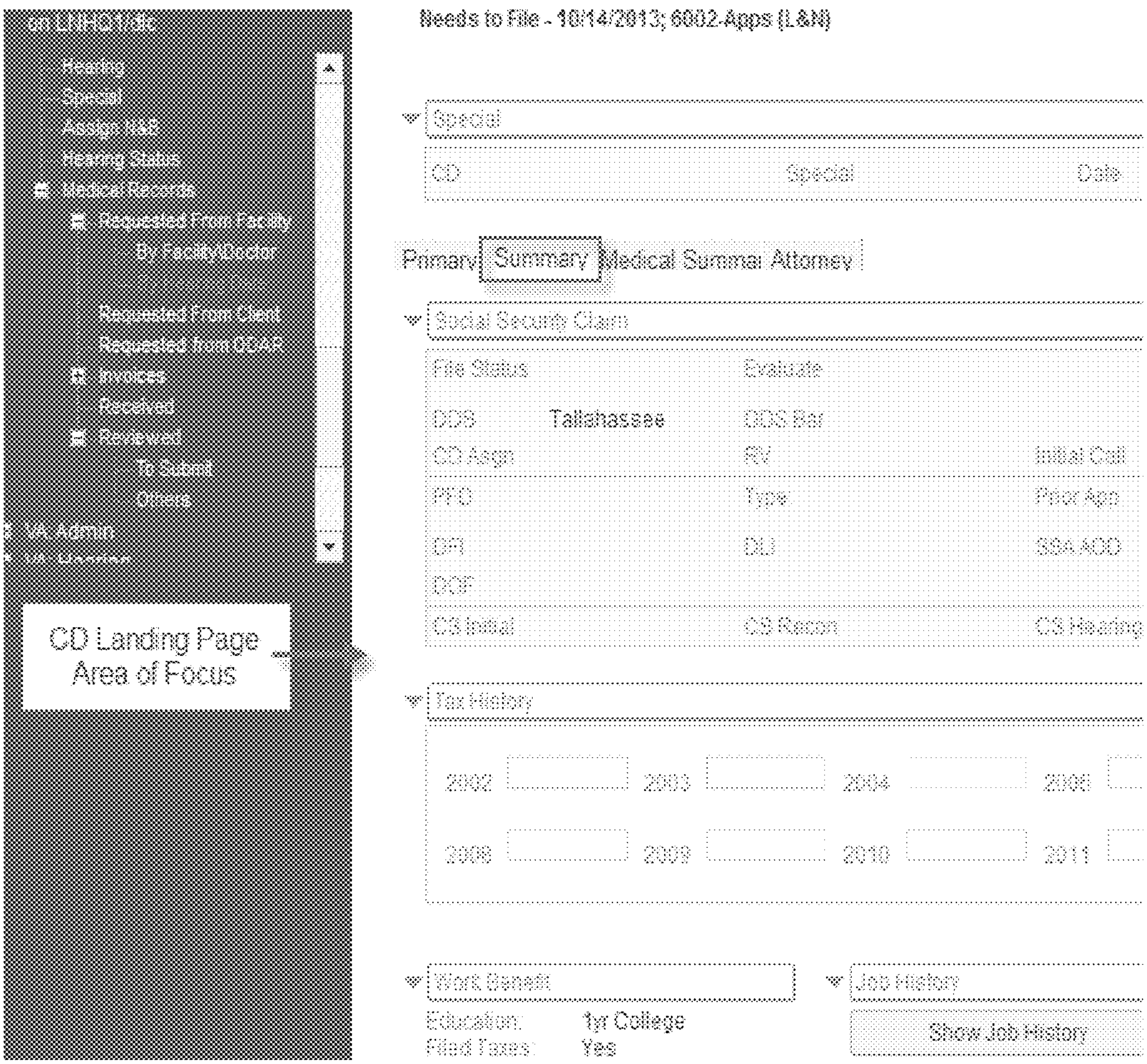
FIG. 169 is a screen shot of a CD Landing Page.
Figure 170A:
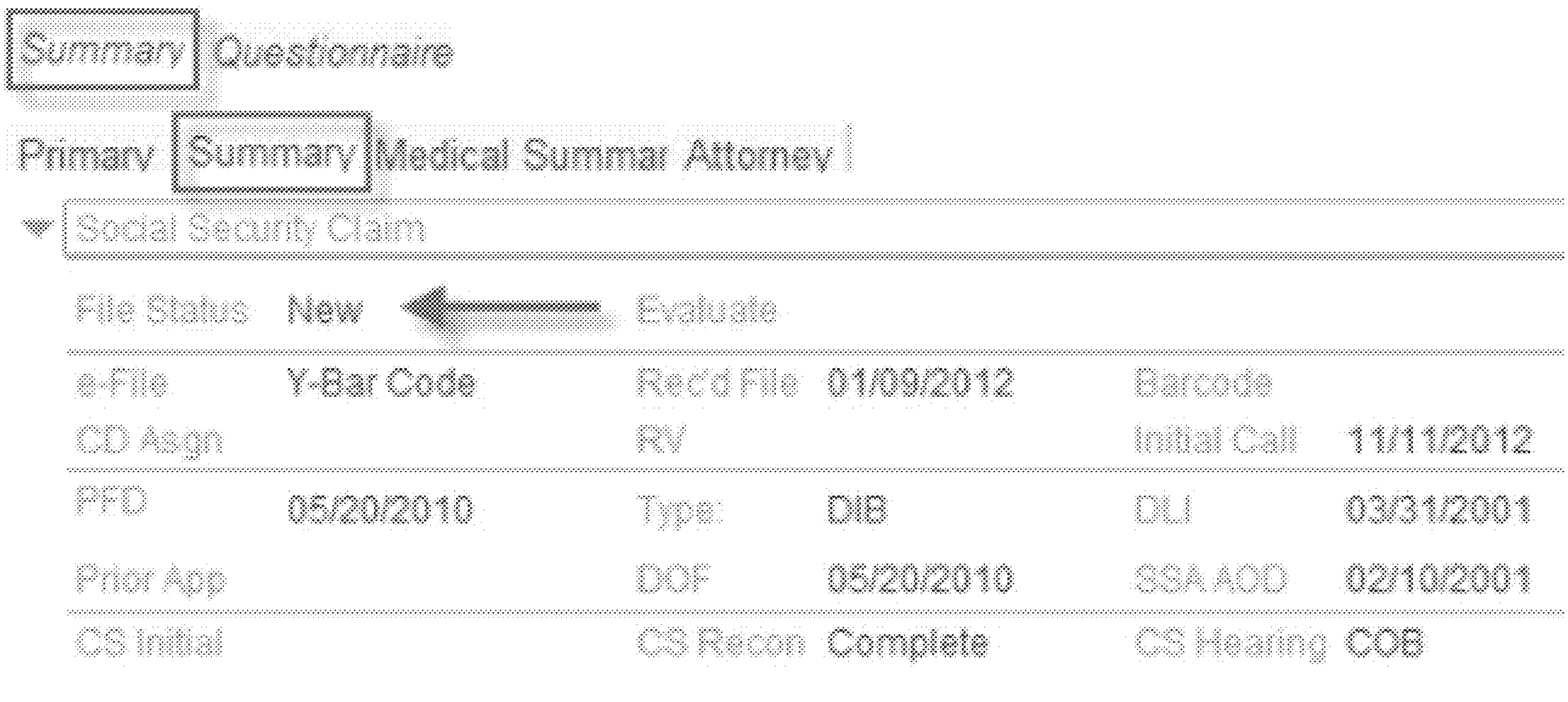
FIGS. 170*a*-170*c* are a screen shot of a CD Landing Page.
Figure 170B:
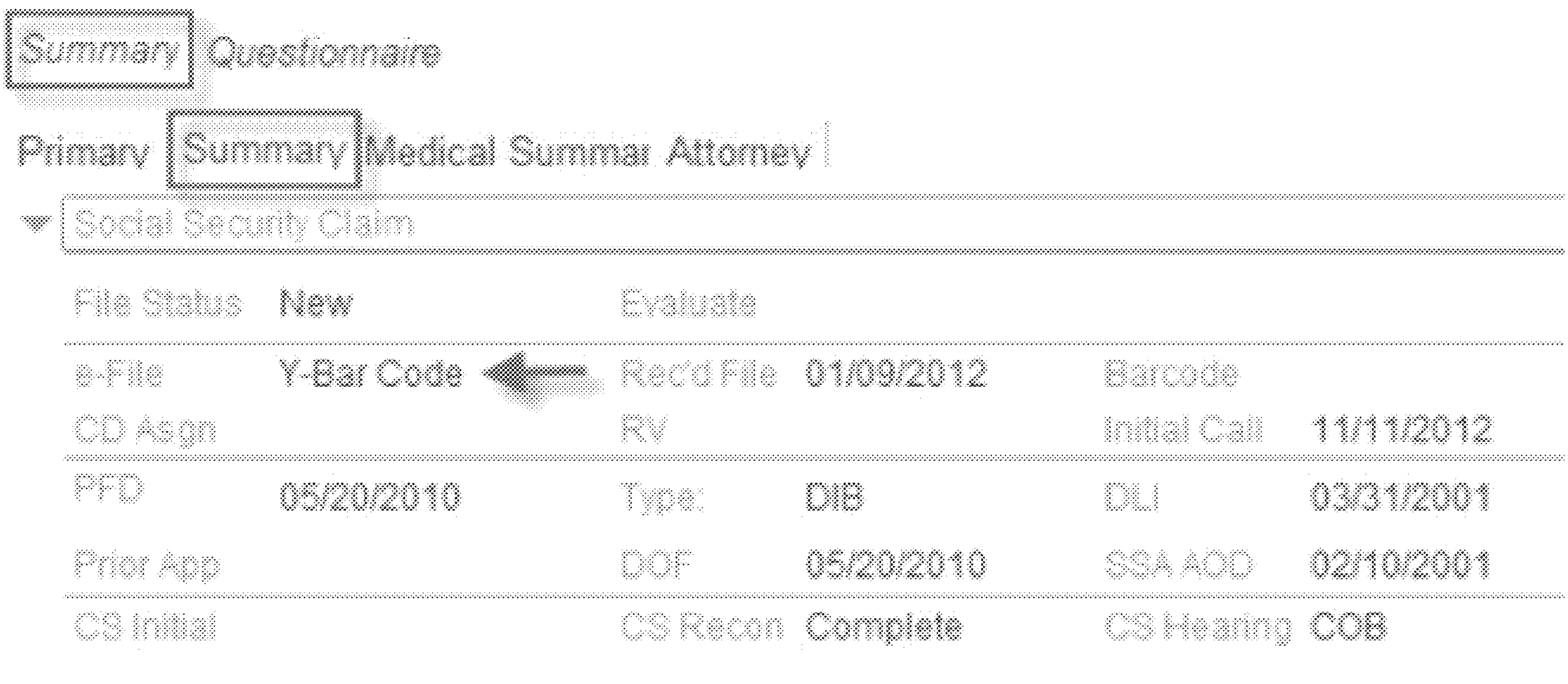
Figure 170C:
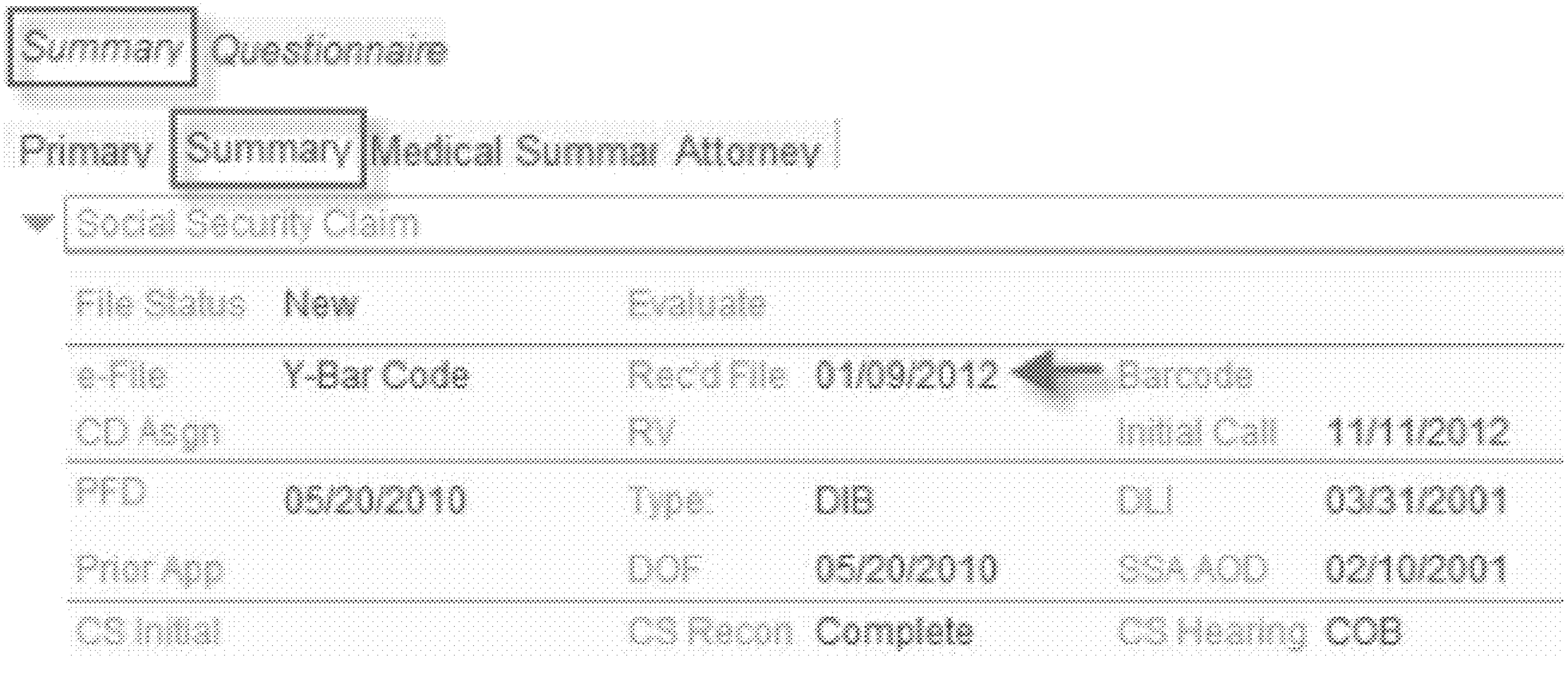
Figure 171A:
FIGS. 171*a*-171*c* are a screen shot of a CD Landing Page.
Figure 171B:
Figure 171C:
Figure 172B:
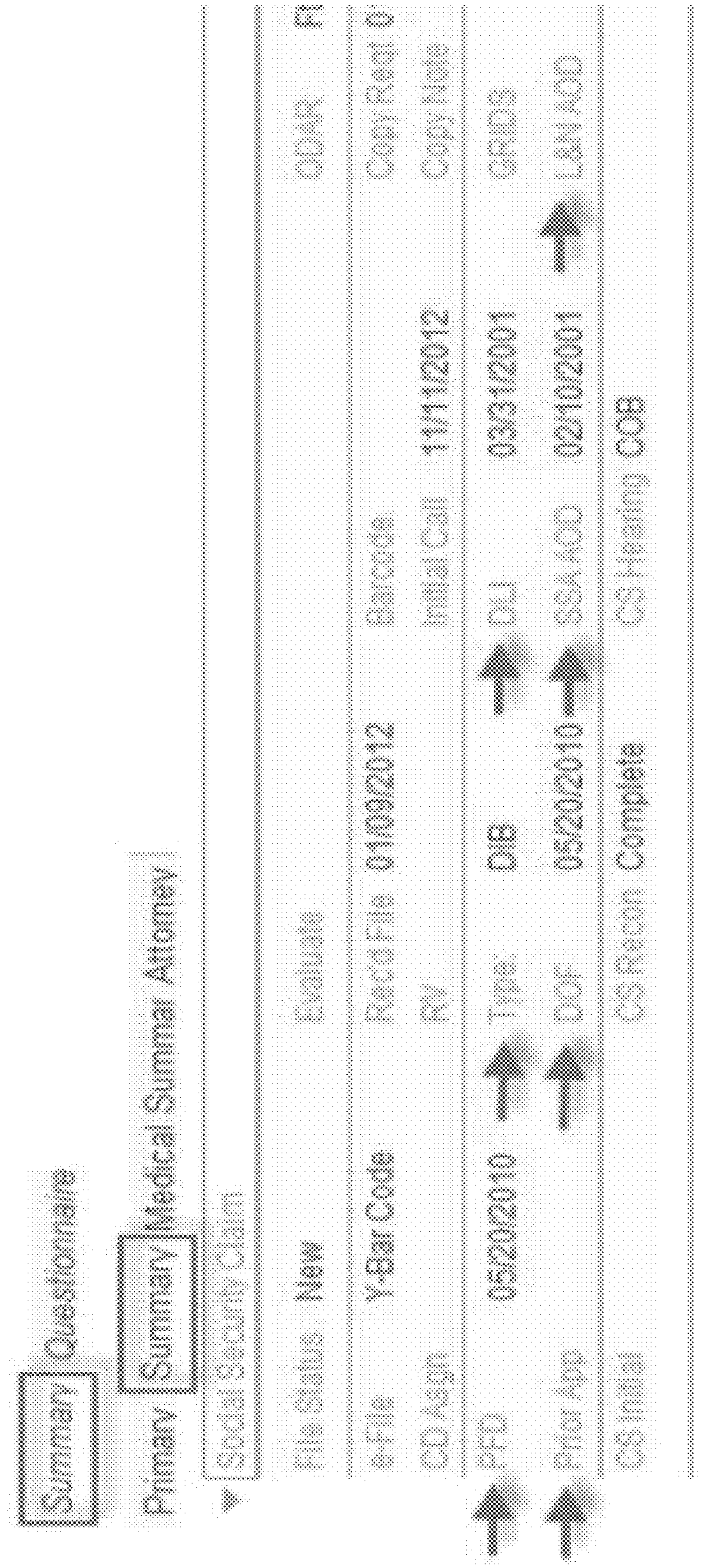
Figure 172C:
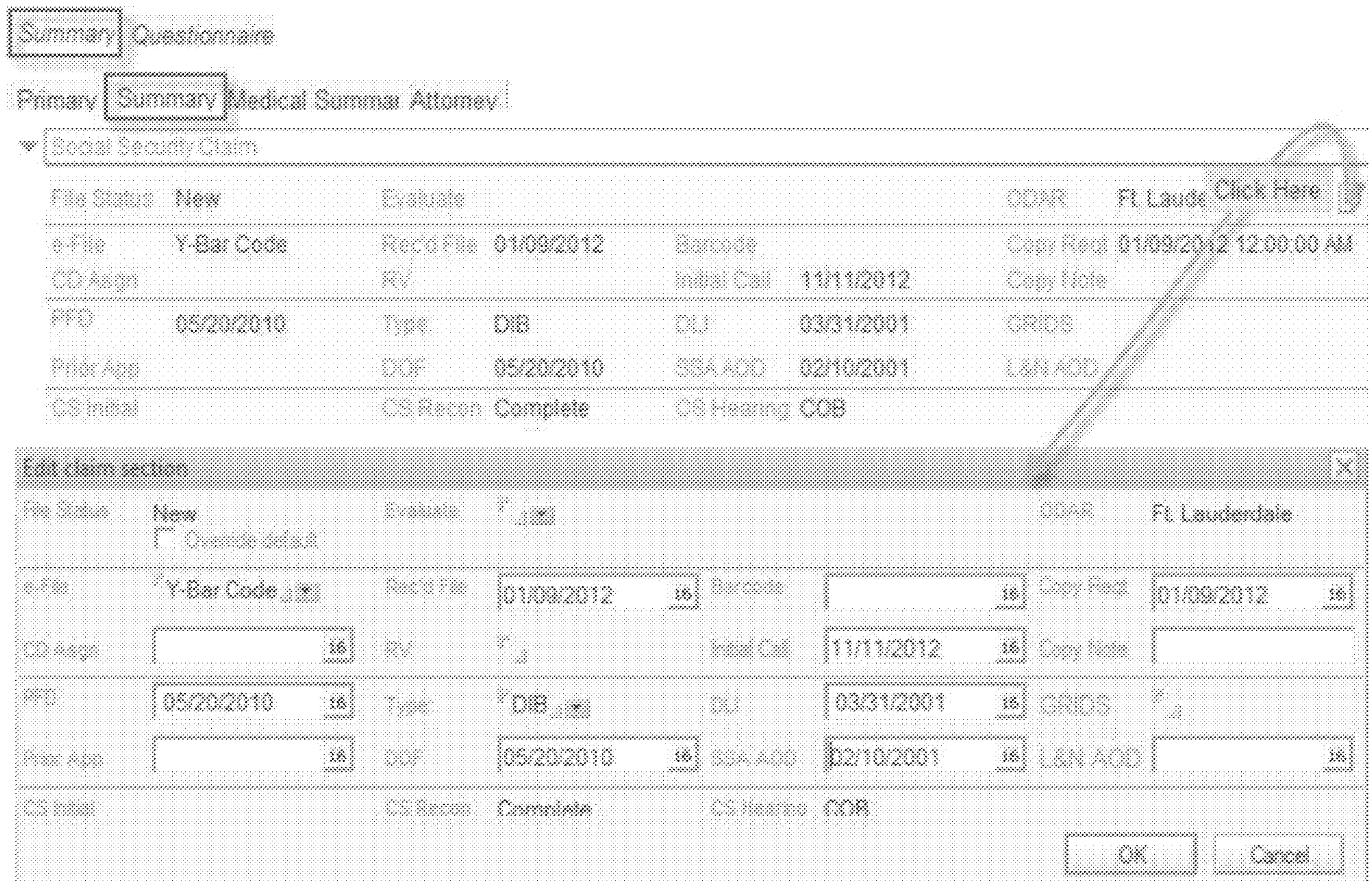
Figure 173A:
FIGS. 173*a*-173*b* are a screen shot of a CD Landing Page.
Figure 173B:
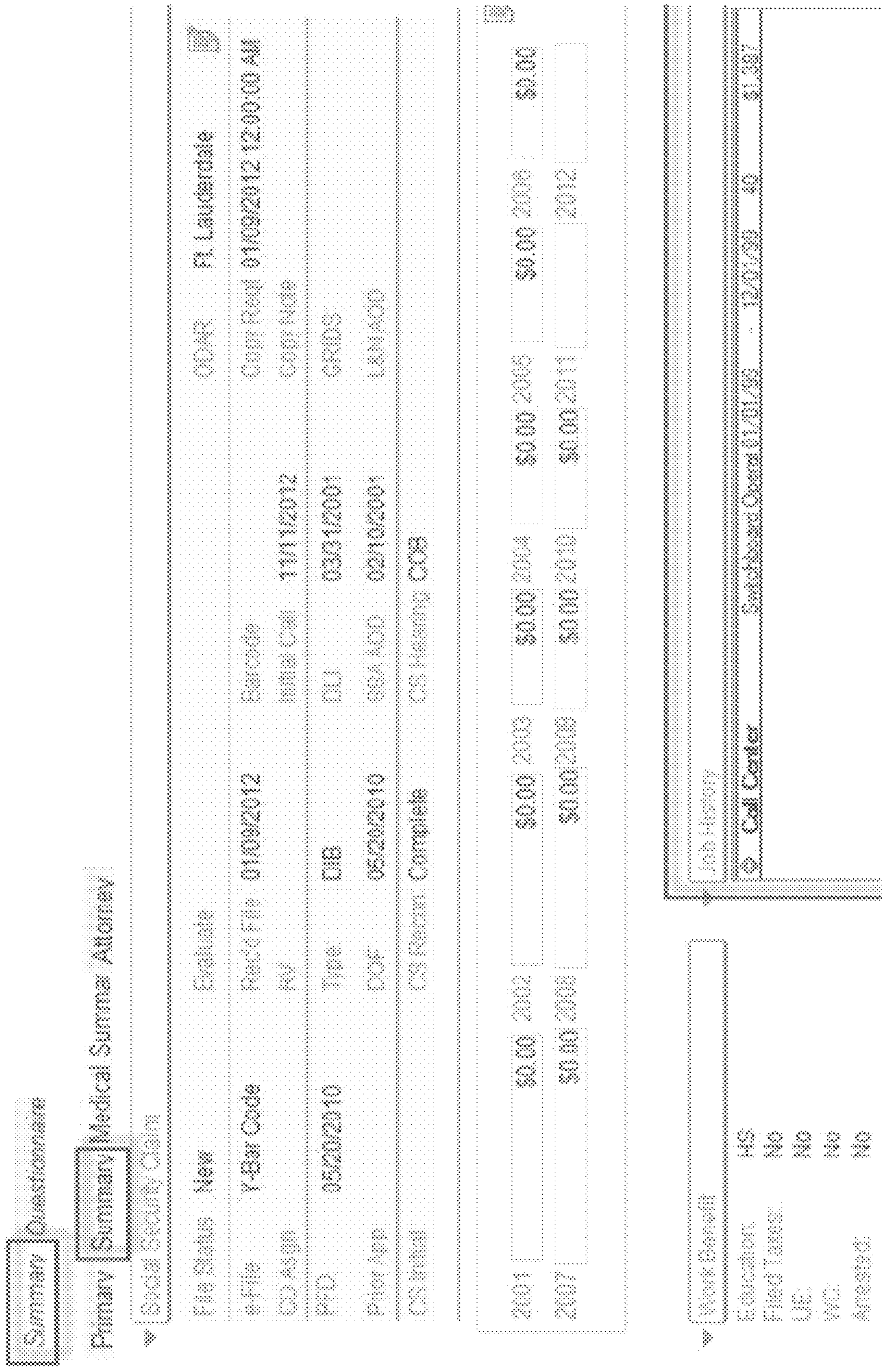
Figure 174A:
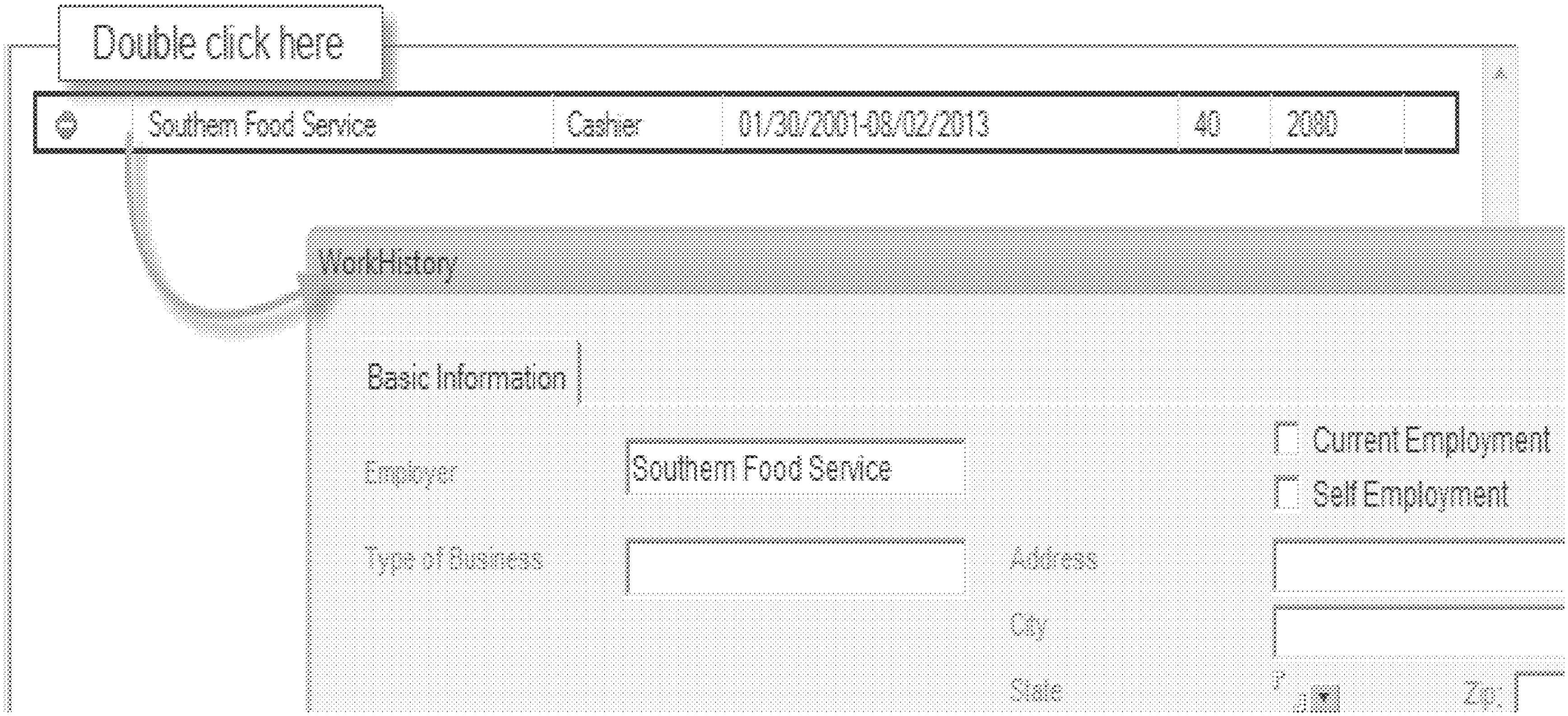
FIGS. 174*a*-174*b* are a screen shot of a CD Landing Page.
Figure 174B:
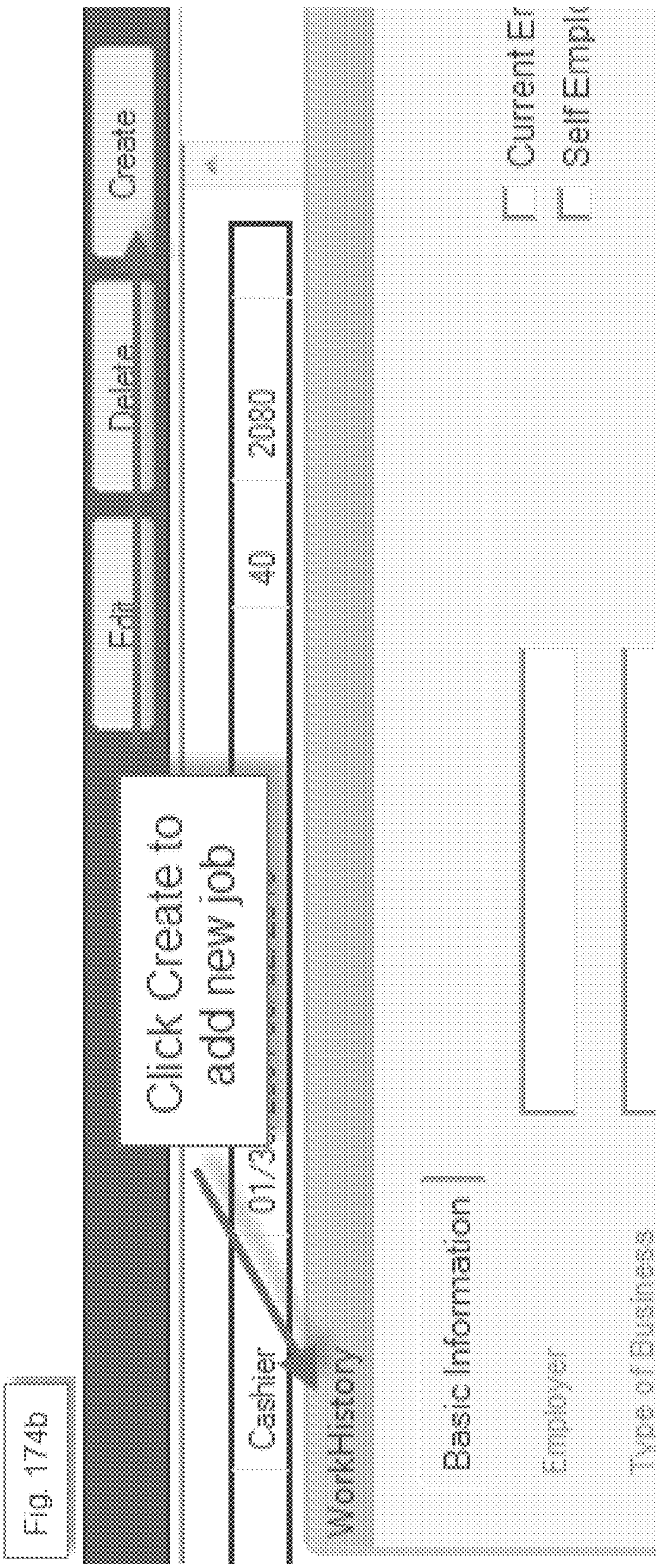
Figure 175:
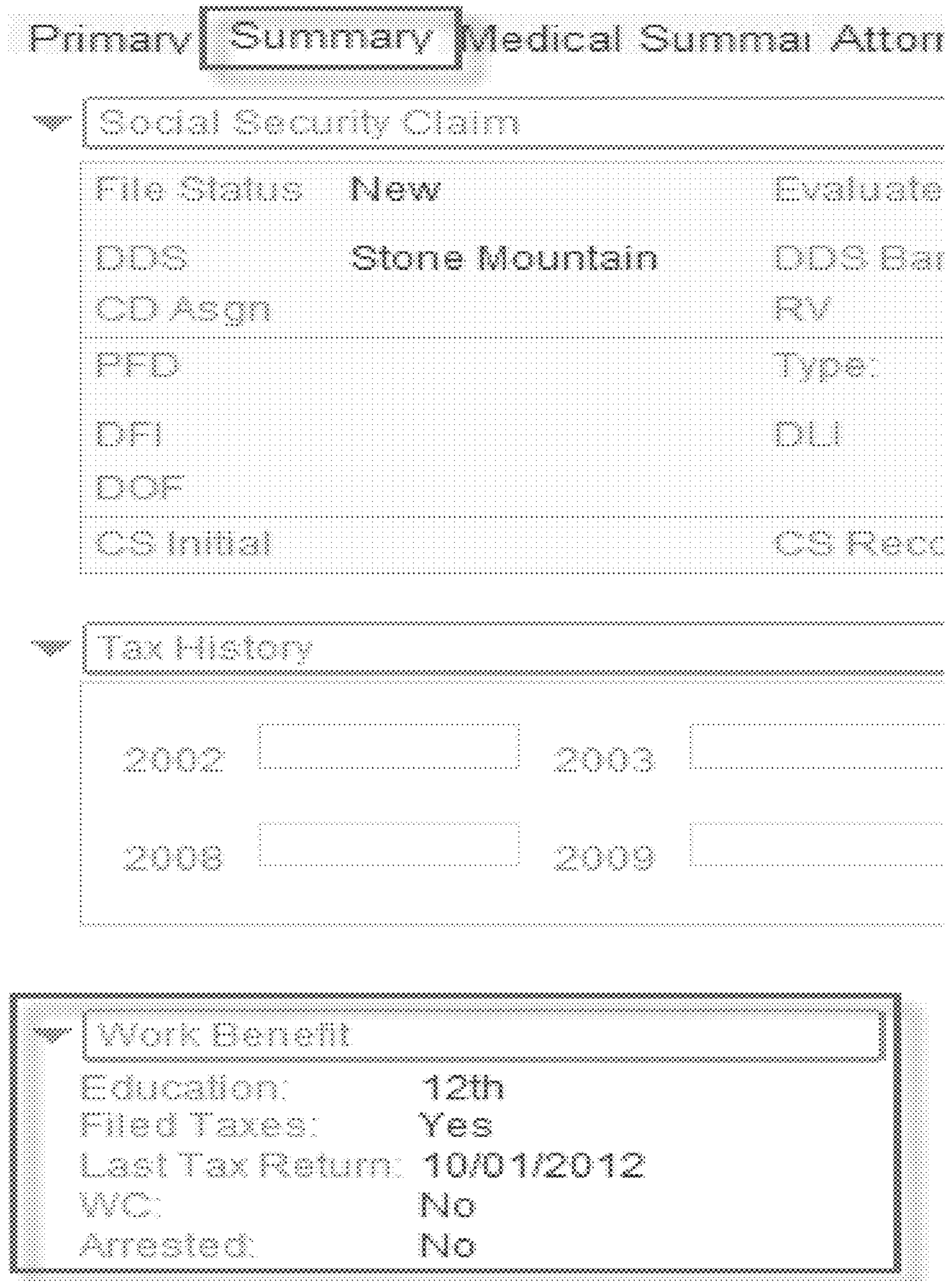
FIG. 175 is a screen shot of a CD Landing Page.
Figure 176A:
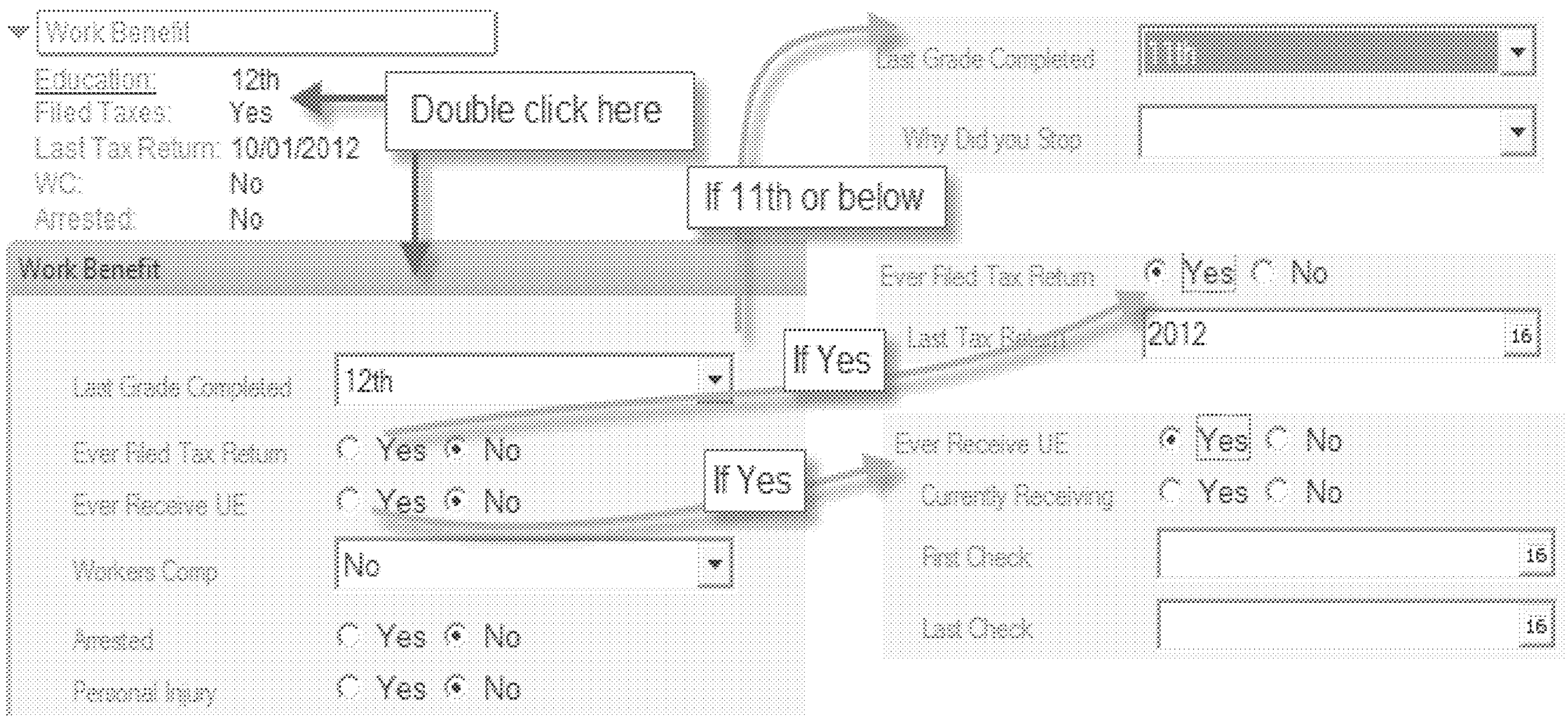
FIGS. 176*a*-176*b* are a screen shot of a CD Landing Page.
Figure 176B:
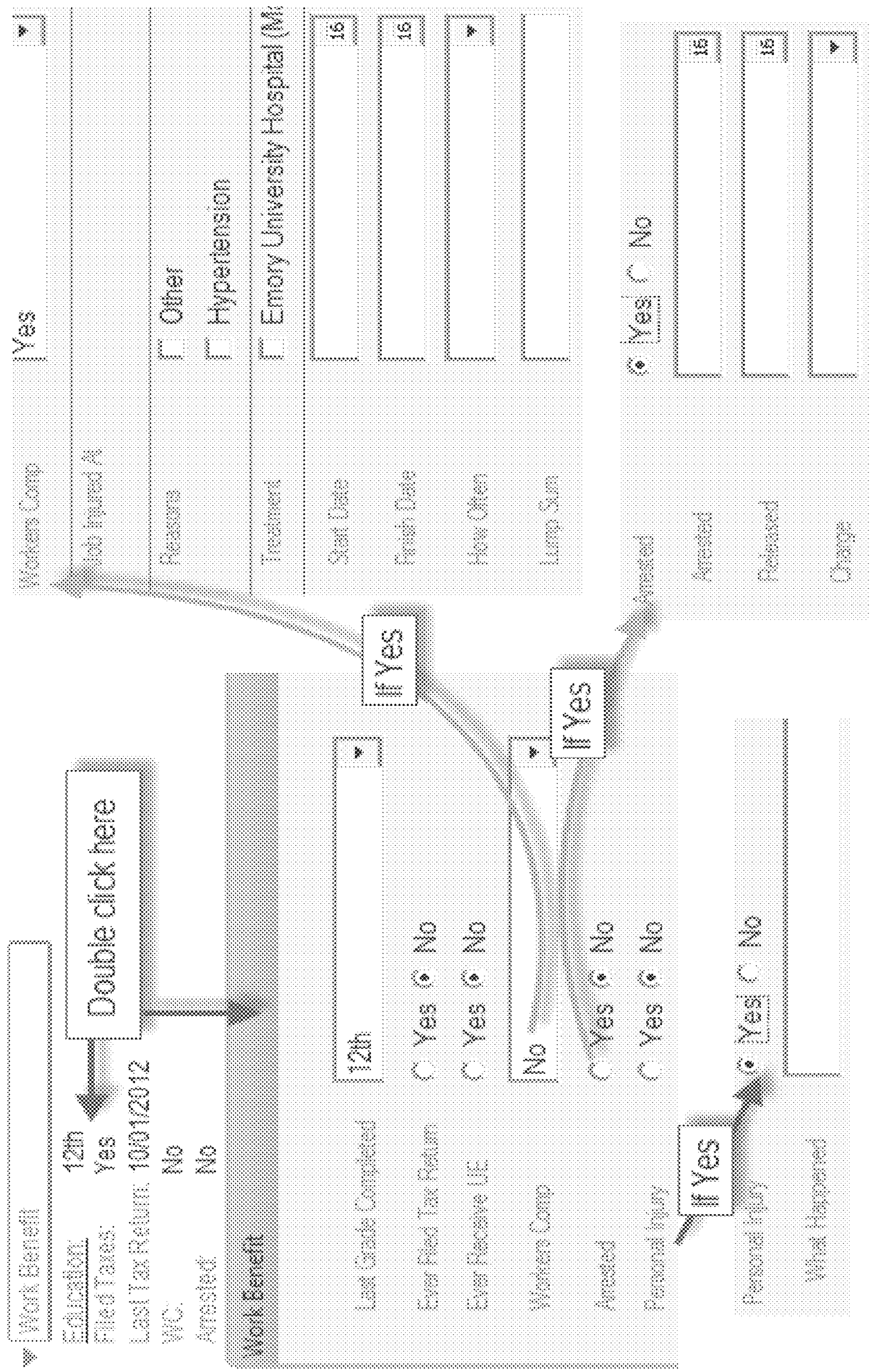
Figure 177A:
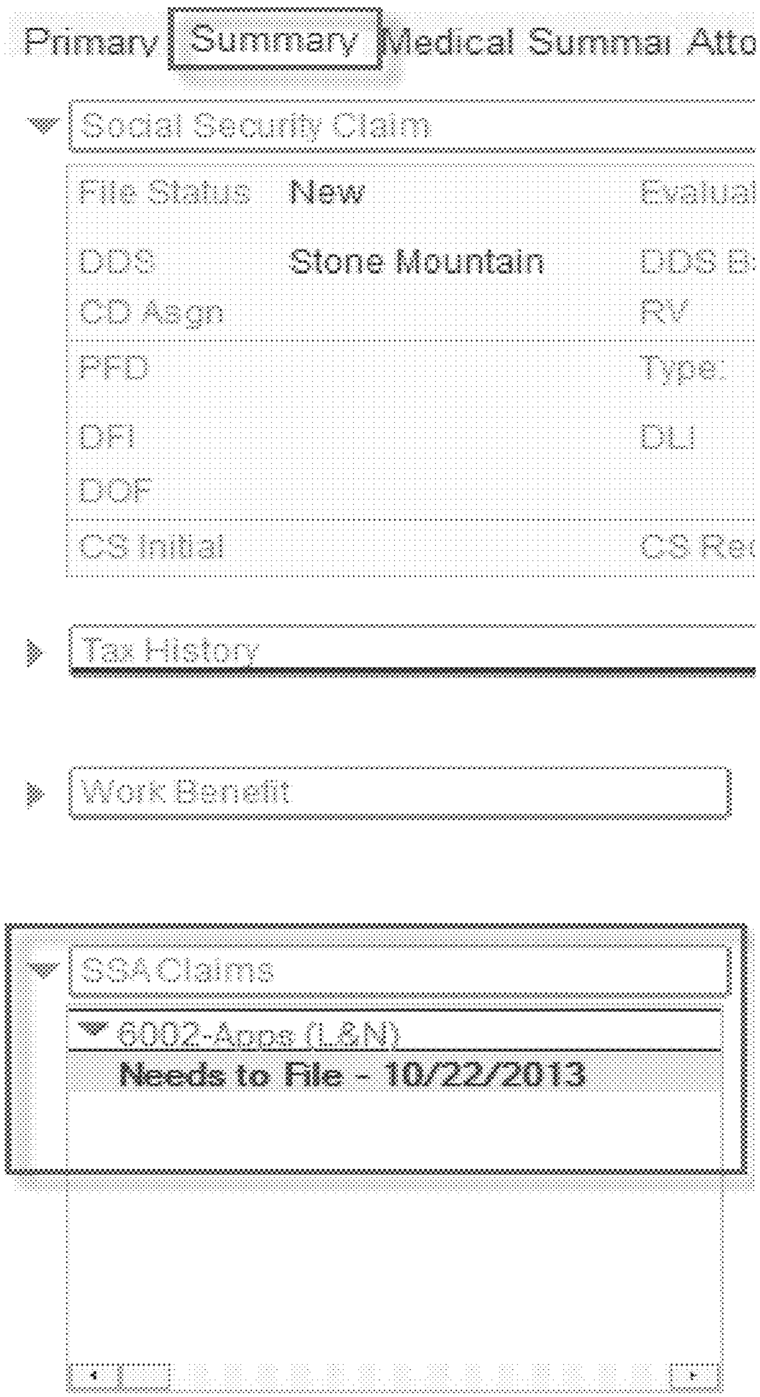
FIGS. 177*a*-177*b* are a screen shot of a CD Landing Page.
Figure 177B:
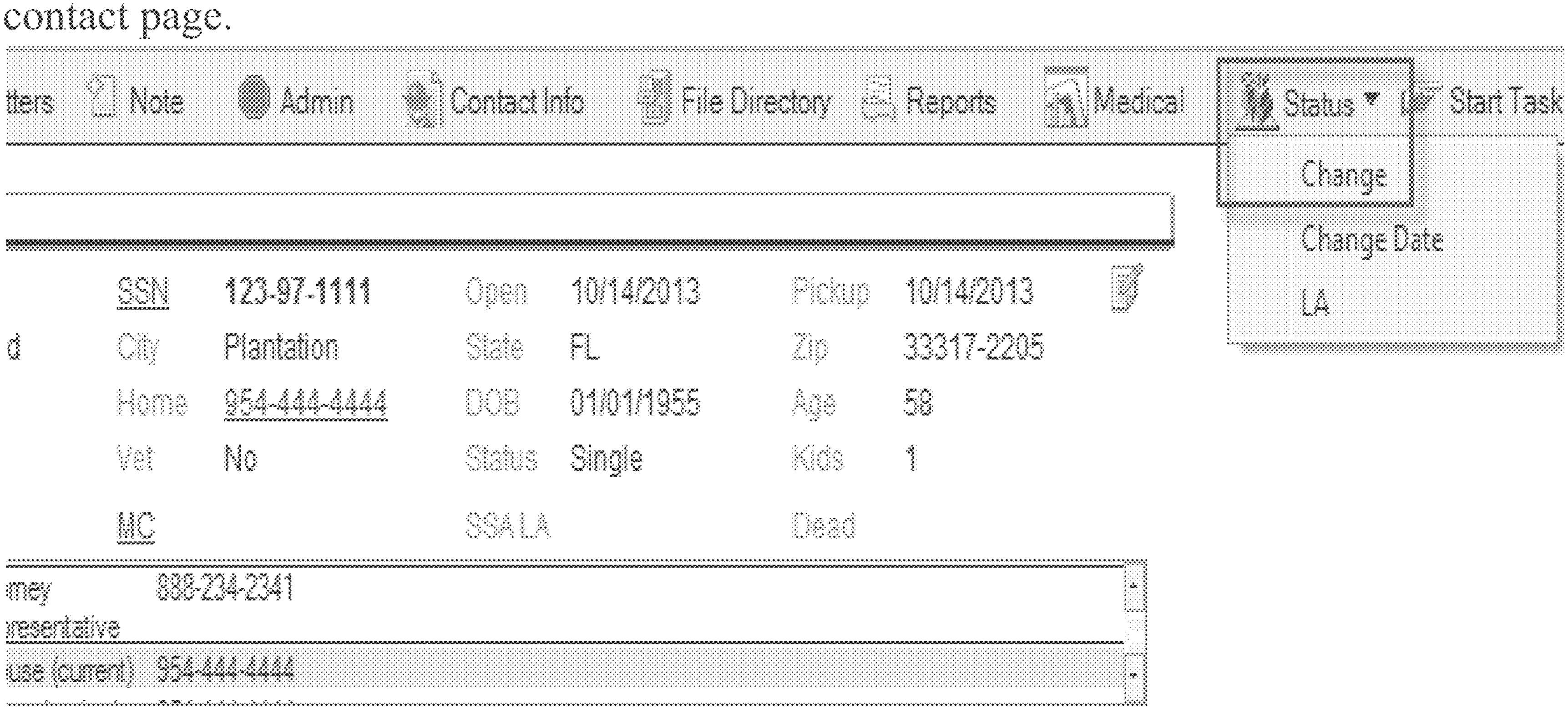
Figure 179:
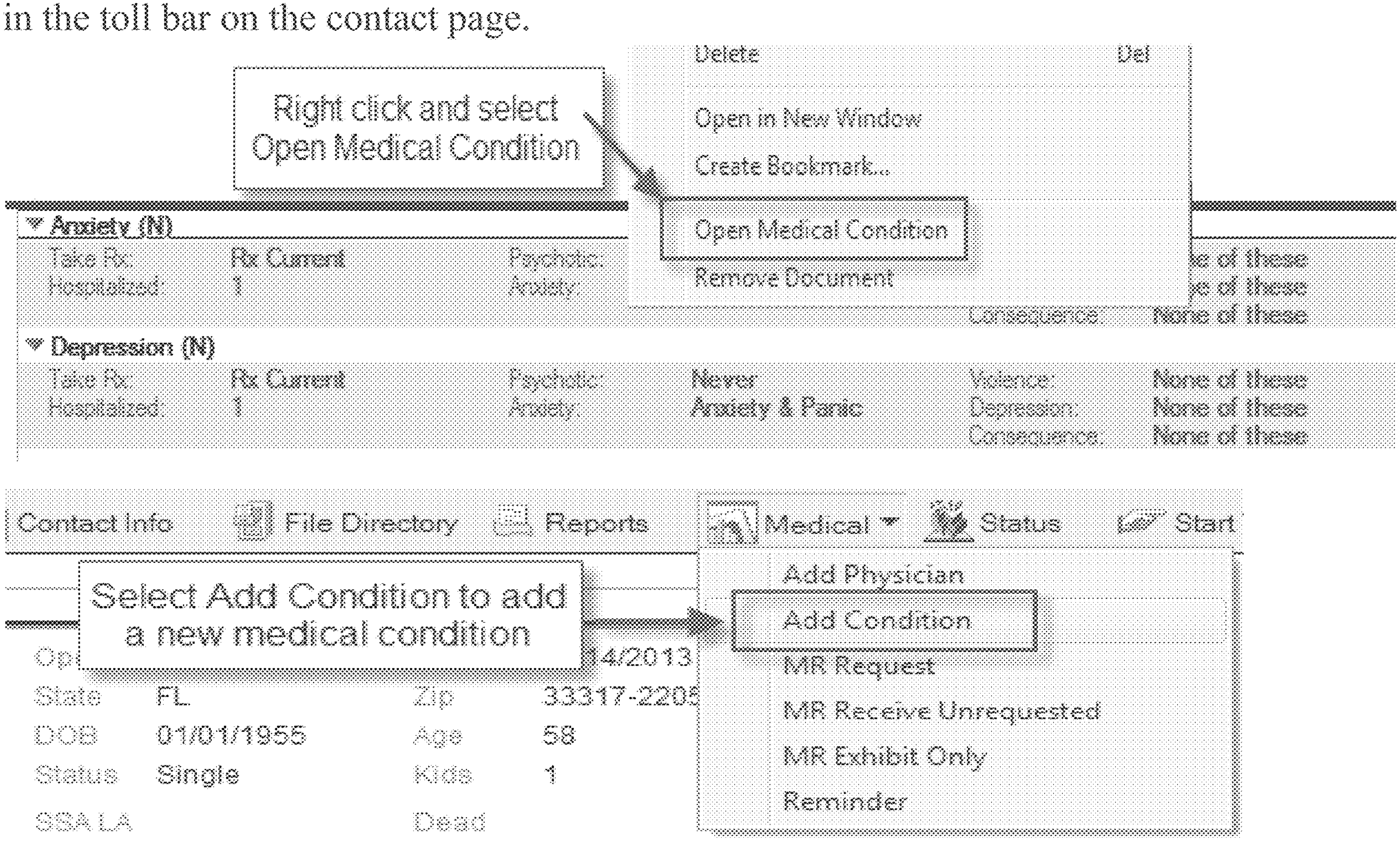
FIG. 179 is a screen shot of a CD Landing Page.
Figure 180:
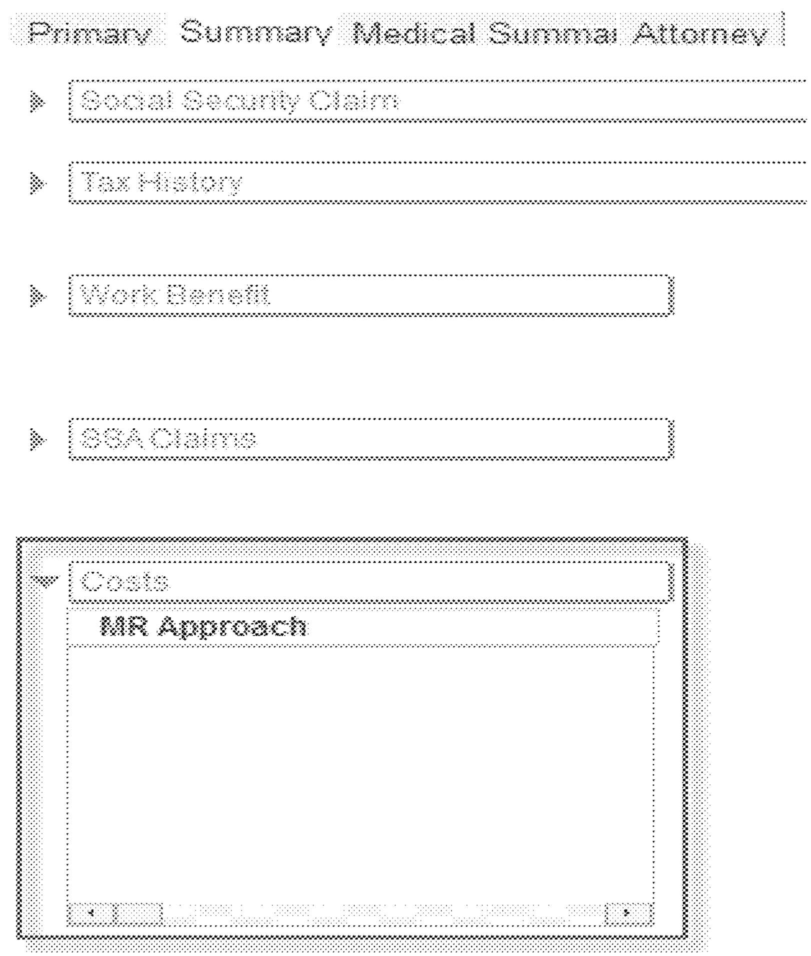
FIG. 180 is a screen shot of a CD Landing Page.
Figure 181:
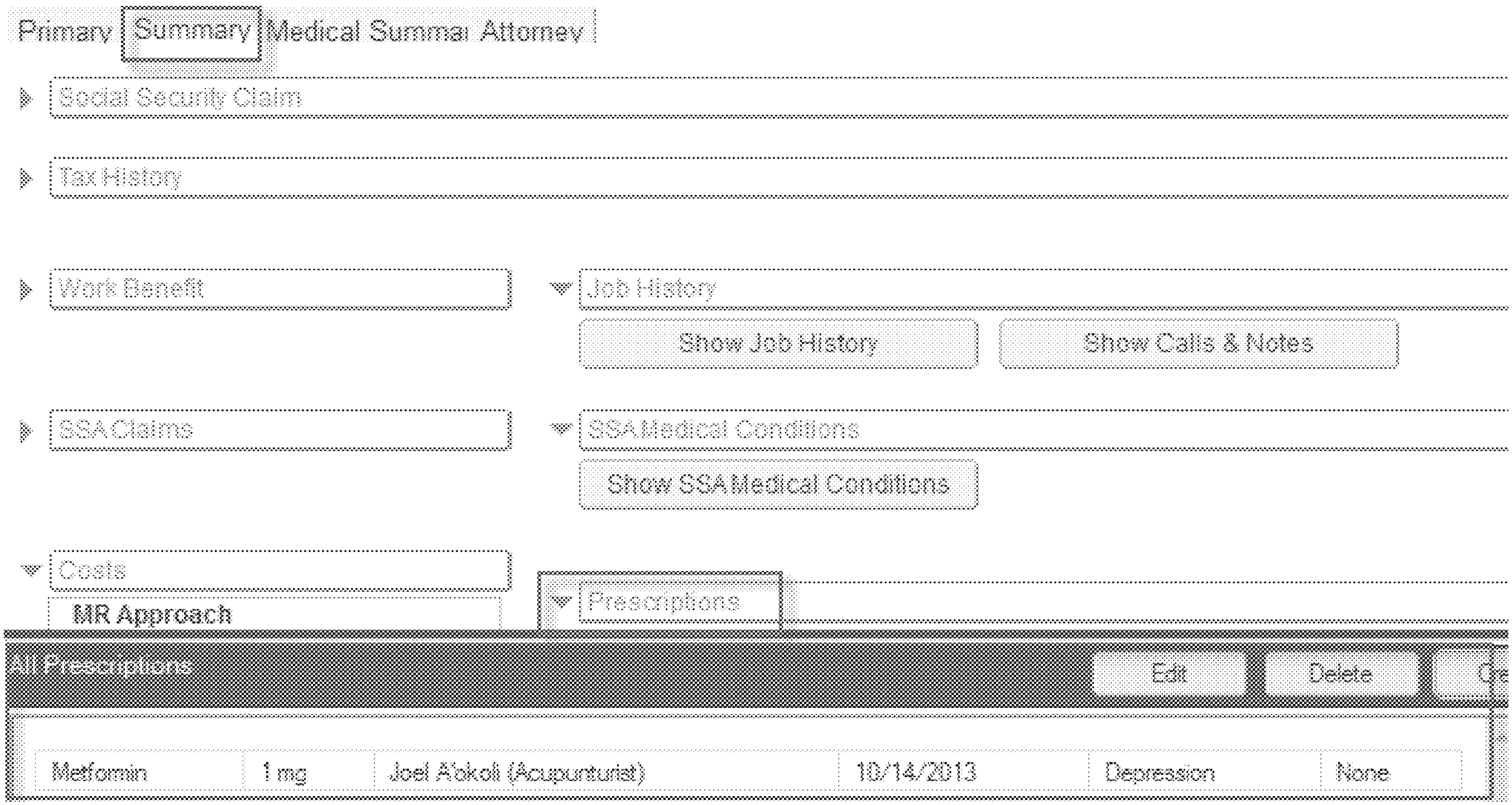
FIG. 181 is a screen shot of a CD Landing Page.
Figure 182:
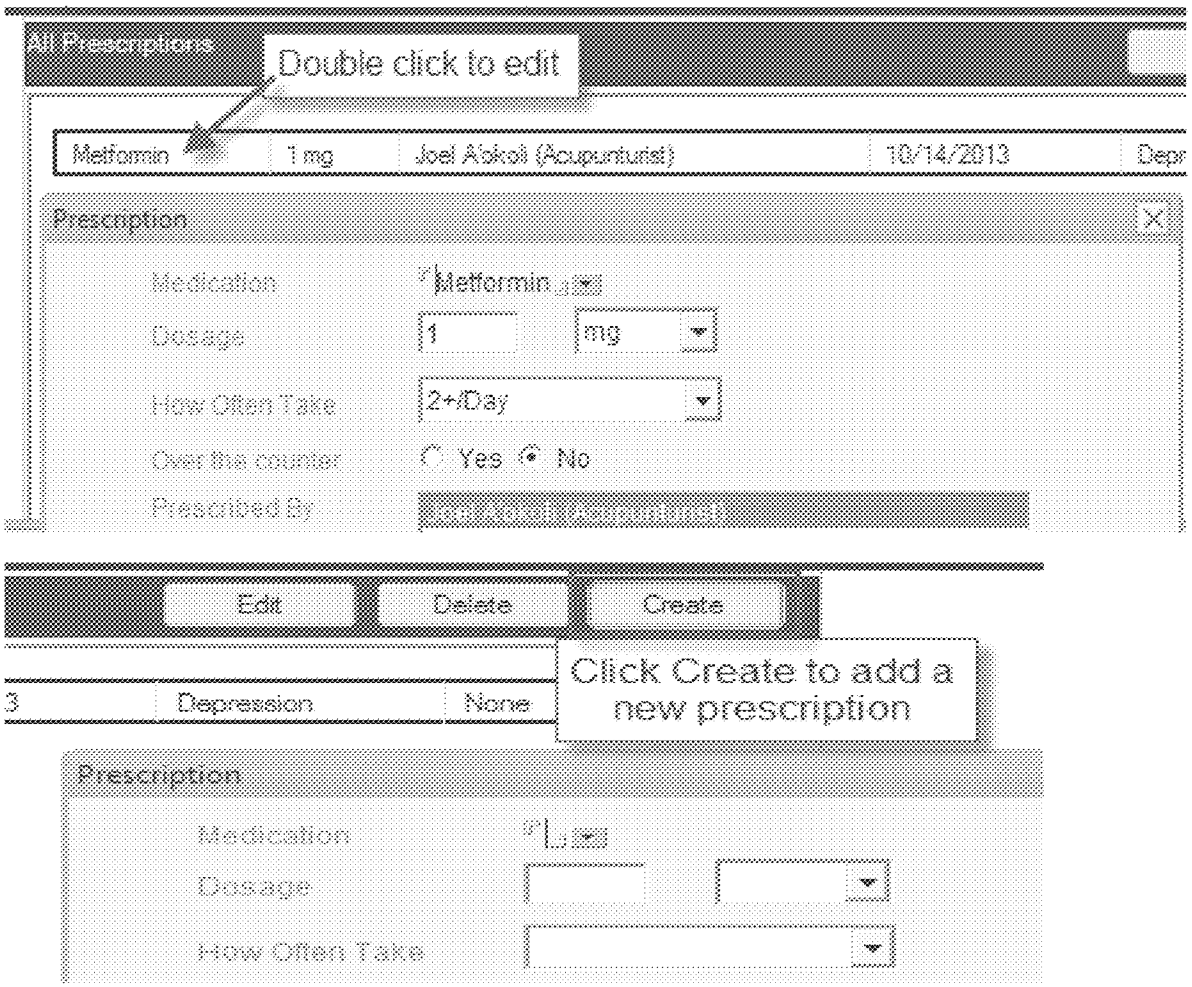
FIG. 182 is a screen shot of a CD Landing Page.
Figure 183:
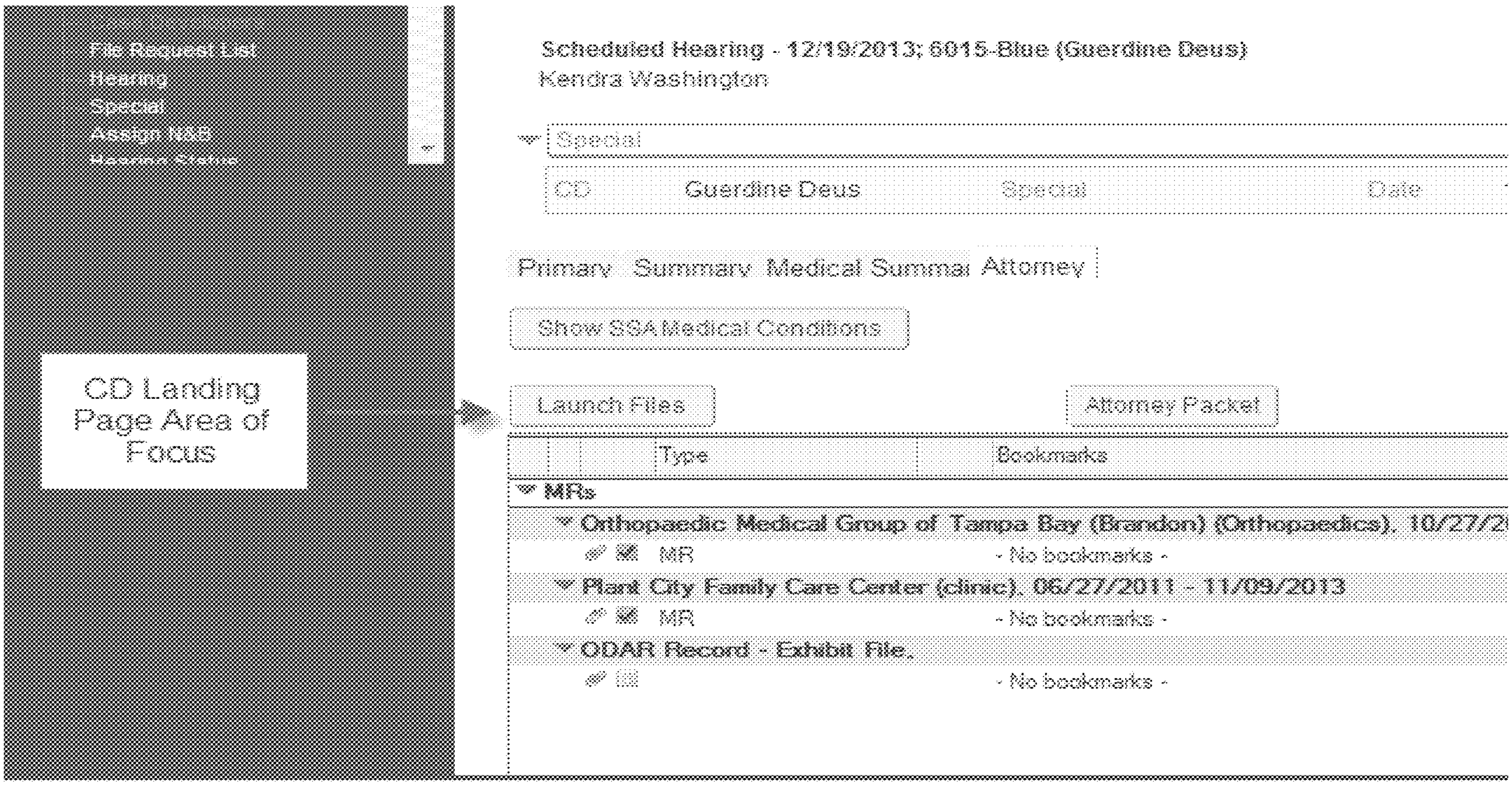
FIG. 183 is a screen shot of a CD Landing Page.
Figure 184:
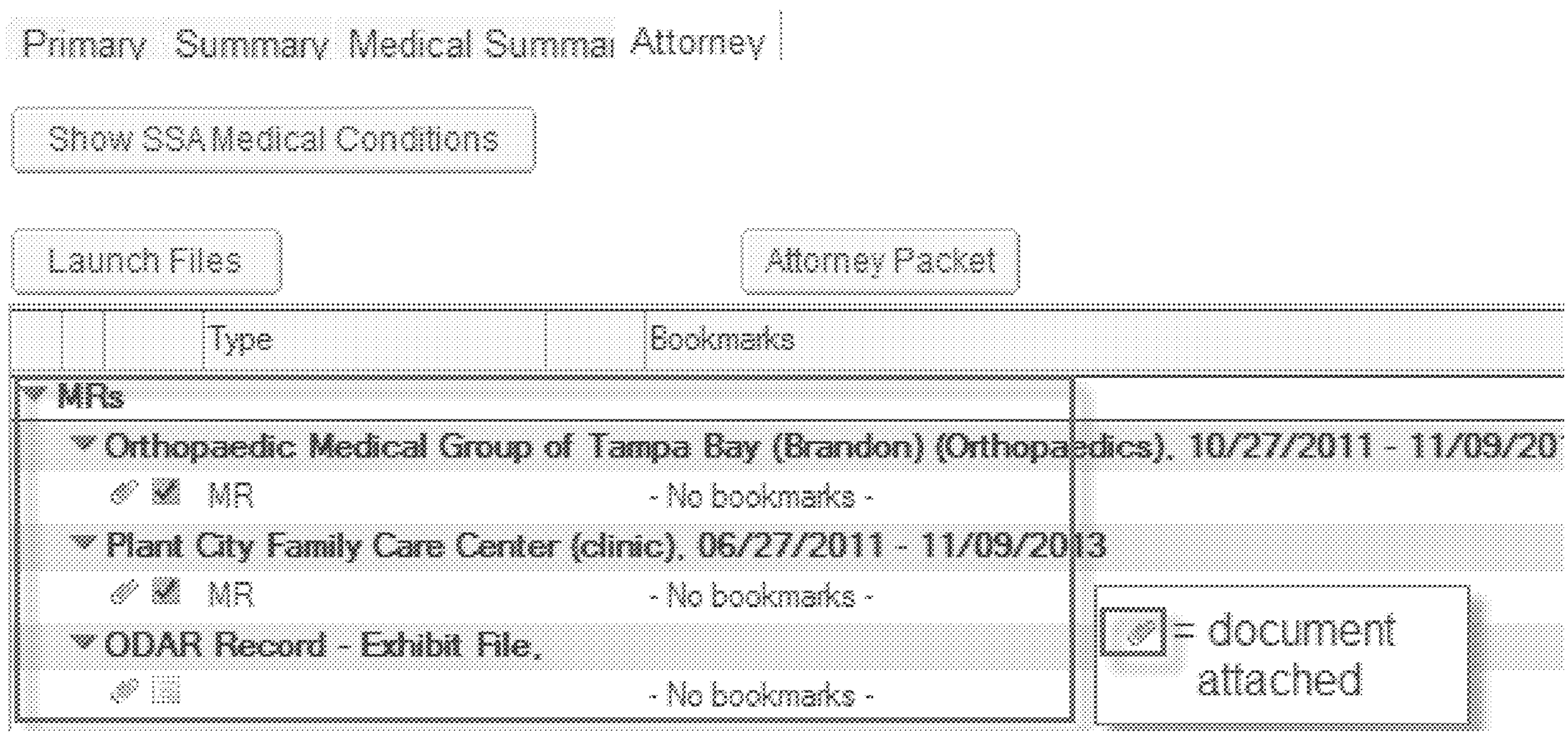
FIG. 184 is a screen shot of a CD Landing Page.
Figure 185A:
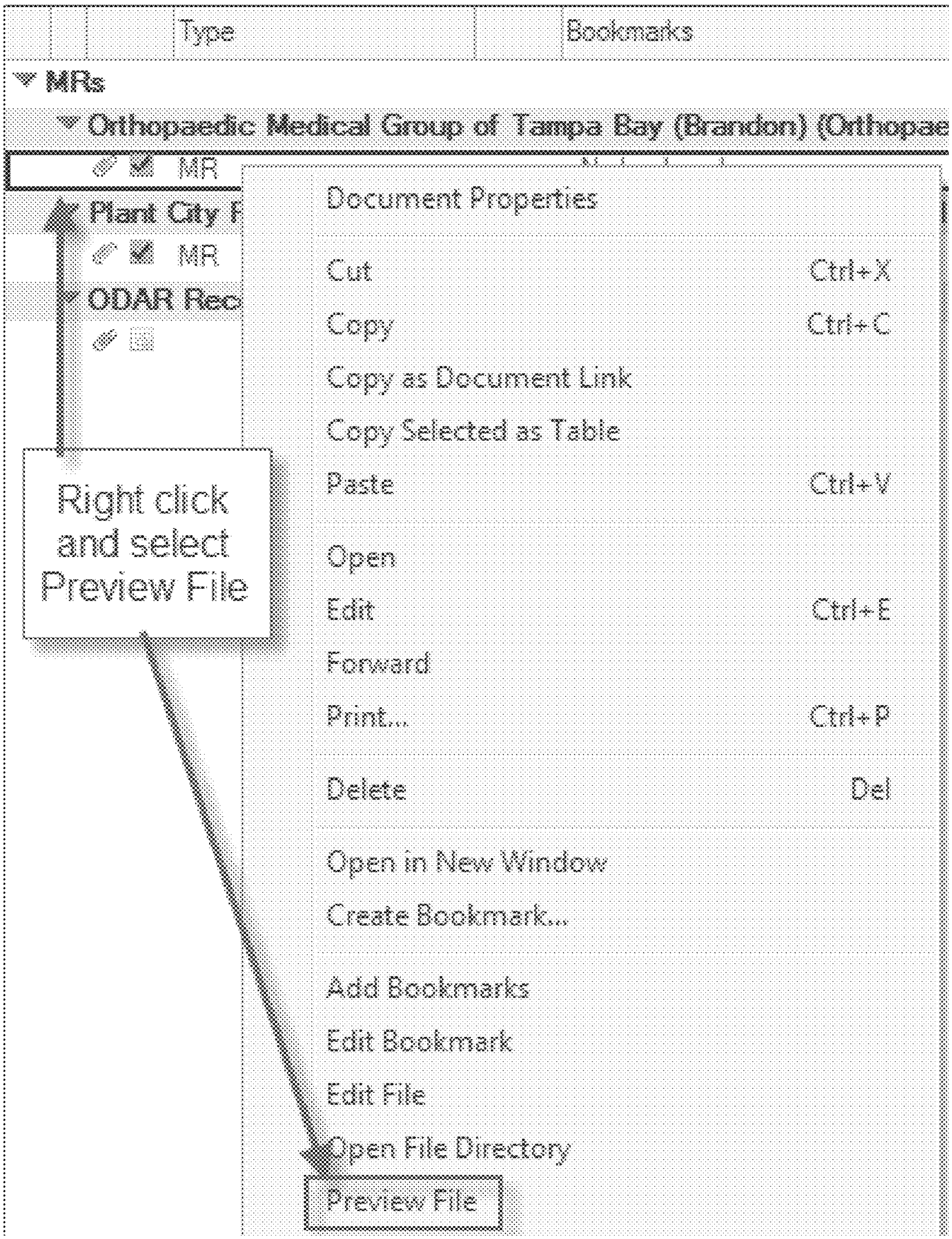
FIGS. 185a-185b are a screen shot of a CD Landing Page.
Figure 185B:
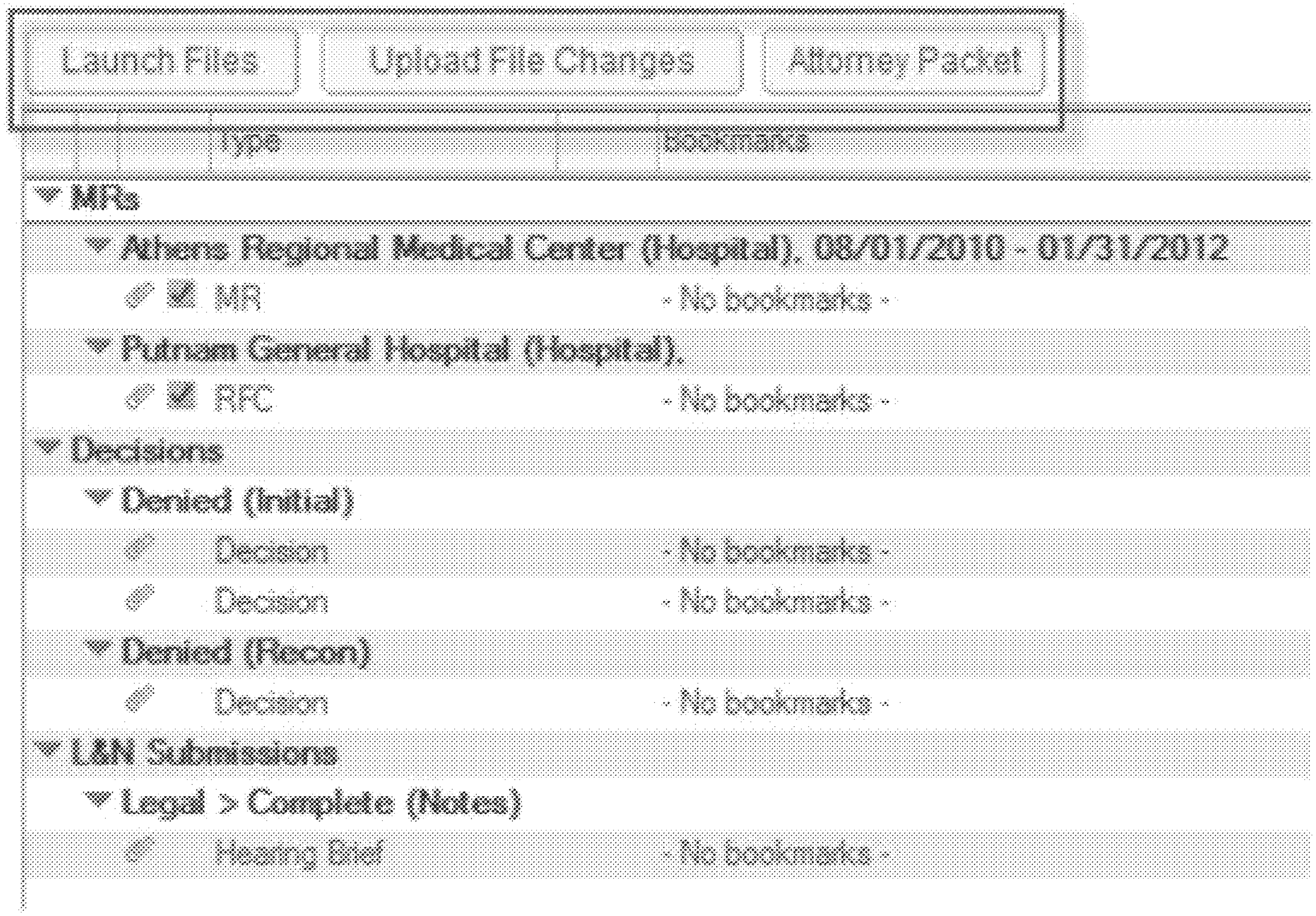
Figure 186A:
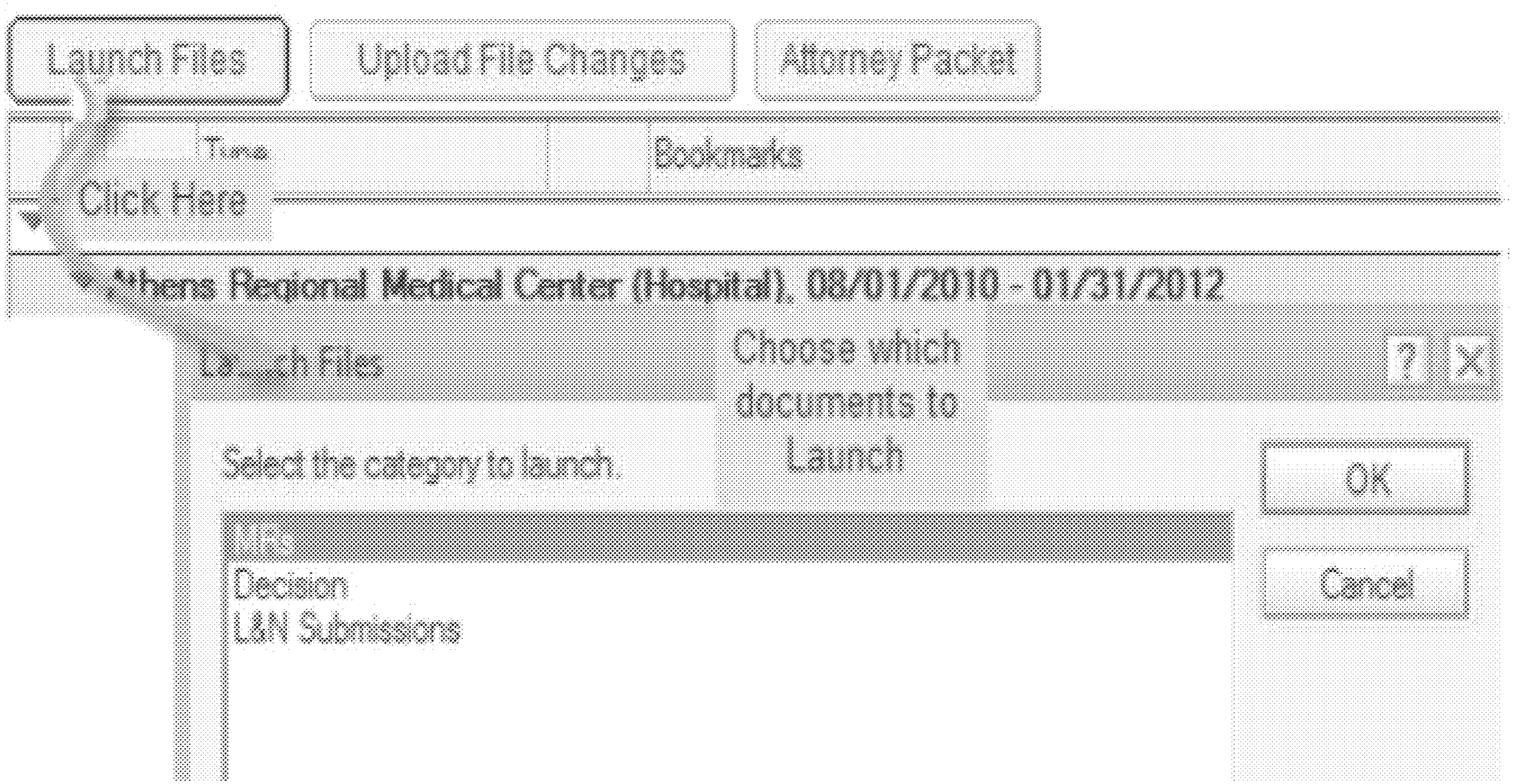
FIGS. 186a-186c are a screen shot of a CD Landing Page.
Figure 186B:
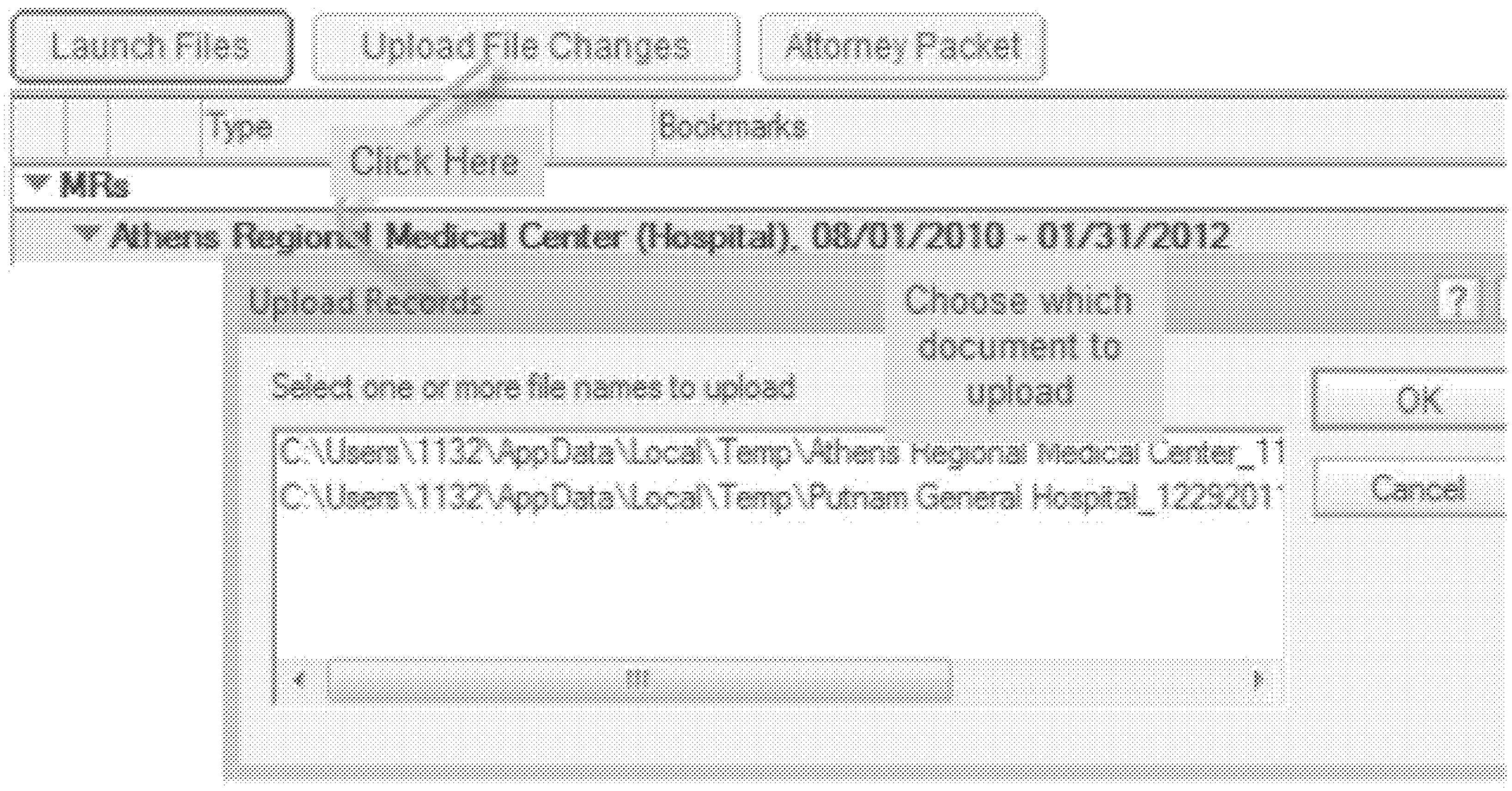
Figure 186C:
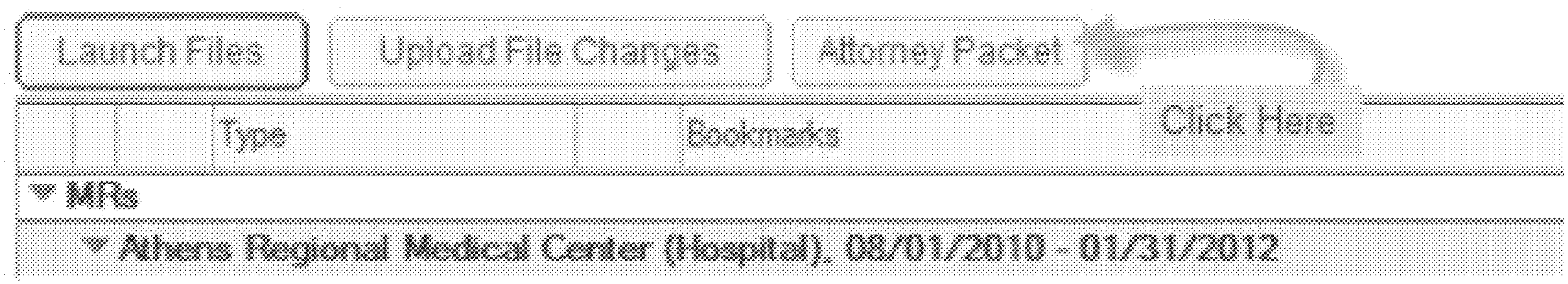
Figure 187:
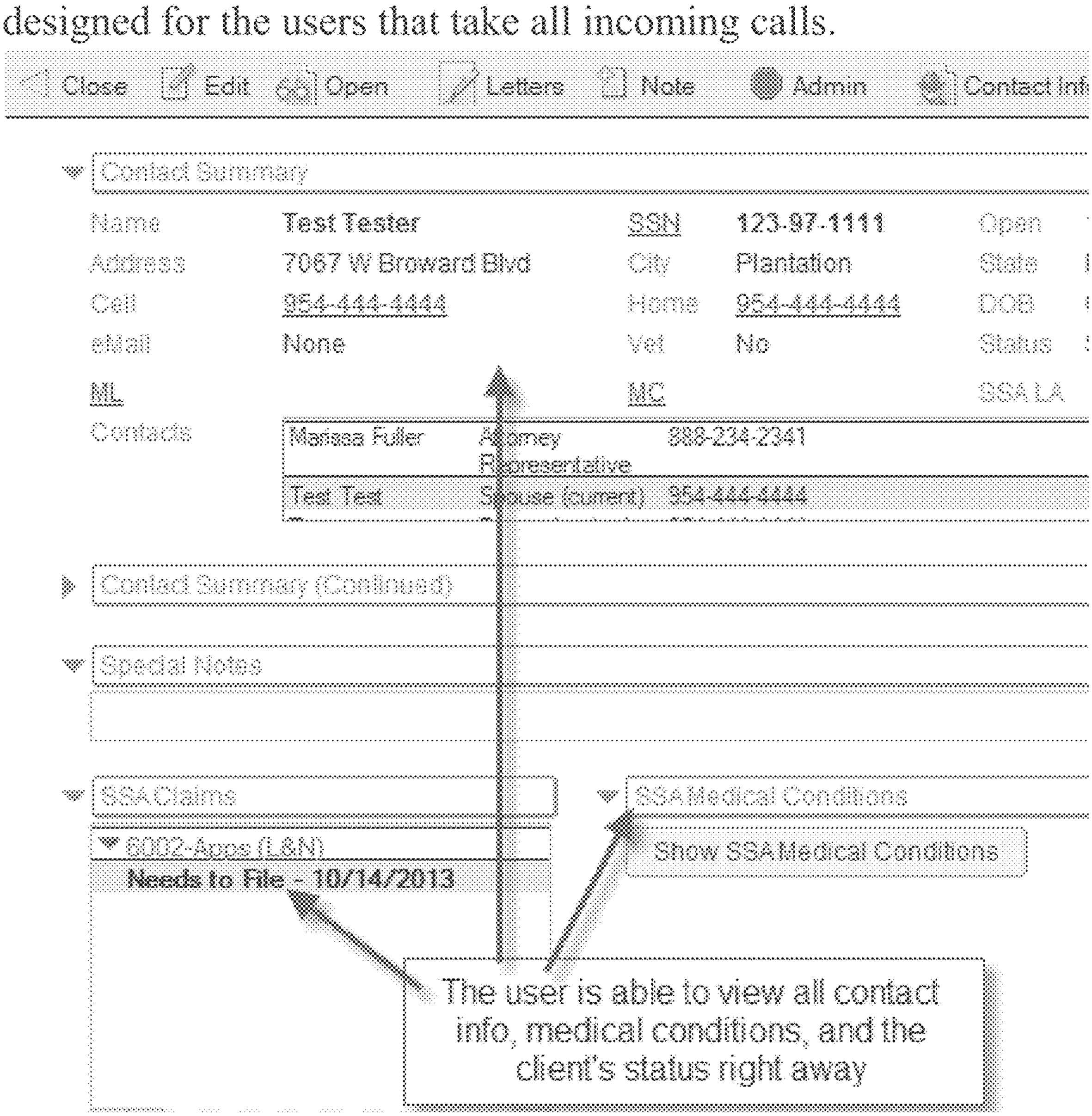
Figure 188A:
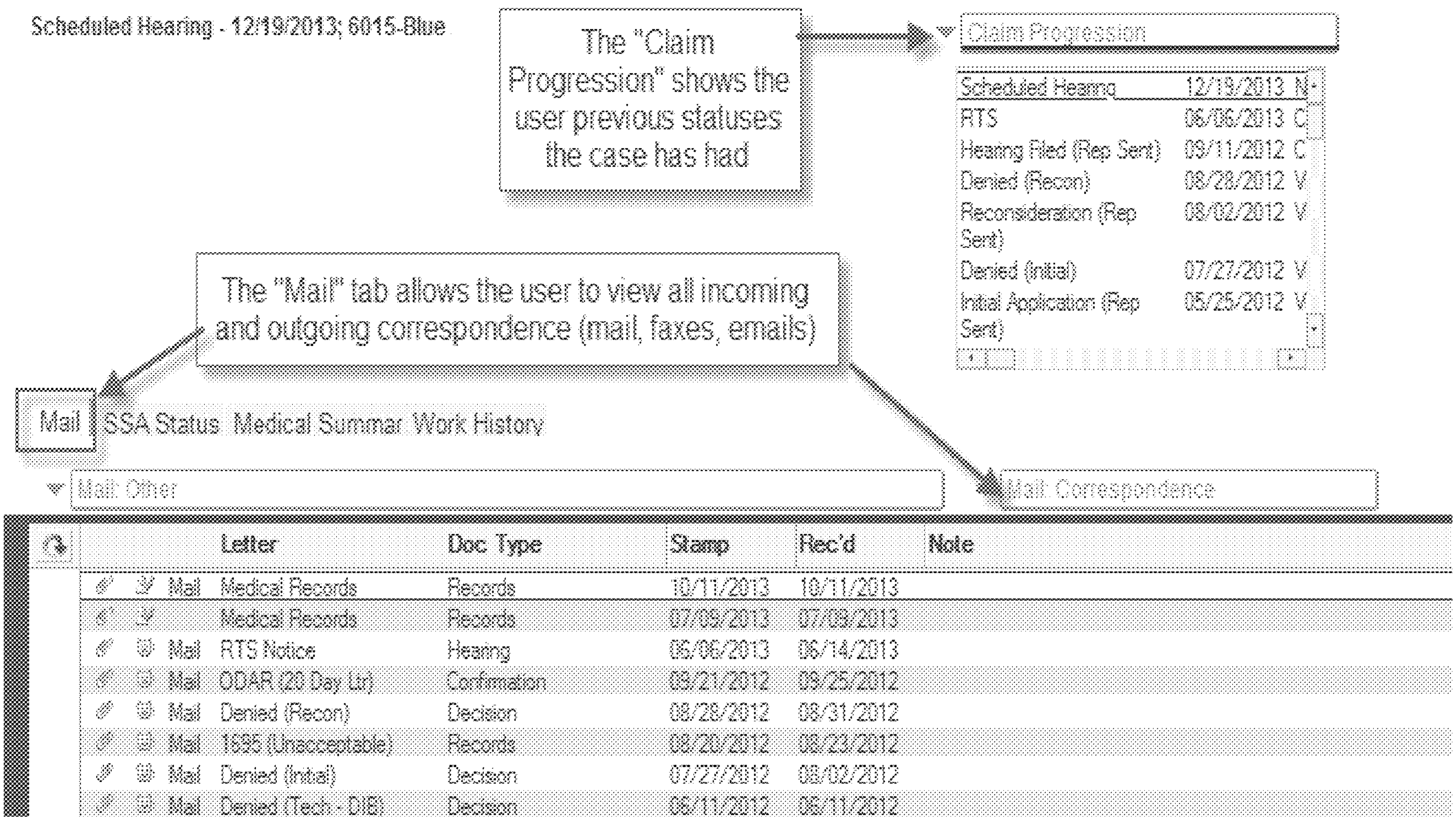
FIGS. 188a-188b are a screen shot of a CSR Landing Page.
Figure 188B:
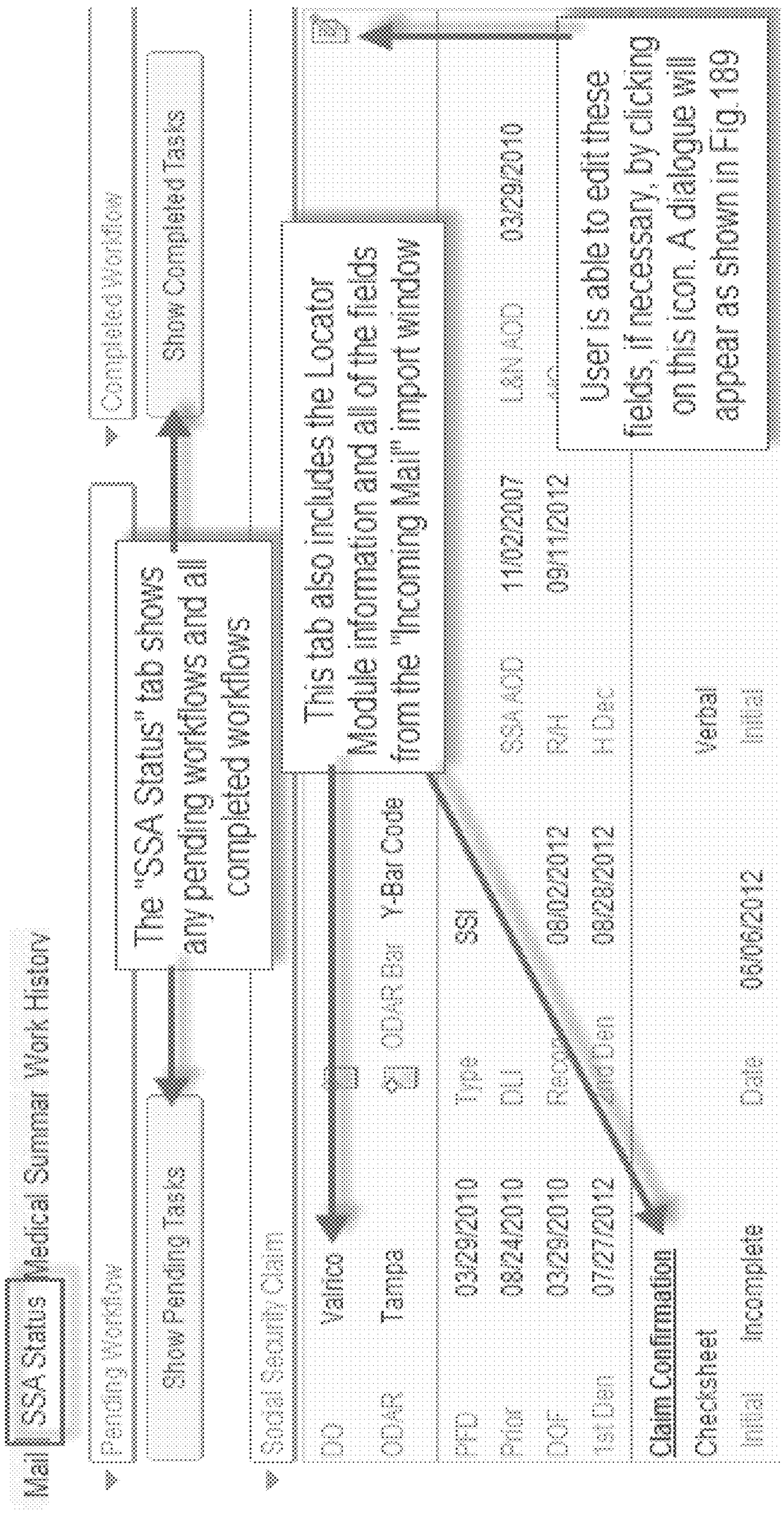
Figure 189A:
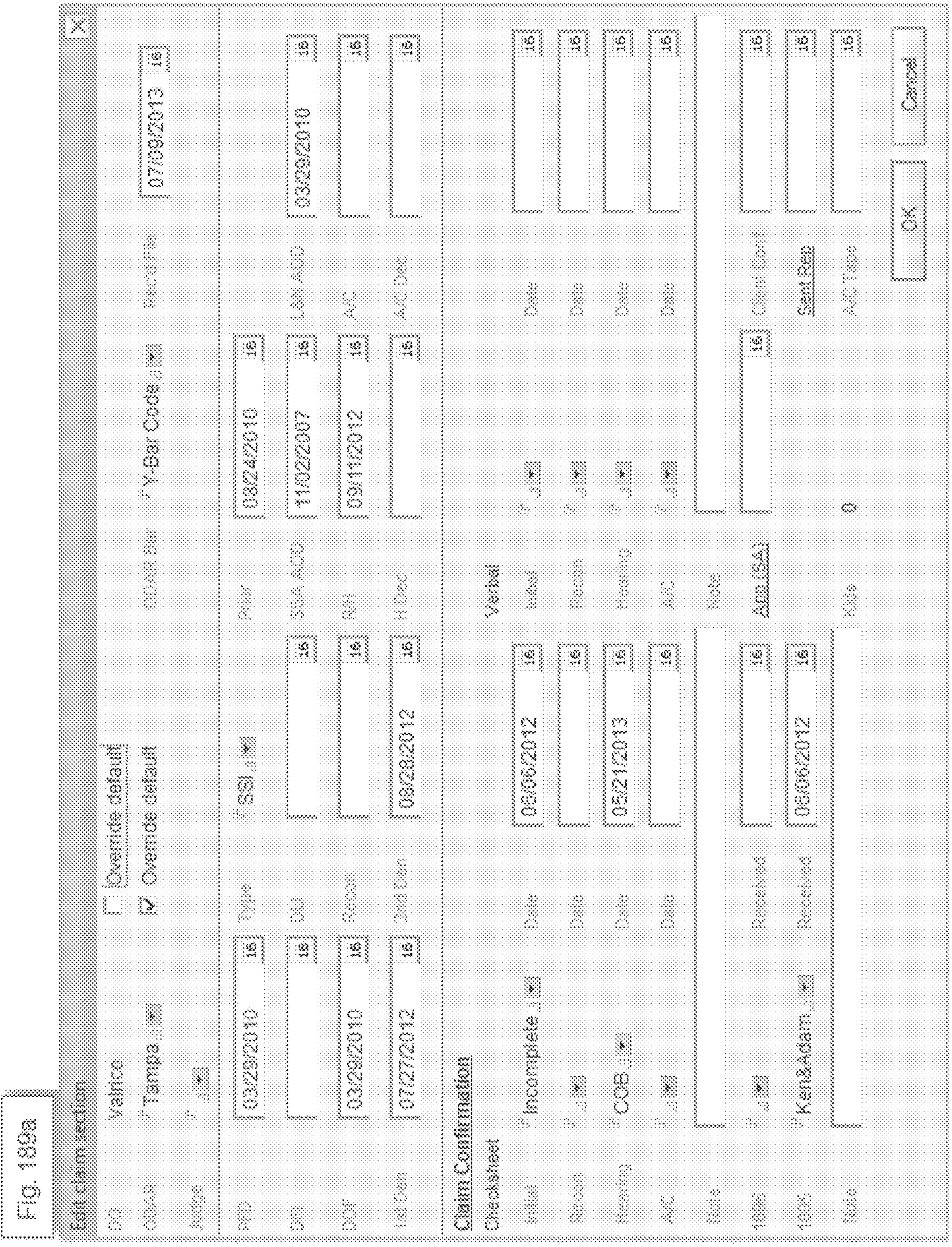
FIGS. 189a-189b are a screen shot of a CSR Landing Page.
Figure 189B:
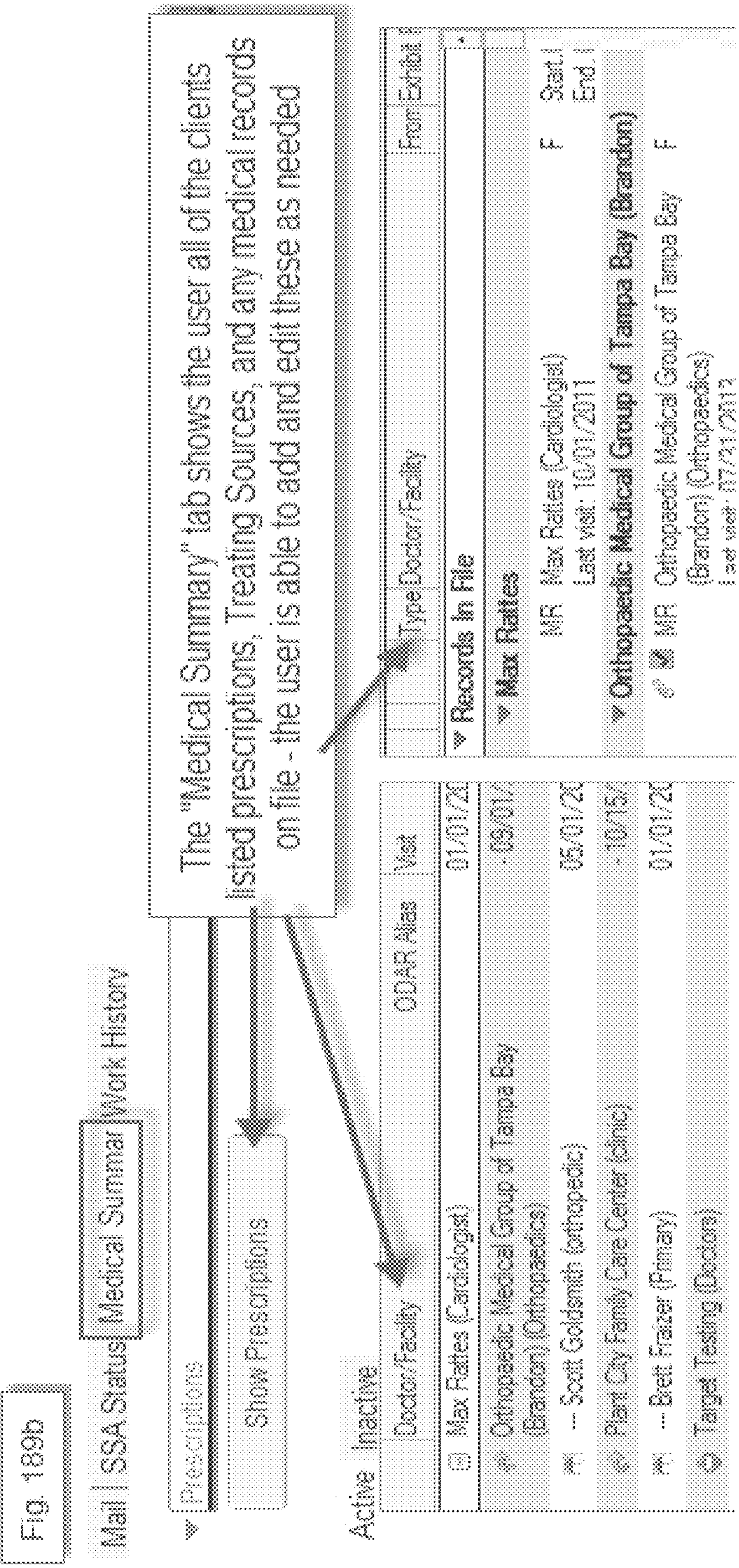
Figure 190:
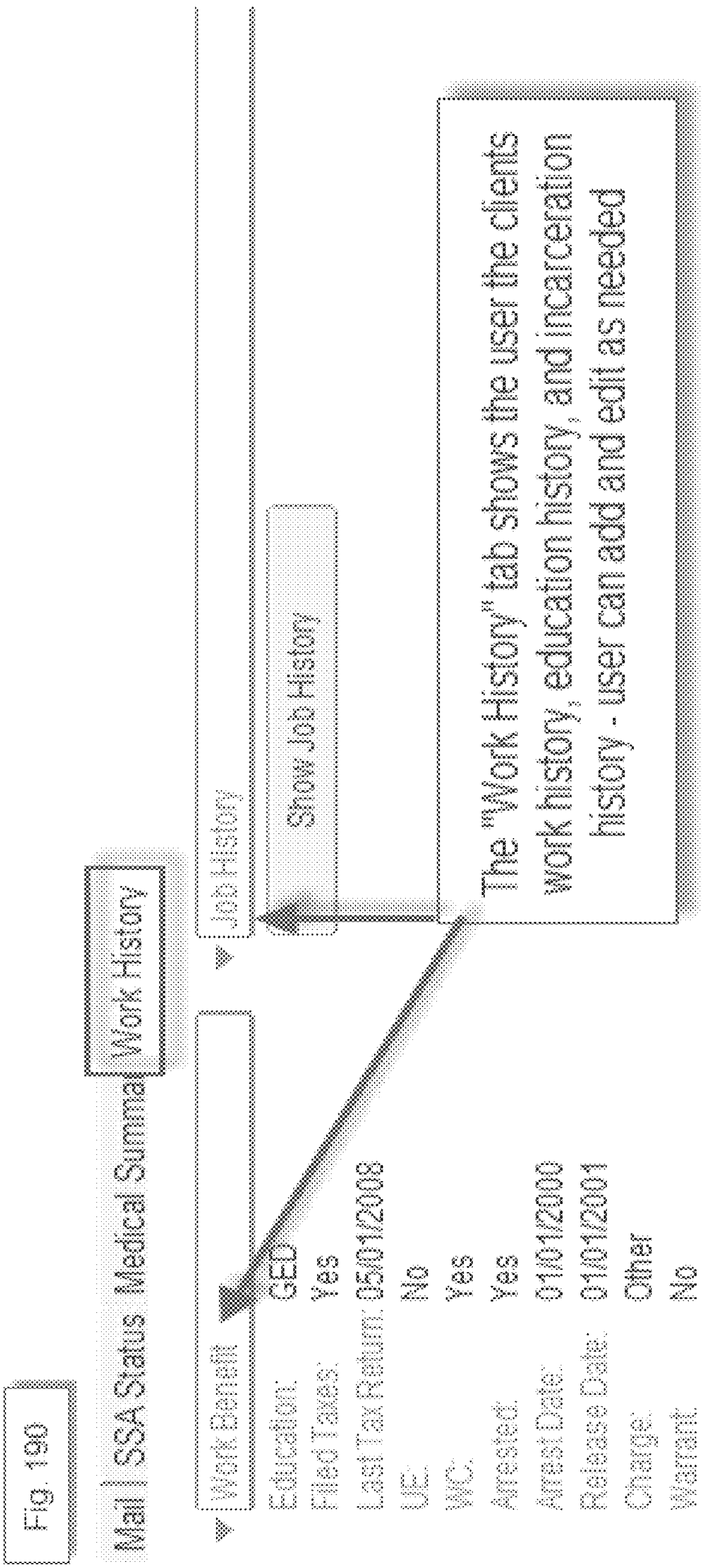
FIG. 190 is a screen shot of a CSR Landing Page.
Figure 191A:
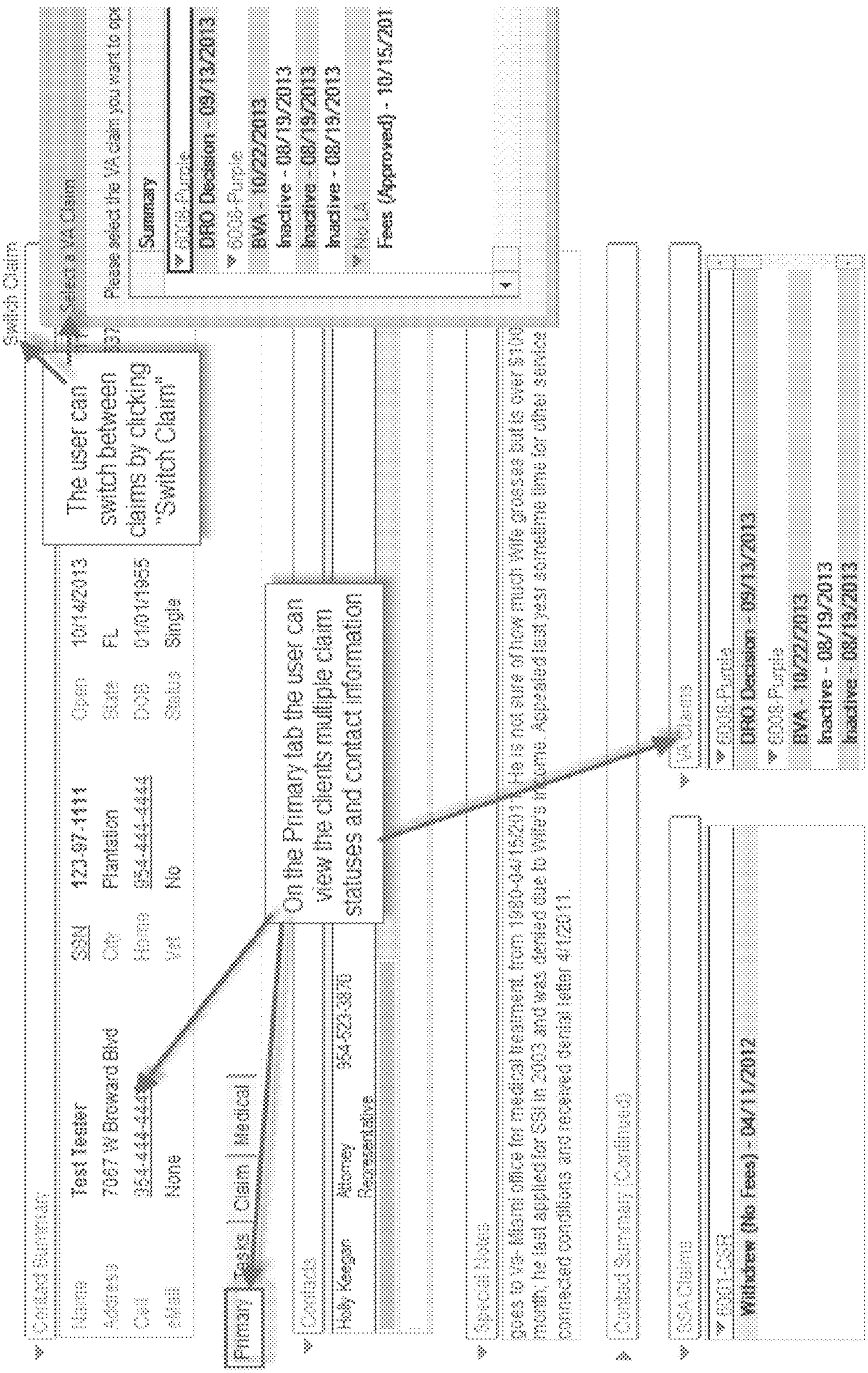
Figure 191B:
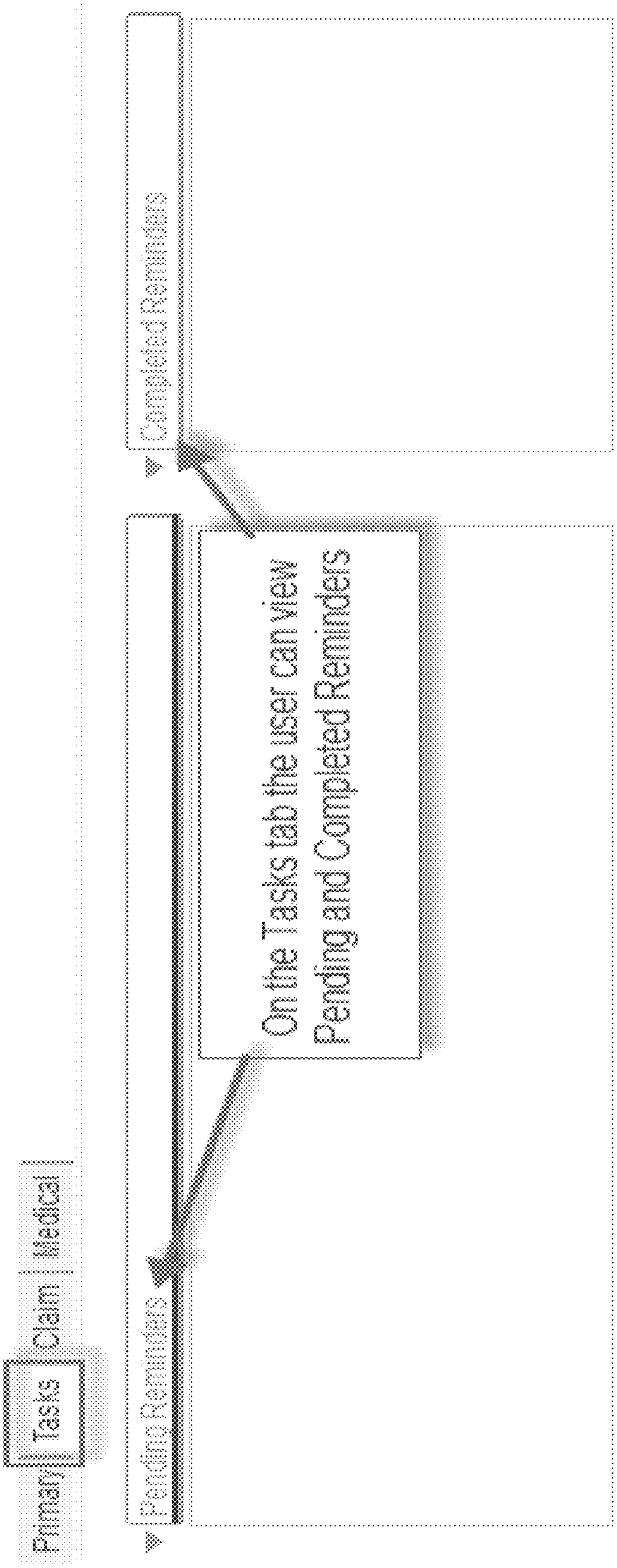
Figure 192A:
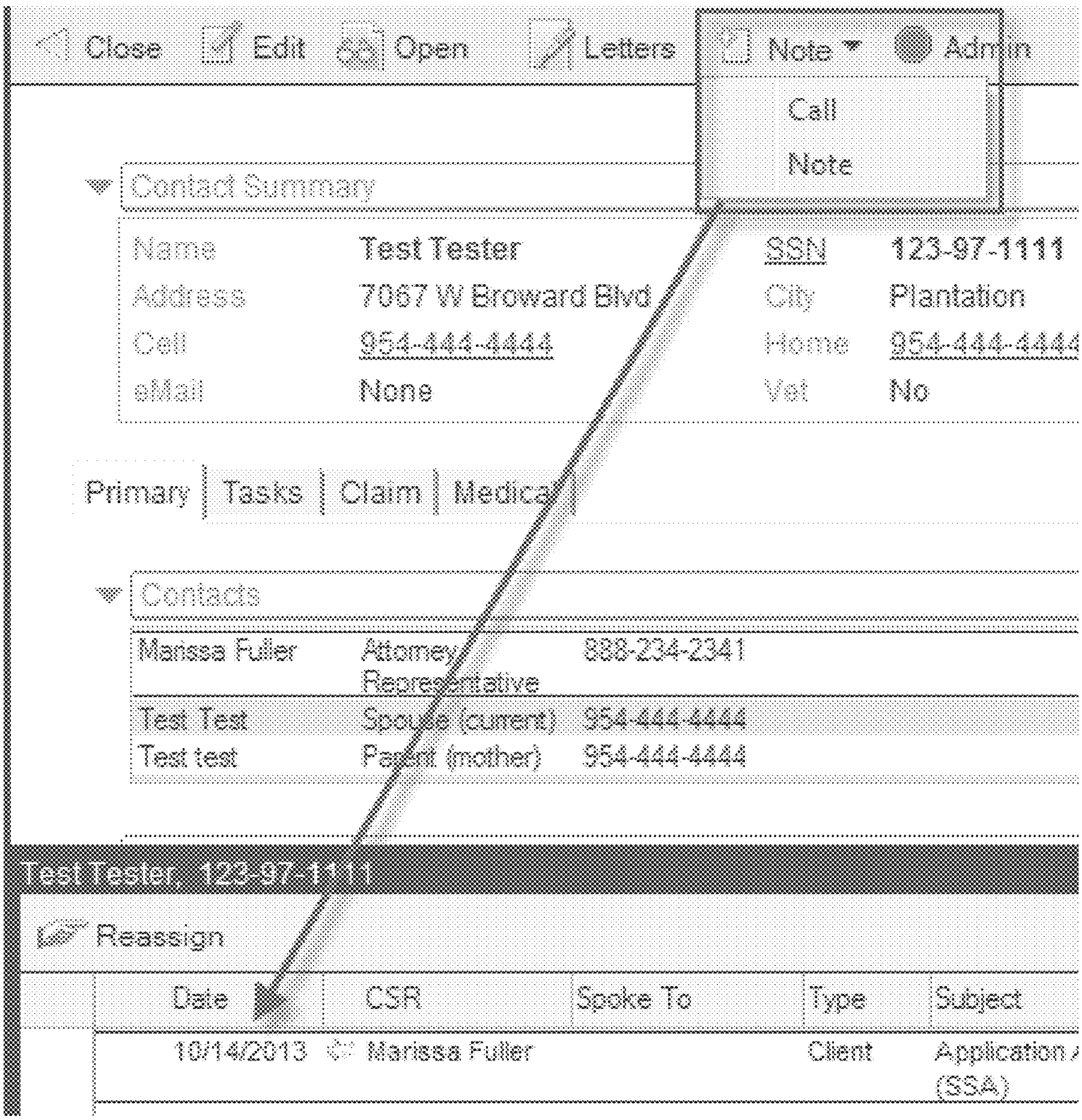
FIGS. 192a-192b are a screen shot of Calls and Notes Pages.
Figure 192B:
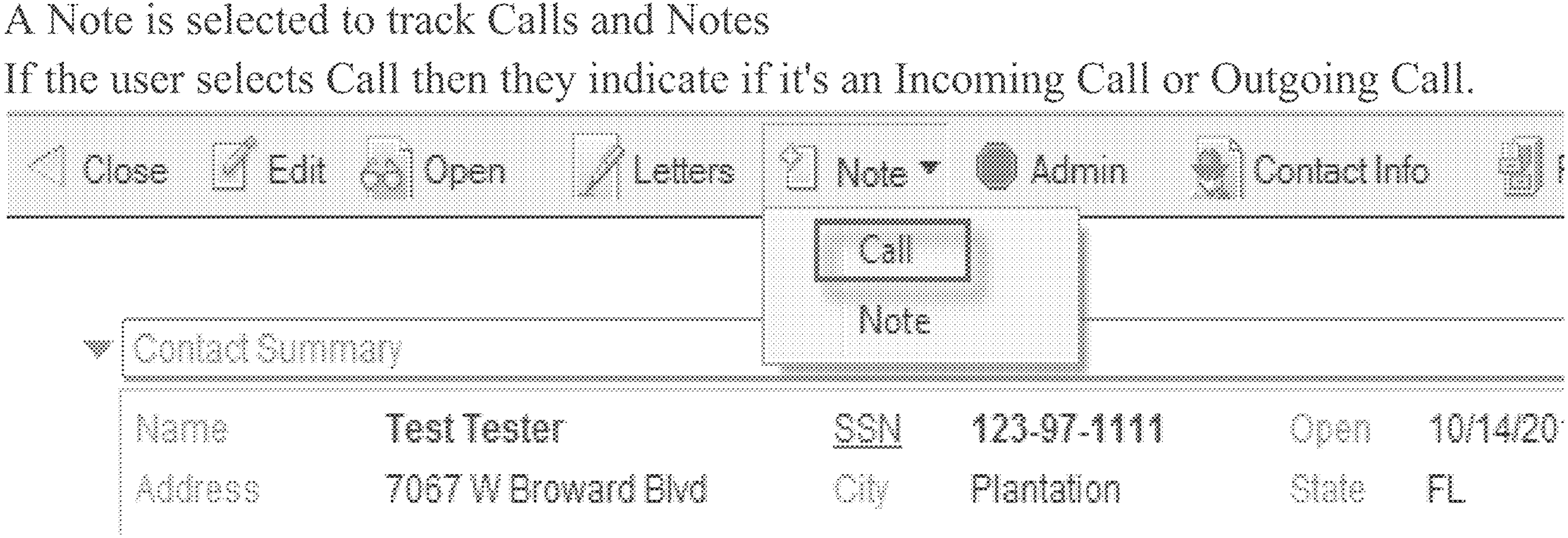
Figure 193A:
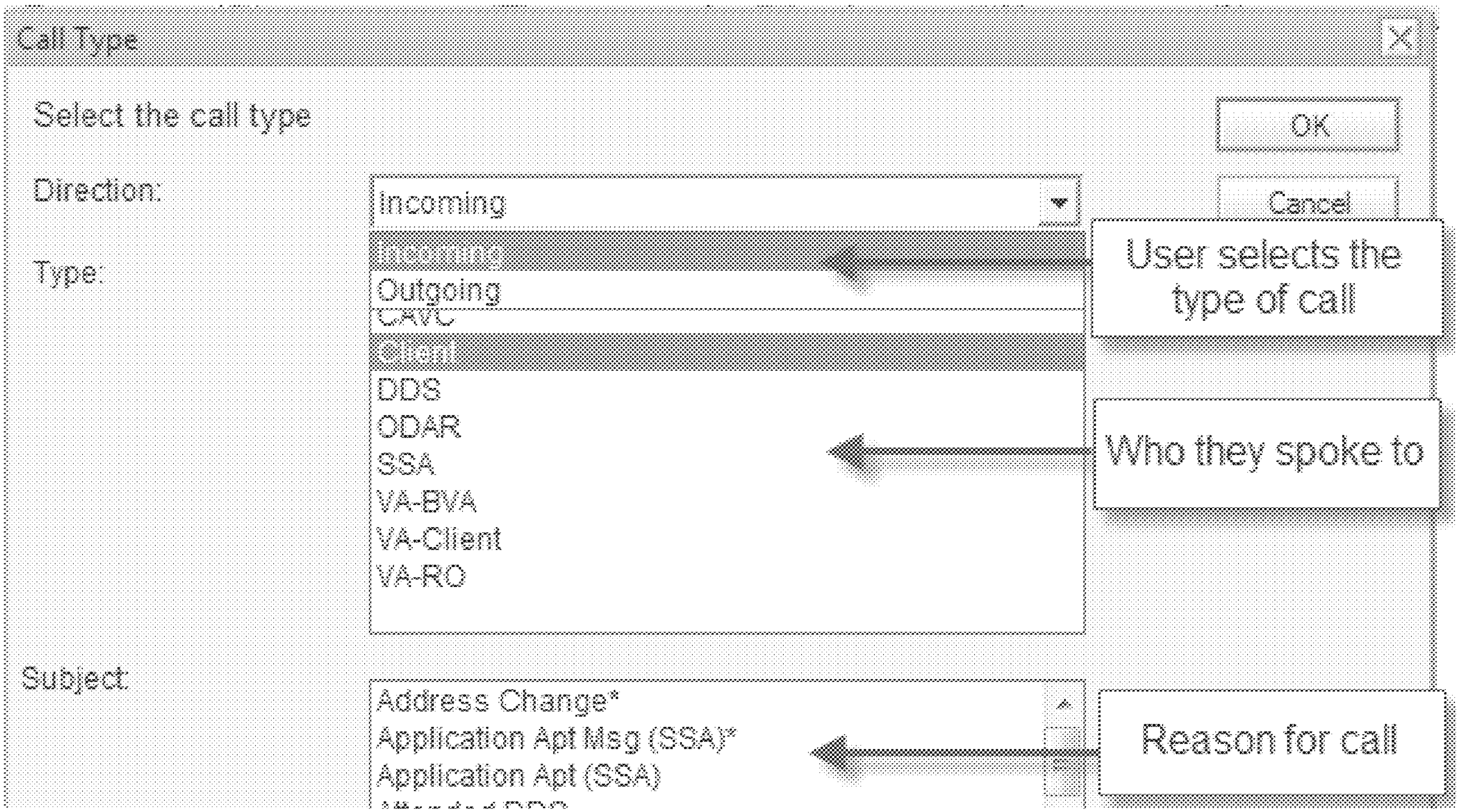
FIGS. 193a-193b are a screen shot of Calls and Notes pages.
Figure 193B:
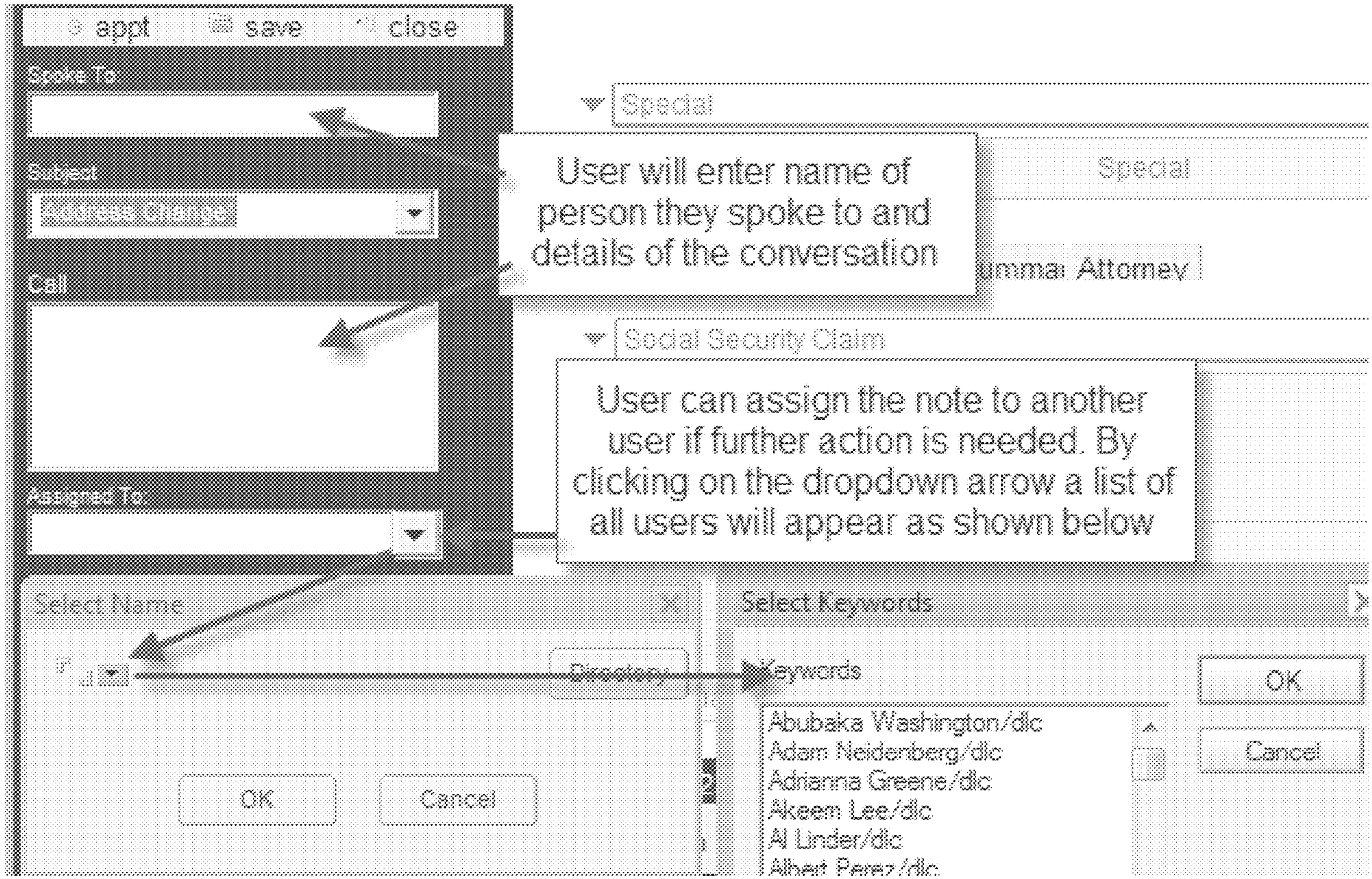
Figure 194A:
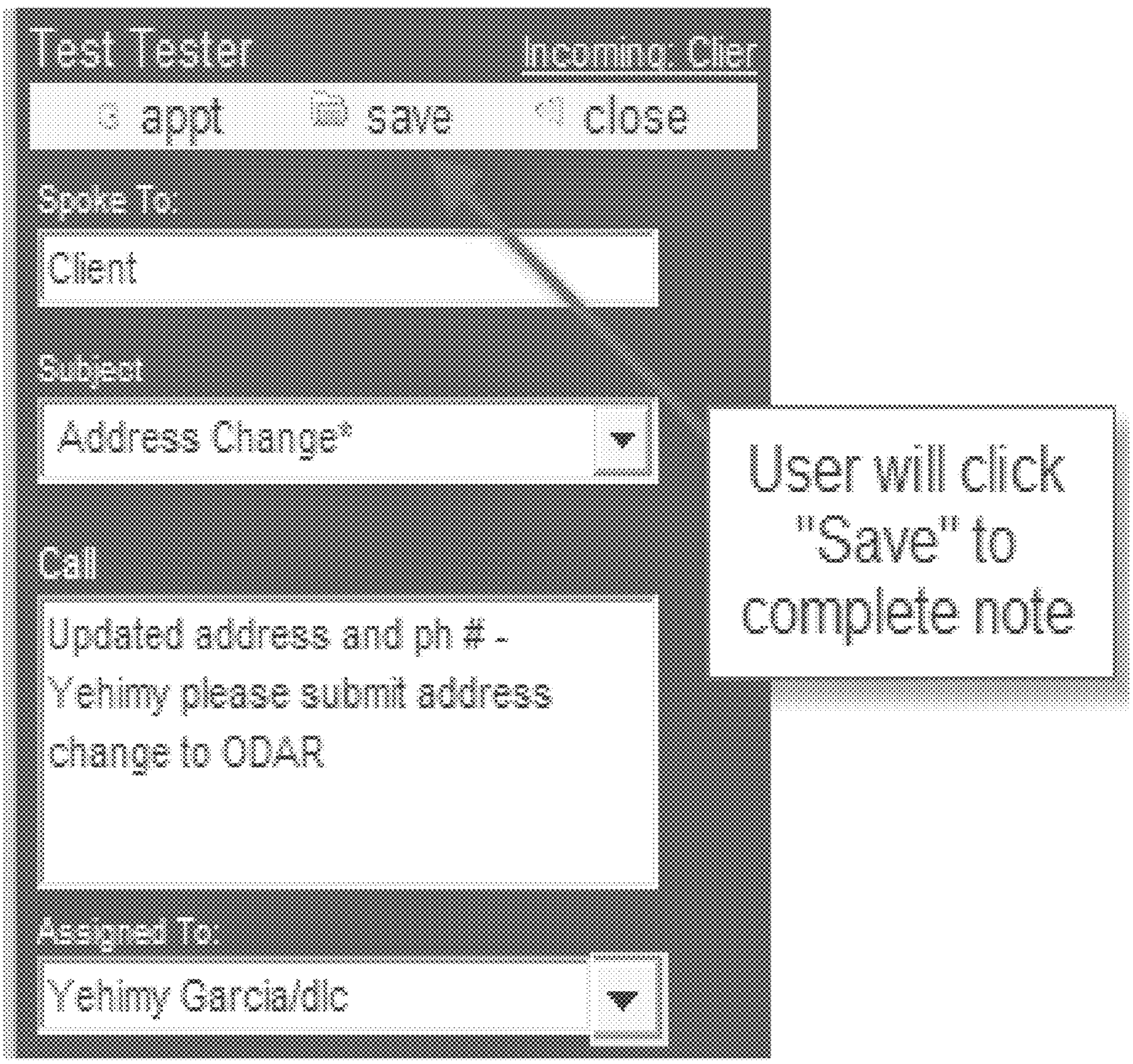
FIGS. 194a-194c are a screen shot of Calls and Notes pages.
Figure 194B:
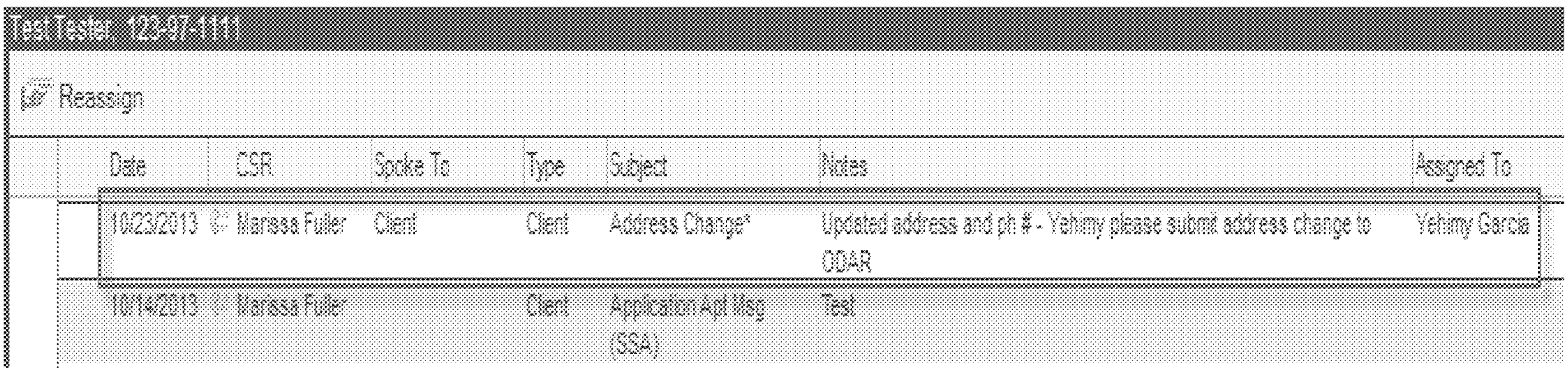
Figure 194C:
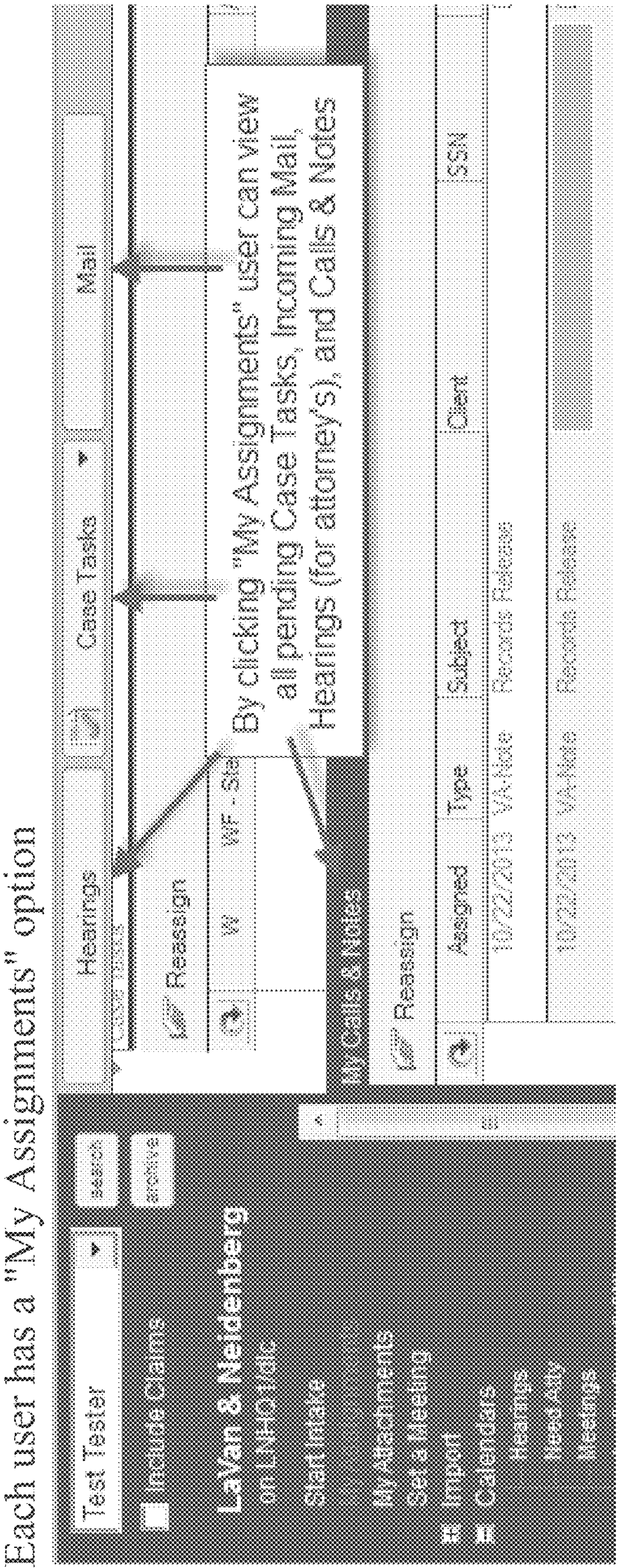
Figure 195A:
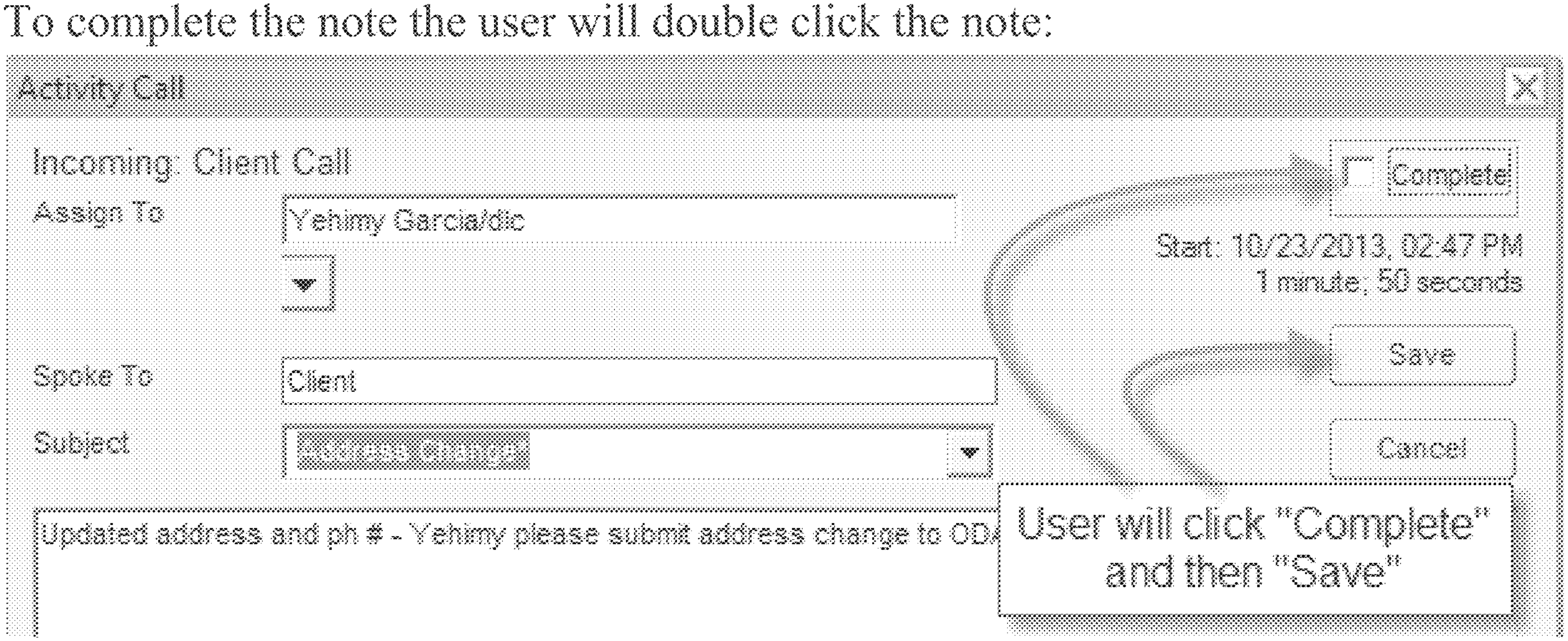
FIGS. 195a-195c are a screen shot of Calls and Notes pages.
Figure 195B:
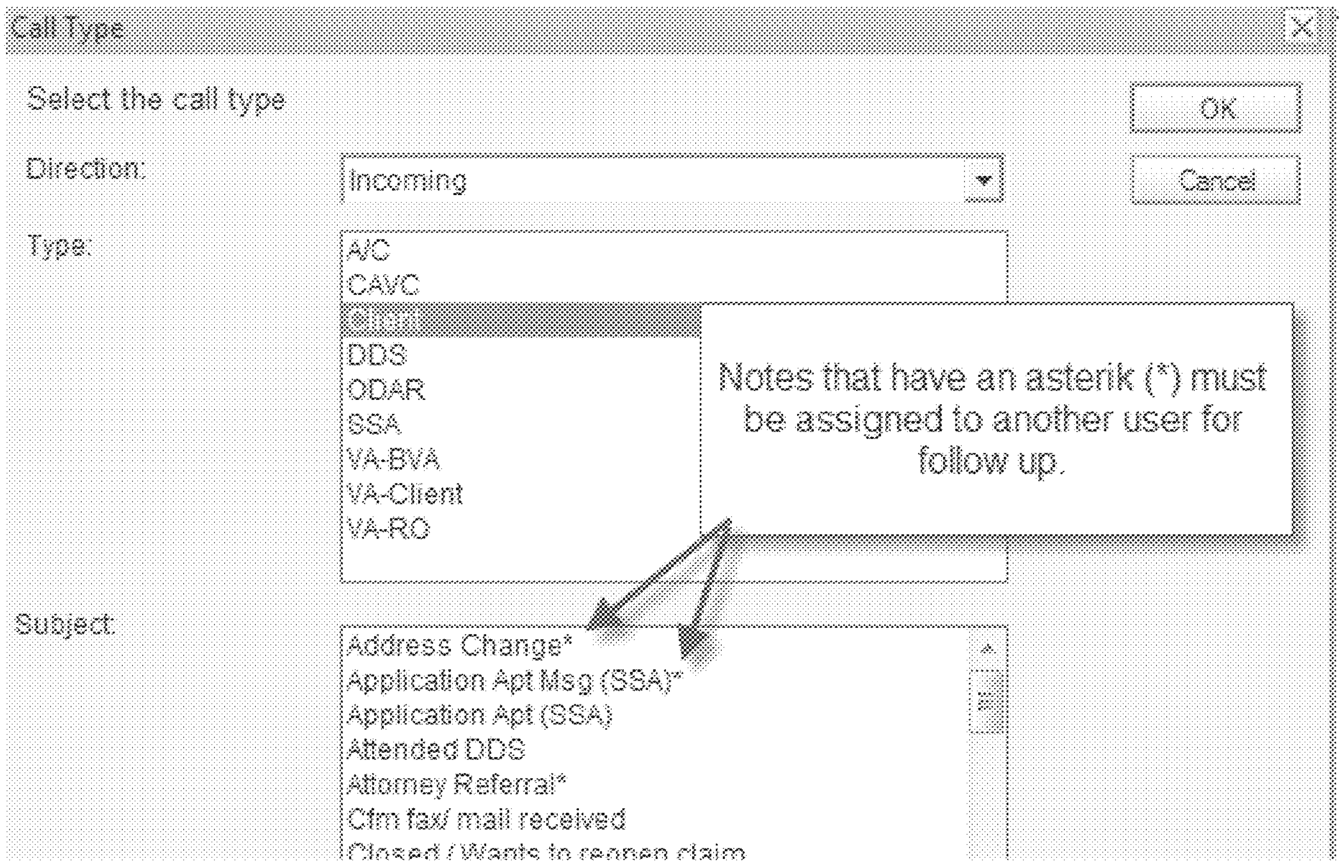
Figure 195C:
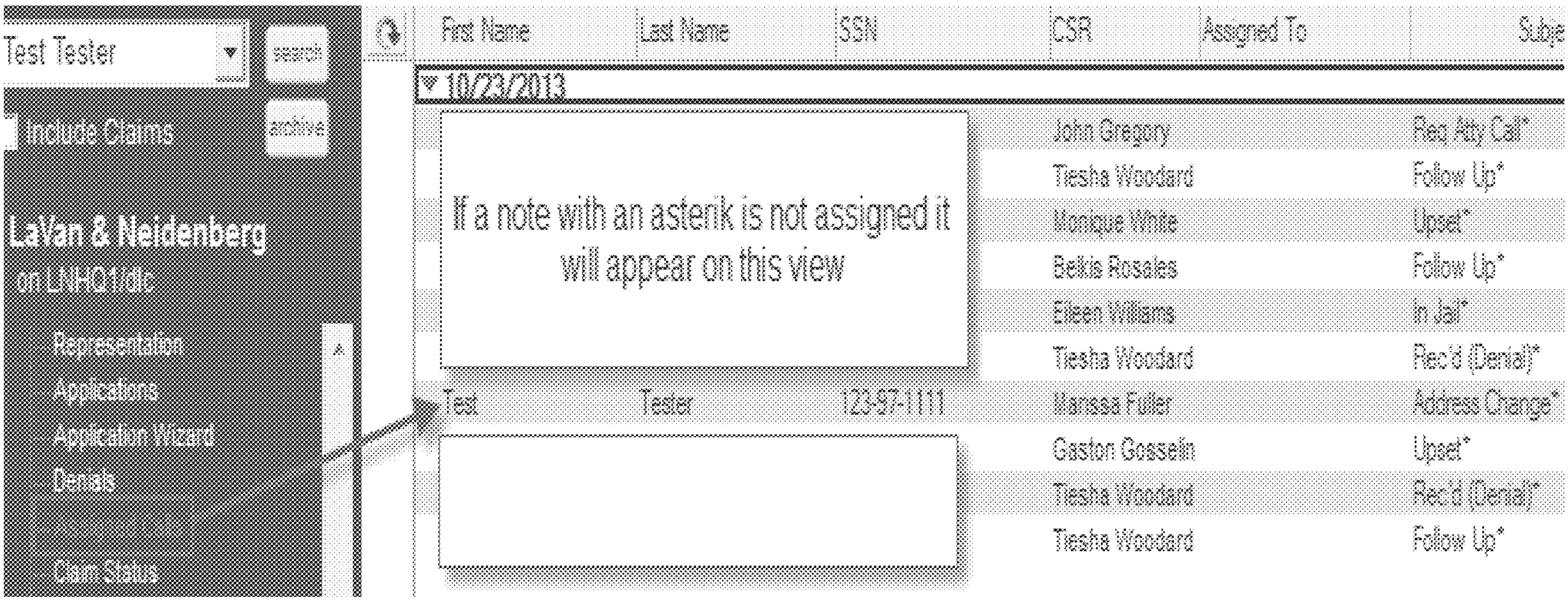
Figure 196:
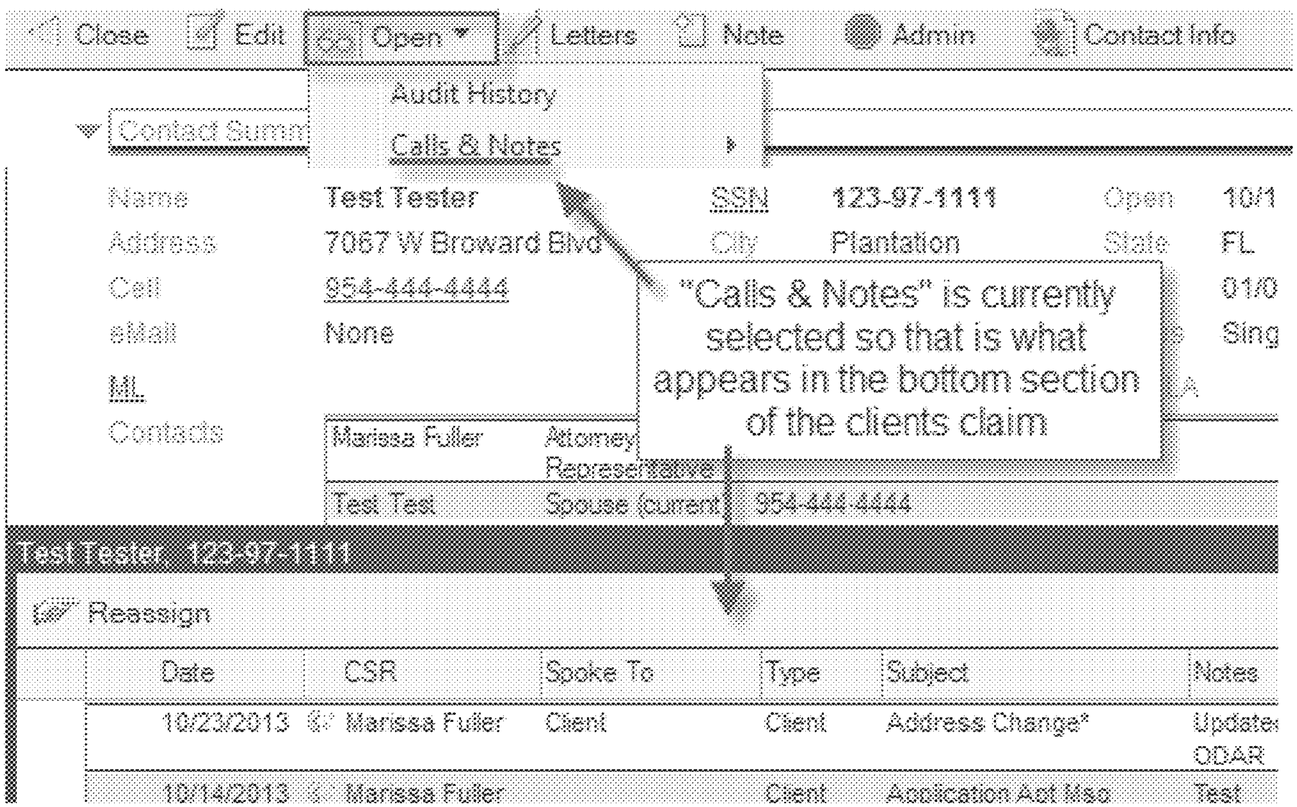
FIG. 196 is a screen shot of Audit History pages.
Figure 197A:
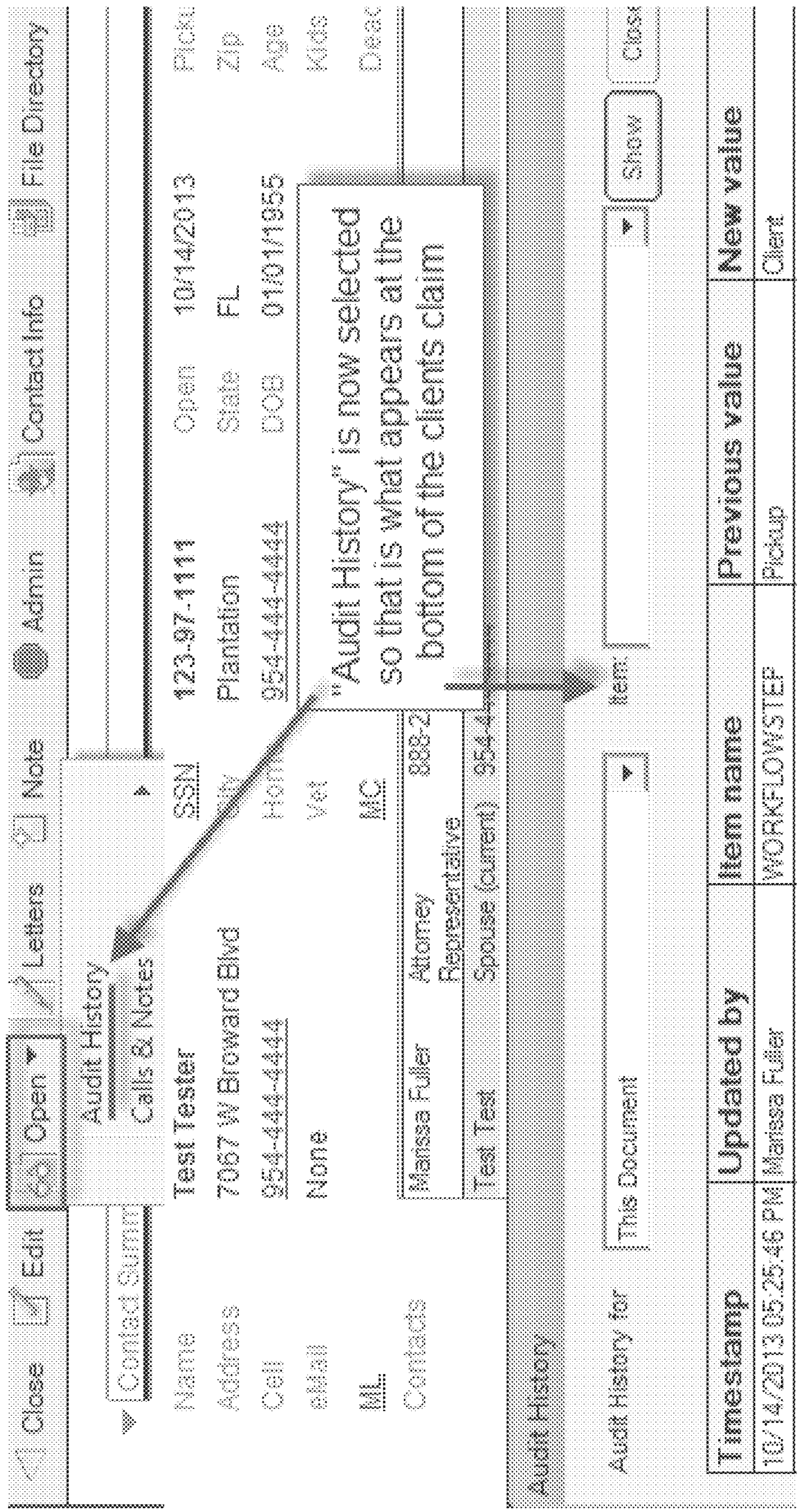
Figure 199A:
Figure 200:
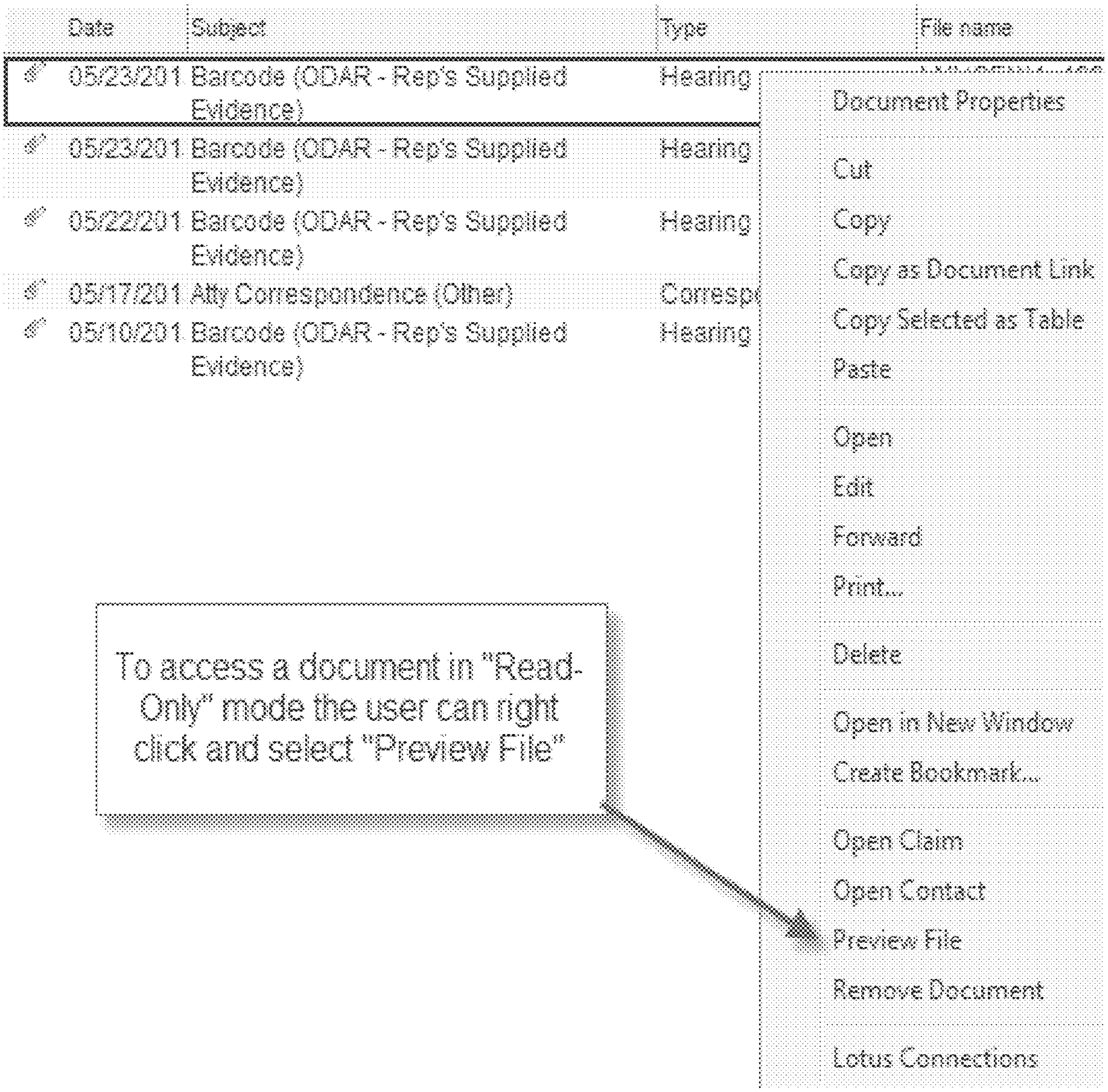
FIG. 200 is a screen shot of a File Directory.
Figure 201:
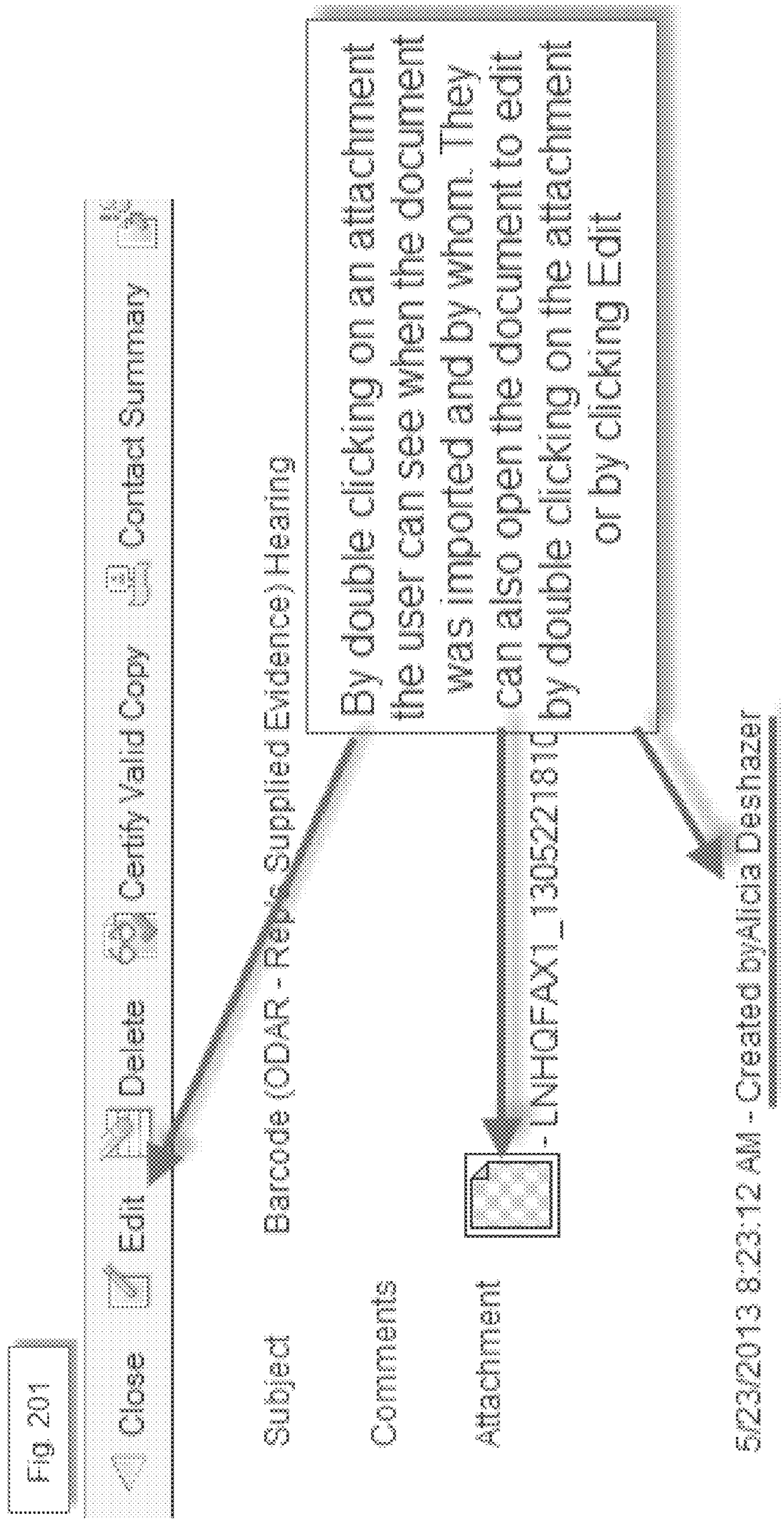
FIG. 201 is a screen shot of a File Directory.
Figure 202B:
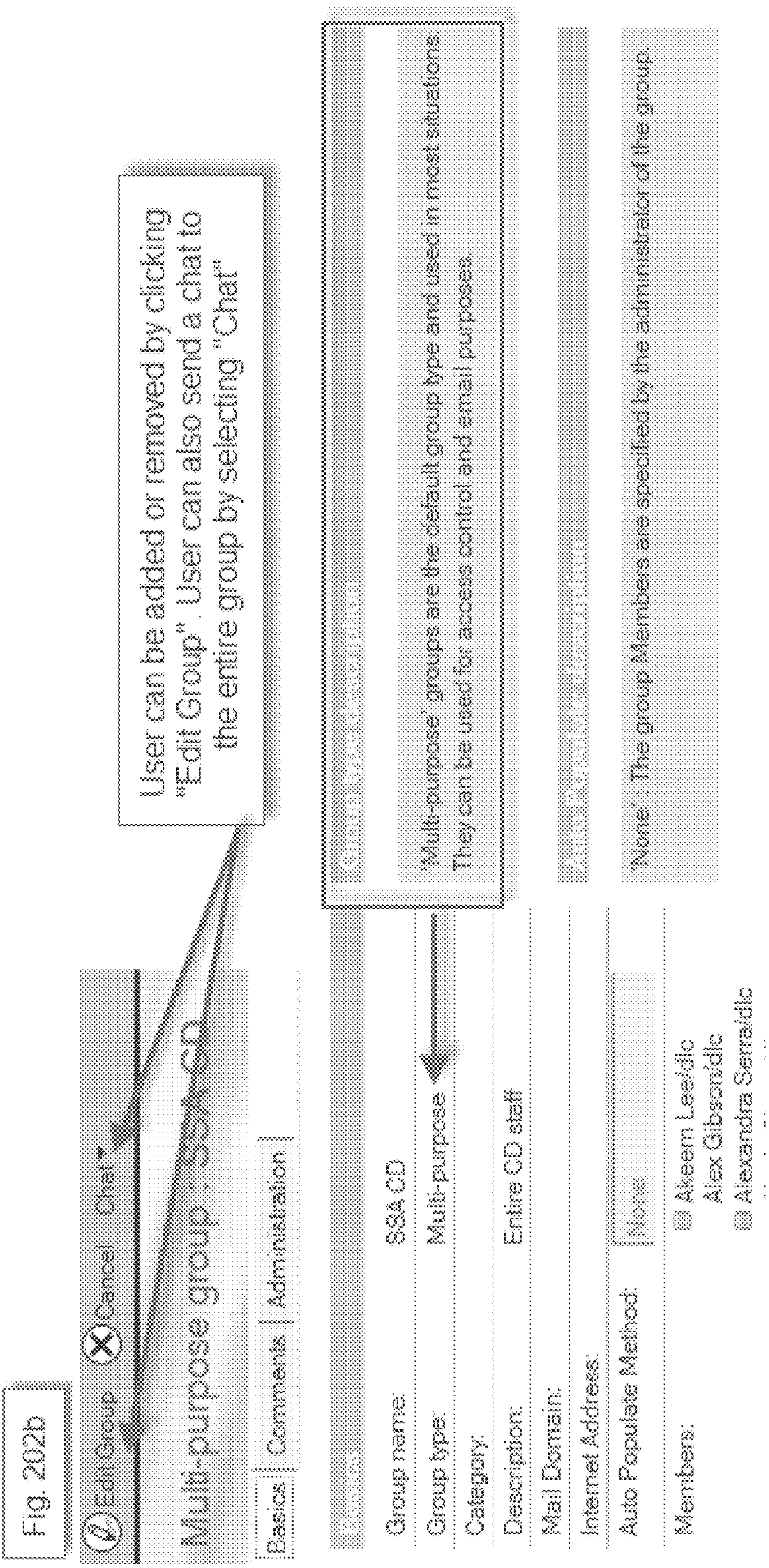
Figure 203A:
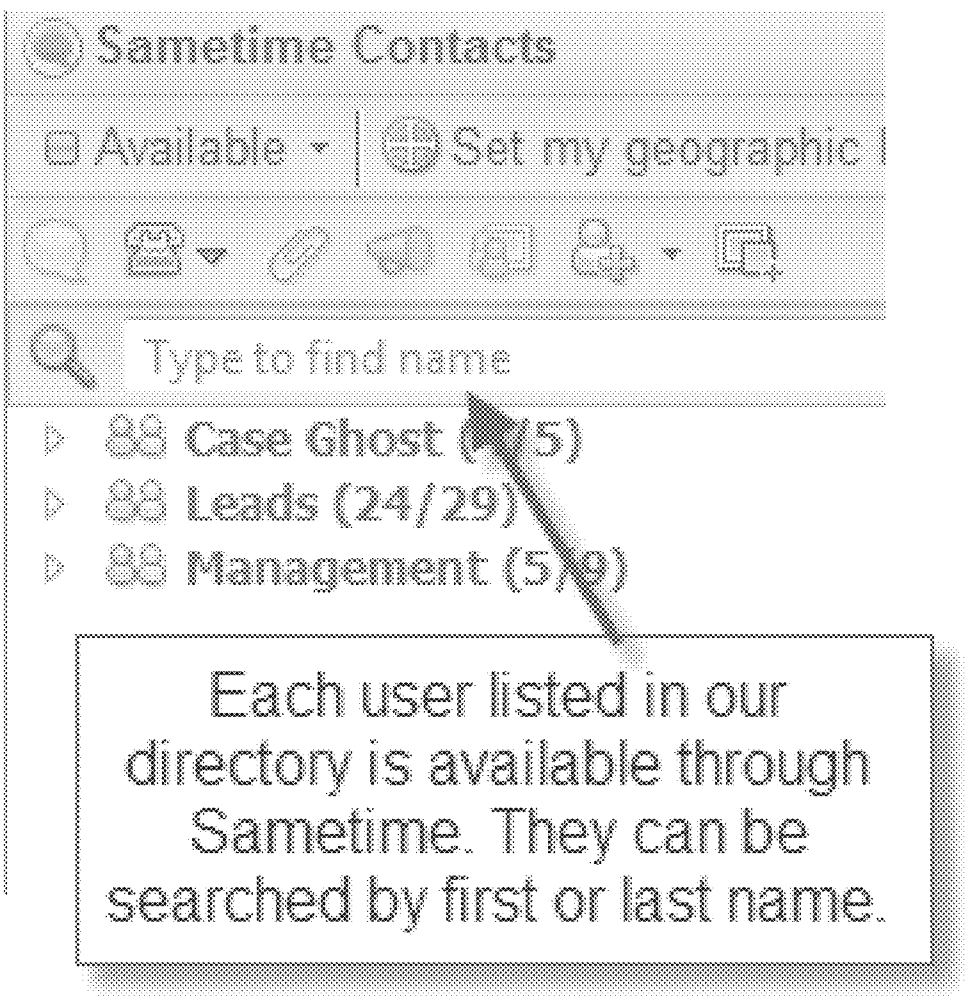
FIGS. 203a-203b are a screen shot of the Bulletin Board IM.
Figure 203B:
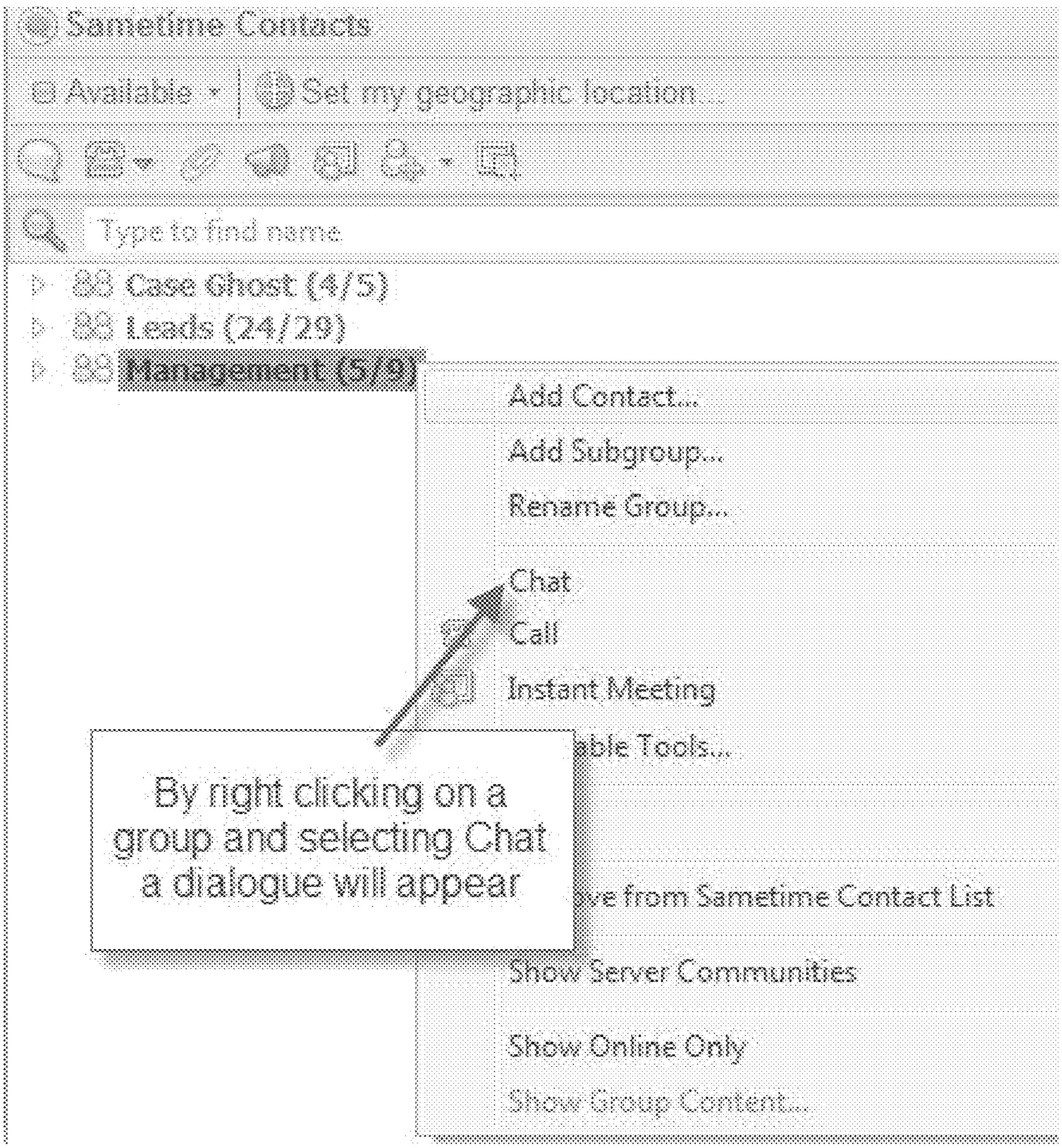
Figure 204A:
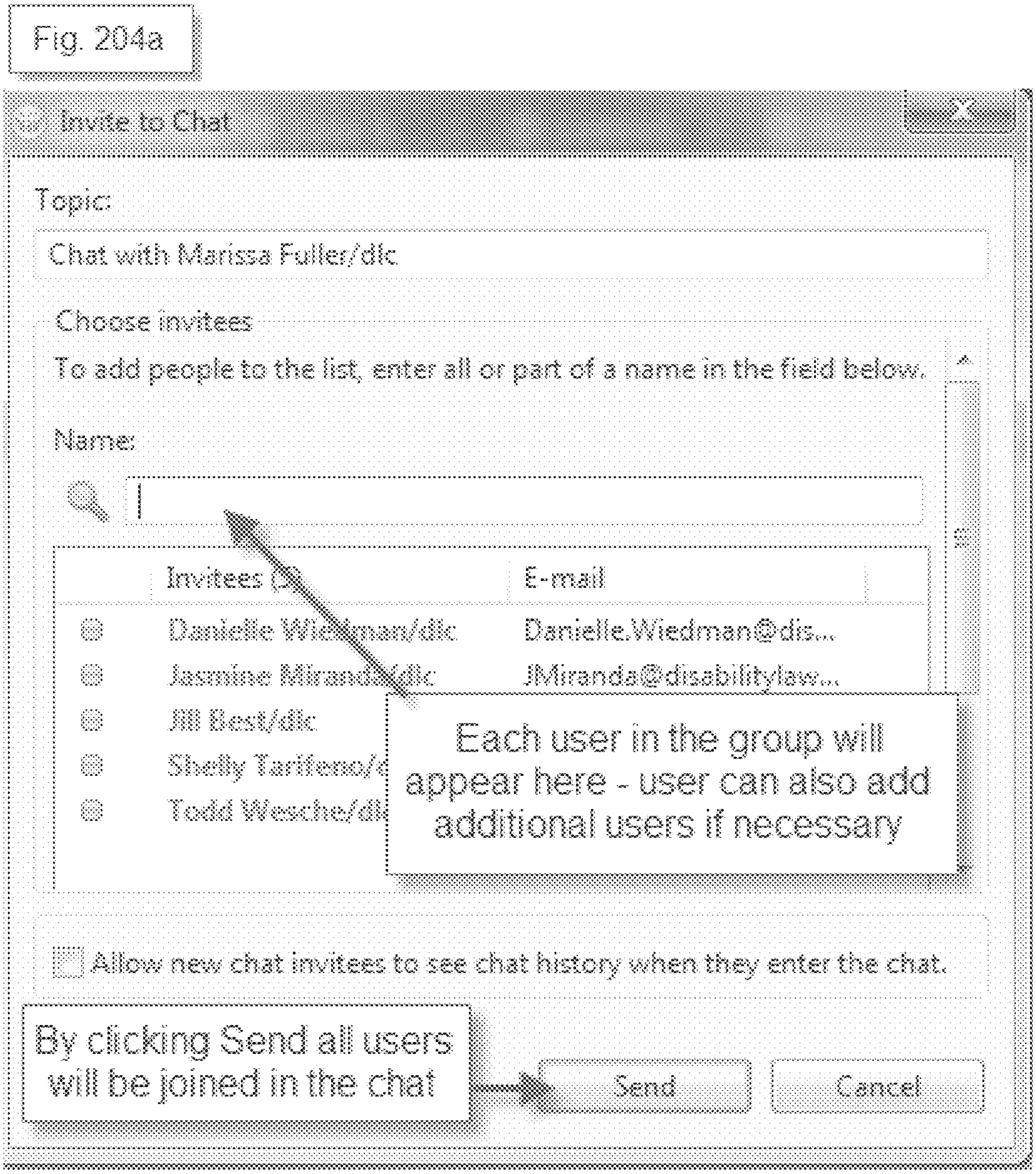
FIGS. 204a-204b are a screen shot of the Bulletin Board IM.
Figure 204B:
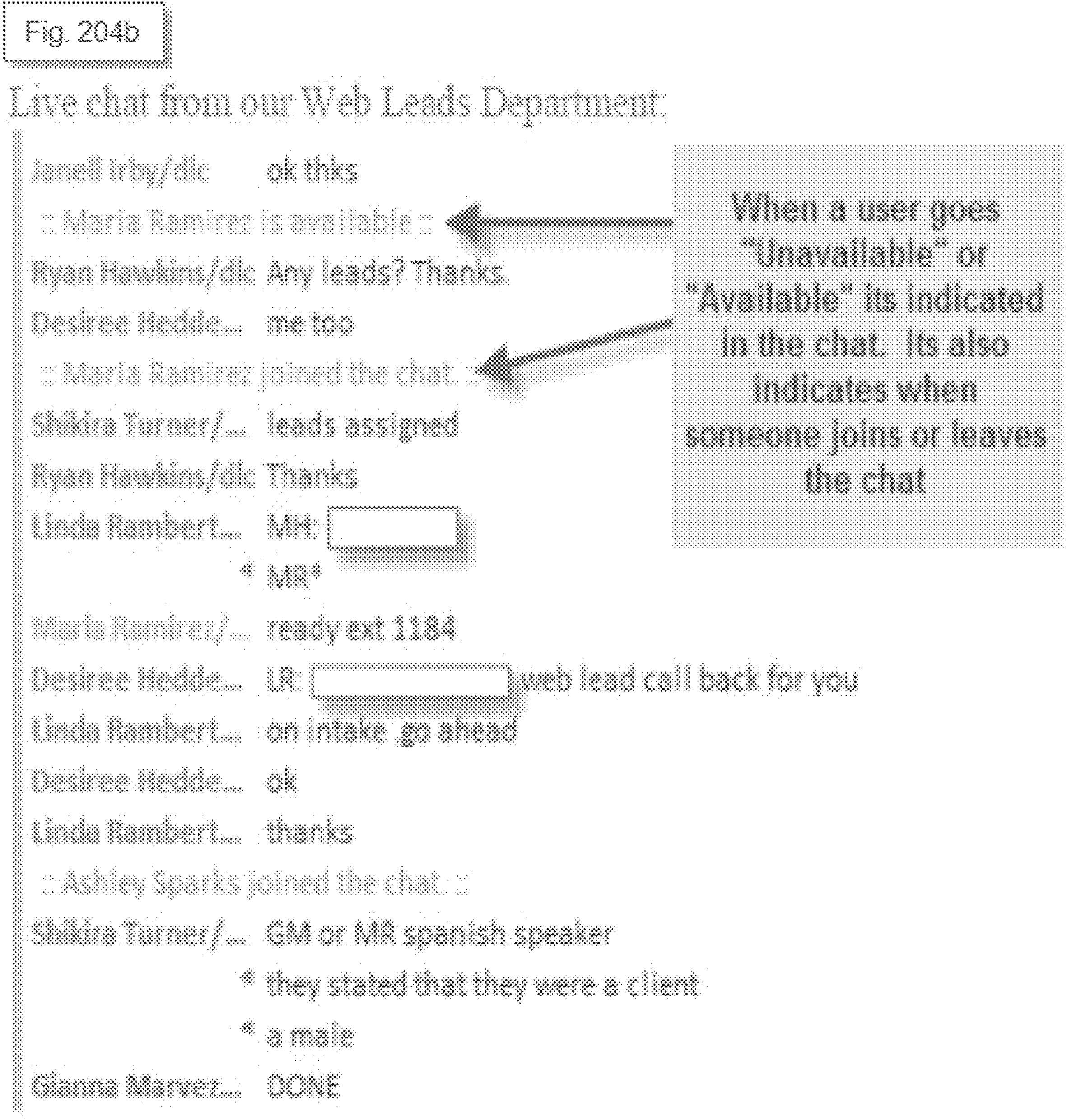
Figure 205A:
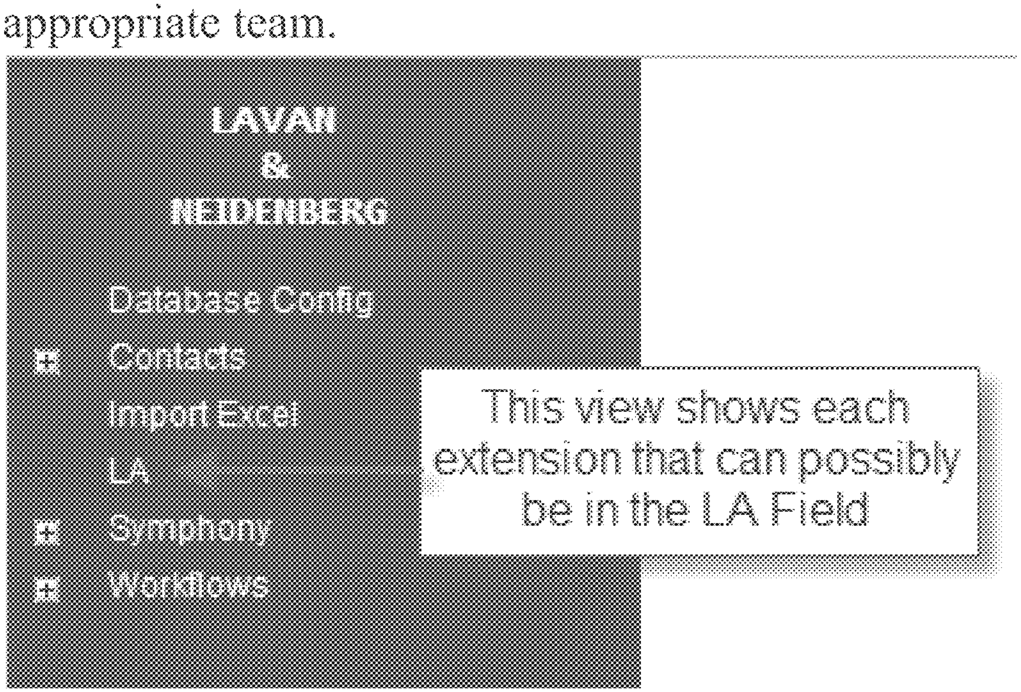
FIGS. 205a-205b are a screen shot of the LA Field.
Figure 205B:
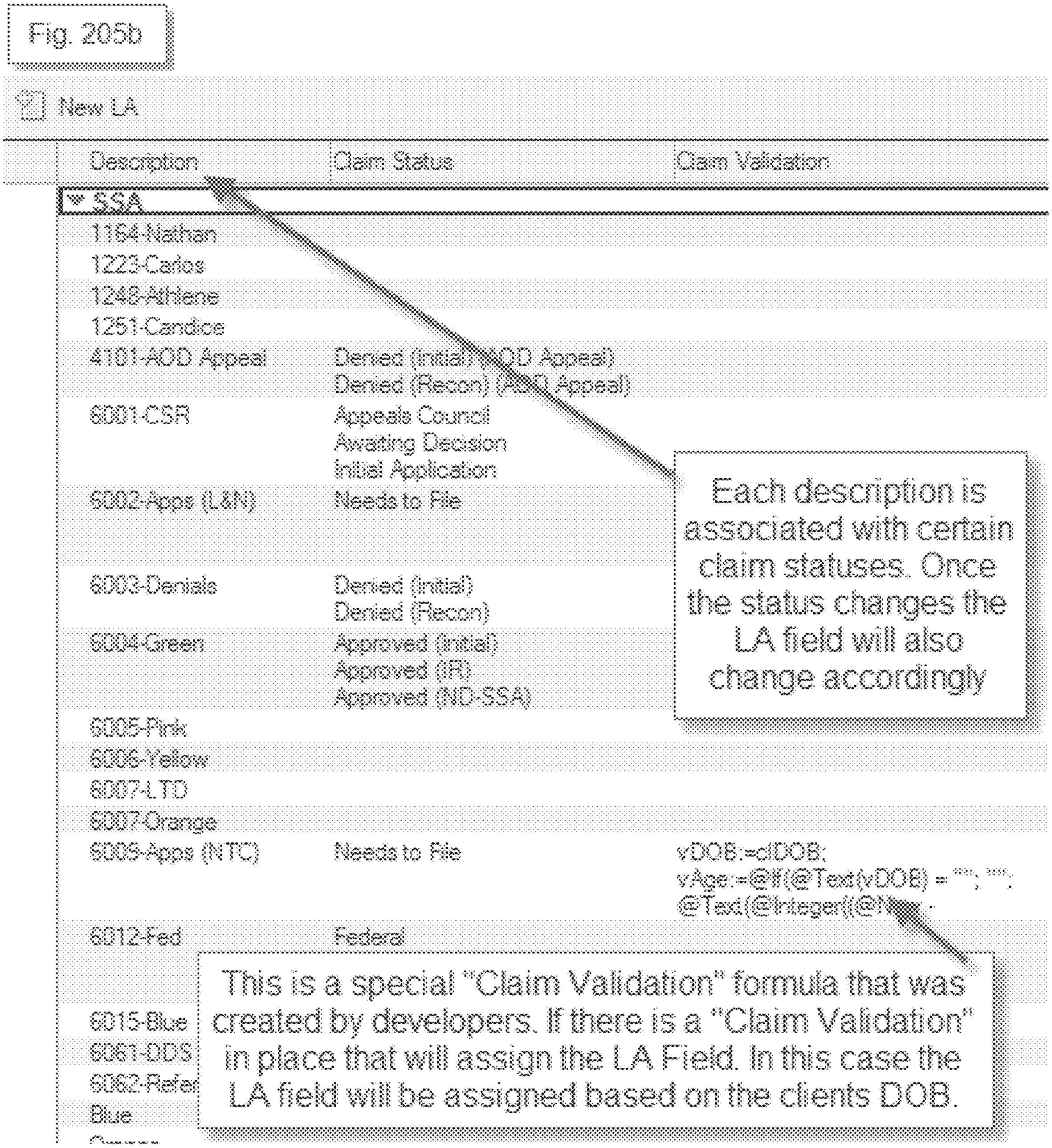
Figure 206:
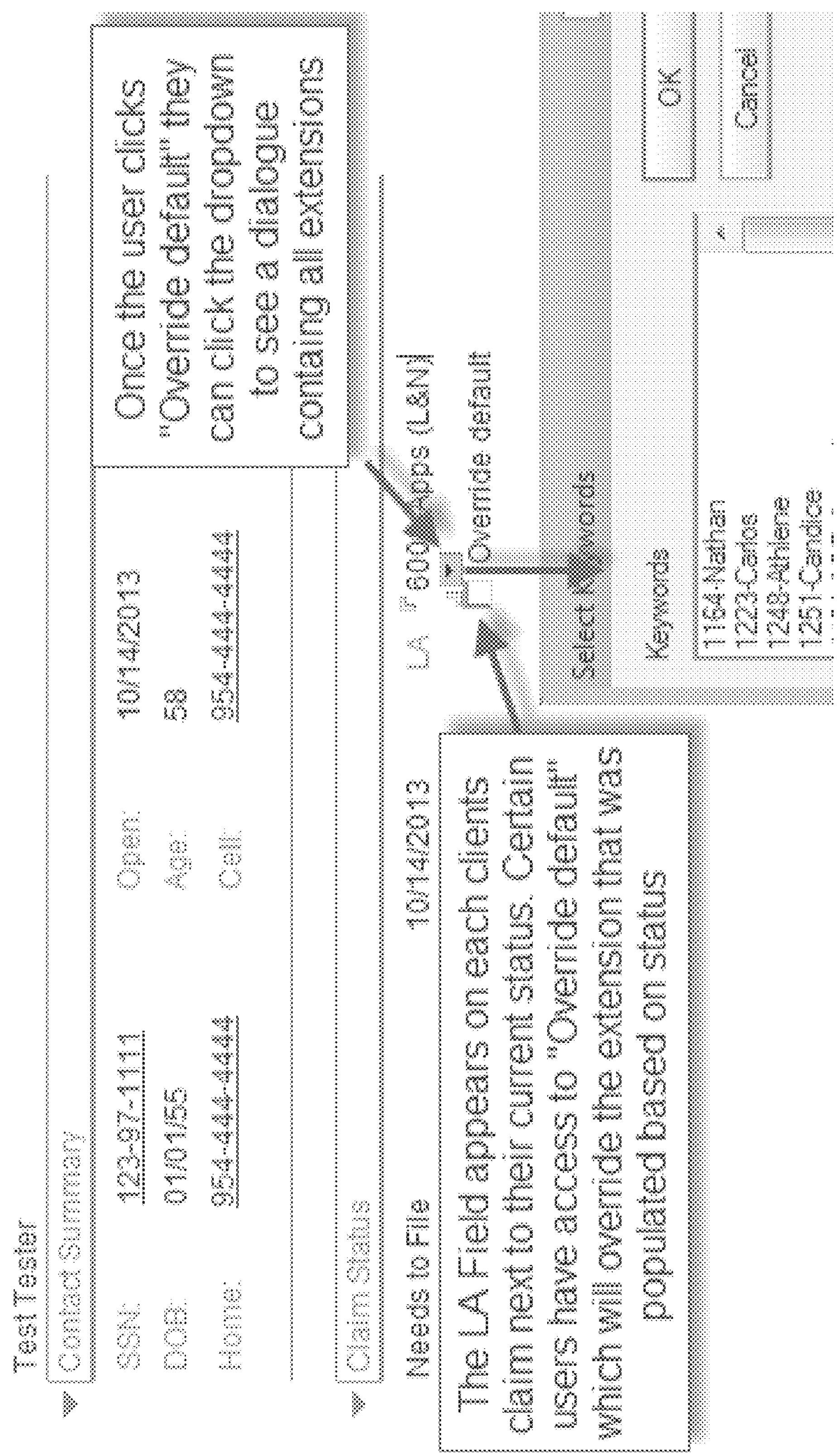
FIG. 206 is a screen shot of the LA Field.
Figure 207A:
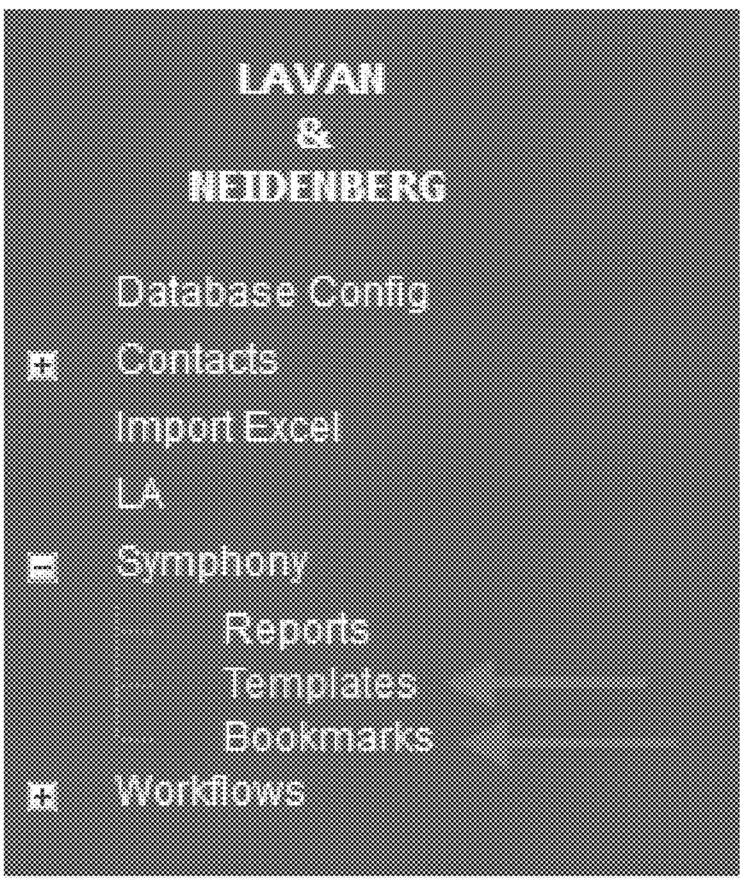
FIGS. 207a-207b are a screen shot of Symphony Templates and Bookmarks.
Figure 207B:
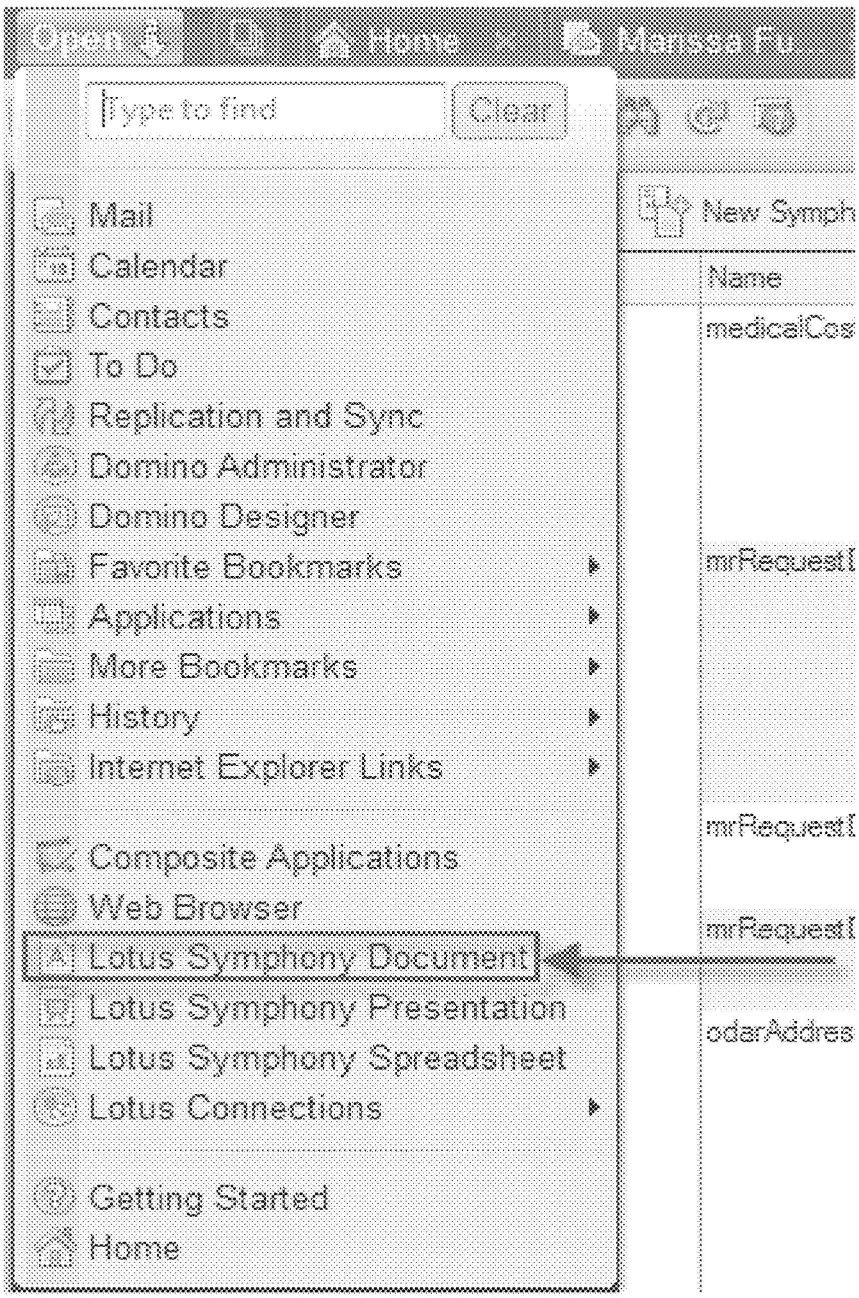
Figure 208A:
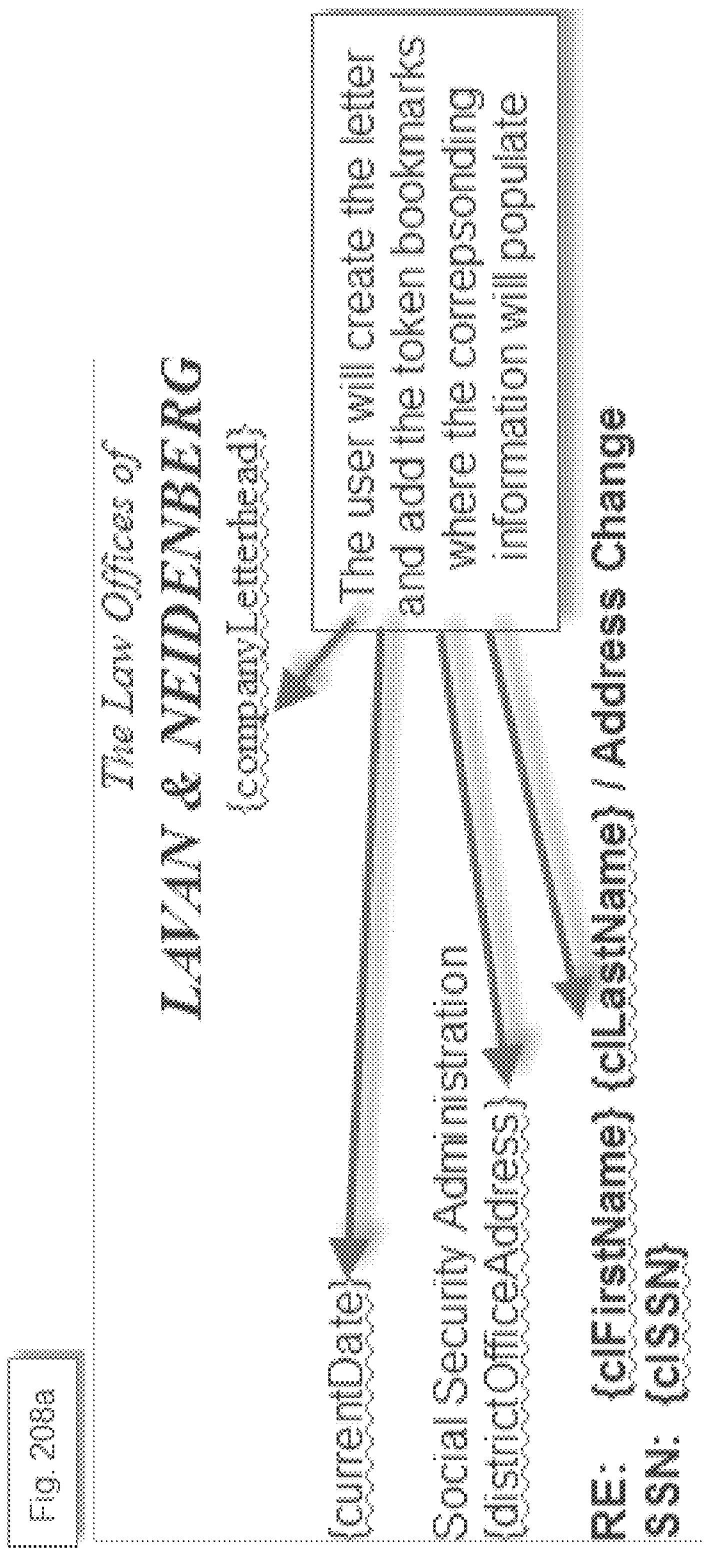
Figure 209A:
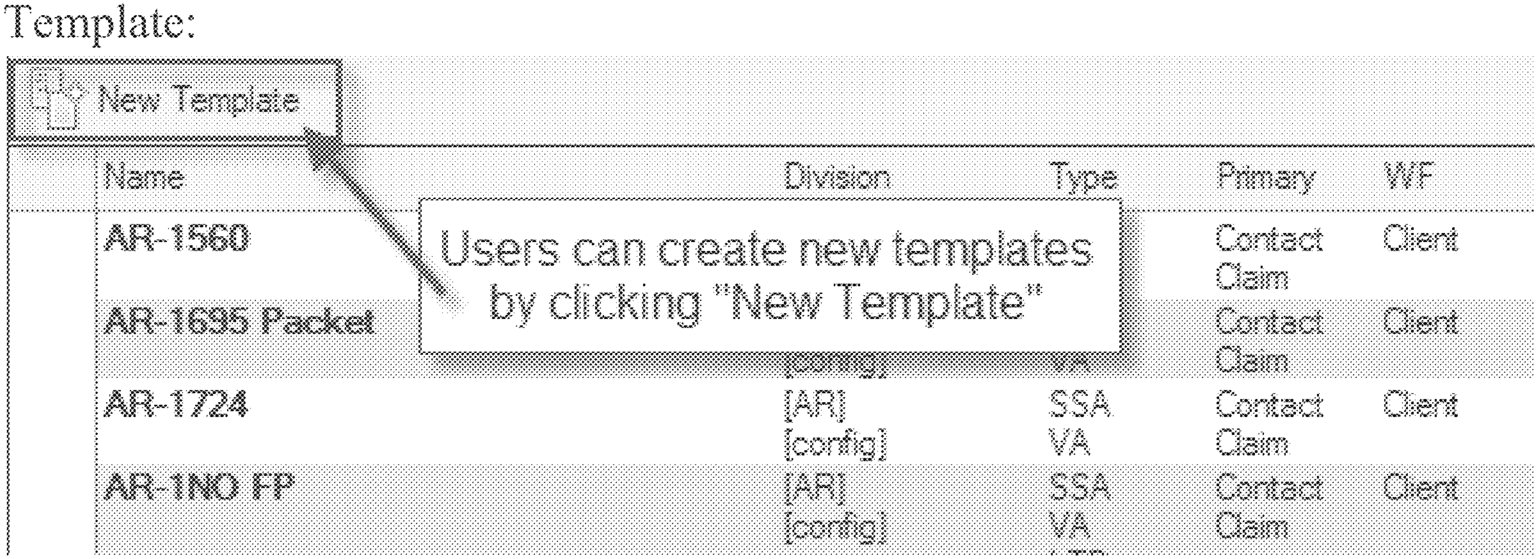
FIGS. 209a-209b are a screen shot of Symphony Templates and Bookmarks.
Figure 209B:
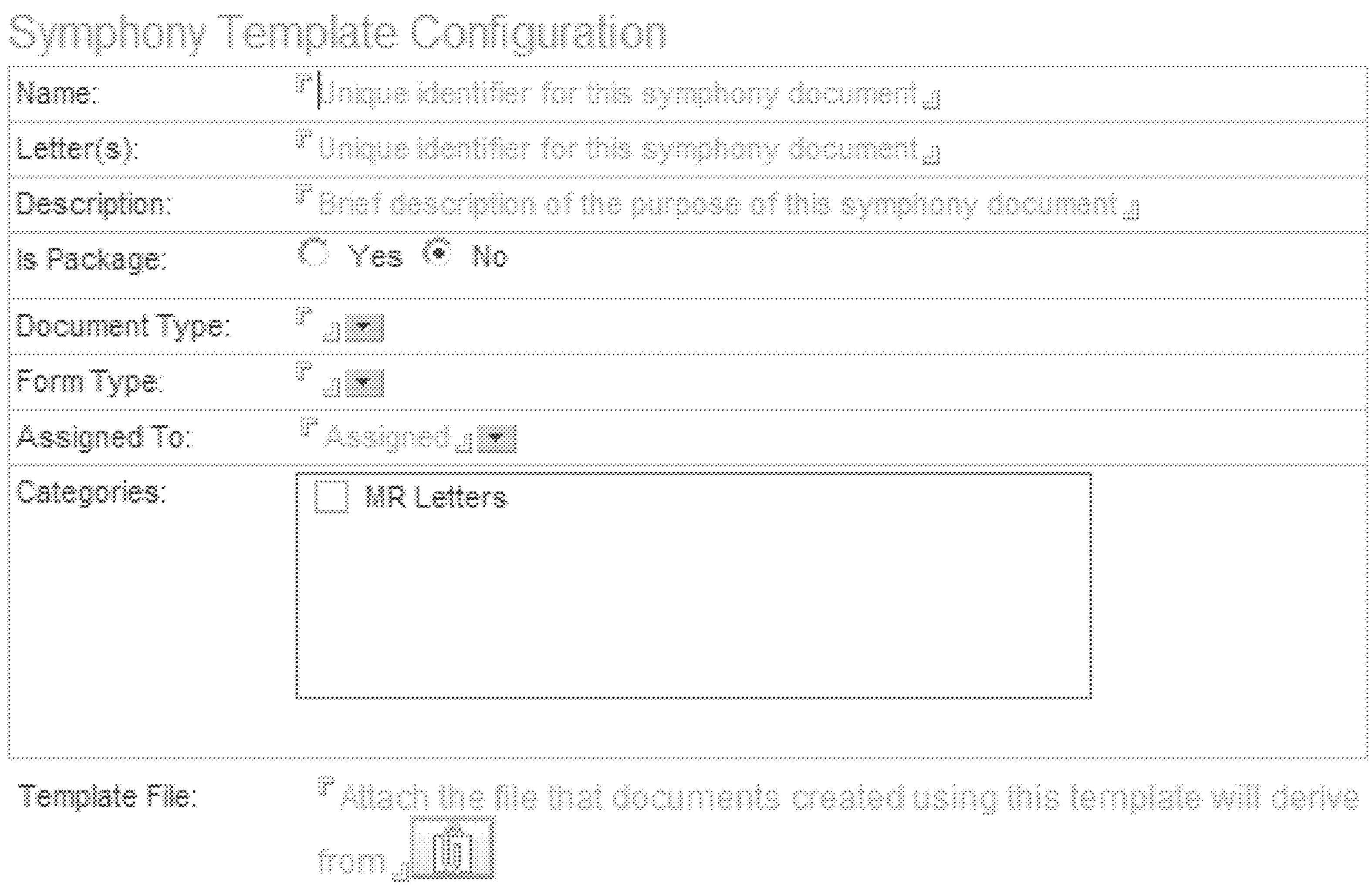
Figure 210A:
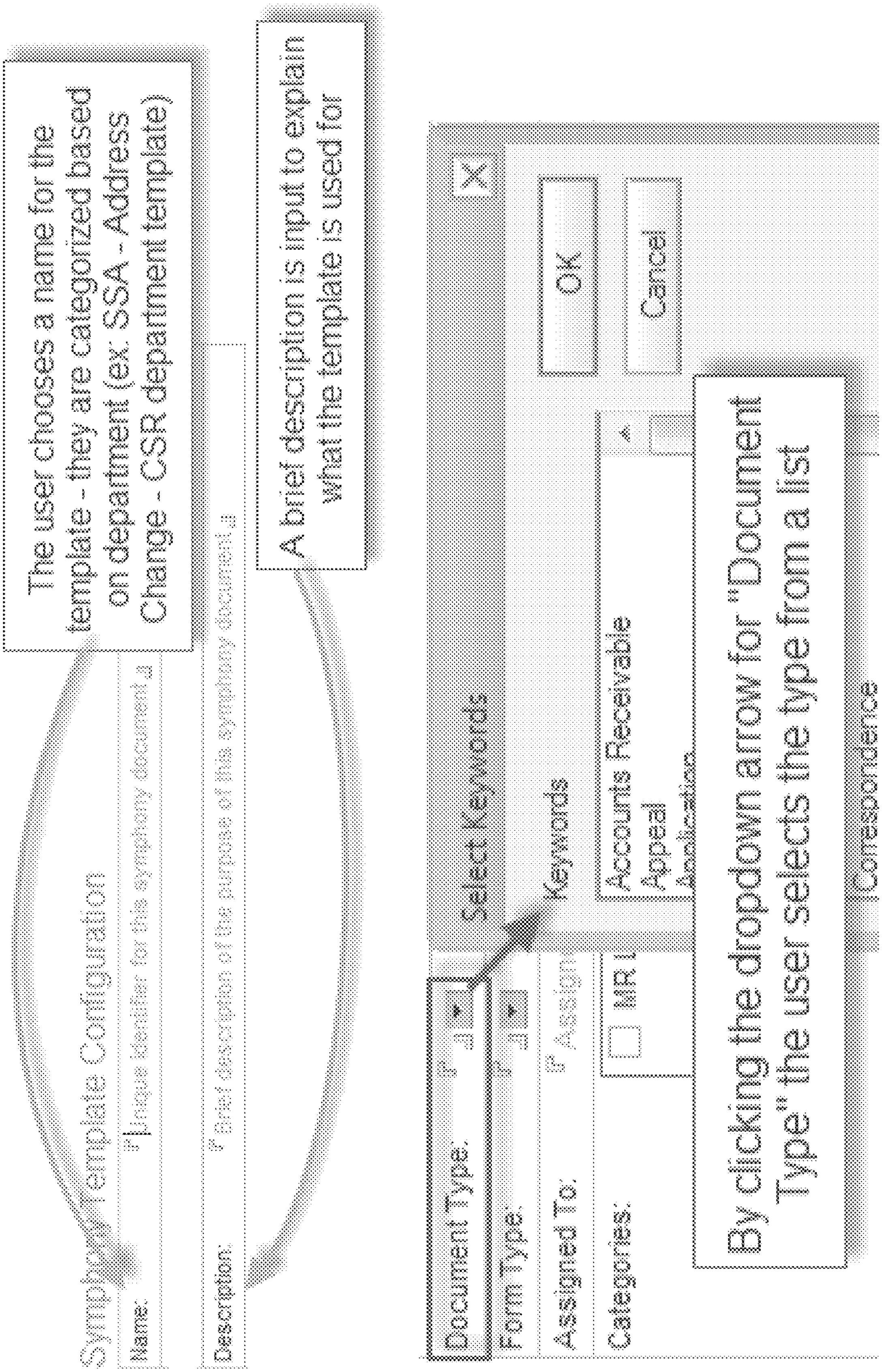
FIGS. 210a-210b are a screen shot of Symphony Templates and Bookmarks.
Figure 210B:
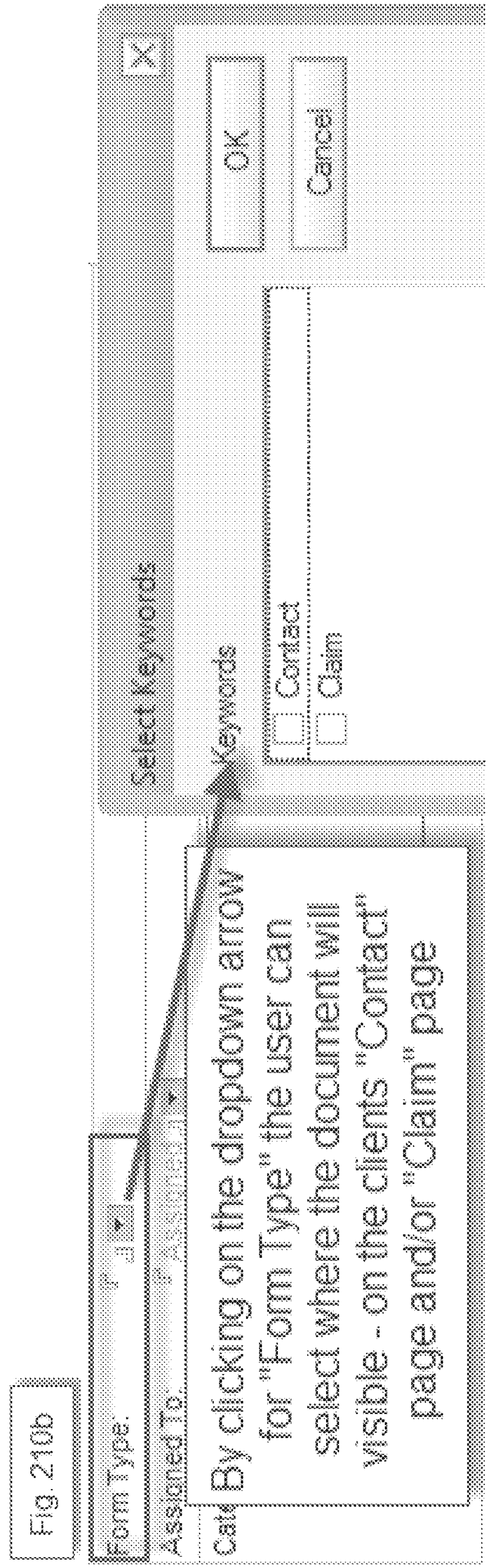
Figure 211A:
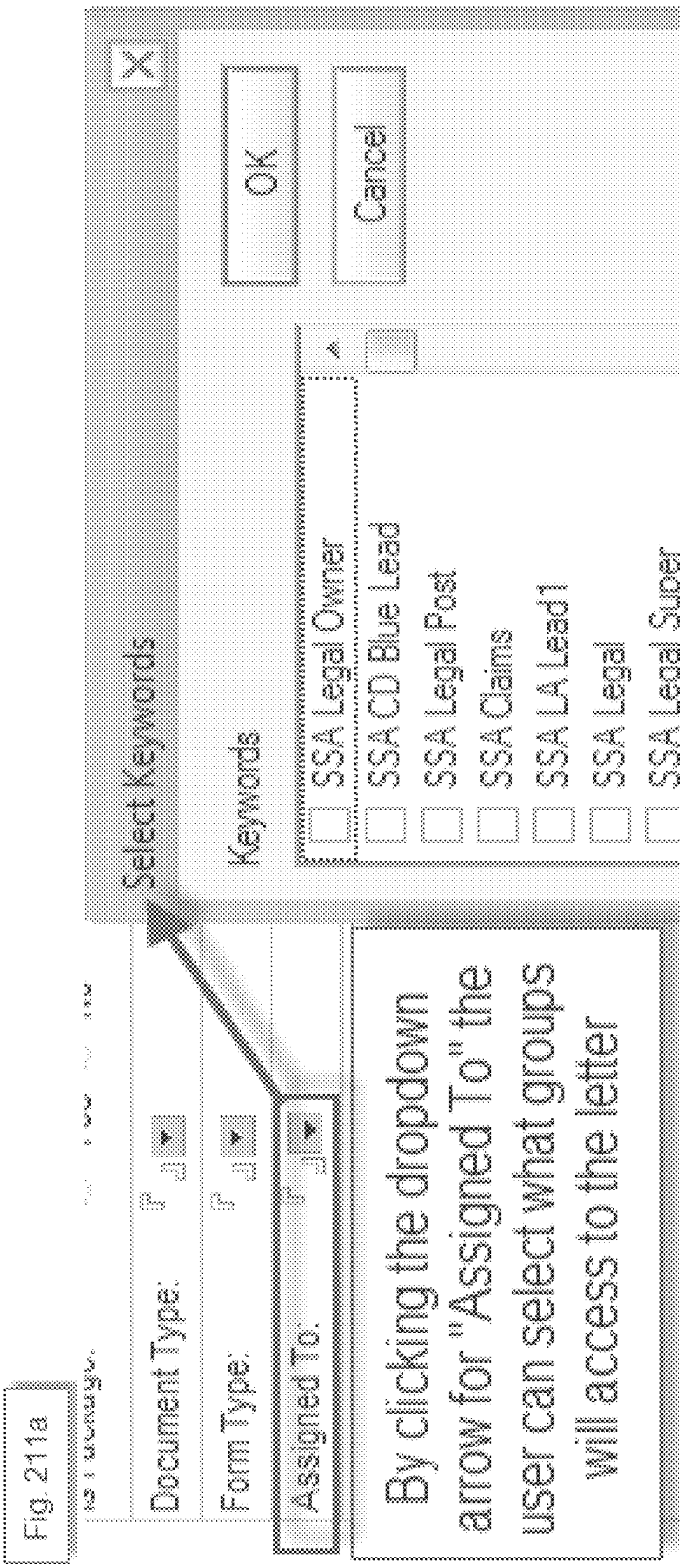
FIGS. 211a-211c are a screen shot of Symphony Templates and Bookmarks.
Figure 211B:
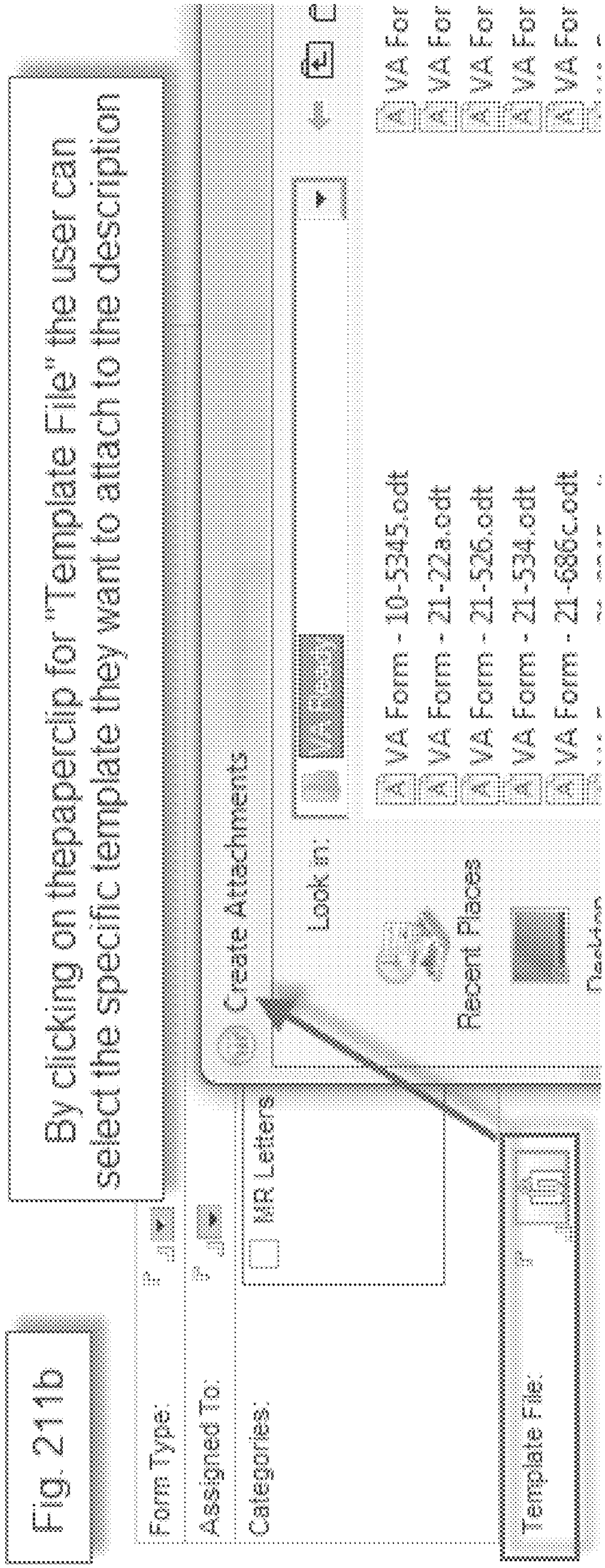
Figure 211C:
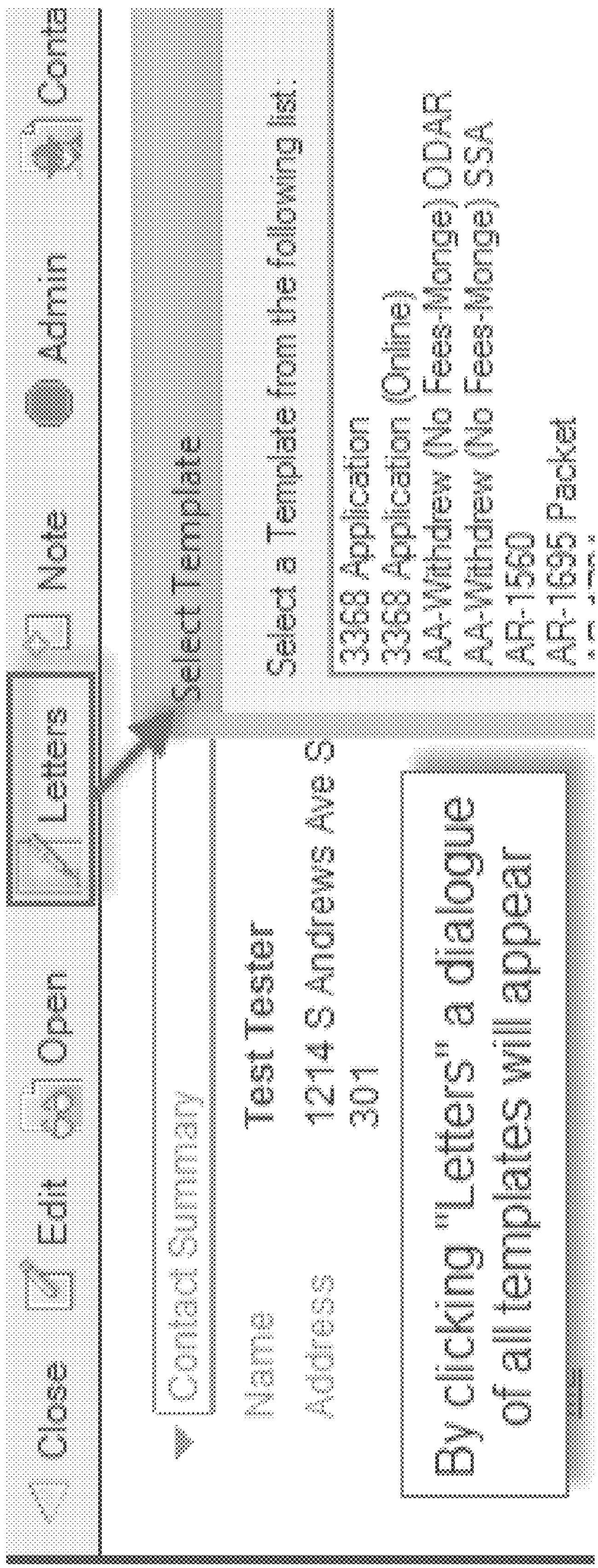
Figure 212A:
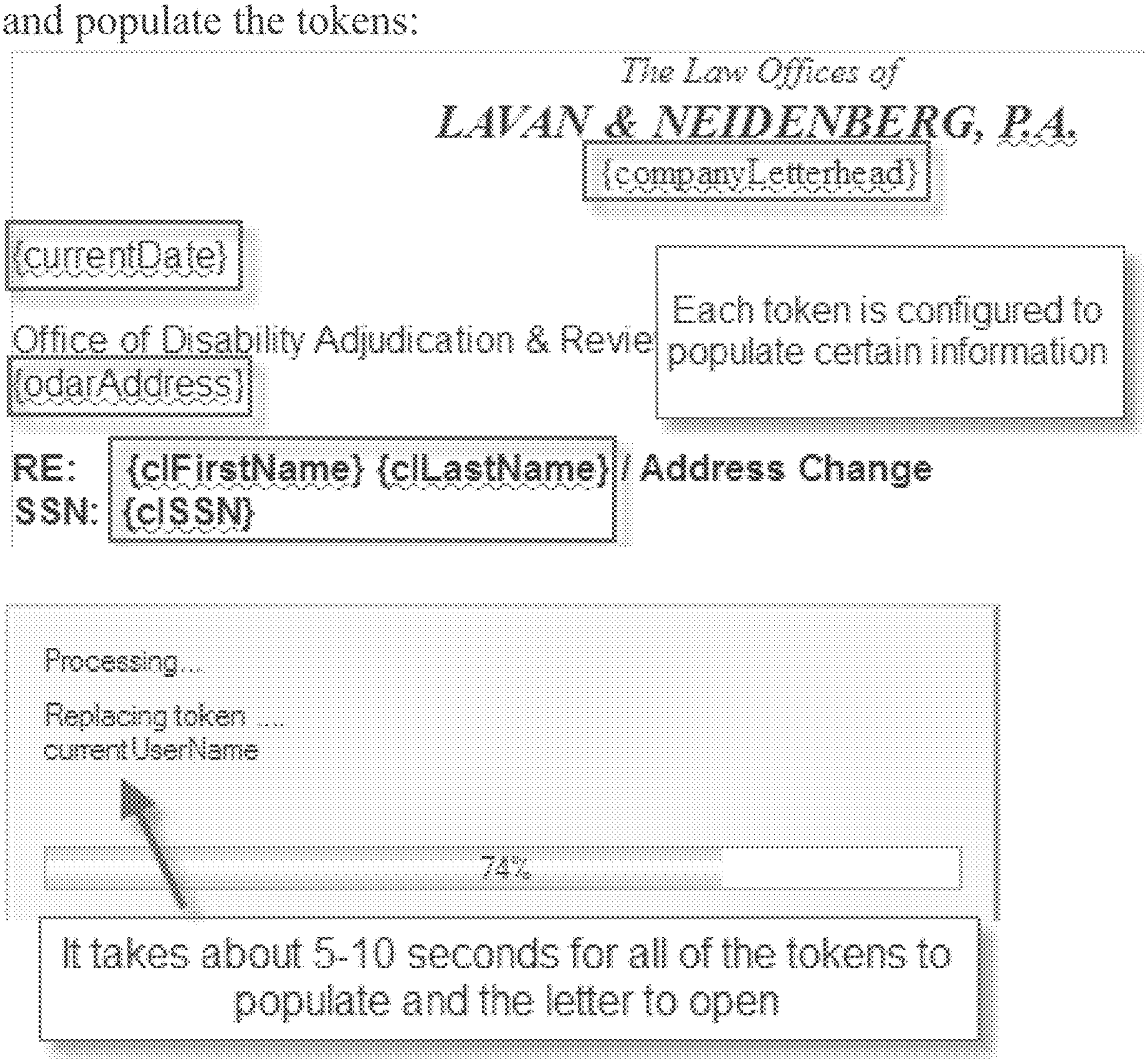
Figure 213:
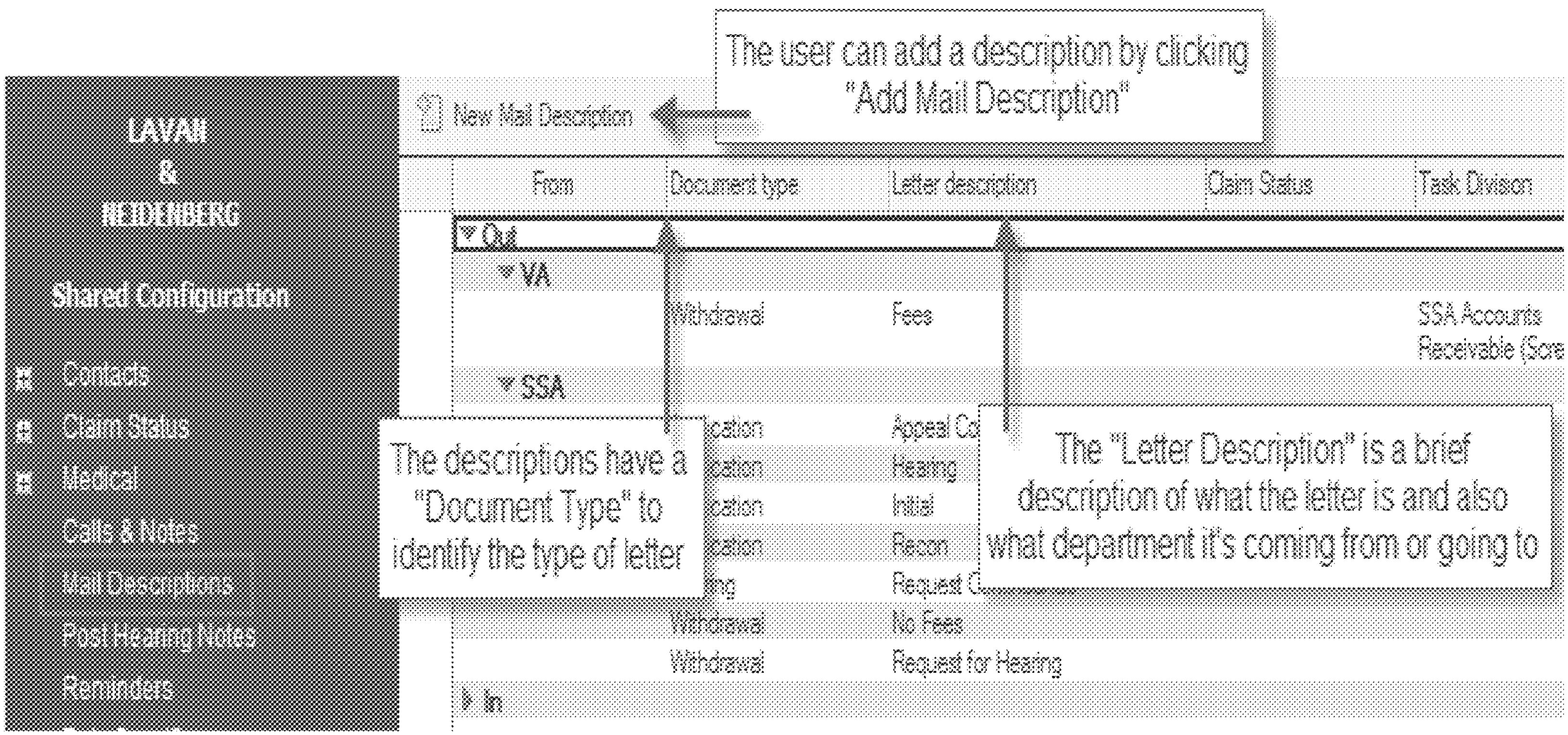
FIG. 213 is a screen shot of Mail Description pages.
Figure 214A:
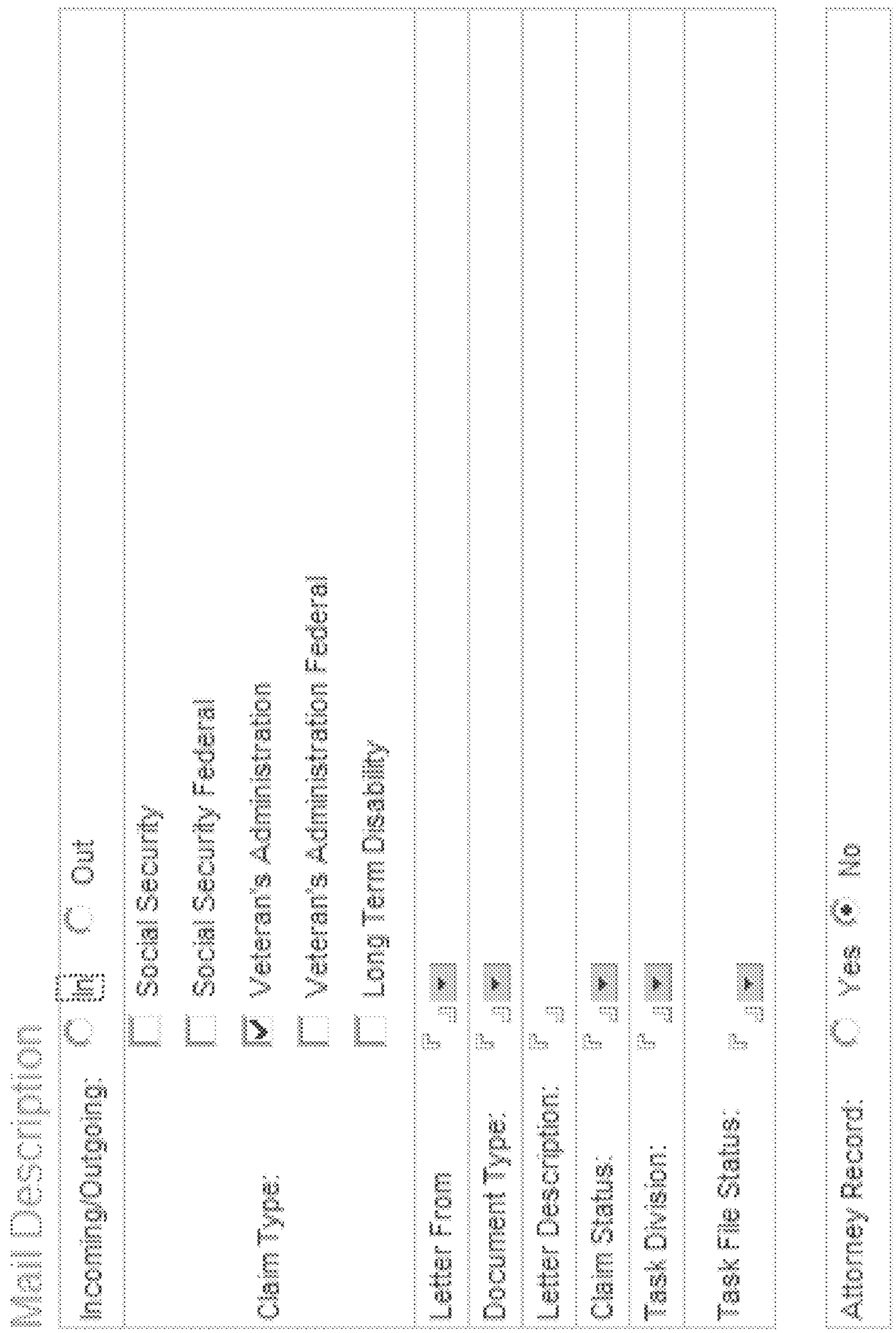
FIGS. 214a-214b are a screen shot of Mail Descriptions pages.
Figure 214B:
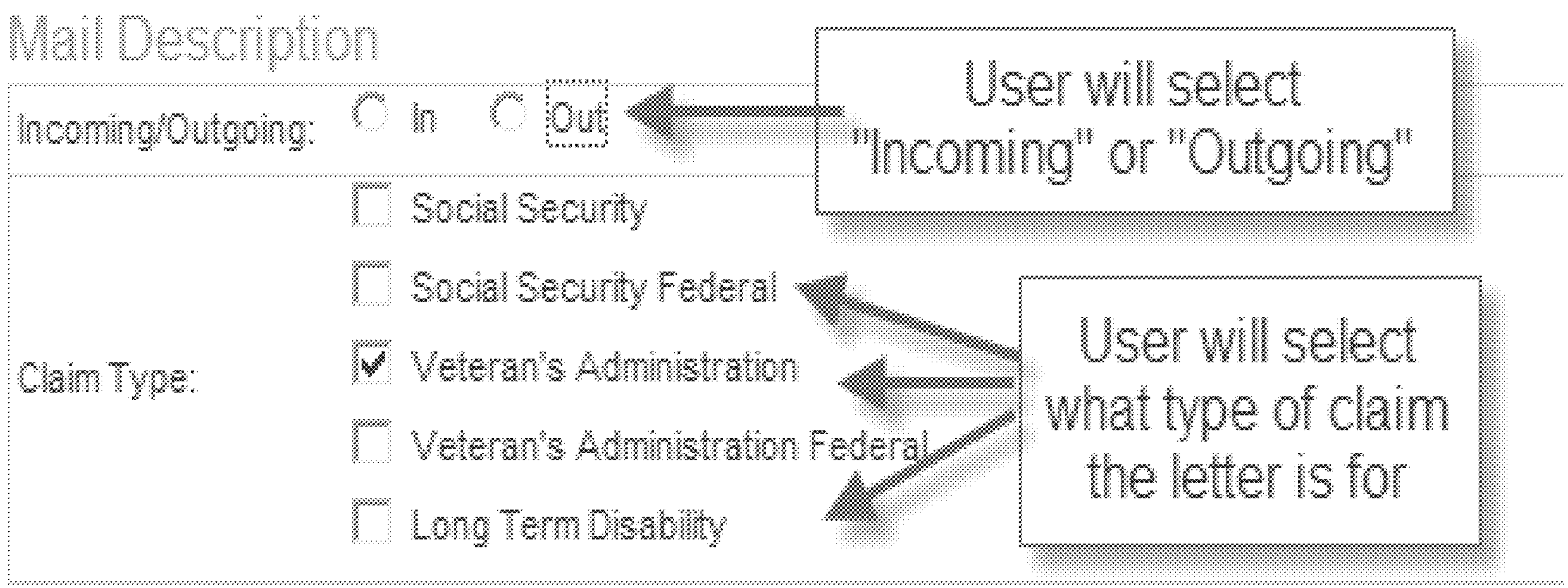
Figure 215A:
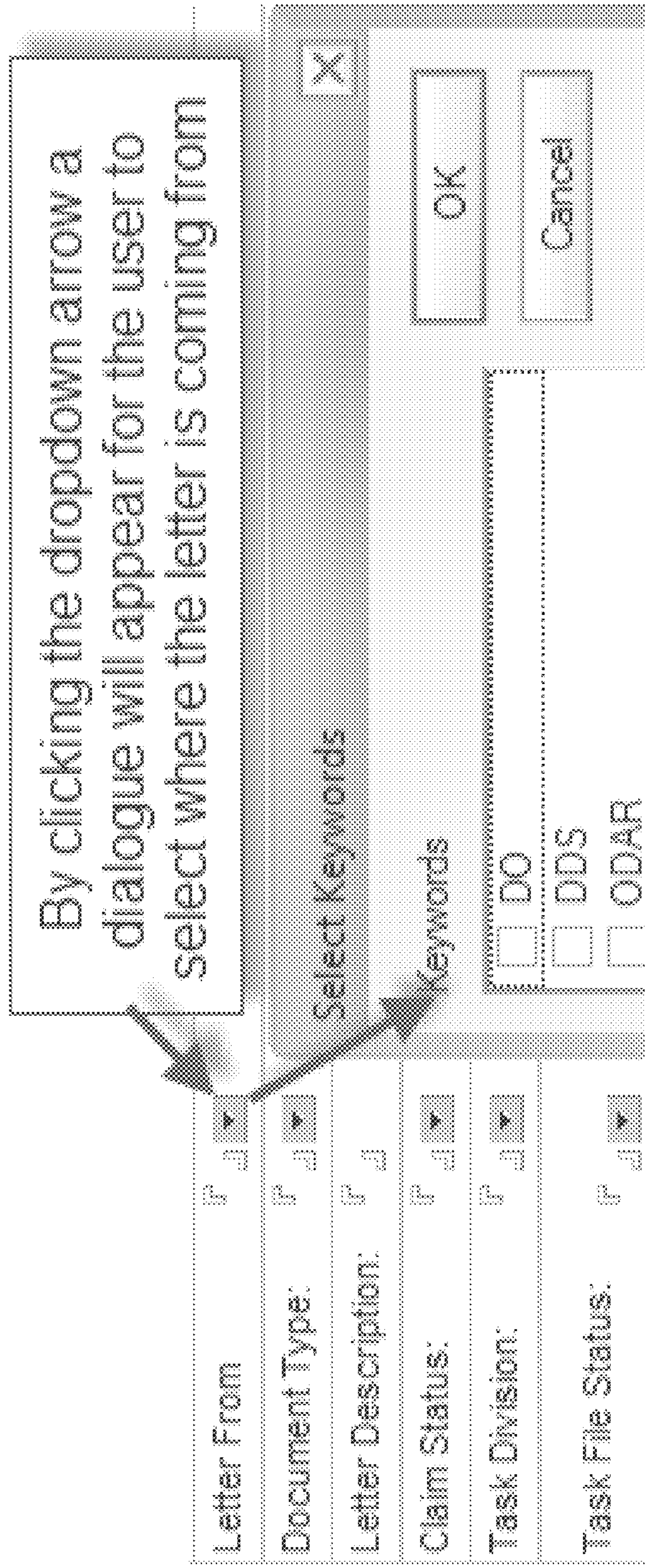
FIGS. 215a-215c are a screen shot of Mail Descriptions pages.
Figure 215B:
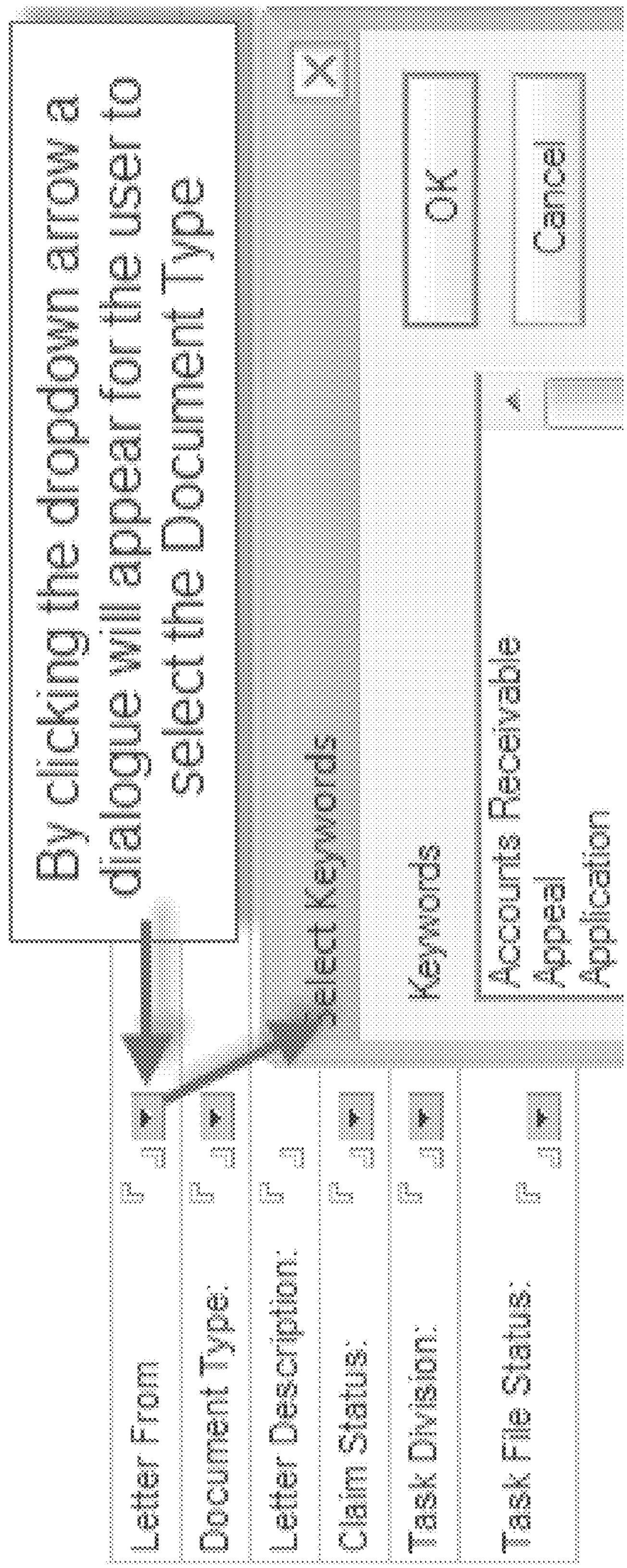
Figure 215C:
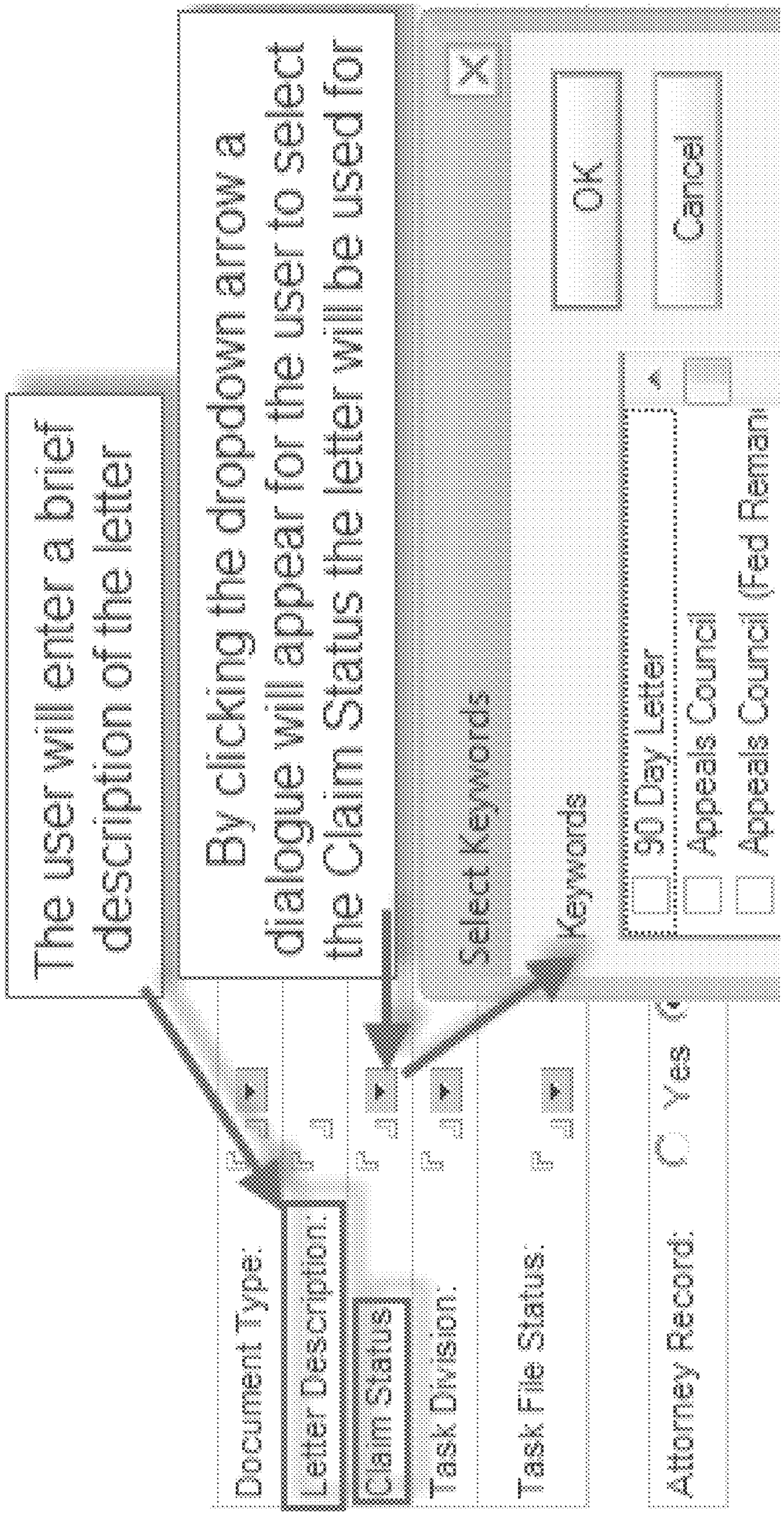
Figure 217:
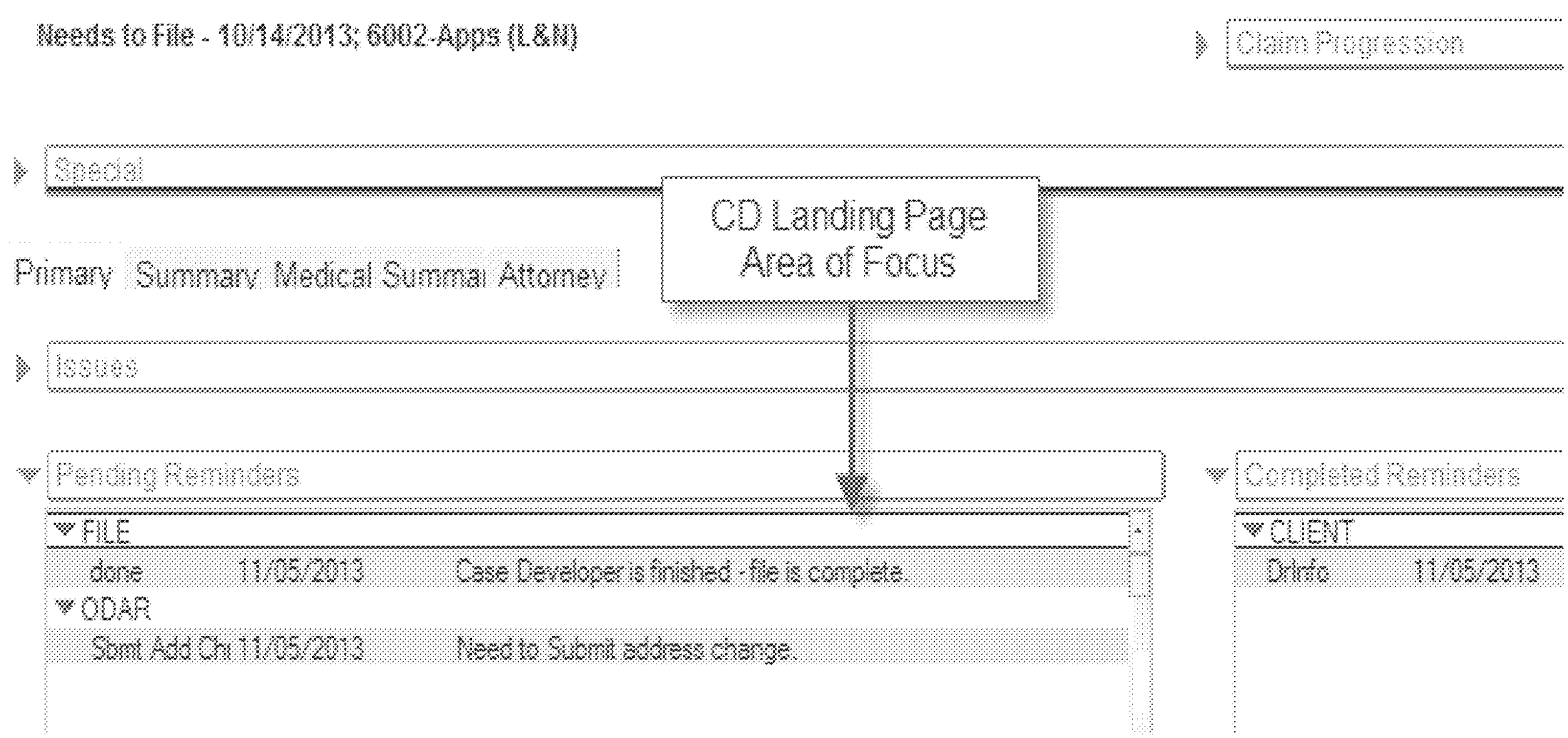
FIG. 217 is a screen shot of Reminder pages.
Figure 218:
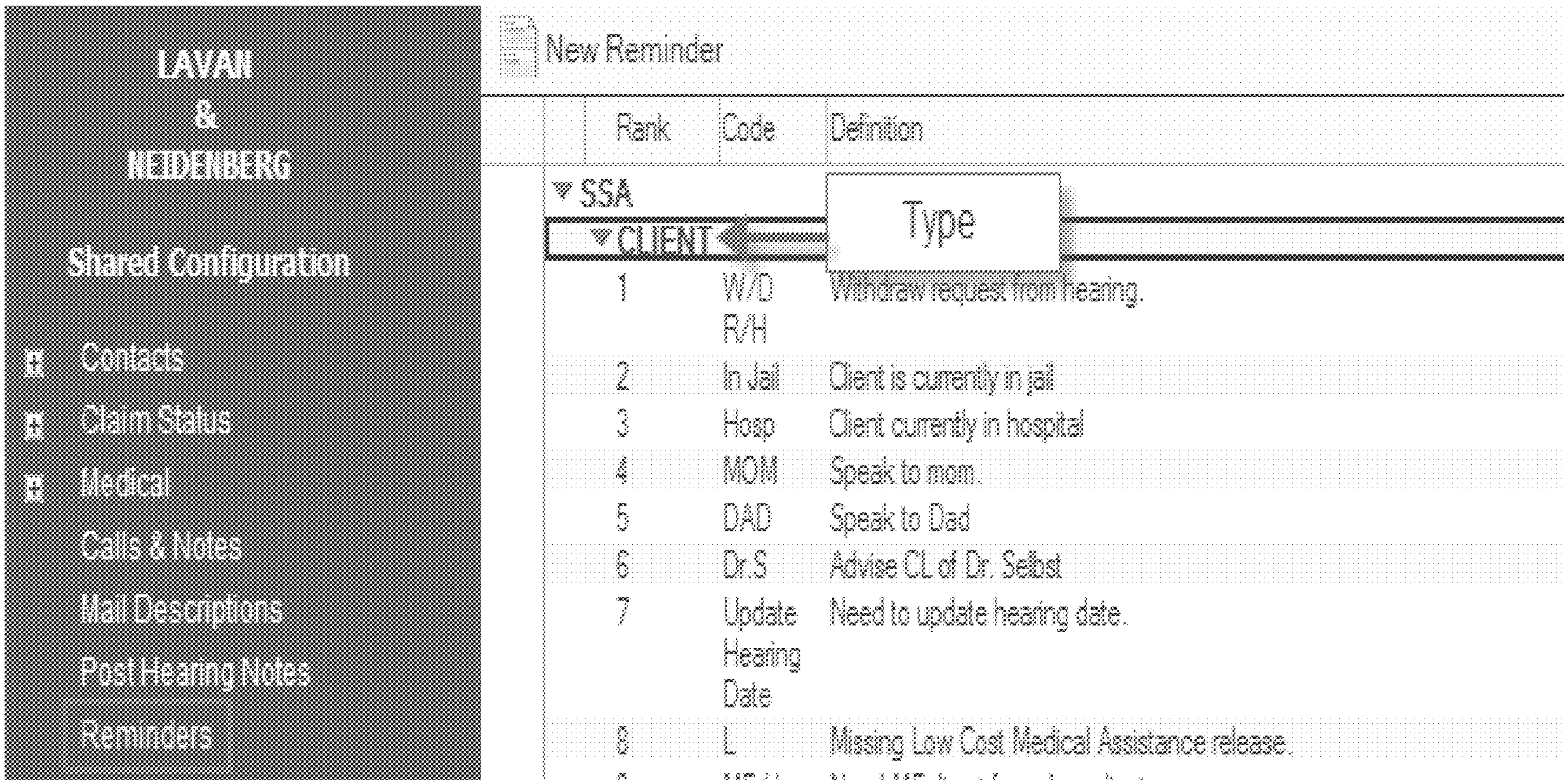
FIG. 218 is a screen shot of Reminder pages.
Figure 219A:
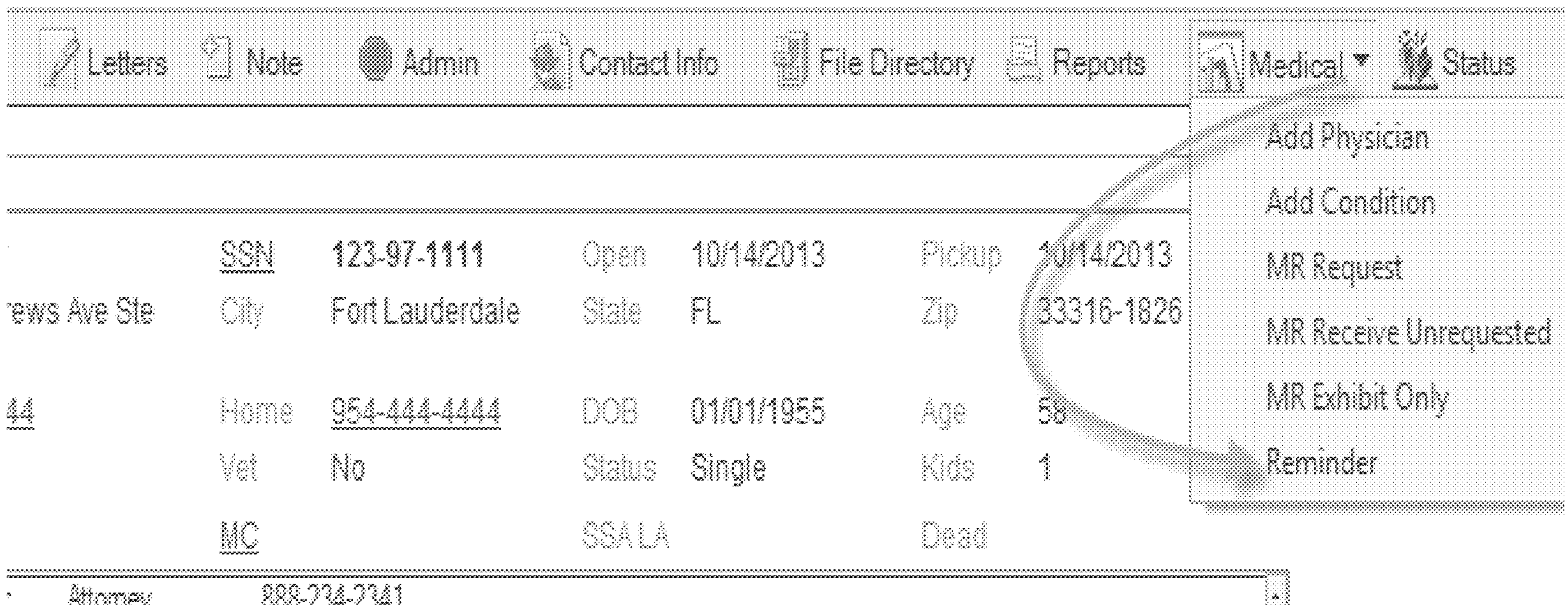
FIGS. 219a-219d are a screen shot of Reminder pages.
Figure 219B:
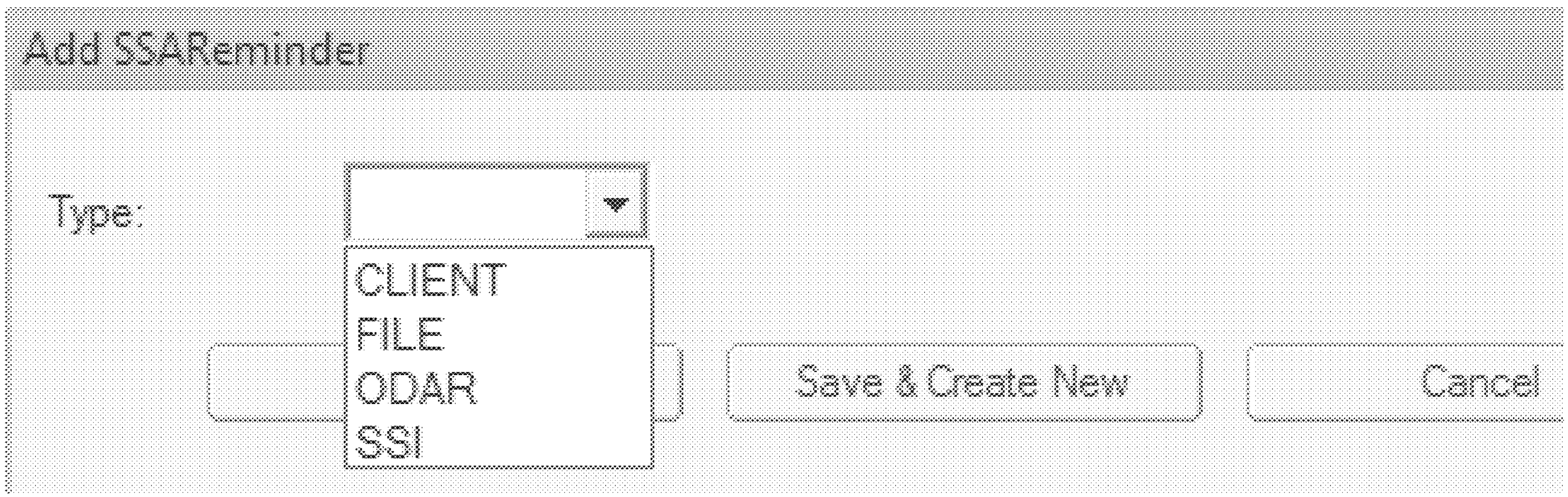
Figure 219C:
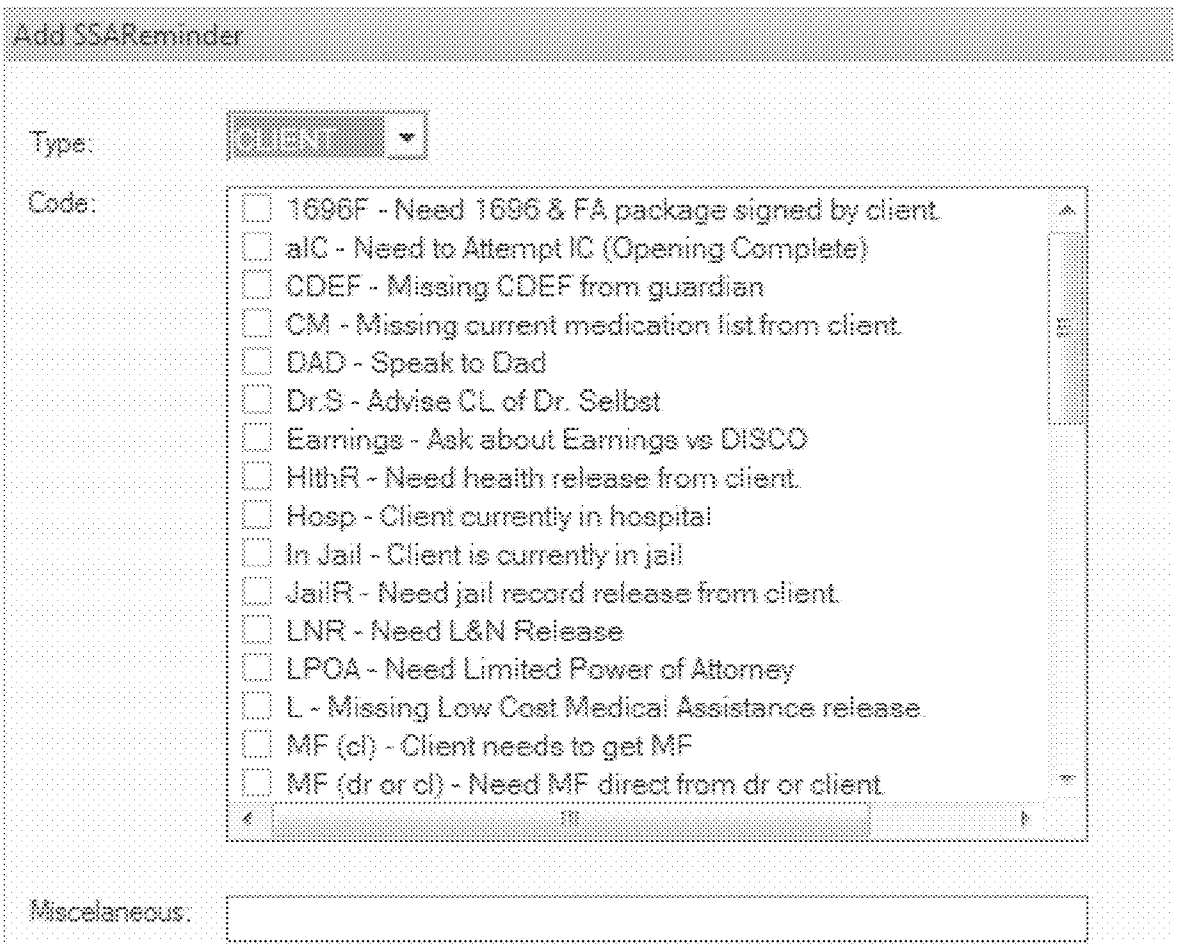
Figure 219D:
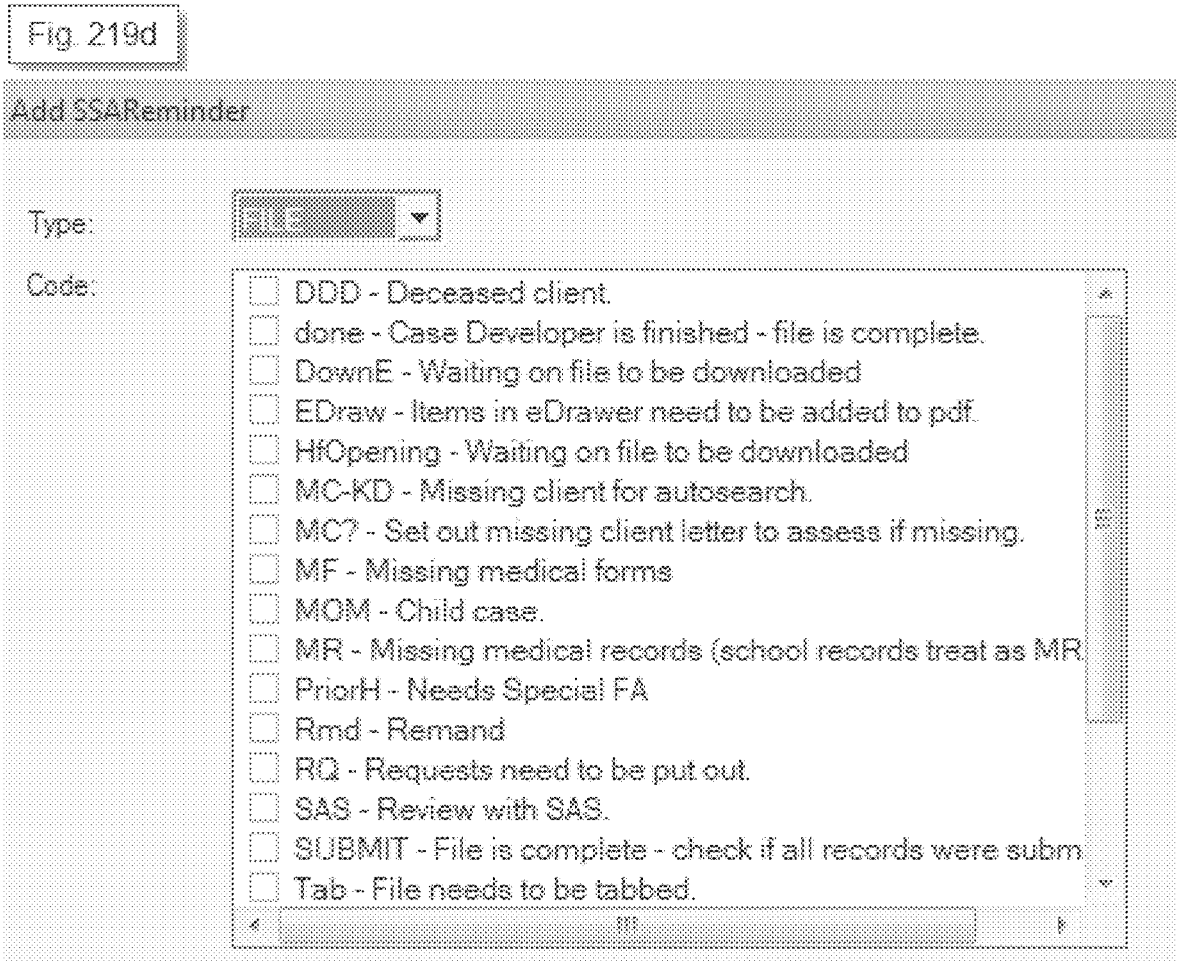
Figure 220A:
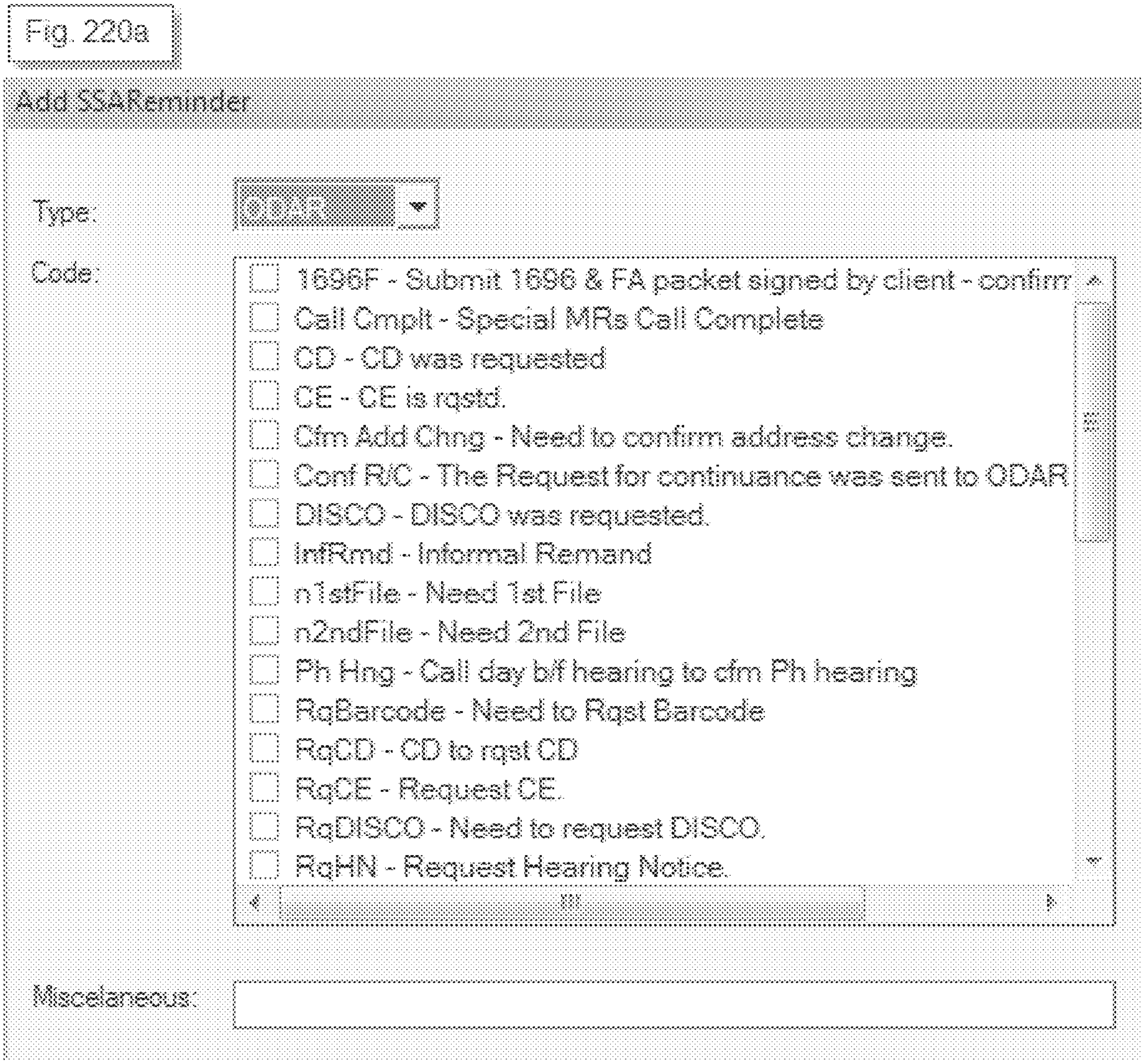
FIGS. 220a-220b are a screen shot of Reminder pages.
Figure 220B:
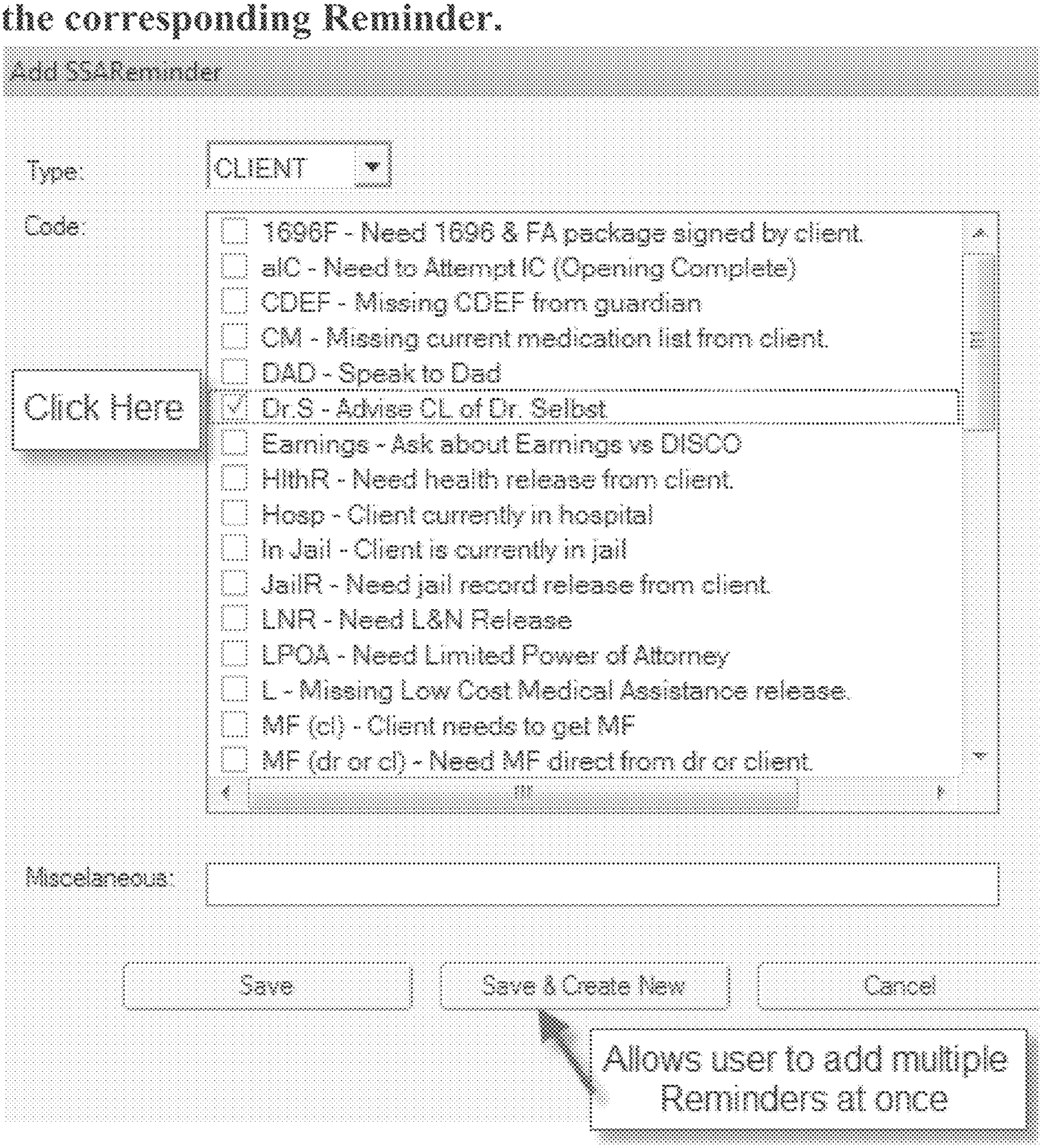
Figure 221A:
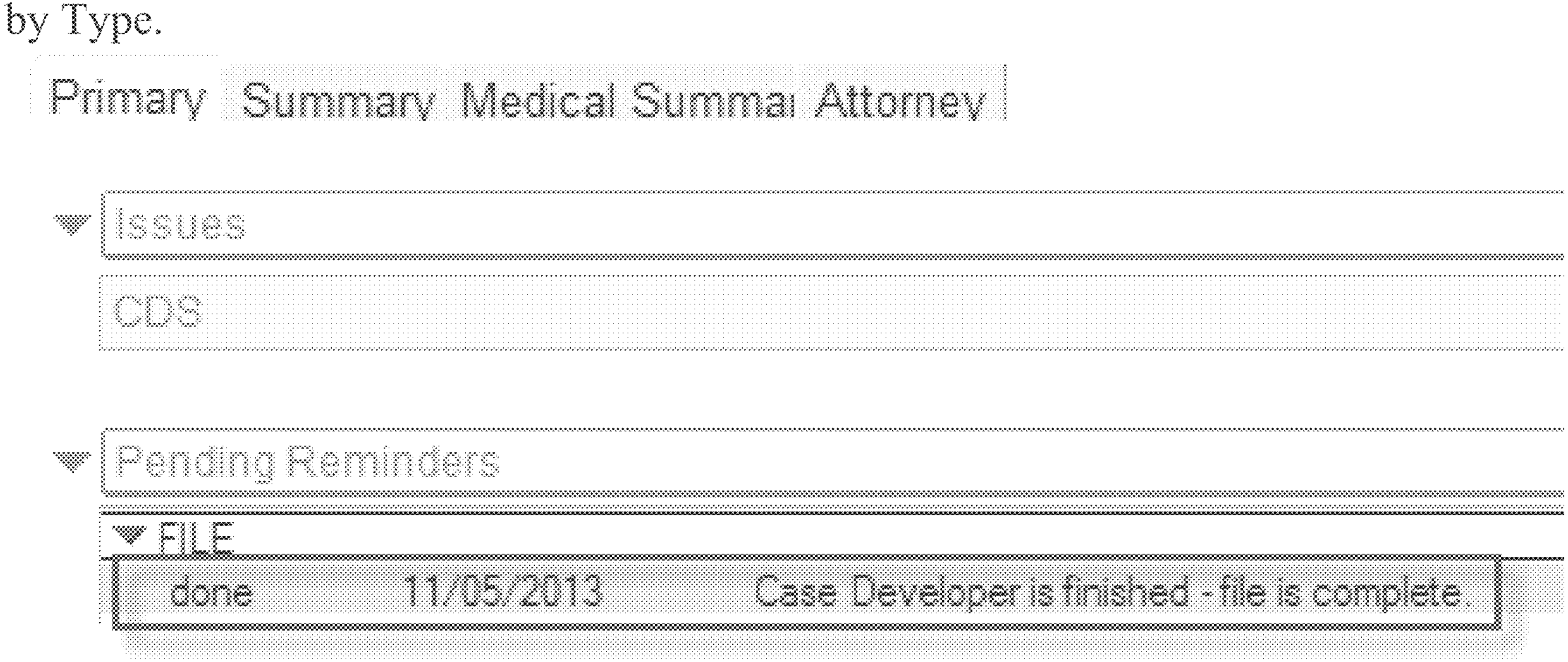
FIGS. 221a-221b are a screen shot of Reminder pages.
Figure 221B:
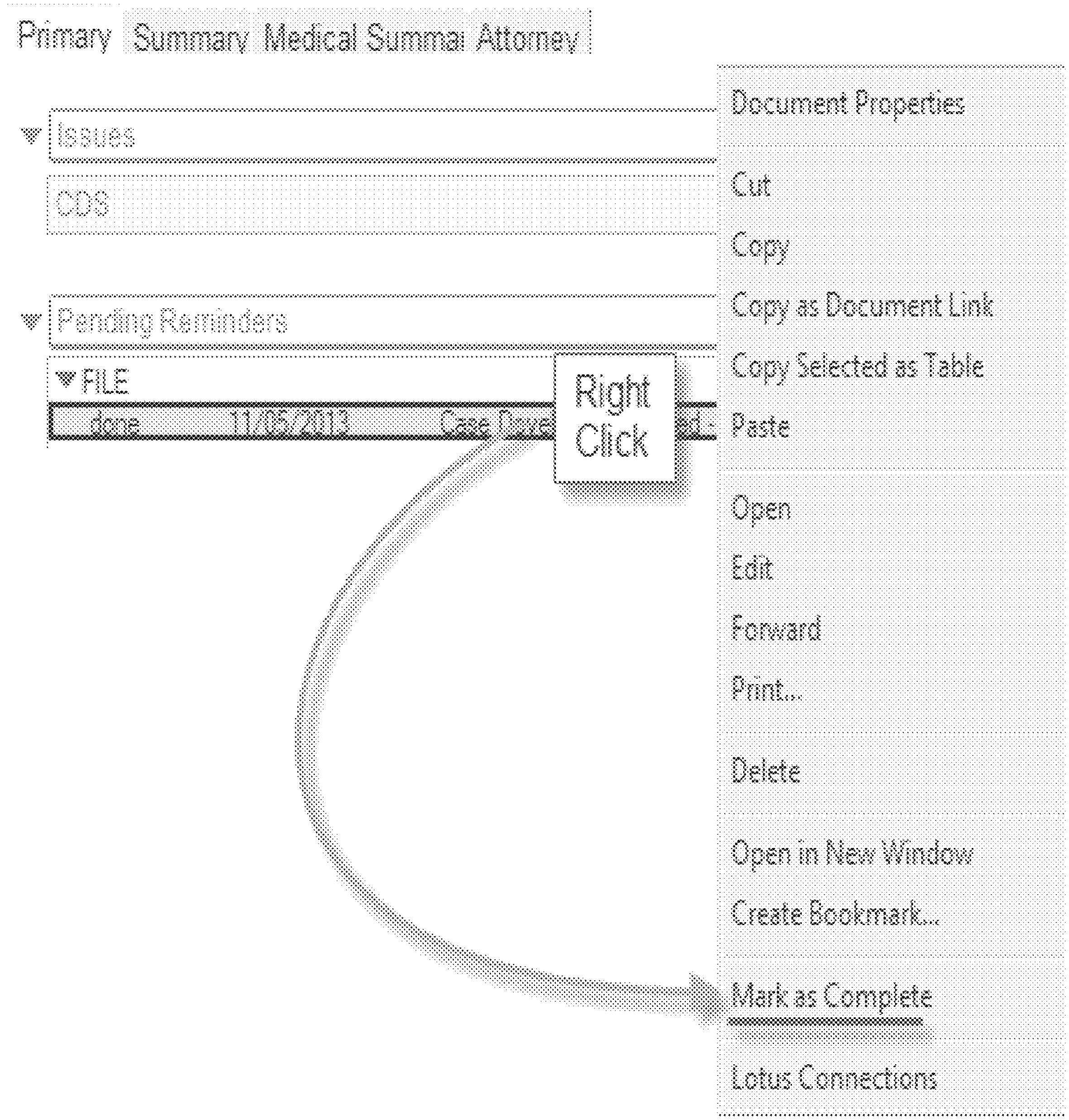
Figure 222A:
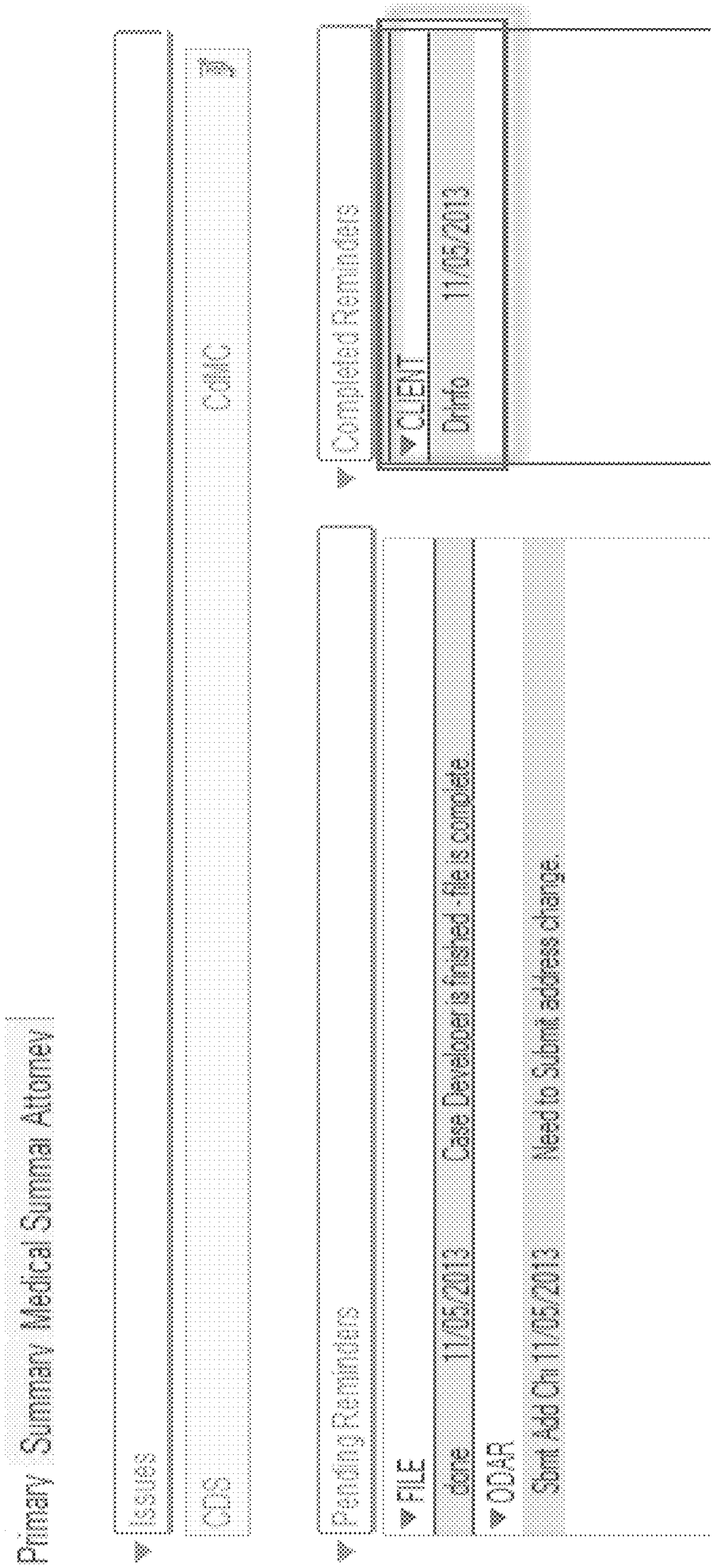
FIGS. 222a-222b are a screen shot of Reminder pages.
Figure 222B:
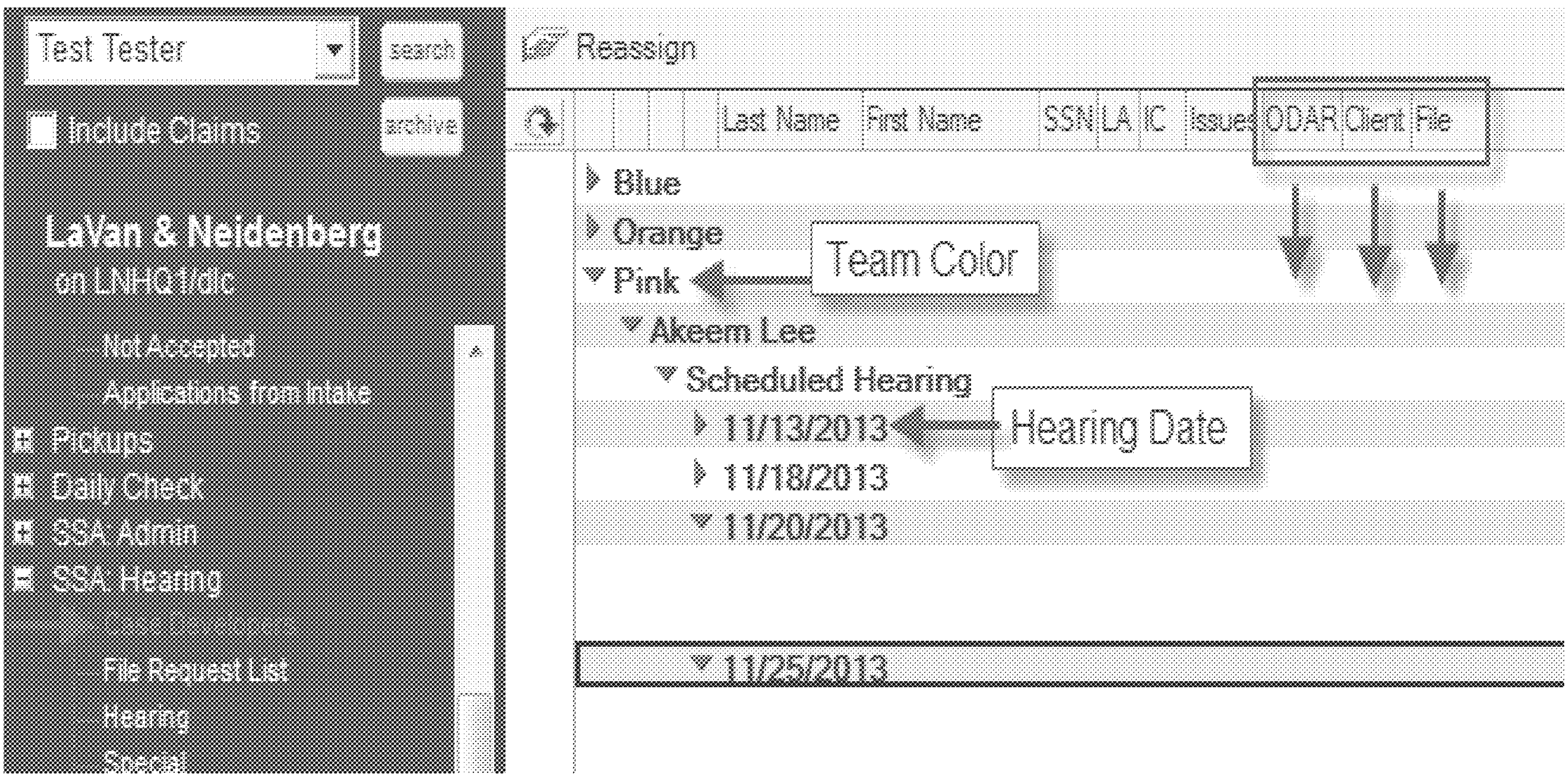
Figure 224A:
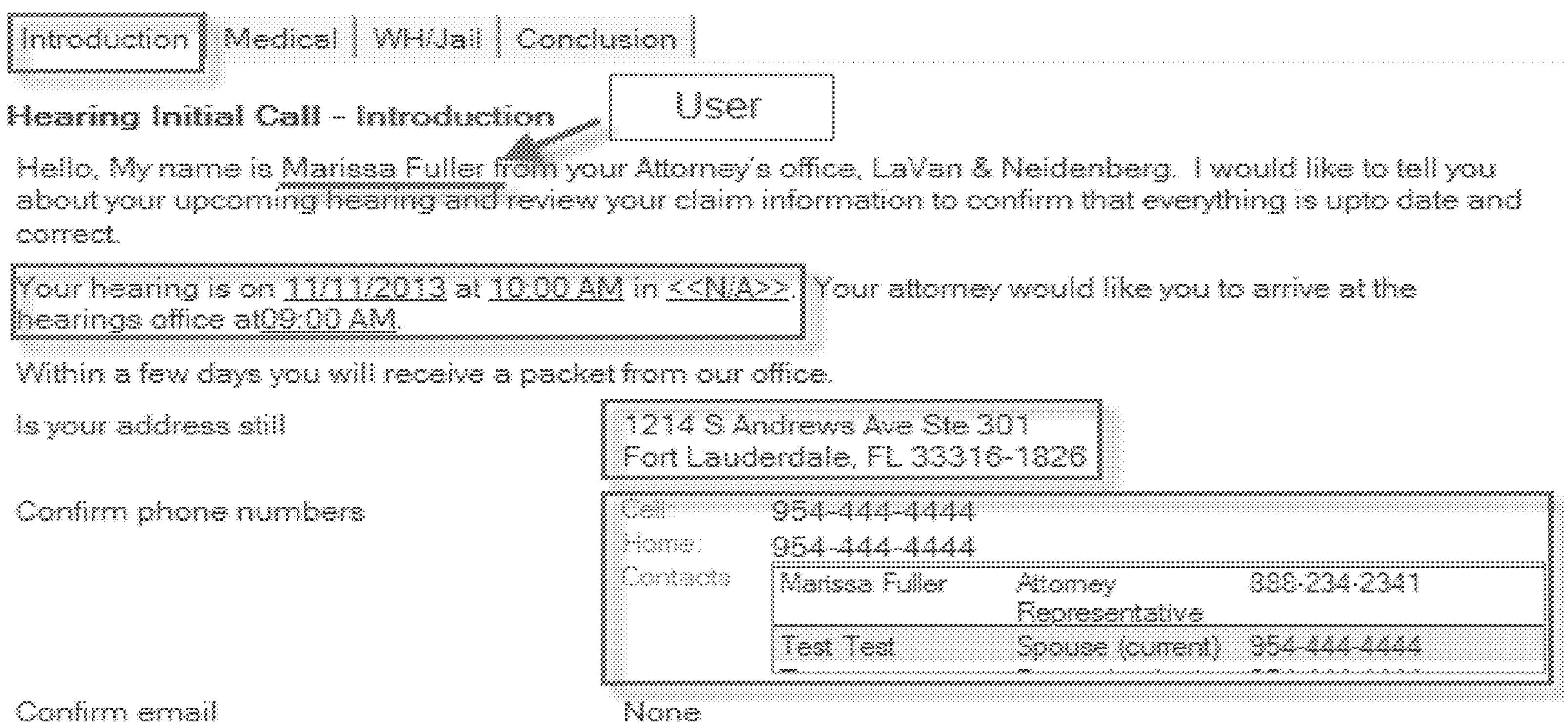
FIGS. 224a-224b are a screen shot of Initial Call Questionnaire pages.
Figure 224B:
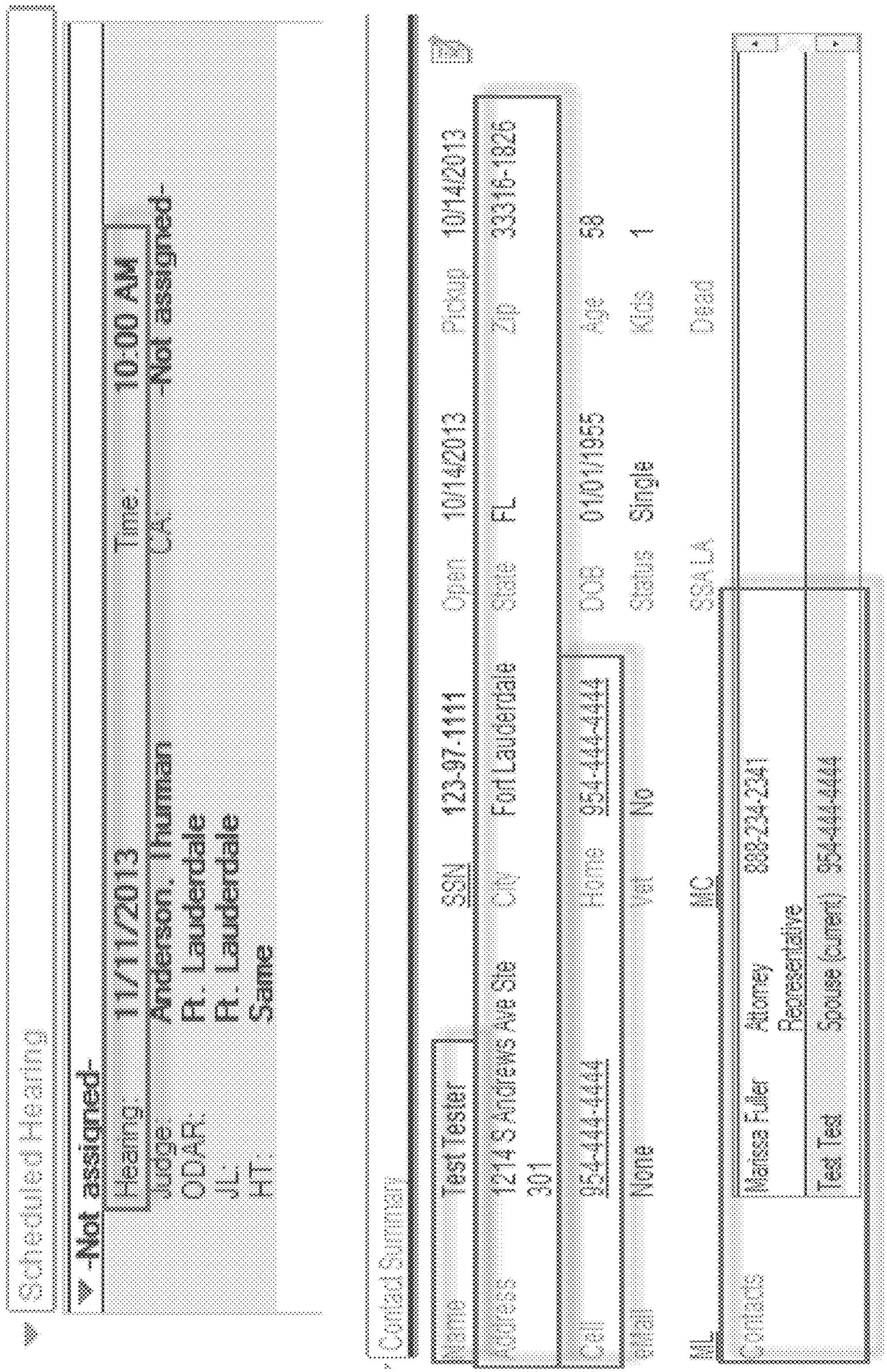
Figure 225A:
Figure 226:
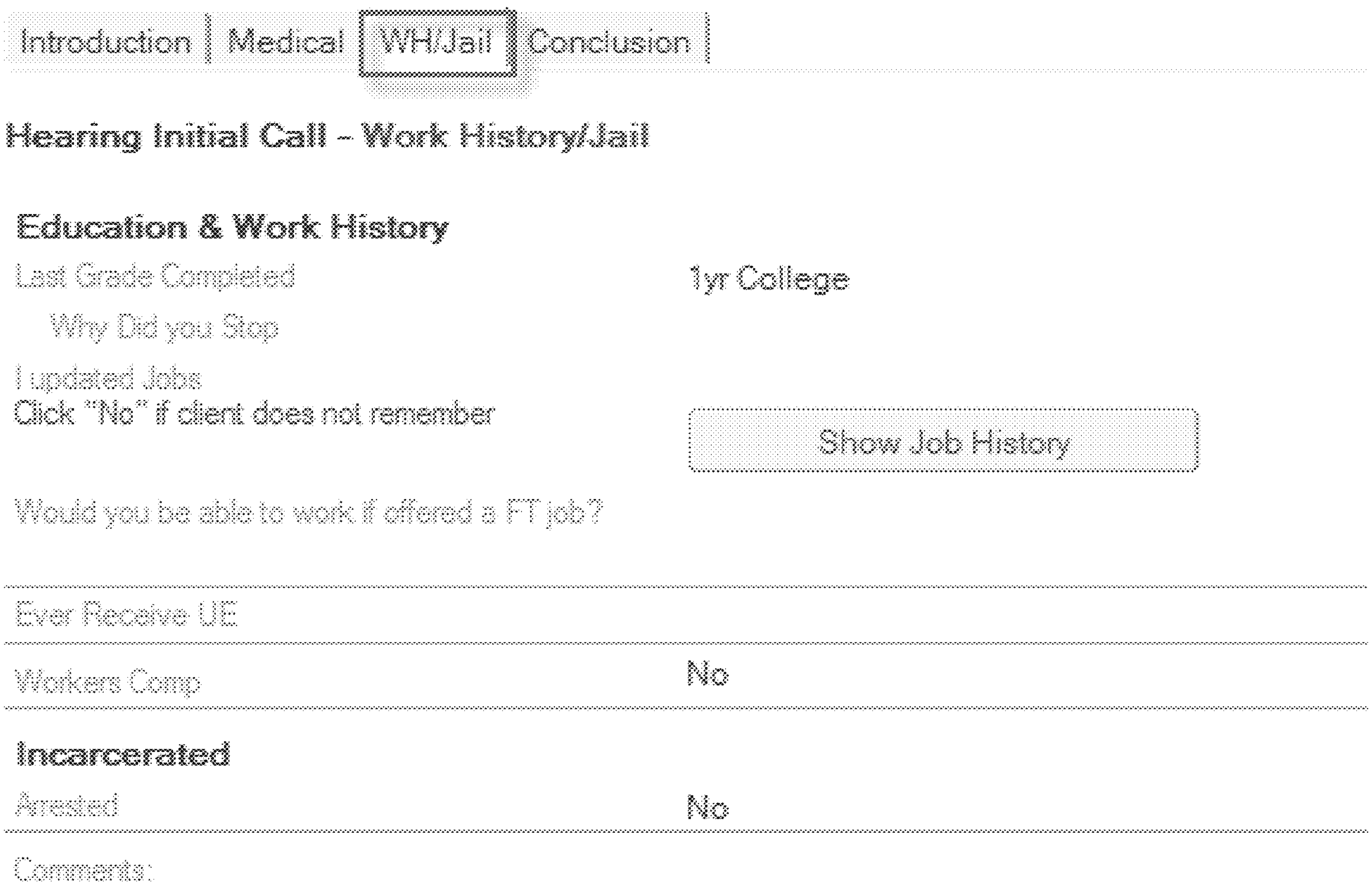
FIG. 226 is a screen shot of Initial Call Questionnaire pages.
Figure 227B:
Figure 228:
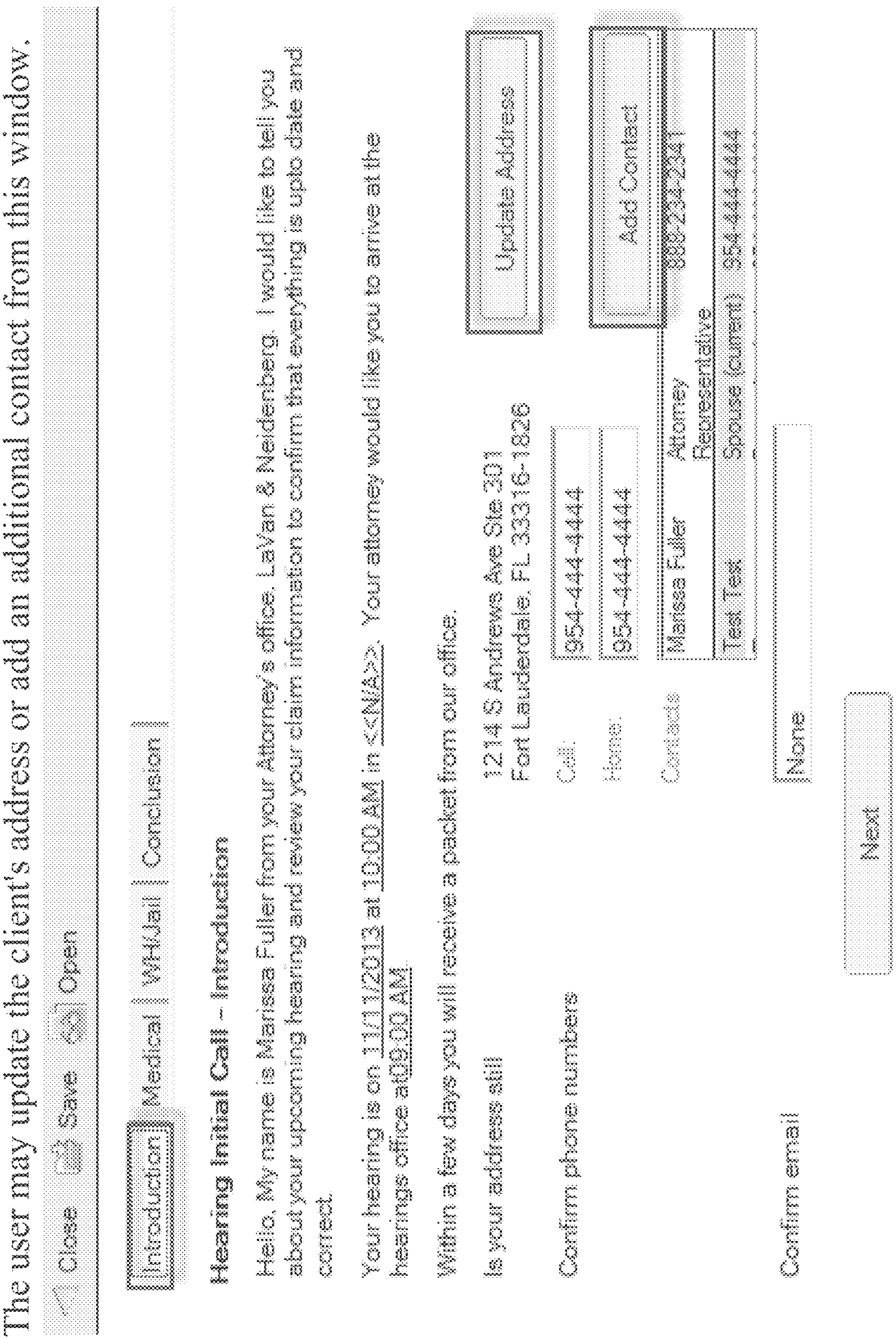
FIG. 228 is a screen shot of Initial Call Questionnaire pages.
Figure 229A:
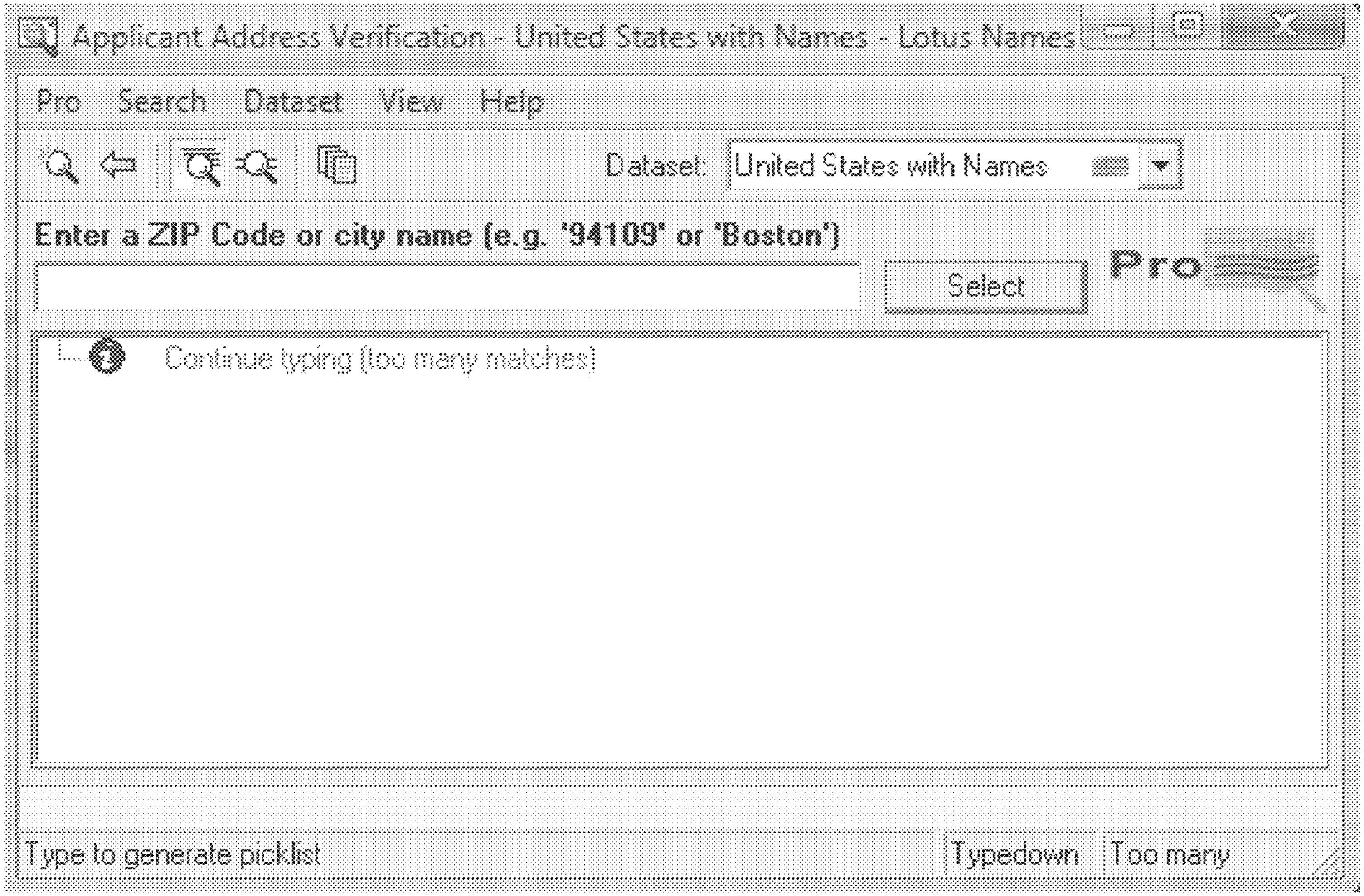
FIGS. 229a-229b are a screen shot of Initial Call Questionnaire pages.
Figure 229B:
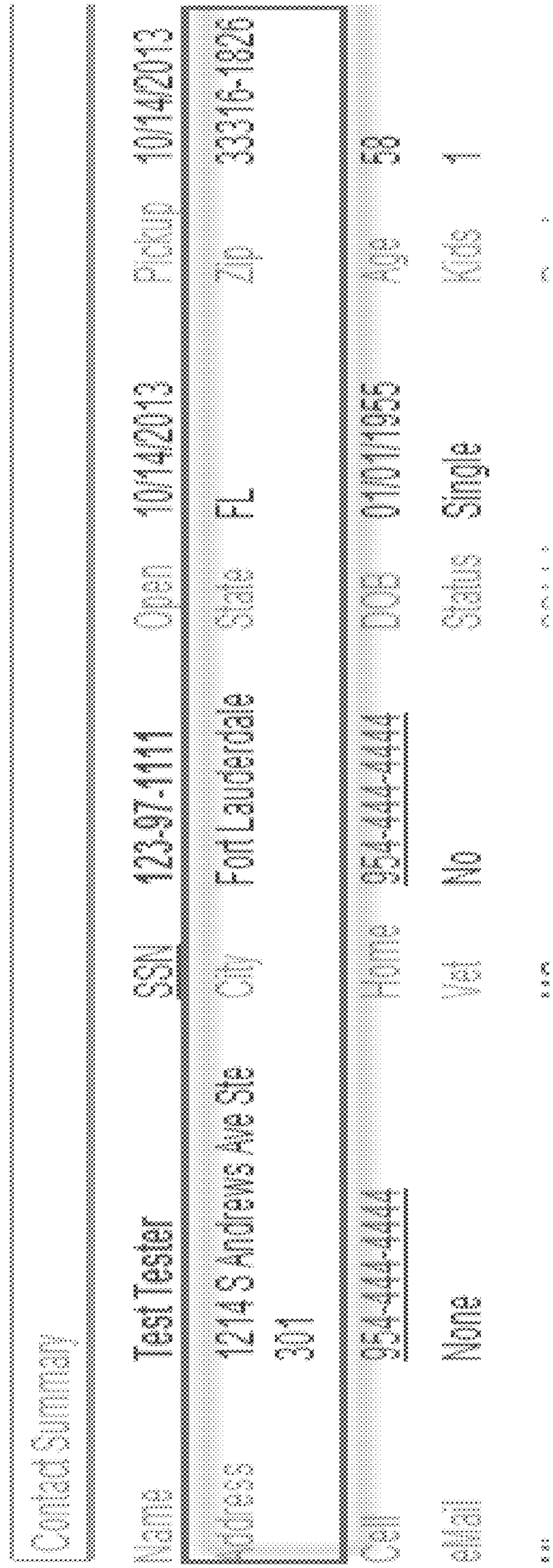
Figure 230A:
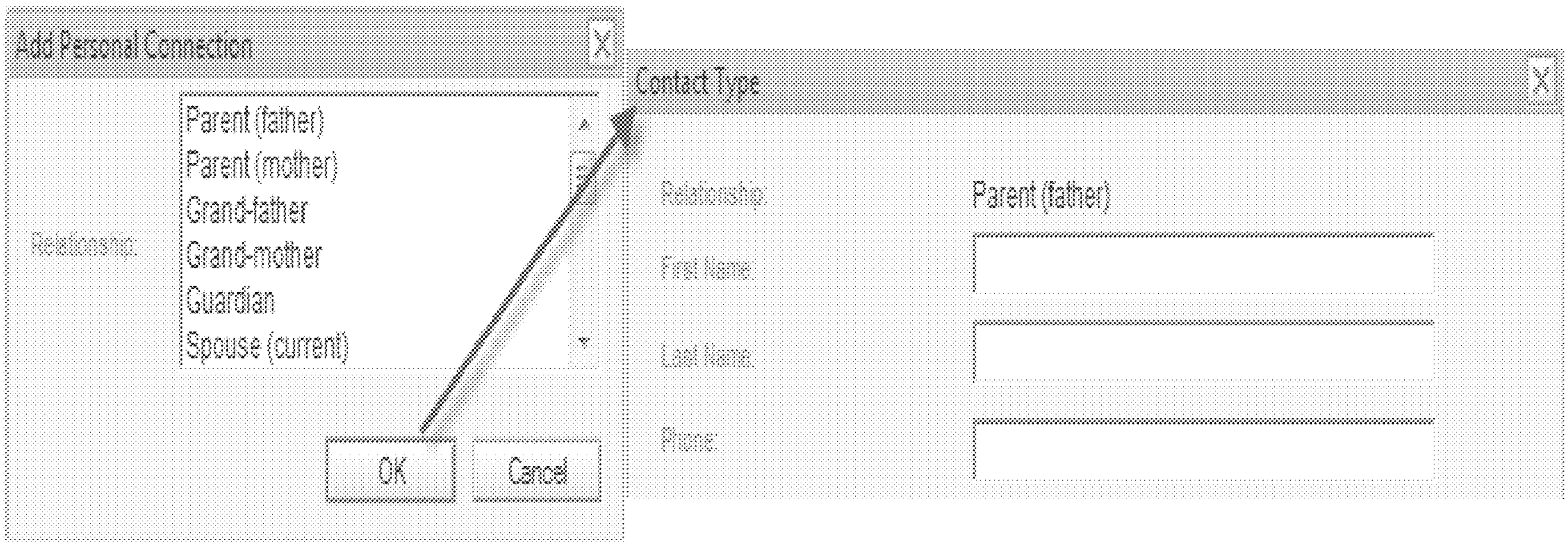
FIGS. 230a-230c are a screen shot of Initial Call Questionnaire pages.
Figure 230B:
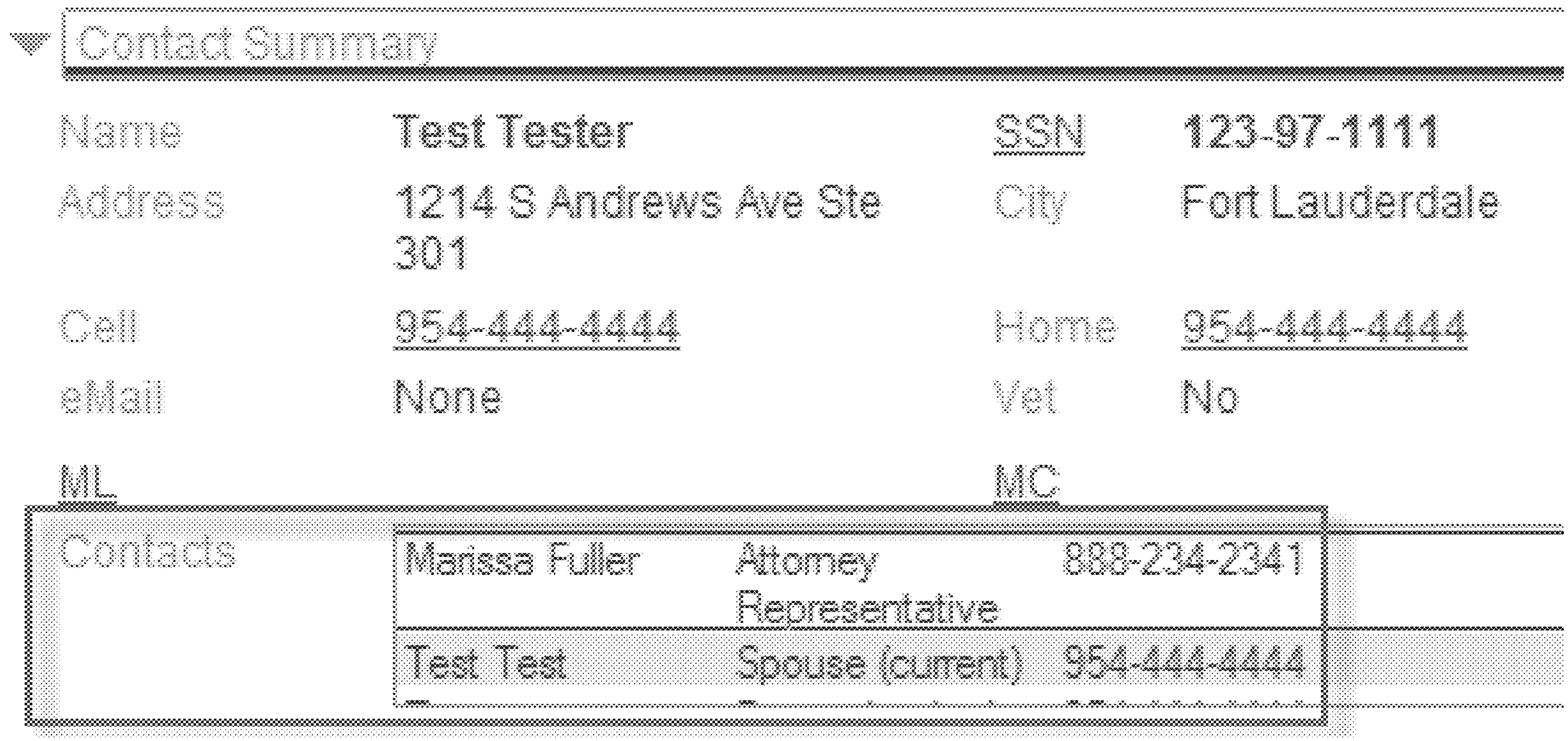
Figure 230C:
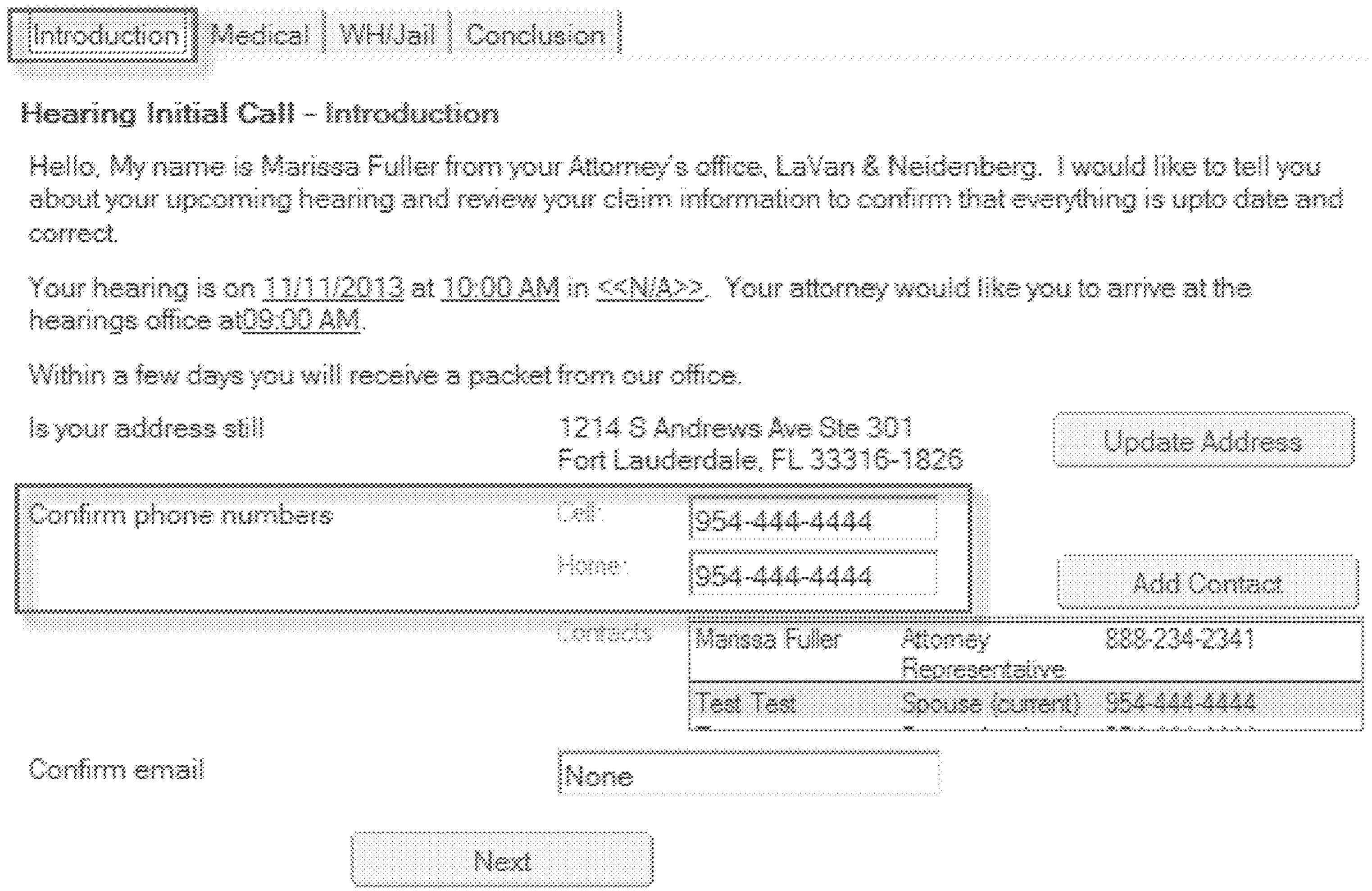
Figure 231:
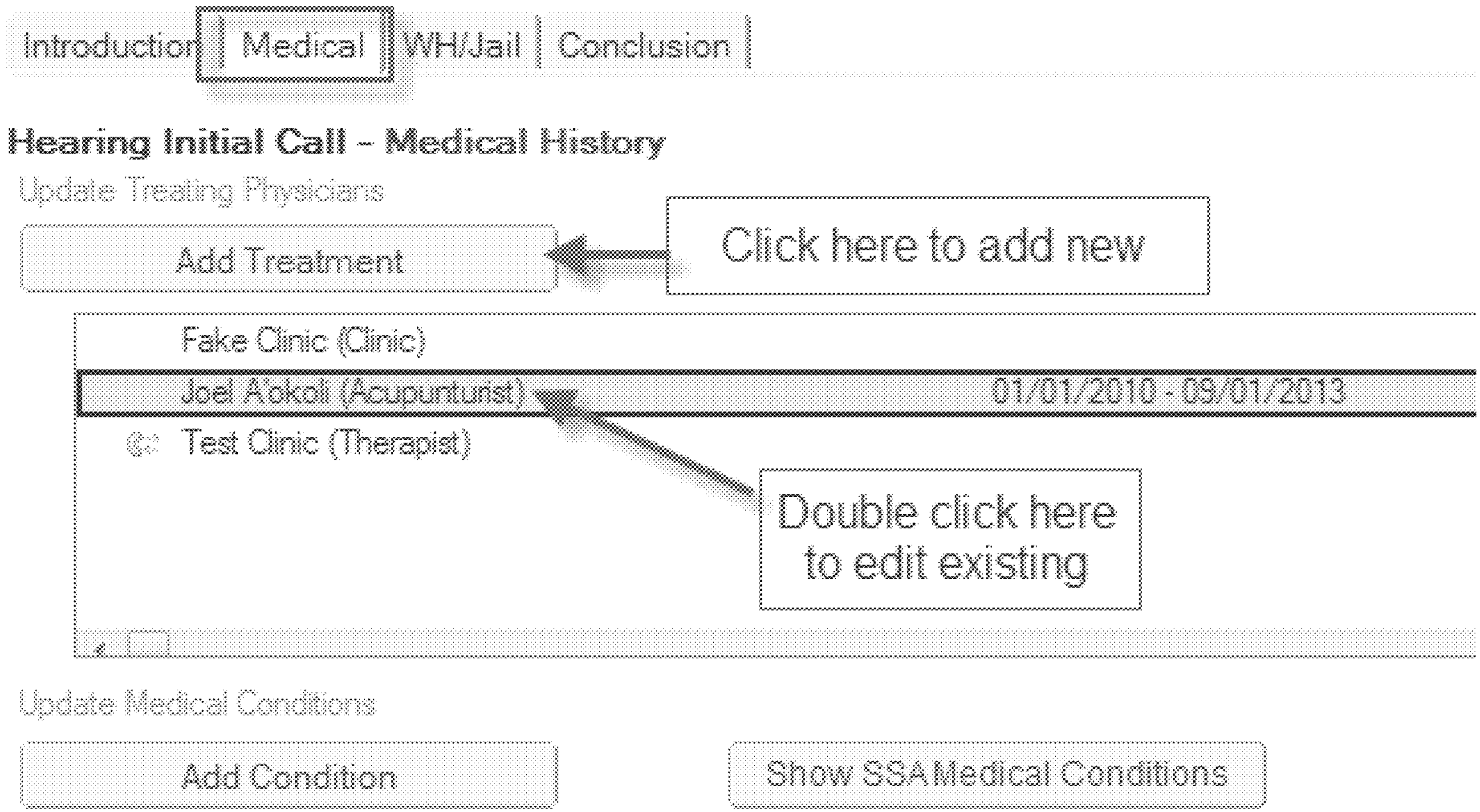
FIG. 231 is a screen shot of Initial Call Questionnaire pages.
Figure 232:
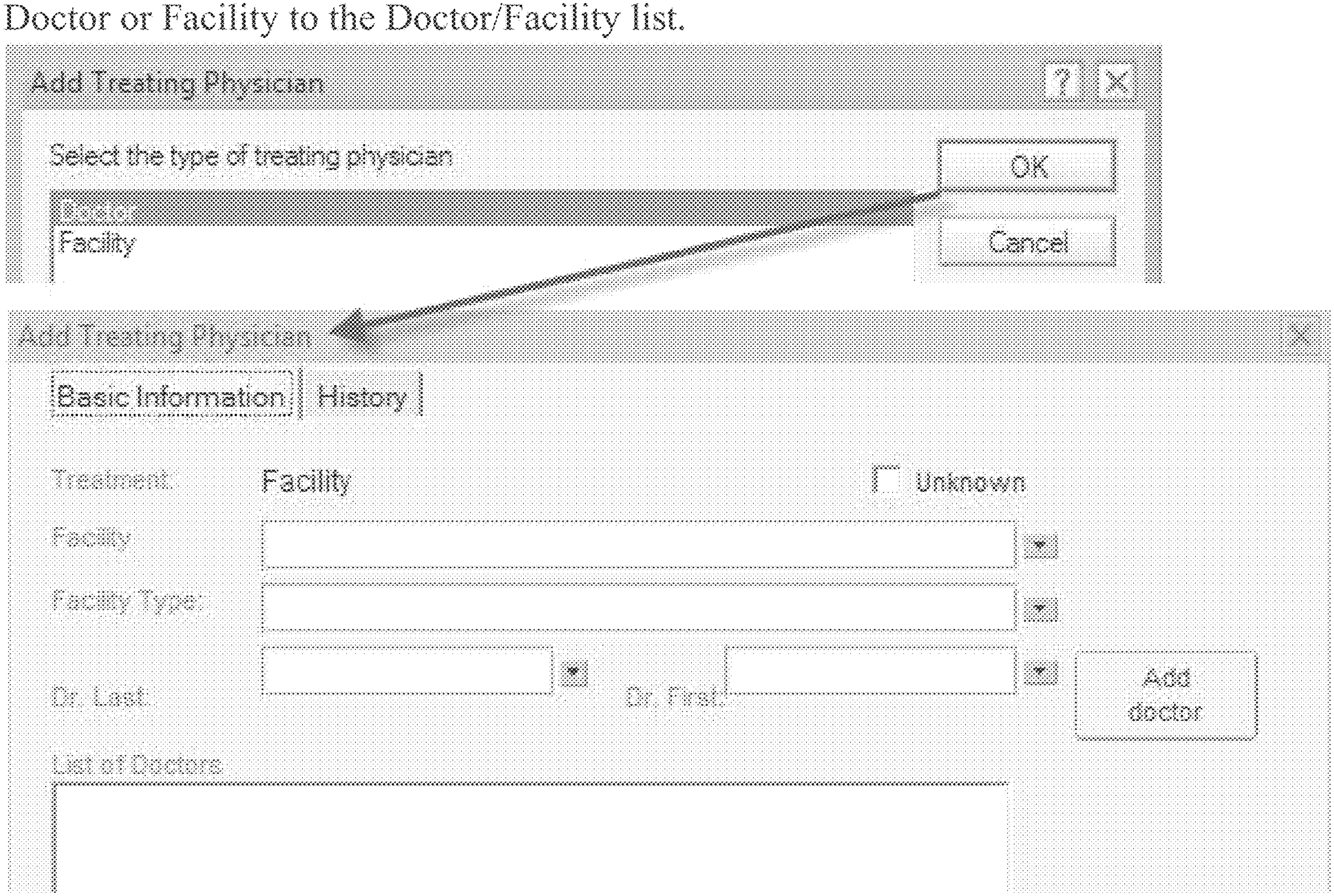
FIG. 232 is a screen shot of Initial Call Questionnaire pages.
Figure 233A:
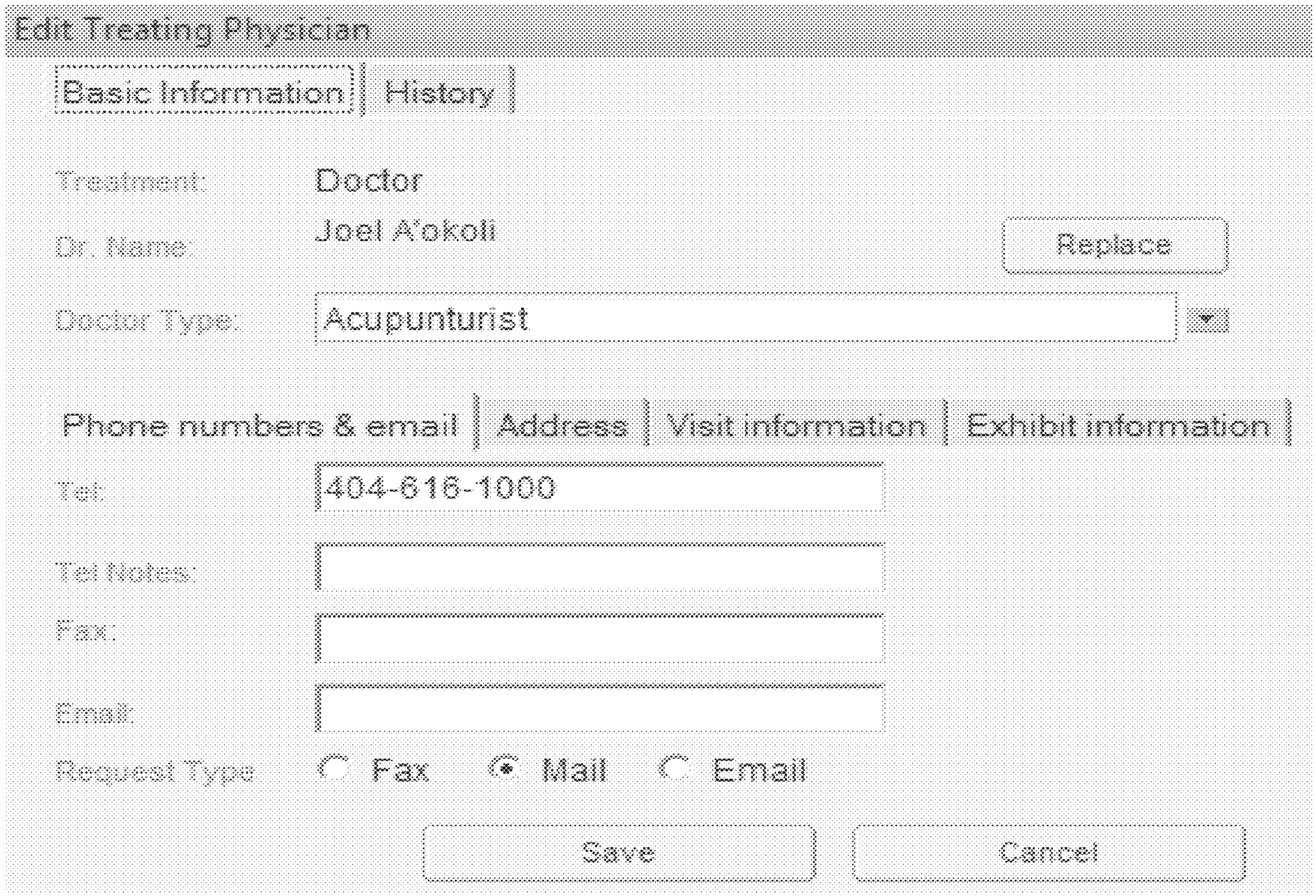
FIGS. 233a-233b are a screen shot of Initial Call Questionnaire pages.
Figure 233B:
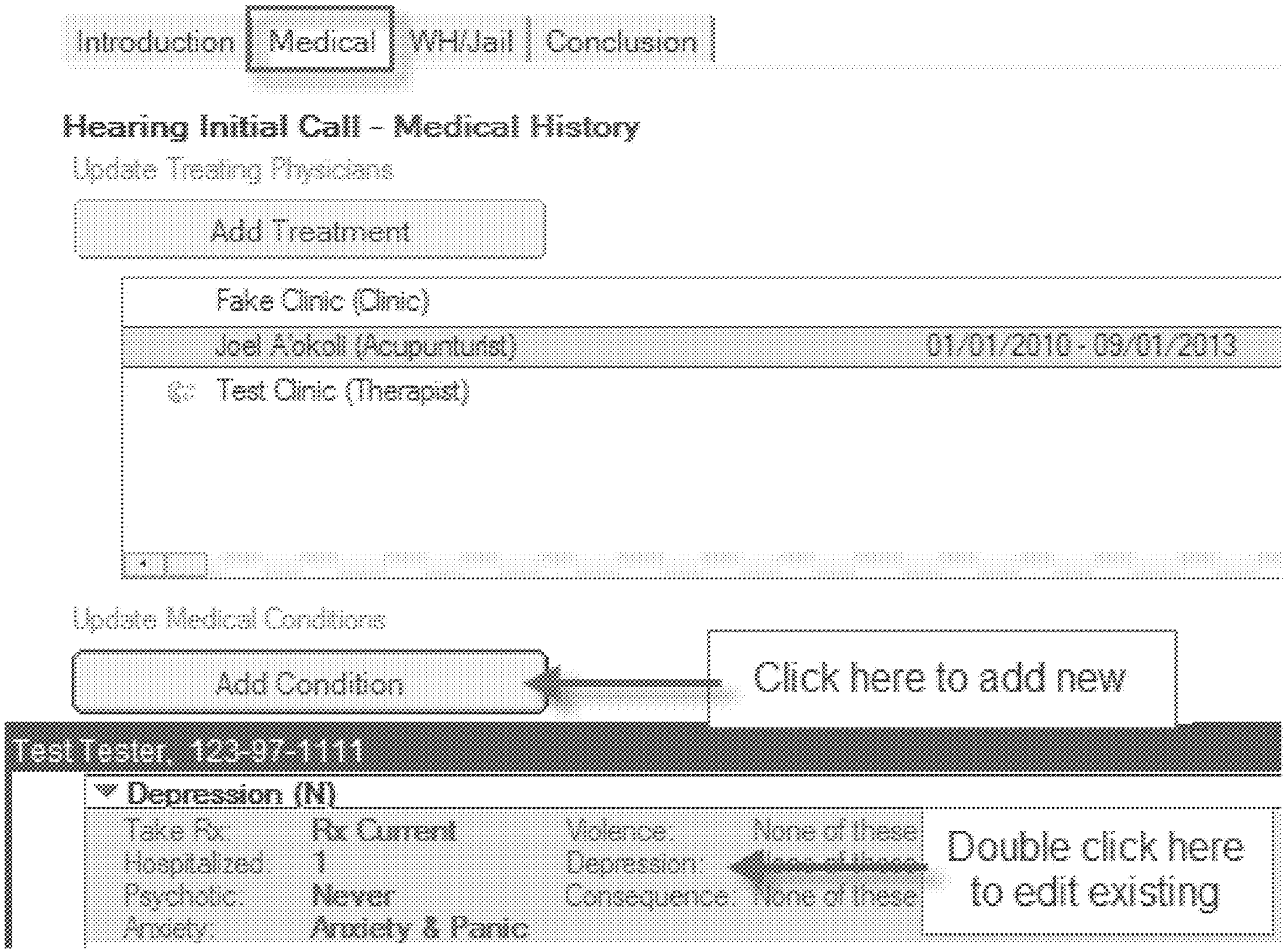
Figure 234:
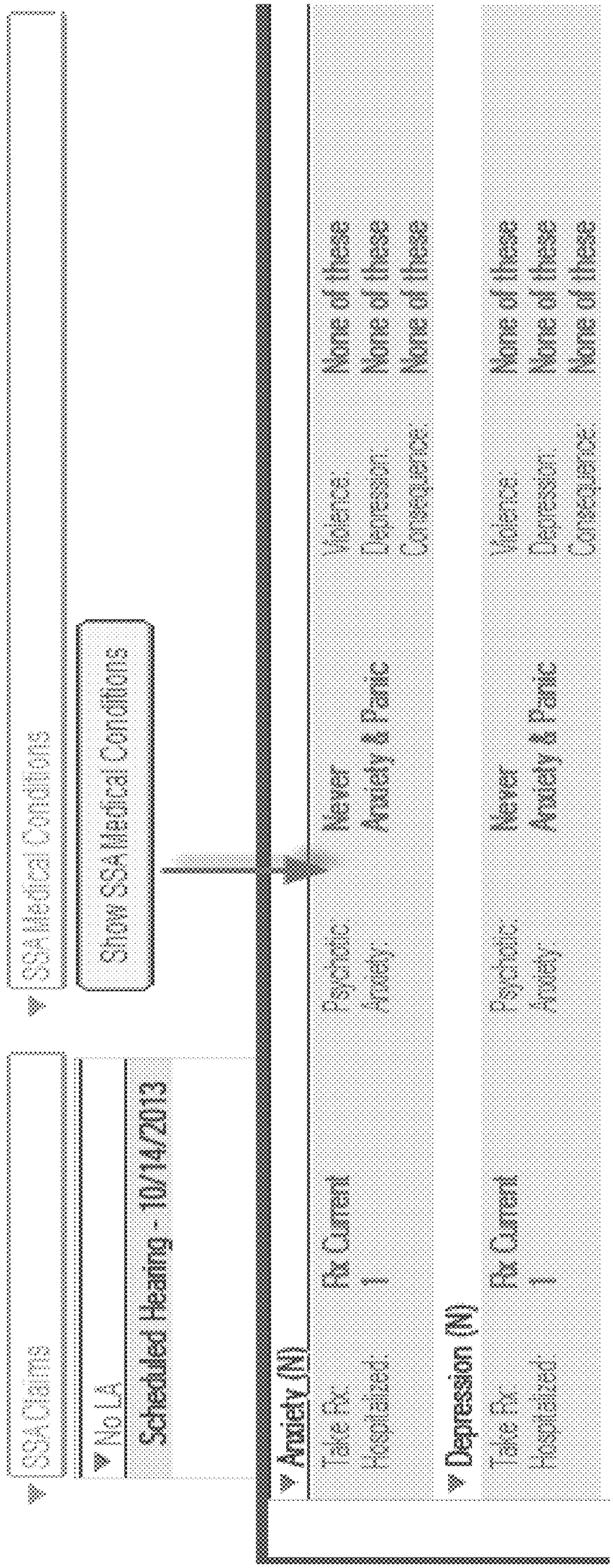
FIG. 234 is a screen shot of Initial Call Questionnaire pages.
Figure 235A:
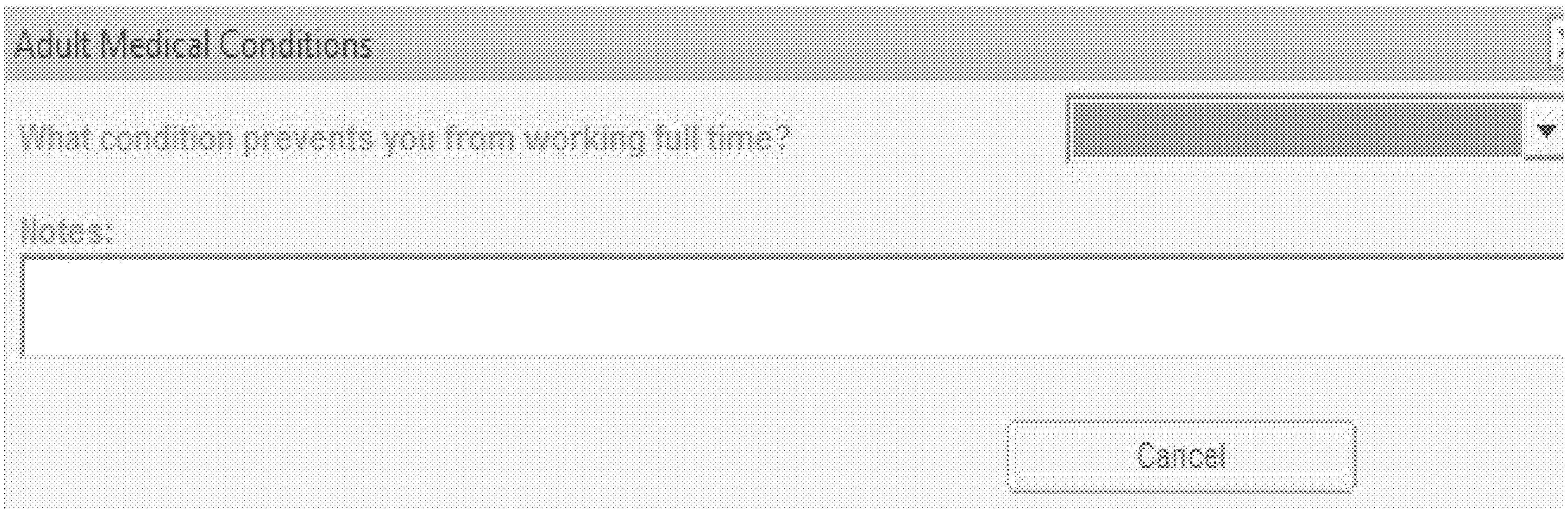
FIGS. 235a-235b are a screen shot of Initial Call Questionnaire pages.
Figure 235B:
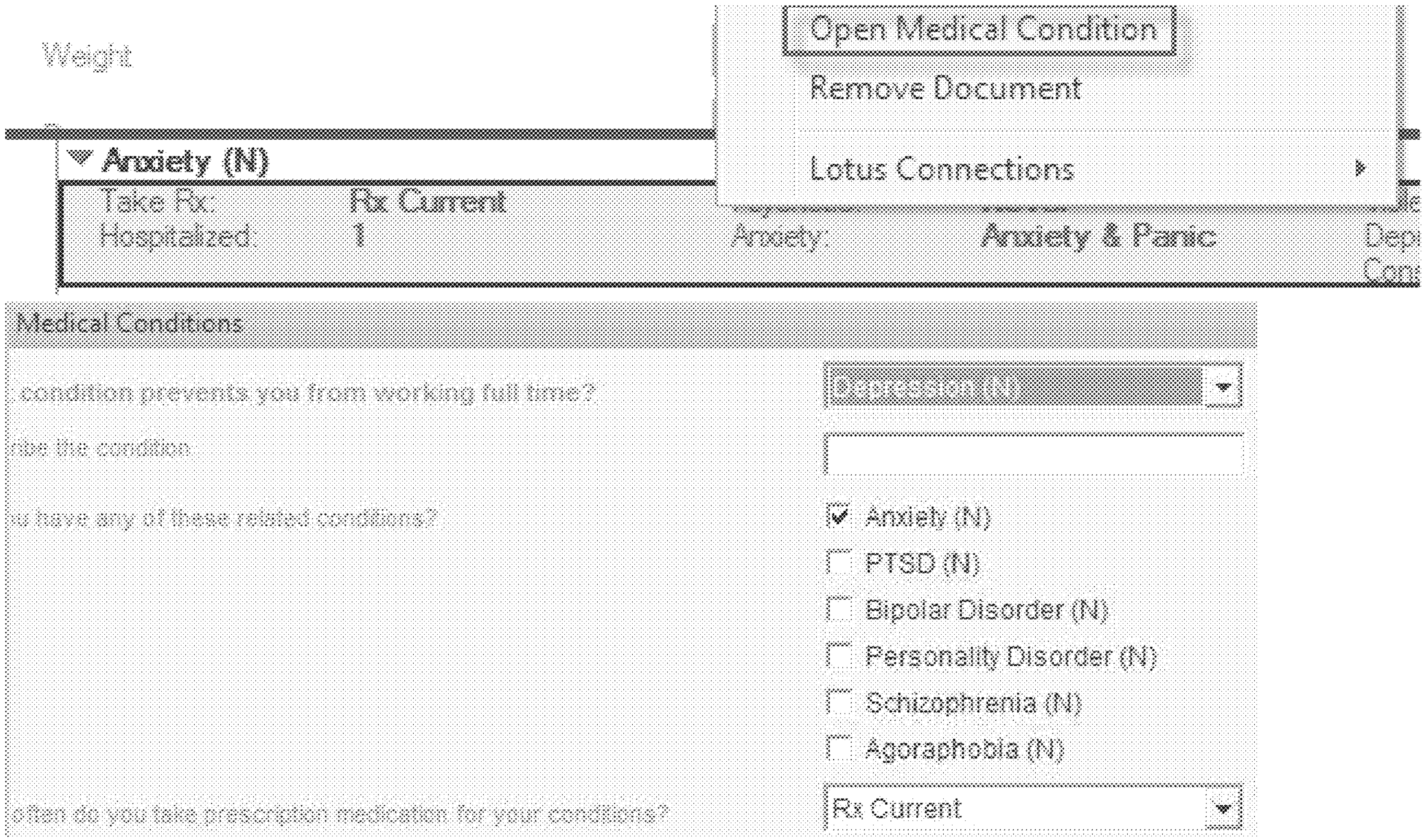
Figure 237:
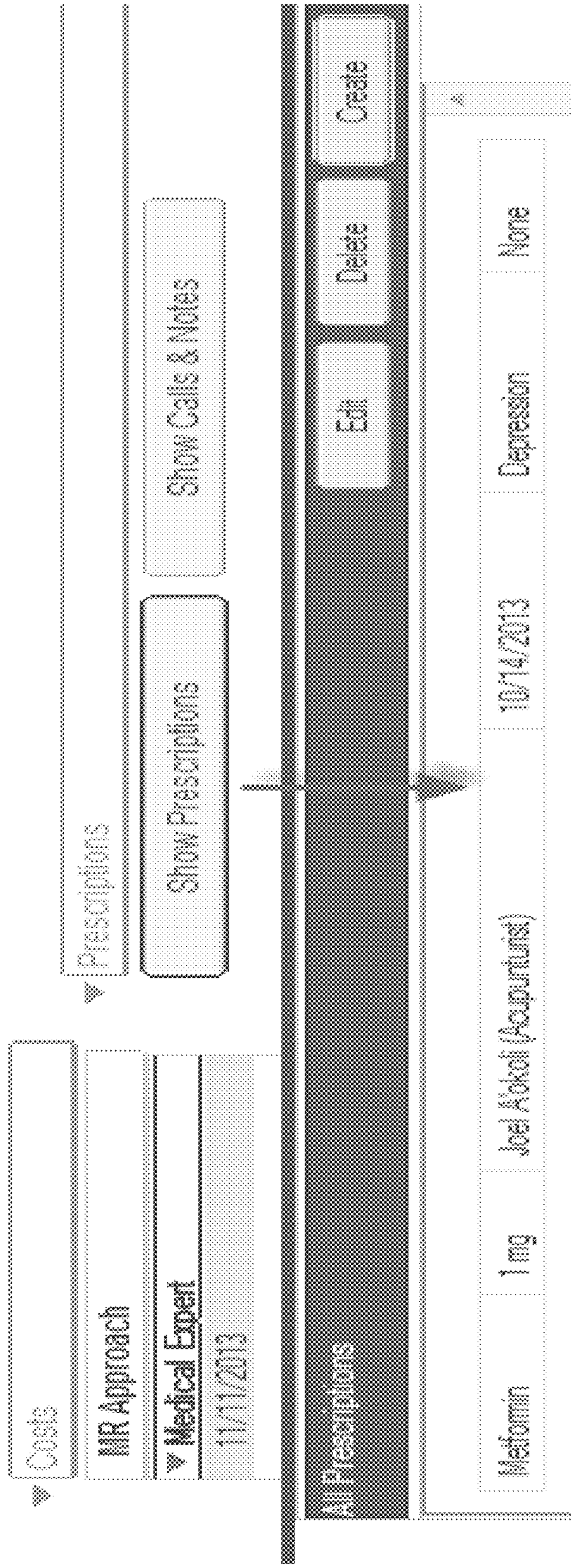
FIG. 237 is a screen shot of Initial Call Questionnaire pages.
Figure 238A:
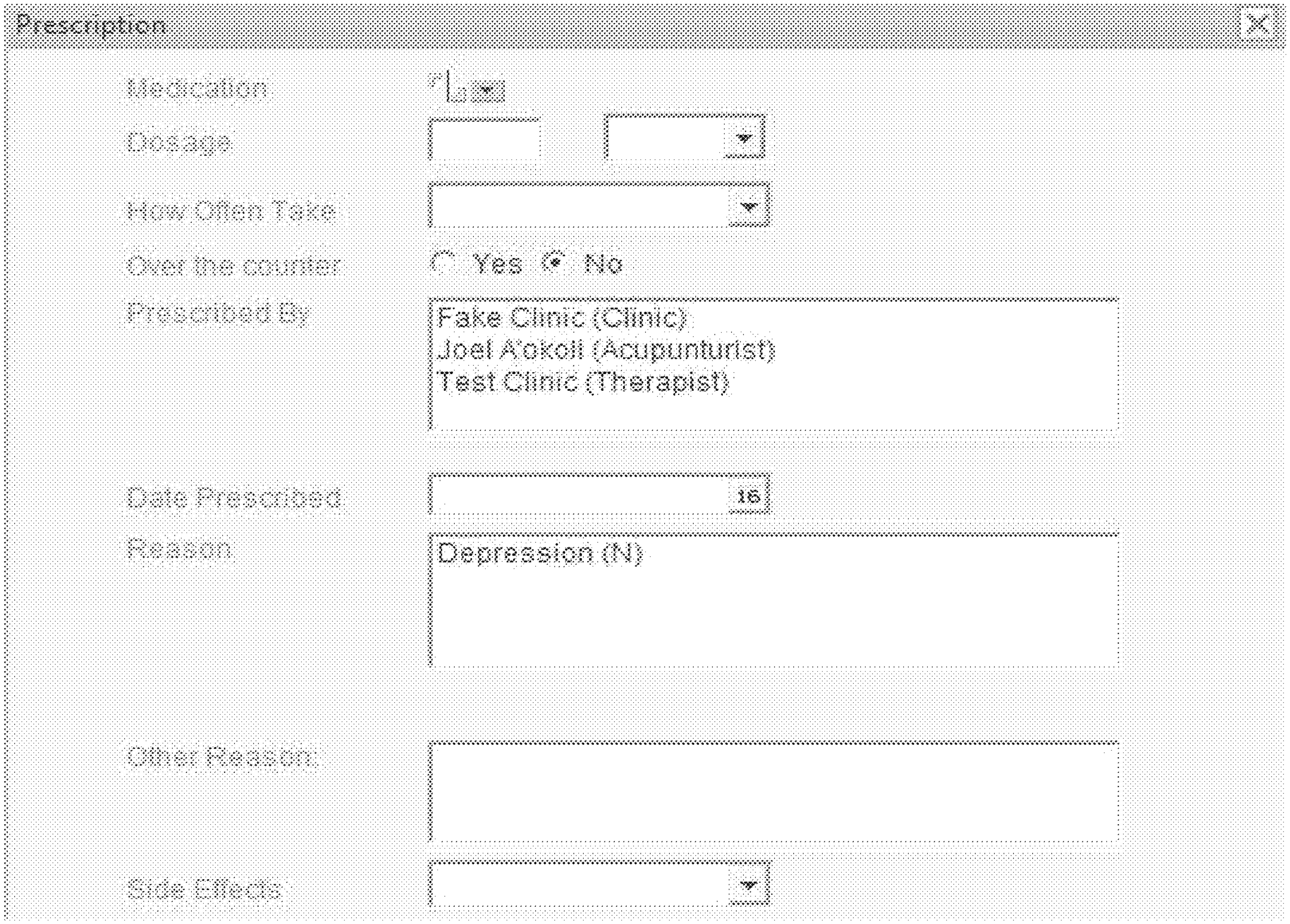
FIGS. 238a-238b are a screen shot of Initial Call Questionnaire pages.
Figure 238B:
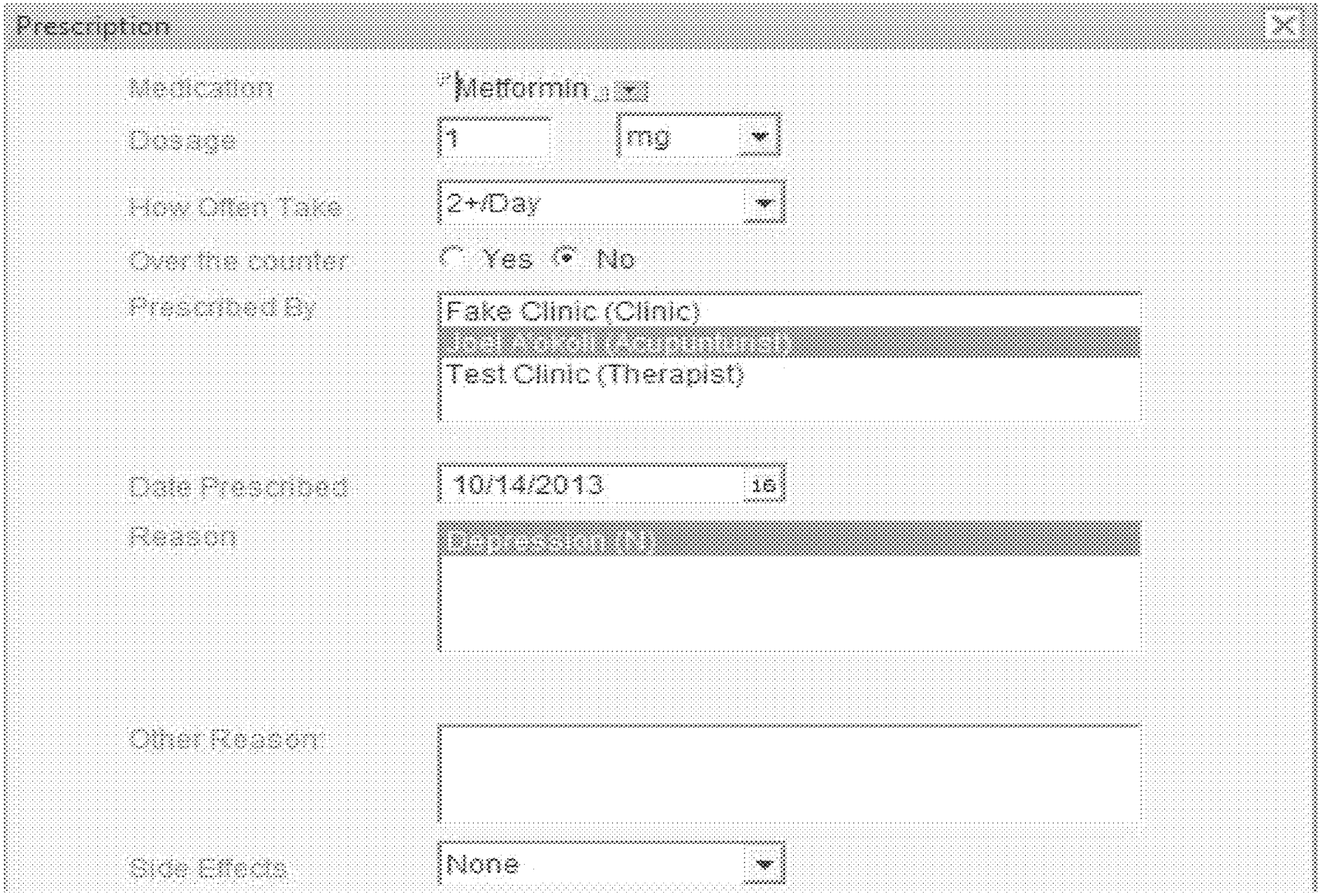
Figure 239:
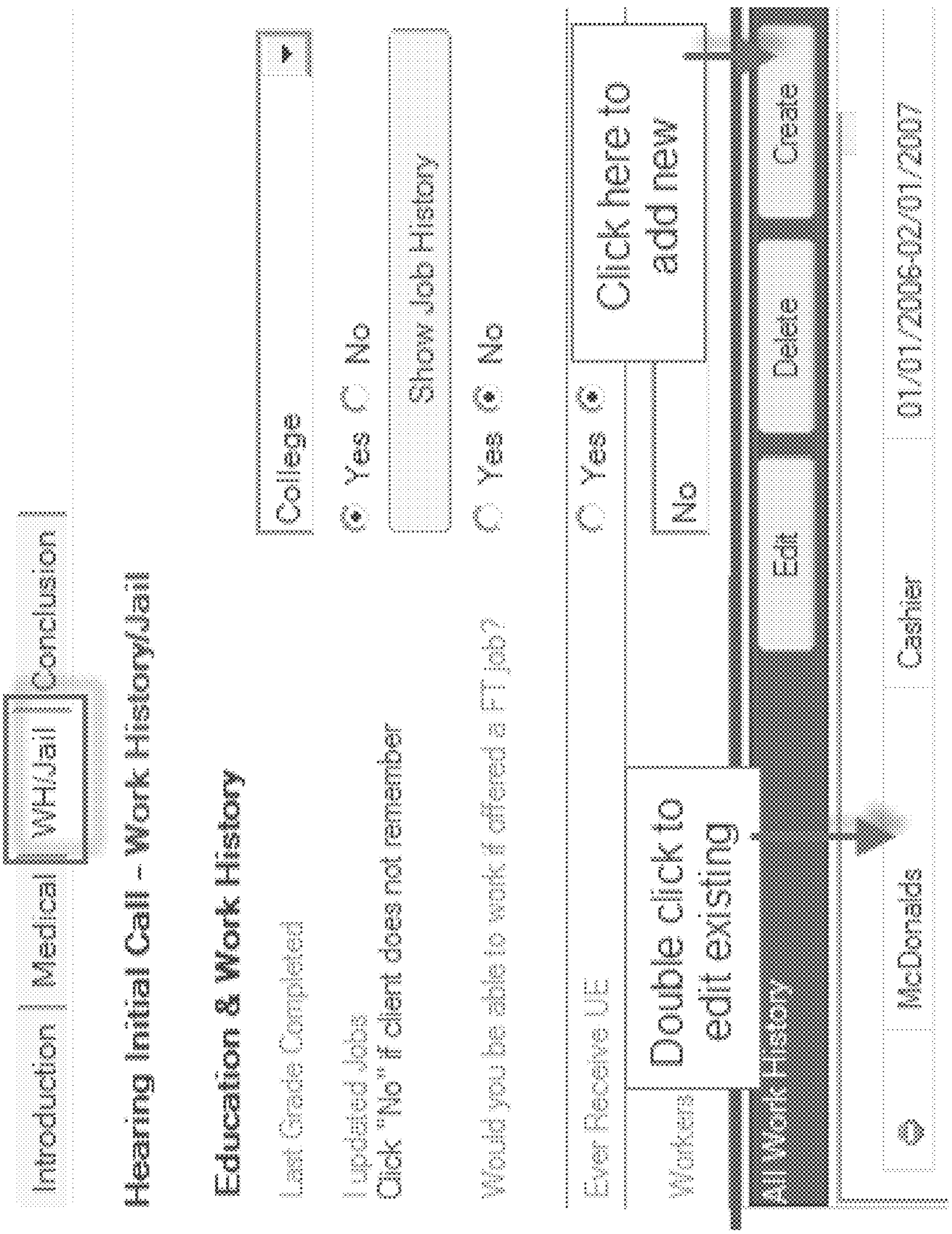
FIG. 239 is a screen shot of Initial Call Questionnaire pages.
Figure 240:
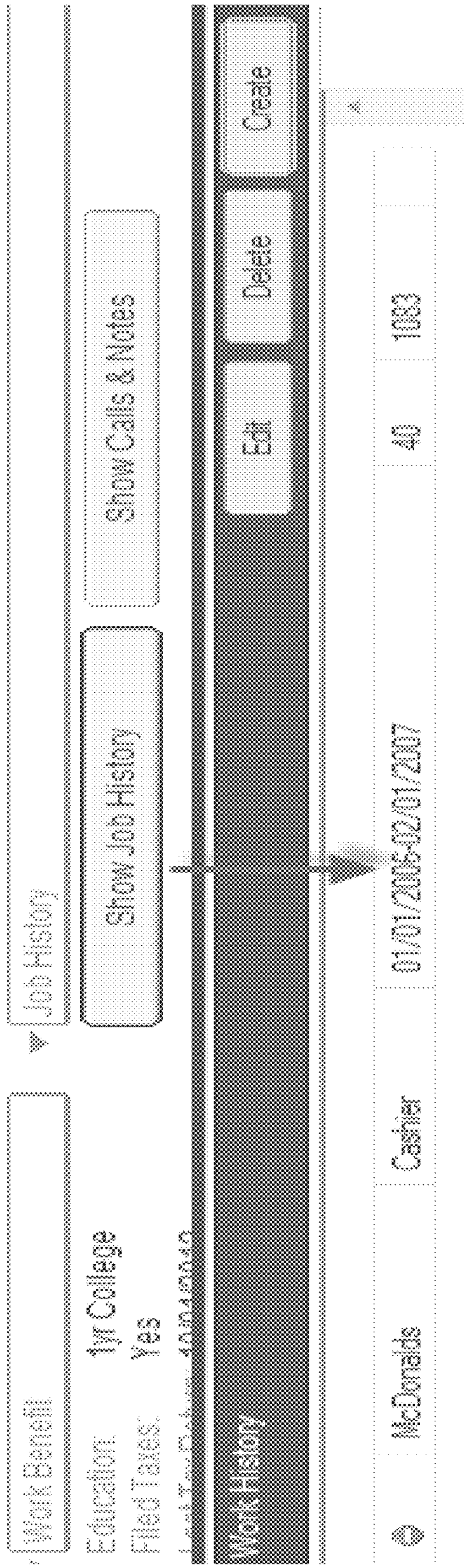
FIG. 240 is a screen shot of Initial Call Questionnaire pages.
Figure 241A:
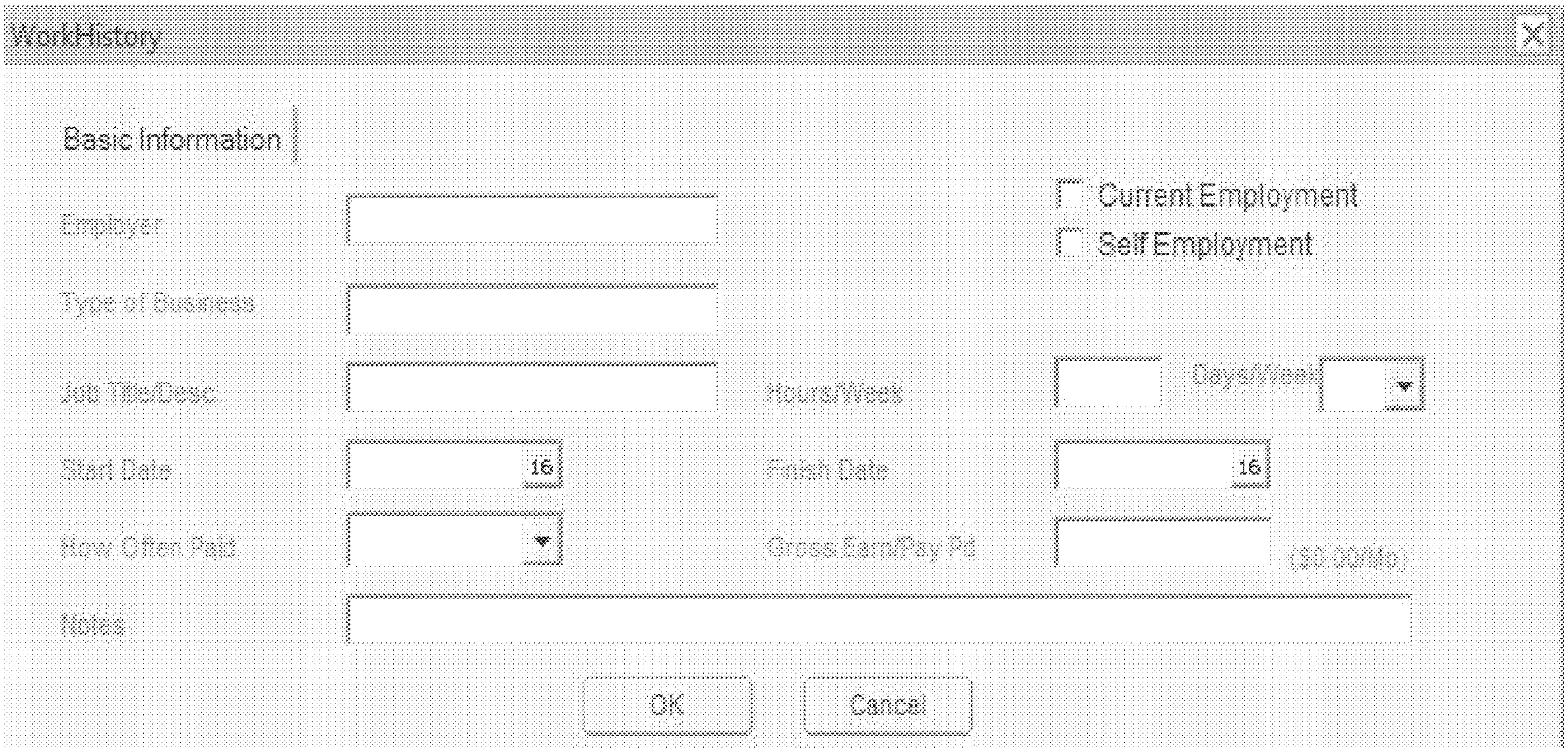
FIGS. 241a-241b are a screen shot of Initial Call Questionnaire pages.
Figure 241B:
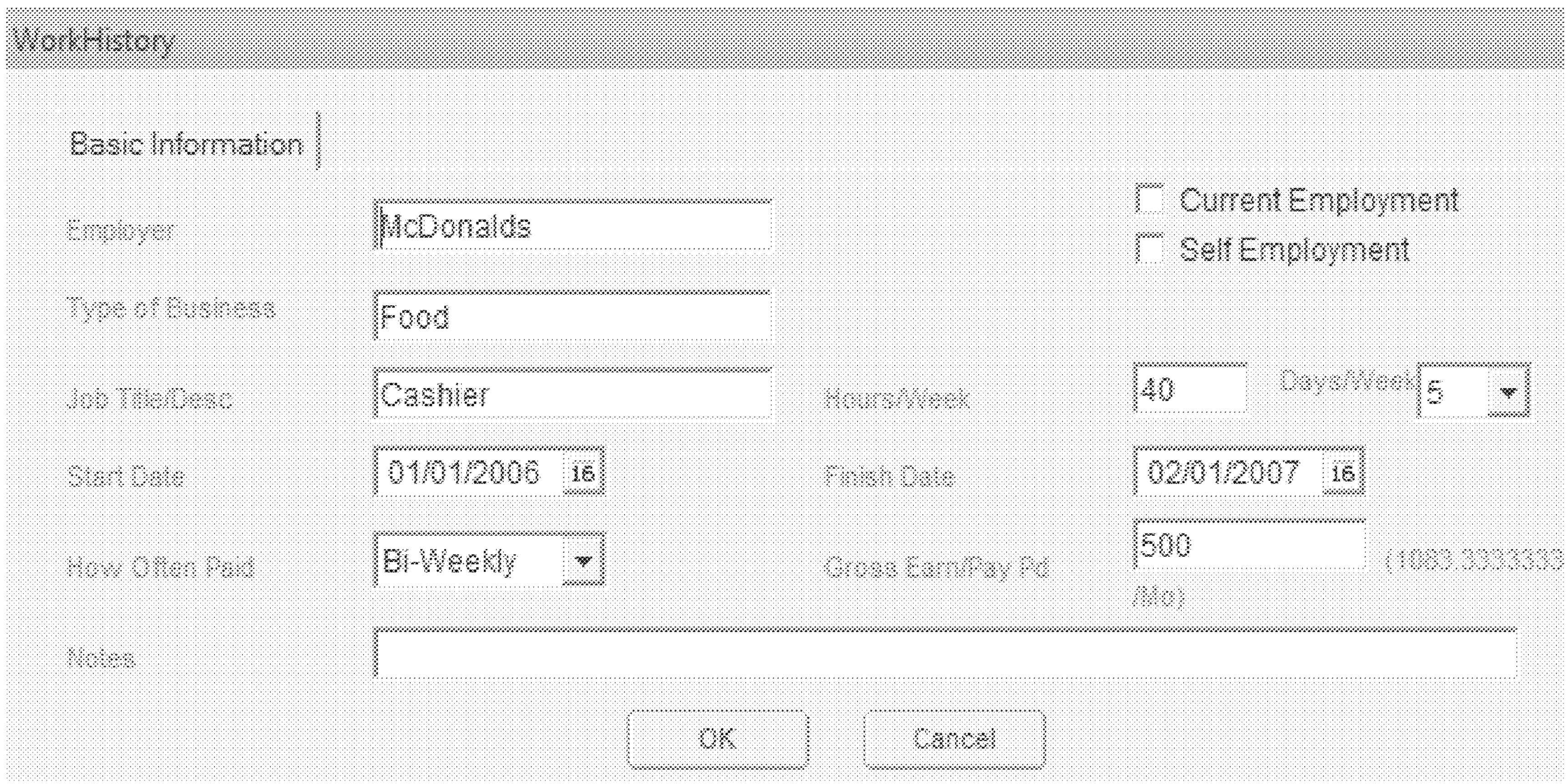
Figure 242A:
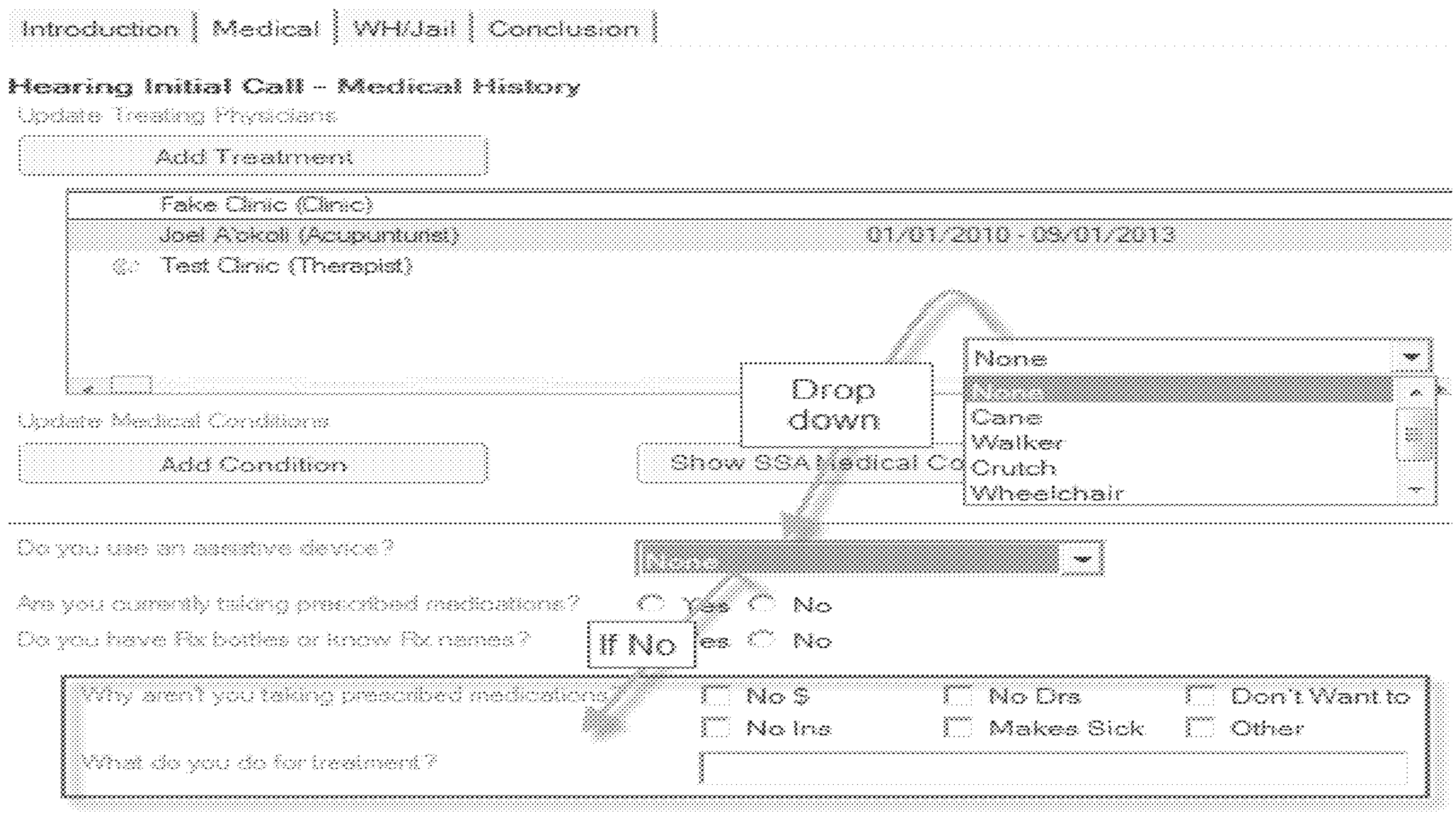
FIGS. 242a-242b are a screen shot of Initial Call Questionnaire pages.
Figure 242B:
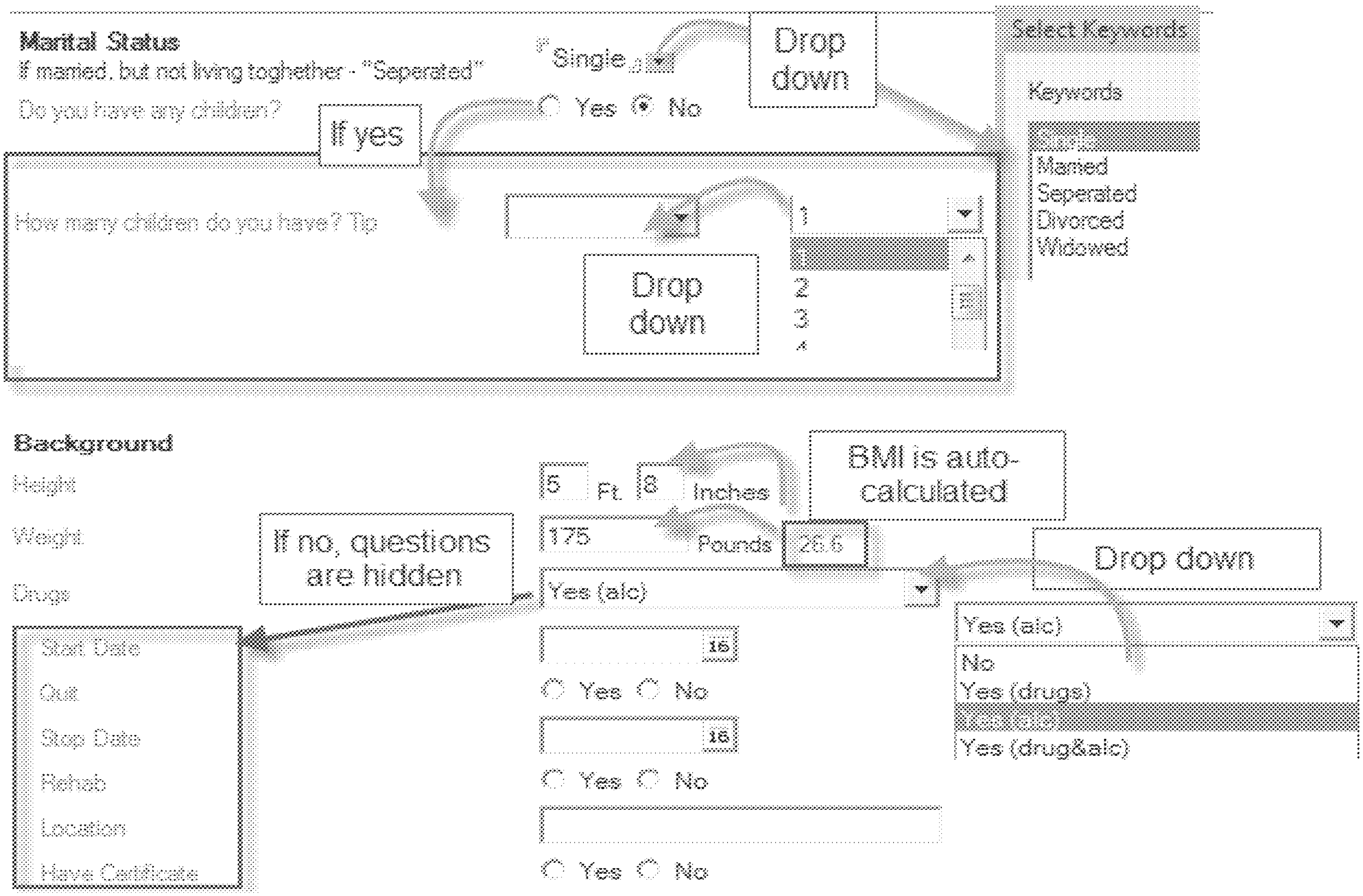
Figure 243:
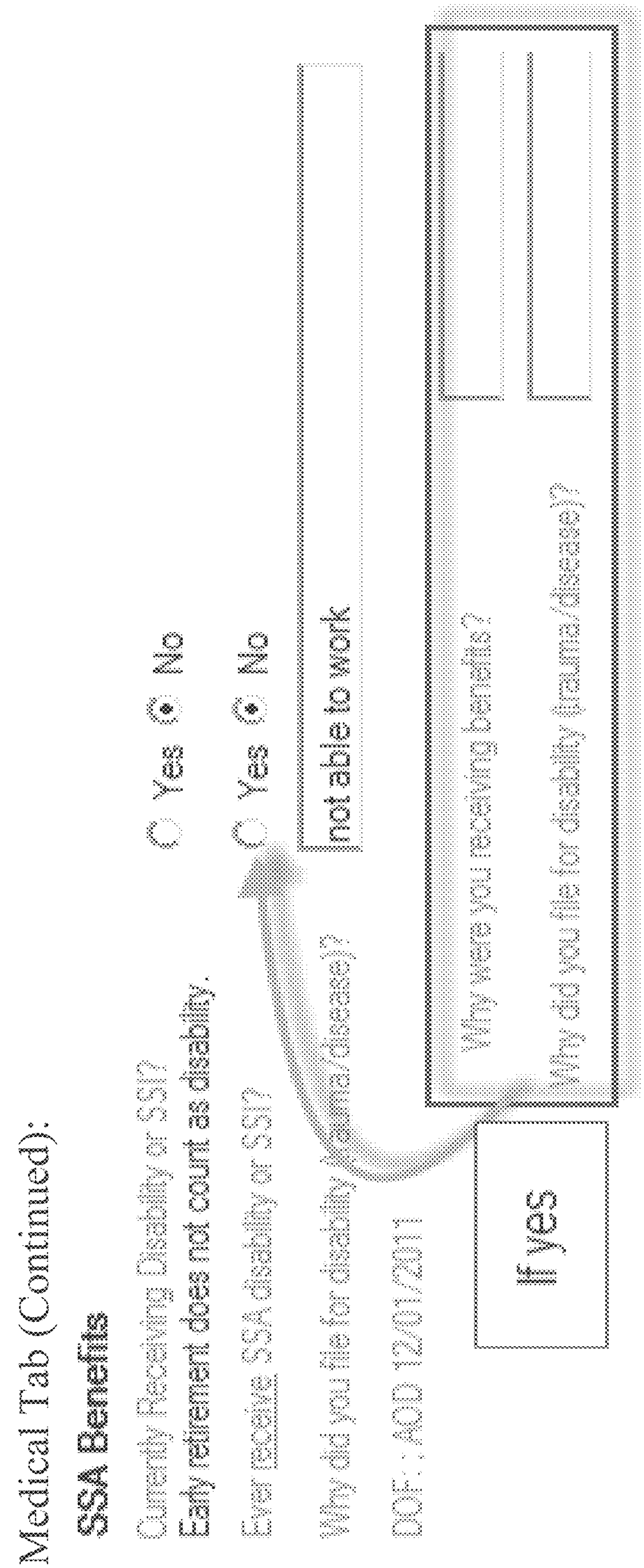
FIG. 243 is a screen shot of Initial Call Questionnaire pages.
Figure 244:
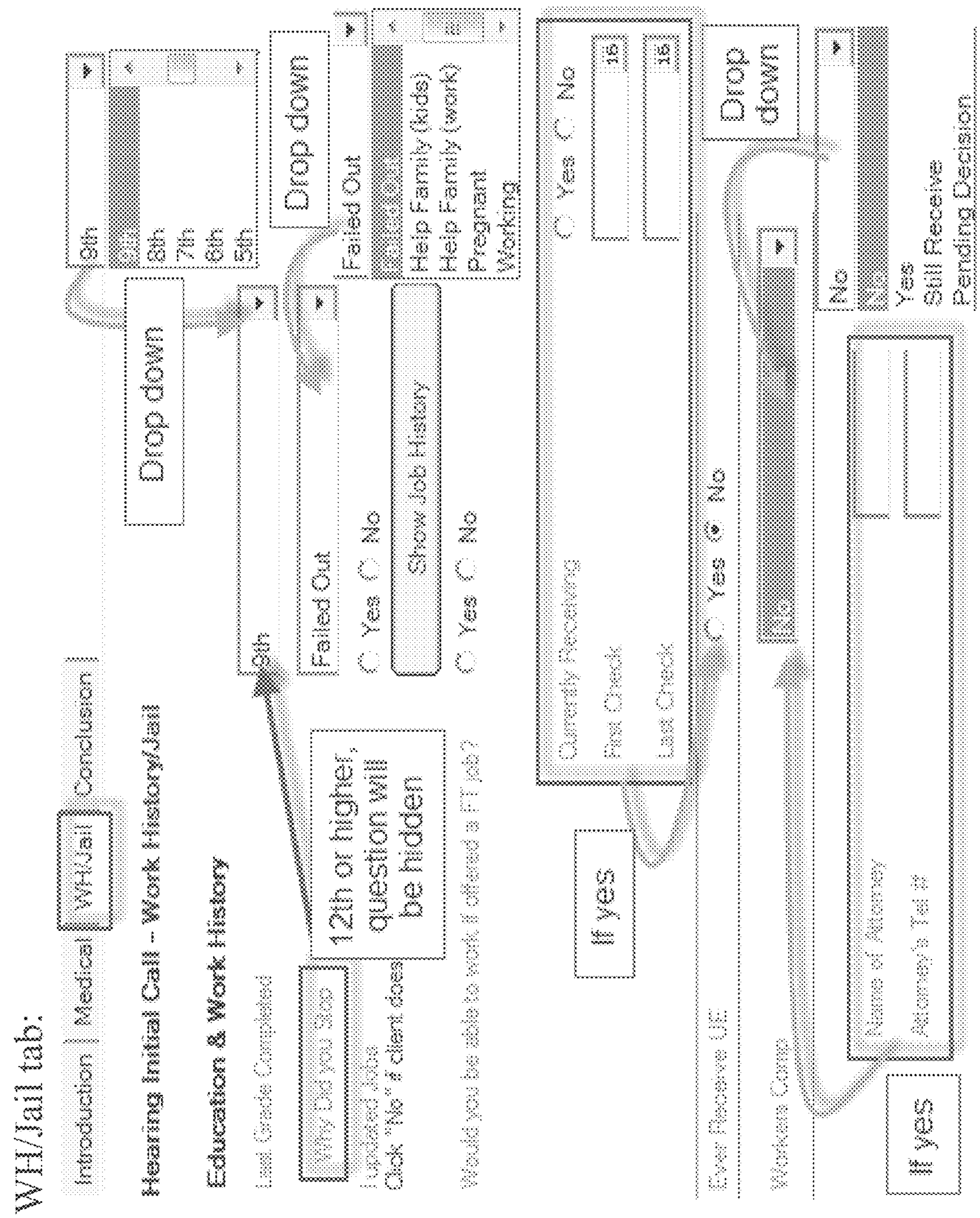
FIG. 244 is a screen shot of Initial Call Questionnaire pages.
Figure 245:
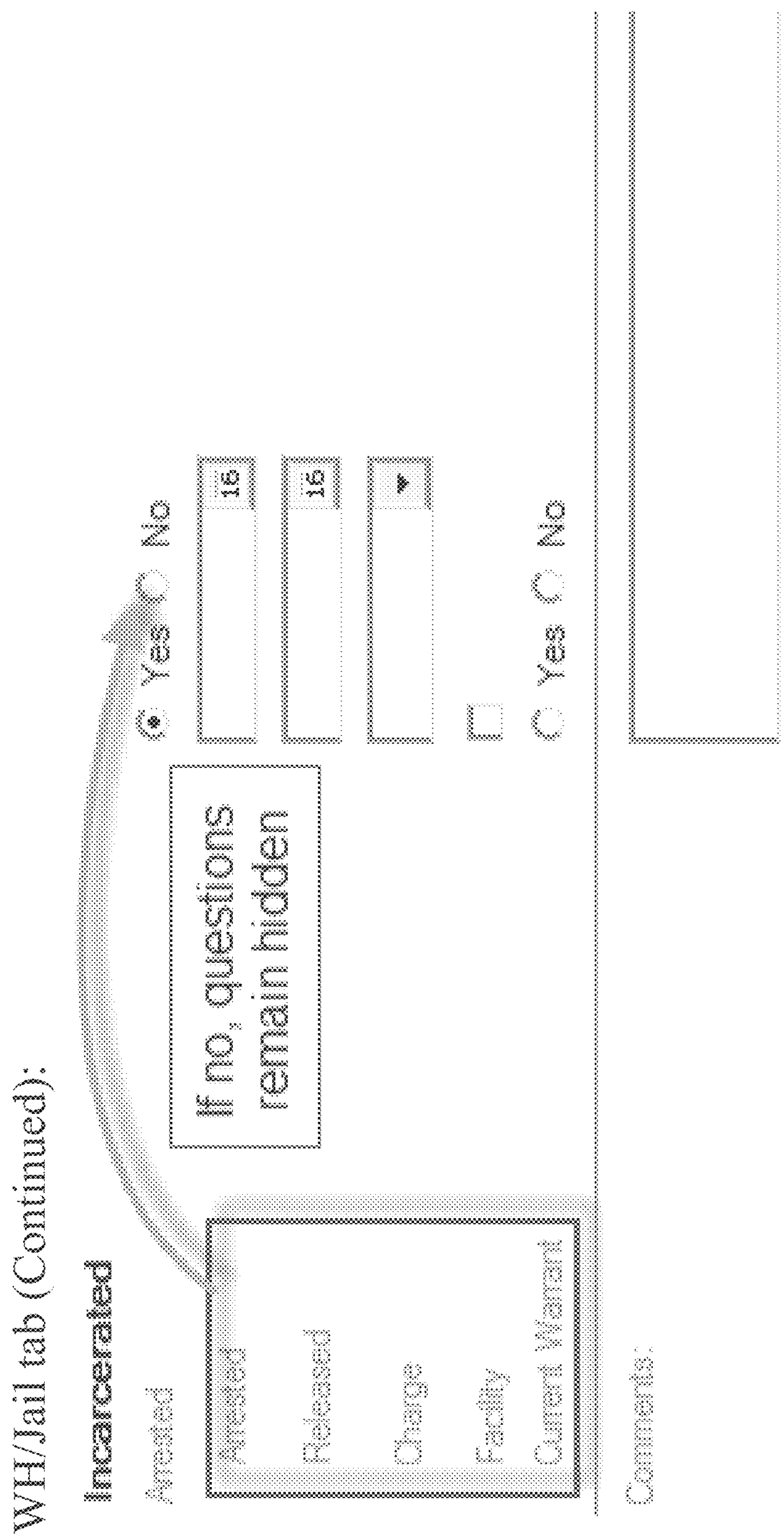
FIG. 245 is a screen shot of Initial Call Questionnaire pages.
Figure 246B:
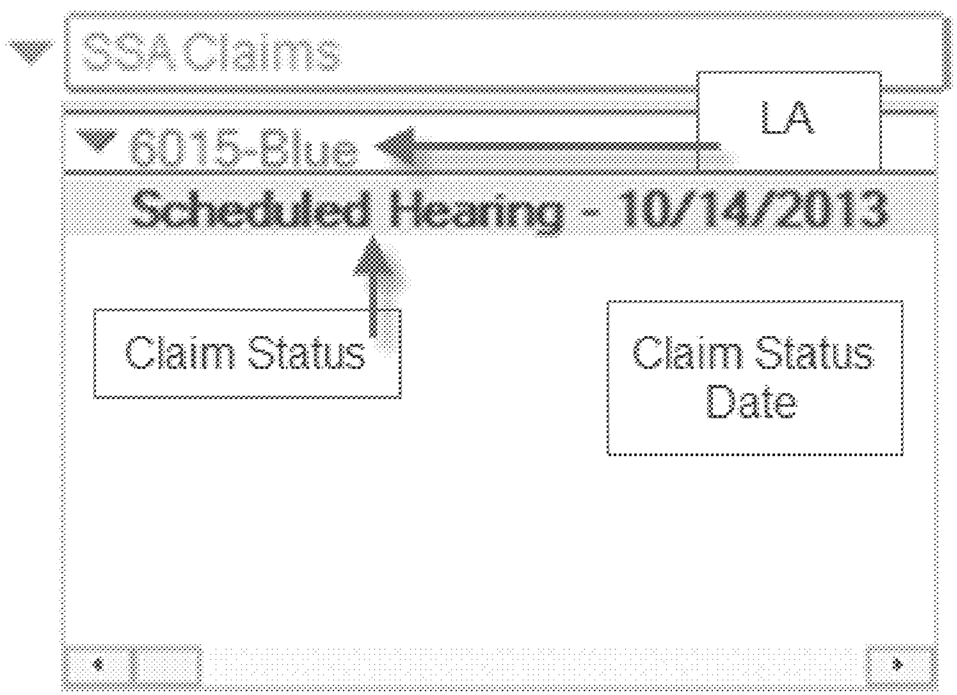
Figure 248:
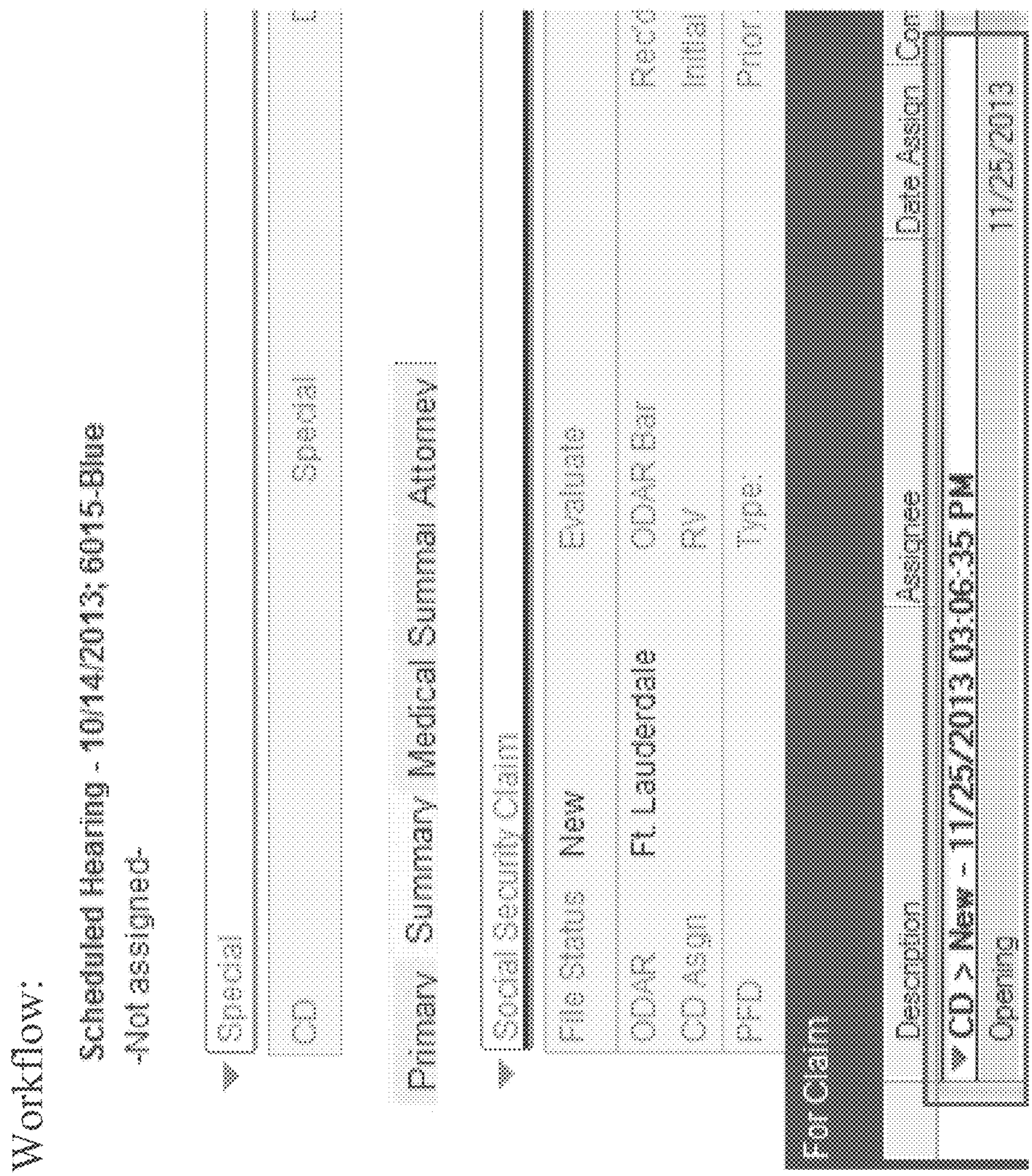
FIG. 248 is a screen shot of SSA Hearing Views pages.
Figure 250:
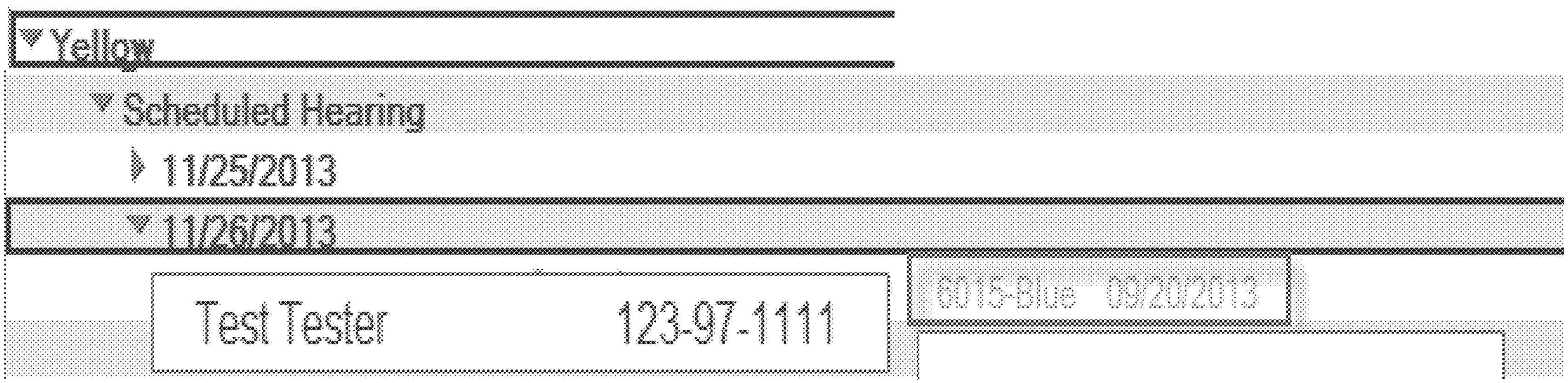
FIG. 250 is a screen shot of SSA Hearing Views pages.
Figure 251:
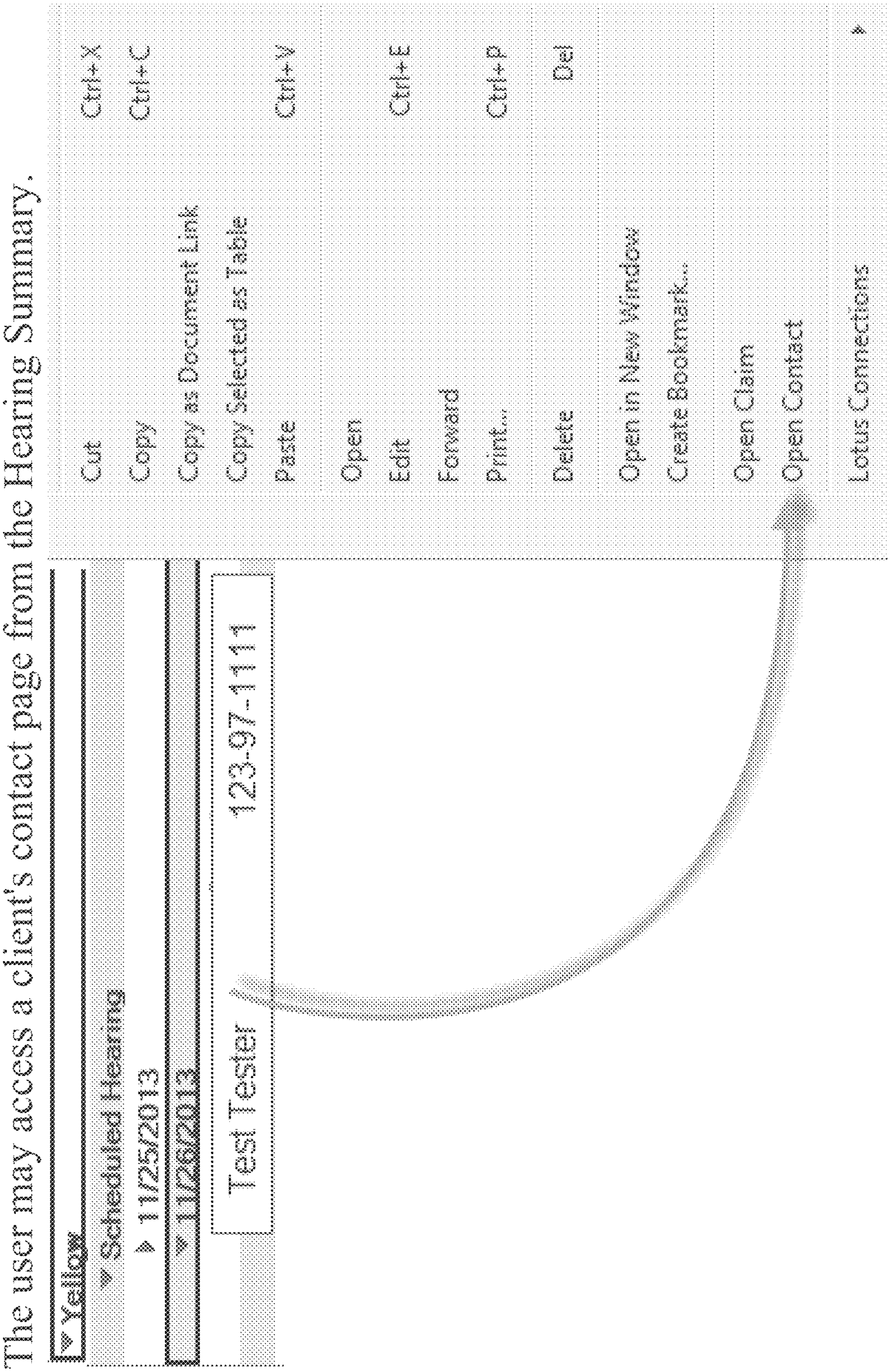
FIG. 251 is a screen shot of SSA Hearing Views pages.
Figure 252:
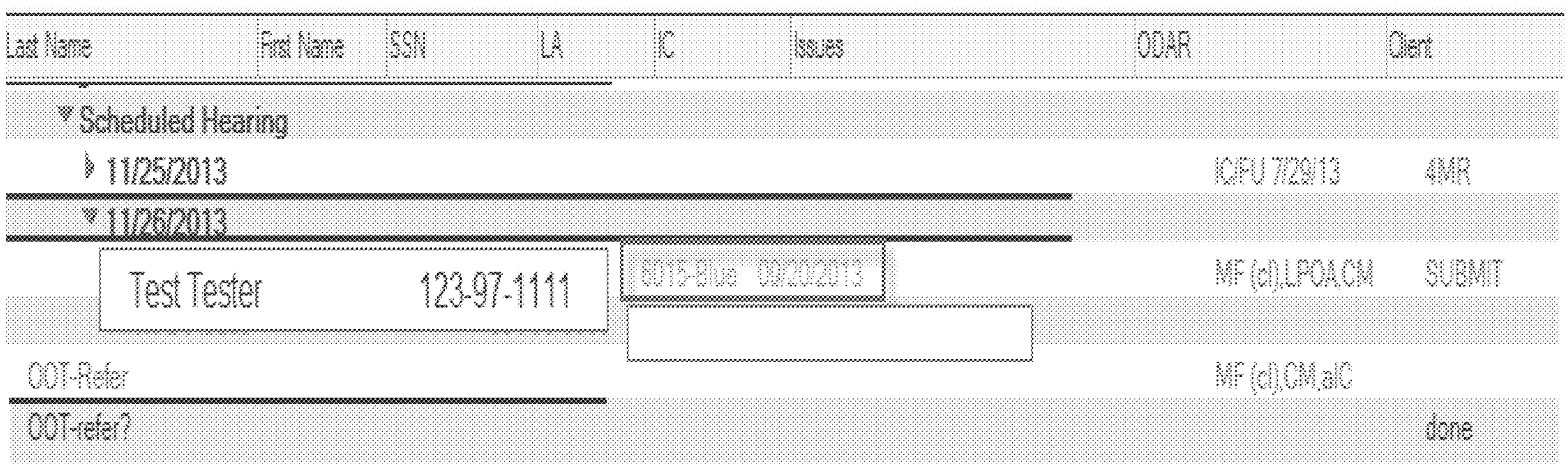
FIG. 252 is a screen shot of SSA Hearing Views pages.
Figure 254:
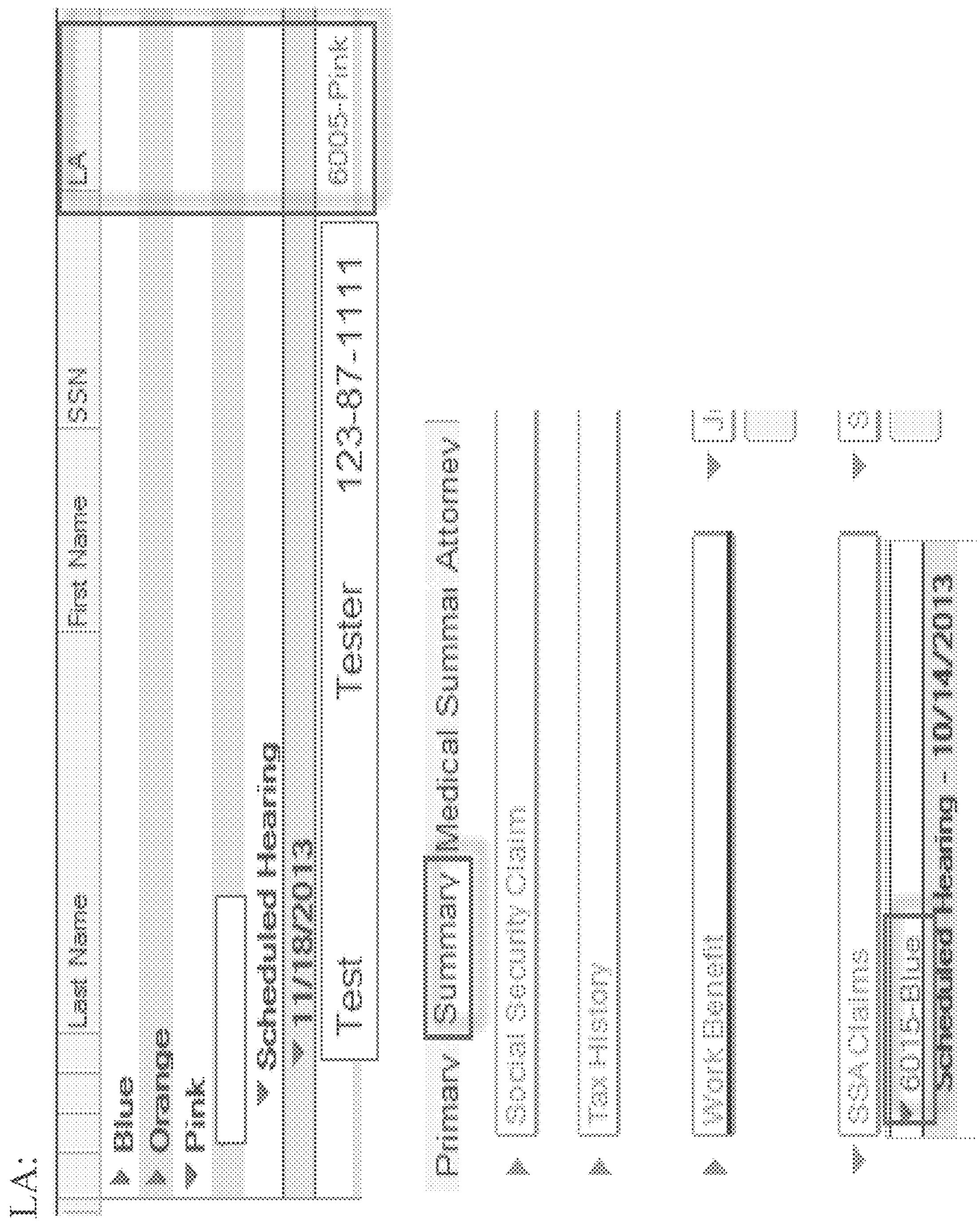
FIG. 254 is a screen shot of SSA Hearing Views pages.
Figure 255A:
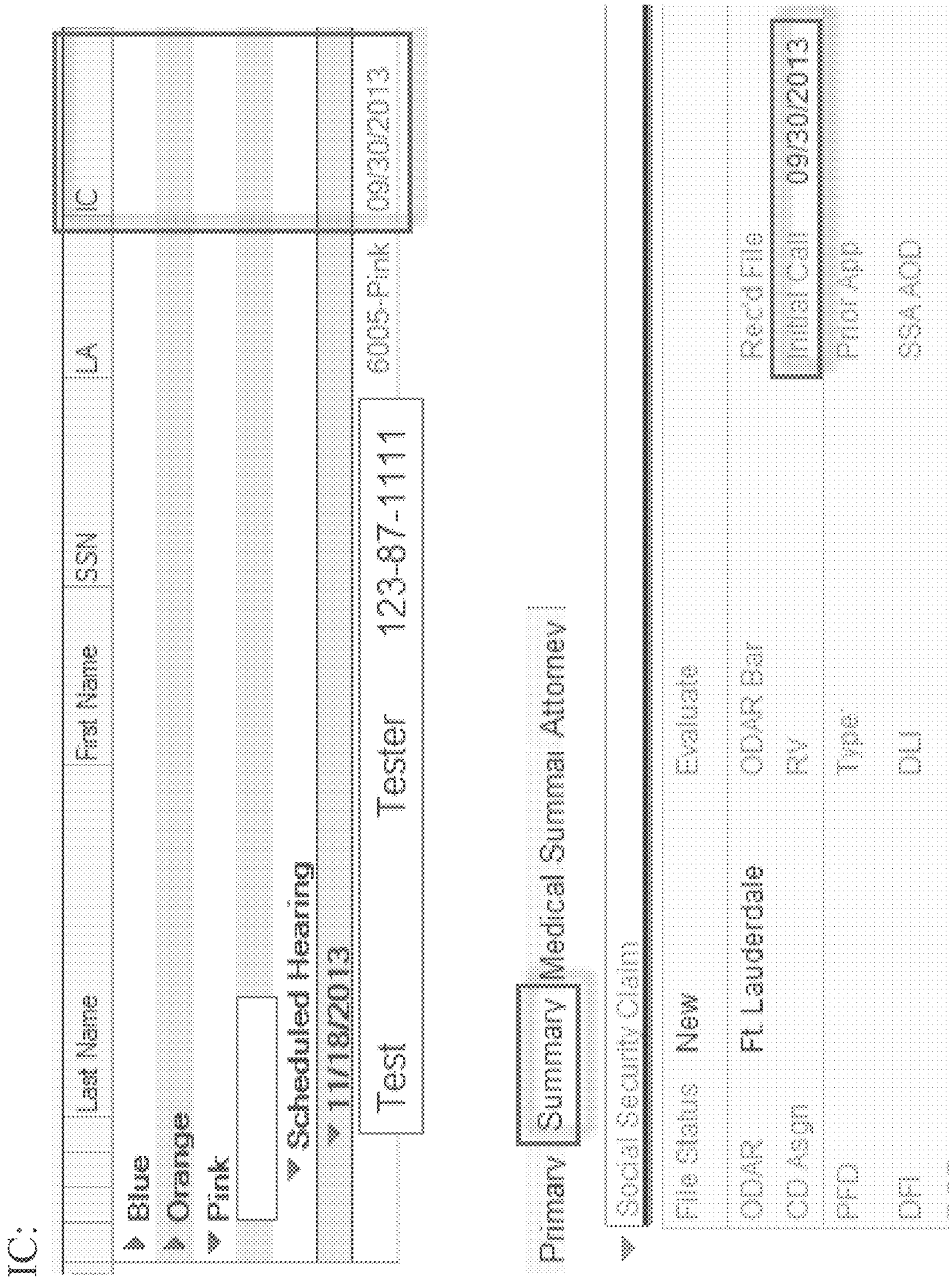
FIGS. 255a-255b are a screen shot of SSA Hearing Views pages.
Figure 255B:
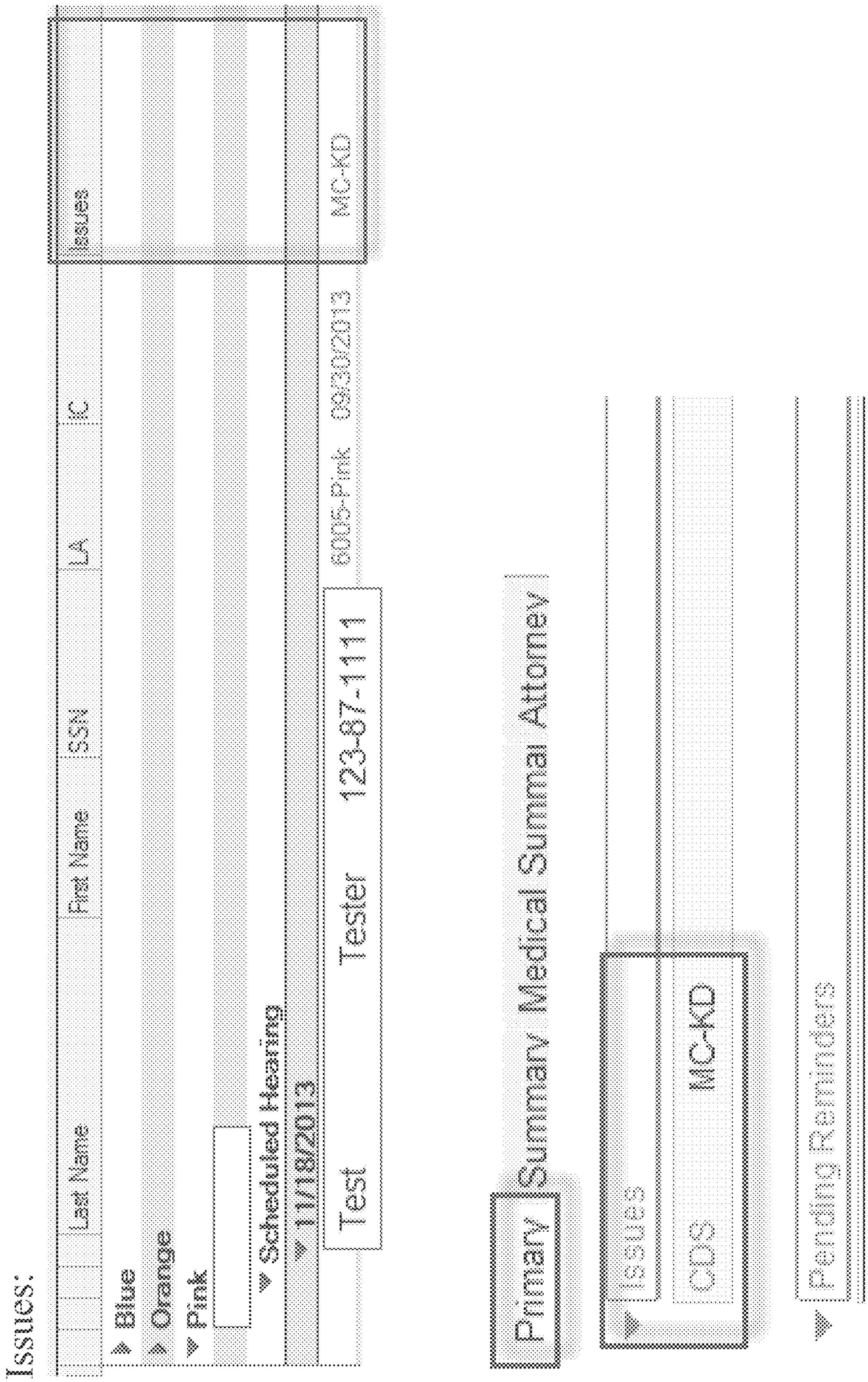
Figure 256:
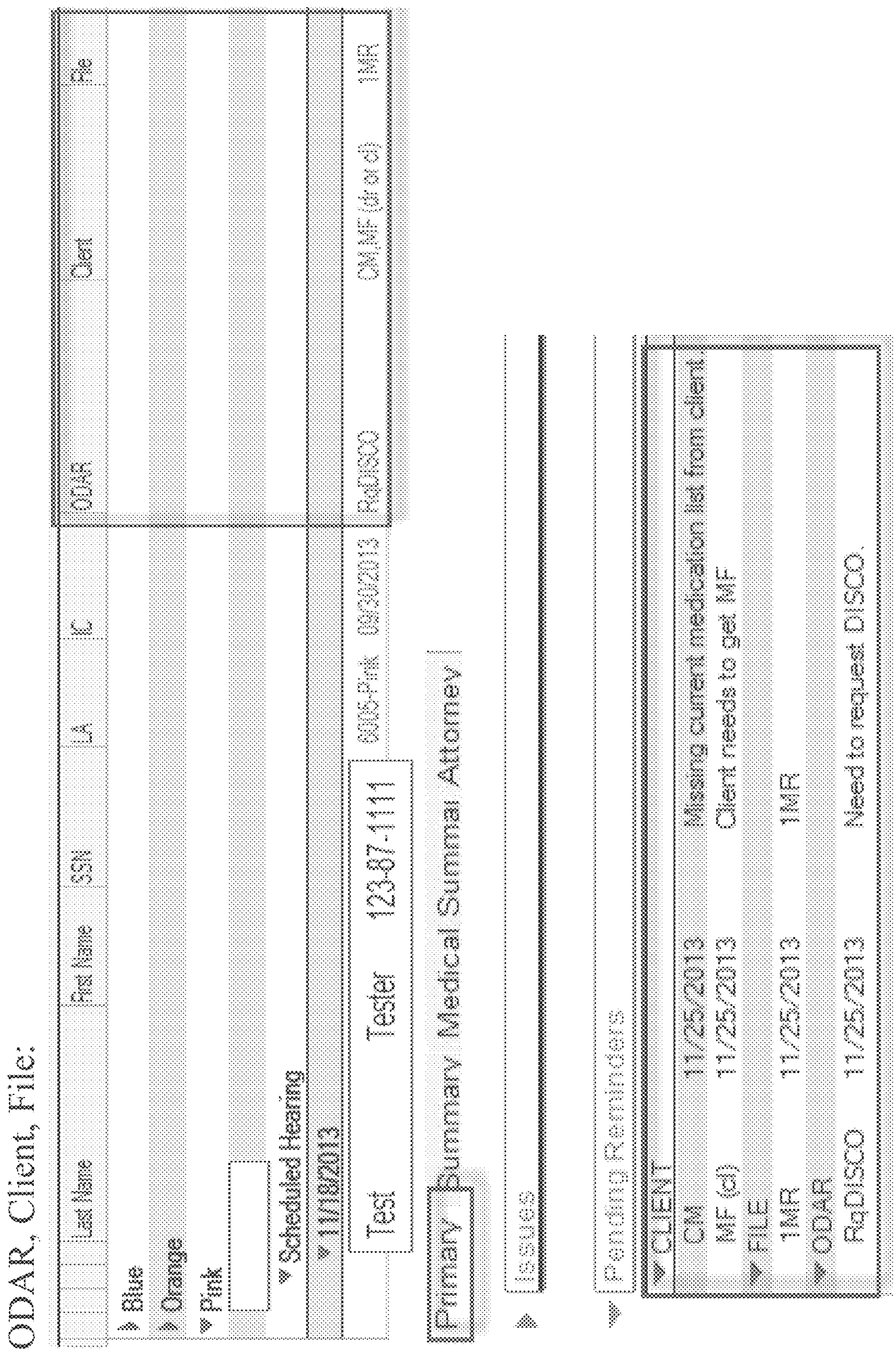
FIG. 256 is a screen shot of SSA Hearing Views pages.
Figure 257:
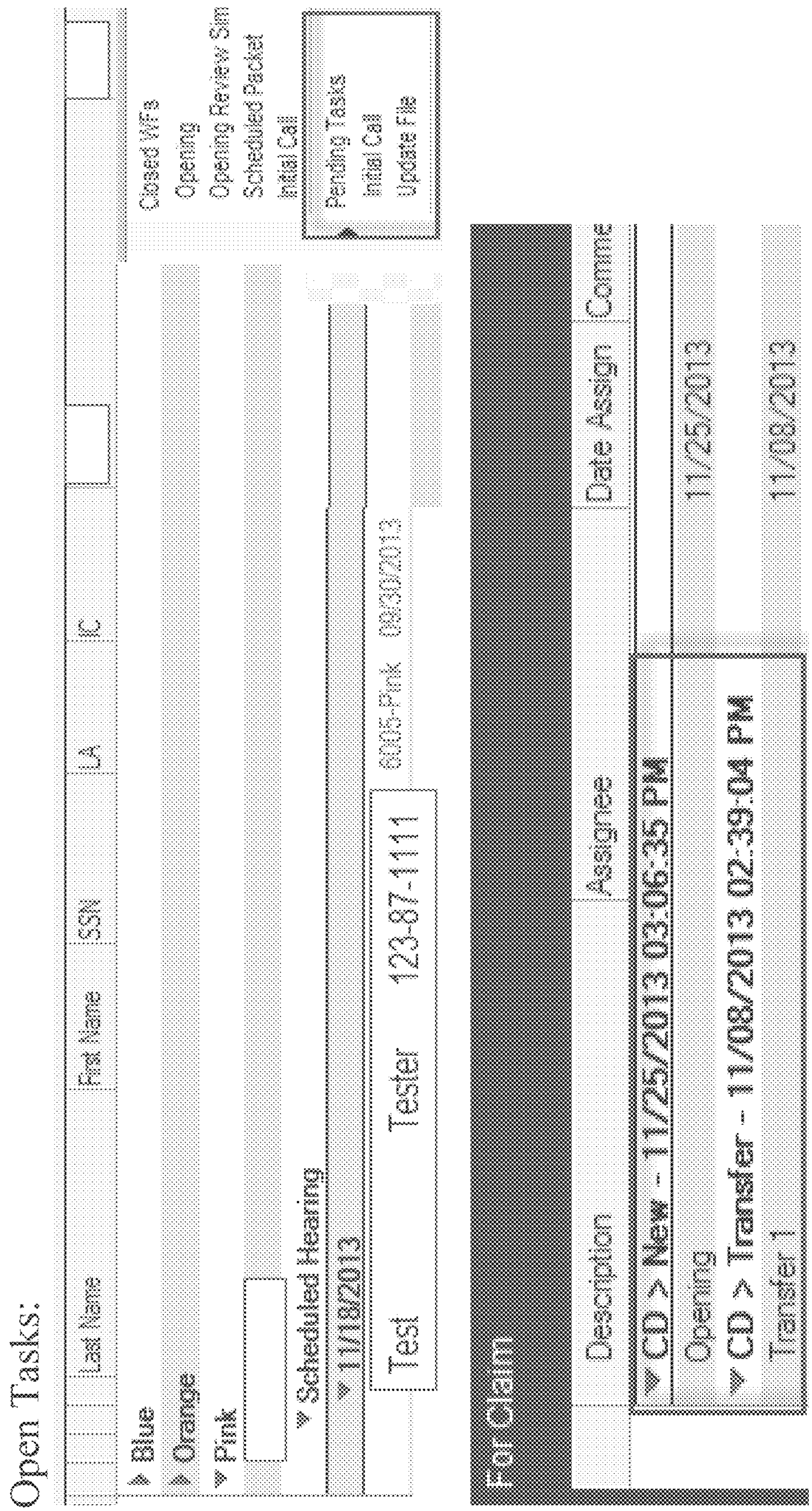
FIG. 257 is a screen shot of SSA Hearing Views pages.
Figure 260:
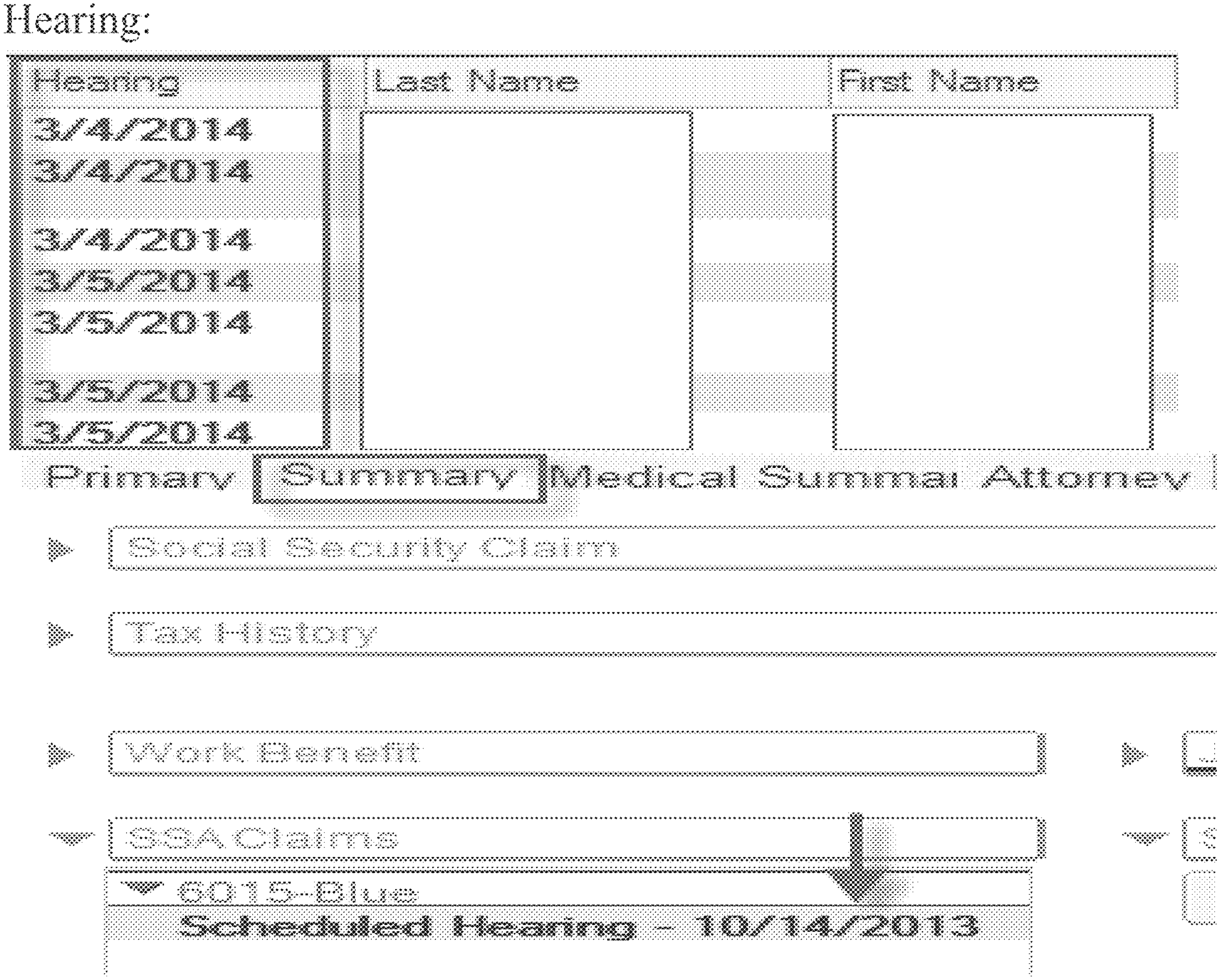
FIG. 260 is a screen shot of SSA Hearing Views pages.
Figure 261A:
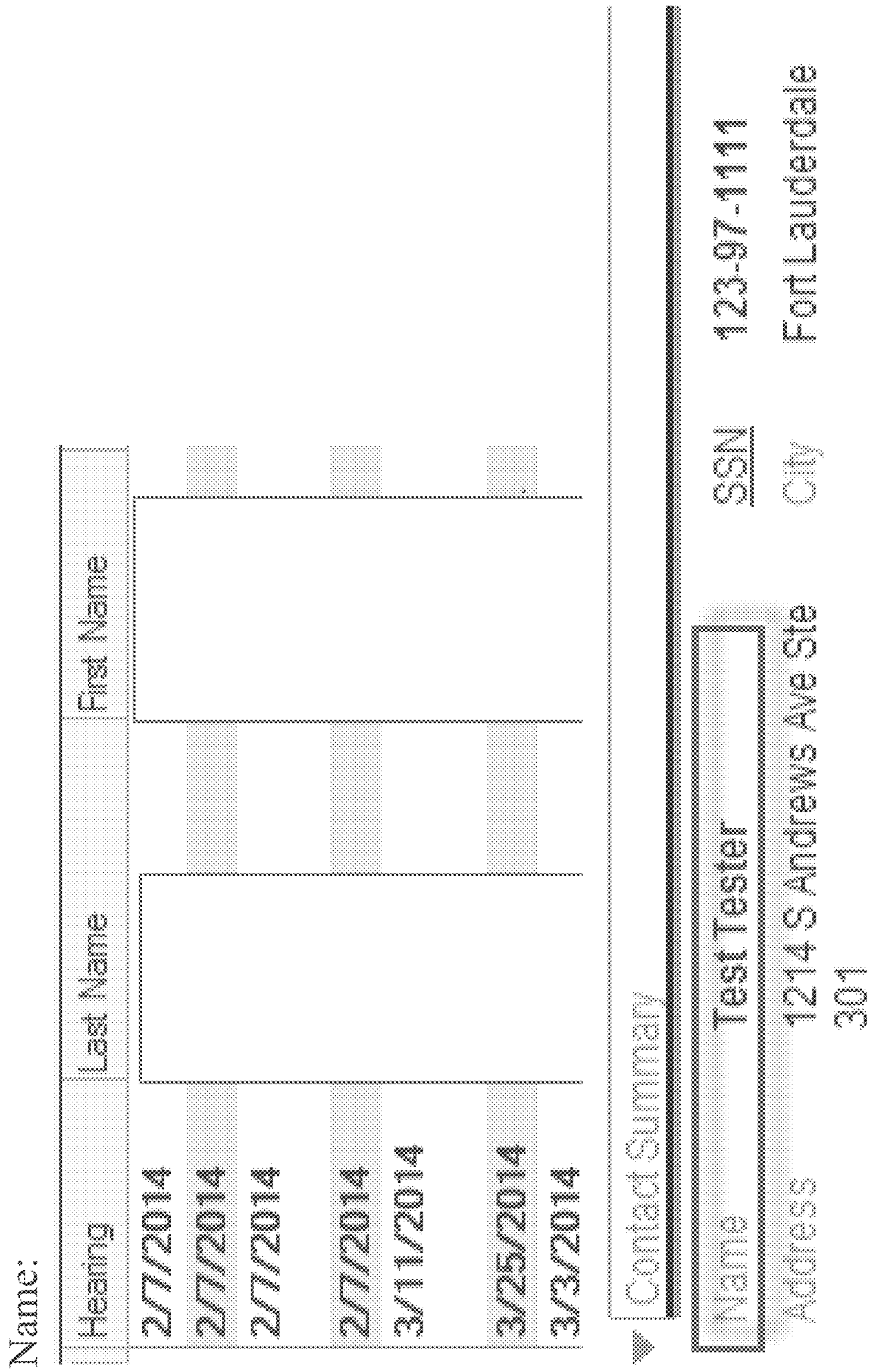
FIGS. 261a-261b are a screen shot of SSA Hearing Views pages.
Figure 261B:
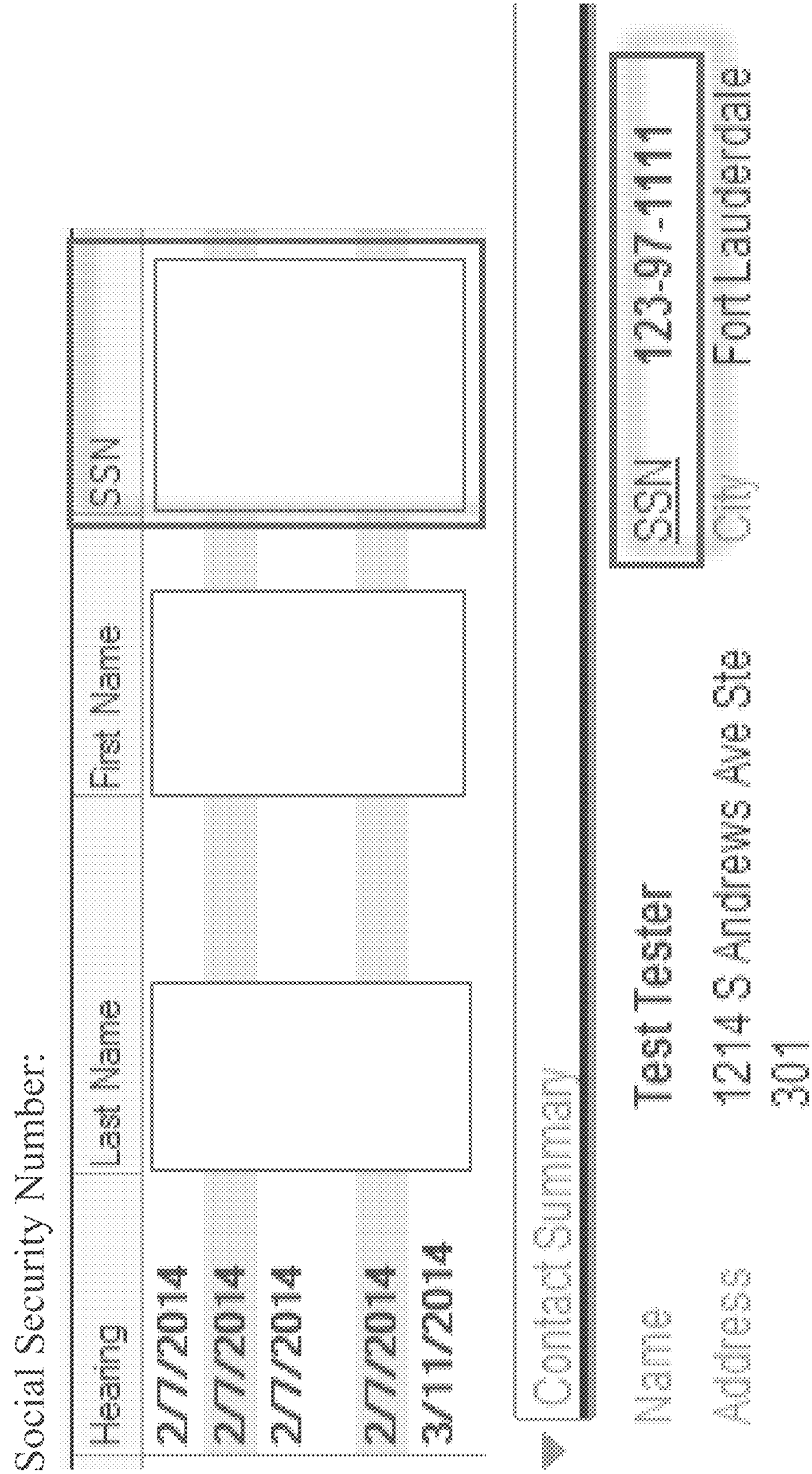
Figure 262A:
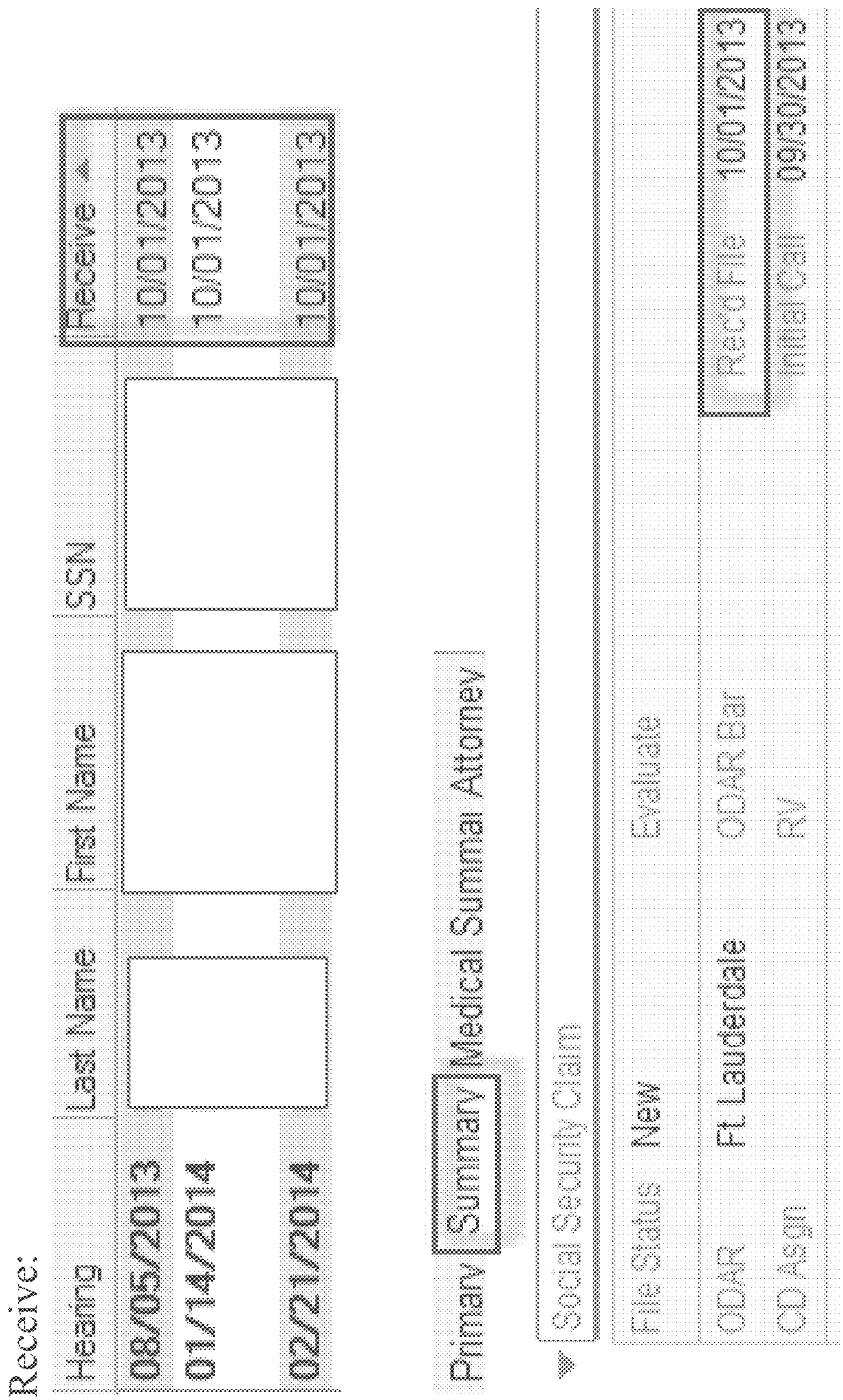
FIGS. 262a-262b are a screen shot of SSA Hearing Views pages.
Figure 262B:
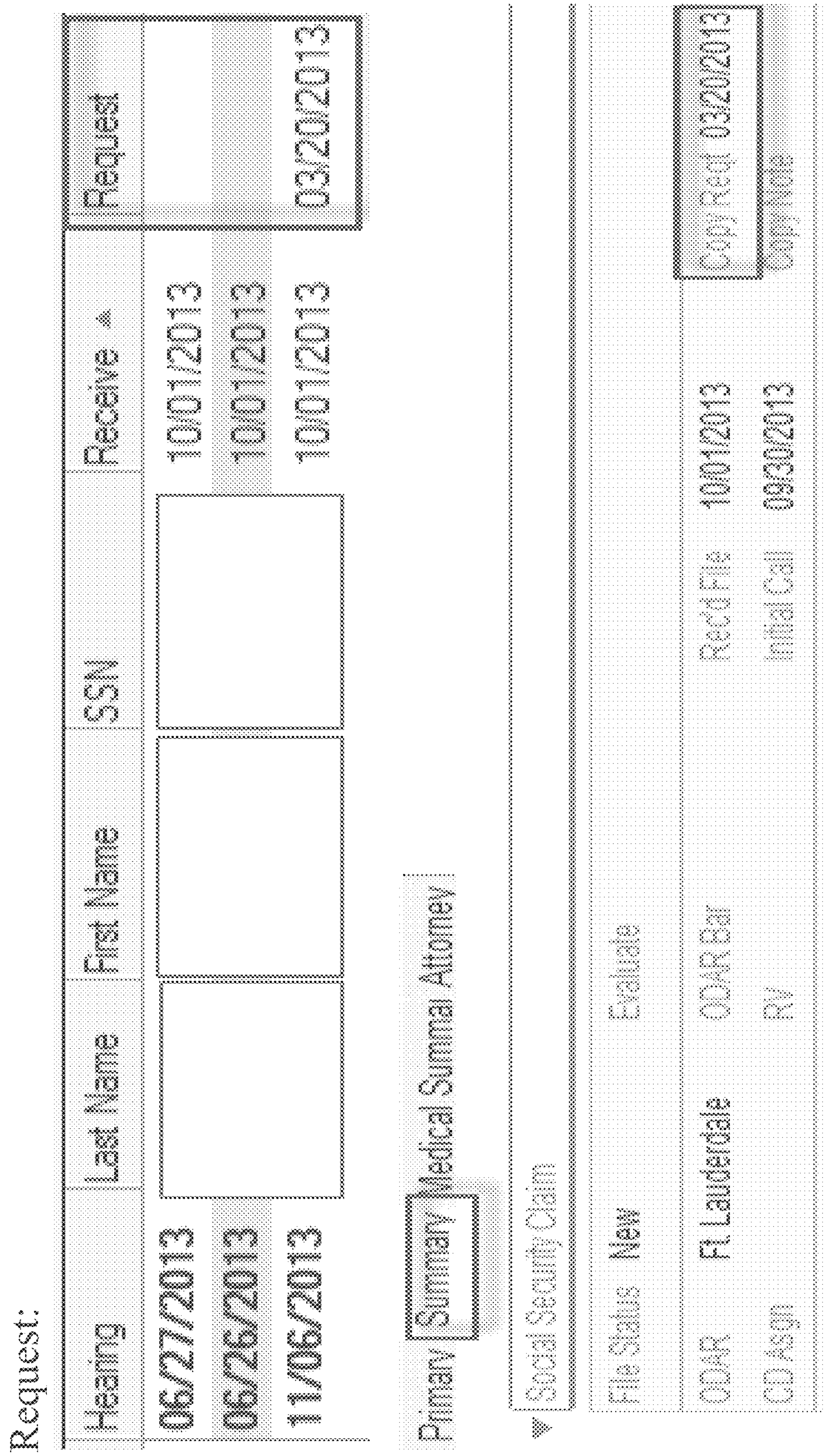
Figure 263A:
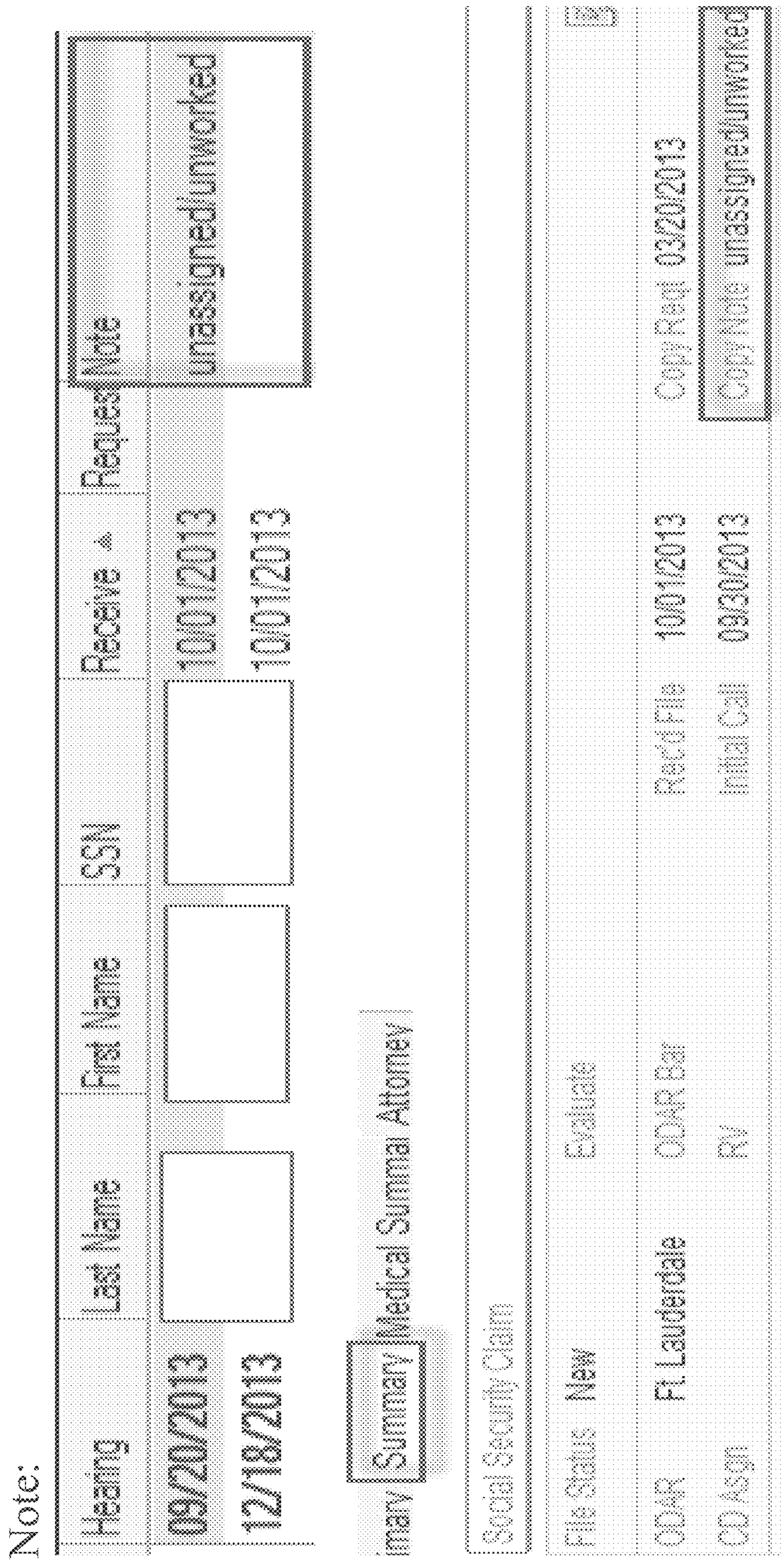
FIGS. 263a-263b are a screen shot of SSA Hearing Views pages.
Figure 263B:
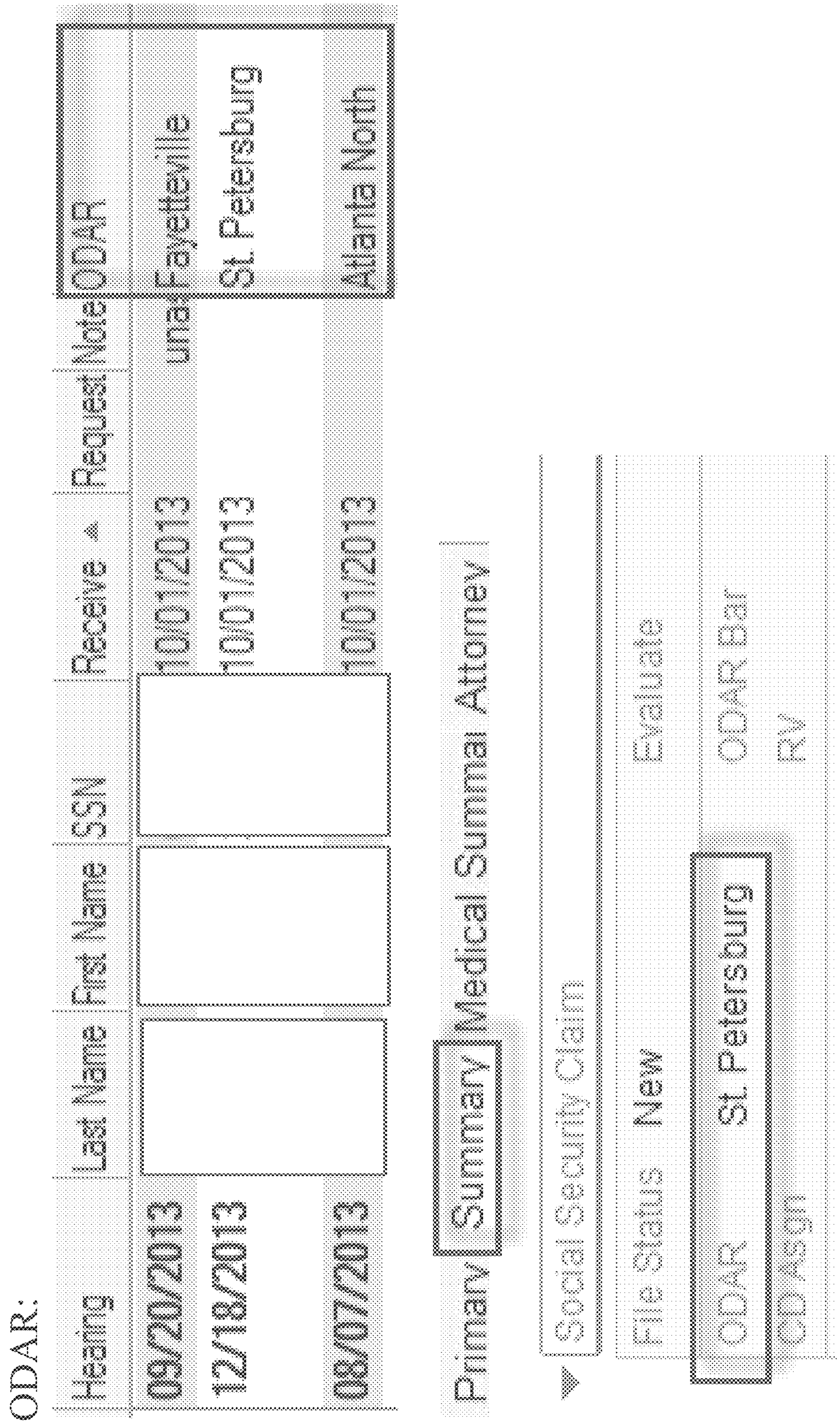
Figure 264:
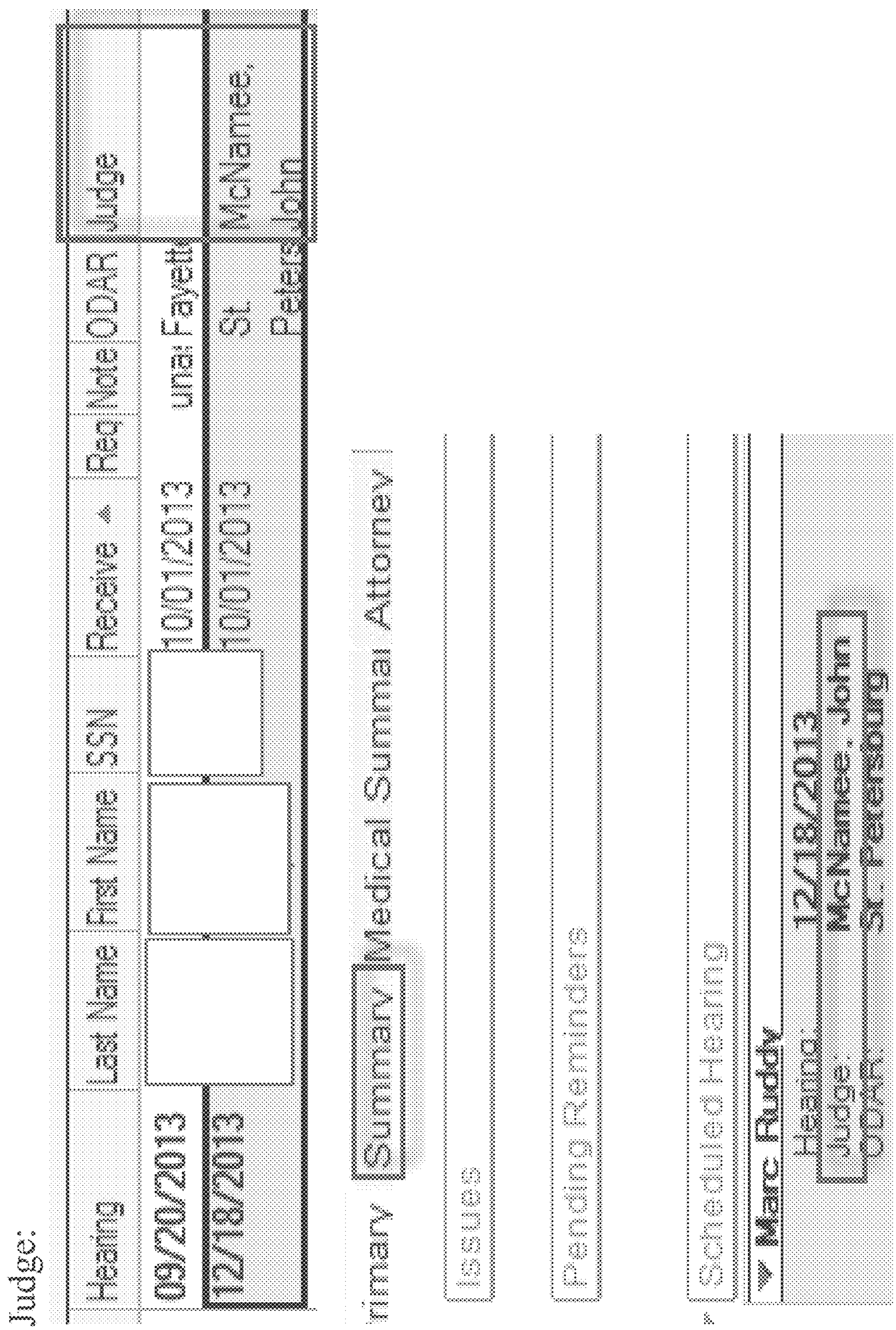
FIG. 264 is a screen shot of SSA Hearing Views pages.
Figure 265:
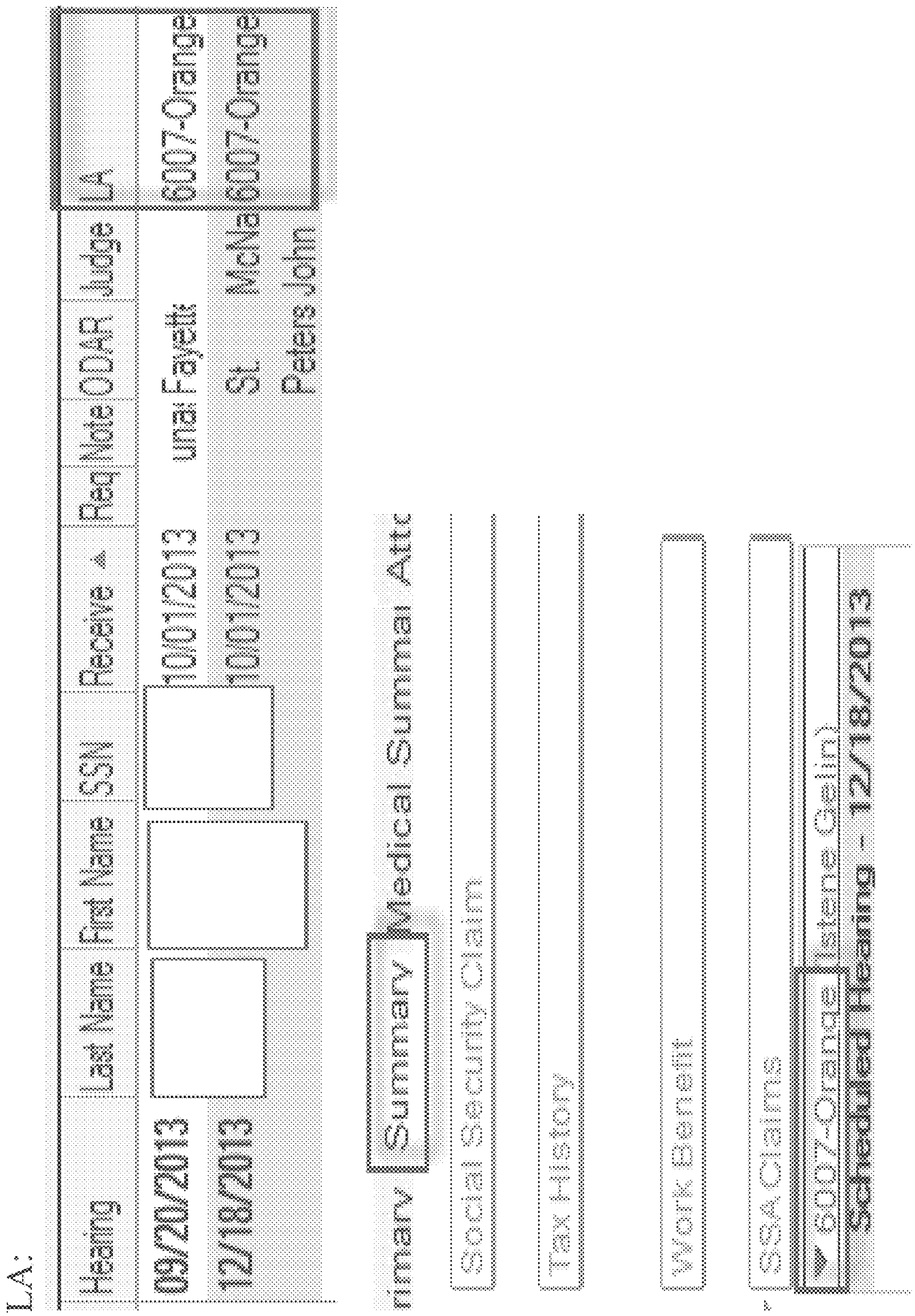
FIG. 265 is a screen shot of SSA Hearing Views pages.
Figure 268:
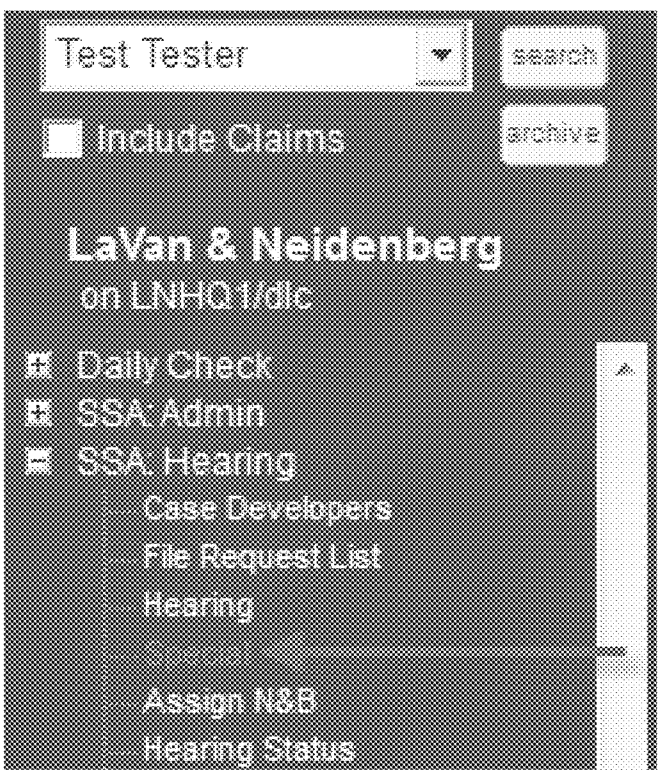
FIG. 268 is a screen shot of SSA Hearing Views pages.
Figure 269:
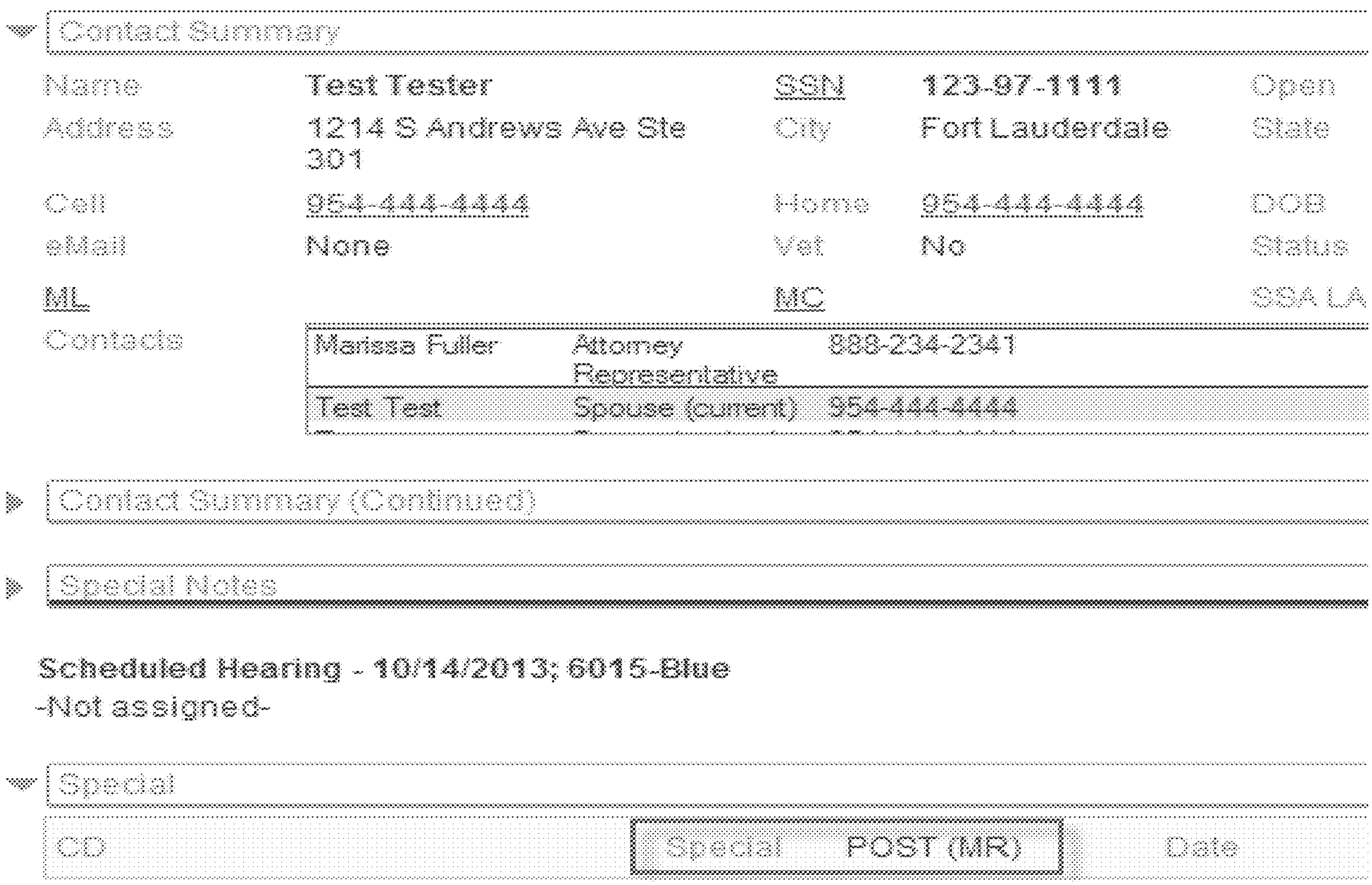
FIG. 269 is a screen shot of SSA Hearing Views pages.
Figure 270A:
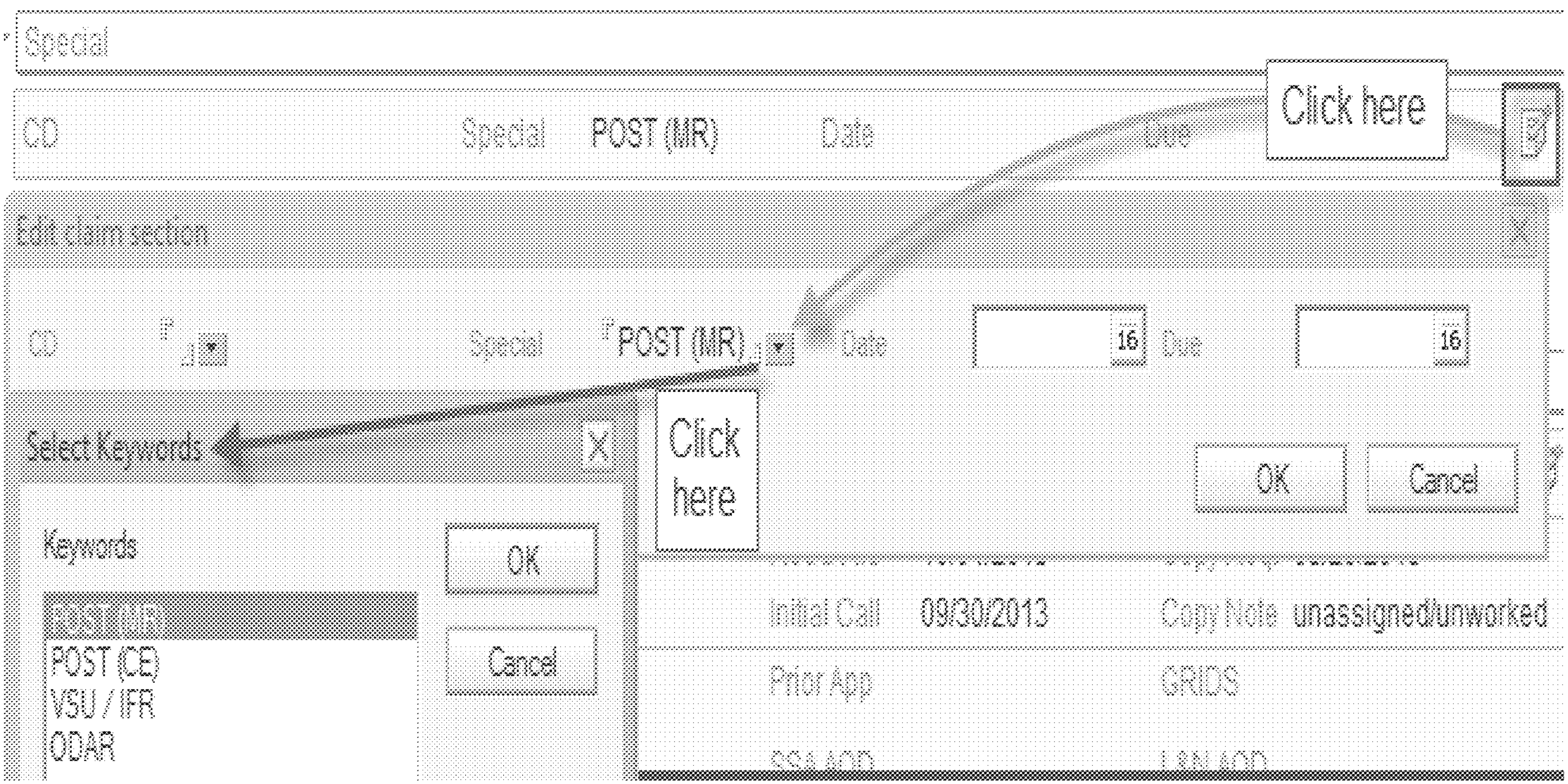
FIGS. 270*a*-270*b* are a screen shot of SSA Hearing Views pages.
Figure 270B:
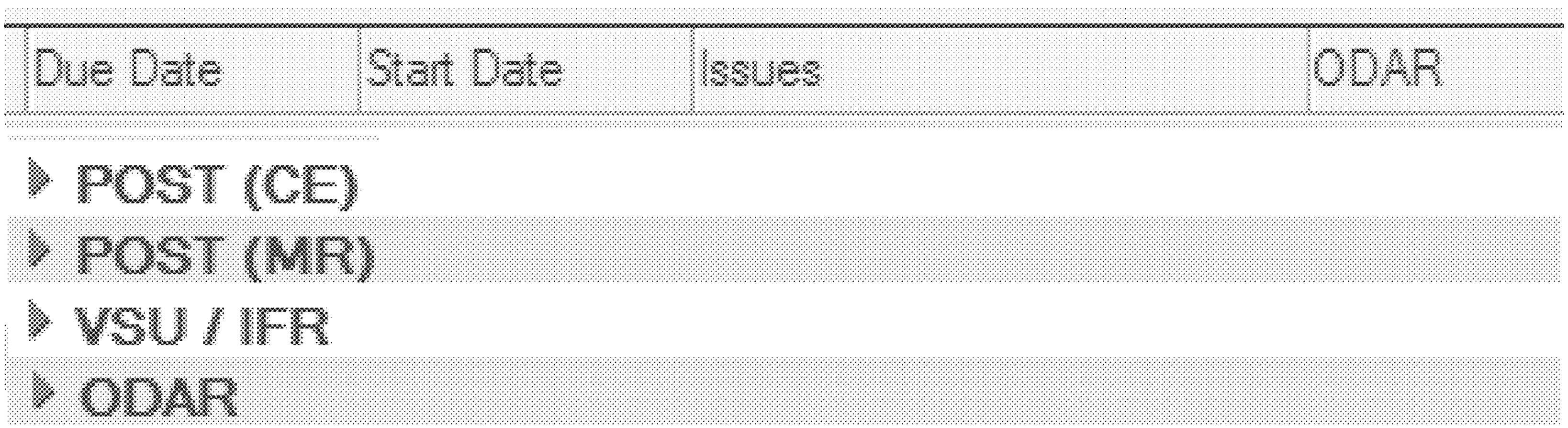
Figure 272B:
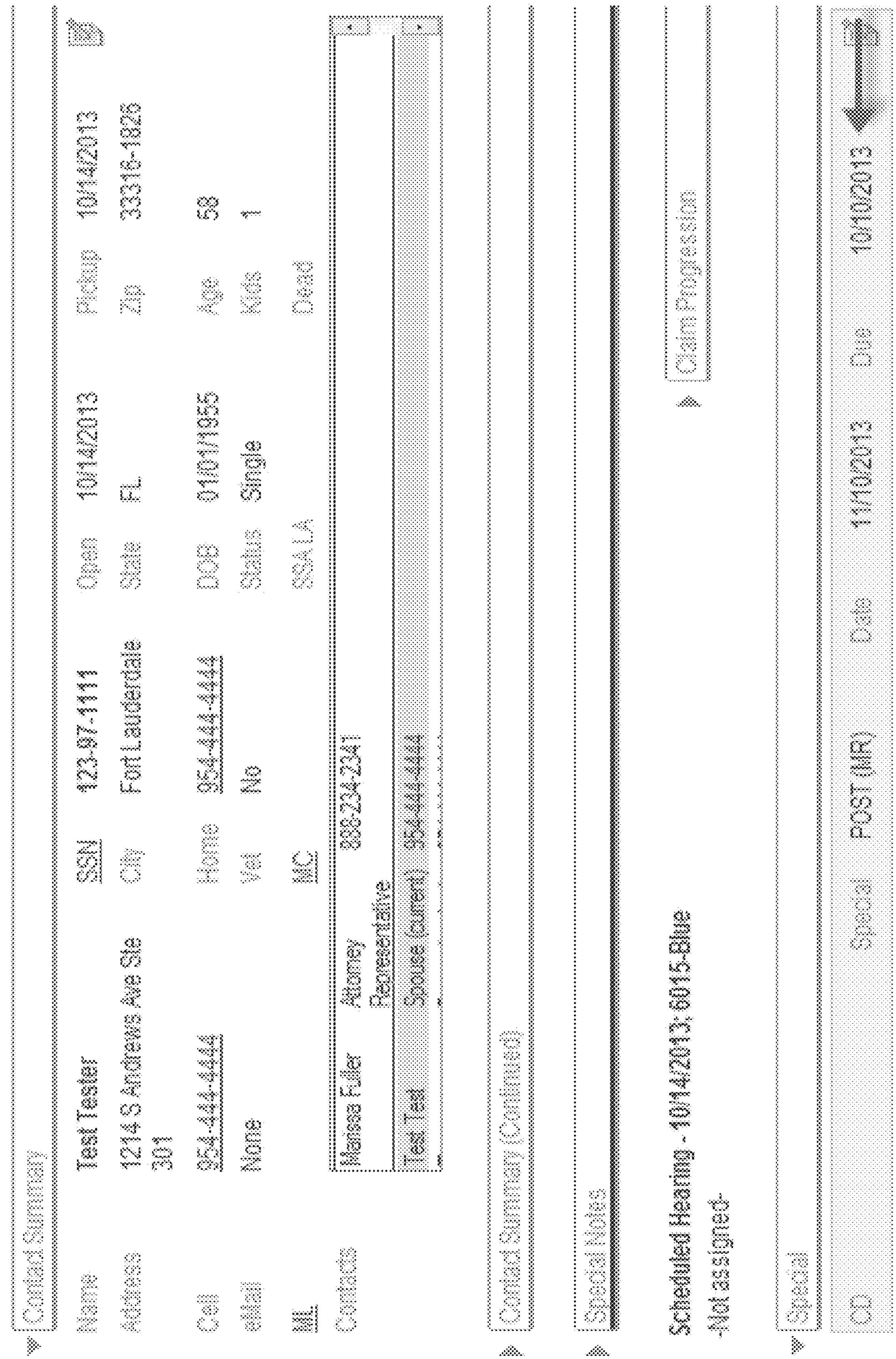
Figure 272C:
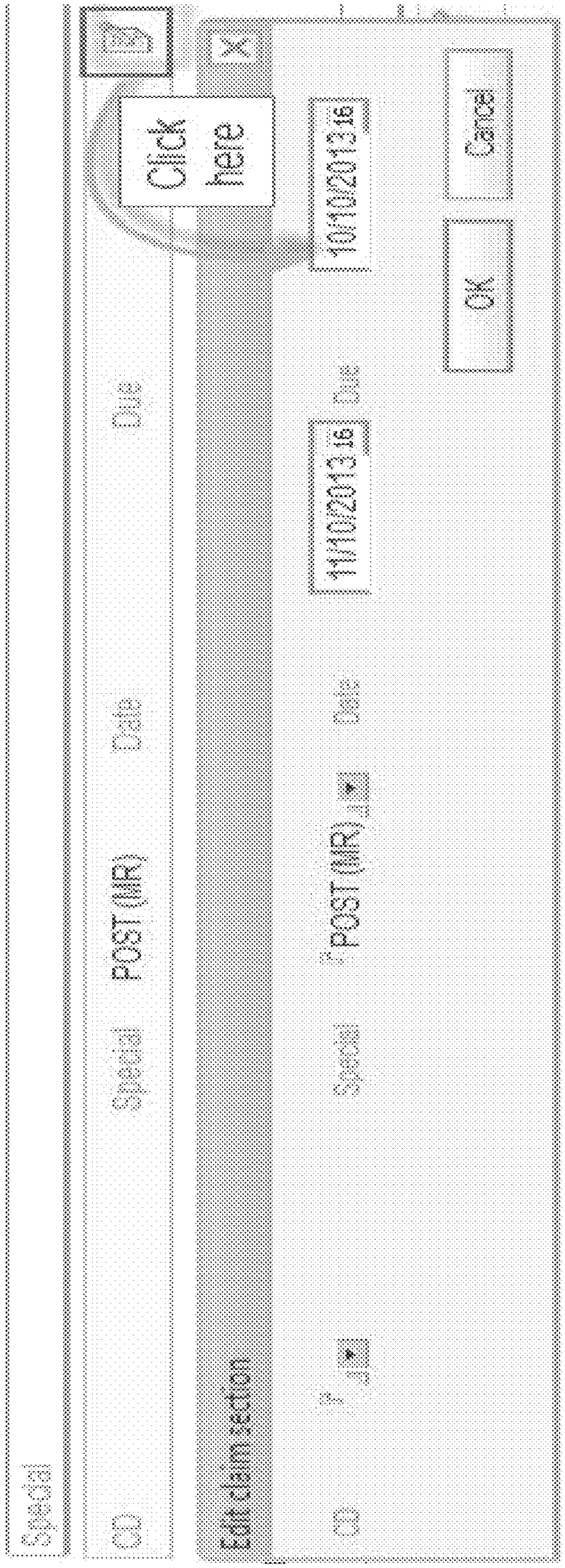
Figure 273C:
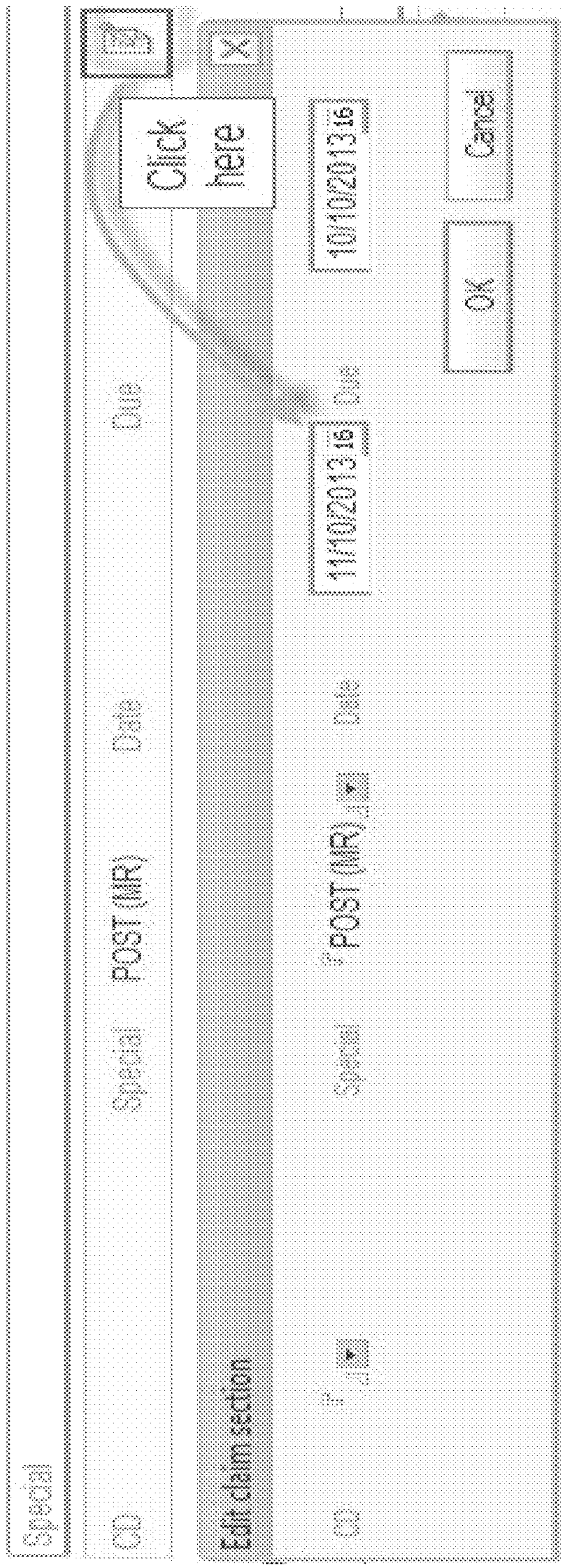
Figure 274:
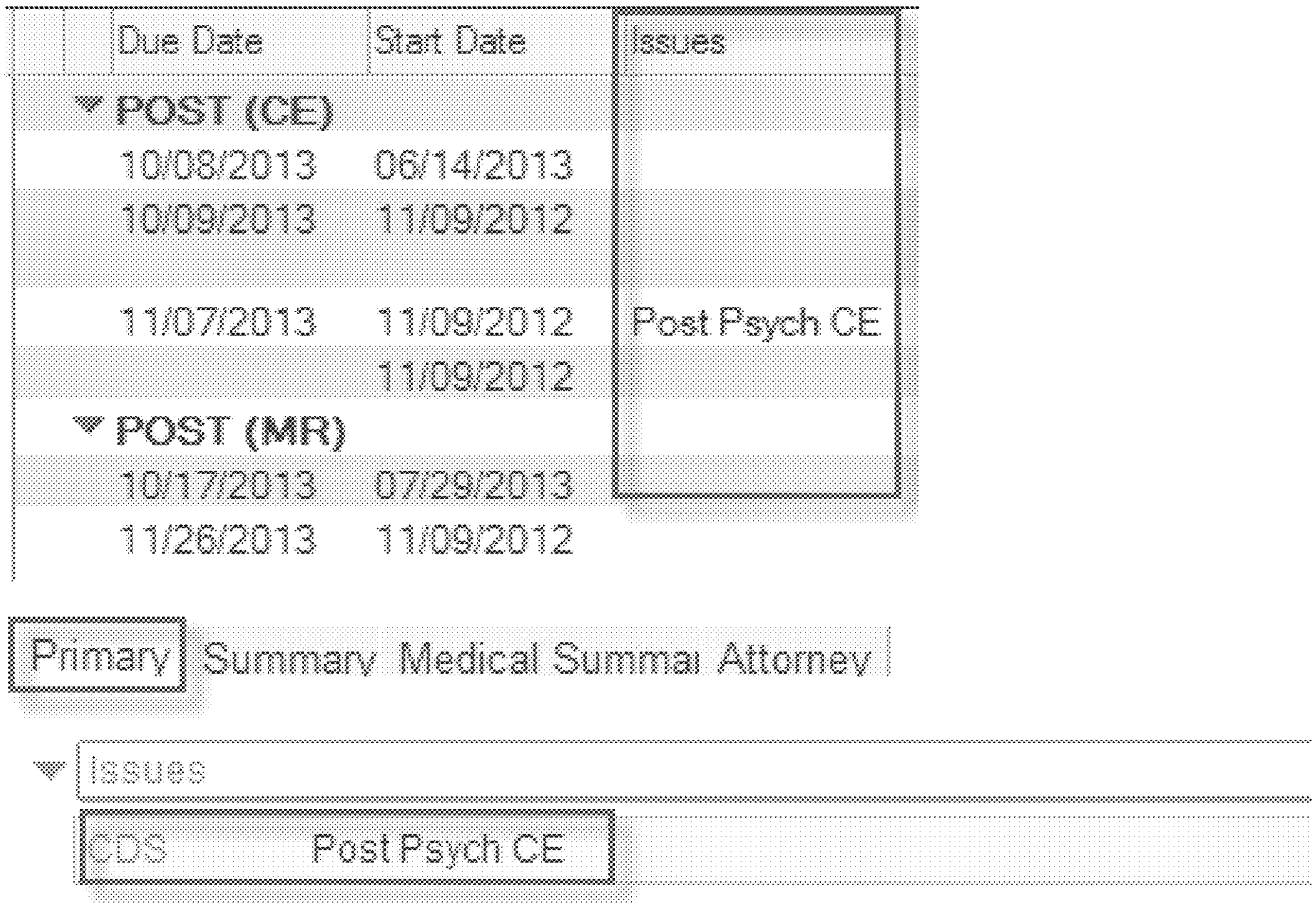
FIG. 274 is a screen shot of SSA Hearing Views pages.
Figure 275A:
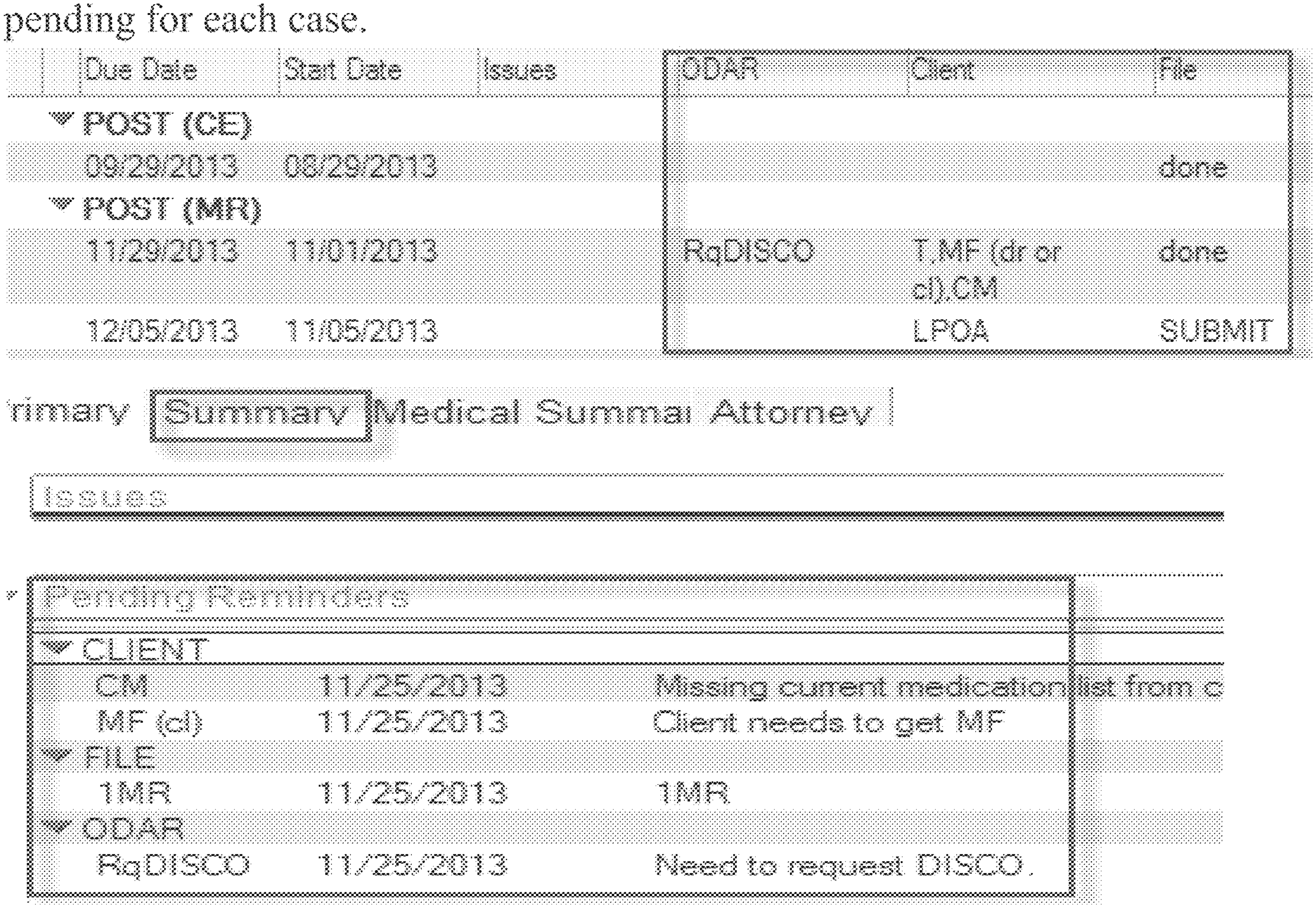
FIGS. 275*a*-275*b* are a screen shot of SSA Hearing Views pages.
Figure 275B:
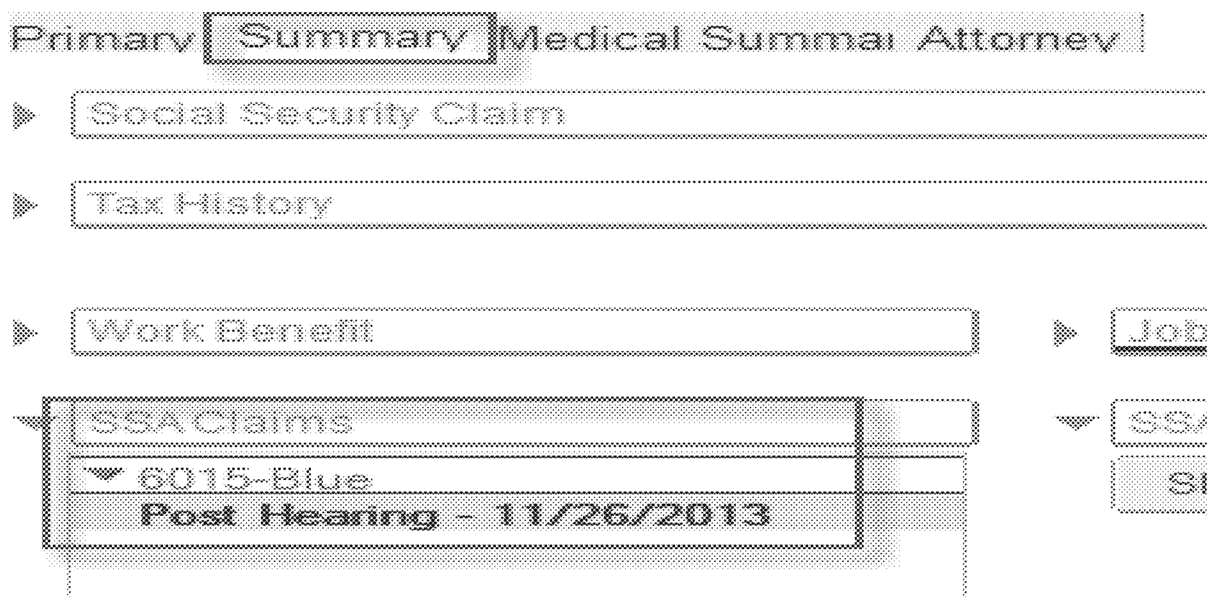
Figure 276:
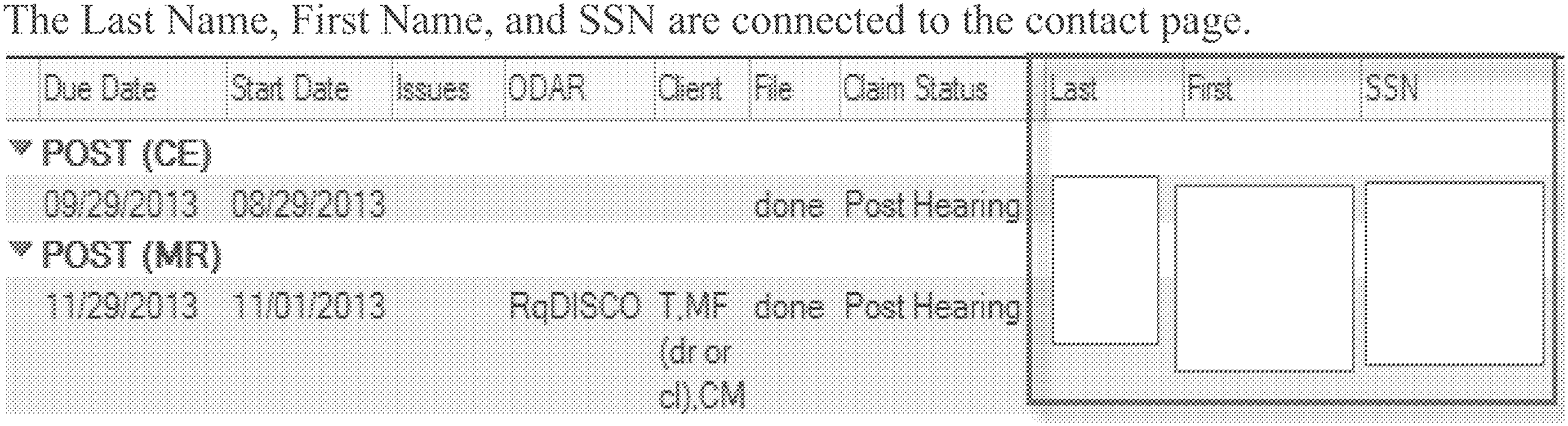
FIG. 276 is a screen shot of SSA Hearing Views pages.
Figure 277:
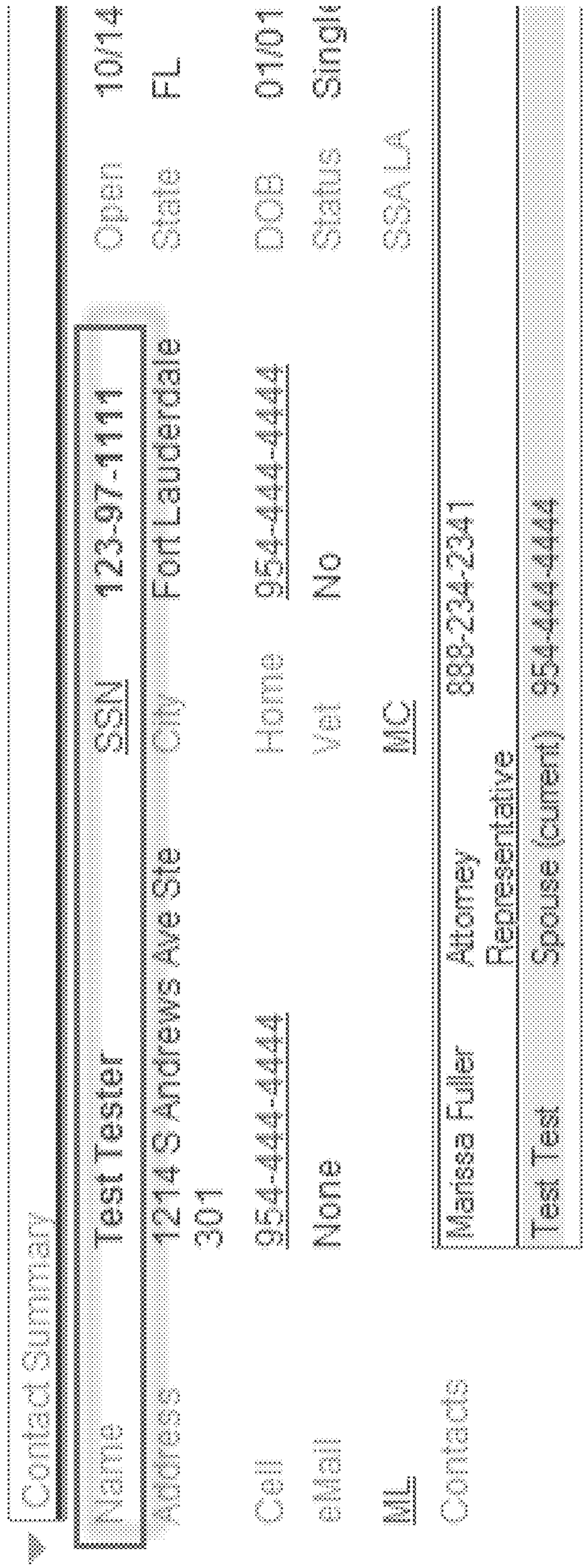
FIG. 277 is a screen shot of SSA Hearing Views pages.
Figure 278A:
Figure 279A:
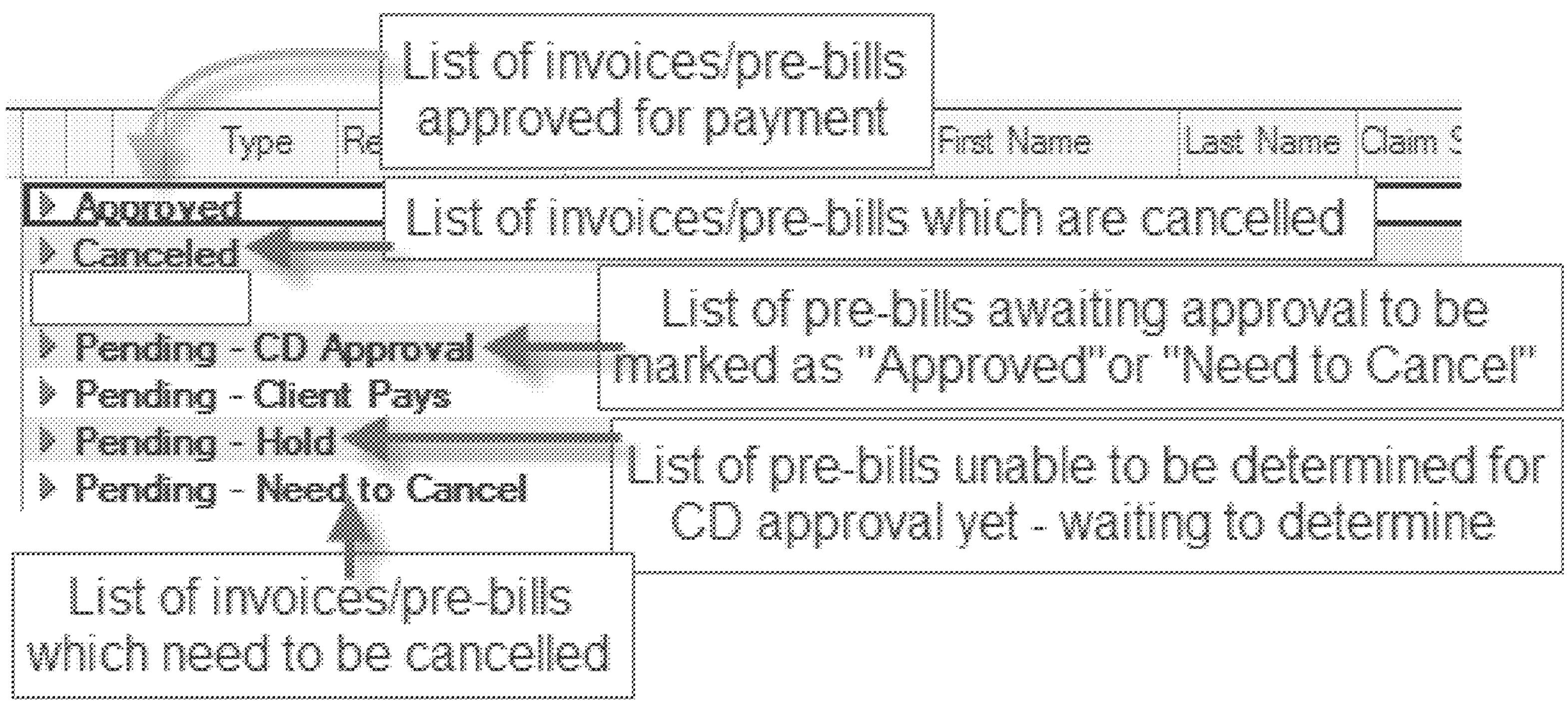
FIGS. 279*a*-279*e* are a screen shot of SSA Hearing Views pages.
Figure 279B:
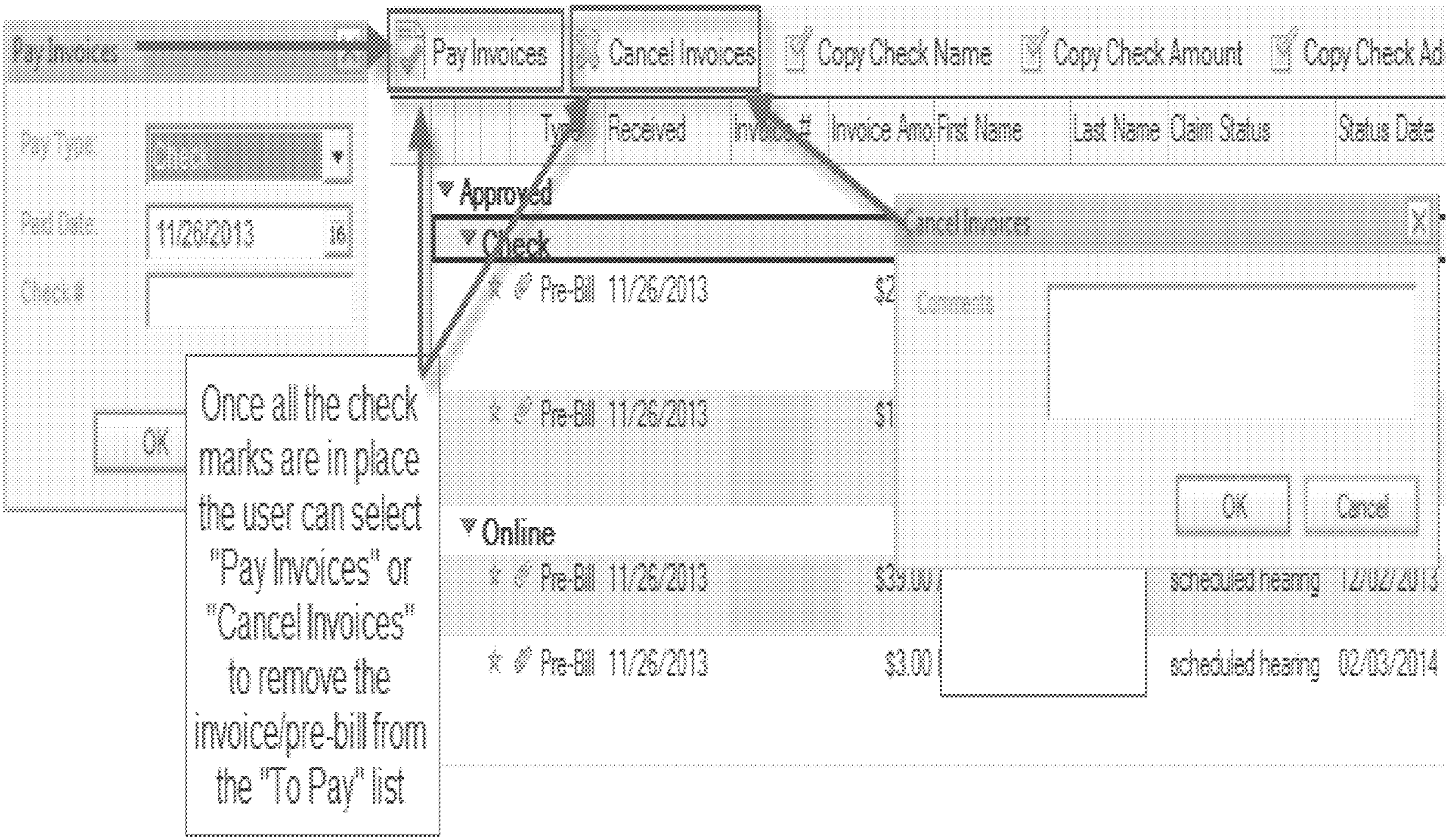
Figure 279C:
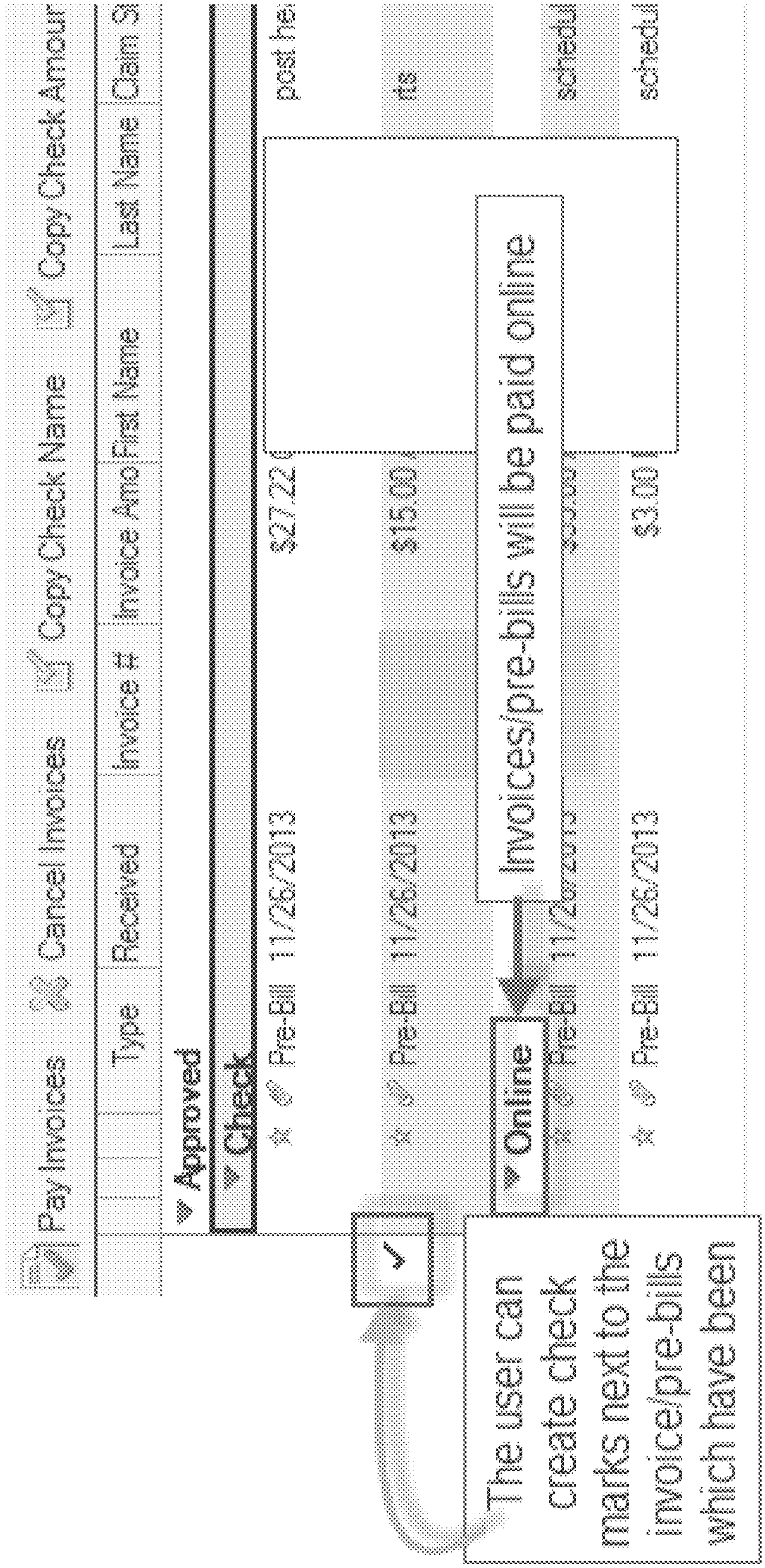
Figure 279D:
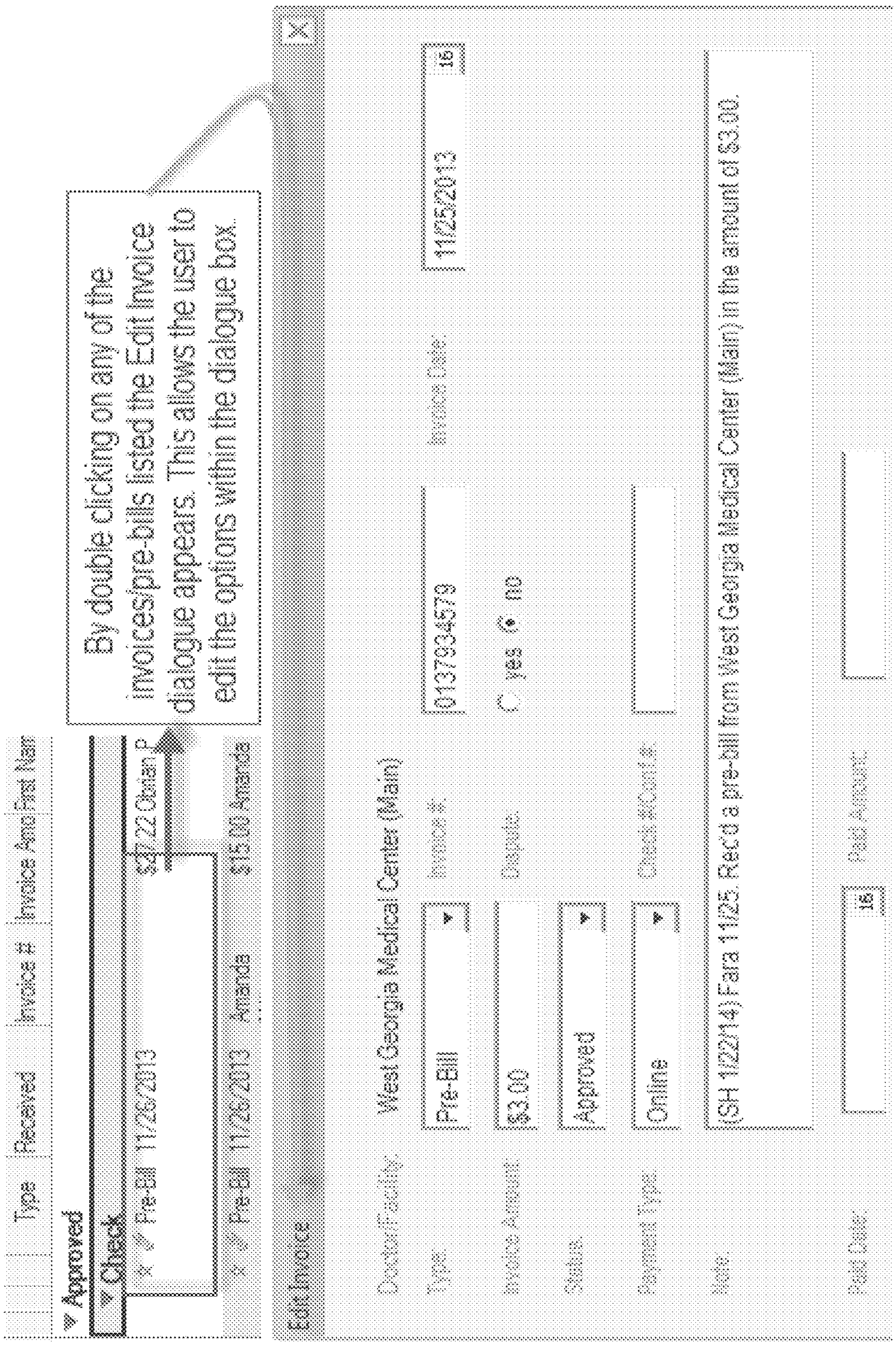
Figure 279E:
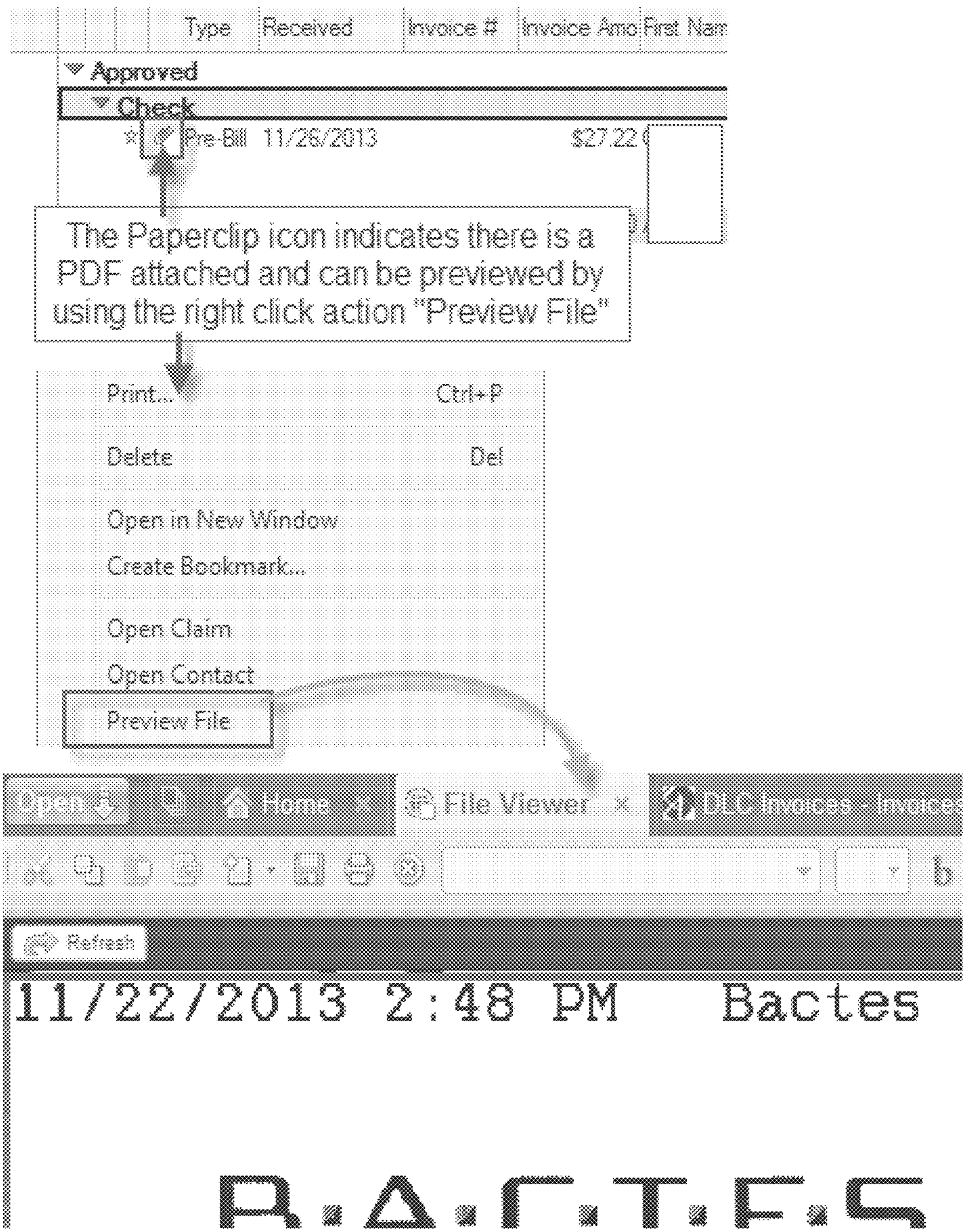
Figure 280A:
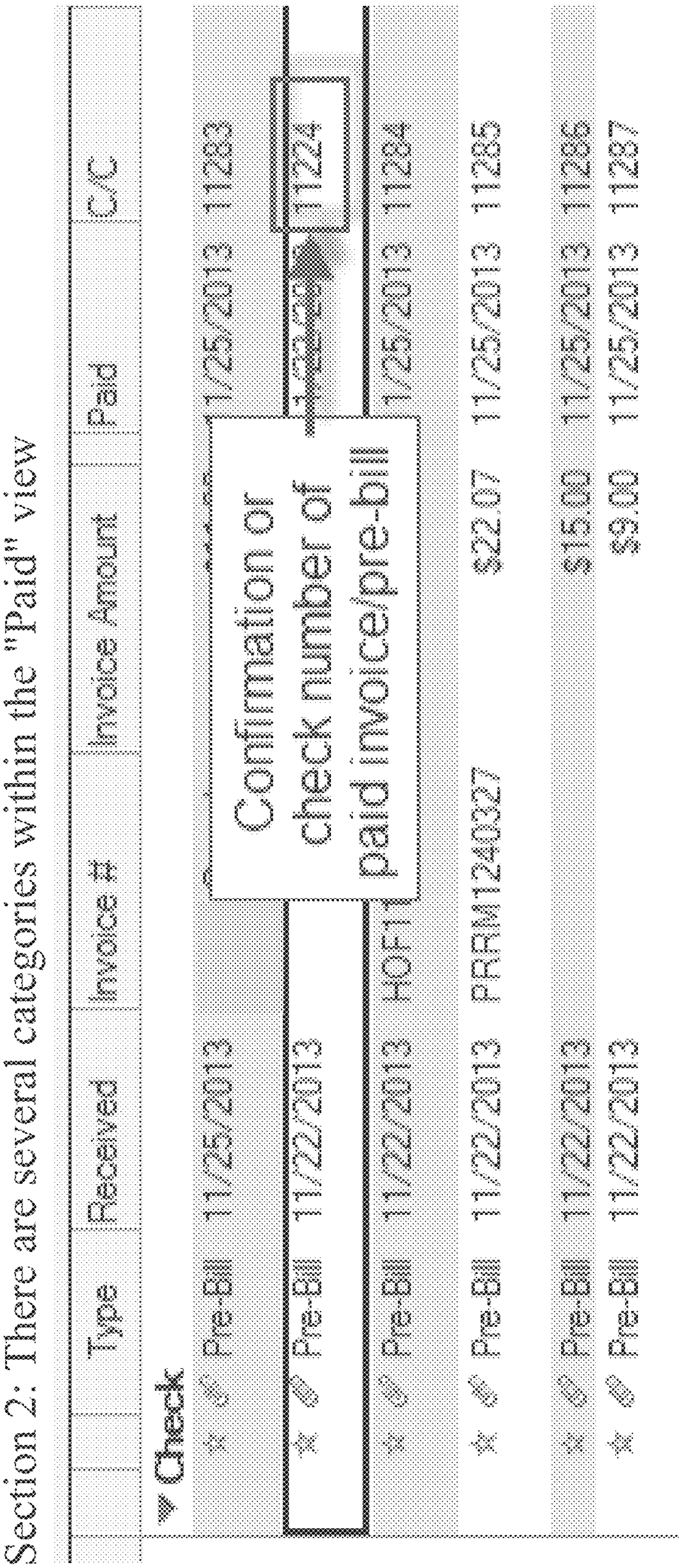
FIGS. 280*a*-280*b* are a screen shot of SSA Hearing Views pages.
Figure 280B:
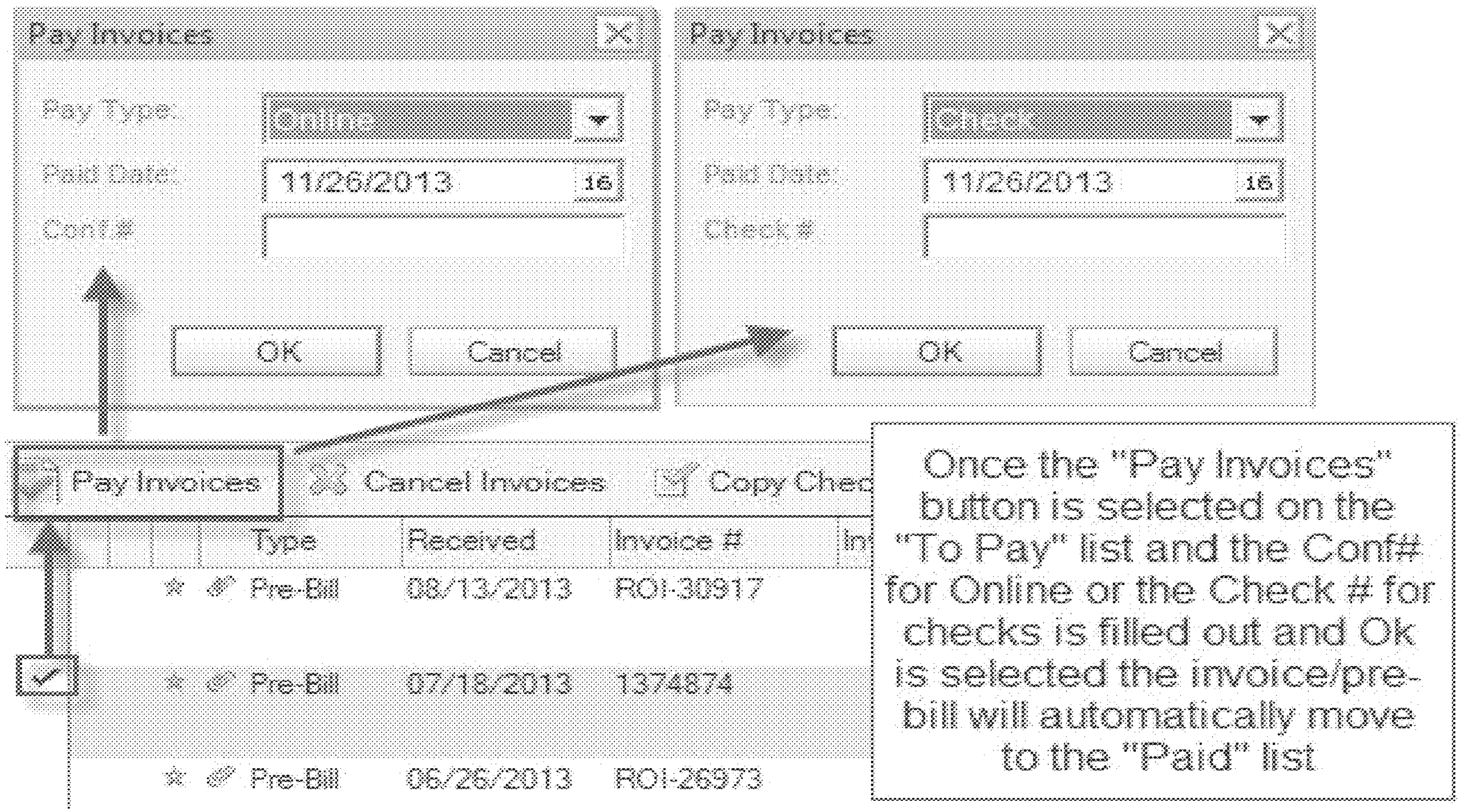
Figure 281B:
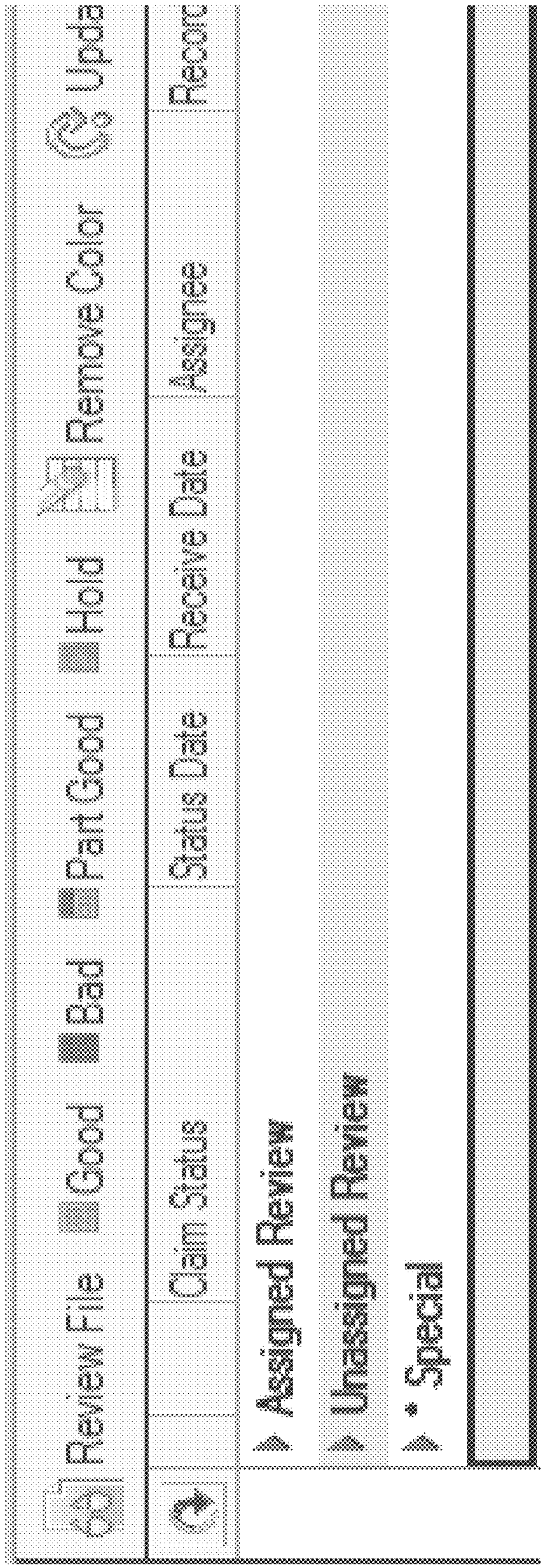

FIGS. 2-284 are screen shots of the above noted process. The screen shot indicate different possible selections and decisions at various steps in the above noted process.

The Import Wizard allows users to attach documents directly to client's files. Wizard is a trademark of the applicant. The wizard connects to a network folder called a Source folder where scanned documents are stored in PDF format. The user can see the selected document in a preview window within the Wizard to easily identify the document and the specific client. The user can select from 6 different import options depending on the type of documents they are importing.

Incoming Mail
Outgoing Mail
Collections
Medical Records
Pickups
Work-flow Documents When a specific client is searched and found their contact and claim information will appear in right side panel. The user will have the option to import the current document in the preview window, skip the current document in the preview window, or pick from a list of all documents in the network folder.

Once the document is imported it is automatically moved into a Target folder.

Importing Pickups: The Pickups Import Wizard is used to import the initial representation paperwork signed by a client.

The user will click Import to attach the document to the specific clients file.

After clicking Import a dialog will appear showing the three different categories the signed paperwork will go into: Pickup Package, 1696 & FA, and L & N Release.

After one the categories is imported it is indicated on the right panel under "Imported Subjects". To complete a pickup all three categories need to be imported.

Incoming Mail: This section of the import wizard is used to import incoming mail documents relating to the clients claim. The user will select from a list of pre-determined letter titles depending on what they are importing. The user can assign each imported document to another user if needed.

The user will click Import to attach the document to the specific clients file.

After clicking import an Import Window dialog will appear. The user will be able to update multiple data fields relating to the document they are importing. The data fields that are updated in the import window will be updated on the clients claim page.

Outgoing Mail: This section of the import wizard is used to upload outgoing mail documents.

The user will click Import to attach the document to the specific clients file.

The user will select from a list of pre-determined letter titles depending on what they are importing.

Workflow documents: Several workflows have been created to require a document to be attached to EZ claim as part of the workflow.

The user will click Import to attach the document to the specific clients file.

Claims have multiple workflows pending at any given time so a dialog will appear to ensure the user is importing the document to complete the correct one.

The workflow must be on the "Import" step (most workflows have multiple steps, Import being the last).

The workflow will appear in yellow in the right side panel which indicates it is on the Import step (it will be white if it's on any other step of the workflow).

Medical Records: This section of the Import Wizard is used to import Medical Records relating to the clients claim.

In addition to the clients contact and claim information, their treating sources will also appear in the right panel.

An "Add doctor/facility" button will also appear on the right panel which will allow the user to add a new doctor or facility if needed.

The user will click Import to attach the document to the specific clients file.

A dialog will appear giving the options Client, Facility, or ODAR. The user will select one of these options depending on where the record was received from.

If the user selects the Client option they must then determine whether the document they are importing is a "Medical Record" from a Doctor/Facility or if it would be categorized as "Other" which is anything that does not fall into the Medical Record category.

If the user selects Medical Record they will then need to select whether the Record was "Requested" or "Unrequested".

The "Requested" option means our office has already requested the records being imported and allows the user to match the received records to the records requested.

The "Unrequested" option means our office has not requested the records and the user must assign such records to a Doctor/Facility.

If the Unrequested option is selected the user will select the doctor or facility of the medical records received by the client.

Once the doctor/facility is selected the doctor/facility contact information appears in the Import window.

The user must then select from a pre-determined list the type of record that has been received.

The user must also select from a pre-determined list the way the records were received into the office.

There is a Comments box available for the user to write additional notes to describe the record that was received.

The user can assign the additional notes to another user with the record attached in PDF format.

The user can select "Reminders" within the import window. By selecting the Reminders tab a view will appear with pending Reminders found within the clients claim. The user can place a check mark on existing Reminders to remove them.

The user can add new Reminders by clicking Add. This will bring up a dialog box that will allow the user to add a new Reminder.

If the user selects the option "Other" they will need to determine whether or not the record was Requested or Unrequested.

If the user selects Unrequested they will choose the type of record from a pre-determined list.

If the user selects "Facility" as the source where the Medical Record was received from they will then select "Medical Record" or "Invoice" as the type of record to attach.

If the user selects "Medical Record", the user will select whether the record was Requested or Unrequested.

If the user selects requested, the will also need to select the Facility from which the records were received. Once the facility is selected it will show the date range of the requested records.

The user will have the option to select Close in order to document when records are not received or when the request needs to be consolidated.

The user will select the option which best describes the reason no records were received: Need to Request, Not seen since, Not relevant. If needed the user can write in the comments area any further details regarding the reason for closing the request.

When the user clicks Save with one of the options described it will close the request.

To Consolidate a record the user must select which record needs to be consolidated.

The user must then select the Consolidate option and a Resulting Record box will appear.

The Resulting record box shows a list of open requests for facilities which the selected request can be consolidated into.

Once the user has selected which facility the records need to be consolidated and imported under, a Receive Information box appears for the user to select then to enter the record information to be imported.

If the user selects "Invoice" they will choose the Doctor/Facility from which the Invoice was received.

An Invoice can only be imported if there is an open or satisfied request in the system. Otherwise there will be no Doctors/Facilities to choose from and the system will not allow anything to be imported.

The user must select to either import as an invoice or pre-bill. Once it is imported the bill goes onto the SSA Hearing—Medical Record—Invoices—To Pay list. If the pre-bill option is selected the bill goes to the top of the "To Pay" list to be paid first regardless if other invoices were received before it.

The user must select whether the bill can be paid by check, online, or by phone. Depending upon the option selected is where the bill will appear on the "To Pay" list. If online or phone is selected the Check Name and Check Address will appear.

If an Invoice/Pre-Bill was not invoiced correctly the user can select to Dispute it. Once Dispute is selected a new dialog box will appear to place the amount we are being incorrectly charged.

The user must select the action needed on the Invoice/Pre-Bill. Based upon the option selected the bill will go to the appropriate section on the "To Pay" list. If CD approval is selected a new dialog box will appear "Assigned" to assign the bill to a person to determine whether it will be paid or cancelled.

If the user selects "ODAR" as the source where the record was received from they will then need to select "Requested" or "Unrequested".

If the user selects Unrequested they will choose the type of record from a pre-determined list.

Importing Collections: This section of the Import Wizard is used to import any payment mail relating to a clients claim.

The user will click Import to attach the document to the specific clients file.

A dialog will appear giving the options New Fee Request, New Fee Mail, Existing Fee Request, and Existing Fee Mail. The user will select one of these options depending on what they are importing.

If the user selects "New Fee Request" they will select Received or Requested. If the user selects Received the date will automatically populate in the Check Received field.

The user will also select the Type to categorize the type of payment received, and Issued By to specify who issued the payment.

The user will then select the Fee Type from a pre-determined list.

The user will select the Attorney's name that appears on the check from a pre-determined list, the amount received, and a note if needed.

The user will select the AR Status from a pre-determined list and enter the date. This information will be reflected on the clients claim for tracking purposes.

The user will also have the option to update the clients claim status if necessary.

As described in #58, if the user selects New Fee Mail they will select the Subject and Fee Type from pre-determined lists.

The user will enter the Fee Amounts into each field accordingly and can add notes if needed.

If the user selects Existing Fee Request they will choose from a list of all Fee Requests imported under "New Fee Request" in order to edit the information.

If the user selects Existing Fee Mail they will choose from a list of all Fee Mail imported under "New Fee Mail" in order to edit the information.

The Application Wizard is an extension of the Intake Wizard. Once the Intake Wizard is completed the user is redirected to the Application Wizard for completion.

The user will be automatically redirected based on the clients claim status. The Intake Wizard predicts whether or not an Application needs to be completed based on a series of questions that are asked.

If the Intake Wizard predicts the client needs to file an application the user will redirected to the Application Wizard to begin.

All of the information gathered on the Intake Wizard is automatically populated into the Application Wizard to avoid retrieving duplicate information.

As each question is answered it allows more questions to appear. If a question does not apply due to previous answers the question will stay hidden.

If the user clicks Add Spouse a dialog will open and they will enter the all of the appropriate information which, upon saving, will populate in a summary box.

By clicking on any of the buttons on the Application Wizard a dialog will appear so that the user can enter the corresponding information. The information is then displayed in a summary box.

Once the Application Wizard is completed the client will appear on the Application Wizard View. On this view each application is categorized by the status of the Application Wizard and then sub-categorized by the user assigned to the application.

By double clicking on the client from the Application Wizard view that specific clients completed Application Wizard will open to be reviewed.

The Reviewer can add any revisions for the user to make once the Application Wizard is returned to them.

After reviewing the Application Wizard the user will click Return to Submitter and then from a dialog box they will select Revise and Return, Revise and OK to Submit, or OK to Submit.

Once the Application Wizard is under the category OK to Submit the user will click the Submit to SSA button.

The Social Security Application for Disability Benefits is a series of three (3) extensive forms. The Application Wizard has grouped the questions from these forms together to drastically shorten the completion time and to avoid gathering duplicate information.

Once all of the information is gathered using the Application Wizard the user can generate all three (3) Social Security forms by clicking the Submit to SSA button. Each application will open one at a time and the information gathered on the Application Wizard is populated into the corresponding fields on the SSA Application forms.

Now referring to FIGS. 285-301, disclosed is MyClaimGo, a client portal, the client will go to www.myclaim-.com. They can also access the portal from our website, www.disabilitylawclaims.com by clicking on the MyClaim link. MyClaim and MyClaimGo are trademarks of the Applicant. To Register the client will click on Register to use the site.

The client will enter their personal information and create a username and password.

Once the client registers, their information will be linked directly to their claim in Lotus using their Last Name, Date of Birth, and the Last four digits of their Social Security Number.

Once the client registers and logs in they will have access to their claim status information, contact information, emergency contact information, medical treatment information, prescription information, medical conditions, and work history.

If the client clicks on Emergency Contacts they will be able to view, Edit, or Remove all existing contacts. They will also have the ability to add New contacts.

If the client requests to add, edit, or remove a contact the request will appear in their Pending Requests window.

All client requests to add, edit, or remove information is sent our Admin Console which a user is checking daily.

If the client clicks on Medical Treatment they will be able to view, Edit, or Remove all existing Medical Treating sources. They will also have the ability to add new Treating Sources.

If the client requests to add, edit, or remove a medical treating source the request will appear in their Pending Requests window.

If the client clicks on Prescriptions they will be able to view, Edit, or Remove all existing Prescriptions. They will also have the ability to add new Prescriptions.

If the client requests to add, edit, or remove a prescription the request will appear in their Pending Requests window.

As described in #5<---this doesn't make sense here because my numbers are not included, if the client clicks on Medical Conditions they will be able to view, Edit, or Remove all existing Medical Conditions. They will also have the ability to add new Conditions.

If the client requests to add, edit, or remove a medical condition the request will appear in their Pending Requests window.

If the client clicks on Work History they will be able to view, Edit, or Remove all existing Work History. They will also have the ability to add new Work History.

If the client requests to add, edit, or remove a Work History the request will appear in their Pending Requests window.

The client can also click on Additional Comments to enter any information or request they'd like to be reviewed by the firm.

All client requests submitted to the Admin Console are reviewed daily and will be updated in the clients claim that will reflect on MyClaimGo.com in real time.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A computer driven systematic method for filtering data regarding Social Security disability, Veteran's Disability Compensation, or Workers Compensation claims, the method comprising the steps of:

providing on-line accessible data fields accessible by at least one computer device coupled to the internet, said data fields being stored on a first database accessible through the internet;

receiving answers, through a processor of the computer, by gathering data through on-line data fields;

populating said data fields in said first database with data entered by an individual or a computer regarding Social Security disability, Veteran's Disability Compensation, or Workers Compensation claims;

accessing preconfigured rules regarding Social Security disability, Veteran's Disability Compensation, or Workers Compensation data on said first database or on a second database accessible through the internet;

accessing a shared database in a dynamic configurable database and researching information data related to filter conditions and model learning techniques through identification of filtered information data wherein the model filters, and automatically updating said dynamic configurable database in real time, subject to user confirmation, with adjusted filtered conditions from the model filtering;

comparing, by a computer having a processor coupled to the internet, said populated data fields on said first database against said preconfigured rules;

analyzing, by said computer processor, the results of the comparison and determining how to make a decision most beneficial to a claimant;

reviewing said results and populating a data field with said filtered results to provide answers;

filtering at least a portion of said answers and forwarding the filtered information into a second database; and populating forms based on the type of case, pending claim status, claim progression, client location, work flow, medical conditions, prescriptions, age, date last insured, onset date, work history, military occupational specialty and financial information, by an application executing on the computer device.

2. The systematic method of claim 1, further comprising determining whether a representative will assist a claimant in applying to receive Social Security disability benefits, Veteran's Disability Compensation benefits, or Workers Compensation claims benefits.

3. The systematic method of claim 1 includes assessing personal history.

4. The systematic method of claim 1, further comprising including the claimant's military service.

5. The systematic method of claim 4, further comprising determining the claimant's eligibility for Veterans Disability.

6. The systematic method of claim 1, further comprising the step of determining whether the claimant's children are eligible to receive benefits.

7. The systematic method of claim 1, further comprising including the step of determining whether an application or appeal for the claimant is required, and whether the claimant has ever filed an application.

* * * * *